US006091684A

United States Patent [19]
Schell

[11] Patent Number: 6,091,684
[45] Date of Patent: Jul. 18, 2000

[54] OPTICAL DISC SYSTEM AND METHOD FOR CHANGING THE ROTATIONAL RATE OF AN INFORMATION STORAGE MEDIUM

[75] Inventor: David L. Schell, Colorado Springs, Colo.

[73] Assignee: Discovision Associates, Irvine, Calif.

[21] Appl. No.: 08/485,896

[22] Filed: Jun. 7, 1995

Related U.S. Application Data

[60] Division of application No. 08/420,380, Apr. 11, 1995, abandoned, which is a continuation-in-part of application No. 08/376,882, Jan. 25, 1995, Pat. No. 5,729,511.

[51] Int. Cl.[7] ........................ G11B 5/09
[52] U.S. Cl. ........................ 369/50
[58] Field of Search ........................ 369/50, 32, 33, 369/43, 44.27, 44.34, 44.35, 44.29

[56] References Cited

U.S. PATENT DOCUMENTS

| | | | |
|---|---|---|---|
| Re. 32,051 | 12/1985 | Ceshkovsky et al. | 369/44 |
| Re. 32,431 | 6/1987 | Dakin et al. | 369/50 |

(List continued on next page.)

FOREIGN PATENT DOCUMENTS

| | | |
|---|---|---|
| 7900180 | 4/1984 | Brazil . |
| 833100 | 1/1970 | Canada . |
| 1013854 | 7/1977 | Canada . |
| 1125434 | 6/1982 | Canada . |
| 1145464 | 4/1983 | Canada . |
| A2-282288 | 9/1988 | European Pat. Off. . |
| 287235 | 10/1988 | European Pat. Off. . |
| A2-304932 | 3/1989 | European Pat. Off. . |
| A2-313818 | 5/1989 | European Pat. Off. . |
| 427302 | 5/1991 | European Pat. Off. . |
| 543707 | 5/1993 | European Pat. Off. . |
| 57-18037 | 1/1982 | Japan . |
| 57-48709 | 3/1982 | Japan . |
| 58-64649 | 4/1983 | Japan . |
| 60-115031 | 6/1985 | Japan . |
| 60-129937 | 7/1985 | Japan . |
| 60-219640 | 11/1985 | Japan . |
| 60-247854 | 12/1985 | Japan . |
| 61-17230 | 1/1986 | Japan . |
| 61-182642 | 8/1986 | Japan . |
| 61-248241 | 11/1986 | Japan . |
| 62-205540 | 9/1987 | Japan . |
| 63-282938 | 11/1988 | Japan . |
| 1173475 | 7/1989 | Japan . |
| 1628236 | 11/1990 | Japan . |
| 1670392 | 6/1991 | Japan . |
| 6-223389 | 8/1994 | Japan . |
| 92-25208 | 12/1992 | Rep. of Korea . |

OTHER PUBLICATIONS

Hartmann, M., "Erasable Magneto–Optical Recording Media", iIEEE Transactons On Magnetics, vol. Mag–20, No. 5, Sep. 1984, pp. 1013–1018.

(List continued on next page.)

*Primary Examiner*—Tan Dinh
*Attorney, Agent, or Firm*—Donald Bollella; Paul M. Thyfault

[57] ABSTRACT

An optical disc drive apparatus includes mechanics, optics, electronic circuitry, and software code for implementing a method of disc rotation. One such method includes the changing of the rotational rate of a storage medium by applying a force to the storage medium to change the rotational rate from an initial rotational rate toward a first upper limit. The first upper limit is between the initial rotational rate and a desired rotational rate. A first signal is generated when the rotational rate exceeds the first upper limit. A second signal is generated when the rotational rate exceeds a lower acceptable limit of the desired rotational rate. The application of force is then terminated. To terminate the application of force, a second upper limit may be set at an upper acceptable limit of the desired rotational rate, a lower limit may be set at the lower acceptable limit of the desired rotational rate, and the application of force may be terminated when the rotational rate is greater than the lower limit.

37 Claims, 154 Drawing Sheets

U.S. PATENT DOCUMENTS

| | | | |
|---|---|---|---|
| Re. 32,574 | 1/1988 | Ceshkovsky et al. | 369/32 |
| Re. 32,709 | 7/1988 | Ceshkovsky et al. | 369/44 |
| 2,432,432 | 12/1947 | MacNeille . | |
| 3,310,792 | 3/1967 | Groom et al. . | |
| 3,518,442 | 6/1970 | Johnson . | |
| 3,530,258 | 9/1970 | Gregg et al. . | |
| 3,536,375 | 10/1970 | Mansell et al. . | |
| 3,637,984 | 1/1972 | Irvine | 219/471 |
| 3,652,167 | 3/1972 | Smith . | |
| 3,677,621 | 7/1972 | Smith . | |
| 3,806,668 | 4/1974 | Hilliker | 369/126 |
| 3,931,641 | 1/1976 | Watrous . | |
| 3,997,715 | 12/1976 | Elliott | 178/6.6 |
| 4,059,841 | 11/1977 | Bricot et al. | 369/44.24 |
| 4,118,735 | 10/1978 | Wilkinson | 358/128 |
| 4,160,156 | 7/1979 | Sherer | 235/463 |
| 4,161,753 | 7/1979 | Bailey et al. | 358/128 |
| 4,190,860 | 2/1980 | Somers et al. | 358/128 |
| 4,191,570 | 3/1980 | Shirai . | |
| 4,204,199 | 5/1980 | Isailovic | 340/347 |
| 4,210,931 | 7/1980 | Bailey et al. | 358/128.5 |
| 4,222,072 | 9/1980 | Bailey et al. | 358/128.5 |
| 4,225,873 | 9/1980 | Winslow | 346/762 |
| 4,228,326 | 10/1980 | Dakin et al. | 358/128 |
| 4,232,201 | 11/1980 | Canino | 179/100.1 |
| 4,232,337 | 11/1980 | Winslow et al. | 358/128.5 |
| 4,232,388 | 11/1980 | Isailovic | 375/100 |
| 4,234,837 | 11/1980 | Winslow | 318/577 |
| 4,236,050 | 11/1980 | Winslow et al. | 179/101.1 |
| 4,236,105 | 11/1980 | Wilkinson | 318/577 |
| 4,271,334 | 6/1981 | Yardy | 369/41 |
| 4,282,598 | 8/1981 | Elliott | 369/44 |
| 4,307,381 | 12/1981 | Isailovic | 369/347 |
| 4,313,191 | 1/1982 | Winslow et al. | 369/275 |
| 4,358,796 | 11/1982 | Ceshkovsky et al. | 358/322 |
| 4,370,679 | 1/1983 | Ceshkovsky et al. | 358/318 |
| 4,371,899 | 2/1983 | Ceshkovsky et al. | 358/315 |
| 4,375,091 | 2/1983 | Dakin et al. | 369/32 |
| 4,406,000 | 9/1983 | Shoji et al. | 369/44 |
| 4,414,655 | 11/1983 | Shoji et al. | 369/44 |
| 4,425,043 | 1/1984 | van Rosmalen | 369/44.14 |
| 4,439,848 | 3/1984 | Ceshkovsky et al. | 369/45 |
| 4,447,722 | 5/1984 | Saimi . | |
| 4,449,213 | 5/1984 | Noborimoto et al. . | |
| 4,451,913 | 5/1984 | Elliott | 369/110 |
| 4,455,634 | 6/1984 | Efron et al. | 369/58 |
| 4,456,914 | 6/1984 | Winslow | 369/106 |
| 4,465,977 | 8/1984 | Lopez De Romana | 328/120 |
| 4,467,467 | 8/1984 | Wilkinson et al. | 369/111 |
| 4,488,279 | 12/1984 | Wilkinson et al. | 369/54 |
| 4,497,534 | 2/1985 | Sincerbox . | |
| 4,499,569 | 2/1985 | Lopez De Romana | 369/45 |
| 4,502,783 | 3/1985 | Lau et al. . | |
| 4,504,935 | 3/1985 | Jansen . | |
| 4,514,837 | 4/1985 | Van Rosmalen . | |
| 4,524,444 | 6/1985 | Efron et al. | 371/24 |
| 4,536,863 | 8/1985 | Giddings | 369/32 |
| 4,542,429 | 9/1985 | Nishida et al. . | |
| 4,561,081 | 12/1985 | Janssen et al. | 369/44.17 |
| 4,562,577 | 12/1985 | Glover et al. | 371/38 |
| 4,568,142 | 2/1986 | Iguma . | |
| 4,571,026 | 2/1986 | Maurta . | |
| 4,571,716 | 2/1986 | Szerlip | 369/54 |
| 4,583,210 | 4/1986 | Winslow | 369/54 |
| 4,592,037 | 5/1986 | Ohnuki . | |
| 4,596,444 | 6/1986 | Ushida . | |
| 4,596,448 | 6/1986 | Kikuchi . | |
| 4,598,324 | 7/1986 | Efron et al. | 358/341 |
| 4,603,363 | 7/1986 | Rickert et al. | 360/97 |
| 4,603,412 | 7/1986 | Yamazaki | 369/50 |
| 4,611,318 | 9/1986 | Winslow | 369/54 |
| 4,623,837 | 11/1986 | Efron et al. | 324/77 R |
| 4,627,038 | 12/1986 | Abed et al. | 369/44 |
| 4,633,471 | 12/1986 | Perera et al. | 371/38 |
| 4,638,377 | 1/1987 | Dakin | 358/343 |
| 4,643,522 | 2/1987 | Takashima . | |
| 4,644,516 | 2/1987 | Musha . | |
| 4,646,283 | 2/1987 | Ito et al. . | |
| 4,669,073 | 5/1987 | Wakabayashi et al. . | |
| 4,679,904 | 7/1987 | Kurihara . | |
| 4,682,246 | 7/1987 | Efron et al. | 358/335 |
| 4,688,204 | 8/1987 | Noyes, Jr. et al. | 369/59 |
| 4,694,447 | 9/1987 | Cohen et al. . | |
| 4,696,566 | 9/1987 | Sekimoto et al. . | |
| 4,697,167 | 9/1987 | O'Keeffe et al. | 340/347 D |
| 4,701,898 | 10/1987 | Giddings | 369/32 |
| 4,702,555 | 10/1987 | Iguma et al. . | |
| 4,703,368 | 10/1987 | Dakin | 358/342 |
| 4,703,467 | 10/1987 | Elliott | 369/44 |
| 4,706,133 | 11/1987 | Giddings | 358/342 |
| 4,720,088 | 1/1988 | Tamura . | |
| 4,727,433 | 2/1988 | Dakin | 358/343 |
| 4,727,532 | 2/1988 | Giddings | 369/43 |
| 4,740,941 | 4/1988 | Shah et al. | 369/48 |
| 4,740,946 | 4/1988 | Yumura et al. . | |
| 4,746,991 | 5/1988 | Efron et al. | 358/335 |
| 4,750,065 | 6/1988 | Masaki et al. | 360/99.02 |
| 4,751,692 | 6/1988 | Giddings | 369/32 |
| 4,752,954 | 6/1988 | Masuko | 380/20 |
| 4,755,884 | 7/1988 | Efron et al. | 358/335 |
| 4,757,393 | 7/1988 | Dakin et al. | 358/342 |
| 4,763,314 | 8/1988 | McCaslin et al. . | |
| 4,764,915 | 8/1988 | Efron et al. | 369/58 |
| 4,769,803 | 9/1988 | Yammaiya . | |
| 4,774,699 | 9/1988 | Giddings | 369/32 |
| 4,786,999 | 11/1988 | Tanaka et al. . | |
| 4,791,622 | 12/1988 | Clay et al. | 369/59 |
| 4,792,875 | 12/1988 | Ohdaira . | |
| 4,794,586 | 12/1988 | Korth . | |
| 4,797,763 | 1/1989 | Levy et al. . | |
| 4,805,162 | 2/1989 | Stahl et al. | 369/44 |
| 4,809,247 | 2/1989 | Elliott | 369/44 |
| 4,811,320 | 3/1989 | Kawasaki et al. . | |
| 4,823,336 | 4/1989 | Inada et al. . | |
| 4,829,395 | 5/1989 | Coon et al. . | |
| 4,842,392 | 6/1989 | Nakamura et al. . | |
| 4,845,697 | 7/1989 | Giddings | 369/32 |
| 4,845,699 | 7/1989 | Kawasaki et al. . | |
| 4,849,952 | 7/1989 | Shiho | 369/13 |
| 4,853,811 | 8/1989 | Brooks, Jr. et al. . | |
| 4,866,687 | 9/1989 | Kasai et al. | 369/32 |
| 4,868,694 | 9/1989 | Hagen . | |
| 4,870,703 | 9/1989 | Augeri et al. | 360/98.07 |
| 4,878,211 | 10/1989 | Suzuki et al. | 364/44.35 |
| 4,882,644 | 11/1989 | Kimura et al. . | |
| 4,912,583 | 3/1990 | Hinlein . | |
| 4,942,563 | 7/1990 | Yamamuro . | |
| 4,942,564 | 7/1990 | Hofer et al. | 369/58 |
| 4,953,959 | 9/1990 | Ishiwata et al. . | |
| 4,979,158 | 12/1990 | Yoda | 369/13 |
| 4,988,165 | 1/1991 | Ishii et al. . | |
| 4,998,011 | 3/1991 | Shuman | 250/201.5 |
| 5,001,568 | 3/1991 | Efron et al. | 358/335 |
| 5,003,524 | 3/1991 | Ikeda | 369/44.28 |
| 5,003,526 | 3/1991 | Bailey | 369/59 |
| 5,025,335 | 6/1991 | Stefansky | 360/97.01 |
| 5,044,729 | 9/1991 | Tomita et al. . | |
| 5,079,757 | 1/1992 | Wachi et al. | 369/44.26 |
| 5,084,852 | 1/1992 | Bailey | 369/58 |
| 5,103,438 | 4/1992 | Masunaga et al. . | |
| 5,124,967 | 6/1992 | Isaka et al. | 369/48 |
| 5,126,990 | 6/1992 | Efron et al. | 369/44.15 |

| | | | |
|---|---|---|---|
| 5,128,911 | 7/1992 | Ito et al. | 369/32 |
| 5,136,558 | 8/1992 | Getreuer et al. | 359/814 |
| 5,136,560 | 8/1992 | Hangai et al. | 369/32 |
| 5,138,605 | 8/1992 | Shtipelman et al. . | |
| 5,146,443 | 9/1992 | Iwase et al. | 369/44.29 |
| 5,150,343 | 9/1992 | Goto et al. . | |
| 5,155,633 | 10/1992 | Grove et al. | 369/59 |
| 5,175,716 | 12/1992 | Min | 369/32 |
| 5,175,719 | 12/1992 | Iimura | 369/58 |
| 5,177,640 | 1/1993 | Grassens | 359/813 |
| 5,177,717 | 1/1993 | Sato et al. | 369/14 |
| 5,187,627 | 2/1993 | Hickox et al. | 360/105 |
| 5,187,702 | 2/1993 | Takahashi . | |
| 5,189,653 | 2/1993 | Yanagi | 369/44.32 |
| 5,191,570 | 3/1993 | Shirai | 369/44.22 |
| 5,200,935 | 4/1993 | Watanabe et al. | 369/13 |
| 5,216,647 | 6/1993 | Kitani | 369/32 |
| 5,220,543 | 6/1993 | Kuroda et al. | 369/13 |
| 5,241,524 | 8/1993 | Lee | 360/50 |
| 5,245,174 | 9/1993 | Prikryl et al. | 369/59 |
| 5,253,244 | 10/1993 | Bailey | 369/112 |
| 5,262,913 | 11/1993 | Stram et al. | 360/105 |
| 5,265,079 | 11/1993 | Getreuer et al. | 369/44.14 |
| 5,268,800 | 12/1993 | Nielsen . | |
| 5,291,110 | 3/1994 | Andrews, Jr. et al. . | |
| 5,313,332 | 5/1994 | Schell et al. | 369/44.14 |
| 5,317,143 | 5/1994 | Yoshimoto et al. . | |
| 5,319,624 | 6/1994 | Yamasaki et al. . | |
| 5,321,680 | 6/1994 | Bailey | 369/59 |
| 5,325,247 | 6/1994 | Ehrlich et al. | 360/78.09 |
| 5,331,622 | 7/1994 | Ernst et al. | 369/112 |
| 5,347,500 | 9/1994 | Eguchi . | |
| 5,349,175 | 9/1994 | Prikryl | 369/44.14 |
| 5,361,175 | 11/1994 | Richardson et al. | 360/46 |
| 5,361,242 | 11/1994 | Chaya et al. | 369/13 |
| 5,361,247 | 11/1994 | Fuji et al. | 369/48 |
| 5,365,389 | 11/1994 | Jabbari et al. | 360/105 |
| 5,373,490 | 12/1994 | Bailey | 369/275.3 |
| 5,375,116 | 12/1994 | Bailey | 369/275.3 |
| 5,398,222 | 3/1995 | Kim . | |
| 5,412,522 | 5/1995 | Lockhart et al. | 360/92.01 |
| 5,448,537 | 9/1995 | Tsukahara et al. | 369/13 |
| 5,448,545 | 9/1995 | Bailey | 369/59 |
| 5,455,728 | 10/1995 | Edwards et al. | 360/105 |
| 5,459,624 | 10/1995 | Erickson et al. . | |
| 5,469,414 | 11/1995 | Okamura | 369/32 |
| 5,479,390 | 12/1995 | Bailey | 369/59 |
| 5,493,546 | 2/1996 | Kasahara | 369/44.15 |
| 5,495,465 | 2/1996 | Arisaka | 369/32 |
| 5,502,700 | 3/1996 | Shinada | 369/50 |
| 5,576,909 | 11/1996 | Dierkes et al. | 360/78.09 |

OTHER PUBLICATIONS

Sander, I., “Digital Magneto–Optic Storage System”, Topical Meeting on Optica Data Storage, Jan. 20, 1989, pp. tha2–1–Tha2–4.

Murakami, et al., “Magnetooptic errasable disk memory with two optical heads”, Applied Optics, vol. 25, No. 22, Nov. 15, 1986, pp. 3986–3989.

Yoshizumi, Keiichi, etal., Fast Access Actuator for Optical Disk Memory, SPIE, 1985.

G. Bouwhuis, et al., *Principals of Optical Disc Systems*, Adam Hilger Ltd., Bristol, pp. 70–80.

Kobori, et al., “New Magneto–Optic Head with a Buitlt–In Generator for a Bias Magnetic Field”, Optical Data Storage Conference, Technical Digest Series vol. 10, Mar. 11–13, 1987, pp. 186–189.

Hiromichi Kobori et al., “New magnetooptic head with a built–in generator for a bias magnetic field”, Applied Optics/ vol. 27, No. 4/ Feb. 15, 1988, pp. 698–702.

Eguchi, Naoya, et al., An 86 mm Magneto–Optical Disk Drive with a Compact and fast–seek–time Optical head, SPIE vol. 1316 Optical data Storage (1990), pp. 2–10.

T. Maeda, et al., Read Channel and Format for High Density Magneto–Optical Disk System, Joint Internatioanl Symposium, 1993 IEEE Catalog #93TH0548–8, pp. 59,60.

H. Ide, et al., Write Control Method For High Density Magneto–Opticla Disk System, Joint International Symposium 1993 IEEE Catalog #93TH0548–8, pp. 61,62.

Takeshi Maeda et al., Read Channel and Format for High––Density Magneto–Optical Disk System, Jpn. J. Appl. Phys. Nov. 1993, vol. 32, pp. 5335–5341.

T. Maeda et al., Write Control Method for High Density Magneto–optical Disk System, IEEE Transactions on Magnetics, vol. 29 No. 6 Nov. 1993, pp. 3787–3789.

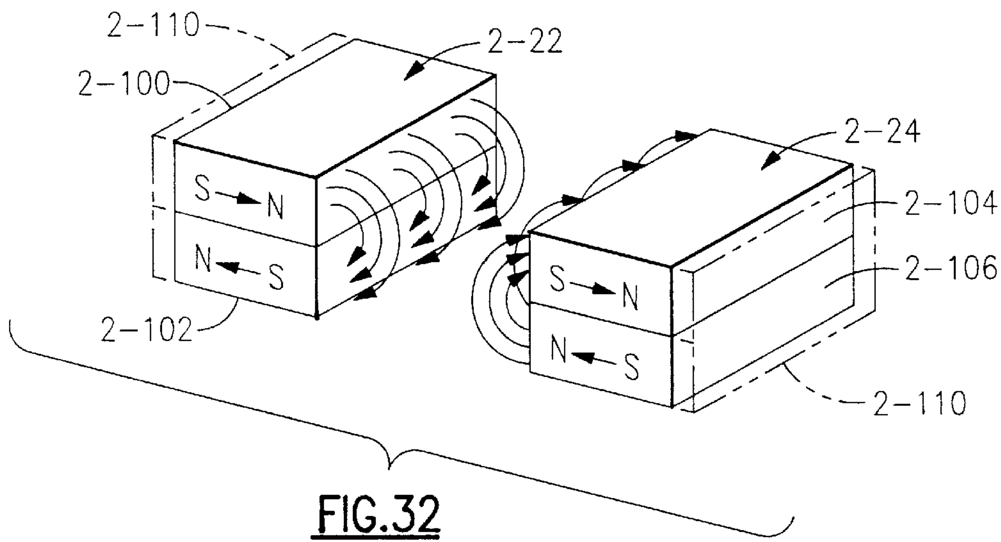
FIG.32
FIG.33
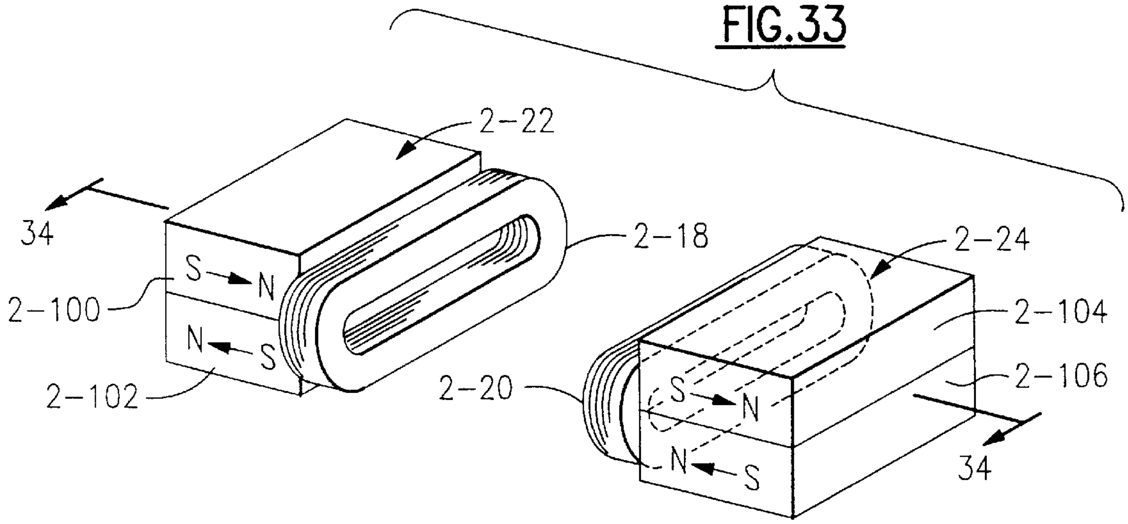

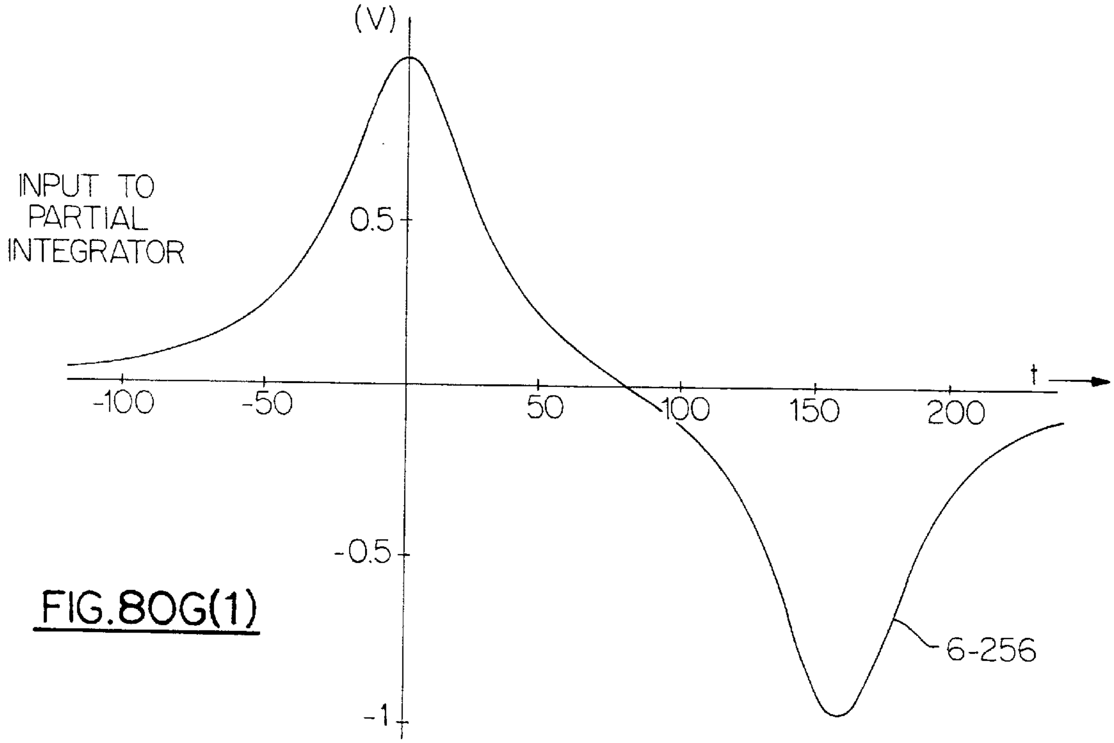
FIG.80G(1)
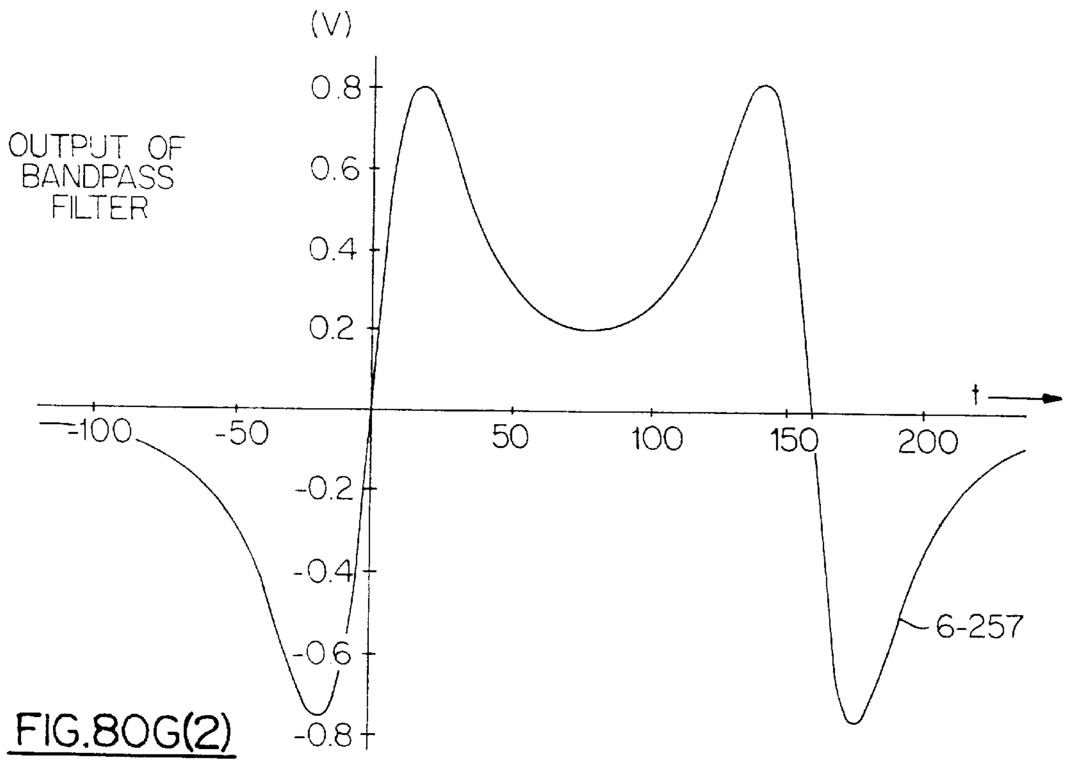
FIG.80G(2)

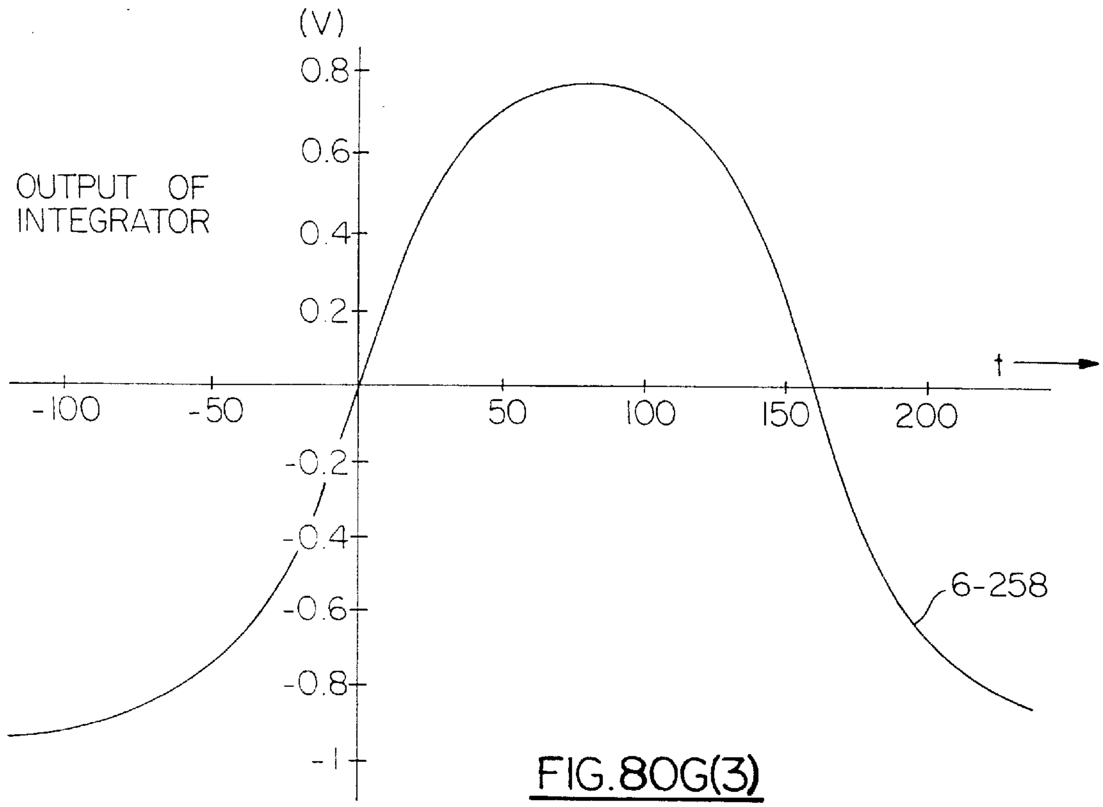
FIG.80G(3)
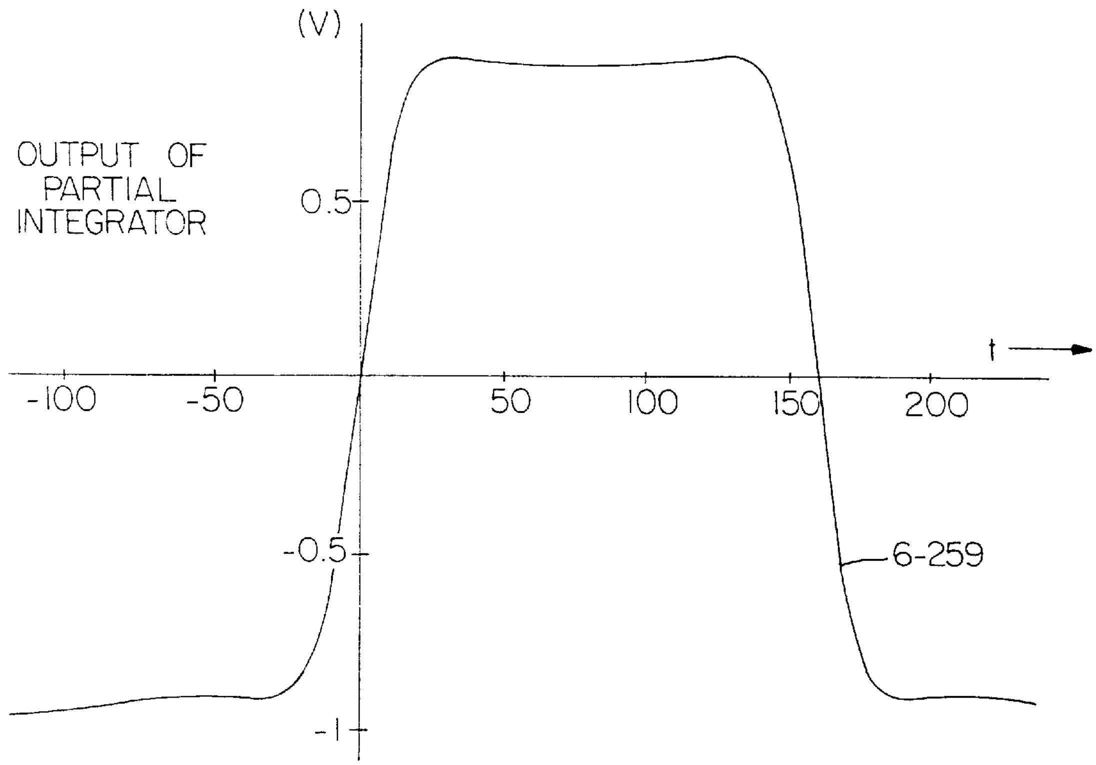
FIG.80G(4)

* FIXED FREQUENCY
80 CHANNEL BITS

++ 1 BYTE = 9 CHANNEL BITS

| ZONE | (ABSOLUTE) | NO. OF SECTORS PER TRACK | NO. OF SEC./ZONE | WRITE FREQ. (MHZ) |
|---|---|---|---|---|
| 1 | 0 – 475 | 40 | 19040 | 10.591 |
| 2 | 476 – 951 | 41 | 19516 | 10.852 |
| 3 | 952 – 1427 | 42 | 19992 | 11.117 |
| 4 | 1428 – 1903 | 43 | 20468 | 11.368 |
| 5 | 1904 – 2379 | 44 | 20944 | 11.636 |
| 6 | 2380 – 2855 | 45 | 21420 | 11.963 |
| 7 | 2856 – 3331 | 46 | 21896 | 12.180 |
| 8 | 3332 – 3807 | 47 | 22372 | 12.459 |
| 9 | 3808 – 4283 | 48 | 22848 | 12.705 |
| 10 | 4284 – 4759 | 49 | 23324 | 12.992 |
| 11 | 4760 – 5235 | 50 | 23800 | 13.257 |
| 12 | 5236 – 5711 | 51 | 24276 | 13.533 |
| 13 | 5712 – 6187 | 52 | 24752 | 13.831 |
| 14 | 6188 – 6663 | 53 | 25228 | 14.086 |
| 15 | 6664 – 7139 | 54 | 25704 | 14.362 |
| 16 | 7140 – 7615 | 55 | 26180 | 14.626 |
| 17 | 7616 – 8091 | 56 | 26656 | 14.914 |
| 18 | 8092 – 8567 | 57 | 27132 | 15.130 |
| 19 | 8568 – 9043 | 58 | 27608 | 15.467 |
| 20 | 9044 – 9519 | 59 | 28084 | 15.694 |
| 21 | 9520 – 9999 | 60 | 28800 | 15.950 |
| | | | TOTAL SEC. 500,040 x 512 B/S = 256.02 MB | |

| CRC FOR ID FIELDS |
|---|
| (1) $G(x) = x^{16} + x^{12} + x^5 + 1$ |
| (2) $R(x) = \left( \sum_{i=8}^{i=23} \bar{b}_i x^i + \sum_{i=0}^{i=7} b_i x^i \right) x^{16} \text{ Mod } G(x)$ |
| (3) $R_C(x) = \sum_{k=0}^{k=15} c_k x^k$ |

| 8 BIT BYTE | | ENCODED | 8 BIT BYTE | | ENCODED |
|---|---|---|---|---|---|
| HEX | BINARY | 9 BIT BYTE | HEX | BINARY | 9 BIT BYTE |
| 00 | 00000000 | 011001011 | 40 | 01000000 | 010001011 |
| 01 | 00000001 | 011001001 | 41 | 01000001 | 010001001 |
| 02 | 00000010 | 001001101 | 42 | 01000010 | 010010010 |
| 03 | 00000011 | 101100011 | 43 | 01000011 | 010010011 |
| 04 | 00000100 | 011001010 | 44 | 01000100 | 010001010 |
| 05 | 00000101 | 101100101 | 45 | 01000101 | 010010101 |
| 06 | 00000110 | 101100110 | 46 | 01000110 | 010010110 |
| 07 | 00000111 | 101100111 | 47 | 01000111 | 010010111 |
| 08 | 00001000 | 011001111 | 48 | 01001000 | 010001111 |
| 09 | 00001001 | 101101001 | 49 | 01001001 | 010011001 |
| 0A | 00001010 | 101101010 | 4A | 01001010 | 010011010 |
| 0B | 00001011 | 101101011 | 4B | 01001011 | 010011011 |
| 0C | 00001100 | 011001110 | 4C | 01001100 | 010001110 |
| 0D | 00001101 | 101101101 | 4D | 01001101 | 010011101 |
| 0E | 00001110 | 101101110 | 4E | 01001110 | 010011110 |
| 0F | 00001111 | 101101111 | 4F | 01001111 | 010011111 |
| 10 | 00010000 | 001001011 | 50 | 01010000 | 011100101 |
| 11 | 00010001 | 001001001 | 51 | 01010001 | 001100101 |
| 12 | 00010010 | 011001101 | 52 | 01010010 | 010110010 |
| 13 | 00010011 | 100100011 | 53 | 01010011 | 010110011 |
| 14 | 00010100 | 001001010 | 54 | 01010100 | 010100101 |
| 15 | 00010101 | 100100101 | 55 | 01010101 | 010110101 |
| 16 | 00010110 | 100100110 | 56 | 01010110 | 010110110 |
| 17 | 00010111 | 100100111 | 57 | 01010111 | 010110111 |
| 18 | 00011000 | 001001111 | 58 | 01011000 | 111100101 |
| 19 | 00011001 | 100101001 | 59 | 01011001 | 010111001 |
| 1A | 00011010 | 100101010 | 5A | 01011010 | 010111010 |
| 1B | 00011011 | 100101011 | 5B | 01011011 | 010111011 |
| 1C | 00011100 | 001001110 | 5C | 01011100 | 110100101 |
| 1D | 00011101 | 100101101 | 5D | 01011101 | 010111101 |
| 1E | 00011110 | 100101110 | 5E | 01011110 | 010111110 |
| 1F | 00011111 | 100101111 | 5F | 01011111 | 010111111 |

FIG.100A(1)

| | | |
|---|---|---|
| 20 | 00100000 | 101001111 |
| 21 | 00100001 | 101001101 |
| 22 | 00100010 | 001010010 |
| 23 | 00100011 | 001010011 |
| 24 | 00100100 | 101001110 |
| 25 | 00100101 | 001010101 |
| 26 | 00100110 | 001010110 |
| 27 | 00100111 | 001010111 |
| 28 | 00101000 | 101001011 |
| 29 | 00101001 | 001011001 |
| 2A | 00101010 | 001011010 |
| 2B | 00101011 | 001011011 |
| 2C | 00101100 | 101001010 |
| 2D | 00101101 | 001011101 |
| 2E | 00101110 | 001011110 |
| 2F | 00101111 | 001011111 |
| 30 | 00110000 | 011100011 |
| 31 | 00110001 | 001100011 |
| 32 | 00110010 | 001110010 |
| 33 | 00110011 | 001110011 |
| 34 | 00110100 | 010100011 |
| 35 | 00110101 | 001110101 |
| 36 | 00110110 | 001110110 |
| 37 | 00110111 | 001110111 |
| 38 | 00111000 | 111100011 |
| 39 | 00111001 | 001111001 |
| 3A | 00111010 | 001111010 |
| 3B | 00111011 | 001111011 |
| 3C | 00111100 | 110100011 |
| 3D | 00111101 | 001111101 |
| 3E | 00111110 | 001111110 |
| 3F | 00111111 | 001111111 |
| POSITION IN BYTE | 8 1 | 9 1 |

| | | |
|---|---|---|
| 60 | 01100000 | 011100110 |
| 61 | 01100001 | 001100110 |
| 62 | 01100010 | 011010010 |
| 63 | 01100011 | 011010011 |
| 64 | 01100100 | 010100110 |
| 65 | 01100101 | 011010101 |
| 66 | 01100110 | 011010110 |
| 67 | 01100111 | 011010111 |
| 68 | 01101000 | 111100110 |
| 69 | 01101001 | 011011001 |
| 6A | 01101010 | 011011010 |
| 6B | 01101011 | 011011011 |
| 6C | 01101100 | 110100110 |
| 6D | 01101101 | 011011101 |
| 6E | 01101110 | 011011110 |
| 6F | 01101111 | 011011111 |
| 70 | 01110000 | 011100111 |
| 71 | 01110001 | 001100111 |
| 72 | 01110010 | 011110010 |
| 73 | 01110011 | 011110011 |
| 74 | 01110100 | 010100111 |
| 75 | 01110101 | 011110101 |
| 76 | 01110110 | 011110110 |
| 77 | 01110111 | 011110111 |
| 78 | 01111000 | 111100111 |
| 79 | 01111001 | 011111001 |
| 7A | 01111010 | 011111010 |
| 7B | 01111011 | 011111011 |
| 7C | 01111100 | 110100111 |
| 7D | 01111101 | 011111101 |
| 7E | 01111110 | 011111110 |
| 7F | 01111111 | 011111111 |
| POSITION IN BYTE | 8 1 | 9 1 |

FIG.100A(2)

| 8 BIT BYTE | | ENCODED |
|---|---|---|
| HEX | BINARY | 9 BIT BYTE |
| 80 | 10000000 | 111001011 |
| 81 | 10000001 | 111001001 |
| 82 | 10000010 | 100010010 |
| 83 | 10000011 | 100010011 |
| 84 | 10000100 | 111001010 |
| 85 | 10000101 | 100010101 |
| 86 | 10000110 | 100010110 |
| 87 | 10000111 | 100010111 |
| 88 | 10001000 | 111001111 |
| 89 | 10001001 | 100011001 |
| 8A | 10001010 | 100011010 |
| 8B | 10001011 | 100011011 |
| 8C | 10001100 | 111001110 |
| 8D | 10001101 | 100011101 |
| 8E | 10001110 | 100011110 |
| 8F | 10001111 | 100011111 |
| 90 | 10010000 | 011101001 |
| 91 | 10010001 | 001101001 |
| 92 | 10010010 | 100110010 |
| 93 | 10010011 | 100110011 |
| 94 | 10010100 | 010101001 |
| 95 | 10010101 | 100110101 |
| 96 | 10010110 | 100110110 |
| 97 | 10010111 | 100110111 |
| 98 | 10011000 | 111101001 |
| 99 | 10011001 | 100111001 |
| 9A | 10011010 | 100111010 |
| 9B | 10011011 | 100111011 |
| 9C | 10011100 | 110101001 |
| 9D | 10011101 | 100111101 |
| 9E | 10011110 | 100111110 |
| 9F | 10011111 | 100111111 |

| 8 BIT BYTE | | ENCODED |
|---|---|---|
| HEX | BINARY | 9 BIT BYTE |
| C0 | 11000000 | 110001011 |
| C1 | 11000001 | 110001001 |
| C2 | 11000010 | 110010010 |
| C3 | 11000011 | 110010011 |
| C4 | 11000100 | 110001010 |
| C5 | 11000101 | 110010101 |
| C6 | 11000110 | 110010110 |
| C7 | 11000111 | 110010111 |
| C8 | 11001000 | 110001111 |
| C9 | 11001001 | 110011001 |
| CA | 11001010 | 110011010 |
| CB | 11001011 | 110011011 |
| CC | 11001100 | 110001110 |
| CD | 11001101 | 110011101 |
| CE | 11001110 | 110011110 |
| CF | 11001111 | 110011111 |
| D0 | 11010000 | 011101101 |
| D1 | 11010001 | 001101101 |
| D2 | 11010010 | 110110010 |
| D3 | 11010011 | 110110011 |
| D4 | 11010100 | 010101101 |
| D5 | 11010101 | 110110101 |
| D6 | 11010110 | 110110110 |
| D7 | 11010111 | 110110111 |
| D8 | 11011000 | 111101101 |
| D9 | 11011001 | 110111001 |
| DA | 11011010 | 110111010 |
| DB | 11011011 | 110111011 |
| DC | 11011100 | 110101101 |
| DD | 11011101 | 110111101 |
| DE | 11011110 | 110111110 |
| DF | 11011111 | 110111111 |

FIG.100B(1)

| | | | | | |
|---|---|---|---|---|---|
| A0 | 10100000 | 011101010 | E0 | 11100000 | 011101110 |
| A1 | 10100001 | 001101010 | E1 | 11100001 | 001101110 |
| A2 | 10100010 | 101010010 | E2 | 11100010 | 111010010 |
| A3 | 10100011 | 101010011 | E3 | 11100011 | 111010011 |
| A4 | 10100100 | 010101010 | E4 | 11100100 | 010101110 |
| A5 | 10100101 | 101010101 | E5 | 11100101 | 111010101 |
| A6 | 10100110 | 101010110 | E6 | 11100110 | 111010110 |
| A7 | 10100111 | 101010111 | E7 | 11100111 | 111010111 |
| A8 | 10101000 | 111101010 | E8 | 11101000 | 111101110 |
| A9 | 10101001 | 101011001 | E9 | 11101001 | 111011001 |
| AA | 10101010 | 101011010 | EA | 11101010 | 111011010 |
| AB | 10101011 | 101011011 | EB | 11101011 | 111011011 |
| AC | 10101100 | 110101010 | EC | 11101100 | 110101110 |
| AD | 10101101 | 101011101 | ED | 11101101 | 111011101 |
| AE | 10101110 | 101011110 | EE | 11101110 | 111011110 |
| AF | 10101111 | 101011111 | EF | 11101111 | 111011111 |
| B0 | 10110000 | 011101011 | F0 | 11110000 | 011101111 |
| B1 | 10110001 | 001101011 | F1 | 11110001 | 001101111 |
| B2 | 10110010 | 101110010 | F2 | 11110010 | 111110010 |
| B3 | 10110011 | 101110011 | F3 | 11110011 | 111110011 |
| B4 | 10110100 | 010101011 | F4 | 11110100 | 010101111 |
| B5 | 10110101 | 101110101 | F5 | 11110101 | 111110101 |
| B6 | 10110110 | 101110110 | F6 | 11110110 | 111110110 |
| B7 | 10110111 | 101110111 | F7 | 11110111 | 111110111 |
| B8 | 10111000 | 111101011 | F8 | 11111000 | 111101111 |
| B9 | 10111001 | 101111001 | F9 | 11111001 | 111111001 |
| BA | 10111010 | 101111010 | FA | 11111010 | 111111010 |
| BB | 10111011 | 101111011 | FB | 11111011 | 111111011 |
| BC | 10111100 | 110101011 | FC | 11111100 | 110101111 |
| BD | 10111101 | 101111101 | FD | 11111101 | 111111101 |
| BE | 10111110 | 101111110 | FE | 11111110 | 111111110 |
| BF | 10111111 | 101111111 | FF | 11111111 | 111111111 |
| POSITION IN BYTE | 8 1 | 9 1 | POSITION IN BYTE | 8 1 | 9 1 |

FIG.100B(2)

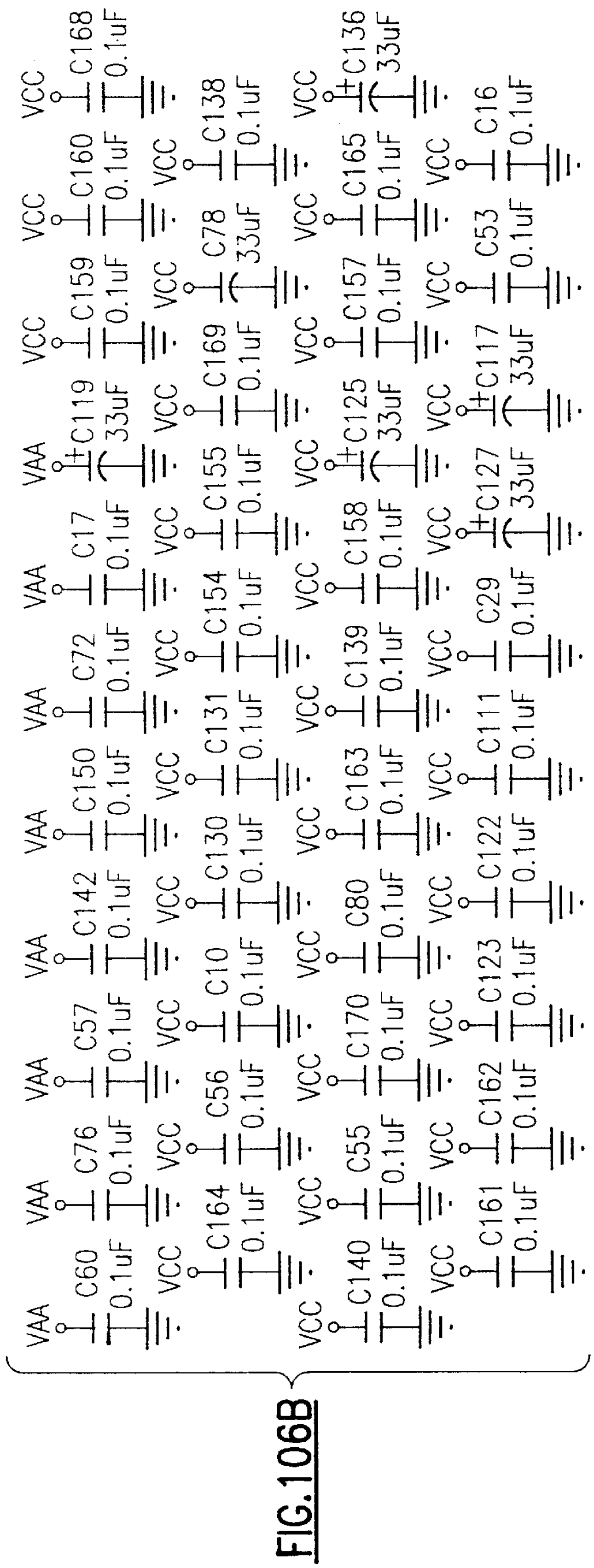
FIG.106B
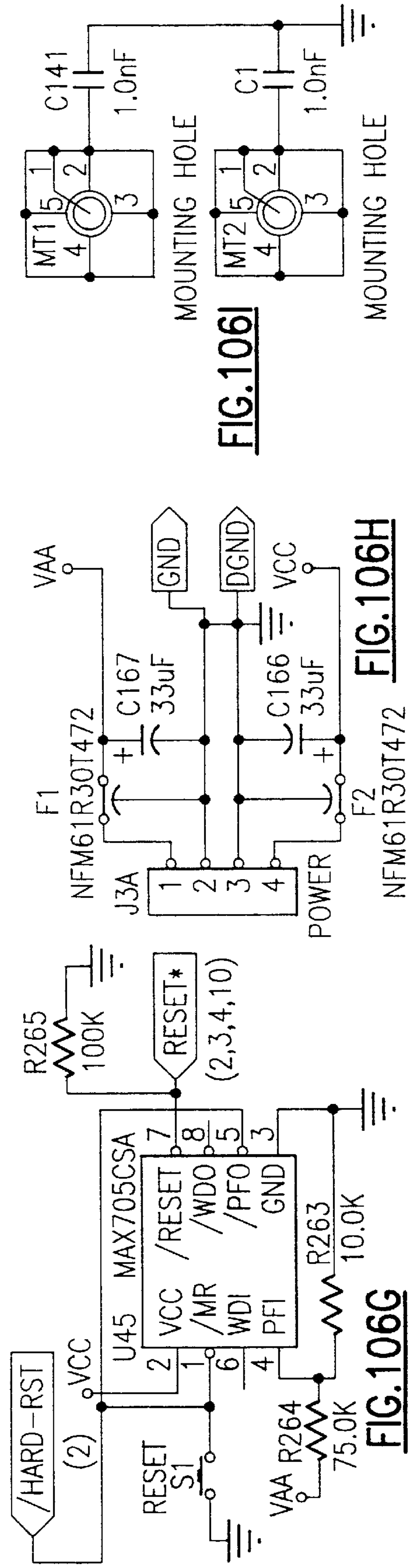
FIG.106G
FIG.106H
FIG.106I

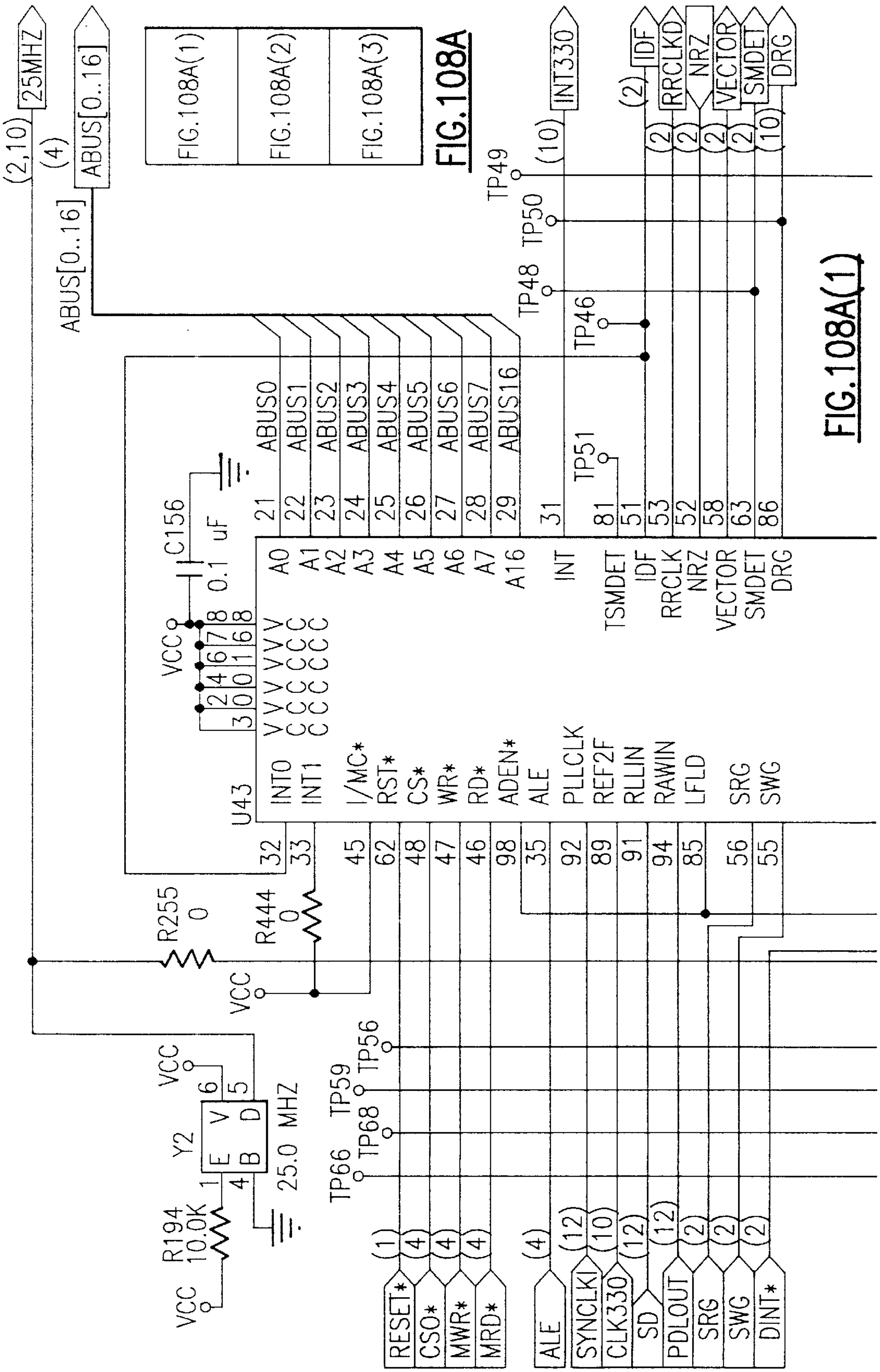
FIG.108A(1)

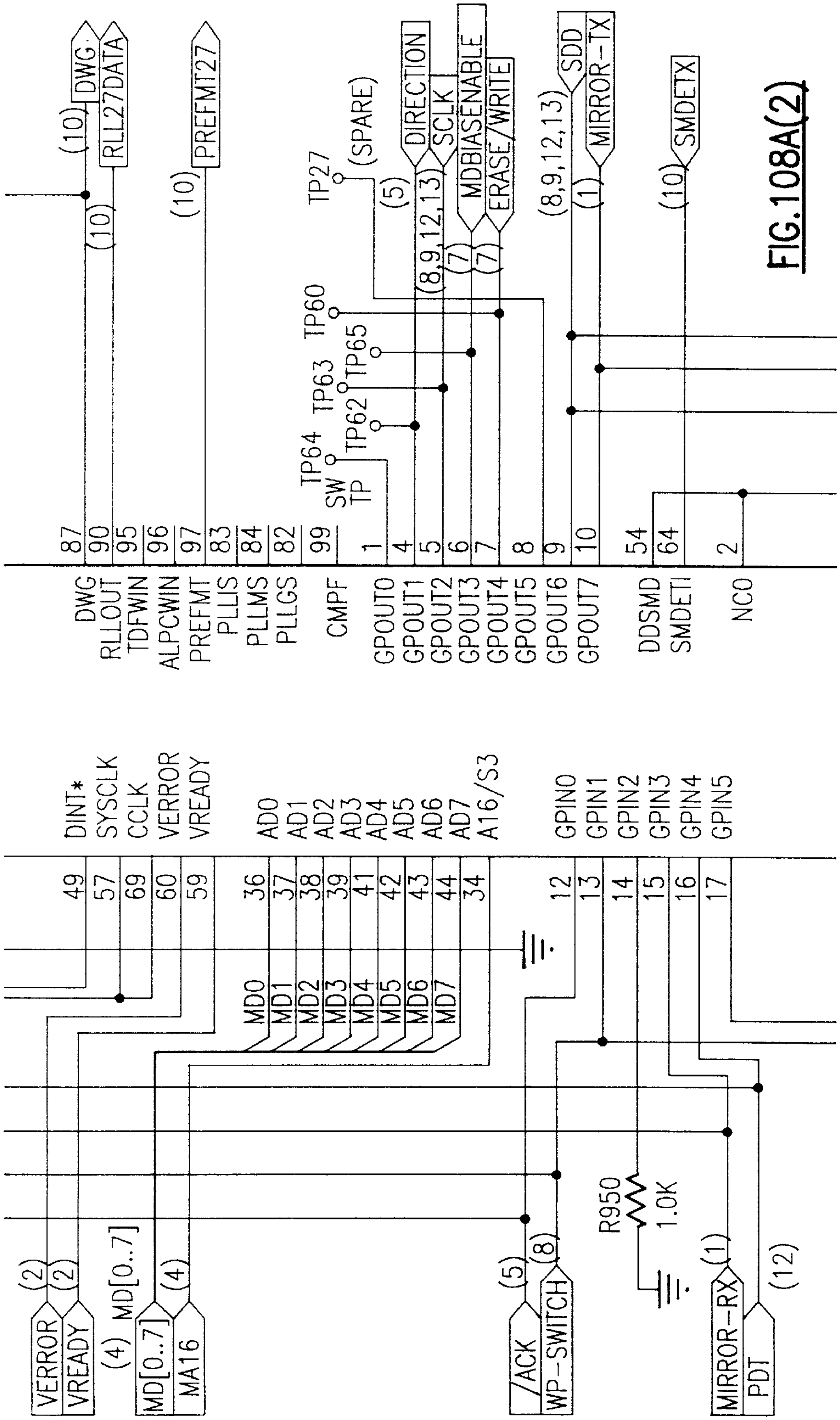
FIG.108A(2)

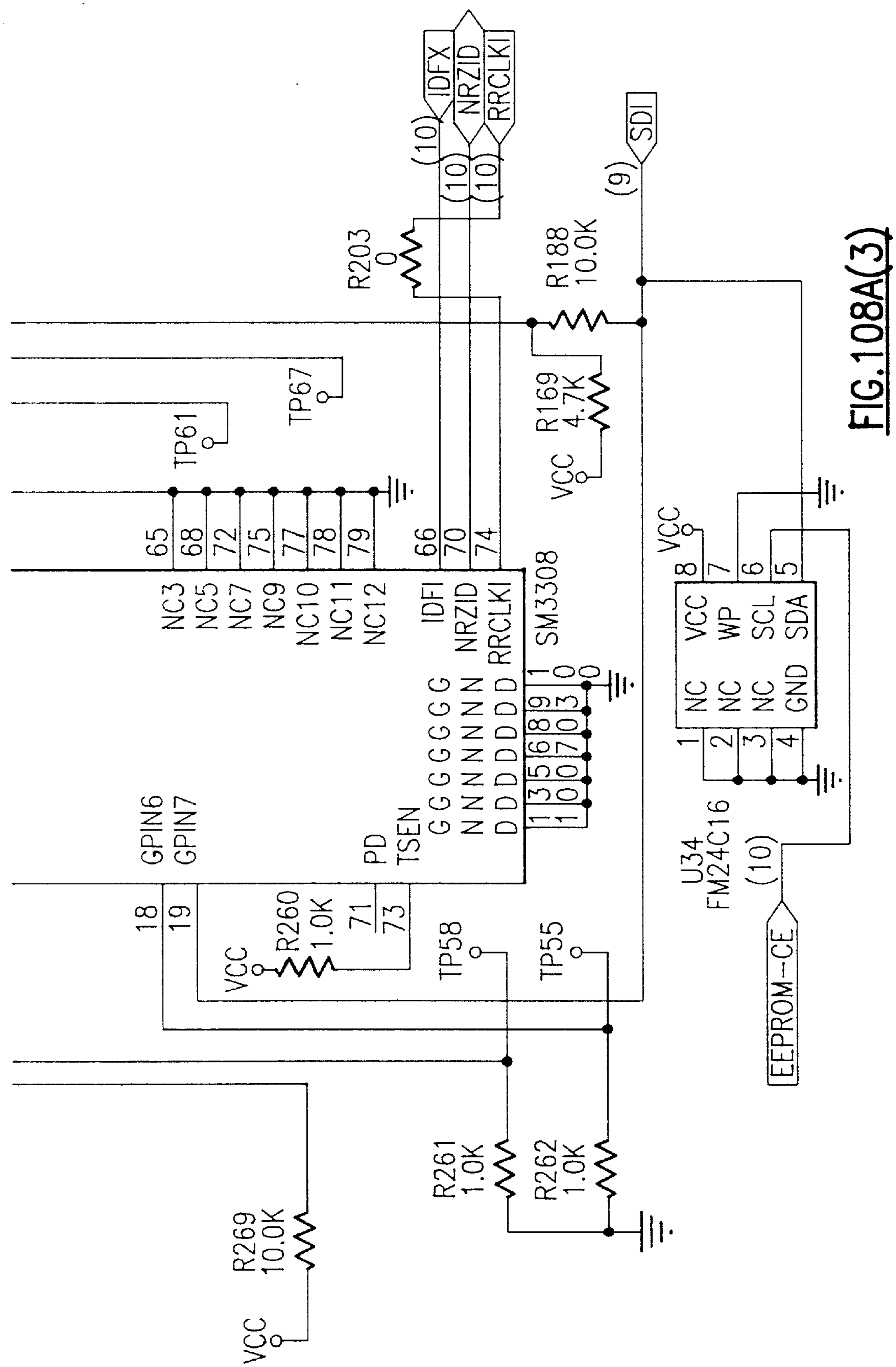
FIG.108A(3)

FIG. 118A(1)

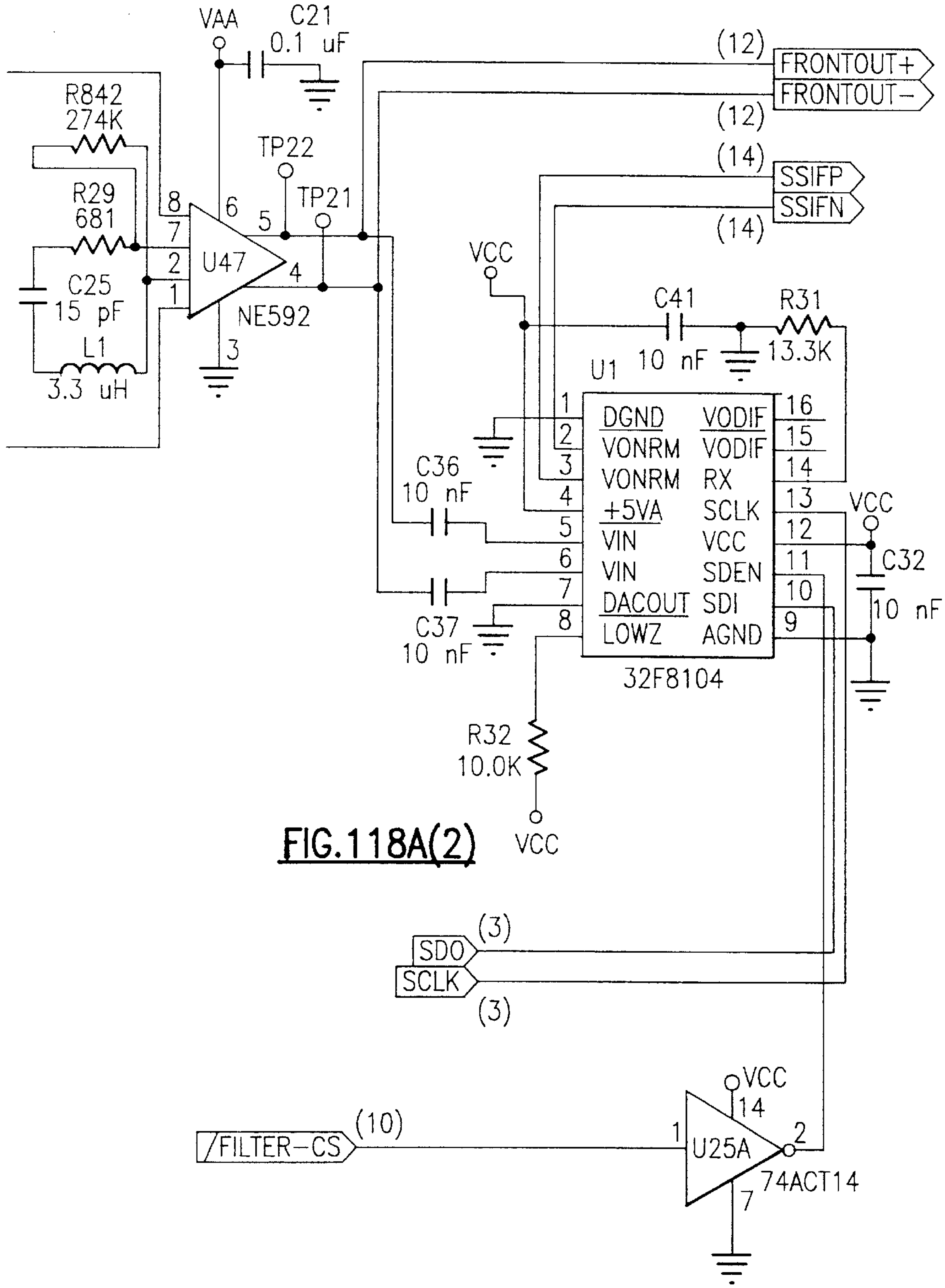
FIG.118A(2)

OPTICAL DISC SYSTEM AND METHOD FOR CHANGING THE ROTATIONAL RATE OF AN INFORMATION STORAGE MEDIUM

CROSS REFERENCE TO RELATED APPLICATIONS

This application is a divisional of U.S. patent application Ser. No. 08/420,380, filed Apr. 11, 1995 abandoned, which is a continuation-in-part of U.S. patent application Ser. No. 08/376,882, filed Jan. 25,1995 and now U.S. Pat. No. 5,729,511.

BACKGROUND OF THE INVENTION

1. Field of the Invention

The present invention relates to data storage systems of the type that include a housing having an opening for receipt of a removable disc cartridge in which an information recording medium is mounted for protection. More particularly, it relates to a system for rapidly encoding and writing information onto optical disks in a high density format, and for reading and decoding the information written thereon.

2. Description of the Related Art: Overview

The demand for mass data storage continues to increase with expanding use of data processing systems and personal computers. Optical data storage systems are becoming an increasingly popular means for meeting this expanding demand. These optical data systems provide large volumes of relatively low-cost storage that may be quickly accessed.

In optical disc systems, coded video signals, audio signals, or other information signals are recorded on a disc in the form of information tracks on one or both planar surfaces of the disc. At the heart of an optical storage system is at least one laser (or other light source). In a first operating mode, the laser generates a high-intensity laser beam that is focused on a small spot on an information track of a rotating storage disc. This high-intensity laser beam raises the temperature of the recording surface of the material above its Curie Point—the point at which the material loses its magnetization and accepts the magnetization of the magnetic field in which the disc is placed. Thus, by controlling or biasing this surrounding magnetic field, and allowing the disc to cool below its Curie Point in a controlled magnetic environment, information may be recorded on the disc in the form of magnetic domains referred to as "pits" on the recording medium.

Subsequently, when the operator desired to reproduce or read the previously recorded information, the laser enters a second operating mode. In this mode, the laser generates a low-intensity laser beam that is again focused on the tracks of the rotating disc. This lower intensity laser beam does not heat the disc above its Curie Point. The laser beam is, however, reflected from the disc surface in a manner indicative of the previously recorded information due to the presence of the previously formed pits, and the previously recorded information may thereby be reproduced. Since the laser may be tightly focused, an information processing system of this type has advantages of high recording density and accurate reproduction of the recorded information.

The components of a typical optical system include a housing with an insertion port through which the user inserts the recording media into the drive. This housing accommodates, among other items, the mechanical and electrical subsystems for loading, reading from, writing to, and unloading an optical disc. The operation of these mechanical and electrical subsystems is typically within the exclusive control of the data processing system to which the drive is connected.

Within the housing of a conventional system that uses disc cartridges, a turntable for rotating a disc thereon is typically mounted on the system baseplate. The turntable may comprise a spindle having a magnet upon which a disc hub is mounted for use. The magnet attracts the disc hub, thereby holding the disc in a desired position for rotation.

In optical disc systems, as discussed above, it is necessary to magnetically bias the disc during a writing operation by applying a desired magnetic field to at least the portion of the disc being heated by the laser during the writing (recording or erasing) operation. Thus, it is necessary to mount a magnetic field biasing device where it may be conveniently placed in close proximity to the disc surface when the disc is held in position by the magnet associated with the spindle.

A variety of media or disc types are used in optical data storage systems for storing digital information. For example, standard optical disc systems may use 5¼ inch disks, and these optical disks may or may not be mounted in a protective case or cartridge. If the optical disc is not fixedly mounted in a protective cartridge, an operator manually removes the disc from the protective case. The operator would then manually load the disc onto a loading mechanism, using care to prevent damage to the recording surface.

Alternatively, for purposes of convenience and protection, a disc may be mounted within an enclosure or a cartridge that is itself inserted into the insertion port of the drive and is then conveyed to a predetermined position. These disc cartridges are well known in the computer arts. The disc cartridge comprises a cartridge housing containing a disc upon which data may be recorded.

Cartridge Loading

To protect the disc when the cartridge is external from the drive, the disc cartridge typically includes at least one door or shutter that is normally closed. The cartridge shutter may have one or more locking tabs associated with it. The corresponding disc drive includes a mechanism for opening the door or shutter on the cartridge as the cartridge is pushed into the system. Such a mechanism may comprise a door link that makes contact with a locking tab, thereby unlocking the shutter. As the cartridge is inserted further into the drive, the shutter is opened to partially expose the information recording medium contained therein. This permits a disc hub to be loaded onto a spindle of a motor or other drive mechanism, and permits entry of a read-write head and a bias magnetic into the protective cartridge. The disc, when rotated by the drive mechanism, permits the read-write head to access all portions of the disc media.

To conserve space in optical storage systems, it is desirable to minimize the size required by the apparatus that loads a disc onto and unloads the disc from a spindle. Conventional loading and unloading devices vary depending upon the type of disc being used. A conventional disc loading and unloading system that uses disc cartridges is typically capable of automatically transporting a disc cartridge from a receiving port onto the spindle. When the disc is no longer required, a conventional disc loading and unloading system automatically unloads the disc from the spindle. A loading device for performing this loading and unloading of the disc is generally constructed so that during disc loading (i.e., when the disc is moved from an ejected position into the player and onto the spindle), the disc is moved horizontally, parallel to the baseplate and turntable, towards the turntable. When the disc has been positioned above the turntable, the disc is lowered vertically, perpendicular to the face of the turntable, onto the spindle. Once on the turntable, a spindle magnet attracts the disc hub fixed to the center of the media, thereby clamping the disc in a rotatable condition for read-write operations.

When an operator is finished using the disc, the operator initiates an eject operation. The most common solution for ejecting a cartridge and disc from a spindle is the technique used in most Japanese drives. In this type of disc unloading apparatus, a cartridge "box" has four pins at its sides, and the pins ride in tracks in an adjacent sheet metal guide. During disc ejection, the cartridge box lifts the disc straight up and off the spindle. The apparatus then moves the disc horizontally, parallel to the baseplate and turntable, towards the disc receiving port in the front of the player. When the disc is thus lifted from the spindle during the unloading operation, it is necessary to generate sufficient upward force on the cartridge to overcome the magnetic clamping force holding the disc hub on the spindle magnet. The peak upward force required to overcome the magnetic clamping force may be produced by the mechanical operation of an ejection lever or by the activation of an electric ejection system.

In conventional electric ejection systems, wherein the disc cartridge unloading apparatus vertically lifts the disc cartridge to break the magnetic force between the spindle magnet and the disc hub, the electric ejection motor must generate a large load to effect removal of the disc cartridge. Consequently, when an operator opts to use the electric ejection system, a large motor having a large torque is required to generate sufficient vertical lifting force. Space must be reserved in the system housing to accommodate this large motor, thereby increasing the overall size of the housing for the cartridge-loading apparatus. In addition, the large motor consumes a considerable amount of power.

It is thus desirable to reduce the complexity of the disc player, while reducing the overall size of the player to facilitate the drive's convenient use in computer applications. In order to be able to receive a 5¼ inch disc cartridge and yet be small enough to be conveniently used in conjunction with a personal computer, optical disc drives must use compact and carefully located mechanical and electrical subsystems. With this in mind, it is desirable to reduce the size of the required ejection motor. One way to effect this result is to reduce the amount of force required to break the magnetic clamping force holding the disc hub on the spindle magnet. By reducing this required force, it is possible to use a smaller ejection motor in the player. It is thus desirable to design a disc loading apparatus wherein the disc is not vertically lifted off of the spindle magnet, but is, rather, "peeled" from the magnet.

A conventional method that attempts to achieve this peeling action has the turntable and spindle swing down away from the disc. This method is discussed in U.S. Pat. No. 4,791,511 granted to Marvin Davis and assigned to Laser Magnetic Storage International. It remains desirable, however, to design a drive wherein the disc is peeled from the spindle magnet.

Focus and Tracking Actuation

In order to attain a precise reading of the information stored on the disc, it is necessary to be able to move the objective lens in both a focusing (i.e., perpendicular to the plane of the disc) or Z direction in order to focus the laser beam to a small point of light on a precise location of the disc to write or retrieve information, and in a tracking (i.e., radial from the center of the disc) or Y direction to position the beam over the exact center of the desired information track on the disc. Focus and tracking corrections may be effected by moving the objective lens in either the direction of the optical axis of the lens for focusing, or in a direction perpendicular to the optical axis for tracking.

In these systems, the position of the objective lens in the focus and tracking directions is commonly adjusted by control systems. Actuators support the objective lens and convert position correction signals from the feedback control systems into movement of the objective lens. Most commonly, these actuators comprise moving coils, stationary magnets, and a stationary yoke, wherein a magnetic field is produced in an air gap between the yoke and magnets. U.S. Pat. No. 4,568,142 issued to Iguma and entitled "Objective Lens Driving Apparatus" illustrates an actuator of this type wherein the actuator includes rectangular magnets positioned within U-shaped yokes. The yokes are spaced from one another with their north poles opposing, in close enough proximity to one another to form a magnetic circuit. A square-shaped focusing coil is bonded to the outsides of a square-shaped lens frame. Four tracking coils are bonded on the corners of the focusing coil. The ends of the focusing coil are then positioned within the air gaps formed by each of the U-shaped yokes so that the focusing coil straddles the yokes. Because the focusing coil must extend around these "center" or "inner" yoke plates, the coil cannot be wound as tightly as desired and the rigidity of the coil construction is compromised. Further, in this type of closed magnetic circuit design, the majority of coil wire is positioned outside the air gaps, significantly reducing the efficiency of the actuator.

In most optical systems, the stiffness of the coil in the air gap has to be very high and the coil decoupling resonance frequency should be above 10 kHz, and is most desirably above 25 kHz. In many types of prior actuator designs, large amounts of coil wire in the magnetic air gap are often required to achieve maximum motor performance. To place such a large amount of coil within the air gap and still conform to the limited space constraints of the actuator design, the coil must be wholly or partially "freestanding", or must be wound on the thinnest bobbin possible. These types of coil configurations have low stiffness and typically decouple at lower frequencies. The dynamic resonance behavior of many actuator designs can also cause the coil to unwind during operation.

Other actuator designs have used the same magnetic air gap to develop focus and tracking motor forces such that the tracking coil(s) is glued onto the focus(s) coil or vice versa, in an attempt to save parts, space, and weight. In these types of designs, the decoupling frequency of the tracking coil(s) glued onto a freestanding focus coil is typically around 15 kHz, significantly below the preferred decoupling frequency.

Focus Sensing

Optical recording and playback systems, such as those utilizing optical memory disks, compact disks, or video disks, require precise focusing of an illuminating optical beam through an objective lens onto the surface of an optical disc. The incident illuminating beam is generally reflected back through the objective lens, and is then used to read information stored on the disc. Subsequent to passing back through the objective lens, a portion of the reflected beam is typically directed to an apparatus designed to gauge the focus of the illuminating beam on the disc. Information extracted from the reflected beam by this apparatus may then be used to adjust the focus of the illuminating beam by altering the position of a movable objective lens relative to the disc.

A number of techniques for detecting the focus of an illuminating optical beam are known. For example, U.S. Pat. Nos. 4,423,495; 4,425,636; and 4,453,239 employ what has been termed the "critical angle prism" method of determining beam focus. In this method an illuminating beam reflected from a storage disc is made incident upon a detection prism surface which is set very close to a critical angle with respect to the reflected illuminating beam. When the focus of the illuminating beam on the surface of the disc deviates from a desired state, the variation in the amount of optical energy reflected by the detection prism surface may be used to derive a focus error signal used to adjust the focus of the illuminating beam.

The critical angle prism method generally requires that the orientation of the detection prism surface relative to the reflected illuminating beam be precisely adjusted. This requirement arises as a result of reflectivity characteristic of the detection prism in the neighborhood of the critical angle and makes focus error detection systems based on this method extremely sensitive. The critical angle technique, however, has several disadvantages. First, the focus error signal it produces depends on the light reflection at the interface between the detection prism surface and air. Thus, changes in altitude, which change the index of refraction of the air, can cause false focus readings (offsets) to occur. Also, the critical angle technique is inherently unsuitable for use in differential focus sensing systems.

Differential systems are increasingly important because they allow cancellation of certain types of noise that can occur in optical disc drives. The critical angle method is unsuited to differential operation for two reasons. First, the transmitted beam produced by the sensing prism is compressed along one axis, making it unsymmetrical with the reflected beam. Symmetry of the two beams is preferred in a differential system to optimize the noise-cancellation properties in varied environments. Second, at the point on the reflectivity curve of a critical angle prism where the intensities of the two beams are balanced, the slope is far too low to produce a useful differential focus error signal.

A focus detecting apparatus which requires somewhat less precise adjustment of the optical surface on which the reflected illuminating beam is incident, when compared to the critical angle technique is disclosed in U.S. Pat. No. 4,862,442. In particular, the optical surface described therein comprises a dielectric multilayer coating having a reflectivity which varies continuously with respect to the angle of incidence of the reflected illuminating beam. It follows that rotational maladjustment of the surface comprising the multilayer coating will have smaller effect on the value of the focus error signal, but that also the technique will have reduced angular sensitivity. Also, inaccuracies in the focus error signal produced by multilayer dielectric systems may develop in response to relatively slight changes in the wavelength of the reflected illuminating beam. Such sensitivity to wavelength changes is undesirable since the focus error signal is designed to relate solely to the focus of the illuminating beam.

In addition, certain systems using a dielectric multilayer reflecting surface provide focus error signals having only a limited degree of sensitivity. For example, FIG. 37 of U.S. Pat. No. 4,862,442 shows a particular reflectivity characteristic for a layered dielectric reflecting surface, with the slope of the reflectivity characteristic being proportional to the sensitivity of the focus error signal. The disclosed reflected intensity ranges in value from approximately 0.75 to 0.05 over angles of incidence extending from 42 to 48 degrees. This reflectivity change of approximately 10% per degree produces a focus error signal of relatively low sensitivity.

Accordingly, a need in the art exists for an optical arrangement characterized by a reflectivity profile which allows generation of a highly sensitive focus error signal relatively immune to changes in altitude and to chromatic aberration, and which is capable of use in differential systems.

Seek Actuation

Optical data storage systems that utilize a focused laser beam to record and instantaneously playback information are very attractive in the computer mass storage industry. Such optical data storage systems offer very high data rates with very high storage density and rapid random access to the data stored on the information medium, most commonly an optical disc. In these types of optical disc memory systems, reading and writing data is often accomplished using a single laser source functioning at two respective intensities. During either operation, light from the laser source passes through an objective lens which converges the light beam to a specific focal point on the optical disc. During data retrieval, the laser light is focused on the recording medium and is altered by the information of the data storage medium. This light is then reflected off the disc, back through the objective lens, to a photodetector. It is this reflected signal that transmits the recorded information. It is thus especially important that, when information is being written to or read from the memory, the objective lens, and the exiting focused beam, be precisely focused at the center of the correct track so that the information may be accurately written and retrieved.

In order to attain a precise reading of the information stored on the disc, it is necessary to be able to move the objective lens in both a focussing (i.e., perpendicular to the plane of the disc) or Z direction in order to focus the laser beam to a small point of light on a precise location of the disc to write or retrieve information, and in a tracking (i.e., radial) or Y direction to position the beam over the exact center of the desired information track on the disc. Focus and tracking corrections may be effected by moving the objective lens in either the direction of the optical axis of the lens for focusing, or in a direction perpendicular to the optical axis for tracking.

In these systems, the position of the objective lens in the focus and tracking directions is commonly adjusted by control systems. Actuators support the objective lens and convert position correction signals from the feedback control systems into movement of the objective lens. As will be appreciated, failure to focus the light on a small enough area of the medium will result in too large a portion of the disc being used to store a given amount of information, or in too broad an area of the disc being read. Likewise, the failure to precisely control the tracking of the laser light will result in the information being stored in the wrong location, or in information from the wrong location being read.

In addition to translation along the Z axis to effect focusing, and translation along the Y axis to effect tracking, there are at least four additional motion modes for the actuator, each of which reduces the accuracy of the reading and writing operations and is thus undesirable during normal operation of the system. These undesirable modes of motion are rotation about the X axis (an axis orthogonal to both the X direction and the Z direction), or pitch; rotation about the Z axis, referred to as yaw; rotation about the Y axis, called roll; and linear motion along the X axis, or tangential translation. Motion in these directions is often caused by motor and reaction forces acting on the carriage and/or actuator. These modes typically produce undesired movement during tracking or focussing operations which subsequently affects the alignment of the objective lens relative to the optical disc.

Anamorphic, Achromatic Prism System

Optical disc systems often employ an anamorphic prism for adjustment of laser beam ellipticity, for the removal of laser beam astigmatism, and/or for beam steering. References such as U.S. Pat. No. 4,333,173 issued to Yonezawa, et al., U.S. Pat. No. 4,542,492 issued to Leterme, et al. and U.S. Pat. No. 4,607,356 issued to Bricot, et al. describe using simple anamorphic prisms for beam shaping in optical disc applications.

Frequently, the anamorphic prism systems have an embedded thin film to reflect some or all of a returning beam (reflected from optical media) to a detection system. U.S. Pat. No. 4,573,149 to Deguchi, et al. describes the use of thin films to reflect a return beam to detection systems. Furthermore, the entrance face of the anamorphic prism is often used to reflect the returning beam to a detection system as described in U.S. Pat. Nos. 4,542,492 and 4,607,356. Often, it is advantageous to have multiple detection channels. For instance, in optical disks, one detector may provide data signals and another detector may provide control signals such as tracking and/or focus servo signals.

A typical problem with conventional prisms is that the anamorphic prism suffers from chromatic dispersion which can result in lateral chromatic aberration. In other words, when the wavelength of the light source changes, the resulting angles of refraction through the anamorphic prism also change. These changes result in a lateral beam shift when the beam is focused onto optical media such as an optical disc. In optical disc systems, a small shift in the beam may cause erroneous data signals. For instance, if the shift is sudden and in the data direction, the beam may skip data recorded on the optical disc.

If the light source (e.g., a laser) were truly monochromatic, the chromatic aberration in the prism would not cause a problem. Several factors, however, often cause the laser spectrum to change. For instance, most laser diodes respond with a change in wavelength when the power increases. In magneto-optic disc systems, an increase of power occurs when pulsing the laser from low to high power to write to the optical disc, as is well understood in the art. This increase in laser power often causes a wavelength shift of around 1.5 to 3 nanometers (nm) in conventional systems. Most laser diodes also respond to a change in temperature with a change in the wavelength. Additionally, random "mode-hopping" can cause unpredictable wavelength changes commonly ranging from 1–2 nanometers. RF modulation is often applied to laser diodes operating at read power in order to minimize the effect that "mode-hopping" has on the system. The RF modulation, however, increases the spectral bandwidth and can change the center frequency. Moreover, RF modulation is not generally used when the laser is operating at write power. In a non-achromatic system, a sudden change in the wavelength of the incident light typically results in a lateral beam shift in the focused spot of up to several hundred nanometers. A lateral beam shift of this magnitude could cause significant errors in the data signal.

Using multi-element prism systems to correct chromatic dispersion is known in the art of optical design. Textbooks such as Warren J. Smith, Modern Optical Engineering, McGraw-Hill, 1966, pp. 75–77 discuss this idea. Furthermore, some optical disc systems use multi-element anamorphic prism systems which are achromatic. Typical existing multi-element prism systems, however, require the multiple prism elements to be separately mounted. Mounting the multiple elements increases the expense and difficulty of manufacturing because each element must be carefully aligned with respect to the other elements in the system. Small deviations in alignment can cause significant variations in function. This also complicates quality control. Other existing multi-element prism systems have attached elements to form a unitary prism, but these prism systems require that the prism material of each prism be different in order for the system to be achromatic. Finally, existing systems which are achromatic do not provide return beam reflections to multiple detection systems.

Data Retrieval—Transition Detection

For many years, various types of recordable and/or erasable media have been used for data storage purposes. Such media may include, for example, magnetic tapes or disks in systems having a variety of configurations.

Magneto-optical ("MO") systems exist for recording data on and retrieving data from a magnetic disc. The process of recording in a magneto-optical system typically involves use of a magnetic field to orient the polarity of a generalized area on the disc while a laser pulse heats a localized area, thereby fixing the polarity of the localized area. The localized area with fixed polarity is commonly called a pit. Some encoding systems use the existence or absence of a pit on the disc to define the recorded data as a "1" or "0", respectively.

When recording data, a binary input data sequence may be converted by digital modulation to a different binary sequence having more desirable properties. A modulator may, for example, convert m data bits to a code word with n modulation code bits (or "binits"). In most cases, there are more code bits than data bits, that is $m<n$.

The density ratio of a given recording system is often expressed according to the equation $(m/n)\times(d+1)$, where m and n have the definitions provided above, and d is defined as the minimum number of zeroes occurring between ones. Thus, the RLL 2/7/1/2 code has, according to the above equation, a density ratio of 1.5, while the GCR 0/3/8/9 code has a density ratio of 0.89.

For reading data in an MO system, a focused laser beam or other optical device is typically directed at the recording surface of a rotating optical disc such that the laser beam can selectively access one of a plurality of tracks on the recorded surface. The rotation of the laser beam reflected from the recorded surface may be detected by means of Kerr rotation. A change in Kerr rotation of a first type, for example, represents a first binary value. A change in Kerr rotation of a second type represents a second binary value. An output signal is generating from the first and second binary values occurring at specified clock intervals.

Although there has been a continual demand for disc systems capable of storing increasingly higher data densities, the ability to achieve high data storage densities has met with several limitations. As a general matter, the reasonable upper limit for data density is determined in part by reliability requirements, the optical wavelength of laser diode, the quality of the optical module, hardware cost, and operating speed. Maximum data densities are also affected by the ability to reject various forms of noise, interference, and distortion. For example, the more densely that data is packed, the more intersymbol interference will prevent accurate recovery of data. Moreover, because the technology for many intermediate and high performance optical disc drives has been limited by downward compatibility constraints to older models, signal processing techniques have not advanced as rapidly as they might otherwise have.

When attempting to recover stored data, existing read channels of magneto-optical and other types of disc drives commonly suffer from a number of problems due to the unintended buildup of DC components in the read signal. One cause of DC buildup results from the recording of unsymmetrical data patterns over a number of bytes or data segments. A symmetrical data pattern may be considered as one having an average DC component of zero over a region of interest. Because sequences of recorded bits may be essentially random in many modulation codes, however, localized regions of recorded data having particular patterns of 1's and 0's will produce an unsymmetrical read signal having unwanted DC components. Because the data patterns vary over time, the level of DC buildup will also vary, causing wander of the DC baseline, reduction of threshold detection margins, and greater susceptibility to noise and other interference.

Undesired DC buildup is also caused by variance in pit size due to thermal effects on the writing laser or the storage medium. As the writing laser heats up, for example, the spot size may increase leading to wider pits. When the recorded pits are read, variations in pit size will cause an unsymmetrical input signal having DC components. Variation in pit size not only causes undesired DC buildup but also causes the relative locations of the data to appear shifted in time, reducing the timing margin and leading to possible reading errors.

Various attempts have been made to overcome the described problems. For example, various tape drive systems commonly use a DC-free code such as a 0/3/8/10 code, otherwise referred to simply as an 8/10 code. Because an 8/10 code requires 10 stored bits to yield 8 data bits, however, it is only 80% efficient which is a drawback when attempting to record high data densities.

Another method for handling DC buildup involves the use of double differentiation. This method typically involves detection of the peaks of a first derivative of the input signal by detecting zero-crossings of the second derivative of the input signal. Thus, the DC components are effectively filtered out. One drawback of this method is that differentiation or double differentiation can cause undesirable noise effects. A second drawback is that the method may decrease the timing margin to unacceptably low levels (e.g., by as much as 50 percent).

In another method for addressing DC buildup, the data to be stored is randomized prior to recording such that none of the data patterns repeat over a data sector. This method, however, may not be acceptable by ISO standards and may lack downward compatibility with previous disc drive systems. As a further drawback to this method, de-randomizing the data may be complex.

Yet another method for controlling DC buildup involves the use of so-called resync bytes between data segments. This method generally involves the examination and manipulation of data before it is recorded in order to minimize DC buildup upon readback. Before recording, two consecutive data segments are examined to determine if the patterns of 1's and 0's are such as to cause positive DC, negative DC, or no DC components when read back. If, for example, two consecutive data segments have the same DC polarity, one of the data segments is inverted prior to being recorded on the medium. In order to stay within the constraints of the particular encoding system, however, a resync byte between the segments may need to be written so that the pattern of contiguous bits and of flux reversals is proper. A drawback of such a method is that it will not necessarily reduce all DC buildup, and time constants must be determined such that the predictable DC buildup will not affect performance. Further, the method requires additional overhead including the examination of data segments to determine their relative polarity.

It would therefore be advantageous to have a method and device for reading stored data from a medium without suffering the undesirable effects of DC buildup, without creating unacceptable levels of noise or significantly reducing timing margins, without the requirement of large amounts of overhead or de-randomizing algorithms, and while providing high data storage efficiency.

Data Storage and Other Aspects of Data Retrieval

Recordable/erasable optical disks are currently available for use as data storage media. Magneto-optical recording is the technique commonly used to store the data on and/or retrieve the data from the disc. During recording, a magnetic field orients the polarity of a generalized area on the disc, while a laser pulse heats a localized area thereby fixing the polarity of the smaller area. The localized area with fixed polarity is commonly called a pit. Some encoding systems use the existence or absence of a pit on the disc to define the recorded data as a "1" or "0", respectively. The most commonly used encoding system for this pit-type recording is the run length limited (RLL) 2,7 code because it gives the highest data-to-pit ratio. This type of recording, however, does not lead to higher density because amplitude and timing margins deteriorate very rapidly as frequency is increased.

SUMMARY OF THE INVENTION

There is disclosed a method of changing the rotational rate of a storage medium from an initial rotational rate to a desired rotational rate having a lower acceptable limit and an upper acceptable limit. The method includes the step of applying a force to the storage medium to change the rotational rate from the initial rotational rate toward a first upper limit, where the first upper limit is between the initial rotational rate and the desired rotational rate. While performing the step of applying, a first signal is generated when the rotational rate exceeds the first upper limit. While performing the step of applying and after generating the first signal, a second signal is generated when the rotational rate exceeds the lower acceptable limit. Thereafter, the application of force is terminated.

To terminate the application of force, a second upper limit may be set at the upper acceptable limit of the desired rotational rate, a lower limit may be set at the lower acceptable limit of the desired rotational rate, and the application of force may be terminated when the rotational rate is greater than the lower limit. The upper acceptable limit may be on the order of one-half of one percent greater than the desired rotational rate. The lower acceptable limit may be on the order of one-half of one percent less than the desired rotational rate.

There is further disclosed a method including the step of applying a force to the storage medium to change the rotational rate from the initial rotational rate toward a first lower limit, where the first lower limit is between the initial rotational rate and the desired rotational rate. While performing the step of applying, a first signal is generated when the rotational rate is less than the first lower limit. While performing the step of applying and after generating the first signal, a second signal is generated when the rotational rate is less than the upper acceptable limit. Thereafter, the application of force is terminated.

To terminate the application of force, a second lower limit may be set at the lower acceptable limit of the desired rotational rate, an upper limit may be set at the upper acceptable limit of the desired rotational rate, and the application of force may be terminated when the rotational rate is less than the upper limit. The upper acceptable limit may be on the order of one-half of one percent greater than the desired rotational rate. The lower acceptable limit may be on the order of one-half of one percent less than the desired rotational rate.

Additional objects, advantages and features of the present invention will further become apparent to persons skilled in the art from a study of following description and of the accompanying drawings.

BRIEF DESCRIPTION OF THE DRAWING

Further objects of the present invention together with additional features contributing thereto and advantages accruing therefrom will be apparent from the following description of certain preferred embodiments of the invention which are shown in the accompanying drawing, wherein:

FIG. 32 is a schematic perspective view illustrating the magnetic fields produced by the magnet pairs of the actuator of FIG. 26;

FIG. 33 is a perspective view of the focus coils and permanent magnets of the actuator of FIG. 26;

FIGS. 80G(1)–80G(4) are waveform diagrams showing signal waveforms at various stages in the read channel;

FIG. 98 is a table depicting, for each of the 21 zones in the preferred format of the high-density optical disc, the tracks within the zone, the number of sectors per track within the zone, the total number of sectors in the zone, and the write frequency of the data recorded in the zone;

FIG. 99 provides a table of the equations used to compute the CRC bits of the ID field;

FIG. 121 is an isometric view of the mechanical isolator in a second preferred embodiment;

FIG. 122 is a state diagram of the read mode firmware module employed in conjunction with the present invention;

FIG. 123 is a state diagram of the write mode firmware module utilized in conjunction with this invention;

FIG. 124 shows a Nyquist diagram of the focus loop transfer function for selected amounts of closed loop peaking;

FIG. 125 is a graphical representation of magnitude responses of the focus loop transfer function for open and closed conditions;

FIG. 126 is a graphical representation of phase responses of the focus loop transfer function for open and closed conditions;

FIG. 127 illustrates the magnitude response curves for focus compensation transfer functions; and FIG. 128 shows the phase response curves for focus compensation transfer functions.

DESCRIPTION OF THE PREFERRED EMBODIMENTS

System Overview: Main Optical, Electrical, and Mechanical Components

Figure 1:
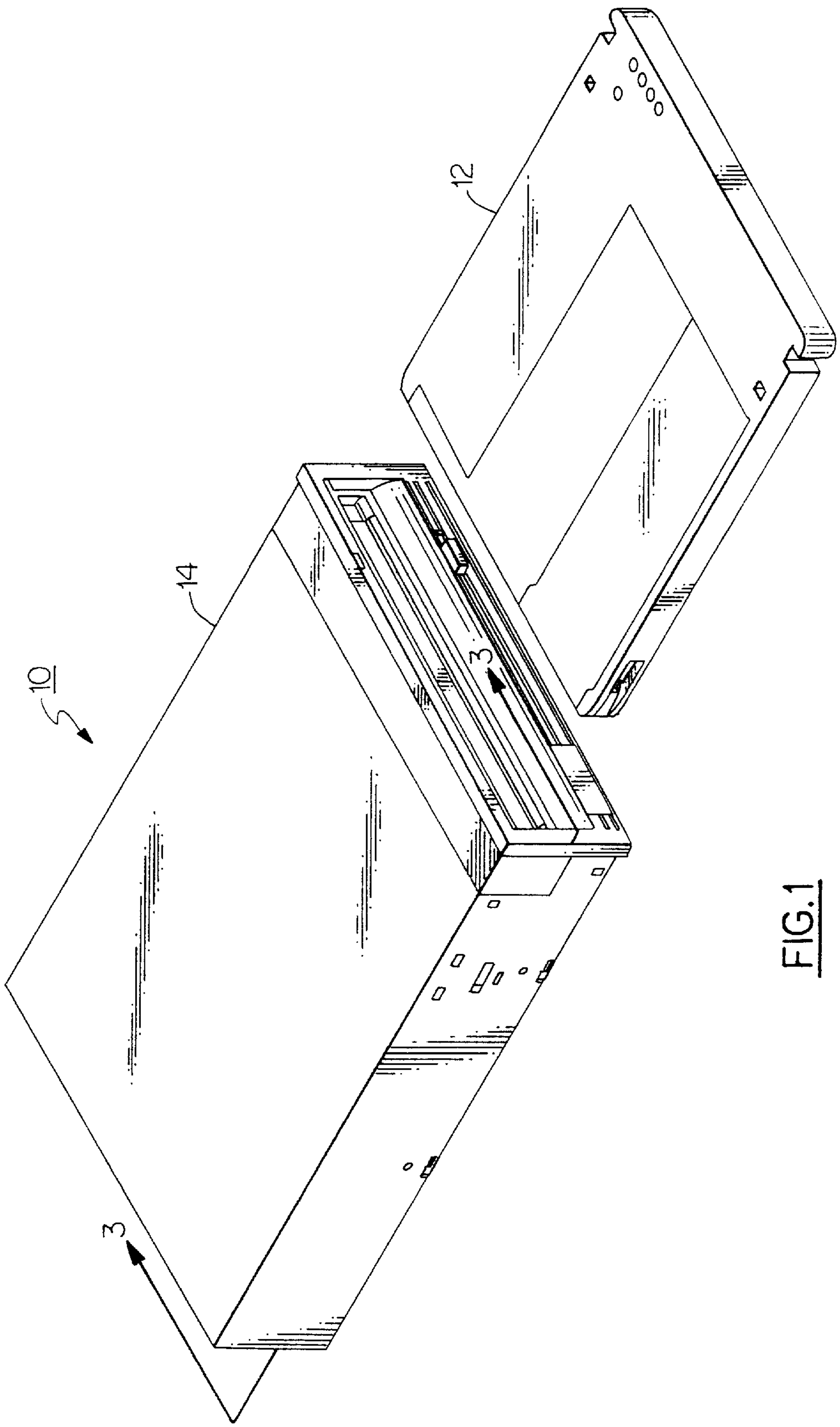
FIG. 1 is an isometric view of an optical disk drive embodying the present invention.

Referring initially to FIG. 1, there is shown an optical disk drive 10 having a housing 14. Disk drive 10 plays and/or records on a disk (not shown) that is housed in removable disk cartridge 12. Alternatively, the disk could be contained within the housing 14 of disk drive 10.

Figure 2:
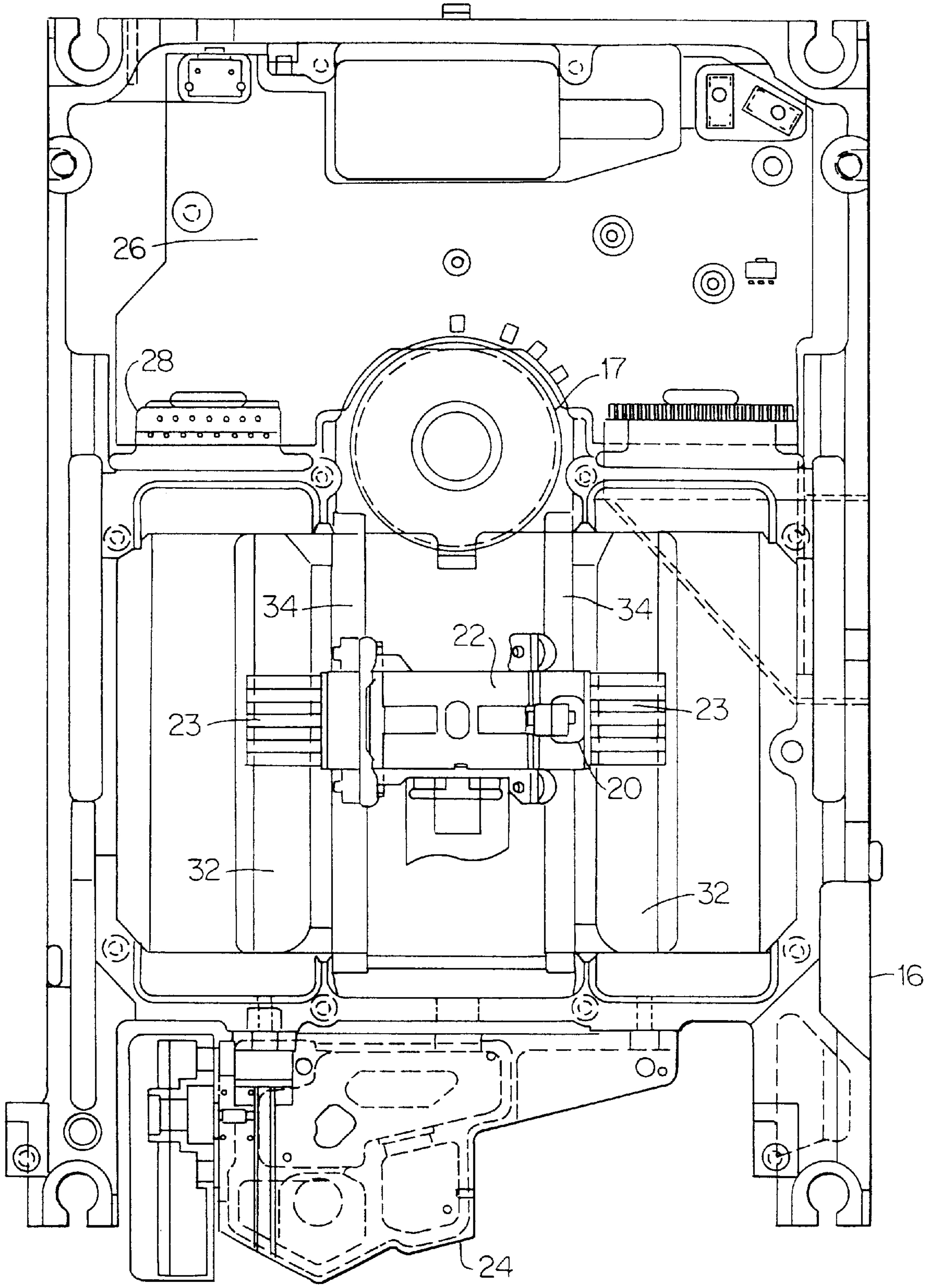
FIG. 2 is a top view of the disk drive of FIG. 1, with the housing of the drive removed.
Figure 3:
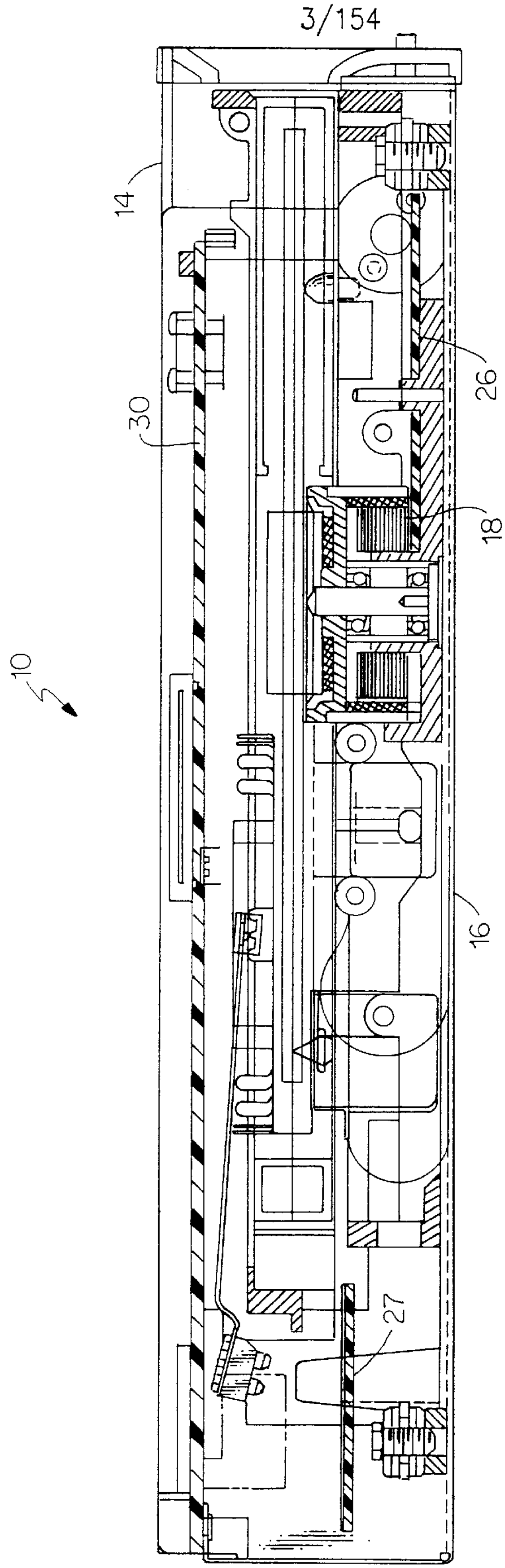
FIG. 3 is a cross-sectional view of the disk drive of FIG. 1, taken in the direction of arrows 3—3 in FIG. 1.

Referring now to FIGS. 2 and 3, wherein FIG. 2 shows a top view of the drive 10 with the housing 14 removed to reveal certain important mechanical, electrical, and optical components of the drive 10. FIG. 3 is a cross-sectional view of the drive 10, taken in the direction of section lines 3—3 of FIG. 1. In FIG. 2 there is shown a base plate 16, a spindle 17, a linear actuator assembly 20, an objective lens carriage assembly 22, an optics module 24, a drive circuit board 26, and a flexible circuit connector 28. FIG. 3 shows a main circuit board 30, a spindle motor 18, an optics module circuit board 27, and the drive circuit board 26.

In brief, the base plate 16 acts as a base for the other components of the drive 10, positioning and aligning the components with respect to each other. Preferably the base plate 16 is made of cast steel for low cost.

As shown in FIG. 2, the linear actuator assembly 20 includes a pair of linear voice coil actuators 23. Each voice coil actuator 23 consists of a rail 34 that is rigidly attached to the base plate 16. The rails 34 are substantially parallel to each other. Adjacent each rail 34 is a pole piece 32. Surrounding a portion of each pole piece 32 is one of the actuator coils 23. Each actuator coil 23 is attached to an opposite portion of lens carriage assembly 22, so that when the coils 23 are selectively energized, the lens carriage assembly 22 moves along the rails 34. The actuator coils 23 are driven by signals from the drive circuit board 26, which result in linear motion of the lens carriage assembly 22 relative to the optics module 24, and relative to a respective disk (not shown) inserted in the drive 10. In this manner, the lens carriage assembly 22 enables coarse tracking of the disk.

The optics module 24 and lens carriage assembly 22 together contain the principle optics of the drive 10. Optics module 24 is rigidly attached to the base plate 16, and contains a laser, various sensors, and optics (not shown). In operation, the laser directs a beam (not shown) from the optics module 24 towards the lens carriage assembly 22, and optics module 24 in turn receives a return beam (not shown) from the lens carriage assembly 22. The lens carriage assembly 22 is attached to the linear actuator assembly 20, as described above. The lens carriage assembly 22 contains a pentaprism (not shown), an objective lens (not shown), servomotors (not shown) for focusing the objective lens, and servomotors (not shown) for fine adjustments of the objective lens position relative to the position of the linear actuator assembly 20 and to the inserted disk, to enable fine tracking of the disk. Electrical information and control signals are transferred between the lens carriage assembly 22 and the main circuit board 30 on the one hand, and the drive circuit board 26 on the other hand by means of the flexible circuit connector 28.

The optics module circuit board 27 contains a laser driver and preamplifiers (not shown). The drive circuit board 26 controls the spindle motor 18, the linear coil actuators 23 of the linear actuator assembly 20, and the servomotors of the lens carriage assembly 22. The drive circuit board 26 is controlled by the main circuit board 30. The main circuit board 30 includes most of the electronic components that various design considerations (e.g., noise reduction, EMI and power loss) do not require to be located on the optics module circuit board 27, or the drive circuit board 26.

The spindle motor 18 is rigidly attached to the base plate 16. Motor 18 directly drives the spindle 17, which in turn spins the disk.

Optics: Optics module and Objective Lens Assembly

Figure 4B:
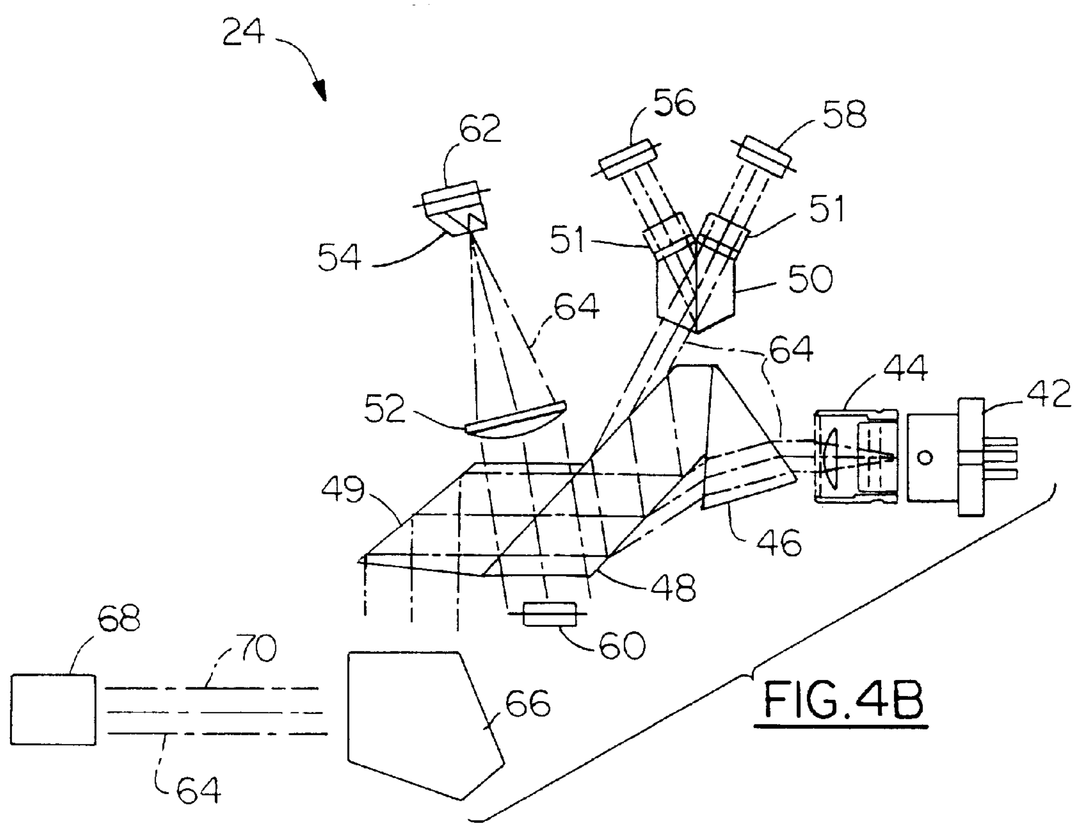
FIG. 4B is a diagram of the optical path of the disk drive of FIG. 1.
Figure 4A:
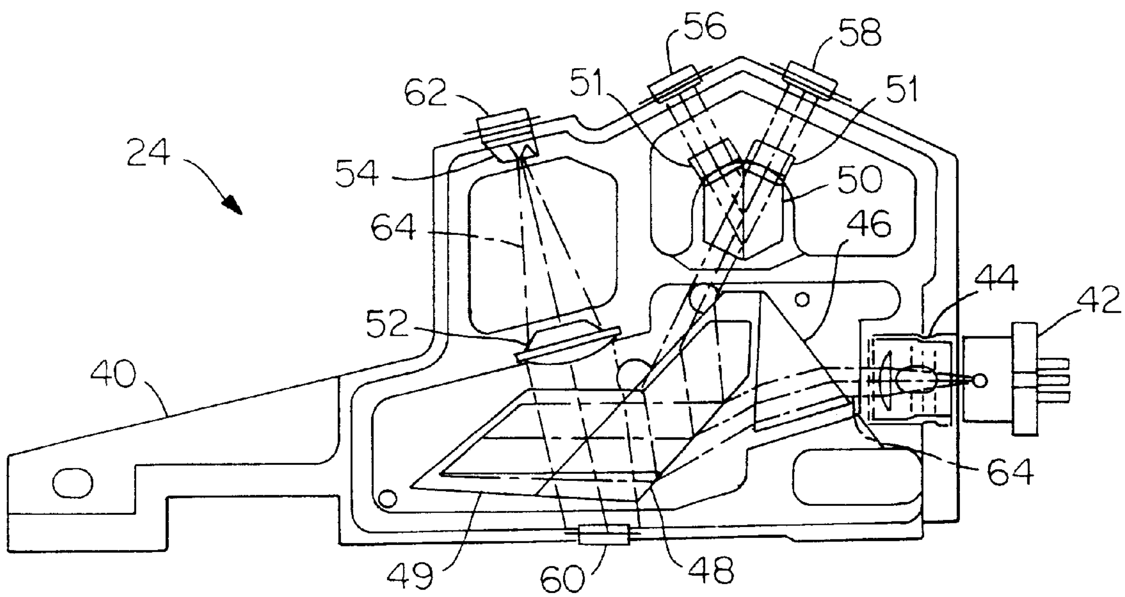
FIG. 4A is a top view of an optics module of the disk drive of FIG. 1.

With reference now to FIG. 4A, there is shown a top cross-sectional view of the optics module 24. Optics module 24 includes a housing 40, a semiconductor laser diode 42, a collimating lenses 44, an achromatizing prism 46, an anamorphic expansion prism 48, a leaky beamsplitter 49, a DFTR prism 50, cylinder lenses 51, a read lens 52, a microprism 54, servodetector sensors 56 and 58, a forward sensor 60, and a data detector sensor 62. These elements are also shown in FIG. 4B, which presents a diagram of the optical path followed by a laser beam 64. FIG. 4B shows the optical elements of the optics module 24 in conjunction with a pentaprism 66 and an objective lens 68 of the lens carriage assembly 22. For ease of illustration in FIG. 4B, a portion 70 of the laser beam 64 between the pentaprism 66 and the objective lens 68 is shown to lie in the same plane as the portions of the laser beam 64 that pass through the optics module 24. Actually, the pentaprism 66 is positioned to direct the laser beam portion 70 perpendicular relative to the portions of the laser beam 64 that pass through the optics module 24.

With continuing reference to FIG. 4B, it is to be understood that in operation the laser beam 64 is a collimated beam produced by the lenses 44 from the diverging beam emitted by the laser diode 42. The beam 64 transmits through the prisms 46 and 48, transmits through the beamsplitter 49 and exits the optics module 24 toward the lens carriage assembly 22. There it passes through the pentaprism 66 and is focused onto the disk surface by the objective lens 68.

Upon reflection from the disk, a reflected portion of the laser beam 64 returns through the objective lens 68 and the pentaprism 66 to re-enter the optics module 24. A first portion of the beam 64 reflects on the beamsplitter interface between the prism 48 and the beamsplitter 49, transmits through and is focused by the read lens 52, and enters the microprism 54. There the beam is split into two parts according to polarization, and each part is detected by a separate element of data detector sensor 62.

A second portion of the beam 64 transmits through the beamsplitter 49 and is internally reflected in the anamorphic prism 48. This second portion of the beam 64 exits the anamorphic prism 48 and enters the DFTR prism 50. There this second portion of the beam 64 is divided into two parts, which are each focused by the cylinder lenses 51 onto the respective surfaces of corresponding servo sensors 56 and 58. In response, the sensors 56 and 58 generate signals that are directed to the optics module circuit board 27, where the signals are used to generate tracking and focus error signals.

Figure 5:
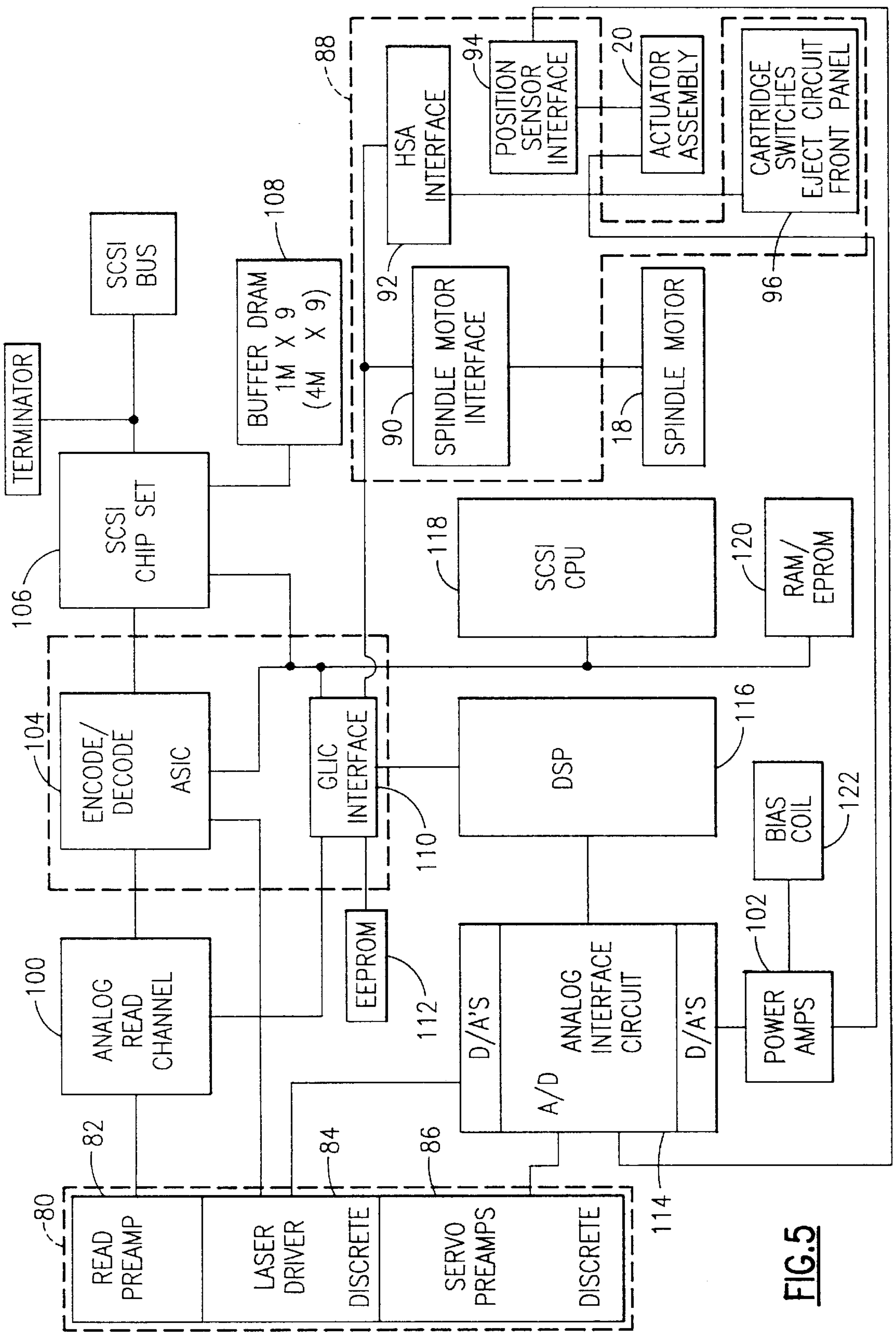
FIG. 5 is a system block diagram of the electronics of the disk drive of FIG. 1.

Electronic Systems: Main Circuit Board, Drive Circuit Board, and Optics Module Circuits Referring now to FIGS. 1, 2, 4A, and 5, there is shown in FIG. 5 a system block diagram of the electronic subsystems of the drive 10 in which a block 80 encompasses a read sensor preamplifier 82, a laser driver 84, and servo sensor preamplifiers 86. As represented by FIGS. 4A and 5, the read sensor preamplifier 82 is connected to the data detector sensor 62, and amplifies the signal generated by data detector 62. Similarly, the servo sensor preamplifiers 86 are connected to the servo detectors 56 and 58, and amplifies the signal generated by servo detectors 56 and 58. The laser diode 42 is connected to the laser driver 84, which provides signals that drive the laser 42. The subsystems 82, 84, and 86 of the block 80 are grouped together on the optics module circuit board 27 that is positioned in close proximity to the optics module 24. This minimizes the distance that signals must travel from the sensors 62 to the preamplifier 82, and from the sensors 56 and 58 to the preamplifiers 86, to reduce the adverse effect of noise on these signals. Since the signal that the laser driver 84 generates to drive laser diode 42 is of a relatively high frequency, good design practice requires the laser driver 84 to be positioned close to laser diode 42.

Block 88 of FIG. 5 encompasses a spindle motor interface 90, a mechanical subassembly (MSA) interface 92, a position sensor interface 94, and an assembly of switches and displays 96. The components 90, 92, 94, and 96 of block 88 all reside on the drive circuit board 26. The spindle motor interface 90 controls the spindle motor 18. The MSA interface 92 interfaces with the various displays and switches 96, including the front panel displays, the eject circuit, and switches related to the disk cartridge 12. Position sensor interface 94 connects to the coil actuators 23 of actuator assembly 20, which are powered by power amplifiers 102.

The remaining subsystems of the system block diagram of FIG. 5 reside on the main circuit board 30 illustrated in FIG. 3. These subsystems include an analog read channel 100, a encoder/decoder 104, an SCSI chip set 106, a buffer dram 108, and a GLIC interface 110 and an associated EEPROM 112. The main circuit board 30 also includes an analog interface circuit 114, a Digital Signal Processor (DSP) 116, an embedded controller 118 and its associated RAM/EPROM 120. Note that for optical drives 10 that are MO recordable drives, power amps 102 also drive a bias coil 122.

Cartridge Loading Apparatus

Figure 6:
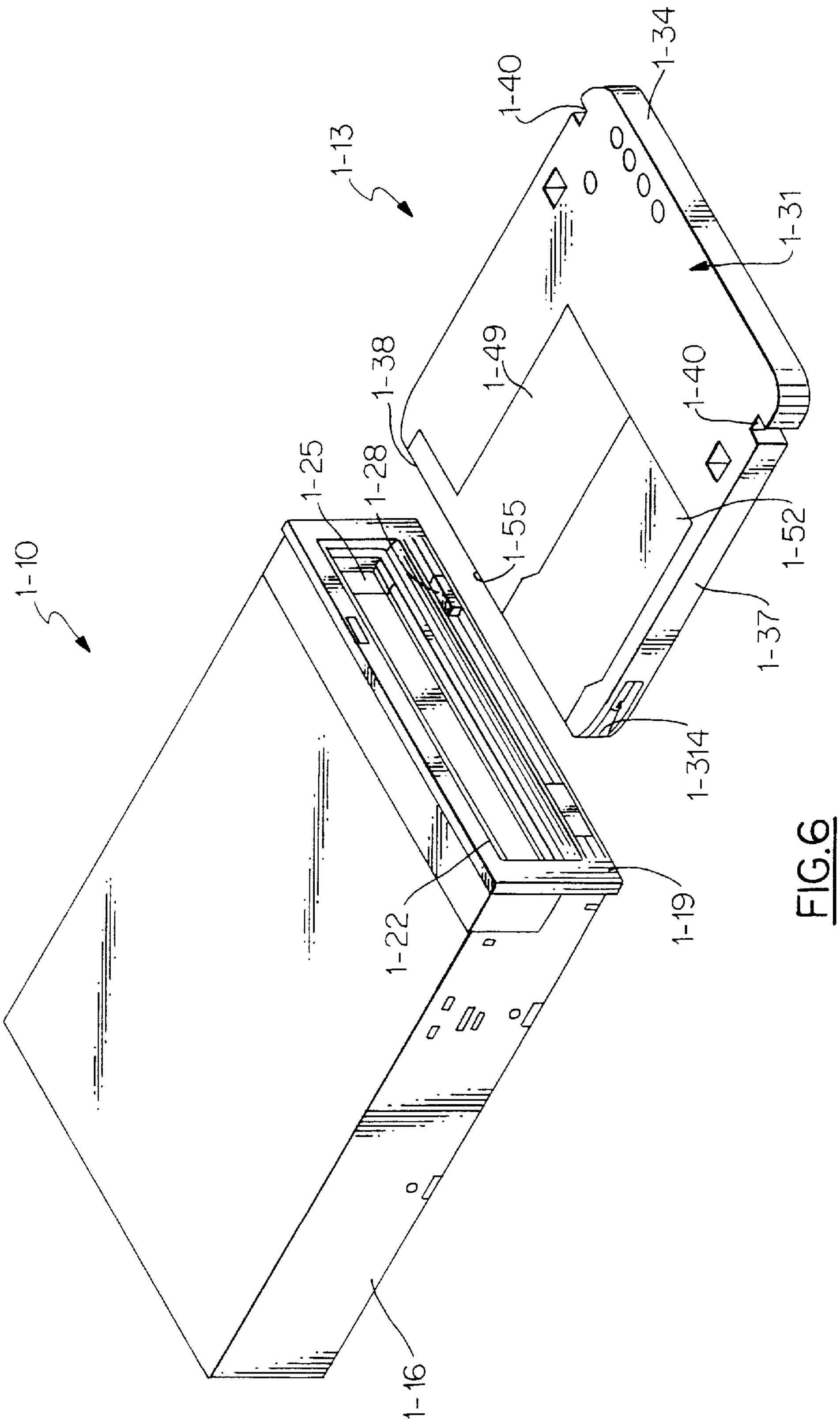
FIG. 6 is another isometric view of a disc drive with a disc cartridge about to be inserted therein.

Referring first to FIG. 6, there is shown a magnetic disc storage system, generally designated 1-10. FIG. 6 depicts a replaceable disc cartridge 1-13 positioned for insertion into the disc drive 1-10 incorporating the cartridge loading and unloading apparatus of the instant invention. The disc drive 1-10 includes a bottom housing 1-16 and a face plate 1-19. The face plate 1-19 includes a disc receiving port 1-22, a drive activity indicator light 1-25, and an ejection button 1-28.

Figure 25:
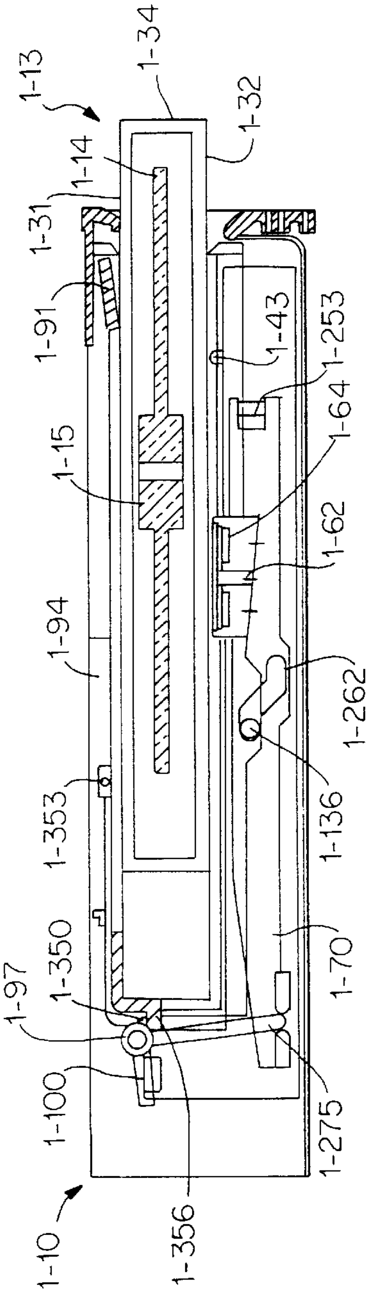
FIG. 25 is an elevational view of the right side of the cartridge receiver and the cartridge during the cartridge-eject cycle, depicting the cartridge loading system in the up position and the disc starting to be ejected from the disc drive.

The outer housing of the disc cartridge 1-13, which is of a conventional type, includes an upper planar surface 1-31 and a lower planar surface 1-32 which is shown in FIG. 25. The disc cartridge 1-13 also has a forward-facing label end 1-34. In the preferred embodiment, the forward-facing label end 1-34 of the disc cartridge 1-13 remains visible to a user while the disc cartridge 1-13 is inserted in the disc drive 1-10. Side walls, for example side wall 1-37, extend between the upper planar surface 1-31 and the lower planar surface

1-32, and the cartridge further comprises a rear wall 1-38 extending between the upper planar surface 1-31 and the lower planar surface 1-32 parallel to the forward-facing label end 1-34. Near the label end 1-34 of the side walls 1-37 are channels 1-40 to accommodate cartridge locating pins 1-43 (FIGS. 8A–8B) located on a base plate 1-46.

Figure 7:
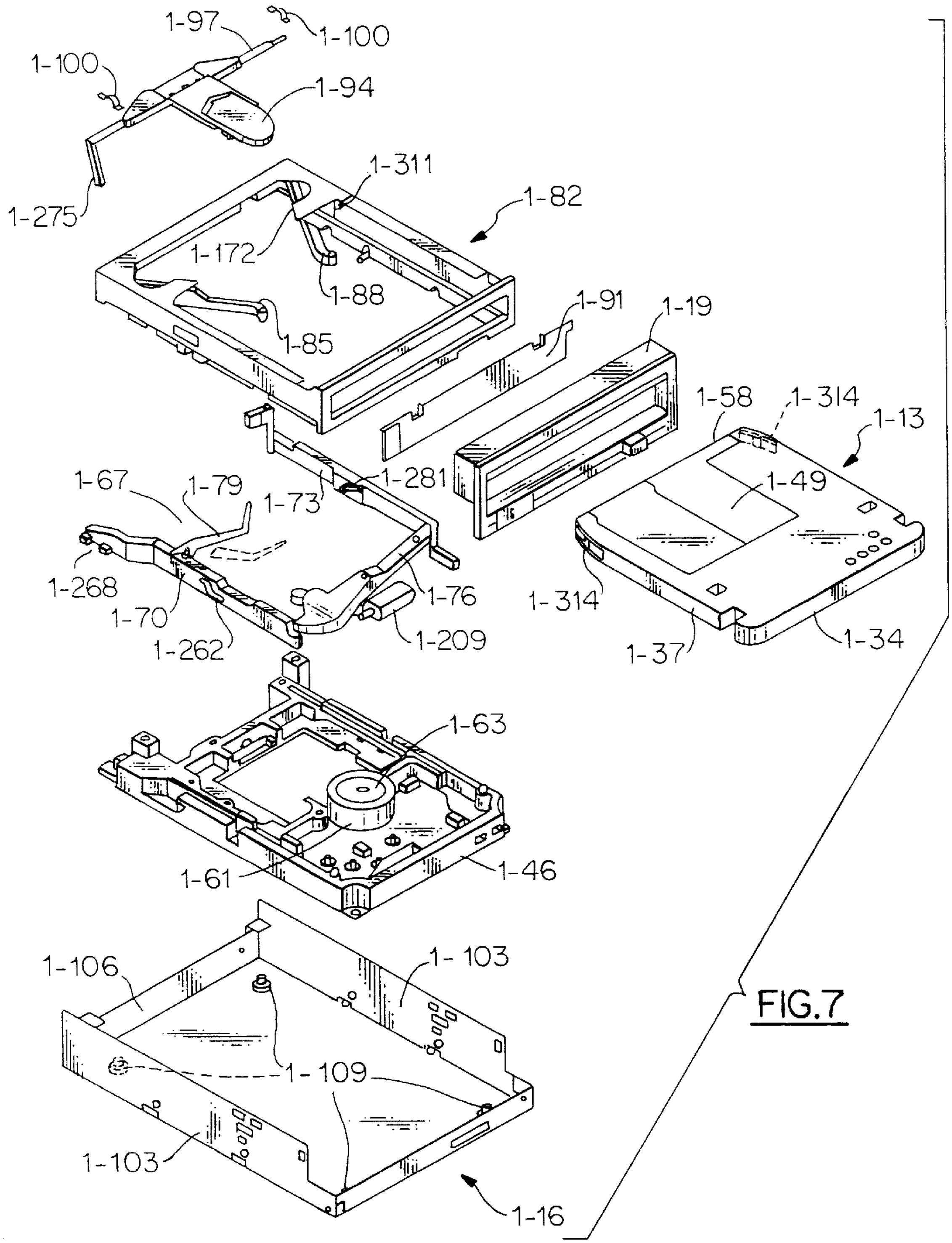
FIG. 7 is an exploded isometric view of the disc drive of FIG. 6, depicting the major subassemblies thereof.

The disc cartridge 1-13 also includes a cartridge door or shutter 1-49. The shutter 1-49 is spring-loaded in a closed position (FIGS. 6, 7, and 16). When the shutter 1-49 is open, it rests in a recessed portion 1-52 of the upper planar surface 1-31. Since the disc drive 1-10 of the preferred embodiment reads two-sided disc cartridges 1-13, a similar shutter and recessed portion exists on the lower planar surface 1-32, but these features are not shown in the figures. The shutter typically has a shutter latch 1-55 (not shown) on the rear wall 1-38 of the disc cartridge 1-13.

Protected within the disc cartridge 1-13 is a disc 1-14 (FIGS. 23–25), having a metallic disc hub 1-15. As known in the relevant arts, the disc 1-14 may be formed as a rigid substrate having a magnetic material coating thereon. Embedded in the magnetic material coating are tracks in the form of concentric or spiraling rings. The magnetic coating may be on either one or both surfaces of the rigid substrate, and the coating enables data to be magnetically recorded on the disc 1-14 by magnetic transducers, typically referred to as heads. At the center of the rigid substrate is the metallic disc hub 1-15.

Referring now to FIG. 7, the primary component groups within the disc drive 1-10 of the instant invention include the following. There is the bottom housing 1-16 in which the base plate 1-46 rests. In FIG. 7, a spindle motor 1-61 is shown mounted on the base plate 1-46. The spindle motor 1-61 includes a spindle magnet 1-63 which attracts the metallic disc hub 1-15 of the disc 1-14 (FIGS. 23–25) when the disc cartridge 1-13 is installed in the disc drive 1-10. An ejection mechanism according to the present invention is generally referenced 1-67. The ejection mechanism 1-67 includes a left slider 1-70, a right slider 1-73, and a tiller 1-76. The ejection mechanism 1-67 is described more fully below. A parking arm 1-79 is also depicted in FIG. 7 in its position above the left slider 1-70. A cartridge receiver is shown generally at 1-82. Also shown in FIG. 7 are a left door link 1-85, a right door link 1-88, and a receiver door 1-91, each of which is pivotally attached to the cartridge receiver 1-82. The drive face plate 1-19 is depicted in front of the cartridge receiver 1-82. Finally, a rotatable, magnetic bias coil assembly 1-94 is depicted attached to a bias coil arm 1-97, with bias coil clamps 1-100 depicted above the bias coil arm 1-97. Further details about each of these primary component assemblies will next be provided.

With continuing reference to FIG. 7, it is illustrated that the bottom housing 1-16 includes side walls 1-103 and a back wall 1-106. On the inside base of the bottom housing 1-16 are four mounting stations 1-109 to which the base plate 1-46 is secured. The bottom housing 1-16 would also encase the control electronics, which are not depicted in the figures.

Figure 8A:
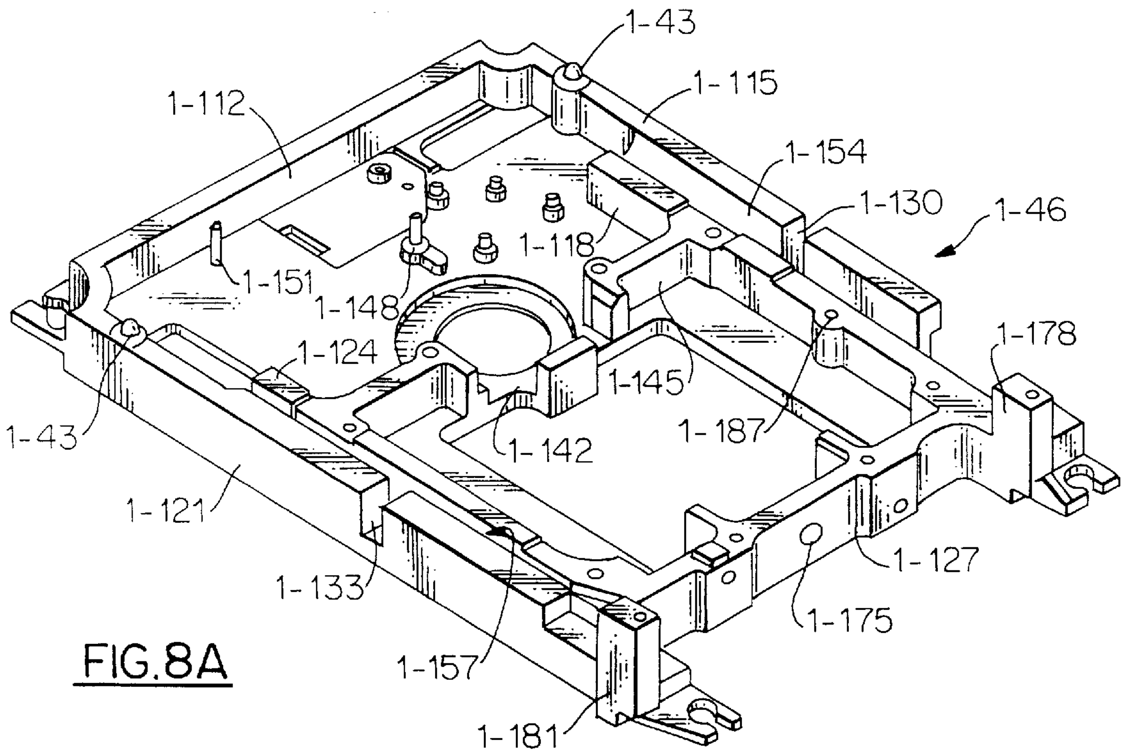
FIGS. 8A–8B are isometric views of the baseplate depicted in FIG. 7.
Figure 8B:
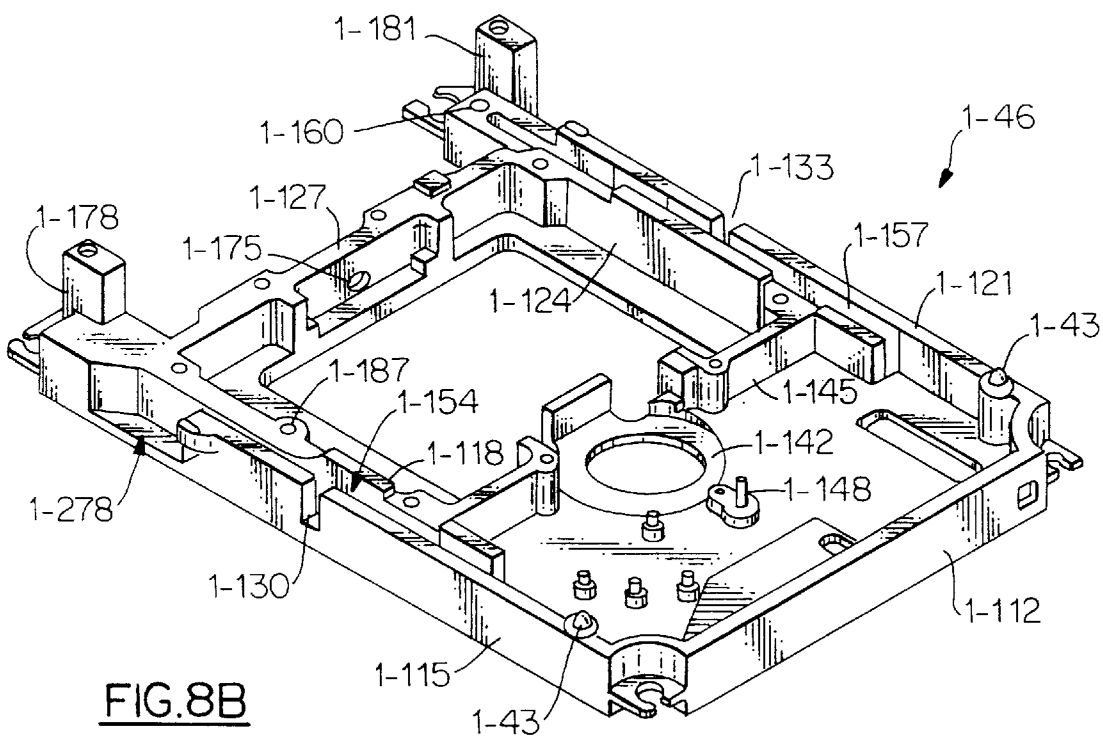

In reference to FIGS. 8A and 8B, further details of the construction of the base plate 1-46 will now be provided. The base plate 1-46 is mounted on the four mounting stations 1-109 (FIG. 7) of the bottom housing 1-16. The base plate 1-46 has many components either molded into, embedded into, attached to, or associated with it. Base plate 1-46 is the "glue" that brings the many components of this invention together and permits them to interact. Around the periphery of the base plate 1-46 there is a forward wall 1-112, a left outer side wall 1-115, a left inner side wall 1-118, a right outer side wall 1-121, a right inner side wall 1-124, and a rear vertical wall 1-127. The left and right outer side walls 1-115, 1-121, respectively, each include a vertical slot 1-130, 1-133, respectively. The left vertical slot 1-130 accommodates a left lift pin 1-136 (FIG. 15A) on the cartridge receiver 1-82 when the cartridge receiver 1-82 is in place around the base plate 1-46. The right vertical slot 1-133 similarly accommodates a right lift pin 1-139 (FIG. 15B) of the cartridge receiver 1-82.

The two cartridge locating pins 1-43, FIG. 8B, are positioned near the forward ends of the left and right outer side walls 1-115, 1-121, respectively. These locating pins 1-43 are adapted to engage the cartridge channels 1-40 (FIG. 6). When the pins 1-43 are located in the channels 1-40, the pins 1-43 hold the disc cartridge 1-13 and prevent it from moving both laterally (i.e., side-to-side) and longitudinally (i.e., forward and backward).

A spindle motor mount 1-142 is molded into the bottom of the base plate 1-46. The spindle motor 1-61 (FIG. 7) may be held on the spindle motor mount 1-142 by, for example, spring clips (not shown) attached to an intermediate rib 1-145.

The base plate 1-46 has various axes and mounting pins associated therewith. For example, a tiller pivot axis 1-148 is mounted on the base plate 1-46 adjacent to the spindle motor mount 1-142. A tiller-spring pin 1-151 is fixed to the bottom of the base plate 146 near the forward wall 1-112 (FIG. 8A). The other pins attached to the bottom of the base plate 1-46 near the forward wall 1-112 act as pivot shafts for the gears in the ejection gear train. The base plate 1-46 also includes a left slider channel 1-154 and a right slider channel 1-157. The slider channels 1-154, 1-157 extend along the sides of the base plate 1-46. The left slider channel 1-154 is formed between the left outer side wall 1-115 and the left inner side wall 1-118. When in position, the left slider 1-70 is sandwiched between the left inner side wall 1-118 and the left outer side wall 1-115, and rides in the left slider channel 1-154 (see FIGS. 9, 13, and 16A). Similarly, the right slider channel 1-157 is formed between the right outer side wall 1-121 and the right inner side wall 1-124. When in position, the right slider 1-73 is sandwiched between the right inner side wall 1-124 and the right outer side wall 1-121, and rides in the right slider channel 1-157. The left and right sliders 1-70, 1-73, respectively, may be held in their respective channels 1-154, 1-157 by, for example, "ears" on the spring clips (not shown) that hold the spindle motor 1-61 in position on the spindle motor mount 1-142.

At the end of the right slider channel 1-157, adjacent to the rear vertical wall 1-127, a socket 1-160 is formed in the base plate 1-46 where the rear of the right inner side wall 1-124 merges with the rear of the right outer side wall 1-121. This socket 1-160 accommodates a pivot pin 1-163 (FIGS. 17B and 17A) of a receiver latch 1-166. The receiver latch 1-166 has a vertical surface 1-169 (FIG. 17B) upon which a latch-release trip lug 1-172 (FIGS. 7 and 16A), which is fixed to the right door link 1-88, impacts to release the receiver latch 1-166.

The base plate 1-46 has a port 1-175 in the rear vertical wall 1-127. The laser diode 42 (not shown), which would be located behind the rear vertical wall between a left corner pillar 1-178 and a right corner pillar 1-181, shines through the port 1-175 and into a carriage 1-184 (best shown in FIGS. 9, 13, 13A, 16A and 16A), which contains the optics that focus the laser beam on an information track on the disc 1-14. The carriage 1-184 is discussed further below.

Figure 9:
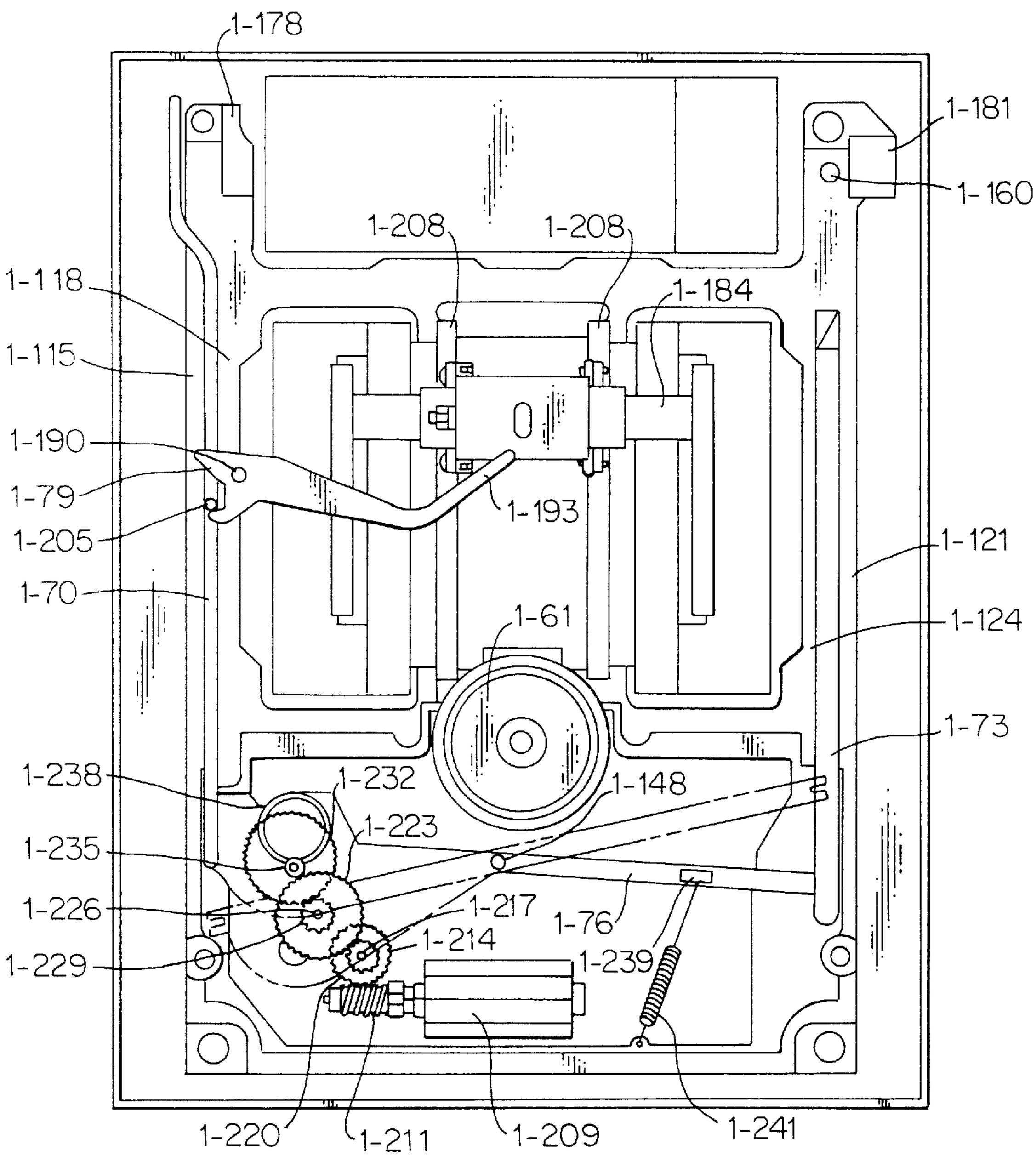
FIG. 9 is a top elevational view of the drive of FIG. 6 with some features removed to better show the tiller, the tiller-driving gears, the motor that drives these gears, and the operative relationship between these features.
Figure 10A:
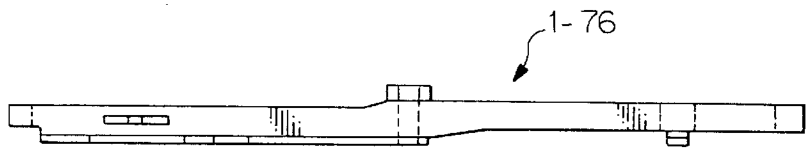
FIGS. 10A–10F are elevational and isometric views of a tiller.
Figure 10B:
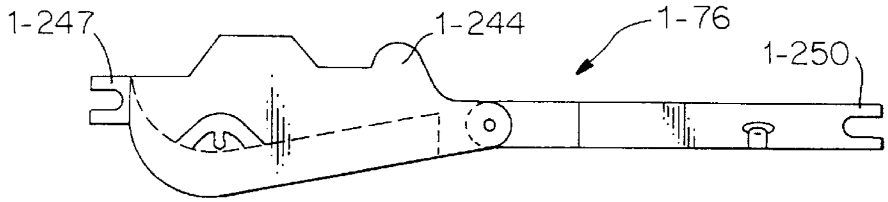
Figure 10C:
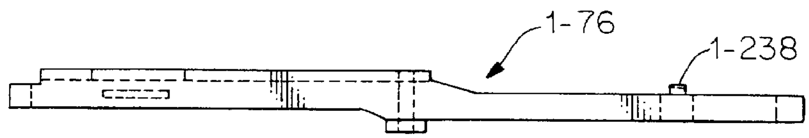
Figure 10D:
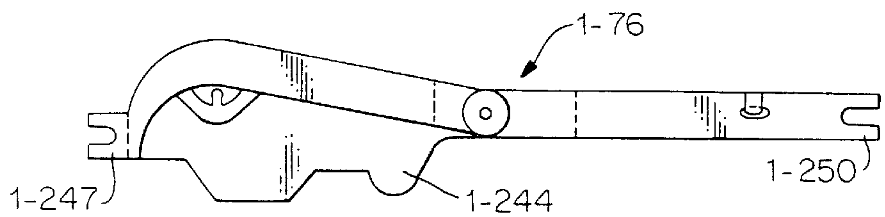
Figure 10E:
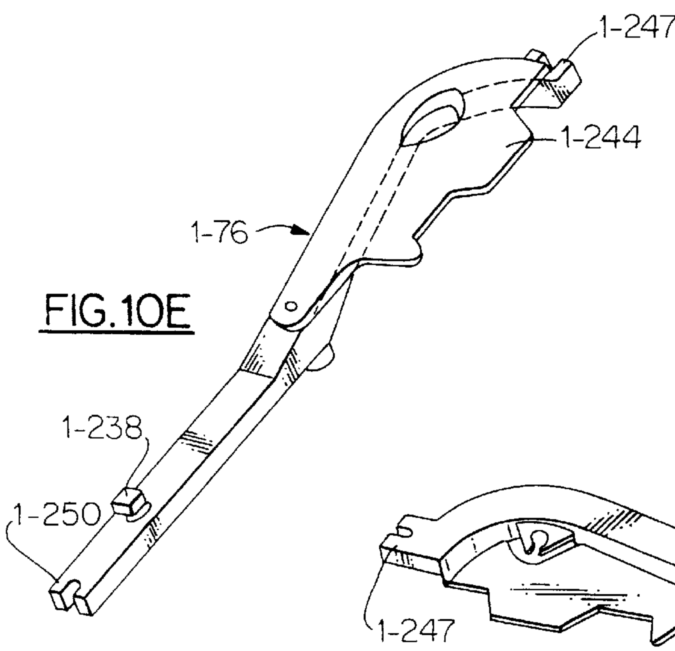
Figure 10F:
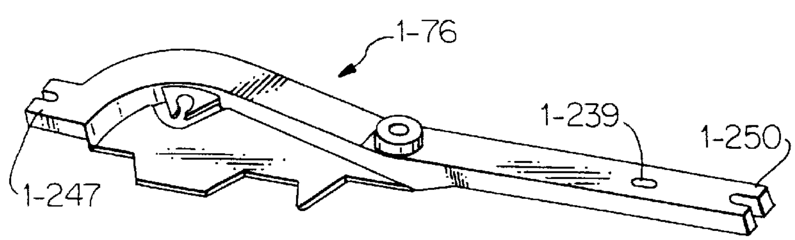

The base plate 1-46 also has a hole 1-187 molded therein to accommodate a pivot shaft 1-190 (FIG. 14B) of the parking arm 1-79. This hole 1-187 is molded as an integral part of the left inner side wall 1-118. FIG. 9, for example, shows the parking arm 1-79 in place with its pivot shaft 1-190 in the hole 1-187. The disc drive 1-10 includes an optics module 1-189 which performs similarly to the optics module 24 discussed above.

Figure 13:
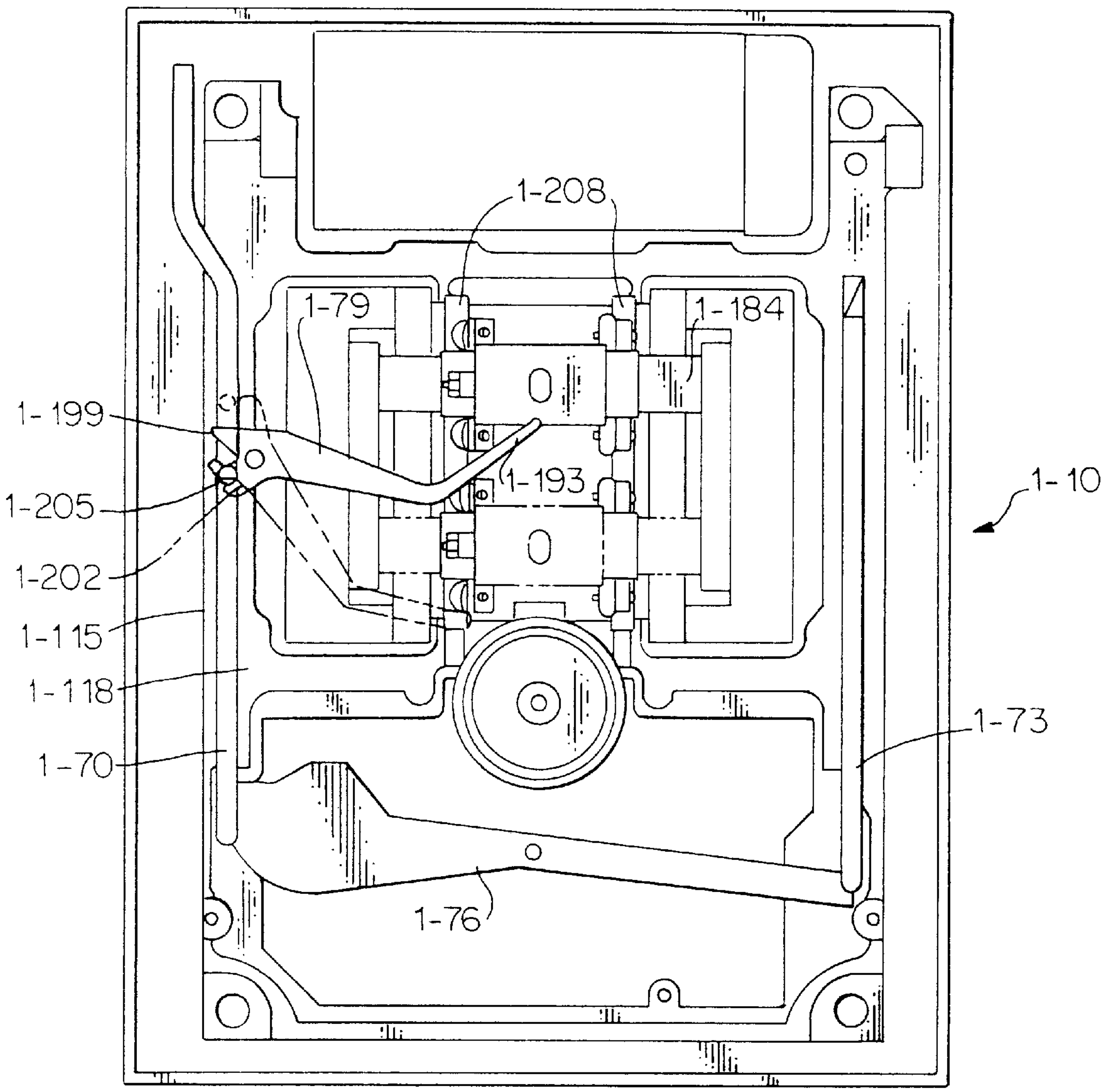
FIG. 13 is a top plan view of the parking arm in two positions, one drawn in phantom, showing its action of parking the carriage at the back of the drive while the drive is at rest.
Figure 13A:
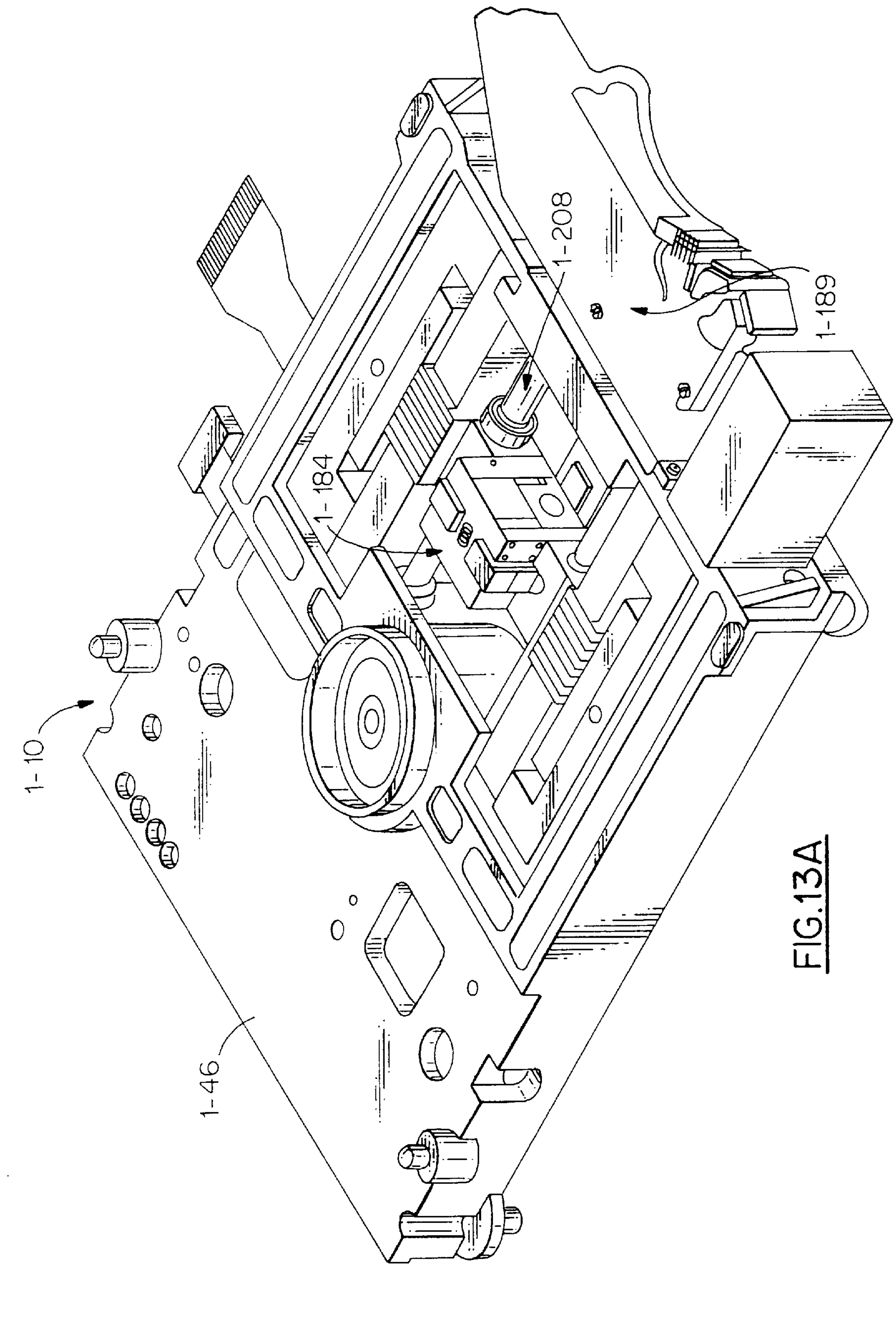
FIG. 13A is a perspective view of the disk drive of FIG. 1, illustrating in particular the fine actuator assembly carriage which supports the optics used to focus the laser beam on the data track of the optical disk.
Figure 14A:
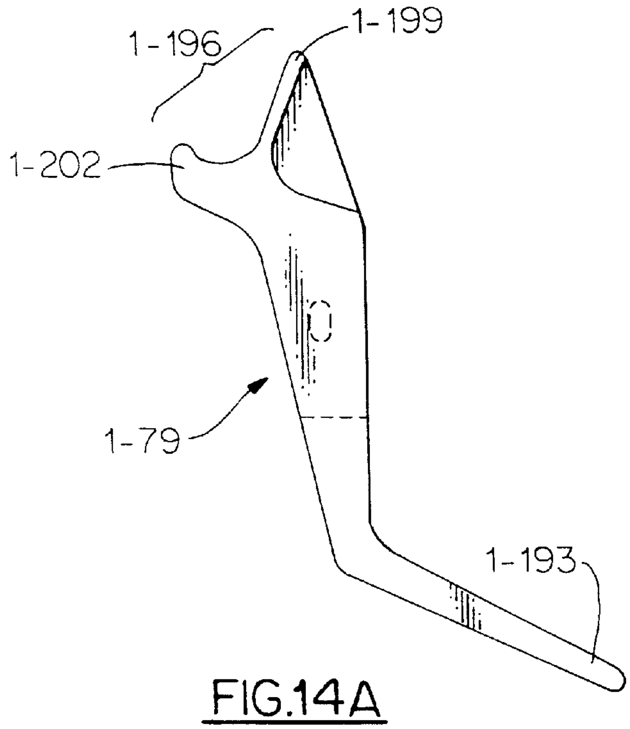
FIGS. 14A–14C comprise elevational and isometric views of a parking arm.
Figure 14B:
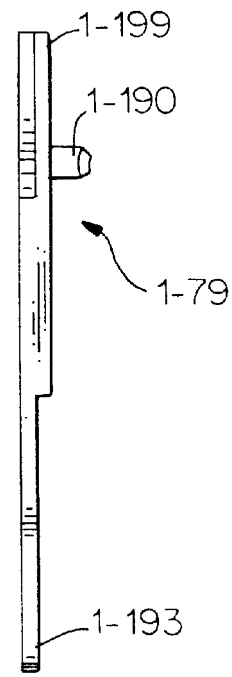
Figure 14C:
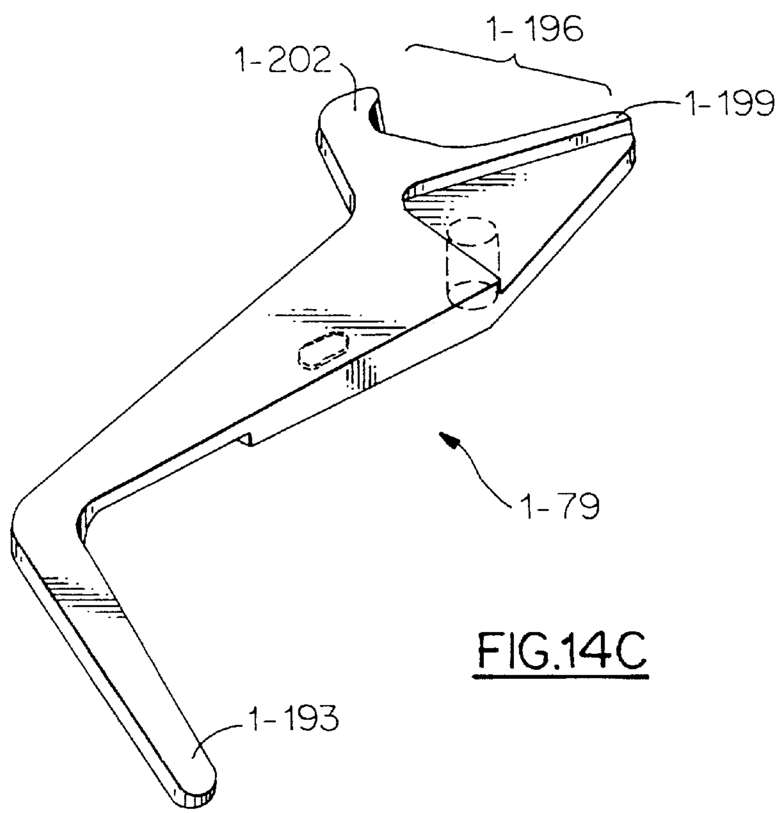

Referring now to FIGS. 14A through 14C, further features of the parking arm 1-79 will be described. In addition to the pivot shaft 1-190, the parking arm 1-79 includes a pressing end 1-193. The parking arm 1-79 has a jaw 1-196 formed on the end remote from the pressing end 1-193. The jaw 1-196 has a long side 1-199 and a short side 1-202. When the parking arm 1-79 is in position, the jaw 1-196 straddles a lug 1-205 (FIG. 11C) on the left slider 1-70. The parking arm 1-79 in position, with its jaw 1-196 straddling the lug 1-205 of the right slider 1-70, may be seen to best advantage in FIGS. 9, 13, 16A and 16B. The position of the parking arm 1-79 is thereby dictated by the location of the left slider 1-70 in the left slider channel 1-154.

Figure 16A:
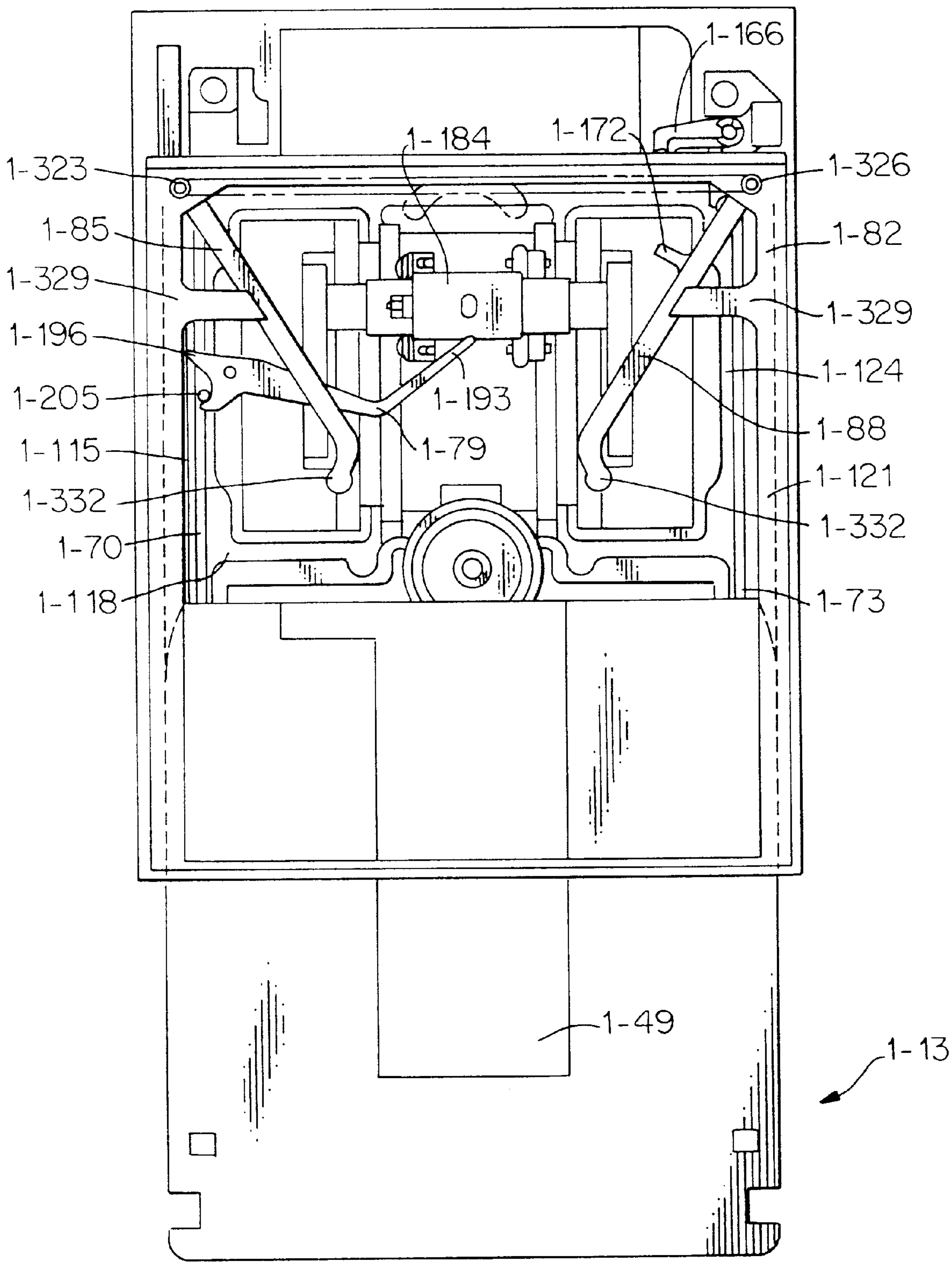
FIGS. 16A and 16B are elevational views, during insertion of a disc cartridge, of the drive of FIG. 6 with some features removed to better show the trip lug on the right door link, the latch, and the operative relationship between these features.
Figure 16B:
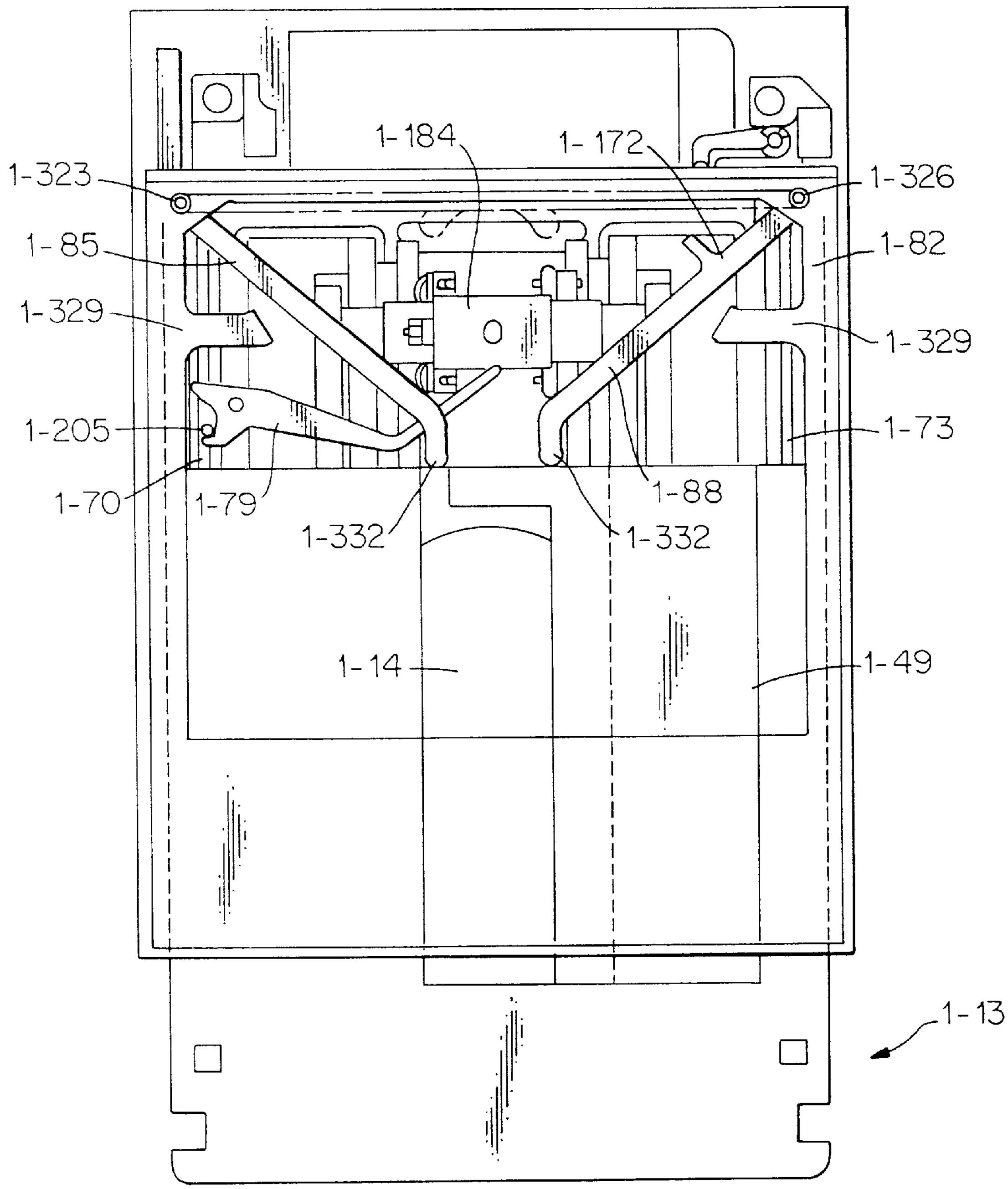

As seen to best advantage in FIG. 13, the parking arm 1-79 parks the carriage 1-184. The carriage 1-184 focuses the laser beam coming through the port 1-175 (FIGS. 8A and 8B) in the rear vertical wall 1-127 of the base plate 1-46. In particular, the carriage positions the laser beam over the center of a data track containing data to be read. The carriage 1-184 rides on support rails 1-208, FIG. 9. A conventional magnetic arrangement drives the carriage 1-184 along the rails 1-208. When the cartridge receiver 1-82 is in the up condition, the parking arm 1-79, which is powered by the left slider 1-70, holds the carriage 1-184 toward the rear of the drive. This condition is illustrated in FIGS. 9 and 16A, and is illustrated in FIG. 13 by the parking arm 1-79 shown in solid lines. When the left slider 1-70 is driven forward by the tiller 1-76 during ejection of the disc cartridge 1-13, the parking arm 1-79 is rotated by the lug 1-205 pressing against the short side 1-202 of the jaw 1-196 until the pressing end 1-193 of the parking arm 1-79 holds the carriage 1-184 toward the back of the disc drive 1-10. When the cartridge receiver 1-82 is in its down position, the left slider 1-70 has been driven toward the rear of the disc drive 1-10 by the tiller 1-76. Under this scenario, the lug 1-205, which was driven rearward with the left slider 1-70, has rotated the parking arm 1-79 toward the front of the disc drive 1-10. With the left slider 1-70 and parking arm 1-79 in these positions, the carriage 1-184 is not influenced by the pressing end 1-193 of the parking arm 1-79 and may move freely below the disc 1-13 in the disc drive 1-10.

The ejection mechanism 1-67, which may be seen to best advantage in FIGS. 7 and 9, includes the following key features. An ejection motor 1-209 powers the ejection mechanism. In particular, the ejection motor 1-209 powers a gear train that powers the output cam which, in turn, forces the tiller 1-76, FIG. 9, to rotate in a first direction (counterclockwise in FIG. 9), thereby ejecting a disc cartridge 1-13 from the disc drive 1-10. When the ejection process is initiated, the motor 1-209 drives a corresponding worm gear 1-211. The worm gear 1-211 is fixed to the central shaft of the ejection motor 1-209. This worm gear 1-211 drives a first large gear 1-214 about a first axis 1-217. This rotation of the first large gear 1-214 rotates a first small gear 1-220, which is fixed to the bottom of the first large gear 1-214 for rotation therewith about the first gear axis 1-217. The first small gear 1-220 drives a second large gear 1-223 about a second gear axis 1-226. A second small gear 1-229 is fixed to the top of the second large gear 1-223 for rotation therewith about the second gear axis 1-226. The second small gear 1-229, in turn, drives a third large gear 1-232 about a third gear axis 1-235. The third large gear 1-232 drives a cam 1-238 that forces the tiller 1-76 to rotate about the tiller axis 1-148.

The tiller 1-76 will now be described with reference to FIGS. 10A–10F and FIG. 9. The tiller 1-76 is pivotally attached to the base plate 1-46 by the tiller axis 1-148. A tiller-spring hook 1-239 is molded on the slender portion of the tiller 1-76. A tiller spring 1-241 (FIG. 9) is attached between the tiller-spring hook 1-239 and the tiller-spring pin 1-151. The tiller-spring 1-241 biases the tiller 1-76 in a second direction (clockwise in FIG. 9) about the tiller axis 1-148. This is the cartridge-loading direction, which drives the right slider 1-73 forward and the left slider 1-70 rearward, to seat the disc cartridge 1-13 on the spindle motor 1-61. The tiller further includes a tiller skirt or webbed portion 1-244 that rides on top of the tiller gear train and thereby helps to contain the ejection gears in position on their respective gear axes. The end of the tiller near the tiller skirt 1-244 comprises a U-shaped jaw 1-247, and the tiller end remote from the skirt 1-244 comprises a similar U-shaped jaw 1-250. The U-shaped jaw 1-247 fits rotatably around a cylindrical connection post 1-253 of the left slider 1-70 (FIG. 11C). Similarly, the U-shaped jaw 1-250 of the tiller 1-76 fits rotatably around the cylindrical connection post 1-256 (FIG. 12E) of the right slider 1-73. The tiller 1-76 is thereby pivotally connected to the forward ends of the left and right sliders 1-70, 1-73, respectively. In addition, since the left and right sliders 1-70, 1-73 are held in their respective slider channels 1-154, 1-157 by the spring clips (not shown) which also hold the spindle motor 1-61 in position, the tiller 1-76 is held on the tiller axis 1-148 by the interaction between the U-shaped jaws 1-247, 1-250 and the cylindrical connecting posts 1-253, 1-256.

When the tiller 1-76 rotates in a first direction (counterclockwise in FIG. 9), the left slider 1-70 is driven forward in the left slider channel 1-154, while the right slider 1-73 is simultaneously driven rearward in the right slider channel 1-157. Thus, rotation of the tiller 1-76 in the first direction (counterclockwise in FIG. 9) raises the cartridge receiver 1-82 so that a disc cartridge 1-13 may be ejected from or loaded into the disc drive 1-10. On the other hand, when the tiller 1-76 rotates in a second direction (clockwise in FIG. 9), the left slider 1-70 is driven rearward in the left slider channel 1-154, while the right slider 1-73 is simultaneously driven forward in the right slider channel 1-157. Rotation of the tiller 1-76 in this direction lowers the cartridge receiver 1-82, placing the disc on the spindle motor. The raising and lowering of the cartridge receiver 1-82 by the rotation of the tiller 1-76 is discussed further below.

As discussed above, the left slider 1-70 rides in the left slider channel 1-154, and the right slider 1-73 rides in the right slider channel 1-157 under the influence of the tiller 1-76. Further details concerning the sliders 1-70, 1-73 is provided next.

Figure 11A:
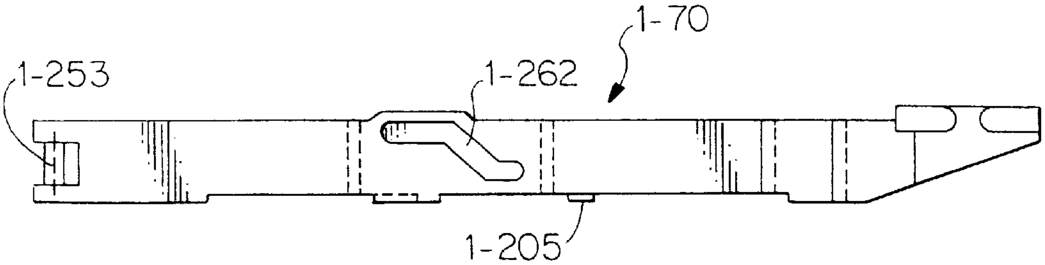
FIGS. 11A–11C comprise elevational and isometric views of a left slider.
Figure 11B:
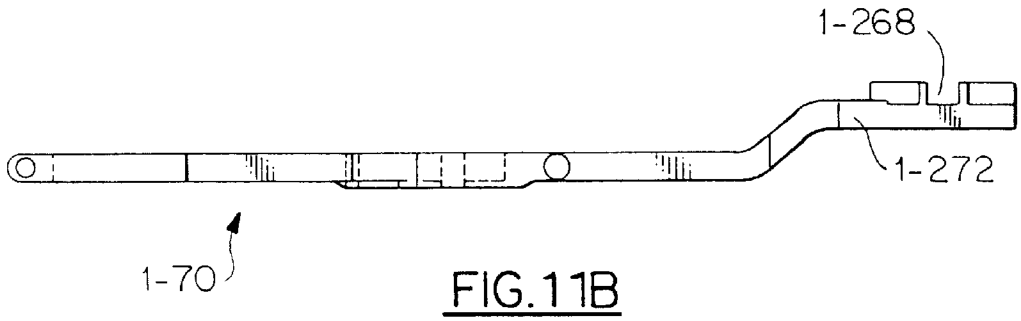
Figure 11C:
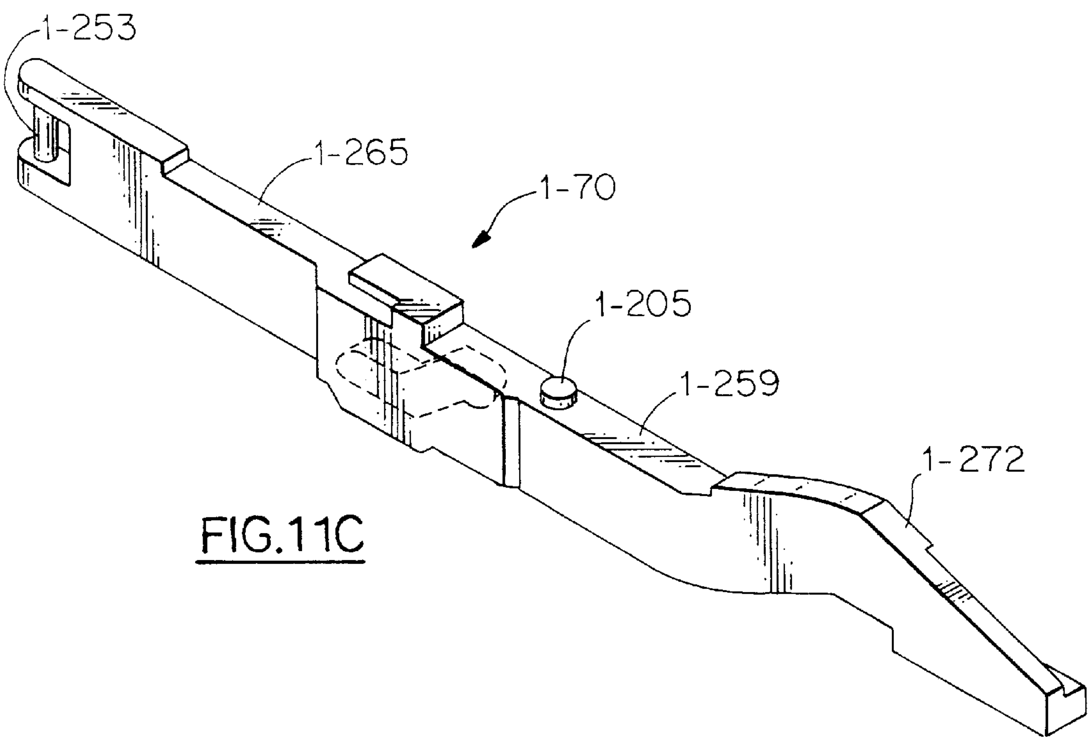
Figure 12A:
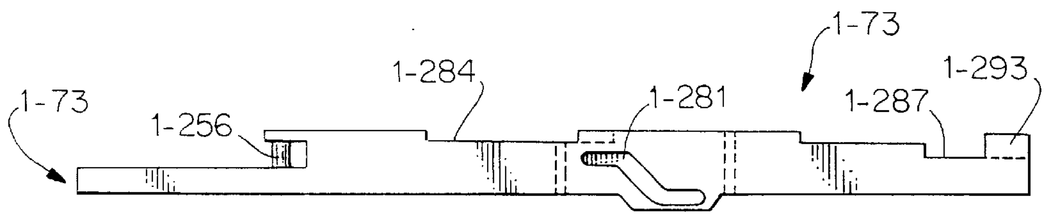
FIGS. 12A–12E are elevational and isometric views of a right slider.
Figure 12B:
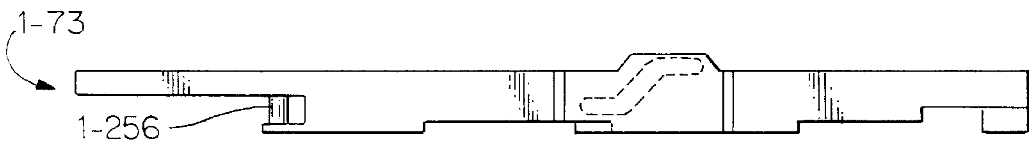
Figure 12C:
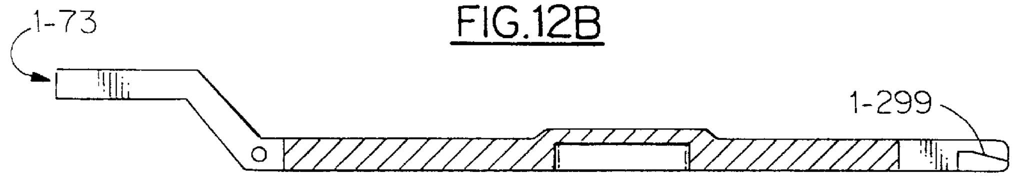
Figure 12D:
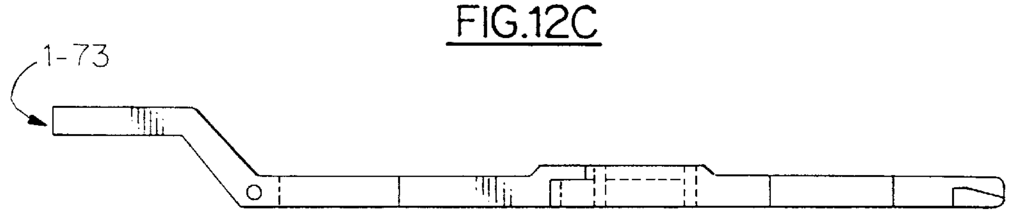
Figure 12E:
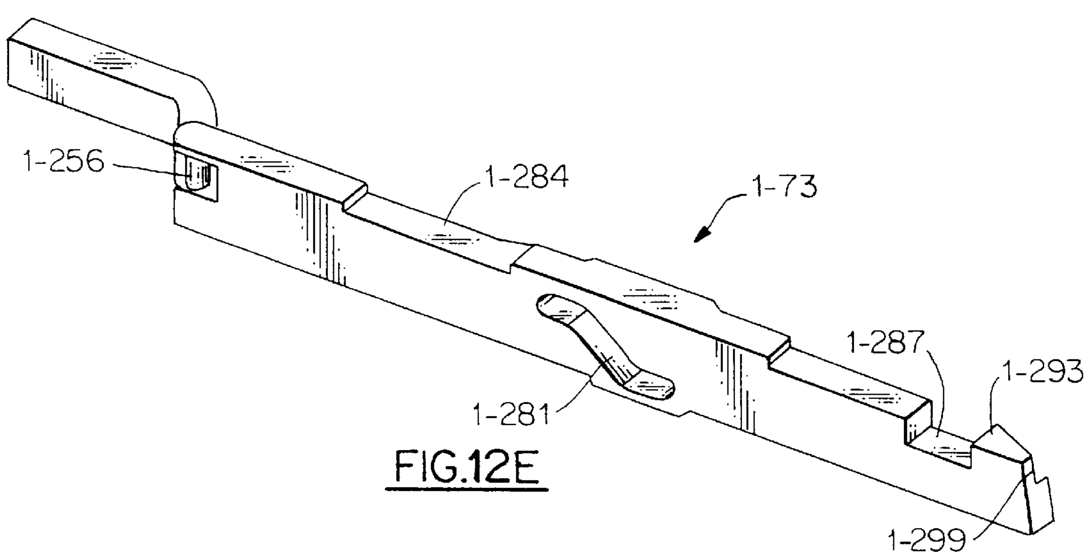

Referring now to FIGS. 11A–11C, the features of the left slider 1-70 are as follows. The left slider includes the cylindrical connecting post 1-253 on its forward end. The parking arm lug 1-205 exists on a first recessed portion 1-259. The parking arm 1-79 slides along the first recessed portion 1-259 of the left slider 1-70 under the influence of the lug 1-205. An S-shaped slot 1-262 is formed into the left slider 1-70. When the left slider 1-70 is in position in the left slider channel 1-154, the S-shaped slot 1-162 opens toward the left outer side wall 1-115, adjacent to and behind the left vertical slot 1-130. When the cartridge receiver 1-82 is in position around the base plate 1-46, the left lift pin 1-136

(FIG. 15A) of the cartridge receiver 1-82 rides in the left vertical slot 1-130 of the base plate 1-46. The left lift pin is longer than the left outer side wall 1-115 is thick. Therefore, the left lift pin 1-136 projects through the left vertical slot 1-130 and rides in the S-shaped slot 1-262 in the left slider 1-70. When the cartridge receiver 1-82 is thus positioned about the base plate 1-46, with the left lift pin 1-136 riding in the vertical slot 1-130 and the S-shaped slot 1-262, the cartridge receiver 1-82 is restricted from traveling forward or backward and may only travel up and down vertically. The vertical slot 1-130 restricts the forward-to-backward movement of the cartridge receiver 1-82, while the S-shaped slot 1-262 in the left slider 1-70 defines the vertical height of the cartridge receiver. In other words, depending upon which portion of the S-shaped slot 1-262 is behind the vertical slot 1-130 at any particular moment, the cartridge receiver 1-82 may be in its highest position, its lowest position, or at some position between its highest and lowest positions.

A second recessed portion 1-265 is present on the top of the left slider 1-70. A horizontal pin (not shown) may be attached to the base plate 1-46 so as to slip along the second recessed portion 1-265. This horizontal pin (not shown) would limit the most forward and most rearward positions of the left slider 1-70 because the pin would impact the edges of the second recessed portion 1-265 upon reaching one of the extreme positions of the left slider.

The rear-most end of the left slider 1-70 includes a notch 1-268, which is best illustrated in FIG. 11B and FIG. 7. The notch 1-268 is located on a displaced end portion 1-272 of the left slider 1-70. The notch 1-268 receives a lever arm 1-275 of the bias coil arm 1-97, FIG. 7. This lever arm 1-275 rotates the bias coil arm 1-97 depending upon the position of the left slider 1-70, and in particular, the position of the notch 1-268. The displaced end portion 1-272 of the left slider 1-70 rides in a recess 1-278 (FIG. 8B) in the left outer side wall 1-115 of the base plate 1-46.

Referring now to FIGS. 12A–12E, the features of the right slider 1-73 will be presented. As stated above, the tiller 1-76 is connected to the right slider 1-73 via the cylindrical connection post 1-256. The right slider 1-73 has an S-shaped slot 1-281 formed therein. This S-shaped slot 1-281 is a flipped version of the S-shaped slot 1-262 in the left slider 1-70. This is best shown in FIG. 7. Upon close consideration of FIG. 7, it becomes apparent that, when the sliders 1-70, 1-73 are connected to the tiller 1-76, the S-shaped slots 1-262, 1-281 are flipped mirror images of each other. This arrangement is necessary since the sliders 1-70, 1-73 move in opposite directions under the influence of the tiller 1-76. The S-shaped slot 1-281 in the right slider 1-73 also opens toward the right outer side wall 1-121 when the right slider 1-73 is in its operating position in the right slider channel 1-157. Similar to what was described above with reference to the left slider 1-70, when the cartridge receiver 1-82 is in position around the base plate 1-46, the right lift pin 1-139 (FIG. 15B) rides in the right vertical slot 1-133 (FIG. 8B). Since the right lift pin 1-139 is longer than the right outer side wall 1-121 is thick, the right lift pin 1-139 projects through the right outer side wall 1-121 at the right vertical slot 1-133 and rides in the S-shaped slot 1-281 in the right slider 1-73. The right vertical slot 1-133 restricts the right lifting pin 1-139 from traveling parallel to the longitudinal axis of the base plate 1-46 (i.e., parallel to a line passing perpendicularly through the forward wall 1-112 and the rear vertical wall 1-127). Since the right lift pin 1-139 rides in the S-shaped slot 1-281, the vertical height of the cartridge receiver 1-82 is defined by the location of the right lift pin 1-139 in the S-shaped slot 1-281. The S-shaped slot 1-281 in the right slider 1-73 travels behind the right vertical slot 1-133 at the same rate that the S-shaped slot 1-262 in the left slider 1-70 passes behind the left vertical slot 1-130, but in an opposite direction. The flipped mirror image design of the S-shaped slots 1-262, 1-281, however, ensures that the left and right lift pins 1-136, 1-139, respectively, are held at substantially the same vertical height above the bottom of the base plate 1-46 at any particular time.

Still referring primarily to FIGS. 12A–12E, the right slider 1-73 includes the following additional features. A recessed portion 1-284 is provided on the top surface of the right slider 1-73. A pin (not shown) may be mounted horizontally across the right slider channel 1-157 so as to slide along the recessed surface 1-284. The horizontal pin sliding along the recessed surface 1-284 would limit the maximum forward and rearward travel of the right slider 1-73 since the horizontal pin would hit the edges of the recess 1-284 at the extremes of travel of the right slider 1-73. The right slider 1-73 also includes a notched region 1-287 to accommodate a paw 1-290 (FIGS. 17A and 17B) of the receiver latch 1-166. A raised portion 1-293 is provided on the rear end of the right slider 1-73. When the tiller 1-76 rotates in the first direction (counterclockwise in, for example, FIG. 13), driving the right slider 1-73 rearward in the right slider channel 1-157, a latching action takes place between the paw 1-290 of the receiver latch 1-166 and the raised portion 1-293 of the right slider 1-73. In particular, a first slipping surface 1-296 (FIG. 17A), which is located on the paw 1-290, slides past a second slipping surface 1-299 (FIGS. 12C and 12E), which is on the raised portion 1-293 of the right slider 1-73. When the surfaces 1-296 and 1-299 slip past each other, the paw 1-290, which is spring-loaded in the direction indicated by arrow 1-302 in FIG. 17A, enters the notched region 1-287 of the right slider 1-73, which holds the right slider 1-73 in the rearward position and, consequently, holds the cartridge receiver 1-82 in its uppermost position. When the cartridge receiver is in this position, any disc cartridge 1-13 in the drive 1-10 would be ejected, or, alternatively, a disc cartridge 1-13 could be loaded into the disc drive 1-10.

The S-shaped slots 1-262 and 1-281 in the left and right sliders 1-70, 1-73, respectively, play a significant role in generating the peeling action accomplished by the instant invention when loading a disc cartridge onto and unloading a disc cartridge from the spindle motor. This role of the S-shaped slots 1-262, 1-281 in facilitating the peeling action generated by the instant invention is discussed further below.

Figure 15A:
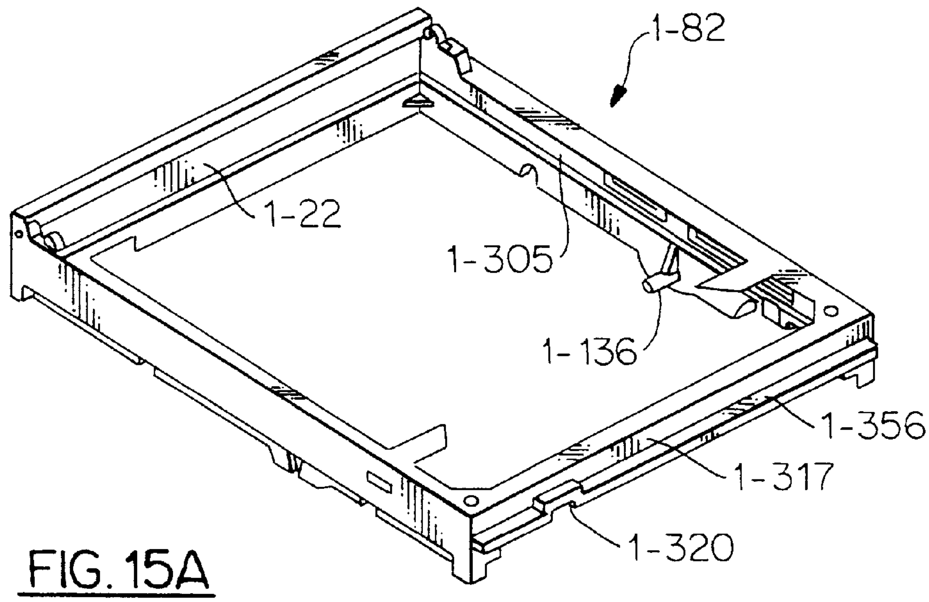
FIGS. 15A and 15B are isometric views of a cartridge receiver.
Figure 15B:
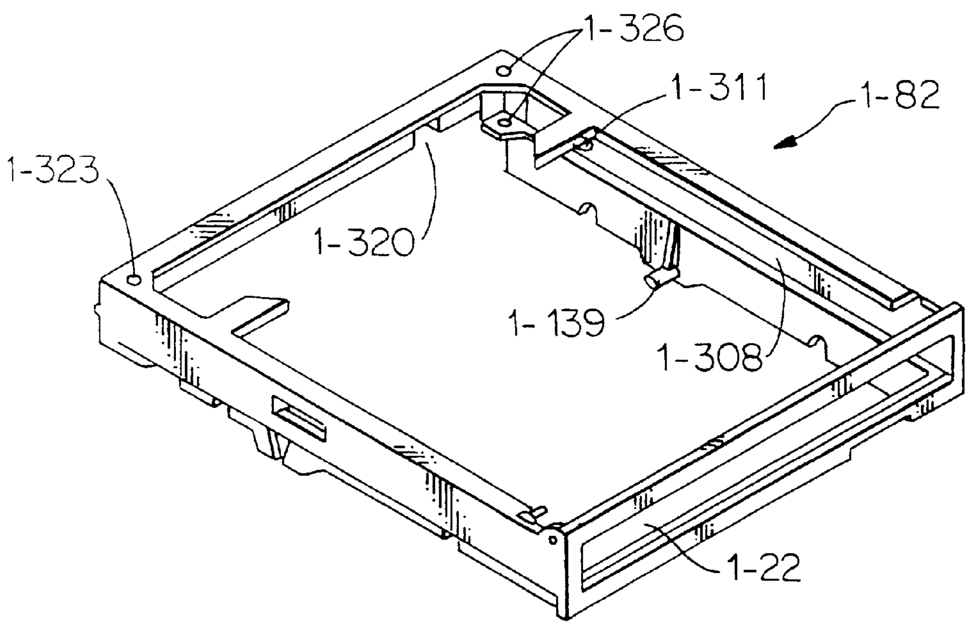

Referring now to FIGS. 15A and 15B, the cartridge receiver 1-82 and the components attached thereto will be described. The cartridge receiver 1-82 is a one-piece, injection molded piece of plastic to which the left door link 1-85 (FIG. 7) and right door link 1-88 are added. When the disc drive 1-10 is fully assembled, the cartridge receiver 1-82 rides on the outside of the left and right outer side walls 1-115, 1-121 of the base plate 1-46. The cartridge receiver 1-82 travels vertically up and down as the lift pins 1-136, 1-139 move up and down as they follow their respective S-shaped slots 1-262, 1-281. The cartridge receiver 1-82 also pitches slightly up and down about an imaginary lateral axis passing through the left and right lift pins 1-136, 1-139. It is this slight pitching motion in conjunction with the up and down motion that generates the beneficial peeling action achieved by the instant invention. The cartridge receiver 1-82 may be snapped or lifted off of the remainder of the mechanism if the cover of the disc drive 1-10 is removed.

The cartridge receiver 1-82 has a left cartridge receiving channel 1-305 and a right cartridge receiving channel 1-308 formed therein. A stop bumper 1-311 is positioned in the rear of the right cartridge-receiving channel 1-308 to prevent improper insertion of a disc cartridge 1-13. As may be seen in FIGS. 6 and 7, the disc cartridge 1-13 has a pair of slots 1-314 molded into the side walls 1-37. If the disc cartridge 1-13 is inserted correctly, with its rear wall 1-38 entering the disc receiving port 1-22 first, one of the slots 1-314 in the disc cartridge 1-13 will accommodate the stop bumper 1-311 and permit the cartridge 1-13 to be fully inserted into the drive 1-10. If, on the other hand, the user inserts the disc cartridge 1-13 with the forward-facing label end 1-34 entering the disc receiving port 1-22 first, the stop bumper 1-311 will impact the label end 1-34 of the disc cartridge 1-13, thereby preventing full insertion of the disc cartridge 1-13 into the disc drive 1-10. A rear wall 1-317 of the cartridge receiver 1-82 has a notched region 1-320 formed therein. This notched region 1-320 permits the latch-release trip lug 1-172 (FIG. 16) fixed to the right door link 1-88 to impact the vertical surface 1-169 (FIG. 17B) of the receiver latch 1-166. Since the left and right door links 1-85 and 1-88, respectively, are rotated toward the rear of the disc drive 1-10 as the disc cartridge 1-13 is inserted in the cartridge receiver 1-82, as the disc cartridge 1-13 approaches full insertion, the trip lug 1-172 trips the receiver latch 1-166 by pressing against the vertical surface 1-169 to rotate the receiver latch 1-166. This rotation of the receiver latch 1-166 frees the paw 1-290 from its latched position around the raised portion 1-293 of the right slider 1-73. When the receiver latch 1-166 is tripped in this manner, the cartridge receiver 1-82 can be lowered, placing the disc cartridge 1-13 in operating position on the spindle motor 1-61.

Referring to FIGS. 7, 15A, 15B, 16A and 16B, the attachment of the left door link 1-85 and the right door link 1-88 to the receiver cartridge 1-82 will now be described. The left and right door links 1-85 and 1-88, respectively, are attached to the rear corners of the cartridge receiver 1-82, near the rear wall 1-317. Specifically, the left door link 1-85 is rotatably mounted to the cartridge receiver 1-82 at a first pivot point 1-323, and the right door link 1-88 is rotatably mounted to the cartridge receiver 1-82 at a second pivot point 1-326. The door links 1-85 and 1-88 are biased by a spring (not shown) toward the face plate 1-19 of the disc drive 1-10. In operation, one or the other of the door links 1-85, 1-88 unlatches the cartridge shutter lock and opens the cartridge shutter 1-49 as the disc cartridge 1-13 is inserted into the drive 1-10. Whether the left door link 1-85 or the right door link 1-88 opens the cartridge shutter 1-49 is determined by which side of the disc cartridge 1-13 is facing up when the cartridge 1-13 is inserted into the drive 1-10. If the disc cartridge 1-13 is inserted with a first side up, the right door link 1-88 operates the shutter latch and opens the shutter 1-49. If the disc cartridge 1-13 is inserted with its other side up, the left door link 1-85 operates the shutter latch and opens the shutter 1-49. When no disc cartridge 1-13 is in the drive 1-10, the door links 1-85 and 1-88 rest against door link stops 1-329, which are integrally formed as part of the cartridge receiver 1-82. These door link stops 1-329 ensure that free ends 1-332 of the door links 1-85 and 1-88 are properly positioned to release the shutter latch and open the shutter 1-49 as the disc cartridge 1-13 is inserted into the drive 1-10.

With reference now to FIGS. 18–22, the rotatable, magnetic bias coil assembly 1-94 will be more fully described. The bias coil assembly 1-94 is used during writing and erasing operations of the disc drive 1-10. The bias coil assembly 1-94 includes a steel bar 1-335 wrapped in a coil of wire 1-338. When the bias coil assembly 1-94 is positioned over a disc 1-14, as best shown in FIG. 23, it extends radially across the disc 1-14 and is thus capable of generating a strong magnetic field over a radial strip of the disc 1-14, extending from near the spindle 1-62 (FIGS. 23–25) to the edge of the disc 1-14. When the disc 1-14 is rotated under the bias coil assembly 1-94 by the spindle motor 1-61, it is possible to generate a magnetic field over the entire surface of the disc 1-14, thus enabling the user to write information to all portions of the disc 1-14 from its innermost to its outermost tracks. The coil 1-338 and bar 1-335 are covered by a bias coil housing top 1-341, which is mounted to a bias coil housing bottom 1-344.

Figure 21:
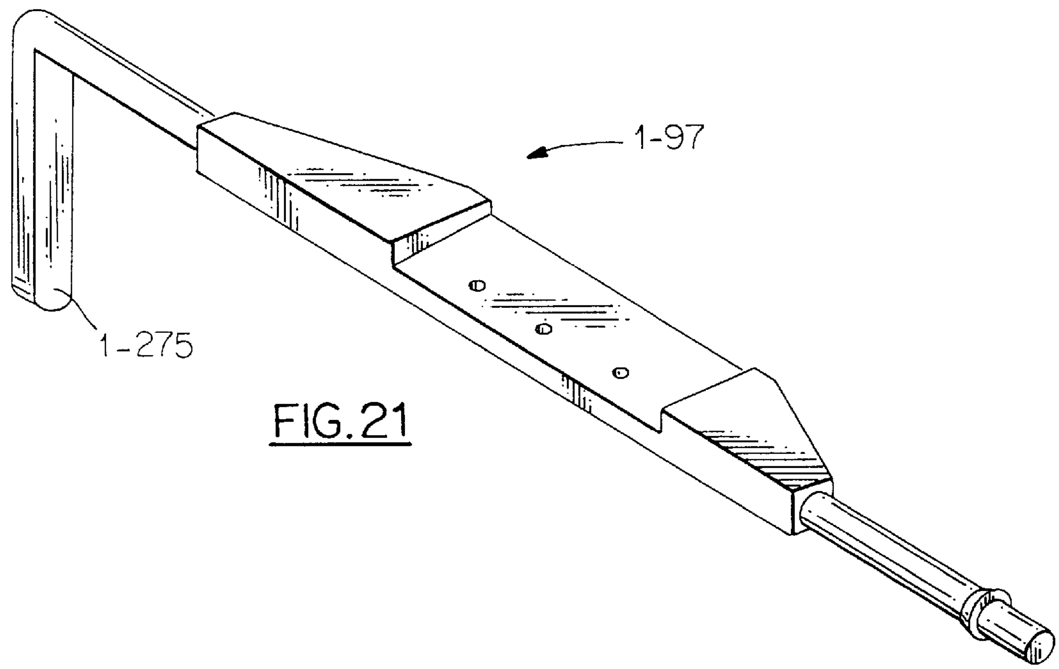
FIG. 21 is an isometric view of a pivot bar or rail that rotatably supports the bias coil assembly.
Figure 22:
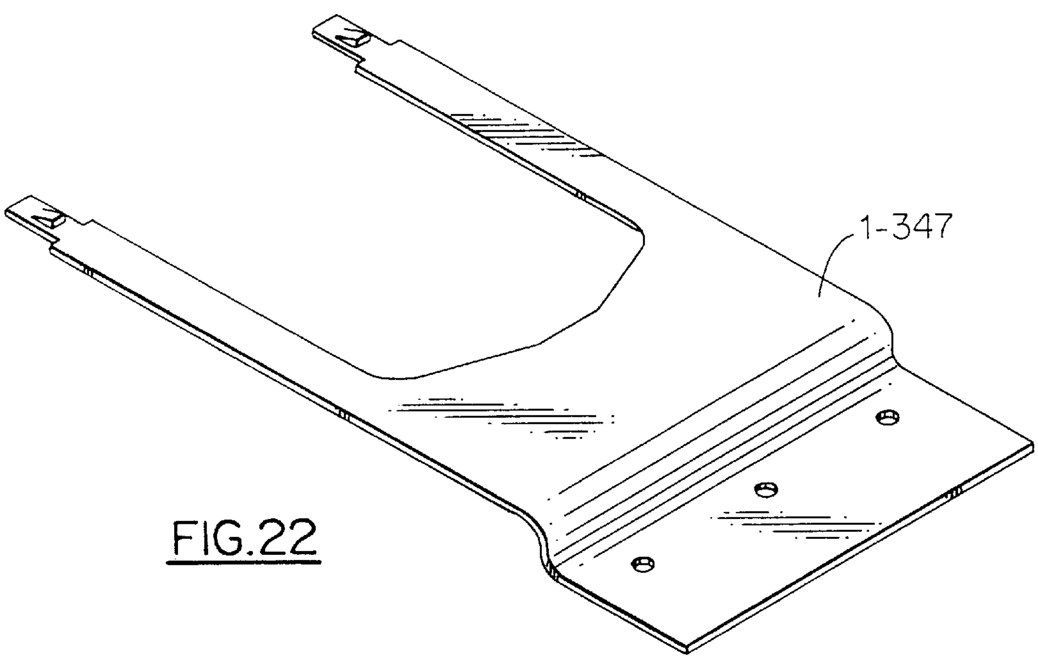
FIG. 22 is an isometric view of the bias coil assembly flexure to which the bias coil assembly is mounted and which is, in turn, mounted to the pivot bar depicted in FIG. 21.
Figure 23:
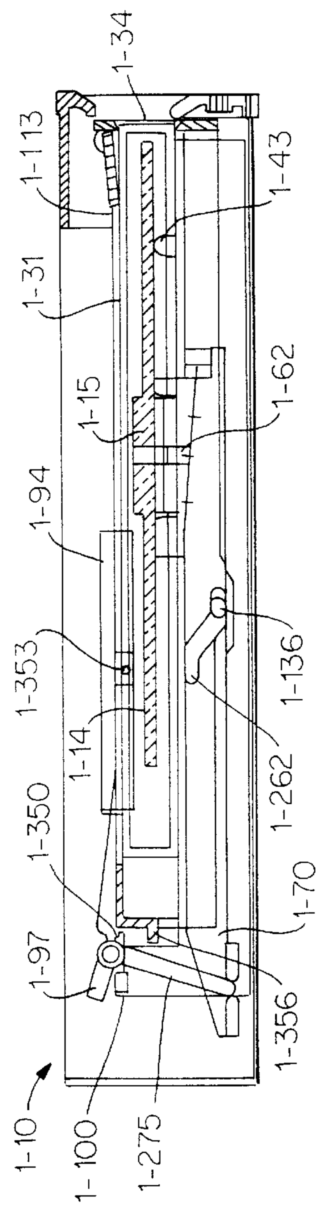
FIG. 23 is an elevational view of the right side of the cartridge receiver and the cartridge just before initiation of an cartridge-eject cycle, depicting the disc mounted in operating position on the spindle.

The bias coil assembly 1-94 is mounted to a bias coil flexure 1-347, FIG. 22, which is, in turn, mounted on the bias coil arm 1-97, FIG. 21. The bias coil arm 1-97 straddles the width of the base plate 1-46 and is rotatably held by a pair of the bias coil clamps 1-100, FIG. 18, to the corner pillars 1-178 and 1-181, FIGS. 8A and 8B, of the base plate 1-46. The bias coil clamps 1-100 thus act as bearing blocks under which the bias coil arm 1-97 can rotate. The bias coil clamps 1-100 include a stop ledge 1-350, FIG. 18, which terminates the upward travel of the cartridge receiver 1-82 during an ejection operation, as discussed more fully below with reference to FIGS. 23–25. As previously discussed, the bias coil arm 1-97 includes the lever arm 1-275 in operative association with the notch 1-268 on the rearward end of the left slider 1-70 to lift and lower the bias coil assembly 1-94. Since the lever arm 1-275 engages the notch 1-268 in the left slider 1-70, the left slider 1-70 controls when the bias coil assembly 1-97 is rotated onto or off of the disc cartridge 1-13.

The bias coil assembly 1-94 may tilt or rotate about a point 1-353 near its center, and it is spring-loaded downward. In this manner, the bias coil assembly 1-94 can remain parallel to the disc cartridge 1-13 when in the down condition (i.e., the position depicted in FIG. 23, wherein the disc cartridge 1-13 is fully loaded), and when in the up condition (i.e., the position depicted in FIG. 25, wherein the disc cartridge 1-13 is unloaded). The ability of the bias coil assembly 1-94 to remain parallel to the disc cartridge 1-13 when in the up condition provides the clearance needed for the drive 1-10 to be able to complete a disk-ejection operation, as discussed below. When in the down condition and loaded in the disc cartridge 1-13, the bias coil assembly 1-94 rests on the disc cartridge 1-13 in three places.

Figure 24:
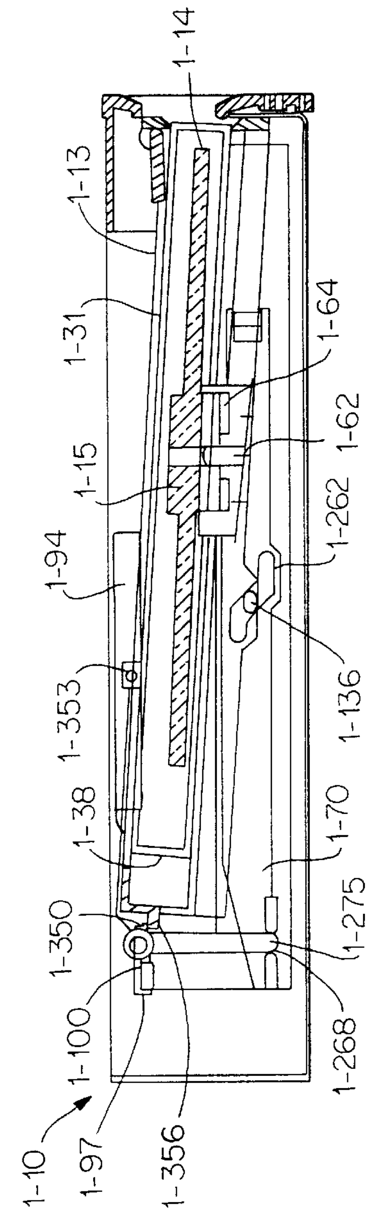
FIG. 24 is an elevational view of the right side of the cartridge receiver and the cartridge during the cartridge-eject cycle, depicting the cartridge being tipped and the disc being peeled off the spindle.

With further reference now to FIGS. 23–25, the ejection of a disc cartridge 1-13 from the disc drive 1-10 will be described. FIG. 23 depicts a disc cartridge 1-13 with the disc hub 1-15 fully loaded onto the spindle 1-62 of the spindle motor 1-61. In this configuration, the bias coil assembly 1-94 is loaded into the disc cartridge 1-13 through the open shutter 1-49. When the disc cartridge 1-13 is fully loaded in this manner, the left slider 1-70 has been slid to its most rearward position by the tiller 1-76. The lever arm 1-275 of the bias coil arm 1-97 has been rotated toward the rear of the disc drive 1-10. It is this rotation of the lever arm 1-275 which has installed the bias coil assembly 1-94 into the disc cartridge 1-13. Since the lift pins 1-136 and 1-139 of the cartridge receiver 1-82 are restrained to only vertical movement by the vertical slots 1-130 and 1-133 (FIGS. 8A and 8B), when the left slider 1-70 has been driven toward the rear of the disc drive 1-10 by the tiller 1-76, as depicted in FIG. 23, the cartridge receiver 1-82, via its lift pins 1-133 and 1-136, has been driven to the lowest point in the S-shaped slots 1-262 and 1-281.

An intermediate stage of the ejection cycle will now be described with reference to FIG. 24. After a user initiates the ejection of the disc cartridge 1-13 from the disc drive 1-10, the ejection motor 1-208, FIG. 9, rotates the tiller 1-76 in a first direction (counterclockwise in FIG. 9). This rotation of the tiller pulls the left slider 1-70 toward the front of the drive 1-10, as illustrated in FIG. 24. As the left slider 1-70 slides forward, the notch 1-268 rotates the lever arm 1-275 forward, thereby lifting the bias coil assembly 1-94 out of the disc cartridge 1-13. As may also be seen in FIG. 24, the lift pins 1-136 and 1-139, which are fixed to the cartridge receiver 1-82, are being forced up the S-shaped slots 1-262 and 1-281 by the motion of the tiller 1-76. Since the lift pins 1-136 and 1-139 are positioned on the cartridge receiver at a point where a lateral axis passing through both lift pins 1-136 and 1-139 would not also pass through the spindle 1-62, a "peeling" action for removal of the disc hub 1-15 from the spindle magnet 1-64 is achieved as the cartridge receiver 1-82 is raised. In other words, as shown in FIG. 24, the disc 1-14 is not lifted vertically from the spindle 1-62 during the ejection cycle. Rather, due to the location of the lift pins 1-136, 1-139 on the cartridge receiver 1-82, the rear portion of the disc cartridge 1-13 is lifted before the forward end of the disc cartridge 1-13 as the lift pins 1-136 and 1-139 follow their respective S-shaped slots 1-262 and 1-281. This peeling action lowers the peak force required to remove the disc hub 1-15 from the magnetic clamp 1-64 of the spindle motor 1-61.

Figure 18:
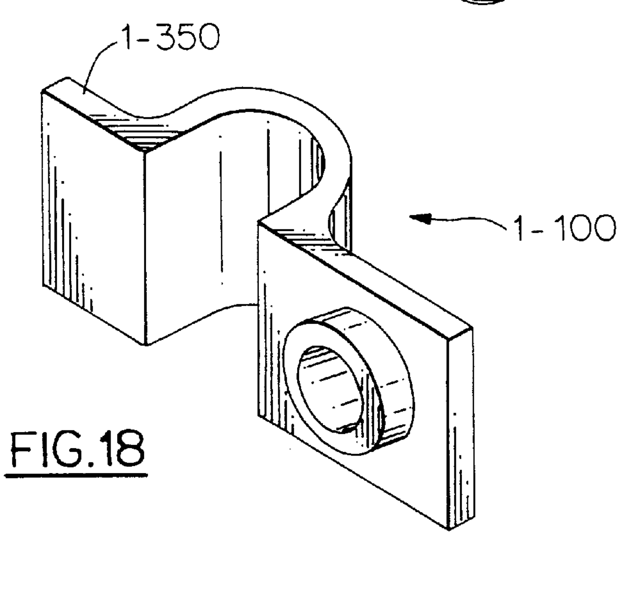
FIG. 18 is an isometric view of a bias coil assembly clamp.
Figure 19:
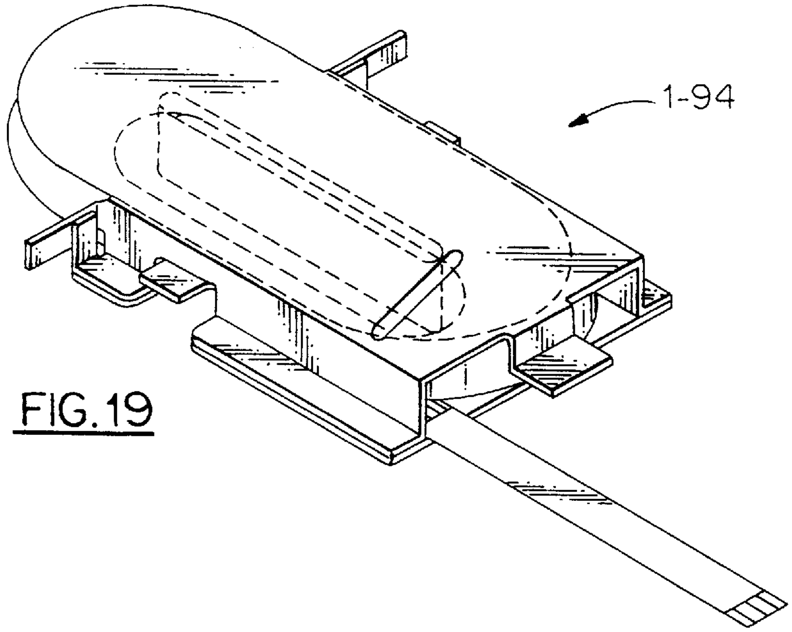
FIG. 19 is an isometric view of a bias coil assembly.
Figure 20:
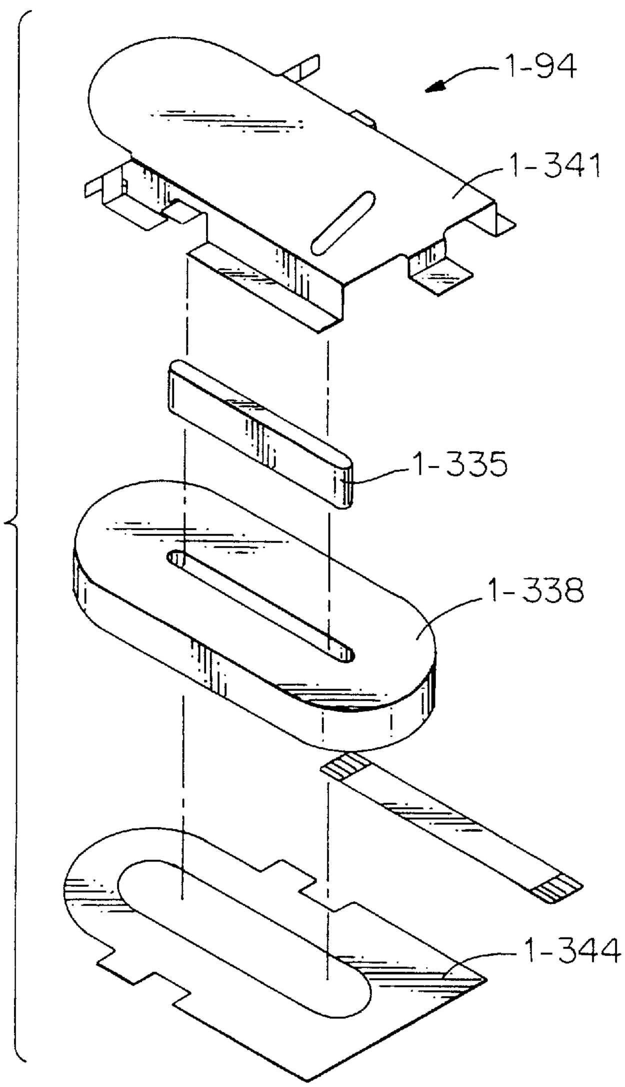
FIG. 20 is an exploded isometric view of the major components comprising the bias coil assembly.

Referring still to FIG. 24, it is apparent that after the cartridge receiver 1-82 has been lifted a predetermined amount by the motion of the sliders 1-70 and 1-73, a lip 1-356, FIG. 15A, on the rear wall 1-317 of the cartridge receiver 1-82 impacts the lower surface of the stop ledge 1-350, FIG. 18, on the bias coil clamps 1-100. This contact between the bottom surface of the stop ledge 1-350 and the top surface of the lip 1-356, in conjunction with the continued rotation of the tiller 1-76 and the resulting longitudinal motion of the sliders 1-70 and 1-73, causes the cartridge receiver 1-82 to pitch slightly upward in FIG. 24. This occurs substantially about the point of contact between the stop ledge 1-350 and the lip 1-356, as the lift pins 1-136, 1-139 continue to pick up the receiver. This slight pitching motion of the cartridge receiver 1-82 effects the "peeling" action referred to above.

FIG. 25 depicts the configuration of the disc drive 1-10 after the slight upward pitching of the cartridge receiver 1-82 is complete and the cartridge receiver 1-82 has impacted the stops adjacent to the disc receiving port 1-22. At this point, the left slider 1-70 has reached its furthest forward position and has pulled the lever arm 1-275 to its furthest forward position, thereby rotating the bias coil assembly 1-94 out of the disc cartridge 1-13. The bias coil assembly is thus parked parallel to and above the disc cartridge 1-13, substantially against the inside of the top surface of the disc drive 1-10 or substantially against a printed circuit board located against the inside of the top surface of the disc drive 1-10. The bias coil assembly 1-94 travels vertically preferably about 9 mm from its loaded position in the disc cartridge 1-13 to its just-described raised position.

Figure 17A:
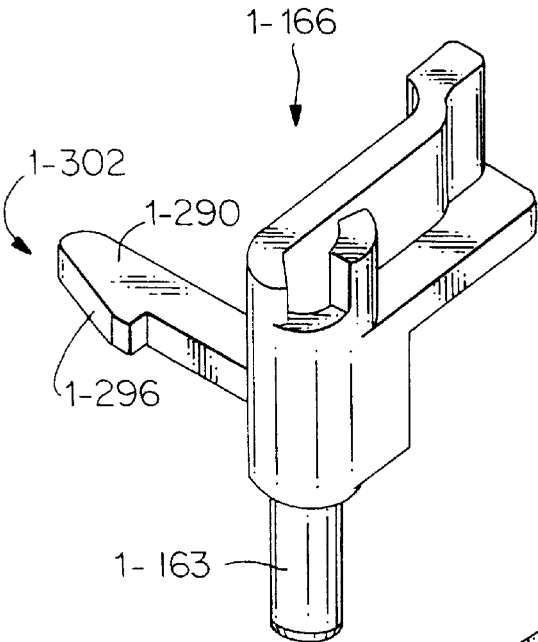
FIGS. 17A and 17B are isometric views of a latch that holds the cartridge receiver in the up position.
Figure 17B:
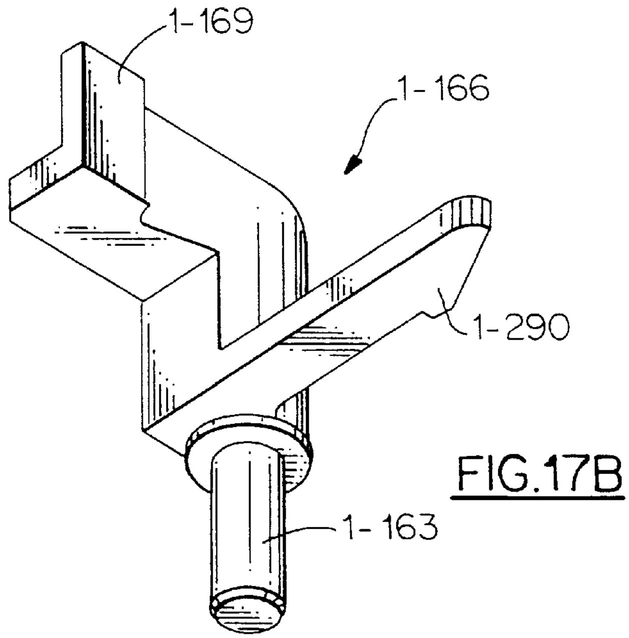

As the cartridge receiver 1-82 is raised to its highest position (about 5 mm above its lowest position), the right slider 1-73 of FIGS. 12A–12E is latched in its rear-most position by the receiver latch 1-166, FIGS. 17A and 17B, as fully described above. When the cartridge receiver 1-82 is in the up position depicted in FIG. 25, the cartridge receiver 1-82 is positioned parallel to the base plate 1-46, ready for the cartridge 1-13 to be ejected. The spring force of the door links 1-85 and 1-88, which are biased toward the forward end of the disc drive 1-10 as described above, and the spring force of the cartridge shutter 1-49, which is biased toward a closed position, cause the disc cartridge 1-13 to be ejected from the disc drive 1-10, as shown in FIG. 25.

The disc loading process is essentially the reverse of the above described ejection process. Therefore, a detailed description of the disc insertion process will not be provided.

In the present invention, where the disc hub 1-15 is peeled from the spindle magnet 1-64, the required ejection force is effectively reduced by the manner in which the disc 1-14 is moved from the loaded position to the unloaded position. Through the use of the "peeling" motion employed in accordance with this invention, a smaller force is required to remove the disc hub 1-15 than is required in conventional, vertical-lifting systems. In addition, the design conserves overall drive height. The above-described design accomplishes the peeling of the disc hub 1-15 from the spindle magnet 1-64 with a mechanism that uses available space at the sides of the drive 1-10, rather than requiring parts that straddle the width of the base plate 1-46 to tie the motion of both sides of a cartridge receiver 1-82 together and using additional height to do so. Another advantageous feature of the design is the noncritical nature of most of the dimensions required. Further, the bias coil actuating mechanism that loads the bias coil assembly into the cartridge 1-13 is simple and has a minimum number of wear points. The entire design is easy to assemble and for the most part, can be manufactured using simple and easy to fabricate parts.

While what has been described above is a preferred embodiment of this invention, it will be obvious to those skilled in the art that numerous changes may be made without departing from the spirit or scope of the invention. For example, the present invention may be used for media systems which do not require the bias coil assembly 1-94 (i.e., phase change or write once systems), by eliminating the parts used to operate the bias coil arm 1-97. In addition, although in the preferred embodiment the storage media is a 5¼ inch magneto-optic disc cartridge, the present invention is applicable to all types of media and all sizes of drives.

Two-Axis Moving Coil Actuator

Figure 26:
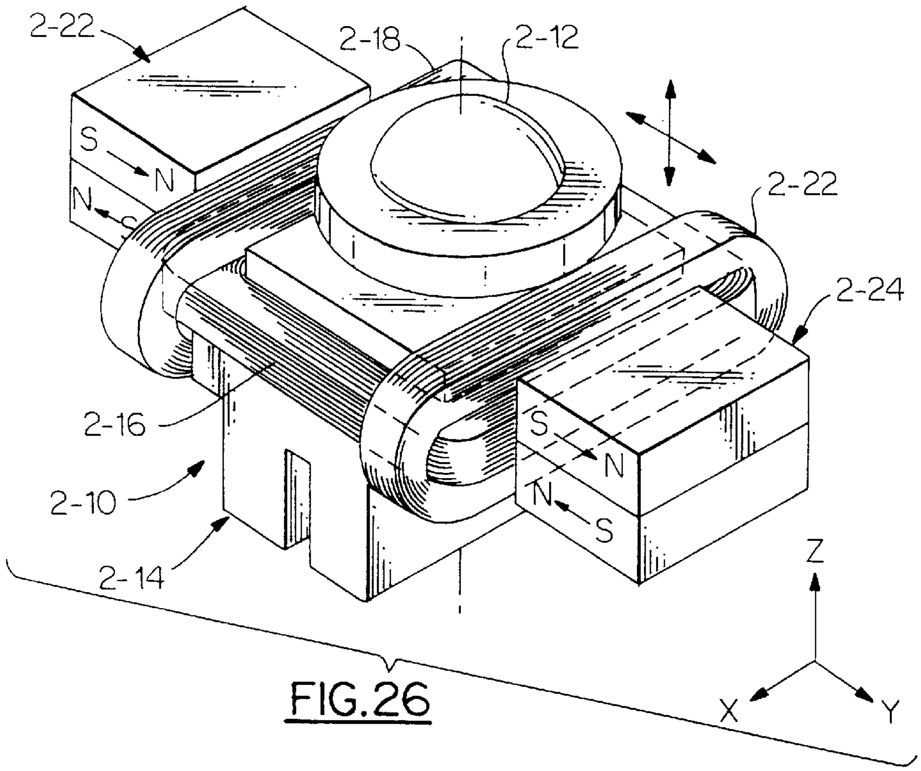
FIG. 26 is a schematic perspective view of an actuator in accordance with the present invention.

FIG. 26 schematically illustrates a two-axis electromagnetic actuator 2-10 constructed in accordance with the present invention. The actuator 2-10 includes an objective lens 2-12 positioned within a lens holder 2-14. A radial or tracking coil 2-16 is wound around and affixed to the lens holder 2-14 so as to be generally positioned perpendicular to the Z axis. First and second focus coils 2-18 and 2-20 are positioned at the sides of the lens holder 2-14 and are affixed to the tracking coil 2-16 so as to be generally positioned perpendicular to the Y axis. A first pair of permanent magnets 2-22 is positioned adjacent the first focus coil 2-18 and a second pair of permanent magnets 2-24 is positioned adjacent the second focus coil 2-20.

Figure 27:
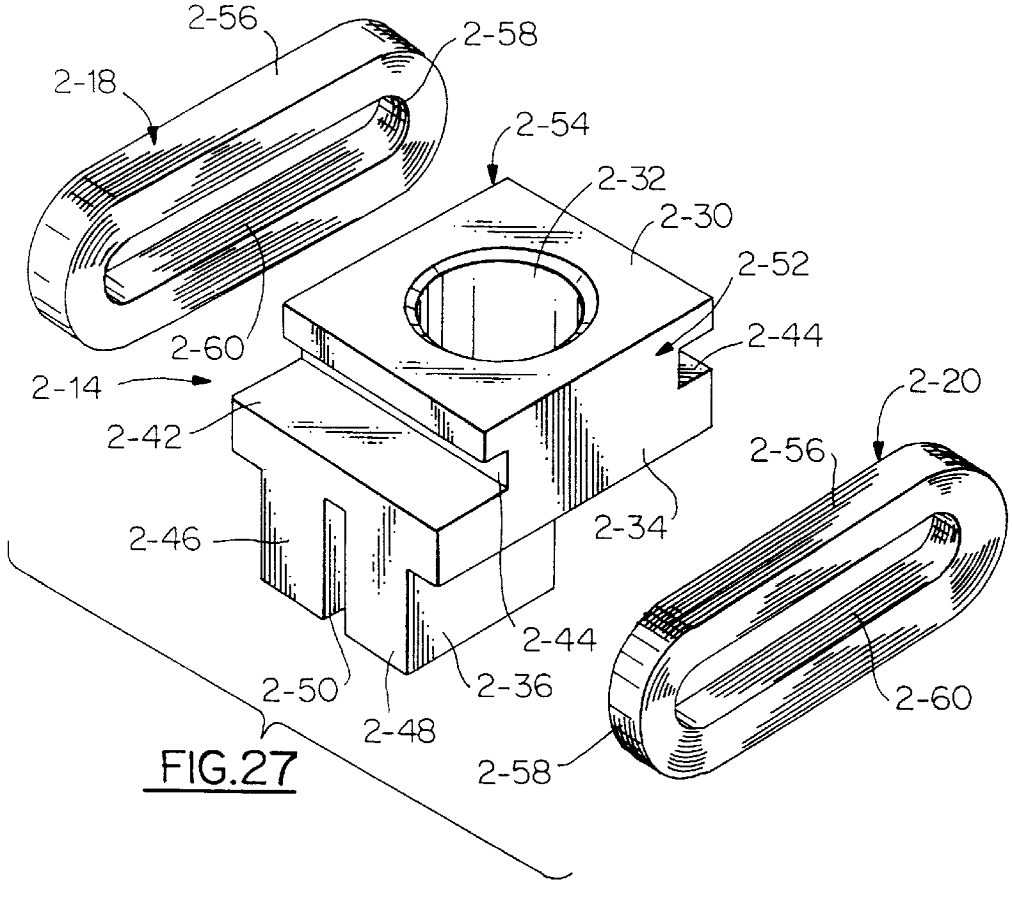
FIG. 27 is a perspective view of the lens holder for the actuator of FIG. 26.

As shown in FIG. 27, the lens holder 2-14 includes a generally rectangular collar 2-30 having a circular aperture 2-32 centered therein. The objective lens 2-12 is glued into position on top of the circular aperture 2-32 in the collar 2-30. The collar 2-30 is supported by a generally I-shaped platform 2-34 having a pair of grooves 2-44 formed at the edges thereof to align and secure the tracking coil 2-16 therein when it is wound around the platform. A base 2-36 supporting the platform 2-34 includes first and second T-shaped sections 2-46 and 2-48 having a slot 2-50 formed therebetween. As will be explained in more detail below, this base 2-36 acts as a mass balance for the lens holder 2-14. The collar 2-30, platform 2-34, and base 2-36 are aligned on two sides to form first and second opposing faces 2-52 and 2-54 of the lens holder.

The focus coils 2-18 and 2-20 are affixed to the tracking coil 2-16 such that the central axes of the focus coils are coincident, intersect, and preferably perpendicular to the central axis of the tracking coil. The focus coils 2-18 and 2-20 are preferably formed from thermally bonded wire having a bond material layer thereon and are preferably wound on a suitable tool or support. The coils 2-18 and 2-20 are preferably wound around the support as tight as possible without deforming the wire. As those skilled in the art will appreciate, this tightness will vary with the type of wire. During the winding process, the focus coils 2-18 and 2-20 are preferably heated to melt the bond material layer on the wire, advantageously increasing the solidity and rigidity of the wound coils. The temperature is advantageously selected so as to be high enough to melt the bond material, but not so high as to melt the insulation. After cooling, the coils 2-18 and 2-20 are removed from the support and these freestanding coils are then affixed to the tracking coil 2-16 in a well-known manner using a suitable adhesive.

Each freestanding focus coil 2-18 and 2-20 is oval in shape and has two elongate sides 2-56 joined by a pair of shorter ends 2-58. The sides 2-56 and ends 2-58 of the coils 2-18 and 2-20 surround an open or hollow annular center 2-60. The tracking coil 2-16 is wound around the I-shaped platform 2-34 of the lens holder 2-14 such that the coil is received by and secured within the grooves 2-44 and positioned against the opposed faces 2-52 and 2-54 of the lens holder. Referring to both FIG. 26 and FIG. 27, the two focus coils 2-18 and 2-20 are affixed to the tracking coil 2-16 such that the tracking coil is positioned within the center 2-60 of each focus coil. The focus coils 2-18 and 2-20 are further positioned such that each coil abuts the opposed faces 2-52 and 2-54 of the lens holder 2-14. In this manner, the tracking coil 2-16 and focus coils 2-18 and 2-20 are rigidly secured to the lens holder 2-14, thereby creating a more rigid driven unit that behaves as a single lumped mass.

Figure 31:
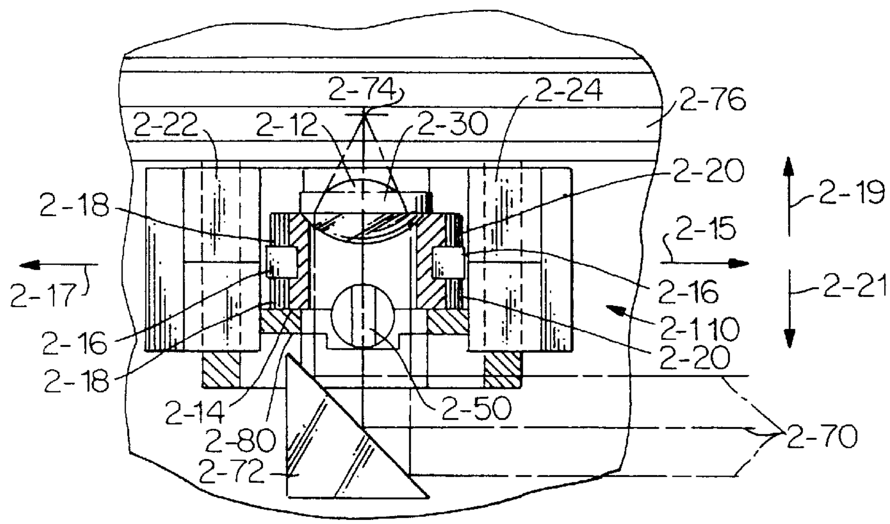
FIG. 31 is a front elevational view of the recording system of FIG. 28.

Referring to FIGS. 28, 29, 30, and 31, in operation, a light source element (not shown), typically a laser diode, emits a laser light beam 2-70, FIG. 31. The beam 2-70 is incident upon a prism 2-72 which orthogonally reflects the light beam upward toward the objective lens 2-12. The lens 2-12 converges the beam 2-70 to a precise focal point or optical spot 2-74 on the surface of a recording medium, such as an optical disc 2-76. Upon striking the disc 2-76, the light beam 2-70 is altered by the information stored on the disc 2-76 and is reflected as a divergent light beam carrying information identical to that encoded on the disc 2-76. This reflected beam re-enters the objective lens 2-12 where it is collimated and is again reflected by the prism 2-72 to a photodetector (not shown) which detects the data stored on the disc 2-76. In addition, if the light beam falling on the photodetector is out of focus or misaligned, the amount of misalignment or defocusing is measured electronically and used as feedback for a servo system (not shown) well-known in the art which properly realigns the objective lens 2-12 relative to the disc 2-76.

It is these feedback signals which determine the amount and direction of movement of the actuator 2-10 and objective lens 2-12 carried thereon needed to bring the light beam into the desired focus condition with respect to the disc 2-76. When radial or tracking movement is required to position the objective lens 2-12 beneath the center of a selected track on the optical disc 2-76, current is applied to the tracking coil 2-16. The current interacts with the magnetic field produced by the permanent magnet pairs 2-22 and 2-24 to produce forces which move the actuator 2-10 in the tracking direction. The forces are generated according to the Lorentz law $F=B \cdot X \cdot I \cdot 1$, wherein F represents the force acting on the tracking coil 2-16, B represents the magnetic flux density of the magnetic field between the permanent magnet pairs 2-22 and 2-24, I represents the current through the tracking coil 2-16, and 1 represents the length of the coil 2-16. When the current I applied to the tracking coil 2-16 travels through the coil in a counterclockwise direction, relative to the orientation of FIG. 29, a force is produced which moves the actuator 2-10 to the right. This rightward movement is indicated in FIG. 31 by arrow 2-15. When the current applied to the coil 2-16 travels through the coil in the opposite, or clockwise direction, a force is produced which moves the actuator 2-10 to the left as indicated in FIG. 31 by arrow 2-17. In this manner, the actuator 2-10 is moved radially to position the objective lens 2-12 beneath the center of a desired information track on the surface of the optical disc 2-76.

Movement of the actuator 2-10 to effect focusing is produced when current is generated in the two focus coils 2-18 and 2-20 affixed to the tracking coil 2-16 at the sides of the lens holder 2-14. When the current through these coils 2-18 and 2-20 is applied so that the current travels in a counterclockwise in the plane of FIG. 30, a force is produced which acts to move the lens holder 2-14 and objective lens 2-12 upward, as shown by arrow 2-19 in FIG. 31, towards the surface of the optical disc 2-76. Conversely, when current is applied such that current travels through the coils 2-18, 2-20 in a direction clockwise in the plane of FIG. 30, a force is produced which moves the lens holder 2-14 downward, as shown in FIG. 31 by the arrow 2-21, or farther away from the surface of the disc 2-76.

Because the tracking coil 2-16 is coupled to the lens holder 2-14, and, in turn, the focus coils 2-18 and 2-20 are coupled directly to the tracking coil 2-16, the coils and lens holder behave as a "lumped mass" and the frequencies at which the coils decouple with respect to the lens holder are significantly increased. Decoupling frequencies of up to 30 kHz have been measured with the actuator design of the present invention.

Figure 28:
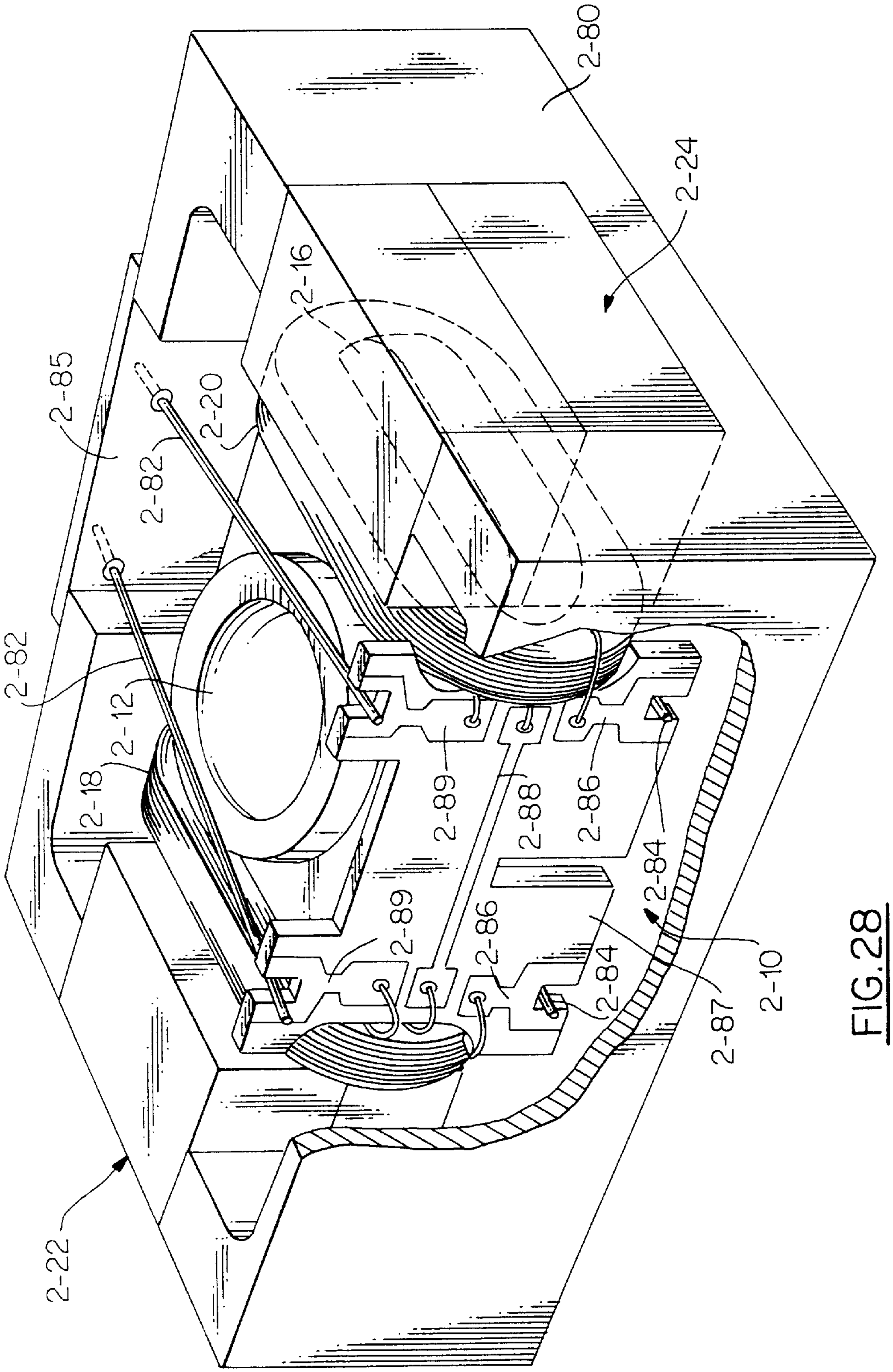
FIG. 28 is a perspective view of the actuator of FIG. 26 within a magnetic field housing as employed in conjunction with a recording system.
Figure 29:
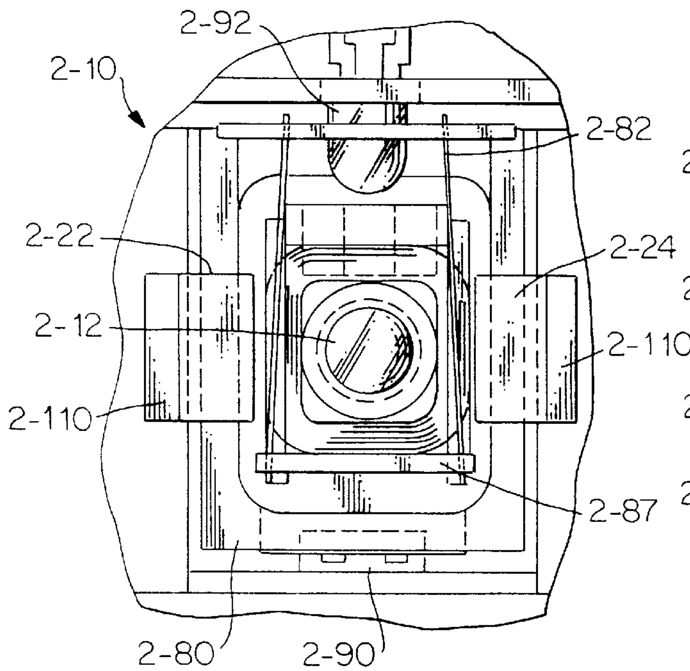
FIG. 29 is a top plan view of the recording system of FIG. 28.
Figure 30:
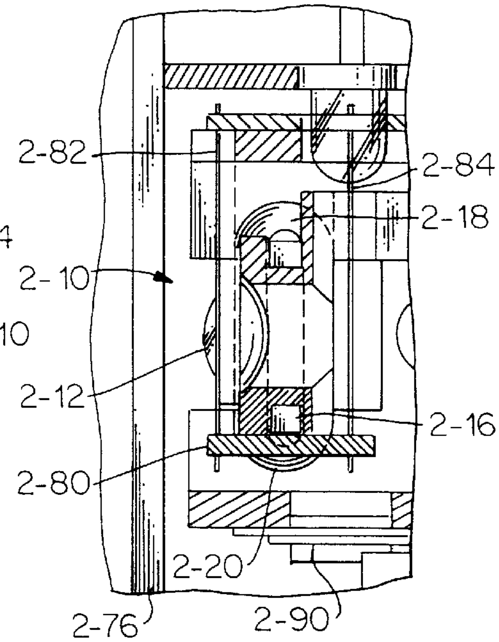
FIG. 30 is a right side elevational view of the recording system of FIG. 28.

With reference now to FIGS. 28 and 29, the magnet pairs 2-22 and 2-24, remain stationary during movement of the lens holder 2-14 and are affixed within a generally rectangular housing or base 2-80. Two pairs of suspension wires 2-82 and 2-84 are provided to suspend the objective lens holder 2-14 between the magnet pairs 2-22 and 2-24. The wire pairs 2-82 and 2-84 are attached to a stationary printed circuit board 2-85 which is positioned vertically with respect to the lens holder 2-14 and acts as a support for the wire pairs 2-82 and 2-84. The wire pairs 2-82 and 2-84 are further attached to electrical contacts on a moving circuit board 2-87 which is attached to the lens holder 2-14, again in a vertical orientation. In particular, a free end of each focus coil 2-18 and 2-20 is soldered to electrical contacts 2-86 such that current is supplied to the focus coils 2-16 and 2-18, through the second or bottom wire pair 2-84 which is also soldered to the contacts 2-86. The other free end of each focus coil 2-18 and 2-20 is soldered to the circuit board 2-87 and joined along an electrical contact 2-88. The free ends of the tracking coil 2-16 and the first or top suspension wire pair 2-82 are soldered to electrical contacts 2-89 on the moving circuit board 2-87 such that current is supplied to the coil through the top pair of wires. The base 2-36 of the lens holder 2-14 acts as a mass balance by offsetting the weight of the objective lens 2-12 and the circuit board 2-87 to which the lens holder 2-14 is attached.

Alternatively, four flexures could be used to suspend the lens holder 2-14. The flexures would desirably act as parallel leaf springs which permit the objective lens holder 2-14 to move up-and-down for focusing while prohibiting changes in the orientation of the optical axis of the lens 2-12. In this manner, the objective lens 2-12 will not be canted with respect to the surface of the optical disc 2-76 as the lens holder 2-14 is moved in the focusing direction. Each flexure further includes narrow portions which operate as a hinge so as to allow some movement of the lens holder 2-14 in a side-to-side direction for tracking adjustments.

In addition to accomplishing fine focusing and tracking movements of the lens holder 2-14, it is often desirable to detect the position of the lens holder 2-14 with respect to the base 2-80. To ascertain the position of the objective lens 2-12 in both a tracking and/or a focusing direction, the actuator 2-10 is equipped with a position sensor 2-90. Preferably, a light emitting diode (LED) 2-92 is positioned on one side of the actuator 2-10, opposite the sensor 2-90, such that when the objective lens holder 2-14 is centered within the base 2-80, light emitted by the LED 2-92 will shine through the slot 2-50 in the lens holder 2-14 to illuminate a portion of the sensor 2-90. A position sensitive detector is advantageously implemented as the sensor 2-90 and the sensor is positioned such that when the lens holder 2-14 is centered within the base 2-80, light emitted by the LED 2-92 will pass through the slit 2-50 and will be distributed on the detector. Thus, as the lens holder 2-14 moves in a side-to-side direction, i.e., the tracking direction, various portions of the sensor 2-90 will be illuminated, indicative of the position of the lens holder 2-14 in the tracking direction. Consequently, when the lens holder 2-14 is not centered with respect to the base 2-80, a portion of the light emitted from the LED 2-92 will be blocked by the lens holder 2-14, causing an unequal distribution of light on the sensor 2-90. This unequal distribution may then be analyzed to determine the position of the lens holder 2-14 with respect to the base 2-80 by well-known circuitry and methods.

When a control signal is generated by the servo system, a given current is applied to the tracking coil 2-16 and/or the focus coils 2-18 and 2-20 depending on the direction in which the displacement of the lens holder 2-14 and objective lens 2-12 attached thereto is required. Such servo systems and feedback circuits which control the amount of current are well known in the art. As discussed above, this current interacts with the electromagnetic field produced by the permanent magnet pairs 2-22 and 2-24 to create a force which displaces the lens holder 2-14 and objective lens 2-12 attached thereto in the appropriate focusing or tracking direction.

The operation and structure of the focus and tracking mechanism will now be described in greater detail. As illustrated in FIGS. 32 and 33, the permanent magnet pairs 2-22 and 2-24, are oriented with opposite poles opposing each other. More specifically, the first pair of magnets 2-22 includes a first or top magnet 2-100 and a second or bottom magnet 2-102 in a stacked relationship joined along a planar interface, such that the north pole of the top magnet 2-100 and the south pole of the bottom magnet 2-102, as represented in FIG. 33, are positioned adjacent the lens holder 2-14. The second pair of magnets 2-24 includes a third or top magnet 2-104 and a fourth or bottom magnet 2-106 in a stacked relationship joined along a planar interface having the opposite orientation, such that the south pole of the top magnet 2-104 and the north pole of the bottom magnet 2-106, as represented in FIG. 33, are positioned adjacent the lens holder 2-14. As shown in FIG. 32, the field lines produced by this orientation originate at the north pole of each magnet pair 2-22 and 2-24, and terminate at the south pole of each magnet pair. Iron plates 2-110 (shown in phantom for clarity) may be attached to each magnet pair 2-22 and 2-24 on the sides of the permanent magnets opposite the lens holder 2-14. The iron plates 2-110 effectively "shunt" the magnetic flux emanating from the sides of the magnets 2-100, 2-102, 2-104, and 2-106 opposite the lens holder 2-14, thereby increasing the magnetic flux adjacent the lens holder and producing a corresponding increase in actuator power.

Figure 34:
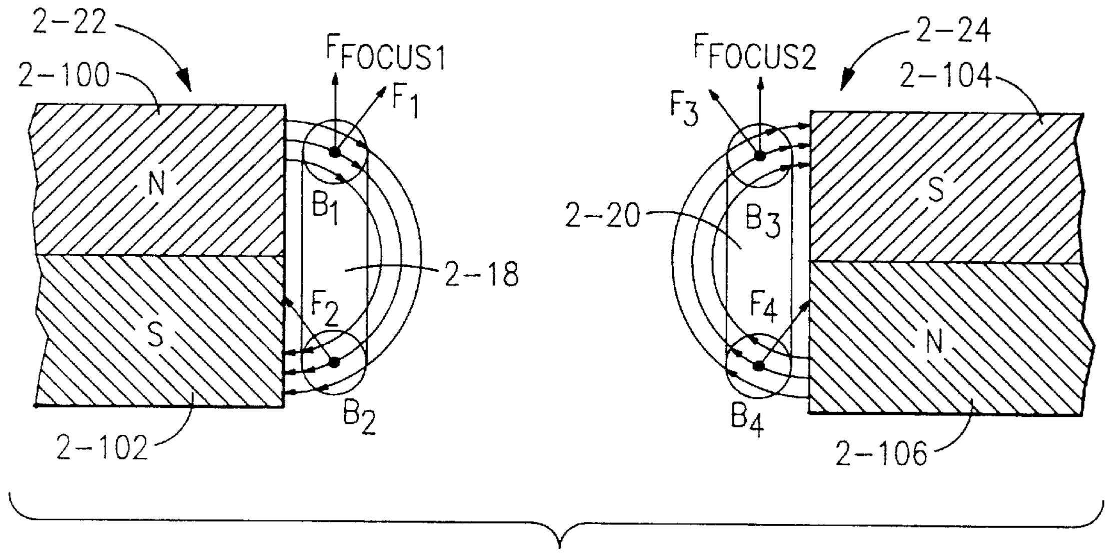
FIG. 34 is a schematic cross-sectional view of the focus coils and permanent magnets of the actuator of FIG. 26 taken along section lines 34—34 of FIG. 33 illustrating the focus forces acting on the actuator.

The focus forces acting on the actuator 2-10 are illustrated in more detail in FIG. 34. When a current I is applied to the focus coils 2-18 and 2-20 in the direction indicated, i.e., out of the plane of the drawing sheet adjacent the top magnets 2-100, 2-104 and into the plane of the drawing sheet adjacent the bottom magnets 2-102 and 2-106, forces $F_{FOCUS1}$ and $F_{FOCUS2}$ are generated which are translated to the lens holder 2-14 to accelerate or decelerate the moving mass (lens holder) and to the suspension wire pairs 2-82 and 2-84, bending the suspension wires to move the lens holder 2-14 and associated objective lens 2-12 closer to the optical disc 2-76. Because the lines of magnetic flux curve as described above, the direction of the magnetic field varies vertically in the focus coils 2-18, 2-20. For example, for the focus coil 2-18 positioned adjacent the first magnet pair 2-22, in the plane of FIG. 34 which vertically bisects the coil adjacent the top magnet 2-100, the magnetic field has a first direction at the top of the coil 2-18 given by $B_1$, and a second direction in the bisecting plane adjacent the bottom magnet 2-102 at the bottom of the coil 2-18 given by $B_2$. In accordance with the Lorentz law $F=B \cdot X \cdot I \cdot 1$, the current interacts with the magnetic field B1 to produce a first force component F1 acting on the portion of the focus coil 2-18 adjacent the top magnet 2-100, and interacts with the magnetic field B2 to produce a second force component F2 acting on the portion of the focus coil adjacent the bottom magnet 2-102. As the magnitude of the horizontal portions of the force components F1 and F2 are equal in magnitude but opposite in direction, these horizontal force components cancel one another in accordance with the rules of vector addition to produce the resultant force $F_{FOCUS1}$ which is vertically upward in the plane of FIG. 34. Similarly, the horizontal force components throughout the rest of the coil 2-18 are canceled, giving a vertical resultant force which is strictly vertically upward (i.e., is vertically upward and has effectively no horizontal component) and therefore moves the lens holder 2-14 closer to the surface of the optical disc 2-76.

As the lines of flux generated by the second magnet pair 2-24 curve oppositely of those generated by the first magnet pair 2-22, the direction of the magnetic field at any point in the focus coil 2-20 is different than the direction of the field at the corresponding point in the focus coil 2-18. Again, because the flux lines curve, the direction of the field acting on the coil 2-20 varies vertically along the coil. In the plane of FIG. 34 which vertically bisects the coil adjacent the top magnet 2-104 of the second magnet pair 2-24, the magnetic field direction is given by $B_3$ at the top of the coil 2-20 and a force is generated in accordance with Lorentz law in the direction $F_3$, while in the bisecting plane adjacent the bottom magnet 2-106, the magnetic field direction is given by $B_4$ at the bottom of the coil 2-20 and a force $F_4$ is generated. The forces add to produce a resultant force $F_{FOCUS2}$, which, as shown, is strictly vertically upward.

Thus, it can be seen that the forces $F_{FOCUS1}$ and $F_{FOCUS2}$, act on the focus coils 2-18 and 2-20, respectively, to move the lens holder 2-14 upward. Conversely, if the current was applied to the focus coils 2-18 and 2-20, in the opposite direction, forces would be generated to move the lens holder 2-14 downward, or farther away from the surface of the optical disc 2-76. By moving the objective lens 2-12 closer to or farther away form the surface of the optical disc 2-76, the focus coils 2-18 and 2-20 act to precisely focus the laser beam exiting the objective lens 2-12 on the disc 2-76.

Figure 35:
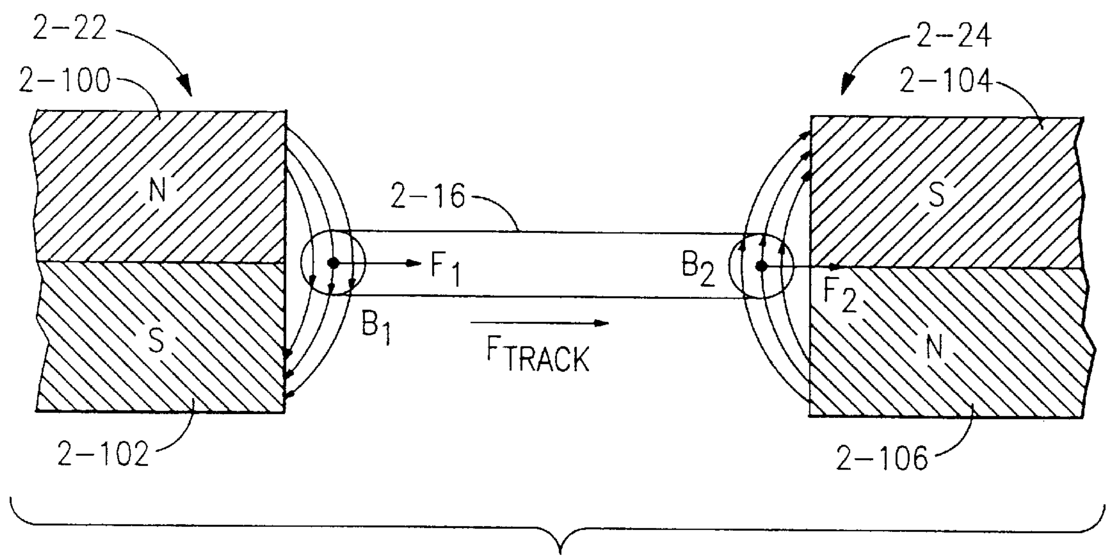
FIG. 35 is a schematic cross-sectional view of the tracking coil and permanent magnets of the actuator of FIG. 26 illustrating the tracking forces acting on the actuator.

As illustrated in FIG. 35, movement of the actuator 2-10 to effect fine tracking is produced when current is generated in the tracking coil 2-16 affixed to the lens holder 2-14. In the plane of FIG. 35 which horizontally bisects the tracking coil 2-16, a magnetic field having direction B1 acts on the cross-section of the coil 2-16 located closest to the first magnet pair 2-22 and a magnetic field having the direction B2 acts on the cross-section of the coil located closest to the second magnet pair 2-24. If, for example, a current I is applied in a counterclockwise direction around the tracking coil 2-16, a force F1 acts on the portion of the tracking coil adjacent the first magnet pair 2-22 and a force F2 acts on the portion of the tracking coil adjacent the second magnet pair 2-24. These forces add under the laws of vector addition to produce a resultant force $F_{TRACK}$ which acts to move the lens holder 2-14 to the right in the plane of FIG. 35. When the forces act on the tracking coil 2-16 in this manner, they are translated through the lens holder 2-14 to accelerate or decelerate the moving mass (lens holder), and into the suspension wire pairs 2-82 and 2-84 which bend in the corresponding direction to move the objective lens 2-12 and precisely center the laser beam exiting therefrom within the center of a selected data track on the surface of the optical disc 2-76. Conversely, if a current I is applied in a clockwise direction around the coil 2-16, a resultant force is produced which moves the lens holder 2-14 to the left in the plane of the FIG. 35.

Thus, it can be seen that the coupling arrangement of the present invention further reduces the distance between the resultant forces acting on the coils 2-16, 2-18, and 2-20 and the optical axis of the objective lens 2-12, decreasing adverse modes of motion such as pitch, roll, and yaw during focusing and tracking operations.

With the actuator design of the present invention, only two pair of permanent magnets, i.e., four total magnets, and three coils are required to effect movement in both the tracking and focusing directions, thereby reducing both the size and weight of actuator and yielding higher decoupling frequencies. As the component count for the actuator is low, the actuator is easy to manufacture and assemble as compared to prior actuator designs having many more coils, magnets, and pole pieces. In addition, because the tracking and focus coils 2-16, 2-18, and 2-20 are coupled directly to the lens holder 2-14 and are not wound around yokes or poles, coil rigidity and resonance frequency response is significantly improved. Furthermore, direct coupling of the coils 2-16, 2-18, and 2-20, reduces the distance between the point where the effective tracking and focus forces are generated and the optical axis of the objective lens, thereby decreasing adverse motions such as pitch, roll, and yaw.

The present invention improves motor performance. Values of merit as high as 130 $m/s^2$/sq. rt. (W) for the focus direction and 70 $m/s^2$/sq. rt. (W) for the radial direction have been measured for actuators constructed in accordance with the present invention. These values are significantly higher than previously realized. As those skilled in the art will recognize, the design of the present invention also ensures that approximately 40% of the coil wire is utilized, thereby increasing the efficiency of the actuator over prior designs.

The preferred embodiment of the two-axis electromagnetic actuator 2-10 has been described with reference to the coordinate system illustrated in FIG. 26 wherein the optical disc 2-76 is positioned above the objective lens 2-12 such that focusing is effected by moving the actuator 2-10 up and down along the Z-axis and tracking movement is effected by moving the actuator in a side-to-side motion along the Y-axis. Those skilled in the art will recognize, however, that the actuator 2-10 of the present invention could also be incorporated in optical systems having different orientations than those illustrated.

Focus Sensing Apparatus

Figure 36:
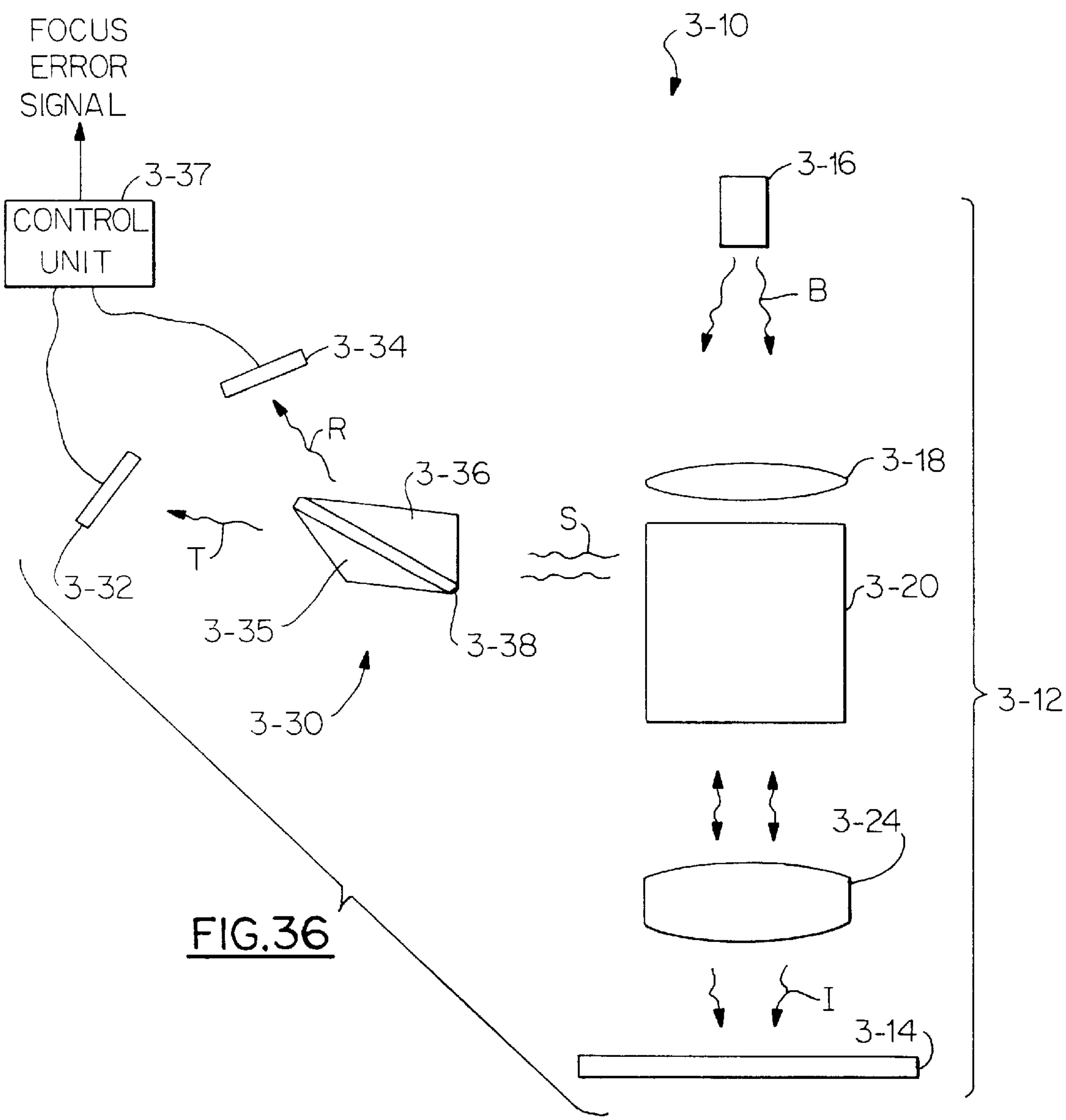
FIG. 36 is a block diagrammatic presentation of a preferred embodiment of the beam focus sensing apparatus of the present invention.

FIG. 36 is a block diagrammatic representation of a preferred embodiment of the beam focus sensing apparatus 3-10 of the present invention. The apparatus 3-10 includes an optical arrangement 3-12 for providing a servo beam S indicative of the focus of an illuminating beam I upon an optical disc 3-14. The servo beam S comprises a portion of the illuminating beam I reflected by the disc 3-14. Techniques for generating such a servo beam are well known to those skilled in the art. For example, an optical system such as the optical arrangement 3-12 for generating the servo beam S is described in U.S. Pat. No. 4,862,442, which is herein incorporated by reference. A brief summary of the operation of the optical arrangement 3-12 is set forth below.

As shown in FIG. 36, the optical arrangement 3-12 includes a laser source 3-16 which generates a linearly polarized beam B. The beam B is collimated by a collimating lens 3-18, and the collimated beam is directed by an optical beamsplitting arrangement 3-20 to an objective lens 3-24. The collimated beam is then converged by the objective lens 3-24 onto the surface of the optical disc 3-14. The optical disc may, for example, comprise a compact disc, video disc, or optical memory disc. The disc 3-14 reflects the illuminating beam focused thereon back through the objective lens 3-24 to the beamsplitting arrangement 3-20. Those skilled in the art will appreciate that the beamsplitting arrangement 3-20 may include a first beamsplitter (not shown) to redirect a first portion of the reflected illuminating beam in order to form the servo beam S. The beamsplitting arrangement 3-20 will also generally include a second beamsplitter (not shown) to redirect a second portion of the reflected illuminating beam to create a data beam. Such a data beam carries information stored on the optical disc 3-14. The servo beam S is intercepted by an FTR prism 3-30, the design and construction of which is discussed more fully hereinafter.

As is also described more fully below, the servo beam S is divided into a transmitted beam T and a reflected beam R by the FTR prism 3-30. In the embodiment of FIG. 36, the transmitted and reflected beams T and R are of substantially equal cross section and intensity. The transmitted beam T is incident on a first quad detector 3-32, while the reflected beam R is incident on a second quad detector 3-34. Electrical signals produced by the quad detectors 3-32 and 3-34 in response to the intensity distributions of the transmitted and reflected beams T and R, are utilized by a control unit 3-37 to generate a differential focus error signal (DFES) indicative of the focus of the illuminating beam I on the disc 3-14. One preferred embodiment of the control unit 3-37 and associated method for generating the DFES is discussed hereinafter. The focus error signal may, for example, be used to control a mechanical arrangement (not shown) disposed to adjust the focus of the illuminating beam I by altering the displacement of the objective lens 3-24 relative to the disc 3-14.

Figure 37:
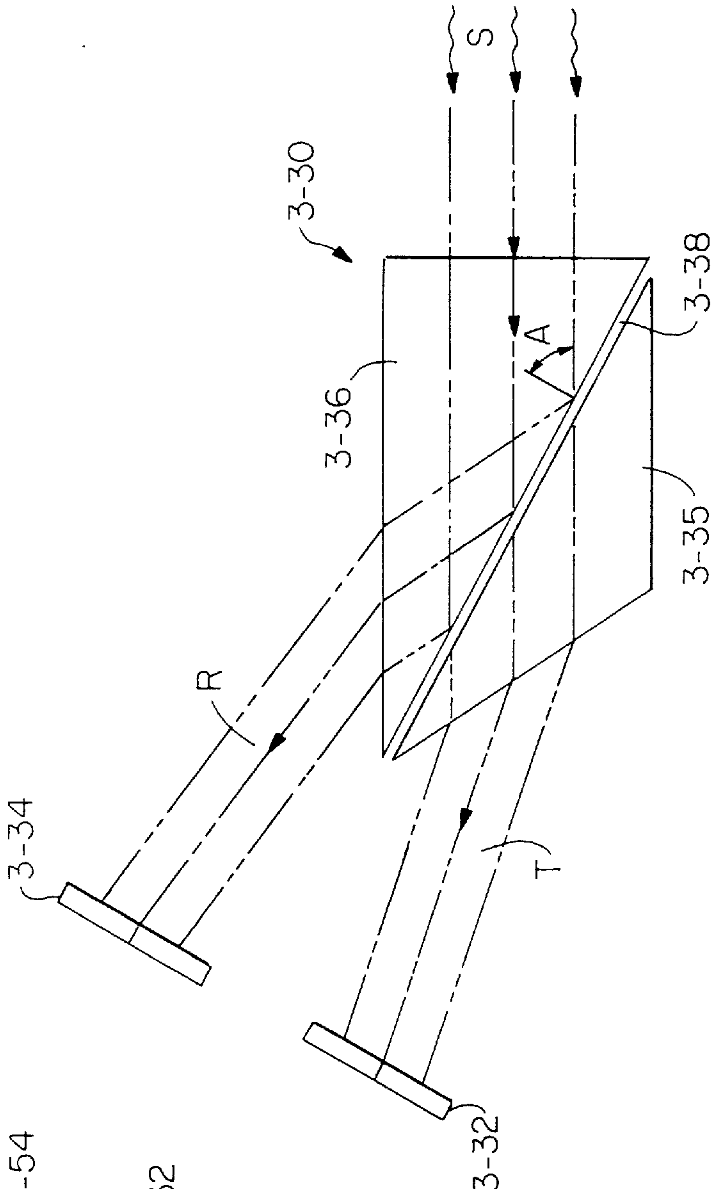
FIG. 37 is a magnified top cross-sectional view of a differential version of the inventive beam separation module (FTR prism)

FIG. 37 shows a magnified top cross-sectional view of the FTR prism 3-30. The prism 3-30 includes first and second optical members 3-35 and 3-36 which sandwich a separation layer 3-38. The optical members 3-35 and 3-36 may be formed from glass having an index of refraction larger than that of the separation layer 3-38. For example, in one preferred embodiment, the optical members 3-35 and 3-36 may be manufactured from glass having an index of refraction of 1.55, while the separation layer 3-38 is composed of a solid such as either magnesium fluoride ($MgF_2$) or fused silica ($SiO_2$) having indices of refraction of 1.38 and 1.48, respectively. The separation layer 3-38 need not consist of a solid, and may be formed from a liquid or air provided that the optical members 3-35 and 3-36 are of a larger index of refraction.

A brief description of the physics of the interaction of the light in beam S with layer 3-38 is as follows. If layer 3-38 and optical member 3-35 are not present, the well-known phenomenon of total internal reflection takes place at the hypotenuse face of optical member 3-36, sending all of beam S in the direction of beam R. However, some light energy exists behind the hypotenuse face of optical member 3-36 in the form of "evanescent waves", which do not propagate. When optical member 3-35 is brought close enough to optical member 3-36, this energy is coupled without loss into member 3-35 and propagates in the direction of beam T. This phenomenon is known as frustrated total reflection (FTR). In this condition, if the FTR prism is disposed with respect to beam S such that the incidence angle A of beam S at separation layer 3-38 is close to the region of frustrated total reflection, the transmission and reflection curves will have very steep slopes (angular sensitivities). This allows the fabrication of a very sensitive focus sensing system. Furthermore, the transmission and reflection curves for such a system based on the FTR principle will be relatively insensitive to the wavelength of the light in beam S, as compared to the curves of a multilayer structure.

The prism 3-30 may be fabricated by first depositing the separation layer on either of the optical members via conventional thin film techniques. The complementary optical member may then be affixed to the exposed surface of the separation layer with an optical glue. Although the indices of refraction of the first and second optical members 3-35 and 3-36 will generally be chosen to be identical, differing indices of refraction may also be selected. In the preferred embodiment, the first and second optical members have identical indices of refraction in such a geometry that the transmitted and reflected beams T and R are of substantially equal cross-section.

Figure 38:
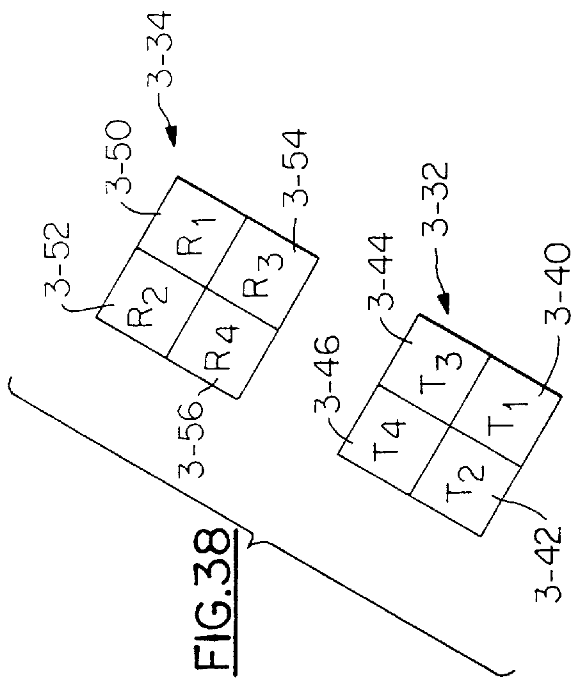
FIG. 38 is an illustrative front view of the first and second quad detectors included within the inventive focus sensing apparatus.

As shown in the illustrative front view of FIG. 38, the first quad detector 3-32 includes first, second, third, and fourth photodetective elements 3-40, 3-42, 3-44, and 3-46, respectively, which produce electrical signals hereinafter referred to as T1, T2, T3, and T4 in response to the intensity of the transmitted beam T impinging thereon. Similarly, the second quad detector 3-34 includes fifth, sixth, seventh, and eighth photodetective elements 3-50, 3-52, 3-54, and 3-56, respectively, which provide electrical signals hereinafter referred to as R1, R2, R3, and R4 in response to incidence of the reflected beam R. The photodetective elements may be PIN diodes, wherein the level of the electrical output from each diode is proportional to the optical energy received thereby.

When the objective lens 3-24 of FIG. 36 is situated relative to the disc 3-14 such that the illuminating beam I is properly focused, the rays included within the servo beam S are well collimated (i.e. substantially parallel) and are therefore incident on the separation layer 3-38 at a substantially identical angle A shown in FIG. 37. Contrary to this, when the objective lens 3-24 does not focus the illuminating beam in the plane occupied by the surface of the disc 3-14, the rays comprising the servo beam S will be either mutually convergent or divergent. It follows that all rays within the servo beam S will impinge on the separation layer 3-38 at the substantially same angle when the illuminating beam I is suitably focused, while rays of a different range of angles of incidence will address the separation layer 3-38 when the beam I is out of focus. The prism 3-30 is designed such that the reflectivity and transmissivity of the separation layer 3-38 is extremely sensitive to the angle at which optical energy is incident on the separation layer 3-38. Thus, the spatial distribution in the intensity of the transmitted and reflected beams T and R will vary as the focus position of the illuminating beam I varies relative to the surface of the disc 3-14. That is, an illuminating beam I which is properly focused gives rise to a well collimated servo beam S such that all the rays thereof experience the same degree of reflection by the separation layer 3-38. Accordingly, the transmitted and reflected beams T and R will be of substantially uniform intensity when the illuminating beam I is appropriately focused. Conversely, a convergent or divergent servo beam S will engender transmitted and reflected beams T and R of nonuniform spatial intensity distributions since the rays within the servo beam S will be subject to a variety of degrees of reflection by the separation layer 3-38. By detecting these spatial variations in the intensity of the transmitted and reflected beams, the photodetectors 3-32 and 3-34 produce electrical signals which may be utilized to produce a DFES indicative of the focus position of the illuminating beam 1.

Figure 39:
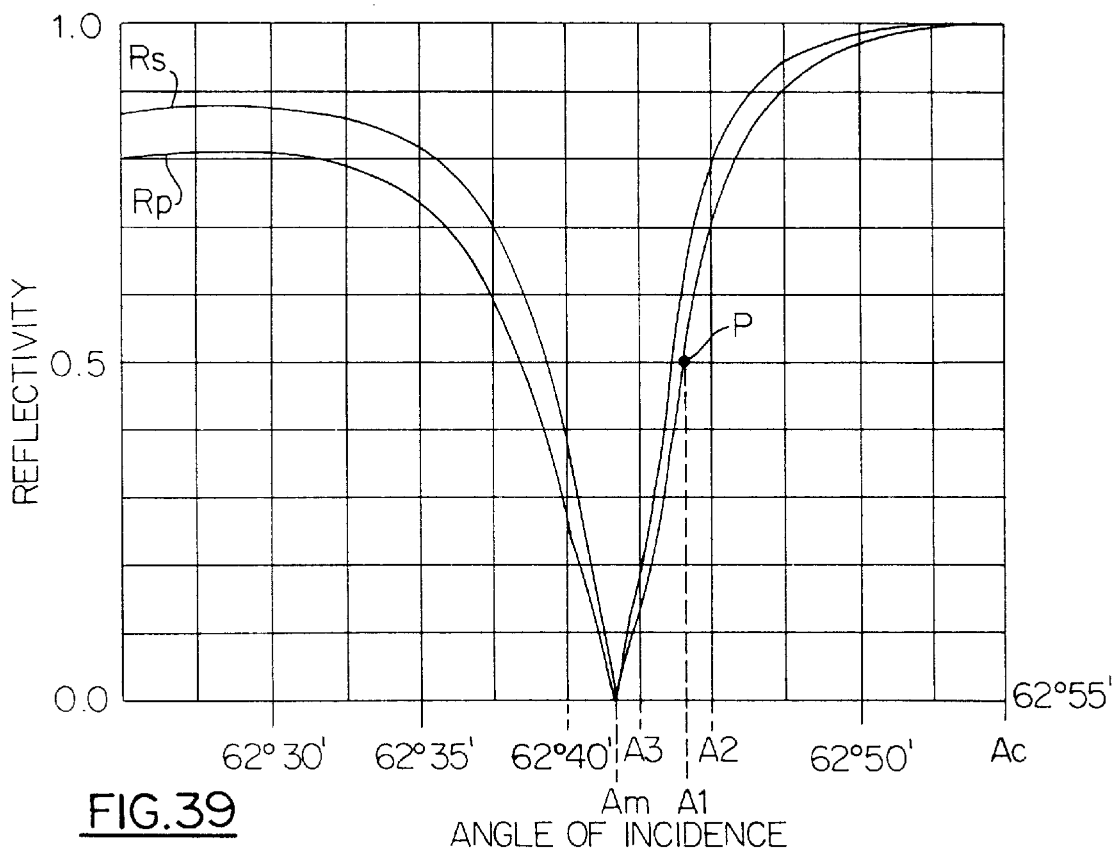
FIG. 39 is a graph showing the reflectivity of the FTR prism as a function of the angle of incidence of the servo beam.

The manner in which a DFES may be synthesized in response to the degree of collimation of the servo beam S may be further understood with reference to FIG. 39. FIG. 39 is a graph showing the reflectivity (intensity of beam R÷intensity of beam S) of the FTR prism 3-30 as a function of the angle of incidence of rays within the servo beam S relative to the separation layer 3-38. Specifically, the graph of FIG. 39 depicts the reflectivities Rs and Rp of the prism 3-30 in response to illumination by both s-polarized and p-polarized optical energy of wavelength 0.78 microns. The reflectivity profiles of FIG. 39 pertain to a FTR prism 3-30 having a separation layer 3-38 with a thickness of 4.5 microns and an index of refraction of 1.38, with the separation layer being sandwiched by glass members having an index of refraction of 1.55. As represented in FIG. 39, the prism 3-30 is preferably positioned relative to the servo beam S at an angle of incidence $A_1$ such that the prism 3-30 is operative about a working point P. That is, at the working point P, the prism 3-30 is positioned such that an illuminating beam I properly focused on the disc 3-14 engenders a well collimated servo beam S having rays which impinge on the separation layer 3-38 at the angle $A_1$. Since the reflectivity of the prism 3-30 is approximately 0.5 at the operating point P, the transmitted and reflected beams produced by the optical arrangement 3-12 including the prism 3-30 are of substantially identical average intensity.

When the separation between the objective lens 3-24 and the disc 3-14 varies such that the servo beam S decollimates in either a convergent or divergent manner, a first portion thereof will impinge on the separation layer 3-38 at an angle of incidence larger than the angle $A_1$. For example, at an angle of incidence of A2, FIG. 39, a corresponding portion of the servo beam will experience a reflectivity of approximately 0.7. Since the first servo beam portion is subject to a reflectivity of only 0.5 when the servo beam S is well collimated, the regions of the detectors 3-32 and 3-34 which receive the parts of the reflected and transmitted beams R and T derived from the first servo beam portion will collect more and less optical energy, respectively, than when the illumination beam I is properly focused. Similarly, the areas of the detectors 3-32 and 3-34 in optical alignment with parts of the transmitted and reflected beams T and R arising from a second portion of the servo beam S incident on the separation layer 3-38 at an angle of incidence $A_3$, which is smaller than the angle $A_1$, will be illuminated by more and less optical energy, respectively, than in a condition of proper focus. The DFES is produced in response to electrical signals engendered by the photodetectors 3-32 and 3-34 indicative of this spatial nonuniformity in the intensity distribution of the transmitted and reflected beams T and R. Moreover, since in the preferred embodiments described herein, the prism 3-30 is optically nonabsorbing, variation in the intensity of the transmitted beam T arising from a change in the angle of incidence of a portion of the servo beam S is mirrored by an equal, oppositely directed variation in the magnitude of the part of the reflected beam R engendered by the identical servo beam portion. Non-differential error signals may be generated independently from either the transmitted or reflected beam, using the equations:

$$FES(transmitted)=(T1+T2)-(T3+T4) \quad (1)$$

$$FES(reflected)=(R1+R2)-(R3+R4) \quad (2)$$

In the differential system, the differential focus error signal (DFES) is generated by the control unit 3-37 in accordance with the following expression:

$$DFES=(R1+R2+T3+T4)-(T1+T2+R3+R4) \quad (3)$$

The control unit 3-37 includes circuitry suitable for carrying out the arithmetic operations of equation (3) and for generating a DFES based on these operations. Preamplifiers (not shown) are included to amplify the electrical signals from the photodetectors 3-32 and 3-34 prior to processing by the control unit 3-37.

Utilizing the dual quad photodetector arrangement described herein leads to the synthesis of differential focus error signals having a reduced sensitivity to certain beam imperfections not induced by inaccuracies in the focus position of the illuminating beam relative to the disc 3-14. Since a localized decrease in the intensity of the servo beam S unrelated to the focus position of the illuminating beam affects the detectors 3-32 and 3-34 in a substantially similar manner, such a decrease does not affect the value of the DFES due to the corresponding cancellation which occurs in equation (3).

As mentioned above in the Background of the Invention, prior focusing systems were generally ill-equipped to implement the differential focus sensing scheme described by equation (3). In particular, a feature of the present invention lies in the ability of the FTR prism 3-30 to provide transmitted and reflected beams of substantially similar cross section and intensity such that both may effectively contribute to the synthesis of a DFES.

In addition to providing a DFES for maintaining the focus of the illuminating beam I in the direction normal to the surface of the disc 3-14, the electrical outputs from the photodetectors 3-32 and 3-34 may also be used by the control unit 3-37 to generate a tracking error signal (TES). The TES is indicative of the radial position of the illuminating beam I relative to the conventional spiral or concentric guiding tracks (not shown) imprinted on the surface of the disc 3-14. The TES enables the beam I to follow the guiding tracks despite eccentricities therein by controlling a mechanical arrangement (not shown) operative to adjust the radial position of the objective lens 3-24 relative to the disc 3-14. The TES is calculated by the control unit 3-37 on the basis of electrical outputs from the photodetectors 3-32 and 3-34 in accordance with the following equation:

$$TES=(T1+T3+R3+R1)-(T2+T4+R2+R4) \quad (4)$$

Again, the manner in which a tracking error signal may be derived from the relationship existing between spatial intensity changes of the servo beam and the tracking position of the illuminating beam is disclosed in, for example, U.S. Pat. No. 4,707,648.

In perhaps the majority of systems operative to control the focus of an illuminating beam relative to an optical disc, it will be desired to generate both tracking and focus error signals in response to the electrical outputs of the photodetective elements. Since generation of both the focus and tracking error signals is known to generally require at least one quad photodetector, the embodiments of the present invention disclosed herein have been described with reference to quad photodetectors. It is also known, however, that a focus error signal may be derived on the basis of electrical signals produced by photodetectors having only two independent photosensitive regions (bicell detectors). Accordingly, in applications requiring only the generation of a focus error signal, a single photodetective element could be substituted for the first and second elements 3-40 and 3-42 of the photodetector 3-32, and a single photodetective element could replace the third and fourth elements 3-44 and 3-46. Similarly, a single photodetective element could be used in lieu of the fifth and sixth elements 3-50 and 3-52 of the photodetector 3-34, and a single element could be substituted for the seventh and eighth elements 3-54 and 3-56.

The slope of the reflectivity profile of FIG. 39 about the working point P is proportional to the sensitivity of the DFES generated by the apparatus 3-10. Specifically, the sensitivity of the apparatus 3-10 to changes in the focus of the illuminating beam I is augmented by increases in the slope of the reflectivity profile. Accordingly, it is an object of the present invention to provide a prism 3-30 characterized by a reflectivity profile which is as steep as practically possible.

The shape of the reflectivity profile of FIG. 39 about the working point P may be altered by adjusting the thickness of the separation layer 3-38. For example, increasing the thickness of the separation layer 3-38 translates the angle of minimum reflectivity $A_m$ towards the critical angle $A_c$, see FIG. 39, without affecting the value of the latter. It follows that increasing the separation layer thickness serves to increase the slope of the reflectivity profile in the vicinity of the working point P. Similarly, reducing the thickness of the separation layer 3-38 enlarges the angular displacement between the critical angle $A_c$ and the angle of minimum reflectivity $A_m$. The shape of the reflectivity profile of the prism 3-30 may be varied in order to adjust the sensitivity of the DFES. A reasonable slope can be obtained, for example, by use of a separation layer having a thickness that is greater than one half the wavelength of the illuminating beam 1.

The value of the critical angle $A_c$ may be adjusted by varying the index of refraction of the separation layer 3-38 relative to that of the glass members 3-35 and 3-36. Thus, adjustment of the separation layer thickness in conjunction with manipulation of the indices of refraction of the separation layer and surrounding glass members allows the prism 3-30 to be fabricated in accordance with a desired reflectivity profile.

Figure 40:
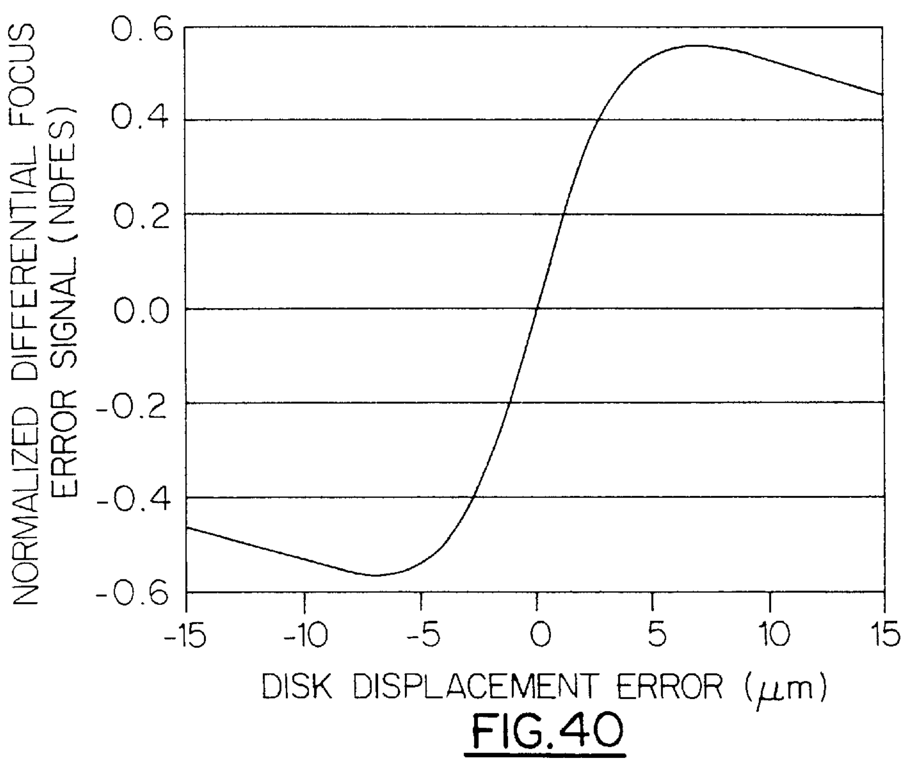
FIG. 40 is a graph of the value of a differential focus error signal generated by a preferred embodiment of the apparatus of the present invention as a function of the position of the objective lens relative to an optical disc.

FIG. 40 is a graph of the value of a normalized DFES (NDFES) generated by the apparatus 3-10 as a function of the deviation from the desired displacement of the objective lens 3-24 relative to the disc 3-14.

Again, the data in FIG. 40 was obtained by utilizing a prism 3-30 having a separation layer of index of refraction 1.38 and thickness 4.5 microns sandwiched between glass members of index of refraction 1.55, with the prism 3-30 being illuminated by a servo beam of wavelength 0.78 microns. As is shown in FIG. 40, the value of the DFES is preferably zero when the desired displacement exists between the objective lens 3-24 and the disc 3-14. The sign (+ or −) of the DFES is thus indicative of whether the displacement between the objective lens and disc surface exceeds or is less than that required for proper focusing. As mentioned above, the DFES may be used to control a mechanical arrangement (not shown) disposed to adjust the separation between the objective lens 3-24 and the disc 3-14. It may be appreciated that the slope of the NDFES is approximately 0.16 $micron^{-1}$ at the working point defined by 0 (zero) disc displacement.

Although the servo beam S has been represented herein to be substantially collimated when incident on the separation layer 3-38, the present invention is not limited to configurations giving rise to collimated servo beams. When a convergent or divergent servo beam is utilized, inaccuracies in the focus position of the illuminating beam will alter the degree of convergence or divergence thereof. Those skilled in the art will appreciate that the focus sensing apparatus of the present invention may be utilized to generate a DFES in response to such changes in convergence or divergence.

The inventive focus sensing apparatus has thus been shown to overcome the disadvantages inherent in other focus detection systems by providing reflected and transmitted beams of substantially similar shape and intensity from which a high precision, altitude insensitive focus error signal may be differentially derived. The focus sensing technique disclosed herein nonetheless retains features present in certain related focus detection systems such as low sensitivity to mechanical vibration, decreased sensitivity to disc tilt, and increased thermal stability.

Seek Actuator

Figure 41:
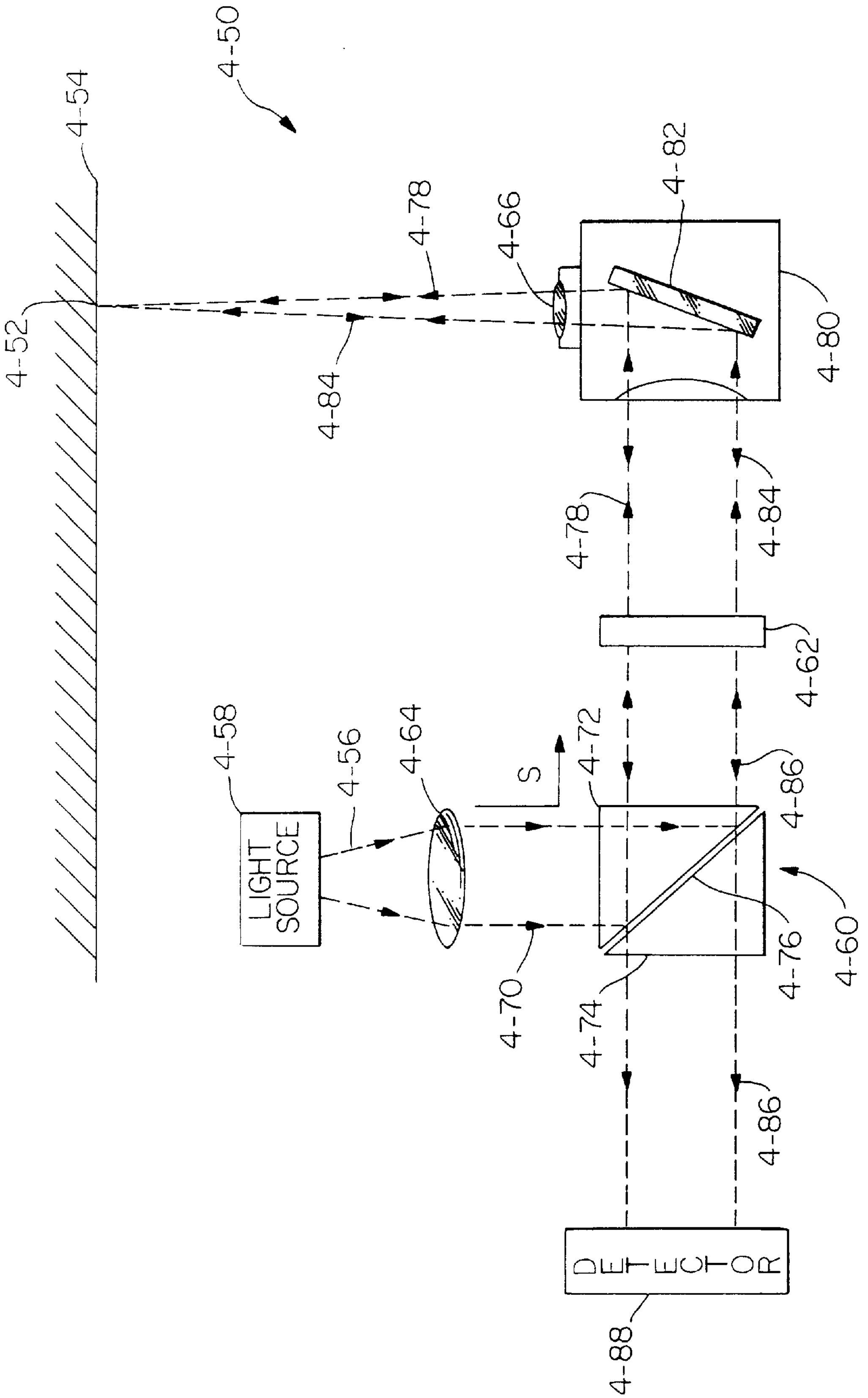
FIG. 41 schematically illustrates an exemplary optical read/write system in which the carriage and actuator assembly of the present invention may be used.

FIG. 41 schematically illustrates the operation of an exemplary optical read/write system 4-50 in reading data from a precise location 4-52 on an information storage medium, such as an optical disc 4-54. While the system 4-50 illustrated is a write-once or WORM system, those skilled in the art will recognize that the carriage and actuator assembly of the present invention could also be used in magneto-optical erasable system. Information is transmitted to and read from the disc 4-54 utilizing a light beam 4-56 produced by a light source 4-58 which passes through a plurality of components including a cube-shaped beamsplitter 4-60 which separates the light beam 4-56 according to its polarization, a quarter wave plate 4-62 which changes the polarization of the light beam 4-56, a collimator lens 4-64, and an objective lens 4-66, which, in combination, direct the light beam 4-56 toward the desired location 4-52 on the disc 4-54.

In operation, the light source 4-58, typically a laser diode, emits the light beam 4-56 toward the convex collimator lens 4-64. The collimator lens 4-64 converts this source beam 4-56 into a parallel, linearly S polarized light beam 4-70 and conducts the beam 4-70 toward the beamsplitter 4-60. This cube-shaped beamsplitter 4-60 is formed by attaching two right angle prisms 4-72 and 4-74 along their respective hypotenuses and includes a polarization sensitive coating forming a beamsplitting interface 4-76 between the two hypotenuses. The beamsplitter 4-60 separates and/or combines light beams of differing polarization states, namely linear S polarization and linear P polarization. Separation is accomplished in conjunction with the polarization sensitive coating which transmits linearly P polarized light beams and reflects linearly polarized S light beams. Light exiting the beamsplitter 4-60 passes through the quarter wave plate 4-62 which converts the linearly polarized light beam 4-70 to a circularly polarized light beam 4-78. Upon exiting the quarter wave plate 4-62, the circularly polarized beam 4-78 enters an actuator 4-80.

The actuator 4-80 includes a mirror 4-82 which orthogonally reflects the light beam 4-78 upward toward the objective lens 4-66. This objective lens 4-66 converges the circularly polarized beam 4-78 to the precise focal point 4-52 on the surface of the optical disc 4-54. Upon striking the disc 4-54, the circularly polarized light beam 4-78 is altered by the information stored on the disc 4-54 and is reflected as a divergent circularly polarized light beam 4-84 carrying information identical to that encoded on the disc 4-54. This reflected circularly polarized light beam 4-84 re-enters the objective lens 4-66 where it is collimated. The light beam 4-84 is again reflected from the mirror 4-82 and re-enters the quarter wave plate 4-62. Upon exiting the quarter wave plate 4-62, the circularly polarized beam 4-84 is converted to a linearly P polarized light beam 4-86. As linearly P polarized light beams are transmitted through the beamsplitter 4-60 without reflection at the splitting interface, this light beam 4-86 continues to a photodetector 4-88, which detects the data stored on the disc 4-54. In addition, if the light beam 4-86 falling on the photodetector 4-88 is out of focus or misaligned, the amount of misalignment or defocusing is measured electronically and used as feedback for a servo system (not shown) which properly realigns the objective lens 4-66.

Figure 42:
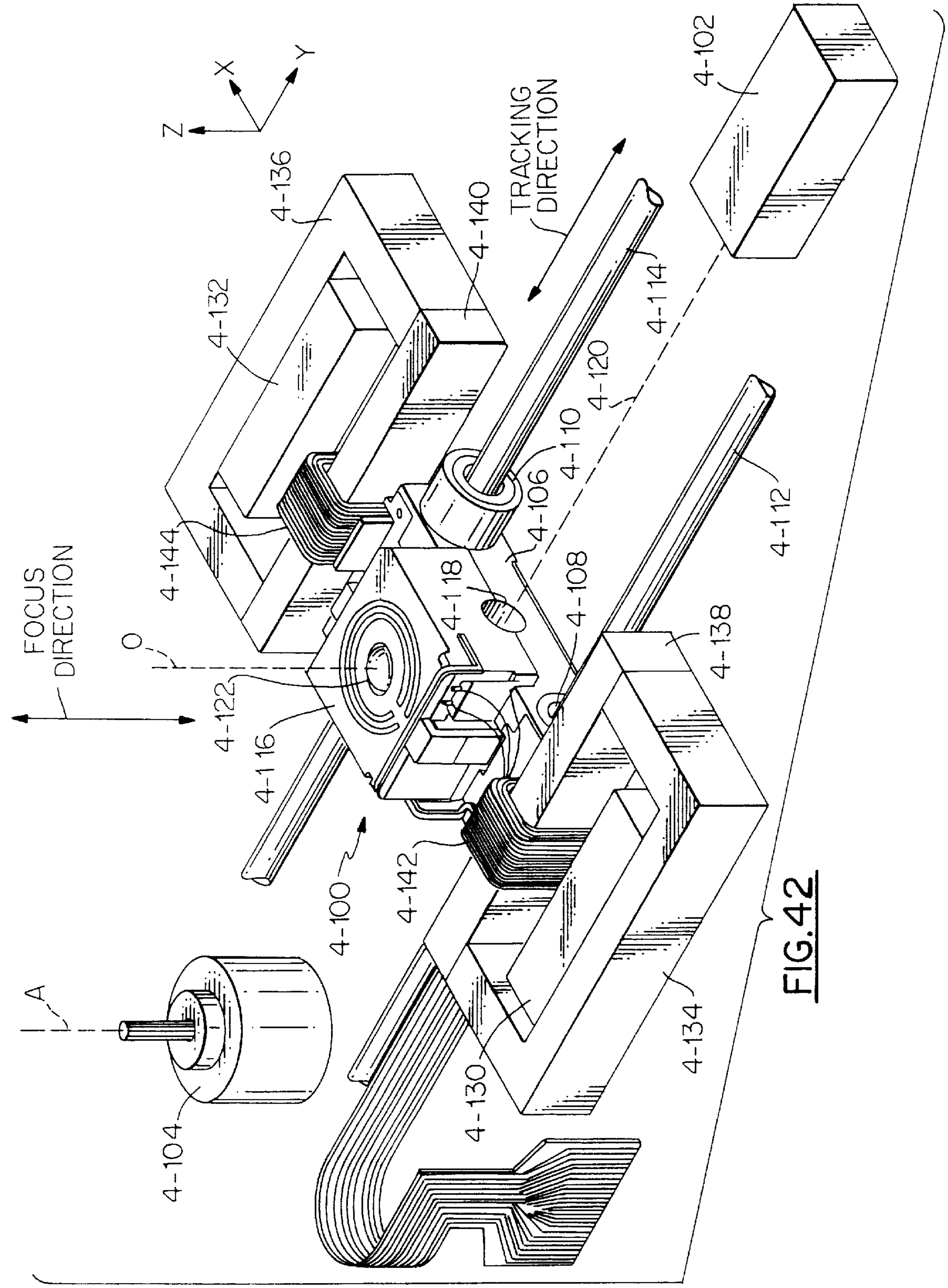
FIG. 42 is a perspective view of the carriage and actuator assembly.

FIG. 42 illustrates an electromagnetic carriage and actuator assembly 4-100 constructed in accordance with the present invention. The assembly can be used with an optics module 4-102 to read and write data onto the surface of an optical disc as described above in connection with FIG. 41, wherein the light source 4-58, detector 4-88, collimating lens 4-64, quarter wave plate 4-62, and beamsplitter 4-60 are all incorporated within the module 4-102. A spindle motor 4-104 is located adjacent the assembly 4-100 and rotates an optical disc (not shown) about an axis of rotation A above the assembly 4-100. The assembly 4-100 includes a carriage 4-106 having first and second bearing surfaces 4-108 and 4-110 slidably mounted on first and second guide rails 4-112 and 4-114, respectively, and an actuator 4-116 which is mounted on the carriage 4-106. As will be appreciated, the rails 4-112 and 4-114 provide a frame along which the carriage moves. A beam of light 4-120 emitted from the light source 4-58 in the optics module 4-102 enters the actuator 4-116 through a circular aperture 4-118 and is reflected by a mirror contained inside the actuator through an objective lens 4-122 defining an optical axis O to the surface of the disc. As readily understood, the axis of rotation A of the disc is parallel to the optical axis O of the objective lens 4-122.

The carriage 4-106 and actuator 4-116 carried thereon are moved horizontally along the rails 4-112 and 4-114 in a tracking direction by a coarse tracking motor to access various information tracks on the surface of the disc. The tracking motor includes two permanent magnets 4-130 and 4-132 wherein each magnet is attached to a C-shaped outer pole piece 4-134 and 4-136, respectively. Two inner pole pieces 4-138 and 4-140 are positioned across the ends of the outer pole pieces 4-134 and 4-136 so as to form a rectangular box around the permanent magnets 4-130 and 4-132. Two coarse coils 4-142 and 4-144 of equal length are affixed to vertical plates 4-174 and 4-176, FIG. 43, and surround the inner pole pieces 4-138 and 4-140 with sufficient clearance to move over the pole pieces 4-138 and 4-140 when the carriage 4-106 is moved in the tracking direction. In this embodiment, these coarse coils 4-142 and 4-144 are the only portion of the course tracking motor that are movable. As will be described in more detail below, the actuator 4-116 can also move the objective lens 4-122 closer to or farther away from the disc, thereby focusing the exiting light beam 4-120 upon the desired location on the surface of the disc.

Figure 43:
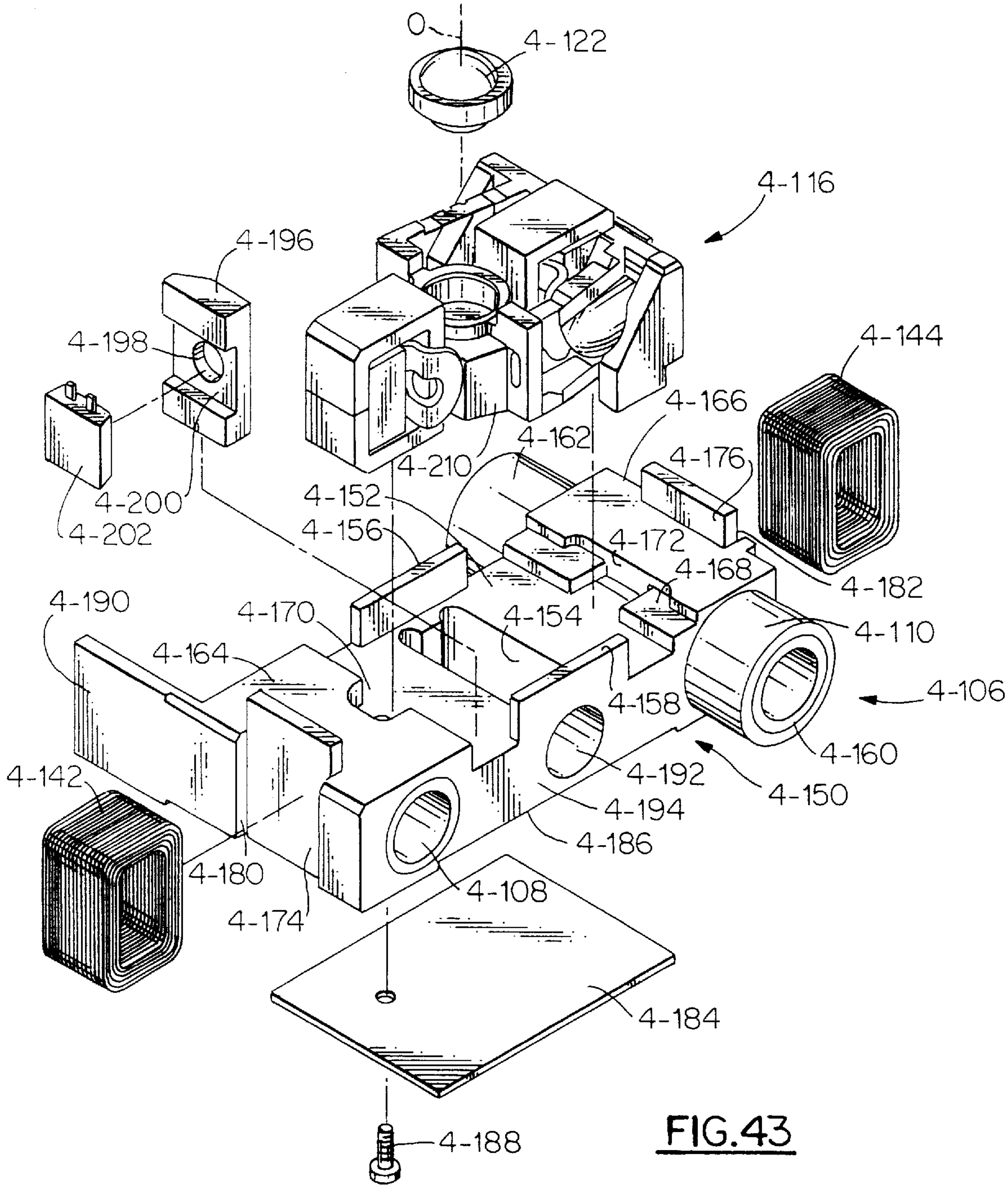
FIG. 43 is an exploded view of the carriage and actuator assembly.

FIG. 43 is an exploded view illustrating the carriage 4-106 and actuator 4-116 in greater detail. The carriage 4-106 includes a generally rectangular base 4-150 to which the actuator 4-116 is attached. The base 4-150 has a substantially flat top surface 4-152 having a generally rectangular chamber 4-154 formed therein. The first bearing surface 4-108 is cylindrical in shape, while the second bearing surface 4-110 consists of two elliptical bearing sections 4-160 and 4-162 of approximately equal length which meet inside the base 4-150. The spacing of the rails 4-112 and 4-114 relative to the optical axis O is selected such that each bearing surface 4-108 and 4-110 is subjected to the same amount of preload. The bearing surfaces 4-108 and 4-110 are further designed such that both surfaces have substantially the same amount of surface area contacting the rails 4-112 and 4-114. The length of the bearing sections comprising the second bearing surface is approximately equal to the length of the first bearing surface, although minor variations in length may be necessary to account for wear.

Two vertical walls 4-156 and 4-158 extend upwardly from the top surface 4-152 of the base 4-150 adjacent the ends of the chamber 4-154. The base 4-150 further includes two platform regions 4-164 and 4-166 formed at the ends of the base 4-150 above the bearing surfaces 4-108 and 4-110. A step 4-168 joins the top surface 4-152 of the base 4-150 with the second platform region 4-166. A first U-shaped notch 4-170 is formed in the first platform region 4-164, and a second U-shaped notch 4-172 is formed in the second platform region 4-166 and step 4-168.

The coarse coils 4-142 and 4-144 are attached to the two vertical plates 4-174 and 4-176 respectively. The plates 4-174 and 4-176 are respectively positioned in notches 4-180 and 4-182 formed in the ends of the base 4-150. The base 4-150 further includes a mass balancing plate 4-184 which is attached to a bottom surface 4-186 of the base 4-150 via a screw 4-188, and a mass balancing projection 4-190 which extends outwardly from the base 4-150 adjacent the first coarse coil 4-142. A circular aperture 4-192 is formed in a front side 4-194 of the base 4-150 and receives the light beam 4-120 emitted from the optics module 4-102 of FIG. 42. A bracket 4-196 having a circular aperture 4-198 therein is positioned between the second vertical wall 4-158 and the first platform region 4-164 along the front side 4-194 of the base 4-150. The bracket 4-196 additionally includes a notch 4-200 which receives a photodetector 4-202 such that the photodetector 4-202 is positioned between the bracket 4-196 and the first platform region 4-164.

The actuator 4-116, often referred to as a "2-D" actuator for 2 degrees of motion, i.e. focusing and tracking, is mounted on the base 4-150 between the vertical walls 4-156 and 4-158 and the platform regions 4-164 and 4-166. A prism (not shown) is positioned within the chamber 4-154 in the base 4-150 to deflect the light beam 4-120 emitted from the optics module 4-102 such that the beam 4-120 exits the actuator 4-116 through the objective lens 4-122. The objective lens 4-122 is positioned within a lens holder 4-210 attached to a focus and fine tracking motor which moves the lens 4-122 so as to precisely align and focus the exiting beam 4-120 upon a desired location on the surface of the optical disc. The objective lens 4-122 defines the optical axis O which extends vertically through the center of the lens.

Figure 44:
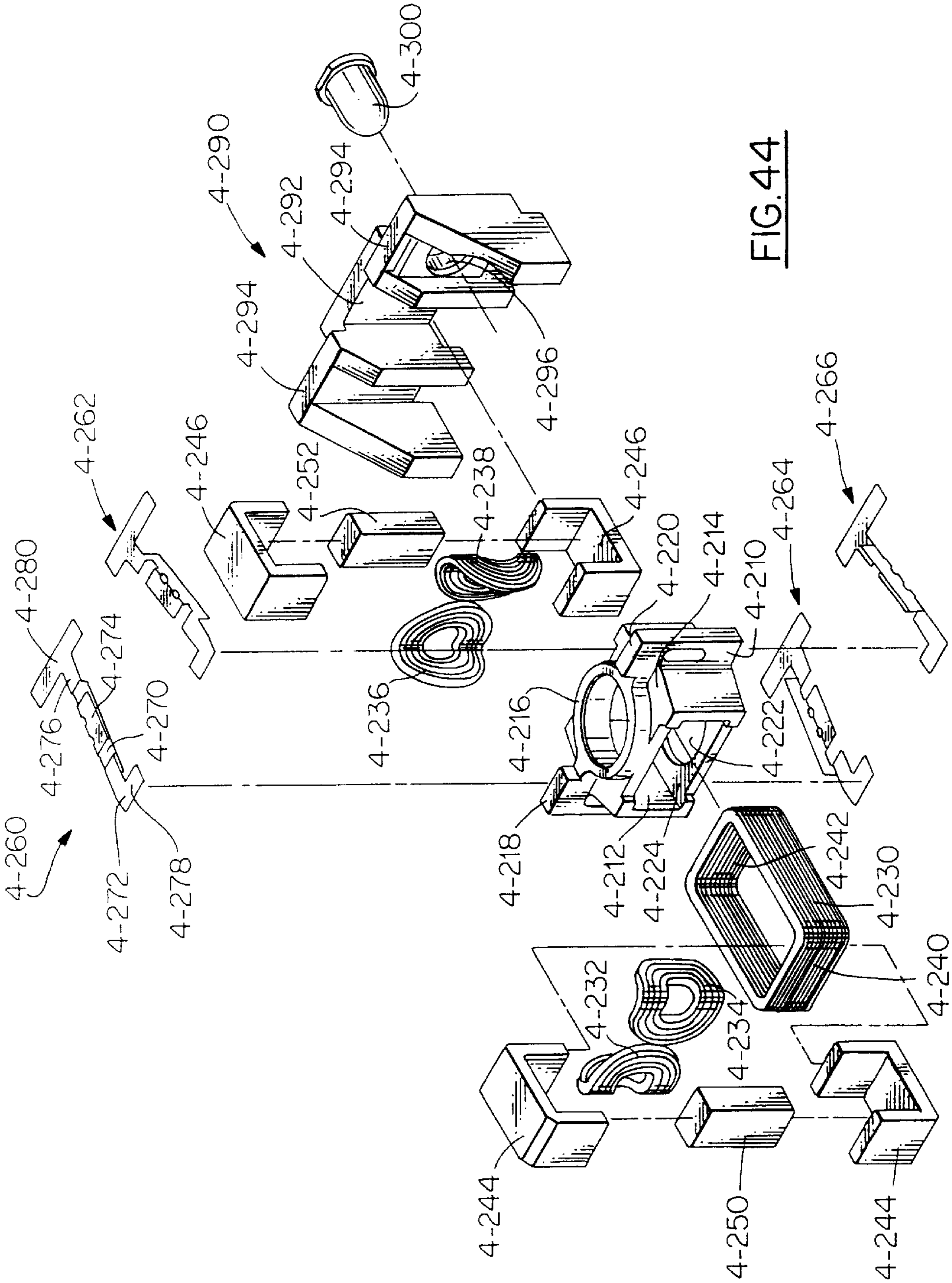
FIG. 44 is an exploded view of the actuator.

The components of the actuator 4-116 are best seen in FIG. 44. The lens holder 4-210 is generally rectangular in shape and includes a generally rectangular opening 4-212 formed therethrough. A top surface 4-214 of the lens holder 4-210 includes a circular collar 4-216 positioned between two shoulders 4-218 and 4-220. A circular aperture 4-222 having a diameter substantially equal to that of the collar 4-216 is formed in a bottom surface 4-224 of the lens holder. A rectangular focus coil 4-230 is positioned within the rectangular opening 4-212 in the lens holder 4-210. Two oval-shaped, fine tracking coils 4-232 and 4-234 are positioned at the corners of a first end 4-240 of the focus coil 4-230, and two more identical tracking coils 4-236 and 4-238 are positioned at the corners of a second end 4-242 of the focus coil 4-230. A first pair of U-shaped pole pieces 4-244 is positioned to surround the first end 4-240 of the focus coil 4-230 and tracking coils 4-232 and 4-234 attached thereto, while a second pair of U-shaped pole pieces 4-246 surrounds the second end 4-242 of the focus coil 4-230 and tracking coils 4-236 and 4-238 attached thereto. In addition, two permanent magnets 4-250 and 4-252 are positioned between the respective pole piece pairs 4-244 and 4-246, adjacent the respective tracking coils 4-232, 4-234, and 4-236, 4-238.

Two top flexure arms 4-260 and 4-262 are attached to the top surface 4-214 of the lens holder 4-210 while two additional bottom flexure arms 4-264 and 4-266 are attached to a bottom surface of the lens holder 4-210. Each flexure arm preferably consists of a thin sheet of etched or stamped metal (typically steel or beryllium copper) with a thickness in the order of 25 micrometers to 75 micrometers. For simplicity, only the flexure arm 4-260 will be described. It should be noted, however, that the remaining flexure arms 4-262, 4-264, and 4-266 are of identical structure. The flexure arm 4-260 includes a first vertical section 4-270 attached to first, second, and third horizontal sections 4-272, 4-274, and 4-276. The third horizontal section 4-276 is further attached to a perpendicular crossbar 4-280. The first horizontal section 4-272 includes a shoulder 4-278 which attaches to the corresponding shoulder 4-218 on the lens holder 4-210. In a similar manner, the shoulder of the second top flexure arm 4-262 attaches to the corresponding shoulder 4-220, while the shoulders of the bottom flexure arms 4-264 and 4-266 attach to the corresponding structures on the bottom surface of the lens holder 4-210.

The flexures 4-260, 4-262, 4-264, and 4-266 are further attached to a support member 4-290. The support member 4-290 includes a central notch 4-292 which receives the second pair of pole pieces 4-246. A ledge 4-294 is formed on each side of the notch 4-292 on the top and bottom surfaces of the support member 4-290. The crossbar sections 4-280 of the flexure arms 4-260 and 4-262 are attached to these ledges 4-294, while flexure arms 4-264 and 4-266 are connected to corresponding ledges on the bottom of the support member 4-290 so as to cooperatively suspend the lens holder 4-210 from the support member 4-290. The support member 4-290 further includes an aperture 4-296 for receiving a light emitting diode 4-300. The diode 4-300 is in alignment with the aperture 4-198 in the bracket 4-196, FIG. 43, and photodetector 4-202 positioned within the notch 4-200 in the bracket, such that when the light emitting diode 4-300 is energized, substantially collimated light is emitted through the aperture 4-198 in the bracket 4-196 and is incident upon the photodetector 4-202. Depending on the position of the lens holder 4-210 with respect to the support member 4-290, light emitted by the diode 4-300 will fall onto various portions of the detector 4-202. By analyzing the amount of light incident upon the detector 4-202, a position correction signal can be generated to determine the amount of displacement required for precise focusing and tracking at the desired location on the surface of the disc.

In the illustrated embodiment, the fine motor mass consists of the lens holder 4-210, the objective lens 4-122, the focus coil 4-230, and the fine tracking coils 4-232, 4-234, 4-236, and 4-238. The carriage mass consists of the base 4-150, course tracking coils 4-142 and 4-144, the bracket 4-196, and photodetector 4-202, the support member 4-290, the vertical plates 4-174 and 4-176, the mass balancing plate 4-184 and screw 4-188, the permanent magnets 4-250 and 4-252, the pole pieces 4-244 and 4-246, and the bearing surfaces 4-108 and 4-110.

With reference to the above description in connection with FIGS. 43 and 44, the coarse tracking coils 4-142 and 4-144 have equal dimensions and are symmetric about optical axis O of the objective lens. Further, the tracking coil pairs 4-232, 4-234 and 4-236, 4-238 have equal dimensions and are symmetric about optical axis O of the lens 4-122. The dimensions of the mass balance plate 4-184 and mass balance projection 4-190 are advantageously selected to compensate for the mass of the support member 4-290, flexures 4-260, 4-262, 4-264, 4-266, bearing surfaces 4-108, 4-110, bracket 4-196 and photodetector 4-202, such that the center of mass of the carriage and the center of mass of the fine and focus drives (consisting of the pole pieces 4-244, 4-246, the permanent magnets 4-250, 4-252, the focus coil 4-230, and tracking coils 4-232, 4-234, 4-236, 4-238) are generally intersected by the optical axis O of the lens 4-122. As will be described in more detail below, alignment of these centers of gravity with the optical axis O of the lens 4-122, and the symmetry of the motor forces and reaction forces acting on the carriage 4-106 and actuator 4-116 ensure that undesirable modes of motion which adversely affect position of the objective lens 4-122 are minimized.

Figure 45:
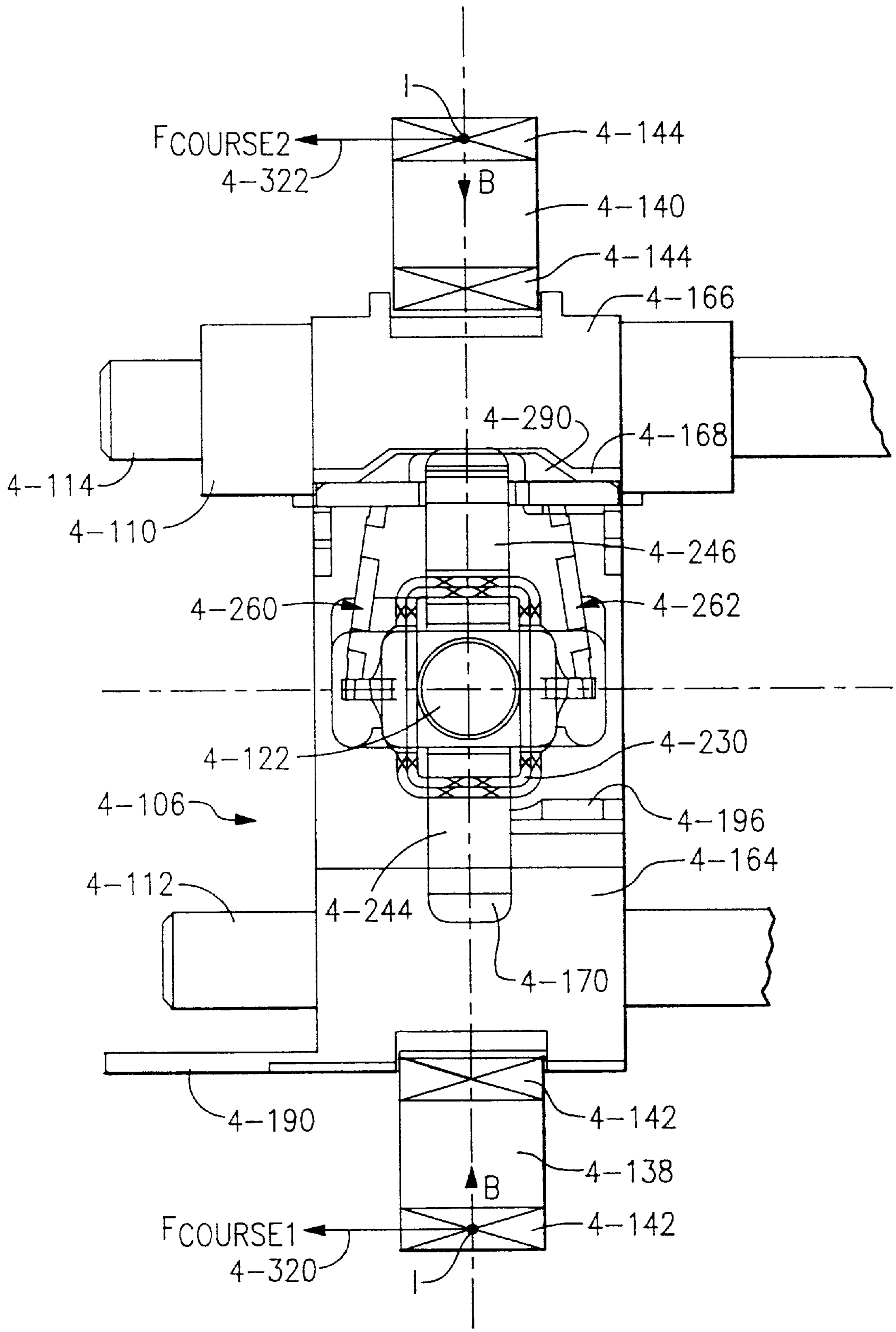
FIG. 45 is a schematic top view illustrating the coarse tracking forces acting on the assembly.

Referring to FIG. 45, the permanent magnets 4-130, 4-132 adjacent the coarse tracking coils 4-142, 4-144 generate a magnetic field B whose lines of flux extend inwardly toward the coarse coils 4-142 and 4-144. When coarse tracking movement is required to position the objective lens 4-122 beneath a selected track on the optical disc, current is applied to the coarse tracking coils 4-142, 4-144. The current interacts with the magnetic field B to produce forces which move the carriage 4-106 in the tracking direction. The forces are generated according to the Lorentz law $F=B \cdot X \cdot I \cdot 1$, wherein, as stated above, F represents the force acting on the focus coil, B represents the magnetic flux density of the magnetic field between the two permanent magnets, I represents the current through the focus coil, and 1 represents the length of the coil. For example, when the current I applied to the first coarse tracking coil 4-142 travels through the portion of the coil positioned within the magnetic field B in the direction into the plane of FIG. 45, a force $F_{Coarse1}$ in the direction of the arrow 4-320 is produced. Similarly, when current I travels through the portions of the second tracking coil 4-144 positioned within the magnetic field B in the direction out of the plane of FIG. 45, a force $F_{Coarse2}$ in the direction of the arrow 4-322 is produced. The forces $F_{Coarse1}$ and $F_{Coarse2}$ act to move the carriage 4-106 horizontally to the left.

Figure 46:
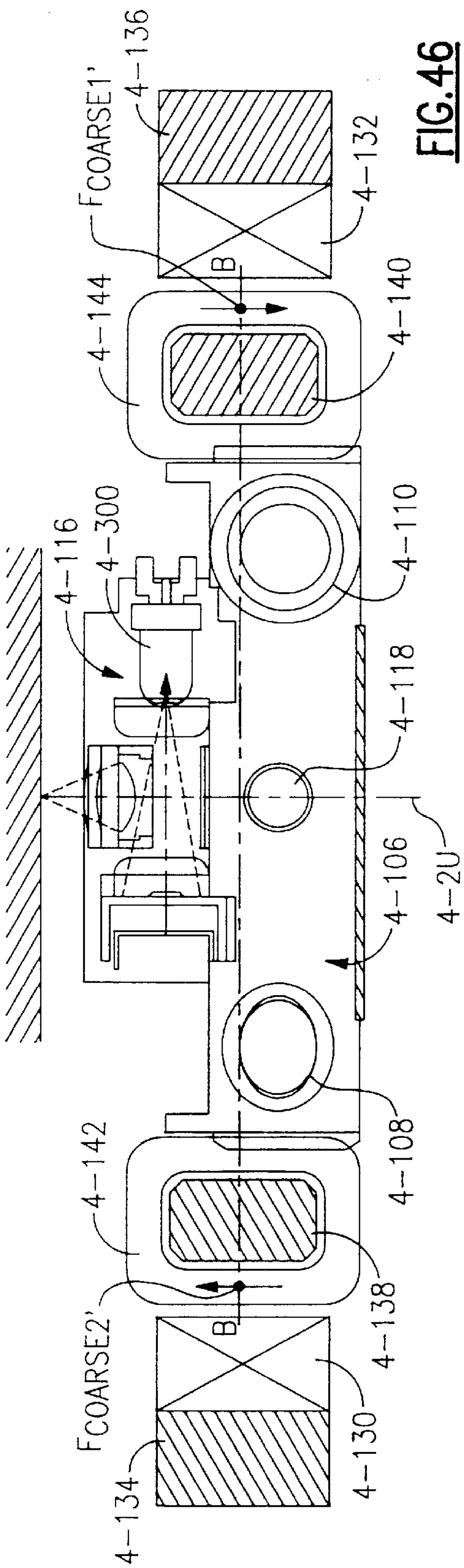
FIG. 46 is a side schematic view further illustrating the coarse tracking forces.

Conversely, FIG. 46 shows that if the direction of the current I within the portions of the tracking coils 4-142, 4-144 within the magnetic field B is reversed, forces $F_{Coarse1}'$, and $F_{Coarse2}'$, are produced which act to move the carriage into the plane of the drawing sheet of FIG. 46 (to the right in FIG. 45). The amount of movement in the tracking direction depends on the amount of current applied to the coarse coils 4-142 and 4-144. In this manner, the carriage 4-106 is moved to position the objective lens 4-122 such that the laser beam 4-120 exiting the lens 4-122 is focused within a desired information track on the surface of the optical disc.

When a control signal is generated by the optics module 4-102, a given current is applied to either the fine tracking coils 4-232, 4-234, 4-236, and 4-238, or the focus coil 4-230 depending on the direction in which the displacement of the lens holder 4-210 and objective lens 4-122 attached thereto is required. Such servo system and feedback circuits which control the amount of current are well known in the art. This current interacts with the electromagnetic field produced by the permanent magnets 4-250 and 4-252 to create a force which displaces the lens holder 4-210 and the objective lens 4-122 attached thereto in the appropriate tracking or focusing direction. For example, if re-positioning is desired in the focus direction, according to a focus error signal, this signal is transmitted to a servo amplifier (not shown), which generates a current through the focus coil 4-230. As described above, a force is generated according to the Lorentz law $F=B \cdot X \cdot I \cdot 1$.

Figure 47:
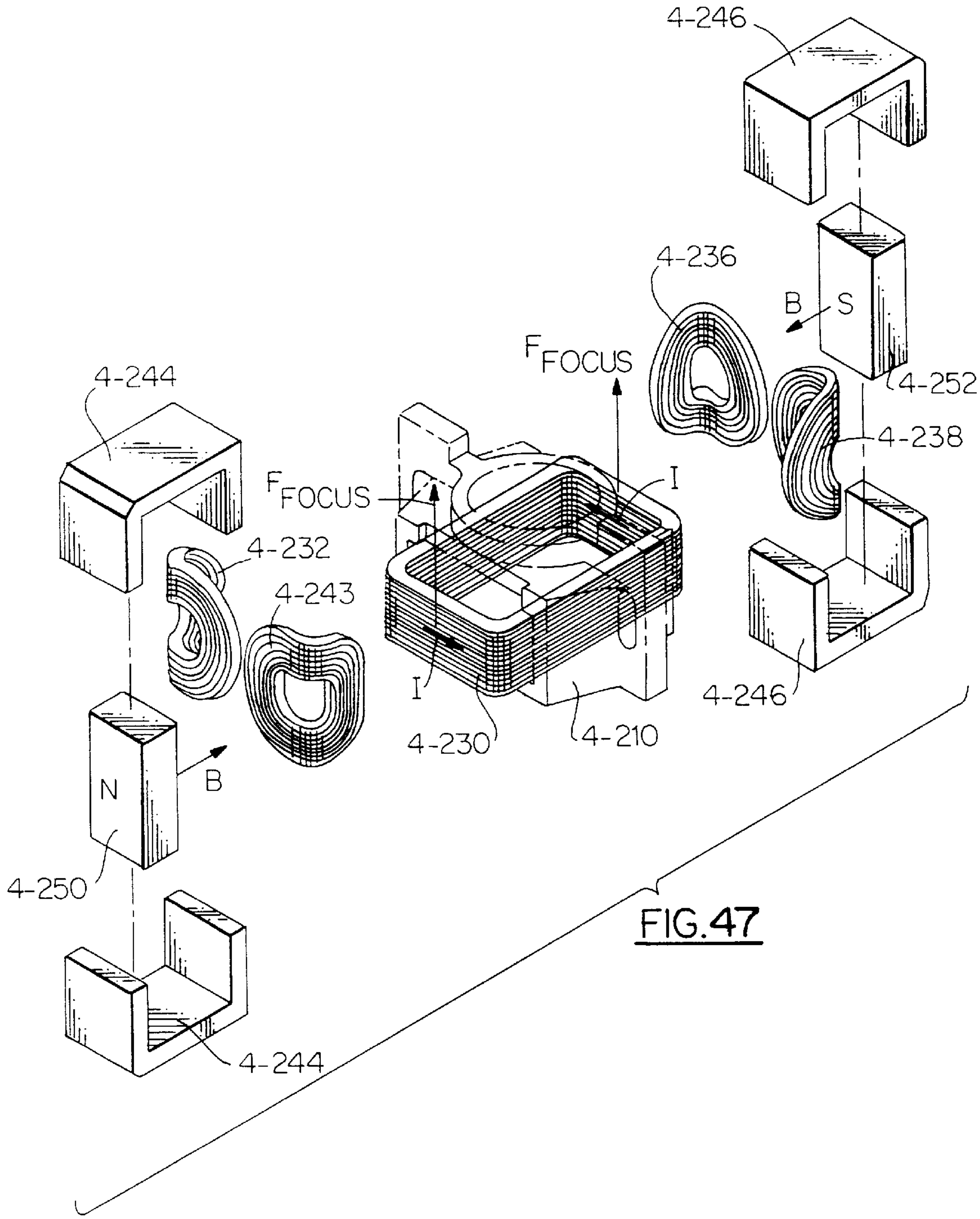
FIG. 47 is an exploded view which illustrates the focus forces acting on the actuator.

With reference now to FIG. 47, the permanent magnets 4-250 and 4-252 of the 2-D actuator 4-116 are oriented such that the south poles of each magnet 4-250, 4-252 face the lens holder 4-210. In this configuration, a magnetic field B is formed whose lines of flux originate at the magnets 4-250, 4-252 and are directed inwardly toward the lens holder 4-210 as shown. When a current I is applied to the focus coil 4-230 and travels through the portions of the coil 4-230 positioned within the magnetic field B in the direction shown, an upward force $F_{FOCUS}$ is generated at each section of the focus coil 4-230 which is translated to the flexure arms 4-260, 4-262, 4-264, and 4-266, bending the flexure arms to move the lens holder 4-210 and associated objective lens 4-122 closer to the optical disc. Conversely, when the current I is run through the coil sections in the opposite directions as those illustrated, a downward force is generated which acts on the flexures to move the lens holder 4-210 and objective lens 4-122 farther away from the surface of the optical disc. The magnitude of the displacement is dependent upon the amount of current applied to the focus coil 4-230. By moving the objective lens 4-122 closer to or farther away from the surface of the optical disc, the focus coil 4-230 acts to precisely focus the laser beam 4-120 exiting the objective lens 4-122 within the desired information track on the disc.

Figure 48:
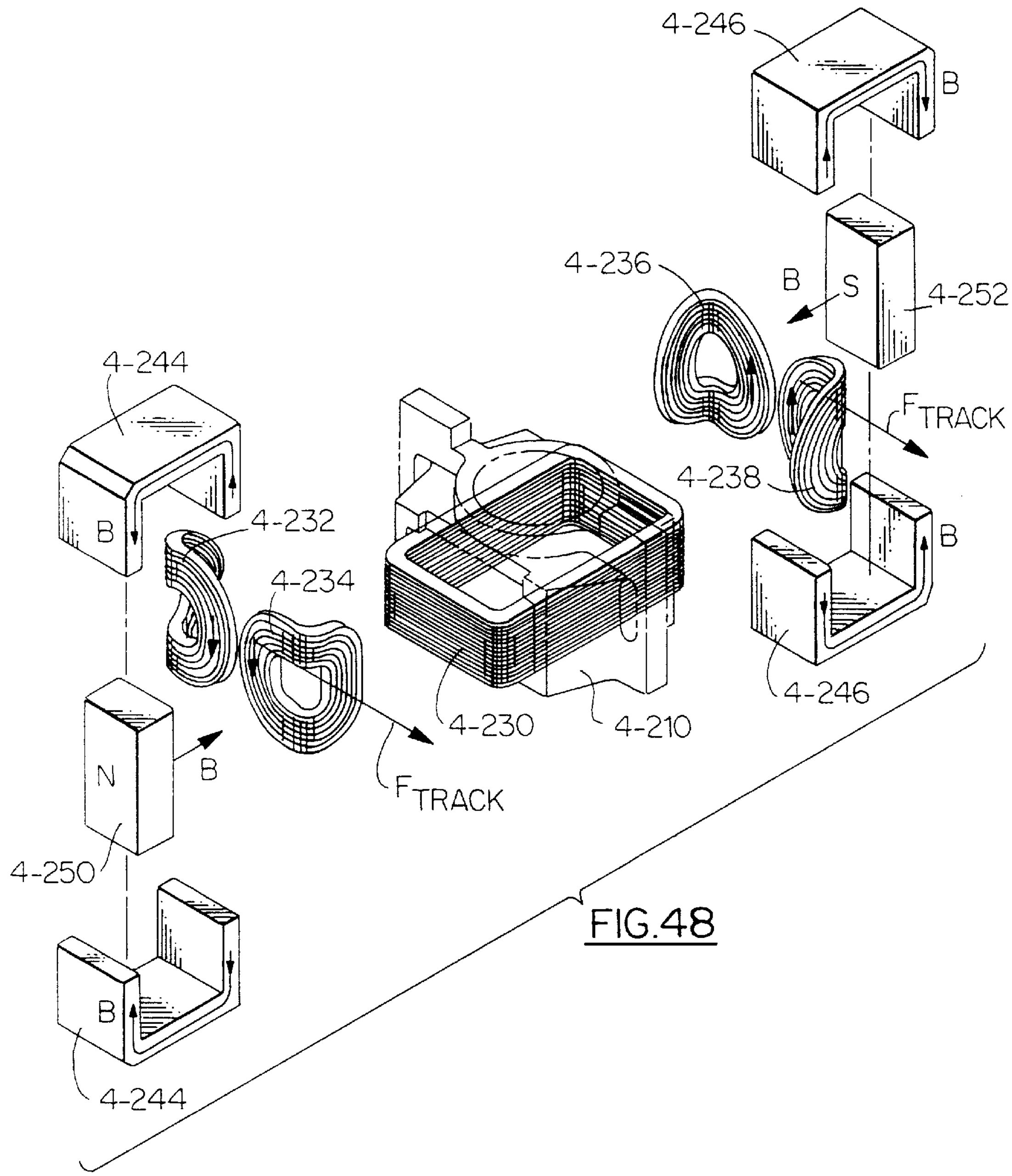
FIG. 48 is an exploded view which illustrates the fine tracking forces acting on the actuator.

As shown in FIG. 48, movement of the actuator 4-116 to effect fine tracking is produced when current is generated in the four fine tracking coils 4-232, 4-234, 4-236, and 4-238 affixed to the focus coil 4-230. When current is applied to the tracking coils in the directions shown through the portions of the tracking coils positioned within the magnetic field B, forces $F_{Track}$ are produced which move the lens holder 4-210 to the right. When the forces $F_{Track}$ act on the tracking coils 4-232, 4-234, 4-236, and 4-238, they are translated through the focus coil 4-230 and lens holder 4-210 to the flexures 4-260, 4-262, 4-264, and 4-268 which bend in the corresponding direction, and the objective lens 4-122 is moved in the direction of the forces, to the right in FIG. 48. When current travels through the tracking coils 4-232, 4-234, 4-236, and 4-238 in the opposite direction, a force is generated which acts to move the lens holder 4-210 to the left. The amount of current applied to the fine tracking coils 4-232, 4-234, 4-236, and 4-238 is relatively small in comparison with the amount applied to the coarse tracking coils 4-242, 4-244, and the dimensions of the fine tracking coils are much smaller than the coarse coils to increase resonance frequencies and thus enable higher servo bandwidths which can then control to tighter track errors.

FIGS. 49A-56B are schematic diagrams of the actuator and carriage assembly 4-100 which illustrate the symmetry and balancing of forces achieved with the design of the present invention.

Figure 49B:
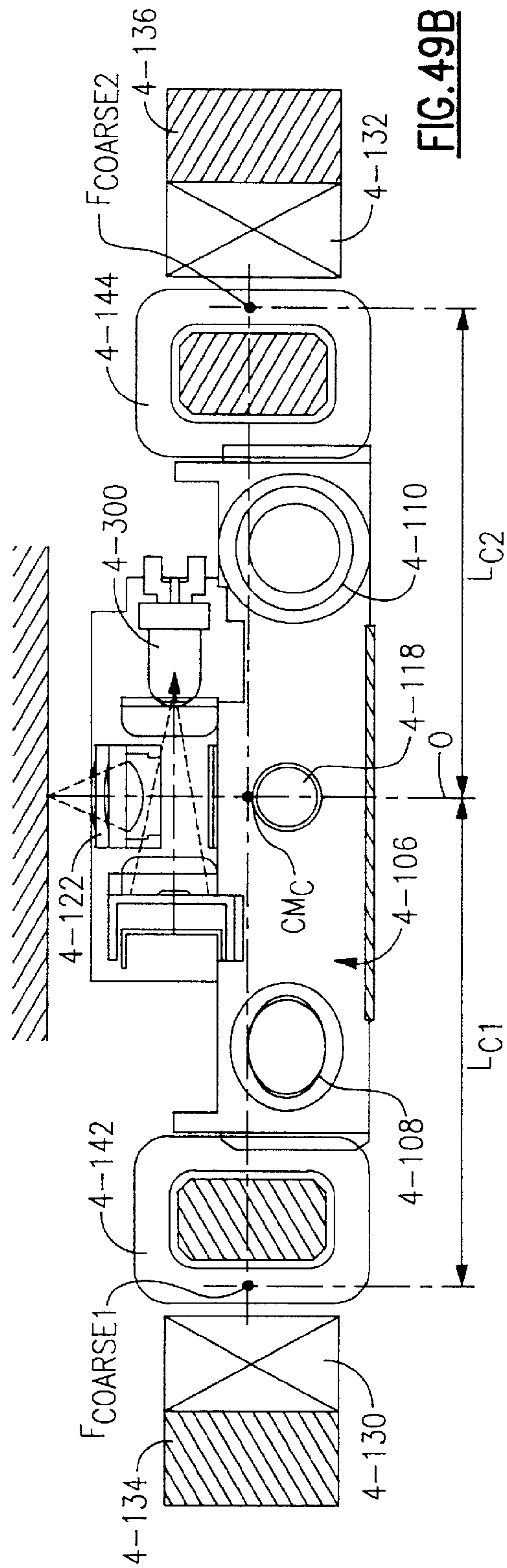
FIG. 49B is a schematic side view illustrating the symmetry of coarse tracking forces in the vertical plane.
Figure 49A:
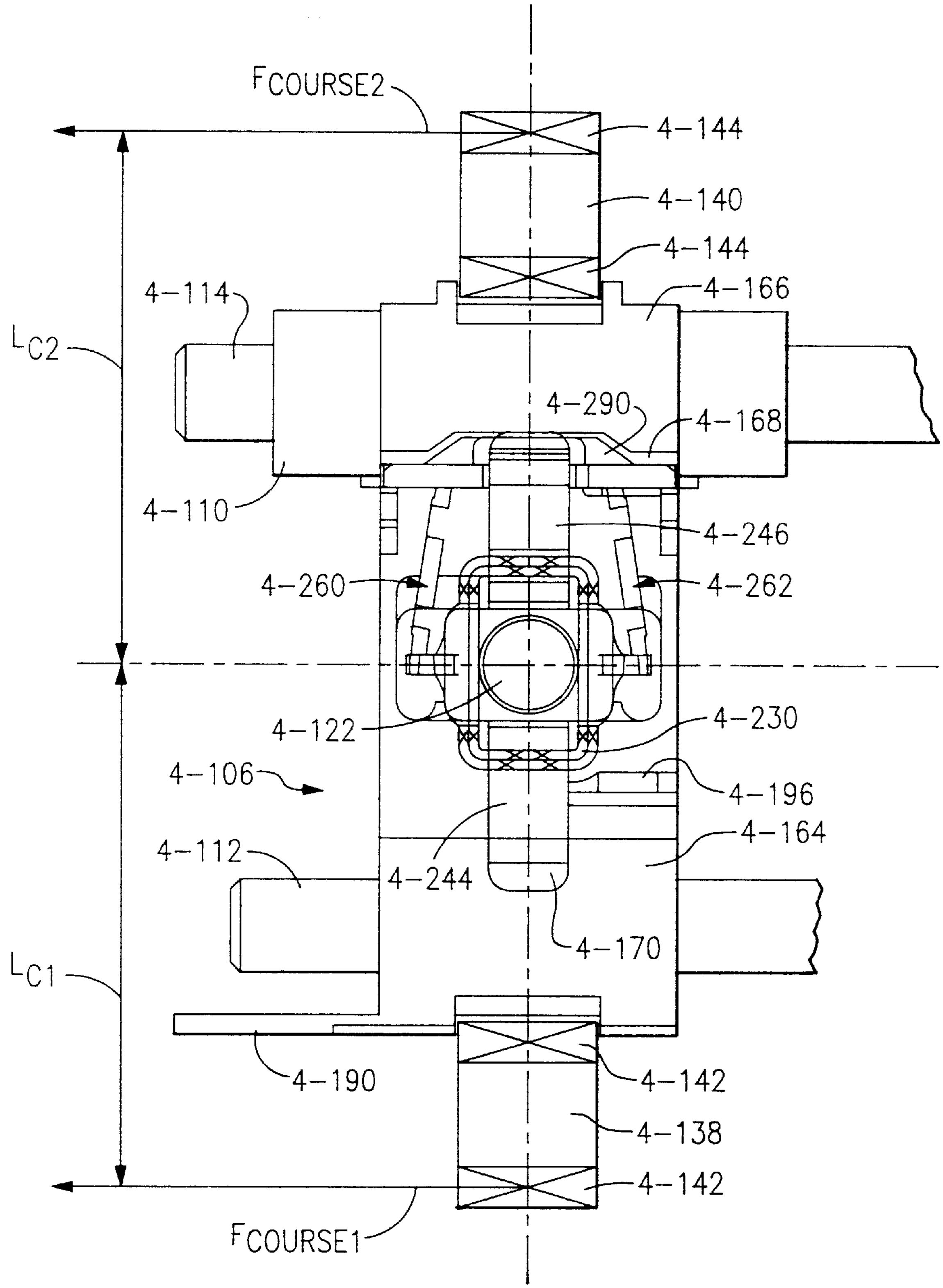
FIG. 49A is a schematic top view illustrating the symmetry of coarse tracking forces in the horizontal plane.

FIG. 49A is a schematic diagram illustrating the symmetry of coarse or carriage motor forces acting on the actuator 4-116 in the horizonal plane. When current is applied to the coarse tracking coils 4-142 and 4-144 as described above, forces $F_{Coarse1}$ and $F_{Coarse2}$ are produced which are centered within the portion of the coarse coils 4-142, 4-144 located adjacent the permanent magnets 4-130 and 4-132, respectively. The dimensions of the first coarse coil 4-142 are selected to equal the dimensions of the second coarse coil 4-144, and the current applied to each coil is the same, such that the forces $F_{Coarse1}$ and $F_{Coarse2}$ acting on the coils are equal. Further, the coarse coils 4-142 and 4-144 are positioned at equal distances $L_{C1}$ and $L_{C2}$ from the objective lens 4-122 such that the resulting moments about the optical axis O of the objective lens 4-122 are equal, and the carriage yaw is minimized. In FIG. 49B, the centers of the coarse motor forces $F_{Coarse\ 1}$ and $F_{Coarse2}$ are illustrated in the vertical plane. Because the forces $F_{Coarse1}$ and $F_{Coarse2}$ are vertically aligned with the center of mass of the carriage $CM_C$ (i.e., are generally intersected by a line orthogonal to the radial direction and the optical axis O containing the center of mass of the carriage $CM_C$), the moments about the horizontal axis are equal, and carriage pitch which can cause the prism to deflect the beam angle, thereby introducing track offset, is reduced.

Figure 50A:
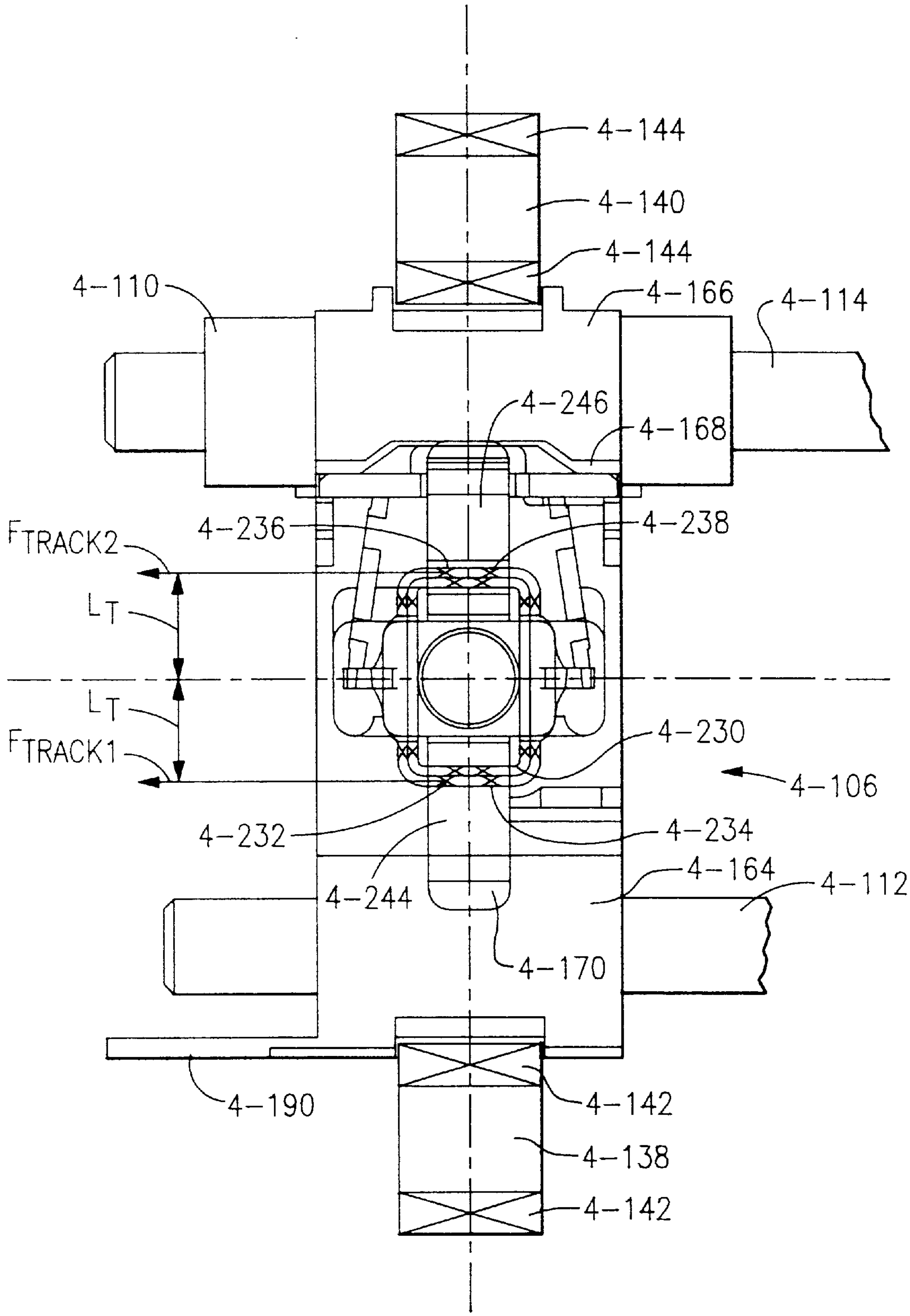
FIG. 50A is a schematic top view illustrating the symmetry of fine tracking forces in the horizontal plane.
Figure 50B:
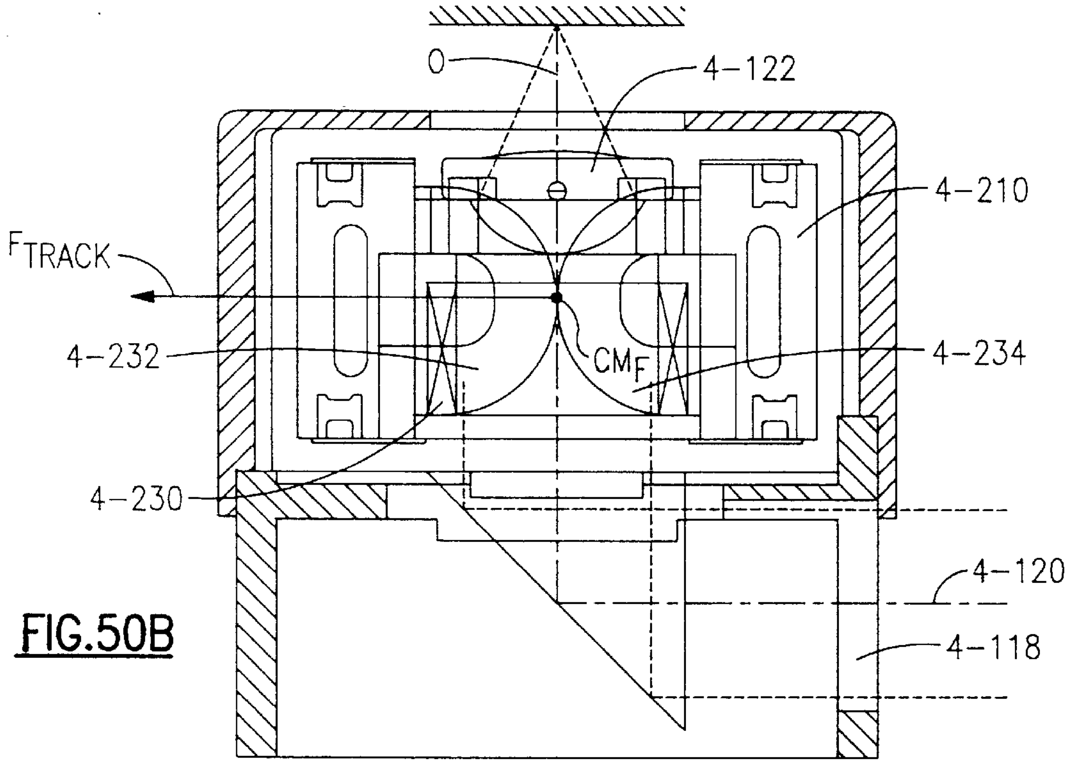
FIG. 50B is a schematic end view illustrating the alignment of the net fine tracking force with the center of mass of the fine tracking motor.

The fine tracking motor forces in the horizontal and vertical planes are illustrated in FIGS. 50A and 50B. The forces $F_{Track1}$ and $F_{Track2}$ produced by the energization of the fine tracking coils 4-232, 4-234, 4-236, and 4-238 within the magnetic field induced by the permanent magnets 4-250 and 4-252 are centered between the pairs of fine tracking coils 4-232, 4-234 and 4-236, 4-238, and extend horizontally in the tracking direction. The dimensions of the coils are equal and the amount of current applied to the coils is equal as well, such that the magnitude of the resulting forces $F_{Track1}$ and $F_{Track2}$ is equal. Additionally, the fine tracking coils 4-232, 4-234, 4-236, and 4-238 are positioned at equal distances $L_T$ from the optical axis O of the objective lens 4-122, and thus, the moments produced about the optical axis O are equal, such that yaw of the lens holder 4-210 and lens 4-122 carried thereon about the vertical axis is decreased. As illustrated in FIG. 50B, the resultant fine tracking force $F_{Track}$ acts on the center of mass of the fine motor mass $CM_F$, such that lens holder pitch is minimized.

Figure 51B:
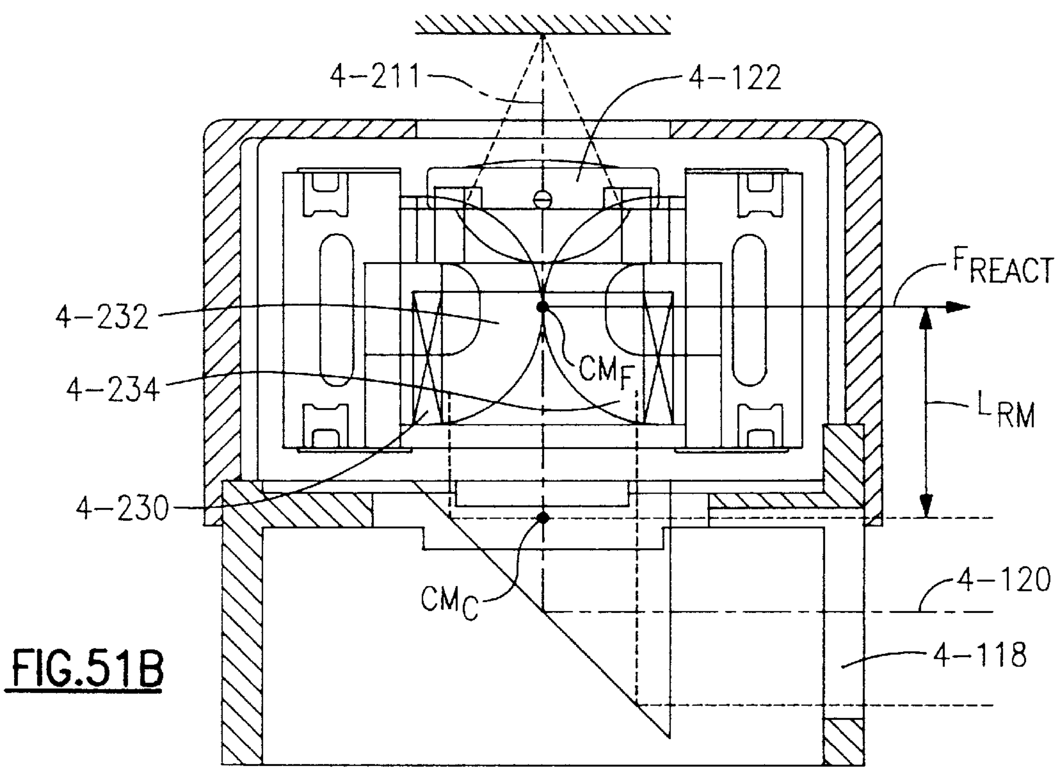
FIG. 51B is a schematic end view illustrating the alignment of the net fine tracking reaction force with the center of mass of the fine tracking motor.
Figure 51A:
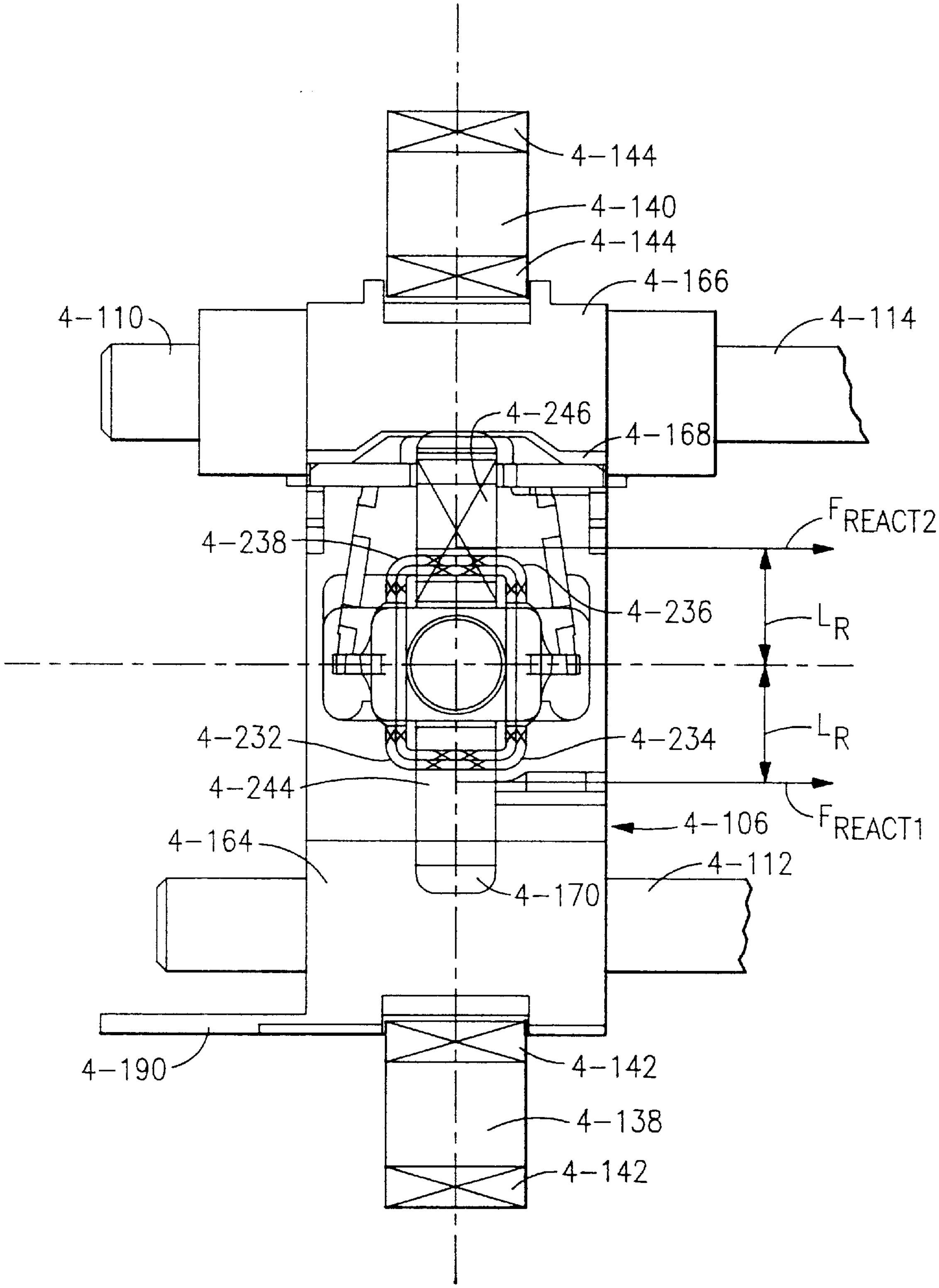
FIG. 51A is a schematic top view illustrating the symmetry of fine tracking reaction forces in the horizontal plane.

FIG. 51A illustrates the reaction forces $F_{React1}$ and $F_{React2}$ resulting from the fine tracking motor which act upon the carriage 4-106 in opposition to the fine tracking motor forces $F_{Track1}$ and $F_{Track2}$ illustrated in FIG. 50A. These reaction forces $F_{React1}$ and $F_{React2}$ act on the pole pieces 4-244 and 4-246 positioned over the tracking coils 4-232, 4-234, 4-236 and 4-238 on each side of the lens holder 4-210. As described above, the magnitude of the tracking forces $F_{Track1}$ and $F_{Track2}$ is equal. Further, the dimensions of the pole pieces 4-244 and 4-246 are equal, such that the reaction forces $F_{React1}$ and $F_{React2}$ produced are equal. Because the pole pieces 4-244 and 4-246 are positioned at equal distances $L_R$ from the optical axis O of the lens 4-122, the moments about the optical axis O are equal in magnitude, reducing rotation about the vertical axis, or yaw. FIG. 51B illustrates the resultant reaction force $F_{React}$ in the vertical plane. As shown, the reaction force $F_{React}$ acts at the center of mass of the fine motor mass $CM_F$ at a distance $L_{RM}$ above the center of mass of the carriage mass $CM_C$, and thus a moment will act on the carriage 4-106. Because the distance $L_{RM}$ and the reaction forces $F_{React1}$ and $F_{React2}$ are fairly small, however, this moment is relatively small and does not significantly affect carriage performance.

Figure 52A:
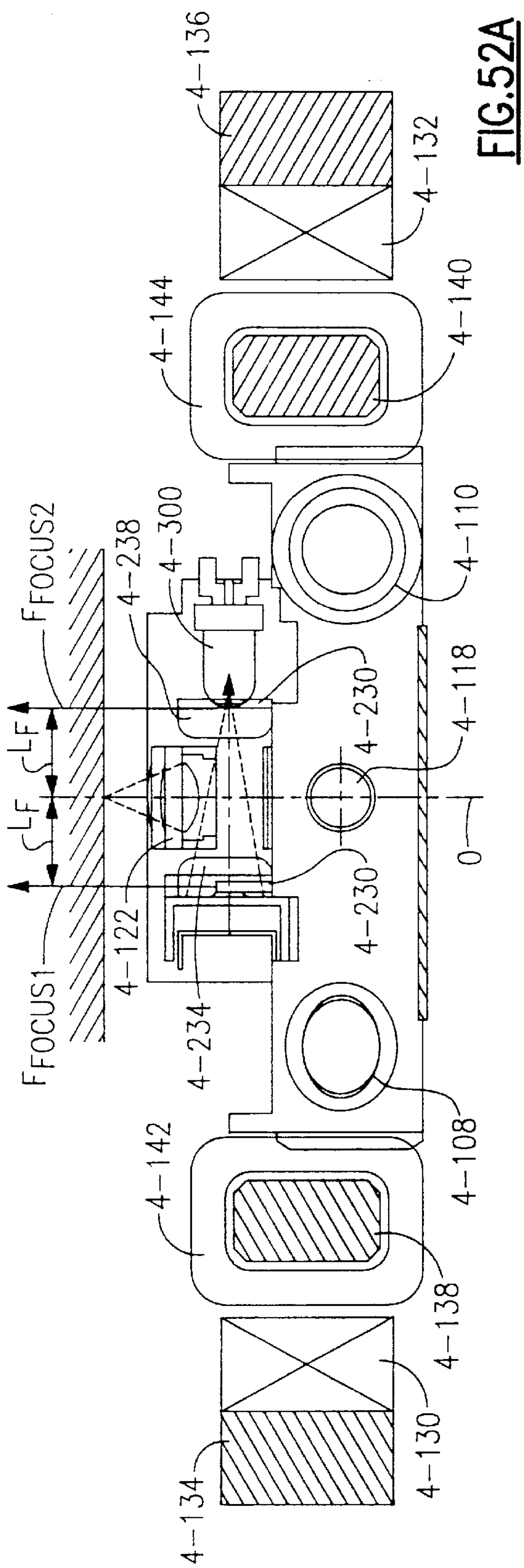
FIG. 52A is a schematic side view illustrating the symmetry of focus forces in the horizontal plane.
Figure 52B:
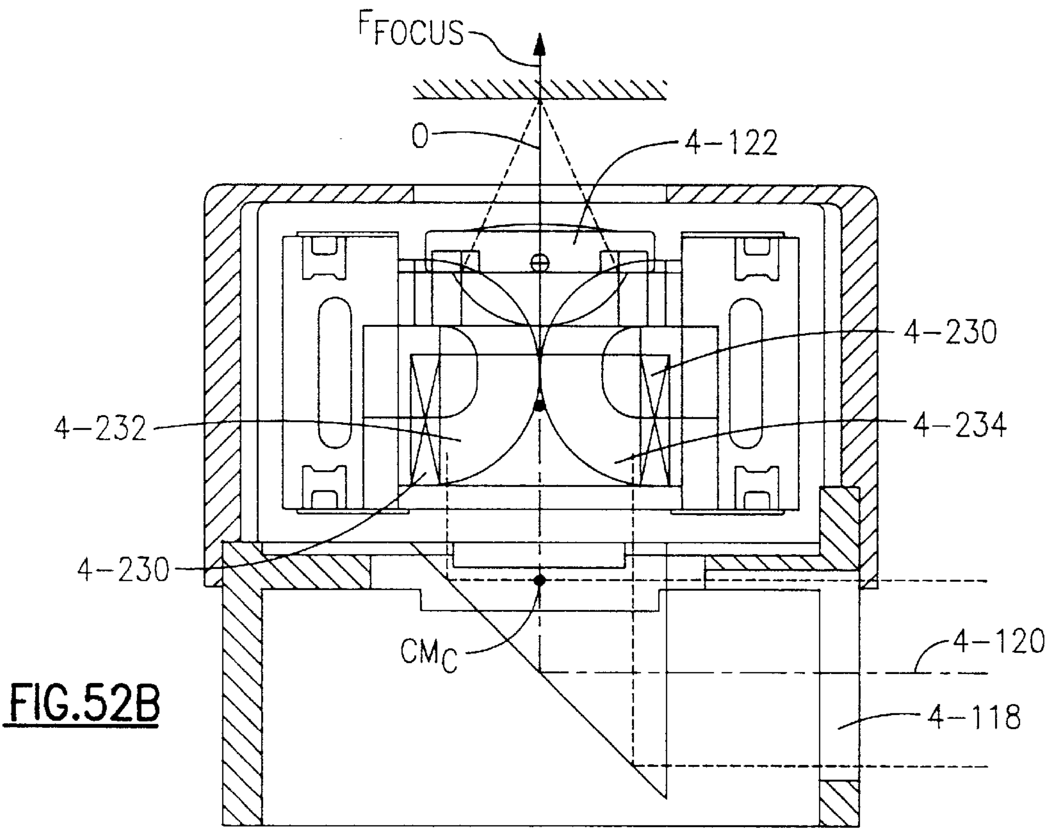
FIG. 52B is a schematic end view illustrating the alignment of the net focus force with the optical axis of the objective lens.

The resultant focus forces $F_{Focus1}$ and $F_{Focus2}$ acting on the actuator 4-116 are illustrated in FIG. 52A. The focus forces $F_{Focus1}$ and $F_{Focus2}$ are centered in the portions of the focus coil 4-230 located between the tracking coils 4-232, 4-234, 4-236 and 4-238 and pole pieces 4-244, 4-246, adjacent the permanent magnets 4-250 and 4-252. The focus coil 4-230 is wound within the opening 4-212 in the lens holder 4-210, FIG. 44, such that the same amount of current flows through each side of the coil 4-230 adjacent the magnets, thus producing equal forces $F_{Focus1}$ and $F_{Focus2}$ at the sides of the lens holder 4-210 which act to move the lens holder and objective lens 4-122 carried thereon in a vertical direction. The coil is positioned symmetrically within the opening 4-212 in the lens holder 4-210 such that the centers of the forces $F_{Focus1}$ and $F_{Focus2}$ produced are positioned equidistantly at distances $L_F$ from the optical axis O of the objective lens 4-122. In this configuration, the moments produced about the optical axis O of the lens 4-122 are equal, reducing roll of the lens holder 4-210. Additionally, as illustrated in FIG. 52B, when viewed from the end of the carriage, the focus forces $F_{Focus1}$ and $F_{Focus2}$ ($F_{Focus}$ in the drawing) are aligned with the center of mass $CM_C$ of the carriage mass, thereby reducing pitch of the carriage 4-106.

Figure 53A:
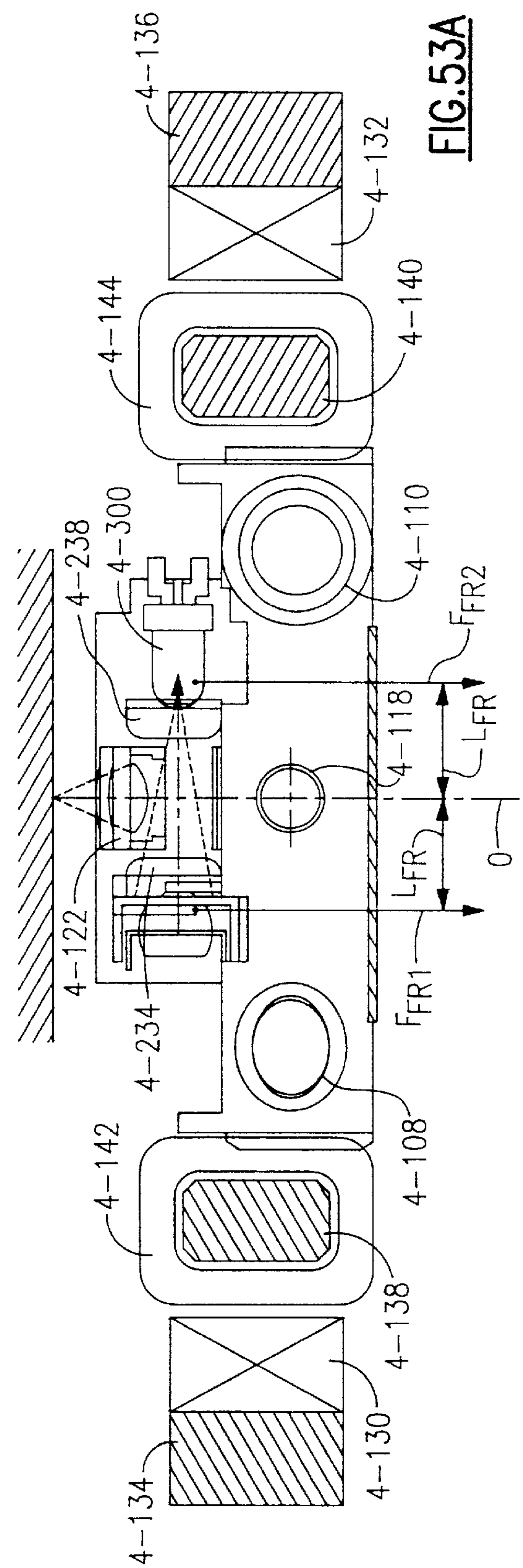
FIG. 53A is a schematic side view which illustrates the symmetry of focus reaction forces in the horizontal plane.
Figure 53B:
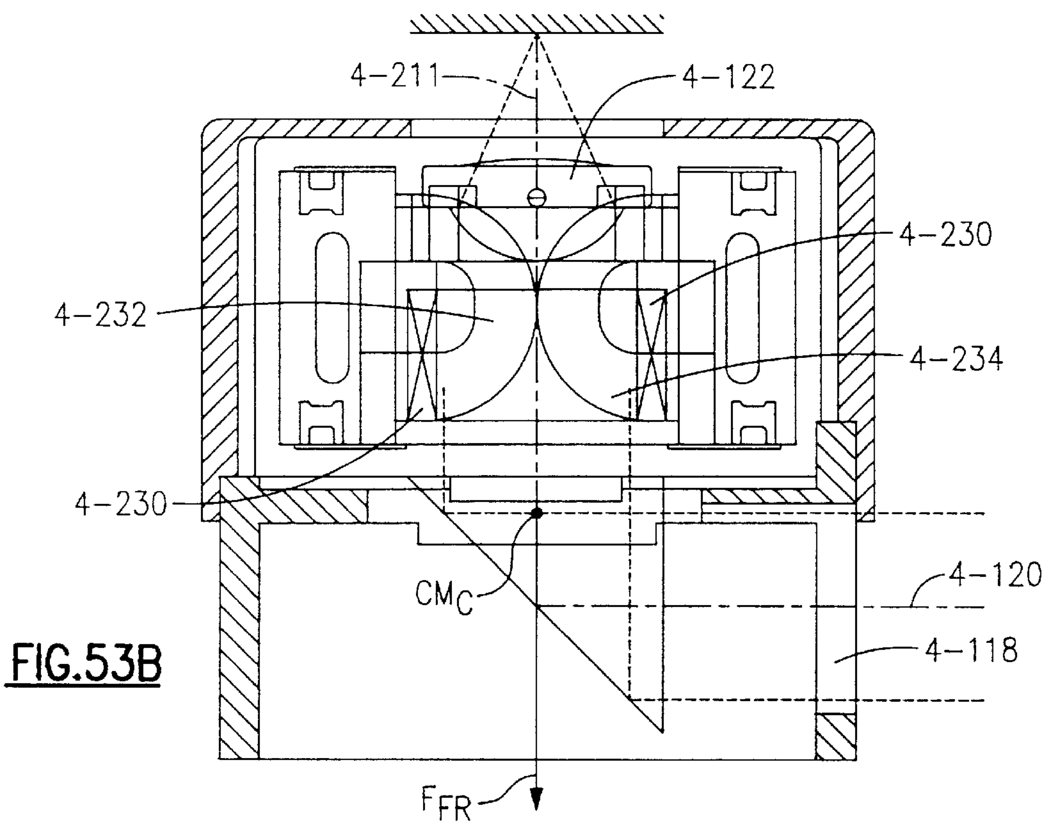
FIG. 53B is a schematic end view which illustrates the alignment of the net focus reaction force with the optical axis of the objective lens.

The reaction forces $F_{FR1}$ and $F_{FR2}$ produced in response to the focus forces $F_{Focus1}$ and $F_{Focus2}$ shown in FIG. 52A are illustrated in the horizontal plane in FIG. 53A. The reaction forces $F_{FR1}$ and $F_{FR2}$ are equal in magnitude and opposite in direction to the focus forces $F_{Focus1}$ and $F_{Focus2}$ and are centered adjacent the fine motor permanent magnets 4-250 and 4-252 intermediate the pole pieces 4-244 and 4-246. As described above, the focus forces $F_{Focus1}$ and $F_{Focus2}$ are equal, and thus, the reaction forces $F_{FR1}$ and $F_{FR2}$ are equal as well. Further, the reaction forces $F_{FR1}$ and $F_{FR2}$ act at equal distances $L_{FR}$ from the optical axis O of the objective lens 4-122 to further reduce pitch. Additionally, as illustrated in FIG. 53B, when viewed from the end of the carriage 4-106, the reaction forces $F_{FR1}$ and $F_{FR2}$ ($F_{FR}$ in the drawing) are aligned with the center of mass $CM_C$ of the carriage mass, thereby reducing pitch of the carriage.

Figure 54:
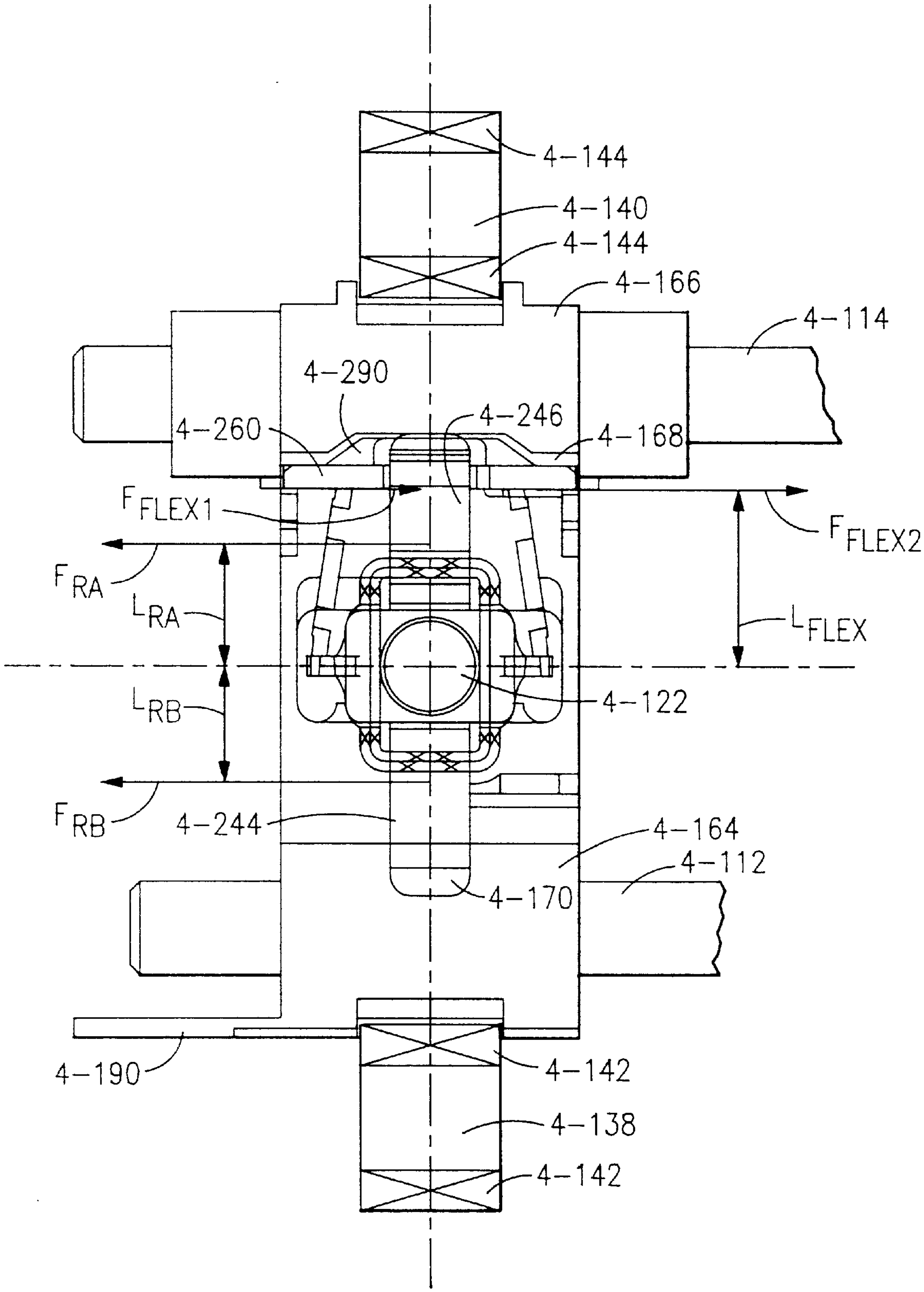
FIG. 54 is a schematic top view illustrating the flexure forces and fine motor reaction forces generated in response to the flexure forces.

Forces $F_{Flex1}$ and $F_{Flex2}$ generated by the flexure arms 4-260, 4-262, 4-264, and 4-266 on the lens holder 4-210 are illustrated in FIG. 54. The forces $F_{Flex1}$ and $F_{Flex2}$ illustrated are those acting on the upper flexure arms 4-260, 4-262. It should be understood by those skilled in the art that identical forces act on the lower flexure arms 4-264 and 4-266, as well. The forces $F_{Flex1}$ and $F_{Flex2}$ acting on the upper flexure arms 4-260 and 4-262, respectively, are centered at the crossbar sections 4-280 of the flexure arms 4-260 and 4-262 where the flexure arms are attached to the support member 4-290. As previously described, when these forces $F_{Flex1}$ and $F_{Flex2}$ act on the flexure arms 4-260 and 4-262, the flexure arms bend in the appropriate direction to achieve fine tracking. To maintain the flexure arms 4-260 and 4-262 in their bent condition, the fine motor generates reaction forces $F_{RA}$ and $F_{RB}$ which are centered at the pole pieces 4-244 and 4-246 on either side of the lens holder 4-210. As shown, the flexure forces $F_{Flex1}$ and $F_{Flex2}$ act a distance $L_{Flex}$ from the optical axis O of the focus lens 4-122, while the reaction forces $F_{RA}$ and $F_{RB}$ act distances $L_{RA}$ and $L_{RB}$ from the optical axis O, respectively. It will be apparent to those skilled in the art that the moments produced about the optical axis O of the lens 4-122 by the pairs of forces are not equal, since ($F_{Flex1}$+$F_{Flex2}$) does not equal ($F_{RA}$ $L_{RA}$+$F_{RB}$ $L_{RB}$). Since, however, these forces are effectively decoupled from the carriage except at very low frequencies (typically below around 40 Hz), these forces do not affect actuator performance at most normal operating conditions.

Figure 55A:
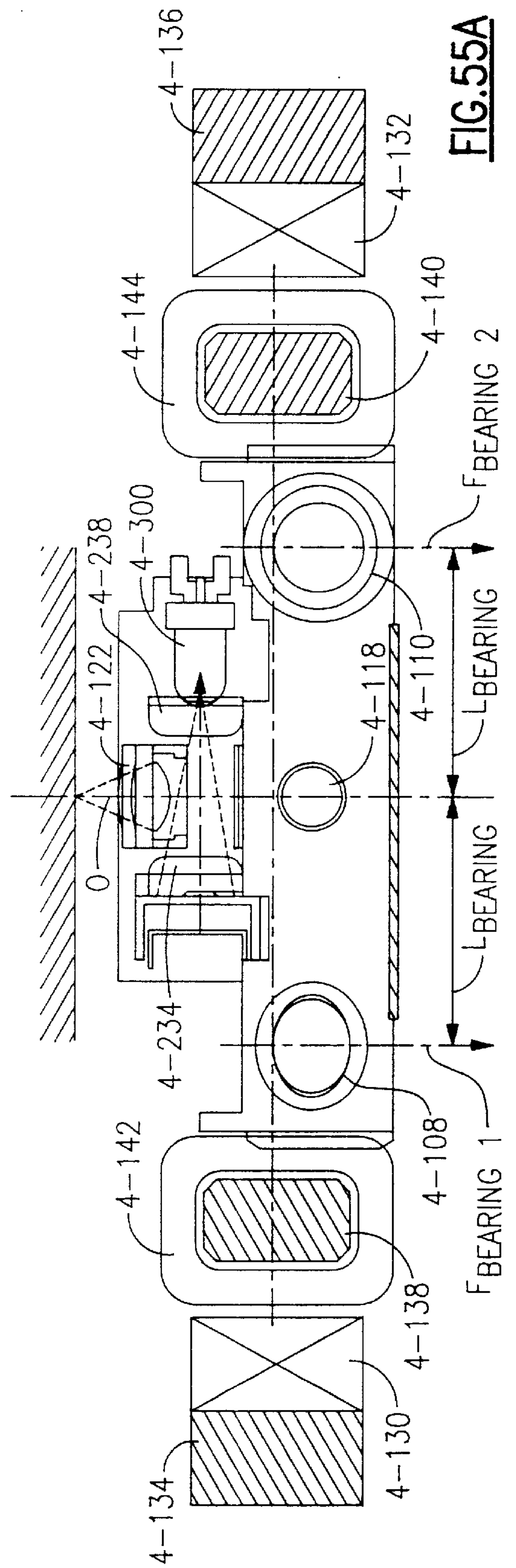
FIG. 55A is a schematic side view which illustrates the symmetry of carriage suspension forces in the horizontal plane.
Figure 56B:
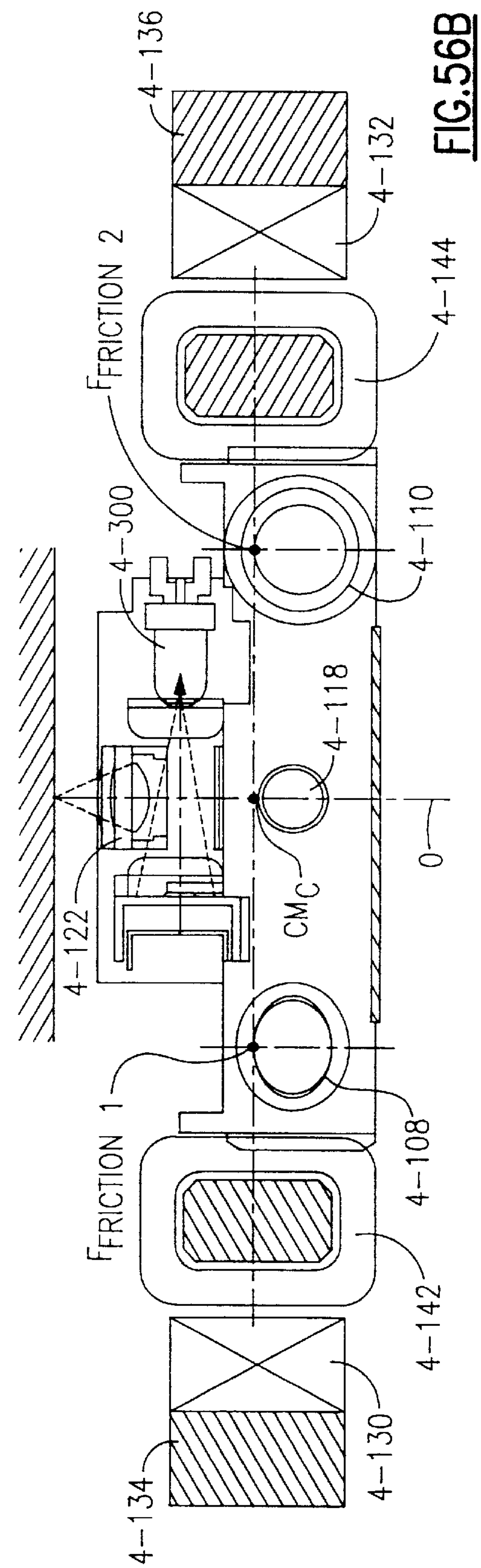
FIG. 56B is a schematic side view illustrating the alignment of the friction forces with the center of mass of the carriage.
Figure 55B:
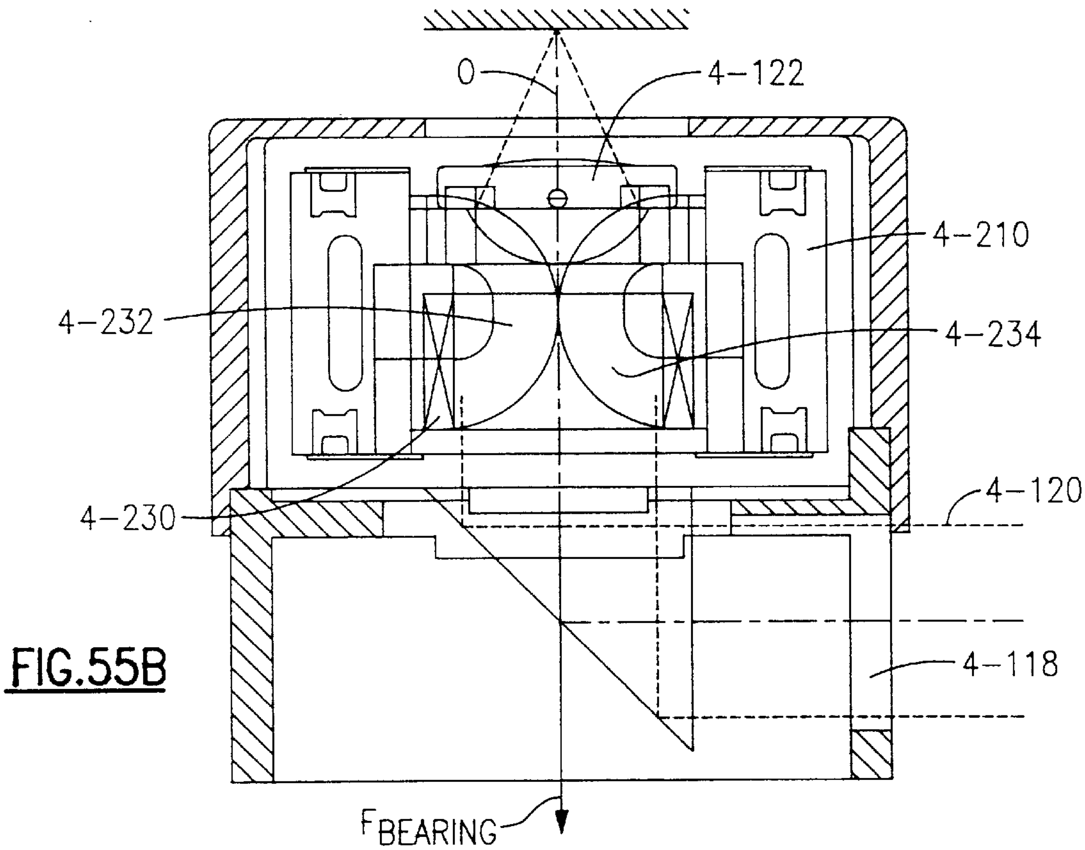
FIG. 55B is a schematic end view illustrating the alignment of the net carriage suspension force with the optical axis of the objective lens.

As described above, the carriage 4-106 includes two bearing surfaces 4-108 and 4-110 which are slidably mounted on the guide rails 4-112 and 4-114 in order to position the carriage 4-106 beneath various data tracks on the optical disc. In essence, the bearings 4-108 and 4-110 act as "springs" which hold the carriage 4-106 above the rails 4-112 and 4-114. Bearing "spring" stiffness forces $F_{Bearing1}$ and $F_{Bearing2}$ are illustrated in FIG. 55A. The forces $F_{Bearing1}$ and $F_{Bearing2}$ are centered at the point of contact between the bearing surfaces 4-108 and 4-110 and the rails 4-112 and 4-114 and extend downwardly through the center of the rails. As described above, the surface contact area between the bearing surface 4-108 and rail 4-112 is approximately equal to the surface contact area between the bearing surface 4-110 and rail 4-114, and thus these stiffness forces $F_{Bearing1}$ and $F_{Bearing2}$ are substantially equal. The bearing surfaces 4-108 and 4-110 are positioned at equal distances $L_{Bearing}$ from the optical axis O of the lens 4-122 so that the moments about the optical axis O produced by these forces $F_{Bearing1}$ and $F_{Bearing2}$ are equal, minimizing carriage yaw. Referring to FIG. 55B, in the vertical plane, the net carriage suspension force $F_{Bearing}$ acts at a point directly between the two bearings and aligned with the optical axis O.

Figure 56A:
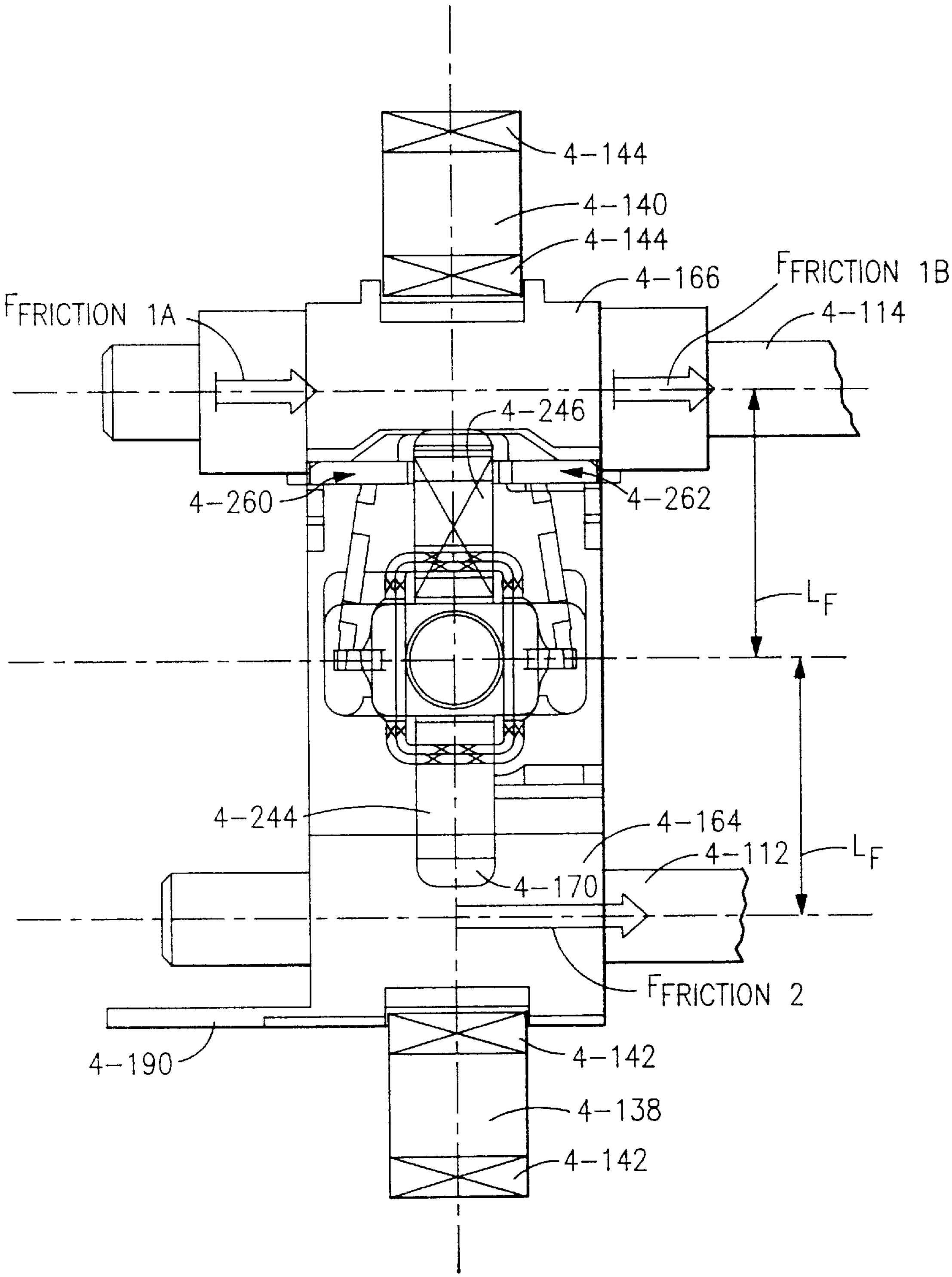
FIG. 56A is a schematic top view which illustrates the symmetry of friction forces in the horizontal plane.
Figure 58A:
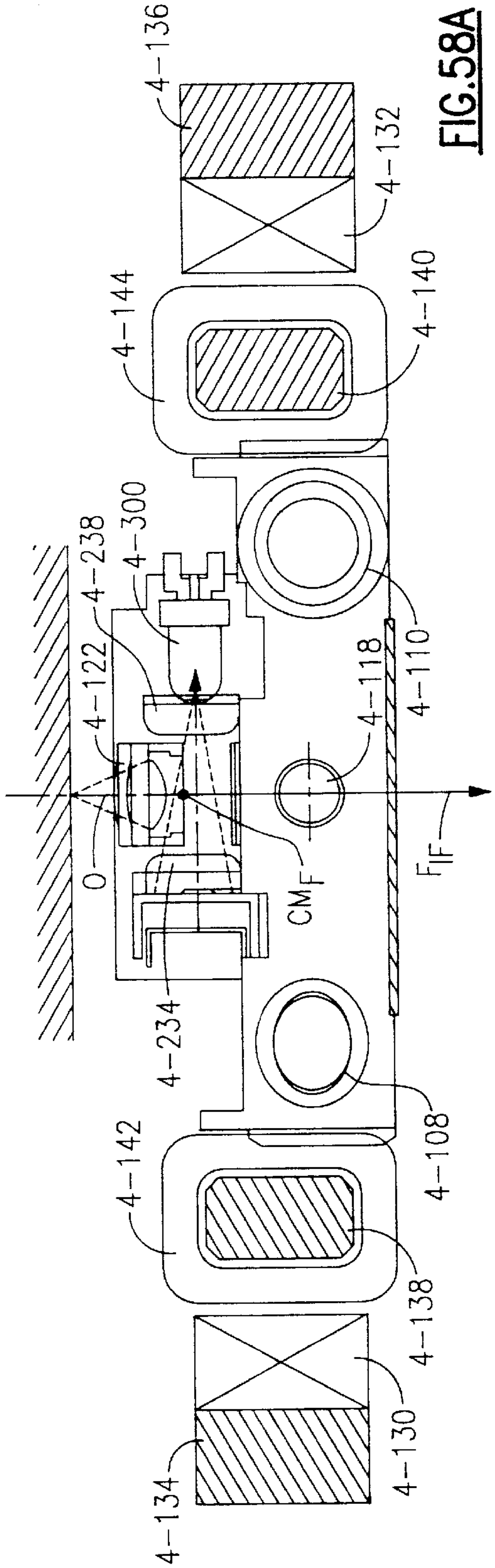
FIG. 58A is a schematic side view illustrating the alignment of the net inertial force of the fine motor with the optical axis of the objective lens.
Figure 58B:
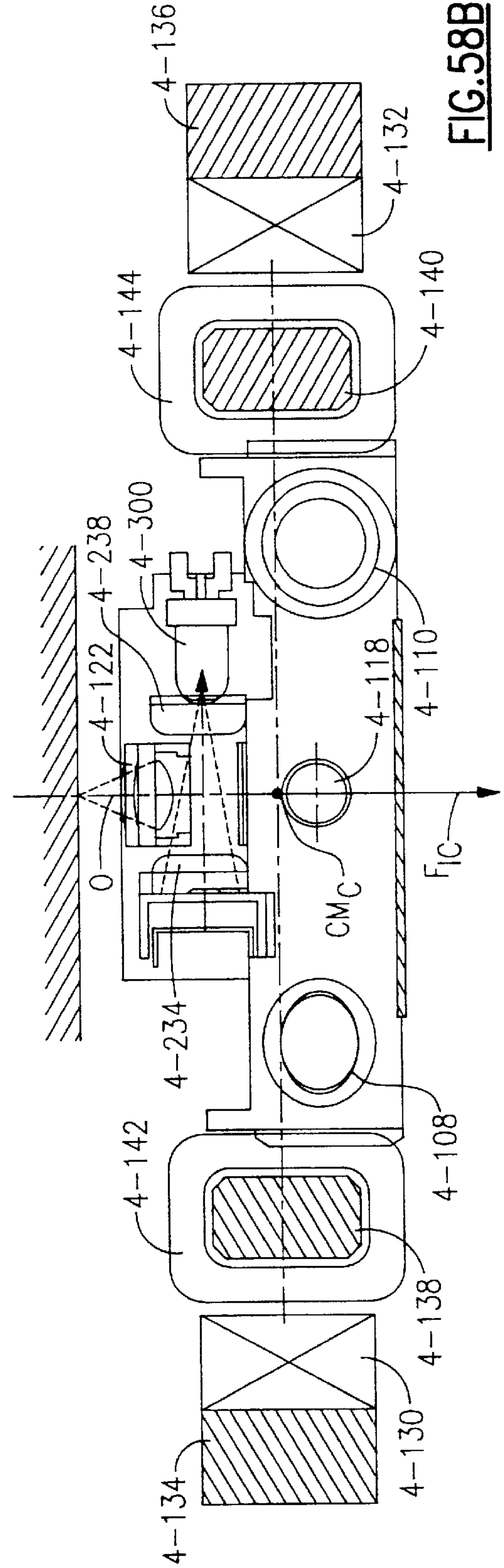
FIG. 58B is a schematic side view illustrating the alignment of the net inertial force of the carriage with the optical axis of the objective lens.

Friction forces $F_{Friction1A}$, $F_{Friction1B}$, and $F_{Friction2}$ acting on the bearing surfaces 4-108, 4-110 and rails 4-112 and 4-114 are illustrated in FIG. 56A. As the first bearing surface 4-108 includes two sections 4-160 and 4-162, the two friction forces $F_{Friction1A}$ and $F_{Friction1B}$ are present, one associated with each bearing section 4-160 and 4-162, respectively, which are centered at the middle of the bearings along the area of contact with the rail 4-114. The second friction force $F_{Friction2}$ acts on the second bearing surface 4-108 and is centered in the middle of the bearing along its contact with the rail 4-112 as shown. Because the area of contact of the bearing sections 4-160 and 4-162 forming the first bearing surface 4-110 substantially equals the area of contact of the second bearing surface 4-108, and the amount of pre-loading and coefficient of friction is the same for both bearing surfaces, the sum of the friction forces $F_{Friction1A}$ and $F_{Friction1B}$ equals the friction force $F_{Friction2}$. The bearing surfaces 4-112 and 4-114 are located at equal distances $L_F$ from the optical axis O of the focus lens 4-122, and the resulting moments about the optical axis of the lens are then equal as well. In the vertical plane, the forces $F_{Friction1A}$, $F_{Friction1B}$, and $F_{Friction2}$, act at the areas of contact between the rails 4-112, 4-114 and the bearing surfaces 4-108, 4-110, FIG. 56B which are advantageously designed to be horizontally aligned with the center of mass of the carriage mass $CM_C$, such that moments about the center of mass which can produce carriage pitch are reduced.

Figure 57:
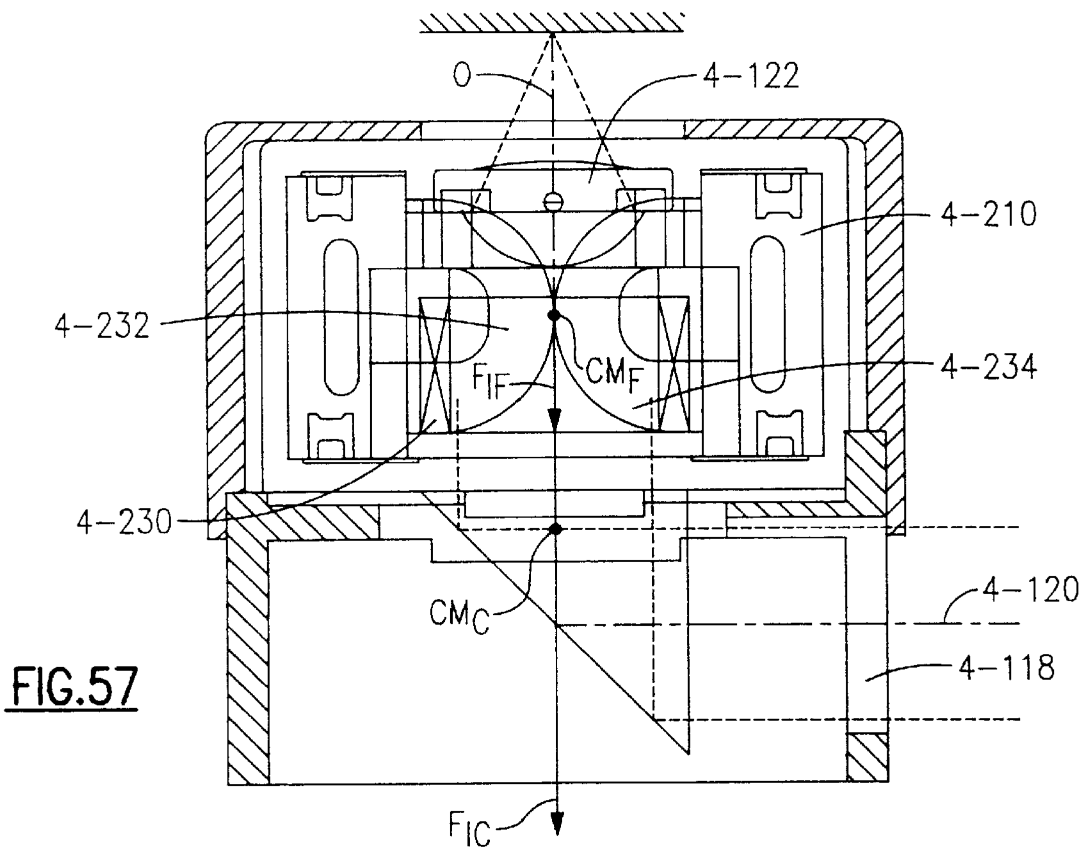
FIG. 57 is a schematic end view which illustrates the net inertial forces acting at the center of mass of the fine motor and center of mass of the carriage in response to a vertical acceleration.

FIGS. 57–60 illustrate the inertial forces acting on the carriage 4-106 and actuator 4-116 for both vertical and horizontal accelerations. The inertial forces acting on the fine motor and carriage in response to a vertical acceleration of the assembly are shown in FIG. 57. A first downward inertial force $F_{IF}$, FIGS. 57 and 58A, equal to the mass of the fine motor multiplied by the acceleration acts at the center of mass of the fine motor mass $CM_F$. A second downward inertial force $F_{IC}$, FIGS. 57 and 58B, acts at the center of mass of the carriage mass $CM_C$ and is equal to the mass of the carriage multiplied by the acceleration. FIGS. 58A and 58B further illustrate that the inertial forces $F_{IF}$ and $F_{IC}$ are horizontally aligned with the optical axis O of the objective lens 4-122.

Figure 59A:
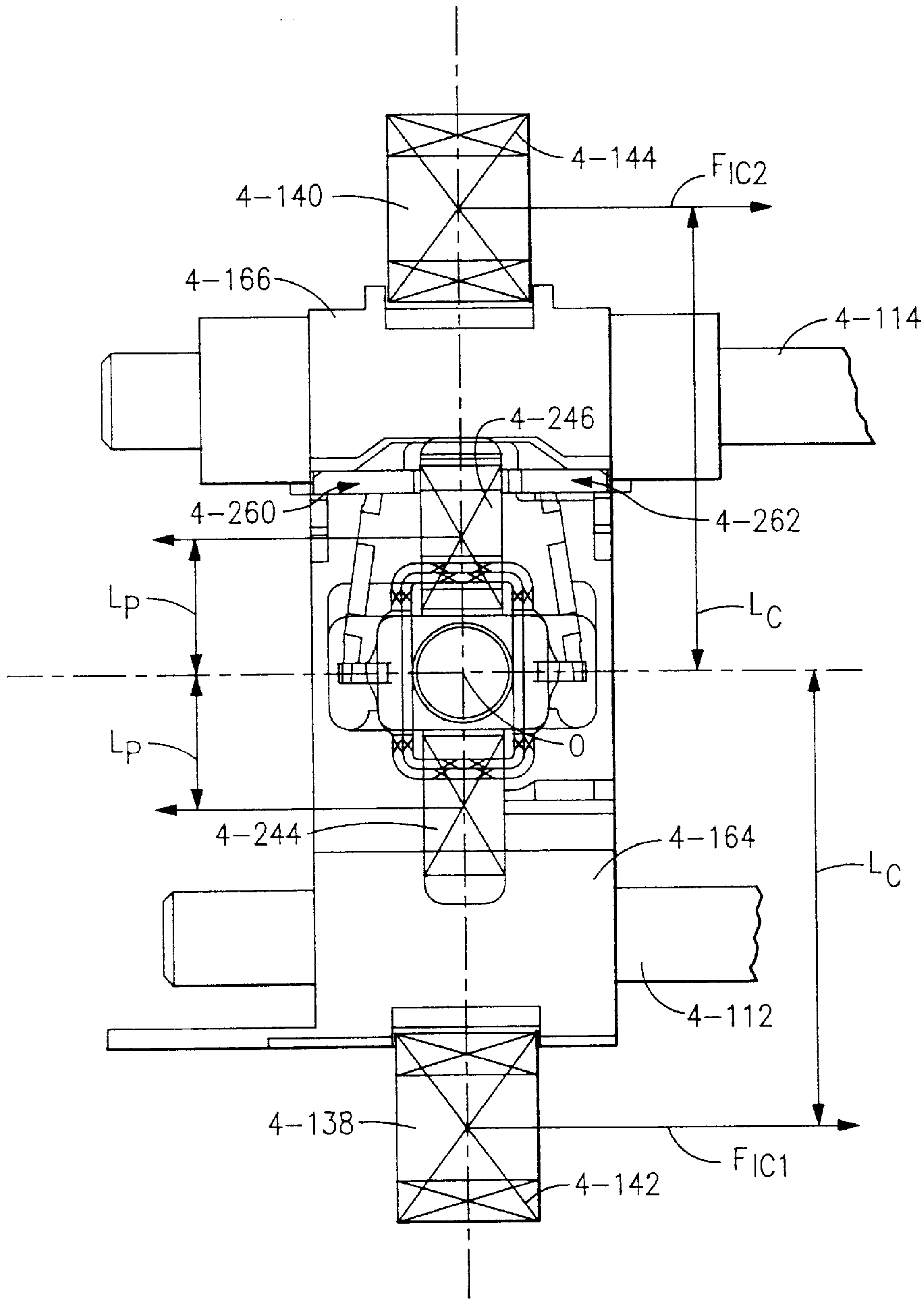
FIG. 59A is a schematic top view which illustrates the inertial forces acting on components of the carriage and actuator assembly for horizontal accelerations.
Figure 59B:
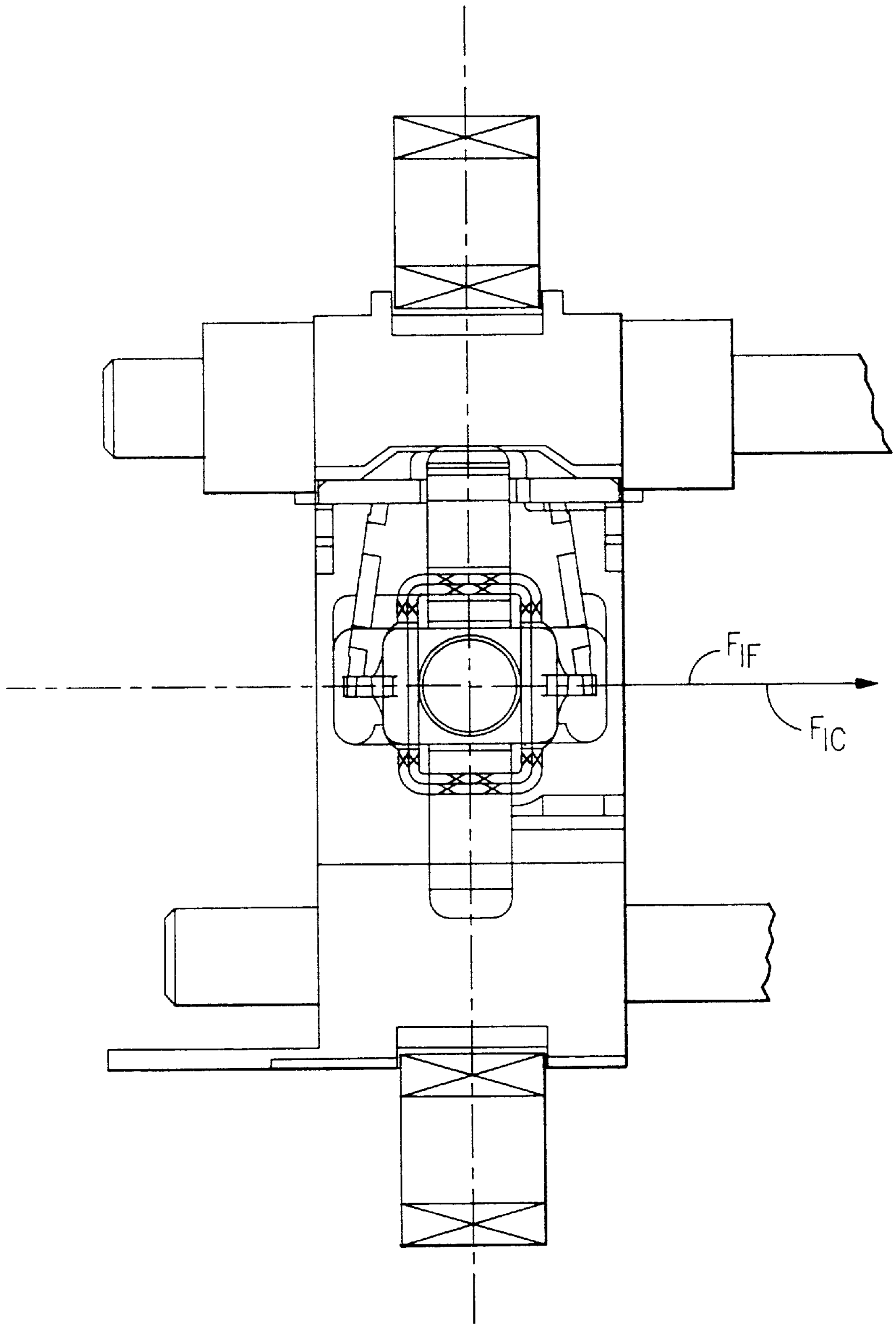
FIG. 59B is a schematic top view illustrating the net inertial forces for horizontal accelerations.

FIG. 59A illustrates the inertial forces acting on the coarse coils 4-142, 4-144 and fine motor pole pieces 4-244, 4-246 for horizontal accelerations of the carriage and fine motor, respectively. An inertial force $F_{IC1}$ acts at the center of upper portion of the first coarse coil 4-142 and an inertial force $F_{IC2}$ acts at the center of the upper portion of the second coarse coil 4-144. As described above, the coils 4-142 and 4-144 are of identical dimensions, such that the mass of the first coil 4-142 equals the mass of the second coil 4-144. The magnitude of each force $F_{IC1}$ and $F_{IC2}$ is equal to mass of the respective coil multiplied by the acceleration, and thus, the inertial forces acting on the coils 4-142 and 4-144 are equal. Because the coils 4-142 and 4-144 are positioned at equal distances $L_C$ from the optical axis O of the objective lens 4-122, the resulting moments about the optical axis of the lens produced by the inertial forces $F_{IC1}$ and $F_{IC2}$ are equal. Similarly, because the fine motor pole pieces 4-244 and 4-246 are of equal dimensions and are located at equal distances $L_P$ from the optical axis O, the inertial forces $F_{IP1}$ and $F_{IP2}$ acting on the pole pieces are equivalent, and the resulting moments about the optical axis O of the objective lens 4-122 are equal. Applying this same analysis to all other components or "subparts" of the carriage and actuator assembly, and as will be explained in more detail below, the inertial forces produced by horizontal and vertical accelerations above the resonance frequency of the flexure arms are balanced and symmetric with respect to the optical axis O. The net inertial forces of the fine motor and carriage $F_{IF}$ and $F_{IC}$ for acting on the assembly for horizontal accelerations thus act along a line through the center of the carriage which intersects the optical axis O as shown in FIG. 59B. The net inertial force due to the coarse motor $F_{IC}$ is equal to the mass of the coarse motor multiplied by the acceleration, while the net inertial force due to the fine motor $F_{IF}$ is equal to the mass of the fine motor multiplied by the acceleration.

Figure 60A:
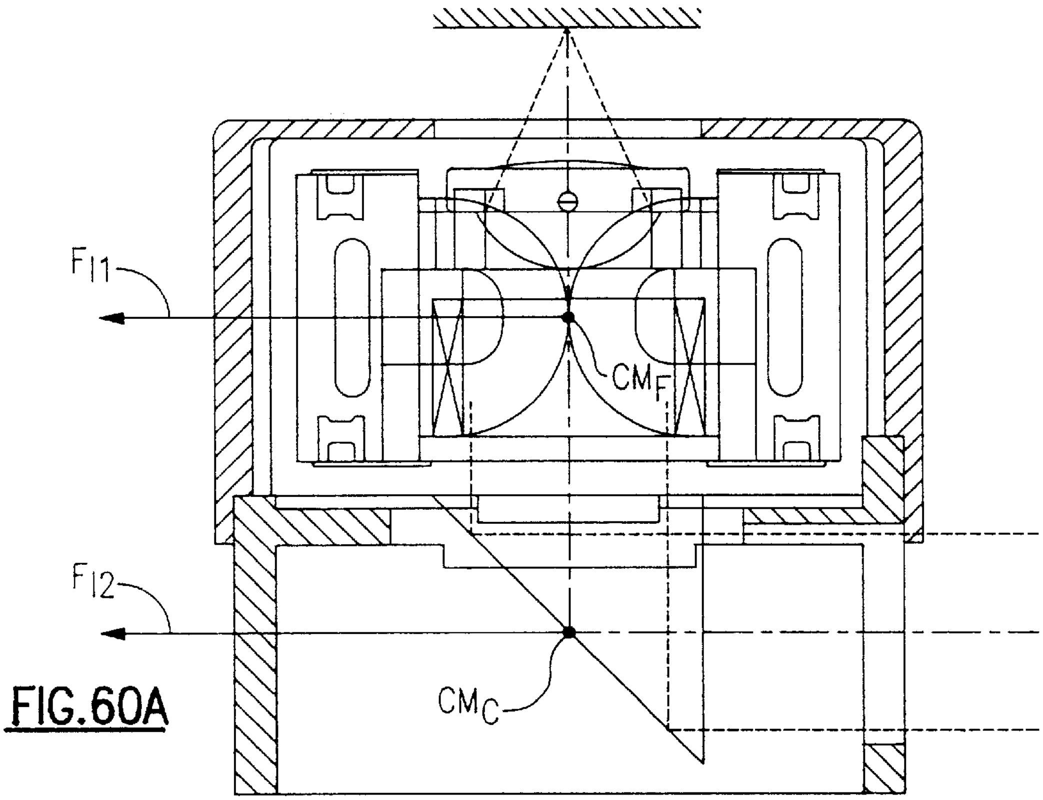
FIG. 60A is a schematic end view which illustrates the fine motor and carriage inertial forces for accelerations above the flexure arm resonance frequency.

At high frequencies, being accelerations in the tracking direction above the lens holder-flexure arm resonance frequency, approximately 40 Hz, components of the assembly 4-100 decouple and do not affect the position of the objective lens 4-122. Consequently, the inertial forces differ for accelerations above and below the flexure arm resonance frequency. The inertial forces for horizontal accelerations at these high frequencies are illustrated in FIG. 60A. At these high frequencies, the actuator 4-116 is decoupled from the carriage 4-106, such that a first inertial force $F_{I1}$ equal to the mass of the fine motor multiplied by the acceleration acts at the center of mass of the fine motor mass $CM_F$, and a second inertial force $F_{I2}$ equal to the mass of the coarse motor multiplied by the acceleration is centered at the center of mass of the carriage mass $CM_C$.

Figure 60B:
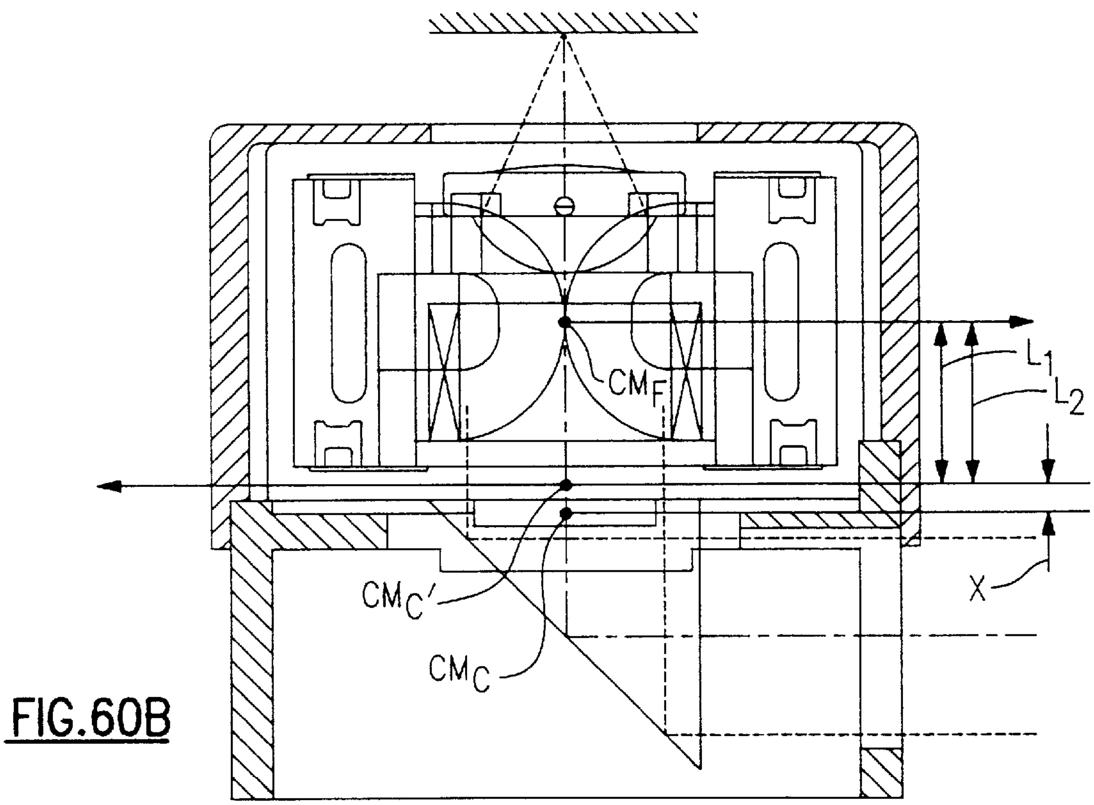
FIG. 60B is a schematic end view which illustrates the fine motor and carriage inertial forces for accelerations below the flexure arm resonance frequency.

FIG. 60B illustrates the inertial forces at horizontal accelerations below the flexure arm resonance frequency. At these lower frequencies, the fine motor mass and carriage mass move as a unit which has a net center of mass at $CM_C'$. As illustrated, this net center of mass $CM_C'$ is located at a distance x vertically above the center of mass of the carriage mass $CM_C$, and thus the coarse motor forces $F_{Coarse1}$ and $F_{Coarse2}$, and the friction forces $F_{Friction1}$ and $F_{Friction2}$, are no longer aligned with the carriage mass center of mass, now shifted to $CM_C'$. Although this vertical shift in the carriage center of mass occurs, the symmetrical design of the assembly 4-100 ensures that the center of mass of the carriage mass $CM_C$ does not shift in the horizontal plane, and the forces acting on the carriage remain symmetrical about the center of mass and optical axis O in spite of the vertical shift in the center of mass from $CM_C$ to $CM_C'$.

Further, the symmetry of the design ensures that horizontal shifting of the center of mass $CM_C$ does not occur when subparts or components of the carriage decouple at high frequencies. For example, at frequencies in the KHz range, the fine motor poles pieces 4-244, 4-246 and magnets 4-250, 4-252 will decouple. Due to the symmetry of the design, however, the center of mass will not shift in the horizontal plane. Because there is no shift of the center of mass $CM_C$ in the horizontal plane, reaction forces of the focus motor will not pitch or roll the carriage at frequencies above those where subparts have come "loose". Thus, by horizontally aligning the center of mass with the optical axis O of the objective lens 4-122, the lens sits "in the eye of the storm", where its position is minimally affected by resonance, motor, and reaction forces acting on the assembly 4-100.

Figure 61A:
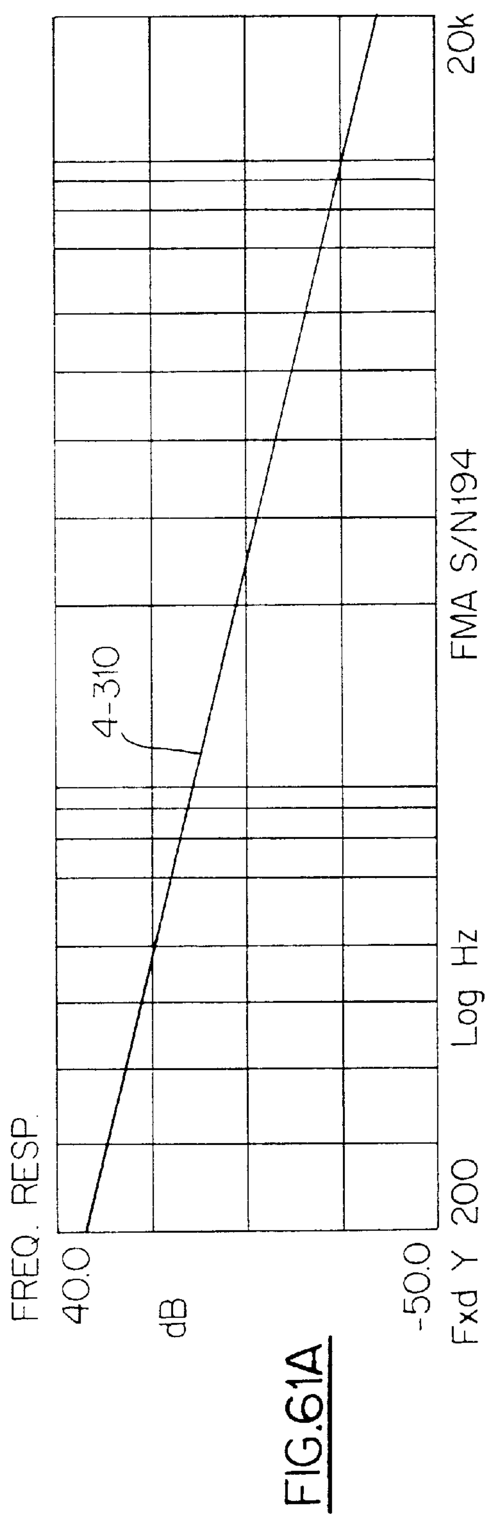
FIGS. 61A–61D are diagrams illustrating the relationship between the fine tracking position versus fine motor current.
Figure 61B:
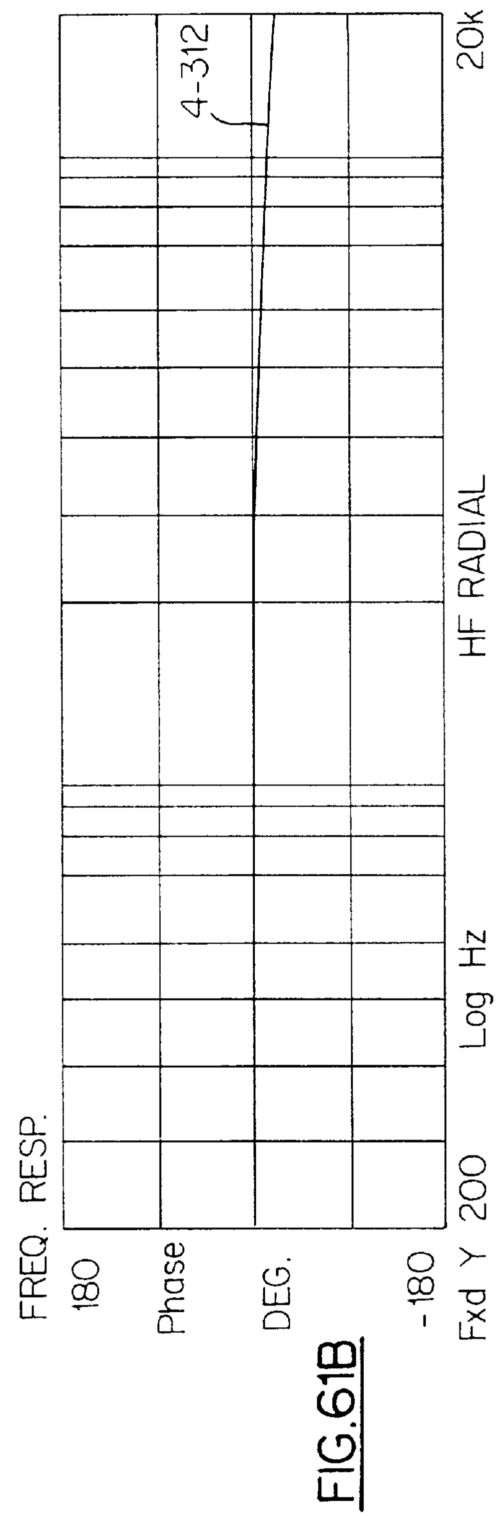
Figure 61C:
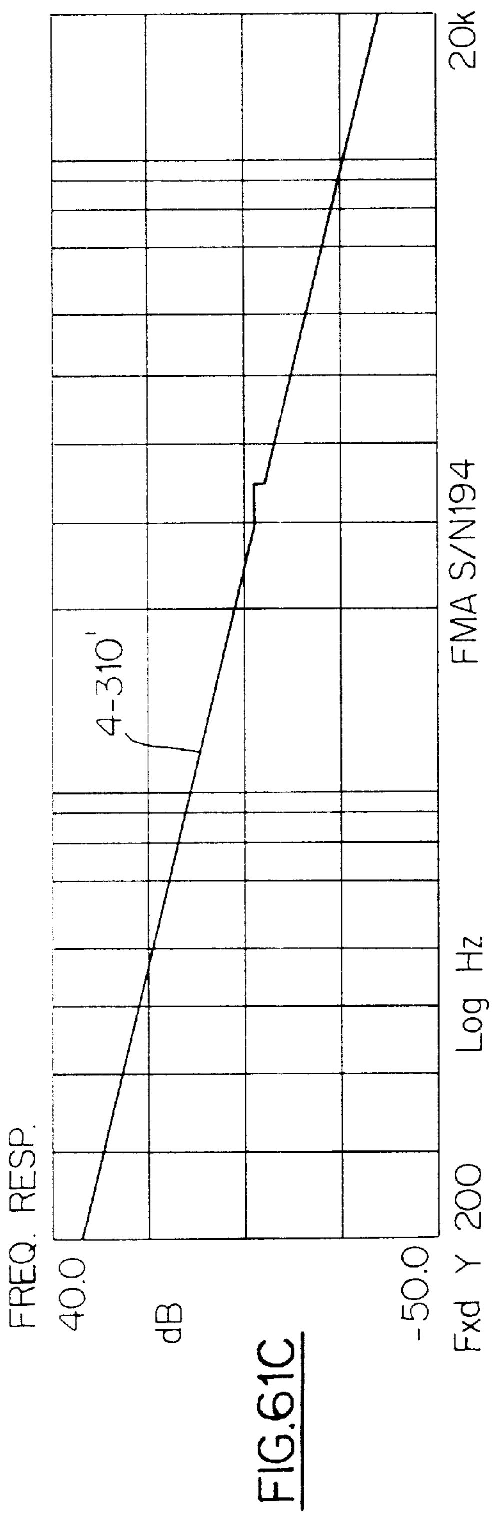
Figure 61D:
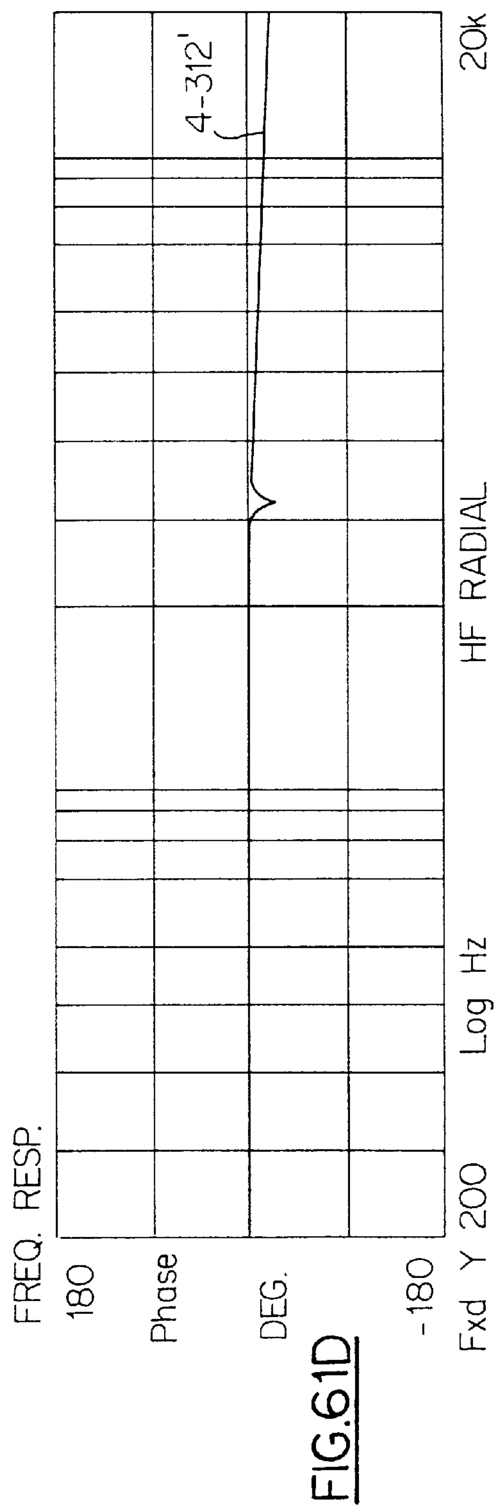

FIGS. 61A and 61B illustrate the Bode transfer diagram of fine tracking position versus fine motor current of the actuator 4-116 of the present invention for an objective lens of 0.24 grams suspended in a fine motor having a mass of 1.9 grams. As illustrated in FIG. 61A, the actuator exhibits an almost ideal dB curve 4-310 having an approximate 40 dB/decade slope and an ideal phase shift curve 4-312, FIG. 61B. The two dB and phase shift curves are identified trace lines 4-310 and 4-312, respectively. FIGS. 61C and 61D illustrate the same transfer function when the lens is off centered in the horizontal or tracking direction by 0.15 mm. Both the dB and phase shift curves, trace lines 4-410' and 4-412', respectively, reveal a disturbance, or glitch, which occurs at approximately 3.2 kHz. The phase margin dips approximately 25 degrees, reducing loop damping and increasing settling time and overshoot. In terms of lens positioning, the horizontal shift in lens position disturbs the symmetry or balance of the fine tracking forces acting on the lens and results in a moment about the optical axis of the lens, resulting in yaw. Thus, it can be seen that the balancing of forces in the assembly 4-100 about the optical axis O of the objective lens 4-122 markedly improves tracking position.

Figure 62A:
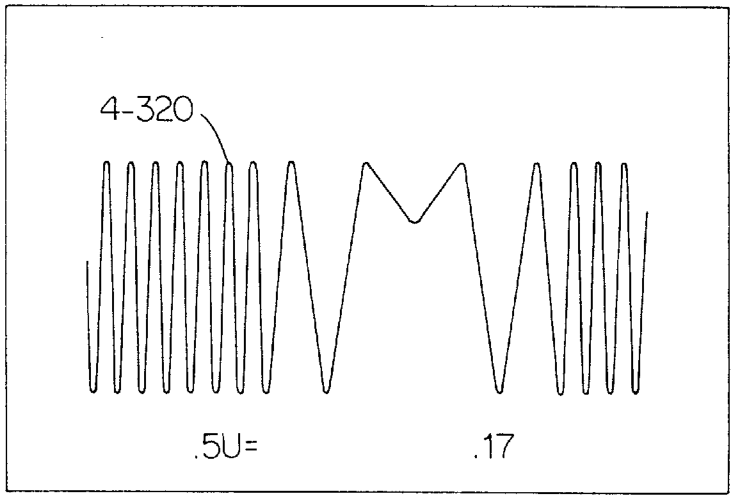
FIGS. 62A–62C illustrate the effects of asymmetrical focus forces acting on the assembly.
Figure 62B:
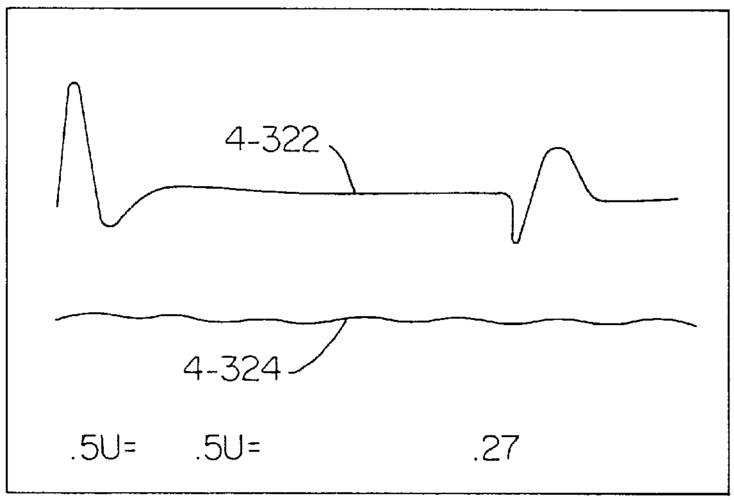
Figure 62C:
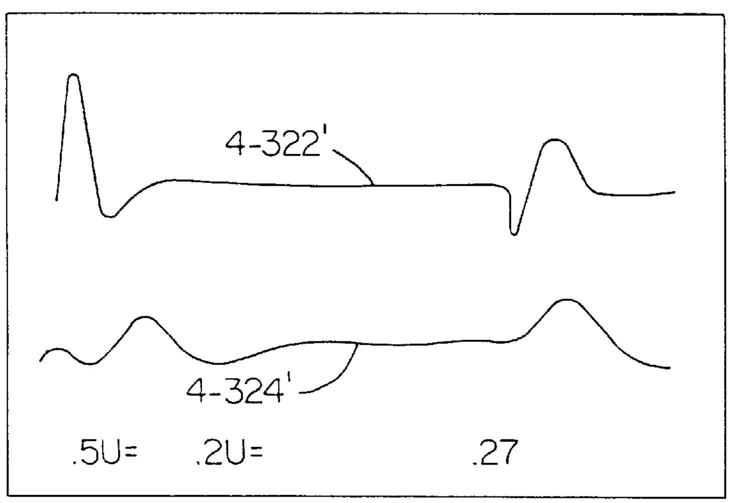

FIGS. 62A–62C illustrate the effects of asymmetrical focus forces acting on the assembly 4-100. FIG. 62A illustrates the tracking signal, illustrated as trace line 4-320, while crossing tracks for a track pitch of 1.5 um, wherein each sine wave corresponds to an information track on the surface of the optical disc. In FIG. 62B, the focus force is centered with the center of mass of the fine motor $CM_F$ and the optical axis O. The top trace 4-322 shows the current applied to the focus coil during the step, while the bottom trace 4-324 shows the tracking error signal while following a particular track, for a focus current of 0.1 Amp, and a focus acceleration of 0.75 $m/s^2$. As illustrated, the tracking error signal remains virtually unaffected by the focus current level. FIG. 62C shows the effect on the current and tracking error signals as in FIG. 62B when the focus force is shifted out of alignment with the optical axis O and center of mass $CM_F$ by approximately 0.2 mm. The corresponding curves are identified as trace lines 4-422' and 4-424', respectively. The tracking signal is now visibly affected by the focus current. With the same focus current and acceleration, a tracking offset of 0.022 um results. Typically, the total allowable track offset in an optical drive is in the range of 0.05 um to 0.1 um, and thus, by aligning the forces as in FIG. 62B, the tracking offset is significantly reduced.

Figure 63:
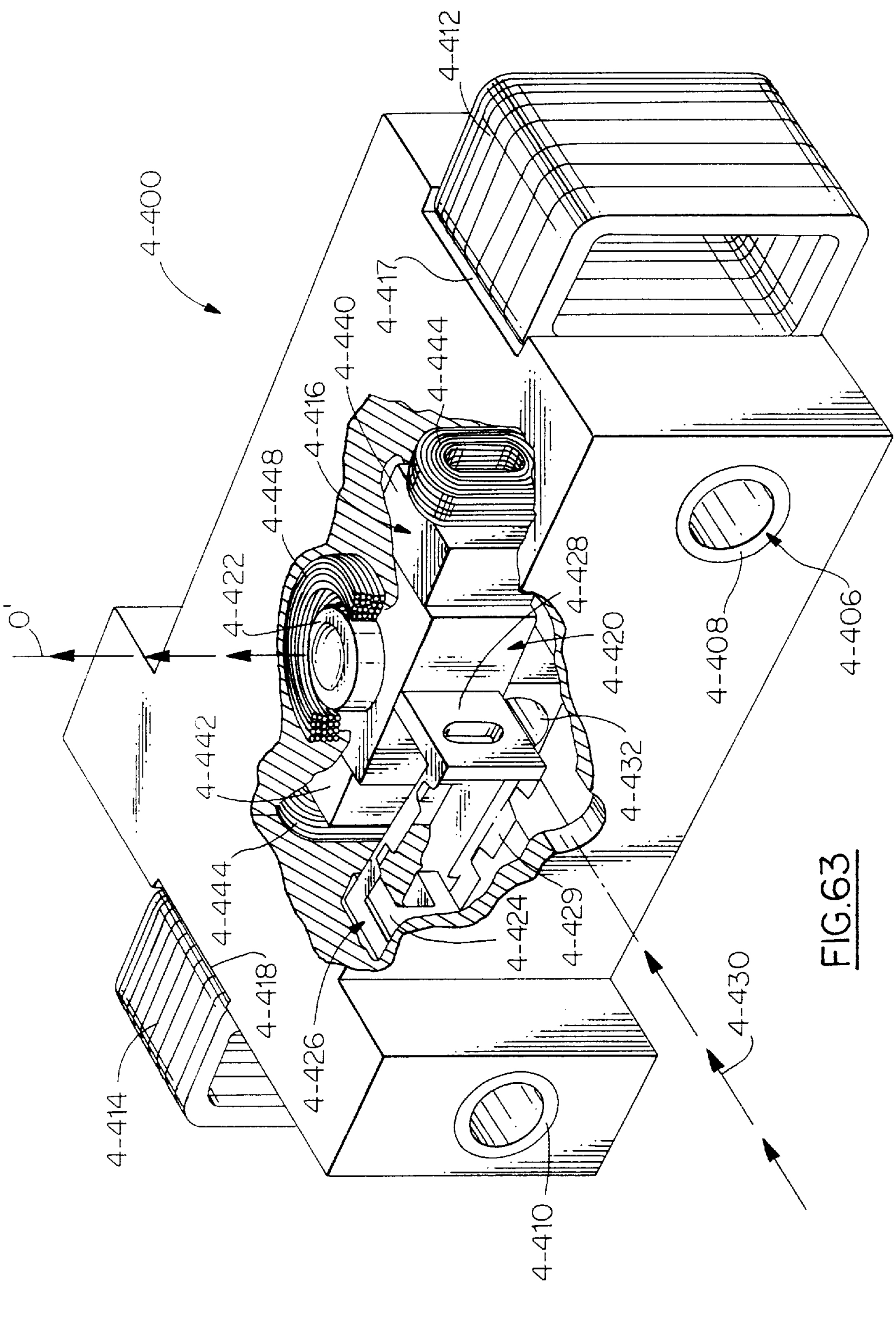
FIG. 63 illustrates an alternative embodiment of a carriage and actuator assembly.

An alternative embodiment of a carriage and actuator assembly 4-400 in which the center of mass of a 2-D actuator coincides with the center of mass of the carriage mass is illustrated in FIG. 63. In addition to being substantially symmetrical about the optical axis of an objective lens, the center of mass of the fine motor mass coincides with the center of mass of the carriage mass and is aligned with the optical axis. The carriage and actuator assembly 4-100 of the first embodiment is adequate for most frequency ranges. The assembly 4-400 of the present alternative embodiment, however, may be used in applications where it is desirable to avoid the shift in the center of mass of the carriage mass at frequencies below the flexure arm resonance frequency.

The assembly 4-400 includes a carriage 4-406 having first and second bearing surfaces 4-408 and 4-410 substantially identical to those in assembly 4-100 which can be slidably mounted on guide rails (not shown), and a 2-D actuator 4-416 which is mounted within the carriage 4-406. The carriage 4-406 includes a pair of coarse tracking coils 4-412 and 4-414 positioned within respective notches 4-417 and 4-418 formed in the carriage 4-406, adjacent the bearing surfaces 4-408 and 4-410, which act to move the carriage 4-406 horizontally in a tracking direction, FIG. 65, to access various information tracks on the surface of an optical disc.

The actuator 4-416 includes a lens holder 4-420 having an objective lens 4-422 mounted thereon. A pair of ledges 4-424 formed on the top surface of the carriage 4-406 support a pair of top flexure arms 4-426 which are further attached to the top surfaces of a pair of projections 4-428 formed on the lens holder 4-420. A pair of bottom flexure arms 4-429 which are identical in structure to the top flexure arms 4-426 are supported by corresponding ledges in the bottom of the carriage (not shown), and attach to corresponding bottom surfaces of the projections 4-428 on the lens holder 4-420. A beam of light 4-430 enters the actuator 4-416 through a oval aperture 4-432 and is reflected by a mirror (not shown) contained inside the actuator 4-416 through the objective lens 4-422 along an optical axis O'. The actuator 4-416 is further attached to a focus and fine tracking motor which moves the lens 4-422 so as to precisely align and focus the exiting beam upon a desired location on the surface of the optical disc. The focus and fine tracking motor includes two permanent 4-440 and 4-442 magnets affixed to opposing ends of the lens holder 4-420. An oval-shaped fine tracking coil 4-444 is affixed to each permanent magnet 4-440 and 4-442, adjacent the carriage bearing surfaces 4-408 and 4-4-410. A focus coil 4-448 is attached to the top and bottom surfaces of the carriage 4-406 and supported by ledges formed within the interior of the carriage such that the lens holder 4-420 is positioned between the focus coils 4-448.

Coarse tracking movement of the carriage 4-406 and actuator 4-416 is effected in a manner identical to that of the assembly 4-100 illustrated in FIGS. 46 and 47. When a current is applied to the coarse tracking coils 4-412 and 4-414 in the presence of a magnetic field, a force is generated according to Lorentz law which acts to move the carriage 4-406 and actuator 4-416 in a tracking directions, FIG. 65, so as to position the objective lens 4-422 beneath various information tracks on the optical disc.

Figure 64:
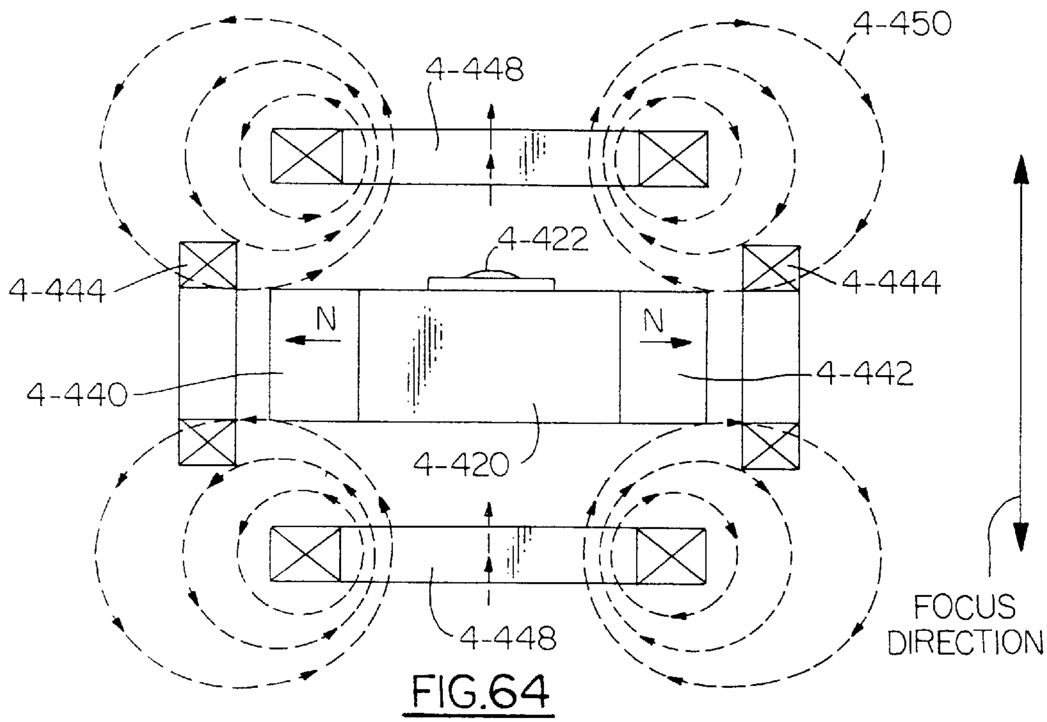
FIG. 64 illustrates the operation of the actuator to move the lens holder in a focusing direction.

FIG. 64 illustrates the operation of the actuator 4-416 to move the lens holder 4-420 and objective lens 4-422 carried thereon in a focusing direction. When a current is generated in the focus coils 4-448, an electromagnetic field 4-450 is induced in each of the coils. The electromagnetic field 4-450 differs in direction for the respective focusing coils as shown. In the example shown, both permanent magnets 4-440 and 4-442 will be attracted by the bottom focus coil 4-448 (not shown) and repelled by the top focus coil 4-448, thus moving the objective lens holder 4-420 toward the bottom focus coil 4-448 and away from the top focus coil 4-448 to position the objective lens 4-422 further away from the surface of the optical disc, wherein the magnitude of the displacement depends on the strength of the induced electromagnetic field.

Figure 65:
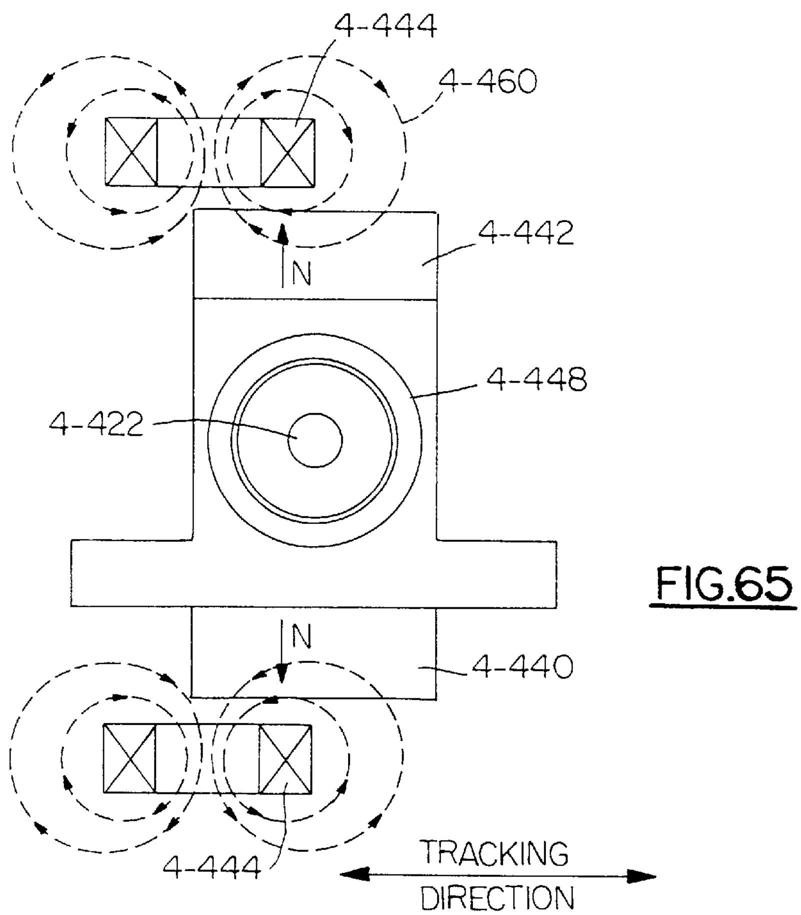
FIG. 65 illustrates the operation of the actuator to move the lens holder in a tracking direction.

In a similar manner, FIG. 65 illustrates the permanent magnets 4-440 and 4-442 interacting with the fine tracking coils 4-444. Energization of the tracking coils 4-444 moves the lens holder 4-420 horizontally in the tracking direction to the right or to the left depending upon the direction of current through the coils. For example, in the presence of the magnetic field 4-460 illustrated, the lens holder 4-420 and objective lens 4-422 are moved towards the left. In this manner, the fine tracking coils 4-444 act to more precisely position the light beam exiting the objective lens 4-422 within the center of a desired information track on the optical disc.

In the following discussion, the identified forces and lengths correspond to those discussed above in conjunction with the assembly 4-100. For convenience of illustration, the prime symbol "'" will be used to discuss corresponding values while reference will be made to FIGS. 46, 49B, 50A, 51A–53A, 55A, 56A, 58A, and 58B as employed in discussing the indicated forces and lengths associated with the assembly 4-100.

As described above, the coarse tracking motor operates in a manner identical to that of the coarse tracking motor in the assembly 4-100. The coarse tracking coils 4-412 and 4-414 are of identical dimensions and are positioned at equal distances from the optical axis O' of the objective lens 4-422. Equal currents are applied to the coils such that corresponding forces $F_{Coarse1}'$ and $F_{Coarse2}'$, see FIG. 46, acting on the carriage 4-406 act at equal corresponding distances $L_{C1}'$ and $L_{C2}'$, FIG. 49B, from the optical axis O'. In the vertical plane, in the radial direction, these forces $F_{Coarse1}'$ and $F_{Coarse2}'$ are aligned with the coincident centers of gravity of the corresponding fine motor mass $CM_F'$, FIG. 58A, and carriage mass $CM_C'$, FIG. 58B, thereby minimizing carriage and actuator pitch. In a similar manner, the bearing surfaces 4-408 and 4-410 are positioned at equal distances from the optical axis O' such that the carriage suspension forces are also symmetric about the optical axis O'. Each force $F_{Bearing1}'$ and $F_{Bearing2}'$, see FIG. 55A for comparison, acts an equal distance $L_{Bearing1}'$ from the optical axis O' such that the moments produced about the optical axis are equal and carriage and actuator pitch is further reduced. The surface area of the bearings which contacts the rails is designed to be substantially equal such that the friction forces acting on the carriage 4-406 are substantially equal. Since the bearing surfaces 4-408 and 4-410 are positioned equidistantly from the optical axis O', the moments acting about the optical axis are equal and carriage and actuator is minimized. The assembly is further designed such that the friction forces are vertically aligned with the center of mass of the carriage 4-406 and actuator 4-416.

The fine tracking coils 4-444 are of equal dimensions and the current applied to the coils is equal such that the fine tracking forces acting on the actuator are equal. Further, the fine tracking coils 4-444 are positioned at equal distances $L_T'$, FIG. 50A, from the optical axis O' such that the moments produced about this axis are equal. In the vertical plane, these forces $F_{Track1}'$ and $F_{Track2}'$, FIG. 50A, are also aligned with the centers of gravity of the actuator 4-416 and carriage 4-406, such that pitch of the actuator 4-416 is reduced. Since the fine tracking forces acting on the assembly are equal, it follows that the reaction forces $F_{React1}'$ and $F_{React2}'$, FIG. 51A, produced in response to the tracking forces $F_{Track1}'$ and $F_{Track2}'$ are equal as well. These reaction forces act at equal distances $L_R'$ from the optical axis and are vertically aligned with the centers of gravity, such that moments about the optical axis O' are equal and yaw is reduced.

In a similar manner, the focus coils 4-448 have substantially equal dimensions and current applied to them such that the focus coils 4-448 produce equal forces $F_{Focus1}'$ and $F_{Focus2}'$ acting on the actuator. In this embodiment, however, the focus coils 4-448 are located at equal distances $L_F'$, FIG. 56A, from the coincident centers of gravity of the fine motor mass and carriage mass such that the moments about the optical axis O' are equal. Further, because the focus forces $F_{Focus1}'$ and $F_{Focus2}'$, are equal, the focus reaction forces $F_{FR1}'$ and $F_{FR2}'$, FIG. 53A, acting on the fine motor mass are equal and act at equal distances $L_{FR}'$, FIG. 53A, from the coincident centers of gravity of the carriage mass $CM_C'$ and fine motor mass $CM_F'$. Thus, moments produced by the reaction forces about the optical axis O' are equal and actuator pitch is further minimized.

The flexure forces $F_{Flex1}'$, $F_{Flex2}'$, acting on the actuator and fine motor reaction forces $F_{RA}'$, $F_{RB}'$, produced in response to the flexure forces are effectively the same as those illustrated in FIG. 54 for the assembly 4-100. Because the flexure and reactions forces are not symmetrical about the optical axis O', the moments produced by these pairs of forces about the axis O' are not equal. These forces, however, are effectively decoupled from the carriage 4-406 except at low frequencies (typically below around 40 Hz), such that these moments do not affect actuator performance under most operating conditions.

Thus, the motor and reaction forces acting on the assembly 4-400 are symmetric about the optical axis O' and are vertically in alignment with the centers of gravity of the fine motor mass $CM_F'$ and carriage mass $CM_C'$. Because the centers of gravity of the fine motor mass and carriage mass coincide, decoupling of the actuator 4-416 or any of the subparts of the assembly 4-400 will not shift the center of mass, and the forces and moments acting on the assembly 4-400 will remain balanced for virtually all horizontal and vertical accelerations.

Anamorphic, Achromatic Prism System

Figure 66:
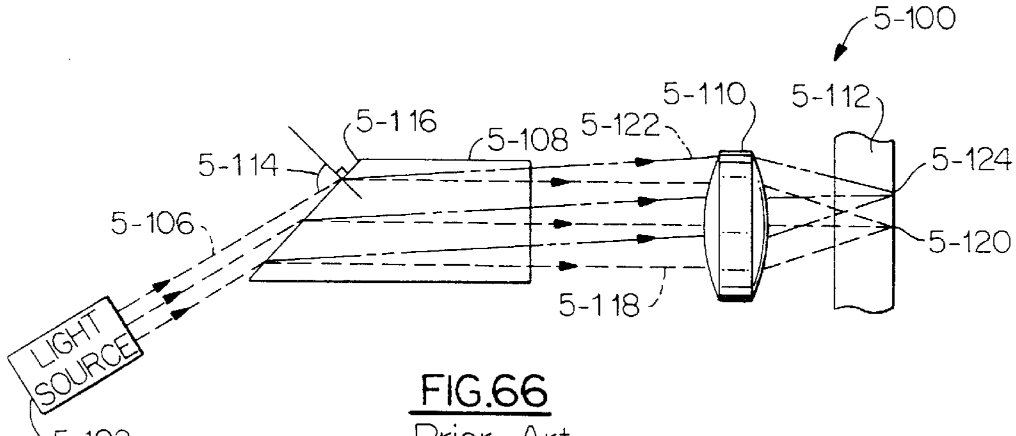
FIG. 66 depicts a simple anamorphic prism and illustrates the effect of chromatic aberration in the prism.

FIG. 66 depicts a prior art optical system 5-100 having a light source 5-102, which provides an incident light beam 5-106 depicted in dashed lines, a simple anamorphic prism 5-108, a focusing lens 5-110, and an optical medium 5-112. The light beam 5-106 enters the prism 5-108 at an incidence angle 5-114 with respect to the normal to an entrance face 5-116 of the prism. Laser light sources usually generate an elliptical beam with some astigmatism, as is well understood in the art. The anamorphic prism 5-108 provides expansion along the minor axis of the ellipse to correct for beam ellipticity. The angle of incidence 5-114 is selected to provide the desired expansion along the minor axis. The anamorphic prism 5-108 can also correct astigmatism in the incident light beam 5-106. The lens 5-110 focuses a resulting corrected beam 5-118 to form a spot 5-120 on the optical medium 5-112.

The simple prism 5-108 is adequate as long as the wavelength of the incident light beam 5-106 remains constant. In practice, however, light sources typically change wavelength due to temperature changes, power shifts, random "mode hopping" and other conditions, as is well known in the art. In magneto-optic disc systems, the laser power continually shifts between the power level required for write operations and the power level required for read operations.

The angle of refraction of light at the interface of materials is calculated with Snell's law, as is well known in the art:

$$n_1 \sin \theta_1 = n_2 \sin \theta_2$$

where:

$n_1$=index of refraction of material 1;

$\theta_1$=angle of incidence with respect to normal;

$n_2$=index of refraction of material 2; and $\theta_2$=angle of refraction with respect to normal.

This relationship governs the refraction of the light beam 5-106 when it enters the prism 5-108. As seen in FIG. 66, when an incident beam 5-106 of one wavelength enters the anamorphic prism 5-108, the beam is refracted at a given angle dictated by the index of refraction of the prism 5-108 and the angle of incidence 5-114 of the light beam 5-106. The resulting light beam 5-118, corrected for ellipticity, and possibly, astigmatism of the incident beam 5-106, enters the focusing lens 5-110 and results in the focused light spot 5-120 on the optical medium 5-112. The index of refraction, however, changes with wavelength. This is referred to as chromatic dispersion. Accordingly, when the wavelength of the incident light beam 5-106 changes, the angle of refraction resulting from the interface between air and the prism 5-108 is different than the angle of refraction for the previous wavelength. FIG. 66 depicts with dotted lines, the effect of a shift in the wavelength of the incident beam 5-106. The incident light beam 5-106 refracts at a different angle and results in a light beam 5-122 which enters the focusing lens 5-110 at a different angle to result in a focused light spot 5-124 on the optical medium 5-112. As illustrated in FIG. 66, the light spot 5-124 is displaced from the light spot 5-120. This displacement, resulting from a change in wavelength in the incident light beam, is referred to herein as lateral beam shift.

The lateral beam shift may be avoided by not employing the anamorphic prism 5-108. For instance, a system may employ a circular lens to provide a circular spot on the optical medium. To form the circular spot with a lens, however, the lens only focuses a circular aperture within the elliptical light beam. This results in an inefficient use of the laser power because portions of the light beam outside the circular aperture are discarded. Accordingly, a system which does not employ the anamorphic prism for beam shaping does not benefit from the prismatic correction of ellipticity and astigmatism in the incident light beam. The beam shaping capabilities of the anamorphic prism provide efficient use of the laser power by expanding the elliptical beam into a circular beam. The efficient use of power is advantageous, particularly in optical disc systems when increased power is necessary in order to write to the disc.

Figure 67:
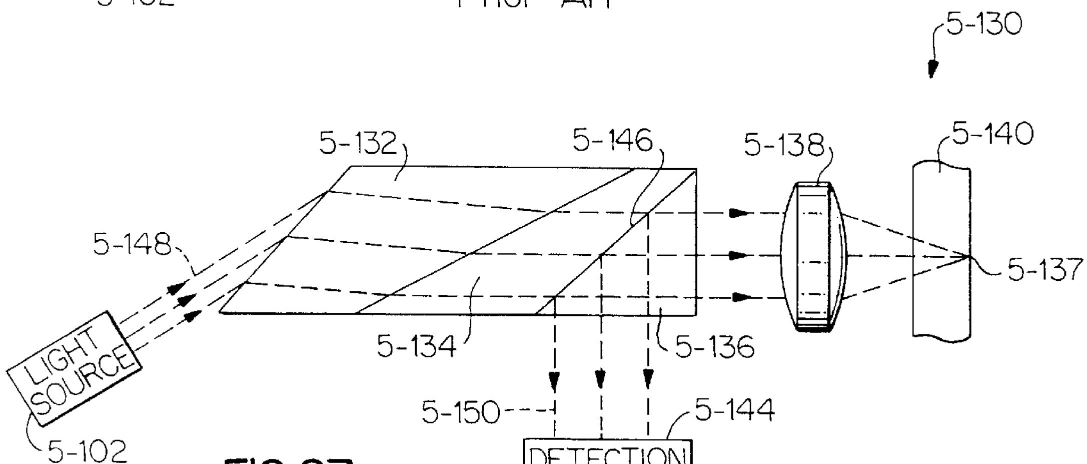
FIG. 67 depicts an existing multi-element anamorphic prism system.

FIG. 67 shows a conventional configuration for a multi-element prism system 5-130, as is well known in the art. The system depicted consists of three prism elements, prism 5-132, prism 5-134 and prism 5-136, a focusing lens 5-138, and a reflective-type optical medium 5-140. The prism system 5-130 could be designed to be achromatic by proper selection of the individual prism geometries, indexes of refraction, and dispersions for prism 5-132, prism 5-134 and, prism 5-136.

The prism system 5-130 illustrated in FIG. 67 also allows reflection of a return beam from the optical medium 5-140 to a detection system 5-144 by including a beam-splitting thin film 5-146 between the prism 5-134 and the prism 5-136.

As seen in FIG. 67, an entering light beam 5-148 passes through the prisms 5-132, 5-134, and 5-136, and is then focused by the lens 5-138 to form a spot 5-137 on the optical medium 5-140. The light beam 5-148 reflects from the optical media 5-140 back through the focusing lens 5-138 into the prism 5-136, and reflects from the thin film 5-146 as a light beam 5-150. The light beam 5-150 then enters the detection system 5-144.

If designed to be achromatic, changes in the input light beam 5-148 wavelength should not result in a lateral shift in the focused light spot 5-137 on the optical medium 5-140.

As previously explained, optical systems often benefit from more than one detector. A prism system with an air space in the light path could provide significant advantages, particularly in providing a compact, achromatic prism system capable of reflecting portions of the incident and return beams to multiple detectors. Furthermore, by using an air space, a symmetrical correcting prism can be added to an existing anamorphic prism system. Finally, a unitary prism system with an air space would be advantageous in order to provide a stable, compact, easy to manufacture and install, prism assembly.

Figure 68:
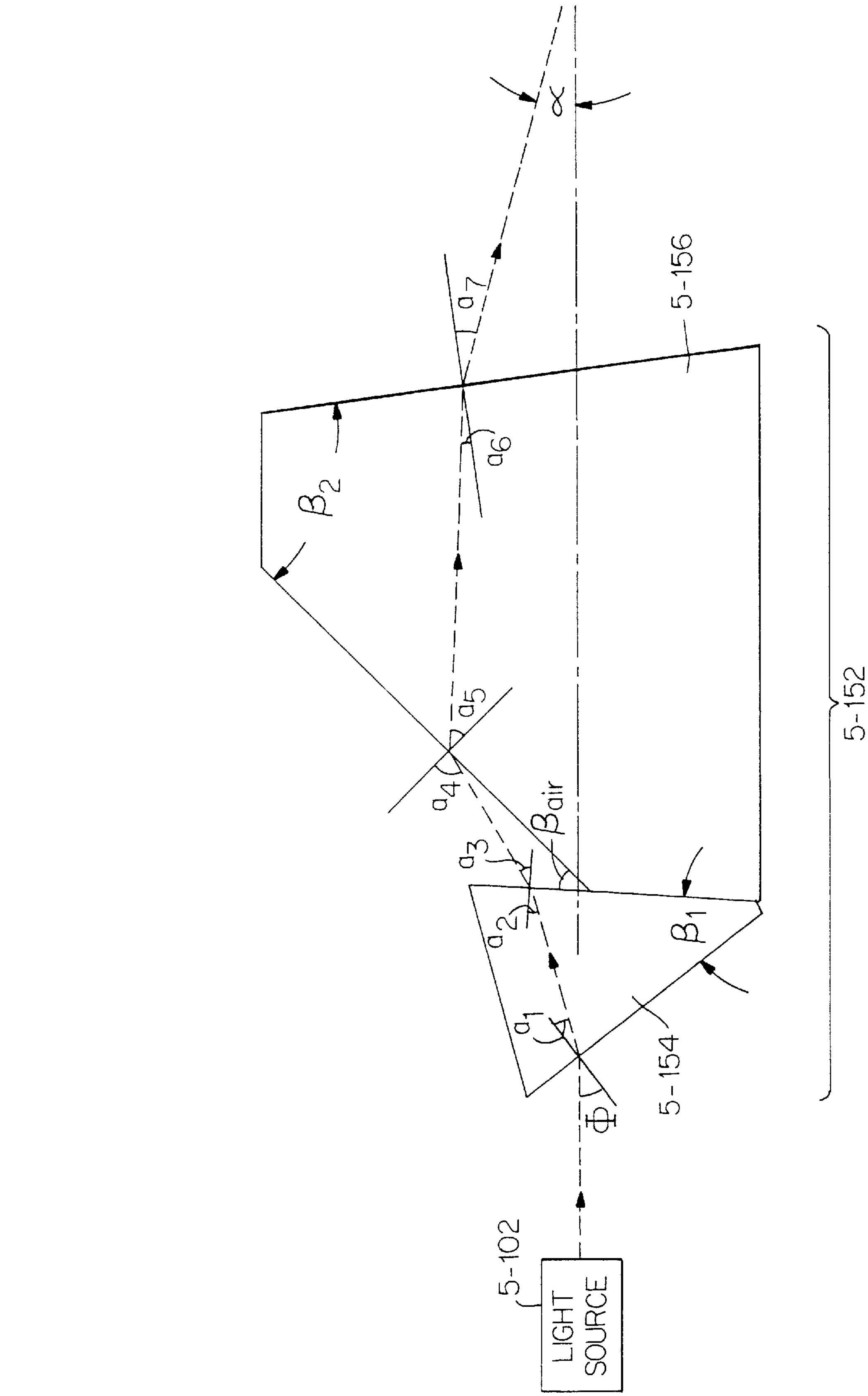
FIG. 68 depicts an exemplary air-spaced prism system according to the present invention.

In order to more fully explain the design of an achromatic prism system with an air space between prisms, reference is made to FIG. 68, which depicts a two-element prism system 5-152 having a chromatic correcting prism 5-154 added to a simple anamorphic prism 5-156. The correcting prism 5-154 has an index of refraction of $n_1$ and the simple anamorphic prism 5-156 has an index of refraction of $n_2$, at a selected wavelength. The angles in the system are represented as shown in FIG. 68 as $\phi$, $a_1$, $a_2$, $a_3$, $a_4$, $a_5$, $a_6$, $a_7$, $\beta_1$, $\beta_2$, $\beta_{air}$. The deviation angle from the incident beam to the exit beam is referenced as $\alpha$, where $$\alpha=\beta_1+\beta_{air}-(a_7+\phi+\beta_2)$$

and $a_7$ can be calculated through repeated applications of Snell's law and the geometry of triangles.

The design conditions are chosen to achieve a desired result (e.g., total deviation through the system). For instance, to design an achromatic system, the condition is that $\alpha$ be constant over some range of wavelengths.

For a total desired deviation angle, $\alpha$=A, from the entrance beam to the exit beam, the condition is met as follows:

$$A=\beta_1+\beta_{air}-(a_7+\phi+\beta_2)$$

Furthermore, the condition for making the correcting prism 5-154 a symmetrical prism with no net expansion of the incident light beam so that it can be added to the simple anamorphic prism 5-156, as shown in FIG. 68, is as follows:

$$\phi=\sin^{-1}[n_1*\sin(\beta_1/2)]$$

By selecting this condition, the correcting prism 5-154 does not expand the incident light beam. The correcting prism, therefore, can be added to an existing anamorphic prism system selected to provide the appropriate expansion.

Finally, the prism assembly 5-152 can meet all of the desired design restraints by proper selection of $\phi$, $\beta_1$, $\beta_2$, $\beta_{air}$, and of the glass dispersions.

In some cases it may be desirable for the exit beam to have a significant deviation angle from the entrance beam. For instance, a deviation of 90 degree(s) may be advantageous. This can be accomplished by providing a total internal reflection in the prism 5-156 before the beam exits the prism. This changes the above calculations, but the design goals can still be met by proper selection of the parameters.

Applying the above principles for adding a symmetrical correcting prism to an existing anamorphic prism, a prism system was designed which has multiple surfaces to partially reflect the return beam to different detectors. Embodiments of unitary, air-spaced, achromatic prism systems with significant deviation angles between the entrance beam and the exit beam, along with multiple reflections to various detection systems are described below.

Figures 69, 69A:
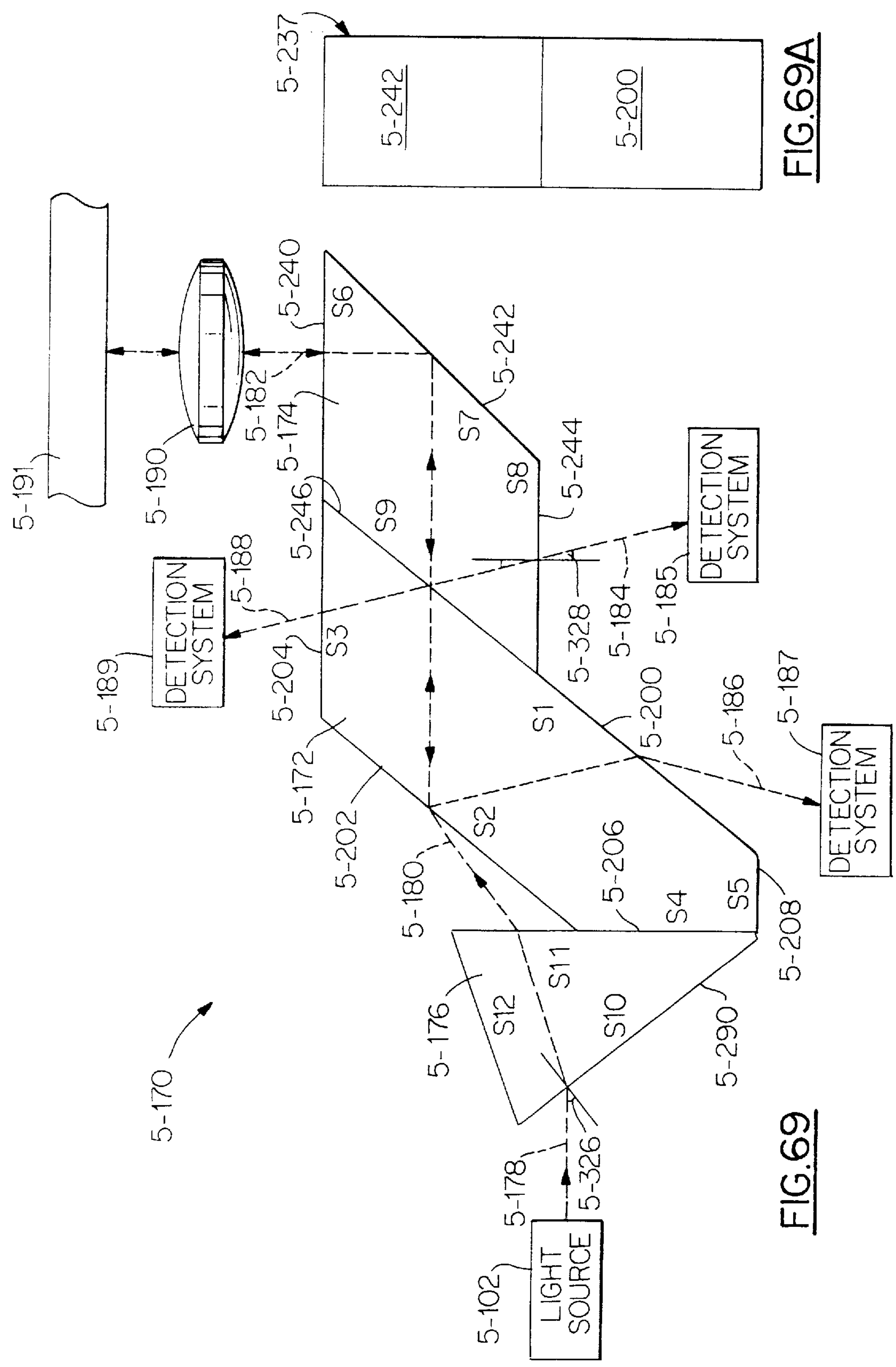
FIGS. 69 and 69A depict one embodiment of an air-spaced, multi-element prism system of the present invention.

FIG. 69 illustrates an embodiment of an air-spaced, anamorphic, achromatic prism system 5-170 according to the present invention. Preferably, the prism system 5-170, as depicted in FIG. 69, has three prisms bonded as a single unit. As previously explained, this provides the advantage that the prism assembly 5-170 is mounted as a single unit. Because the prisms are bonded together, they need not be separately mounted in the optical system. This reduces mounting time, increases stability of the system, decreases mounting costs, and minimizes functional deviations between different optical systems. The three prism elements are a plate prism 5-172, a trapezoidal prism 5-174, and a correcting prism 5-176. FIG. 69 also shows the light beam path as a light beam 5-178 from the light source 5-102, an air gap light beam 5-180, an exit/reflected light beam 5-182, a first detector channel light beam 5-184 to a first detector 5-185, a second detector channel light beam 5-186 to a second detector 5-187, and a third detector light beam 5-188 to a third detector 5-189. By including an air gap between the correcting prism 5-176 and the plate prism 5-172 through which the air gap light beam 5-180 passes, the correcting prism 5-176 can be designed as a symmetrical corrector with no net expansion to the incident beam 5-178. Therefore, the correcting prism 5-176 can be added to the plate prism 5-172 and the trapezoidal prism 5-174 combination in order to achromatize the prism system 5-170 shown in FIG. 69.

FIG. 69 also depicts a lens 5-190 positioned to focus the exit light beam 5-182 onto an optical medium 5-191. The specifics of the design shown in FIG. 69 are described and designed to be substantially achromatic for a design wavelength of 785±22 nm. At this wavelength, the system will have the properties described below.

Figure 70A:
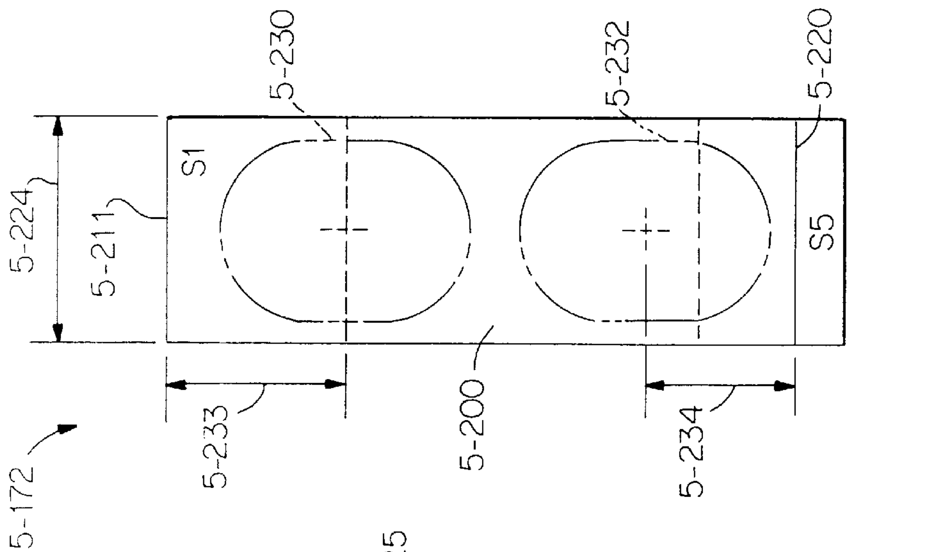
FIGS. 70, 70A, and 70B depict side, bottom, and top plan views, respectively, of the plate prism of the prism system embodiment depicted in FIG. 69.
Figure 70:
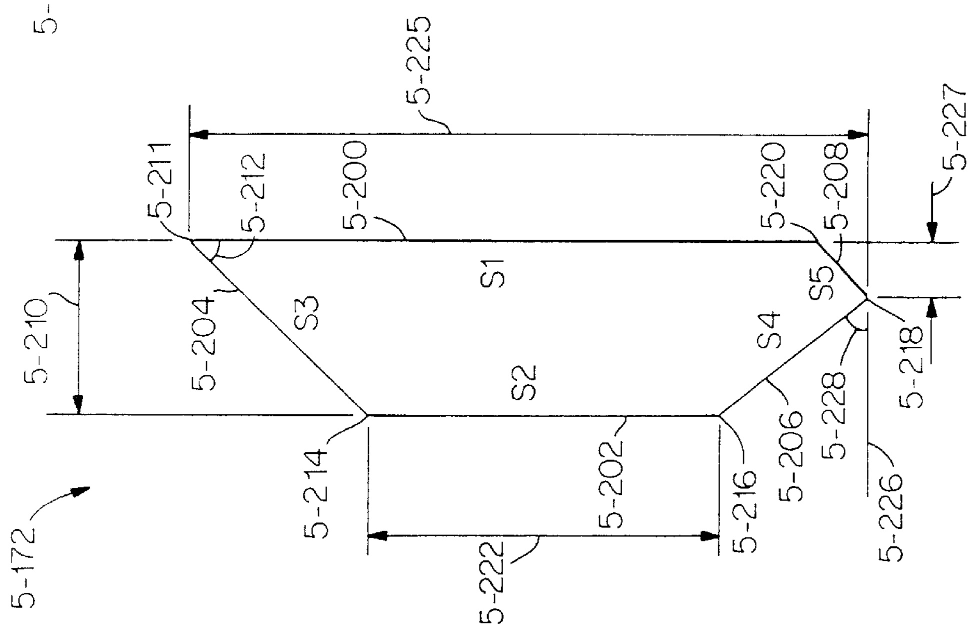
Figure 70B:
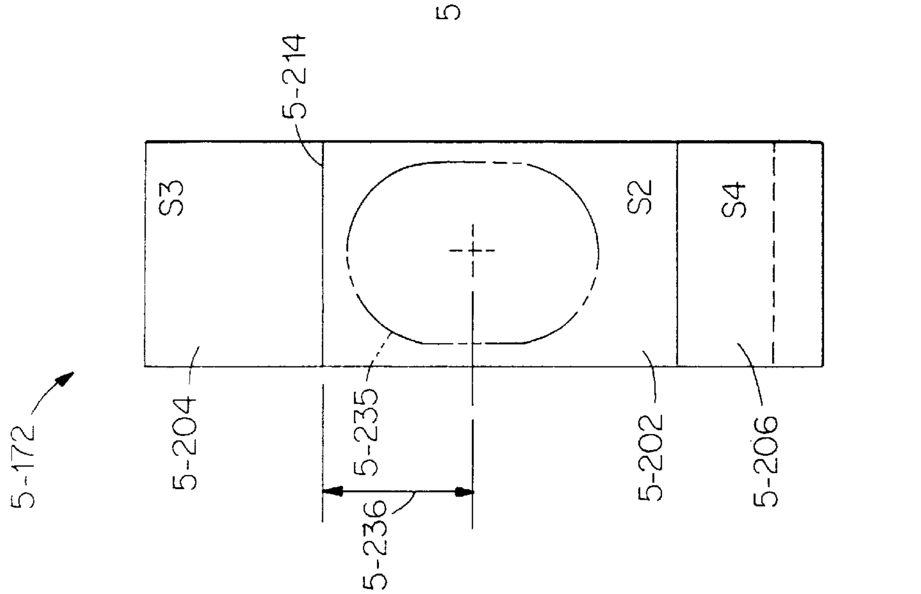

The plate prism 5-172 is depicted in more detail in FIGS. 70, 70A and 70B. FIG. 70 is a side view of the plate prism 5-172, FIG. 70A is a bottom plan view illustrating a surface S1 5-200, and FIG. 70B is a top plan view illustrating a surface S2 5-202. The plate prism has the optical surface S1 5-200, the optical surface S2 5-202, an optical surface S3 5-204, a surface S4 5-206, and a surface S5 5-208. In one embodiment, the surfaces S1 5-200 and S2 5-202 are substantially parallel and spaced apart at a distance designated in FIG. 70 as 5-210. In the present embodiment, the distance 5-210 is advantageously 6.27 mm. The surface S5 5-208 and the surface S3 5-204 are also substantially parallel in the present embodiment. The surface S1 5-200 and the surface S3 5-204 intersect and terminate at an edge 5-211 (i.e., the S1/S2 edge) in FIG. 70, at an angle 5-212 (i.e., the S1/S2 angle), which is advantageously 50 degree(s) 21'±10' in the present embodiment. The surface S3 5-204 and the surface S2 5-202 intersect and terminate at an edge 5-214; the surface S2 5-202 and the surface S4 5-206 intersect and terminate at an edge 5-216; the surface S4 5-206 and the surface S5 5-208 intersect and terminate at an edge 5-218; and the surface S5 5-208 and the surface S1 5-200 intersect and terminate at an edge 5-220, as designated in FIG. 70. The surface S2 5-202 has a length referenced as 5-222 in FIG. 70 and a width referenced as 5-224 FIG. 70A. In the present embodiment, the length 5-222 is 13.34 mm and the width 5-224 is 8.0 mm. The overall length of the prism, referenced as 5-225 in FIG. 70, from the edge 5-218 to the edge 5-211 measured parallel to the surface S1 5-200 is advantageously 23.61 mm in the present embodiment. The distance from the edge 5-218 and the edge 5-220, referenced as 5-227, measured along a reference plane 5-226 defined perpendicular to the surface S1 5-200 and the surface S2 5-202 is advantageously 2.14 mm. The plan view in FIG. 70A illustrates a clear aperture 5-230 and a clear aperture 5-232 defined on the surface S1 5-200. A clear aperture is simply an area of the surface of the prism over which the surface is specified to meet a selected quality. In the present embodiment, the clear apertures 5-230 and 5-232 are 8.5 mm by 6.5 mm ovals. Advantageously, the aperture 5-230 is centered with its minor axis a distance 5-233 from the edge 5-211 and with its major axis centered in the middle of the surface S1 5-200 as shown in FIG. 70A. In the present embodiment, the clear aperture 5-232 is centered with its minor axis a distance 5-234 from the edge 5-220, and with its major axis centered along the middle of the surface S1 5-200. Advantageously, in the present embodiment, the distance 5-233 is 6.15 mm and the distance 5-234 is 5.30 mm.

The plan view depicted in FIG. 70B illustrates a clear aperture 5-235 defined on the surface S2 5-202. The present embodiment defines this clear aperture as an 8.5 mm by 6.5 mm oval with its minor axis centered a distance 5-236 from the edge 5-214 and its major axis centered in the middle of the surface S2 5-202 as depicted in FIG. 70B. In the present embodiment the distance 5-236 is 5.2 mm. The clear apertures 5-230, 5-232, and 5-235 define portions of the surfaces over which the surface quality is preferably at least 40/20, as is well known in the art. In the illustrated embodiment, BK7 grade A fine annealed glass, well known in the art, is an appropriate optical material for the prism 5-172.

Figure 71A:
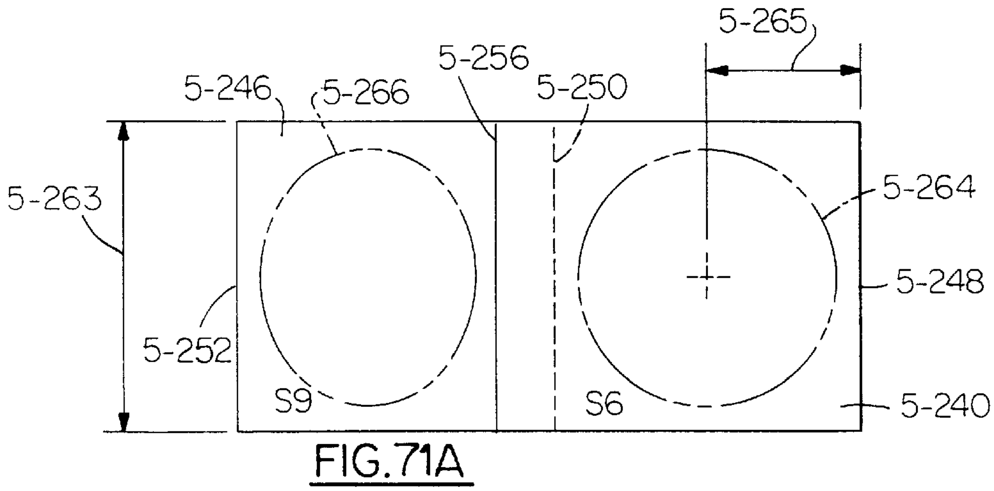
FIGS. 71, 71A, and 71B depict side, top, and bottom plan views, respectively, of the trapezoidal prism of the embodiment of the prism system shown in FIG. 69.
Figure 71:
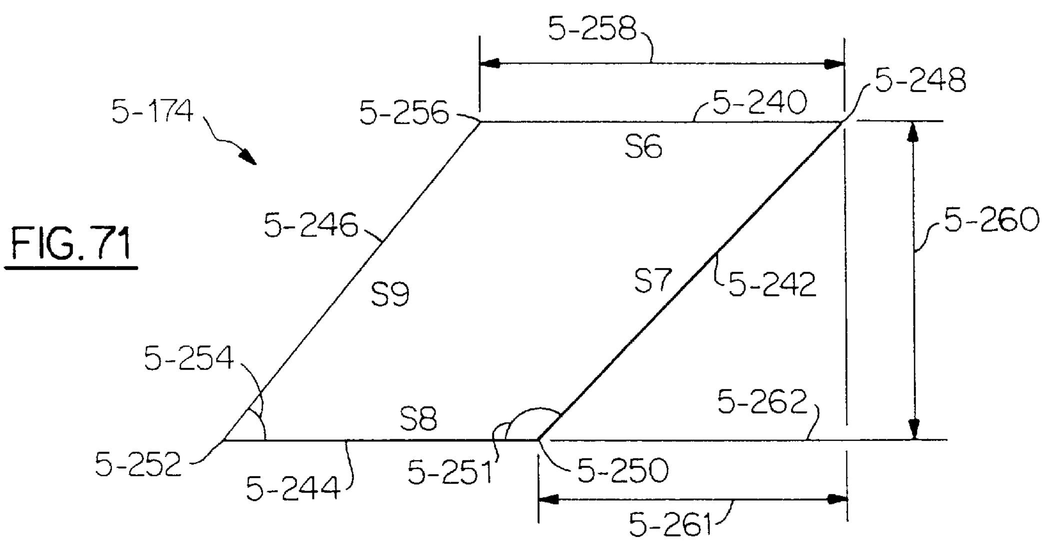

FIG. 71 shows additional detail of the trapezoidal prism 5-174 of the embodiment depicted in FIG. 69. The trapezoidal prism 5-174 has an optical surface S6 5-240, an optical surface S7 5-242, an optical surface S8 5-244, and an optical surface S9 5-246. The surface S6 5-240 and the surface S7 5-242 terminate and intersect at an edge 5-248. The surface S7 5-242 and the surface S8 5-244 intersect and terminate at an edge 5-250 at an angle referenced as 5-251. Advantageously, the angle 5-251 is substantially 135 degrees. The surface S8 5-244 and the surface S9 5-246 intersect and terminate at an edge 5-252 at an angle 5-254 which is advantageously 50 degrees 21' in the present embodiment. The surface S9 5-246 and the surface S6 5-240 intersect and terminate at an edge 5-256. The surface S6 5-240 has a length 5-258 shown in FIG. 71. Advantageously, the length 5-258 is 9.5 mm in the present embodiment. The surface S6 5-240 and the surface S8 5-244 are substantially parallel and spaced at a distance 5-260, FIG. 71. In the present embodiment, the distance 5-260 is 8.0 mm measured in a direction perpendicular to the surface S6 5-240 and the surface S8 5-244. The edges 5-250 and 5-248 are spaced at a distance 5-261 along a plane 5-262 defined parallel with the surface S8 5-244. Advantageously, the distance 5-261 is 8.0 mm in the present embodiment. FIG. 71A is a top plan view of the trapezoidal prism 5-174 illustrating the surface S6 5-240 and the surface S9 5-246. As depicted in FIG. 71A the trapezoid prism 5-174 has a thickness 5-263. Preferably, the thickness 5-263 is approximately 8 mm in the present embodiment. As shown in FIG. 71A, the surface S6 5-240 has a clear aperture 5-264 defined in the present embodiment as a 6.5 mm minimum diameter circular aperture centered across the width of the surface and centered at a distance 5-265 from the edge 5-248. Preferably, the distance 5-265 is 4.0 mm in the present embodiment. The surface S9 5-246 has a clear aperture 5-266 centered on the surface. In the present embodiment, the clear aperture 5-266 is defined as a 6.5 mm by 8.5 mm minimum oval.

Figure 71B:
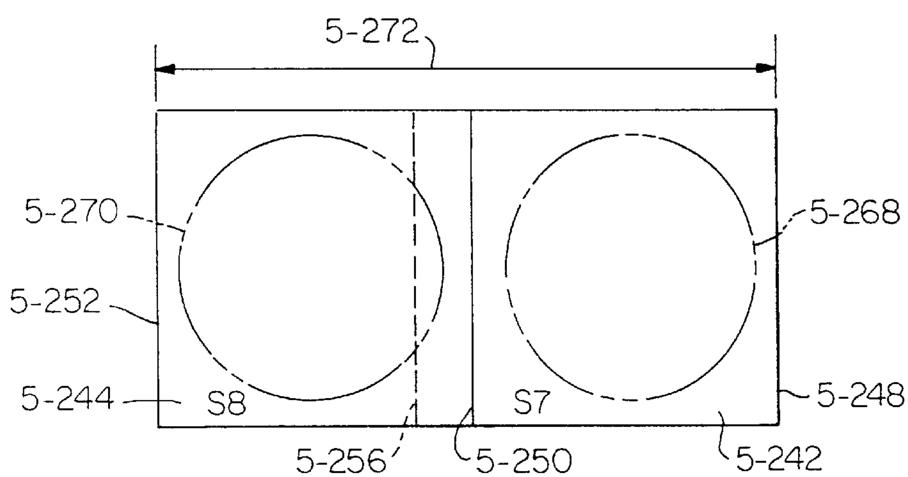

FIG. 71B depicts a bottom plan view of the trapezoidal prism 5-174 illustrating the surface S7 5-242 and the surface S8 5-244 with clear apertures 5-268 and 5-270, respectively. As shown in FIG. 71B, the trapezoid prism 5-174 has a length 5-272 from the edge 5-252 to the edge 5-248 measured along the reference plane 5-262. Preferably, the length 5-272 is 16.13 mm in the present embodiment. In one embodiment, the clear aperture 5-268 for the surface S7 5-242 is defined as a 6.5 mm by 9.2 mm oval centered on the surface S7 5-242 with its minor axis parallel to and centered between the edge 5-248 and the edge 5-250. Advantageously, the clear aperture 5-270 is a 6.5 mm by 6.7 mm oval centered on the surface S8 5-244 with its major axis centered parallel between the edge 5-250 and the edge 5-252. In the present embodiment, the surface quality of the clear apertures 5-264, 5-266, 5-268, and 5-270 is advantageously 40/20, well known in the art.

Many of the surfaces in the prisms have coatings to facilitate the function of the prism. In the present embodiment, the surface S6 5-240 has an anti-reflection coating with transmission ≧99.8% at 90° ±0.5 degrees angle of incidence. The surface S8 5-244 has a coating with transmission ≧98.5% at 10.7° ±0.5 angle of incidence for internally incident light. The surface S9 5-246 has a low extinction thin film coating with reflection of the s polarization state ($R_S$) (i.e., normal to the plane of incidence) >90%, and with reflection of the p polarization state ($R_p$)= 12.5%±2.5% at 39° 39'±0.5° angle of incidence. The material for the trapezoidal prism 5-174 of the embodiment illustrated in FIGS. 69 and 71–71B is BK7 grade A fine annealed optical glass, as is well known in the art.

Figure 72A:
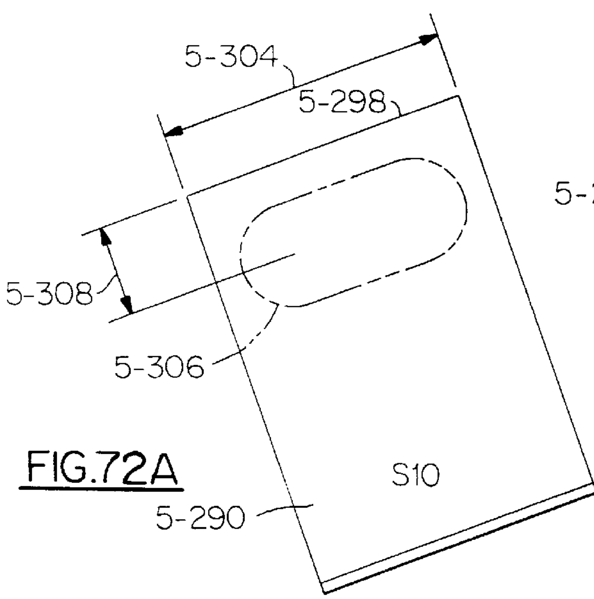
FIGS. 72 and 72A depict a side view and a plan view of one optical surface, respectively, of an embodiment of the chromatic correcting prism of the prism system embodiment shown in FIG. 69.
Figure 72:
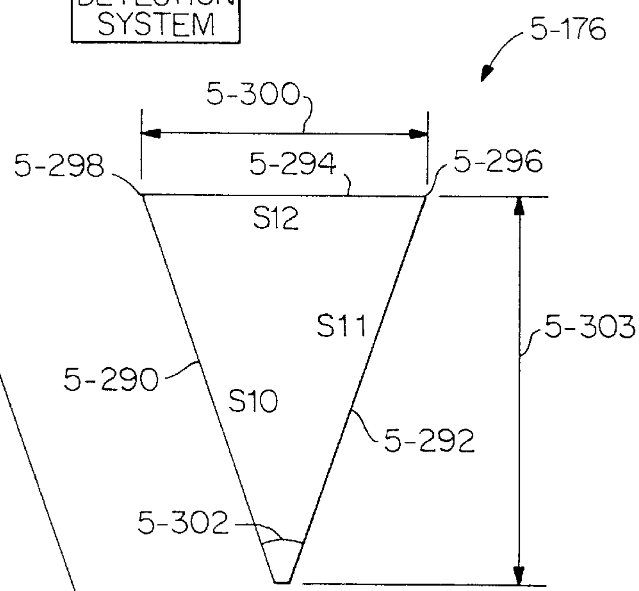

The chromatic correcting prism 5-176 of the embodiment of the prism system 5-170 depicted in FIG. 69 is shown in more detail in FIGS. 72 and 72A. As illustrated, the chromatic correcting prism 5-176 has an optical surface S10 5-290, an optical surface S11 5-292, and a surface S12 5-294 configured to form a triangular prism. The surface S11 5-292 and the surface S12 5-294 intersect and terminate at an edge 5-296. The surface S10 5-290 and the surface S12 5-294 intersect and terminate at an edge 5-298. Preferably, the surfaces S10 5-290 and S11 5-292 are symmetrical. The surface S12 5-294 has a length 5-300, which is 7.78 mm in the present embodiment. Thus, the edge 5-296 and the edge 5-298 are separated by the distance 5-300. The surface S10 5-290 and the surface S11 5-292 approach each other at an angle referenced as 5-302. In the present embodiment, the angle 5-302 is advantageously 38° 20'. The surface S11 5-292 and the surface S10 5-290 are terminated a distance 5-303 from the surface S12 5-294, measured perpendicular to the surface S12 5-294. The distance 5-303 is 10.5 mm in the present embodiment.

FIG. 72A depicts a view of the surface S10 5-290. In this embodiment, the prism 5-176 has a thickness referenced 5-304 in FIG. 72A. In the present embodiment, the thickness 5-304 is advantageously 8.0 mm. Desirably, the surface S10 5-290 has an oval clear aperture 5-306. In the present embodiment, the clear aperture 5-306 is an oval centered with the major axis parallel to, and a distance 5-308 from, the intersection at 5-298. The minor axis is centered on the surface S10 5-290 as illustrated. Preferably, the clear aperture 5-306 is defined as a 6.5 mm by 2.8 mm oval in the present embodiment, and the surface quality across the clear aperture 5-306 is advantageously 40/20, as known in the art. In the present embodiment, the surface S11 5-292 also has a similar clear aperture defined on its surface.

As with the trapezoidal prism 5-174, the chromatic correcting prism 5-176 has coatings on some of its surfaces to facilitate performance. In one embodiment, each of the surfaces S10 5-290 and S11 5-292 has an anti-reflective coating (e.g. reflectance ≦3% at 35.5°±1.0° angle of incidence, as is well known in the art). In the present embodiment, SFII grade A fine annealed glass is the material for the correcting prism 5-176.

When the prisms as described above are assembled as the unitary prism system 5-170 of the embodiment shown in FIG. 69, the light beams reflect as illustrated and explained below for a wavelength of 785±22 nm. For discussion purposes, a reference plane 5-237 is defined along one side of the prism system 5-170 as illustrated in FIG. 69A. The incident beam 5-178 from the light source 5-102 enters the surface S10 5-290 at an incidence angle 5-326 and parallel with the reference plane 5-237. The light beam 5-178 exits the prism 5-176 into the air-gap as the light beam 5-180 and enters the prism 5-172 through surface S2 5-202. A portion of the light beam reflects at the thin film on the surface S9 5-246 and exits the surface S3 5-204 as the light beam 5-188. In one embodiment, the beam 5-188 may be directed to the detection system 5-189. Because this reflected beam is a portion of the input beam, the detection system 5-189 receiving the light beam 5-188 may monitor the intensity of the incident light. The remainder of the light beam which does not reflect at the thin film on the surface S9 5-246, passes into the trapezoidal prism 5-174, reflects internally at the surface S7 5-242 and exits as the light beam 5-182 through the surface S6 5-240.

In the embodiment described, if the angle of incidence 5-326 of the light beam 5-178 is 35° 26', the light beam exits the prism 5-174 with a total deviation from the entrance beam 5-178 to the exit beam 5-182 of 87° 37'±5', parallel to the reference plane 5-237 within 5', and the light beam 5-182 exits normal to the surface S6 5-240 within 5'.

The lens 5-190 focuses the light beam 5-182 onto the optical medium 5-191. The light beam reflects back through the lens and enters normal to the surface S6 5-240, reflects internally at the surface S7 5-242, and then reflects at the thin film between the trapezoidal prism 5-174 and the plate prism 5-172. The resulting beam exits the trapezoidal prism 5-174 through the surface S8 5-244 as the light beam 5-184 at a deviation angle 5-328. The light beam 5-184 enters the first detector 5-185.

Part of the light beam returned from the optical medium 5-190 also passes through the thin film, reflects at the surface S2 5-202 and exits the plate prism 5-172 as the light beam 5-186. This reflection is available because of the air gap in the prism system. In one embodiment, the light beam 5-184 and the light beam 5-186 can both be directed to separate detection systems 5-185 and 5-187, respectively. For instance, the detection system 5-185 may collect data signals, and the detection system 5-187 may collect control signals (e.g., focus and tracking servo information).

As explained above, the embodiment described is substantially achromatic within a typical range of wavelength changes from a conventional laser light source. Accordingly, shifts in the wavelength of the incident light do not significantly affect the resulting lateral position of the focused beam on the optical medium 5-190.

Calculations simulating the performance of the prism system 5-170 for variations in wavelength from 780 nm to 785 nm are shown in the table below. Phi is the incidence angle on the correcting prism (i.e., 35° 26' in the present embodiment) and its variation is estimated as ±0.5°. The wavelength shift is indicated in one column and the corresponding shift in the focused spot from the prism system is indicated in the columns for incidence angles of Phi±0.5°. For instance, as seen in the first line of the table, for a wavelength shift of the incident light beam of 780 nm–781.5 nm, the focused spot shifts by −0.2 nm at the incident angle of Phi, by 2.6 nm for an incidence angle of Phi−0.5°, and by −2.9 nm for a incidence angle of Phi+0.5°.

| Wavelength Shift | Phi −0.5° | Phi | Phi +0.5° |
|---|---|---|---|
| 780–781.5 nm | 2.6 nm | −0.2 nm | −2.9 nm |
| 780–783 nm | 5.2 nm | −0.2 nm | −5.6 nm |
| 780–785 nm | 9.0 nm | −0.1 nm | −9.0 nm |

As can be seen from the above table, the lateral displacement at the incidence angle, Phi, varies by less than 1 nm for a wavelength shift from 780 to 783 nm, with an incidence angle of Phi. This is contrasted with a lateral displacement of approximately 200 nm for a wavelength shift of 3 nm in an embodiment similar to that described above but without the chromatic correction. This indicates a substantially achromatic system.

Figure 73:
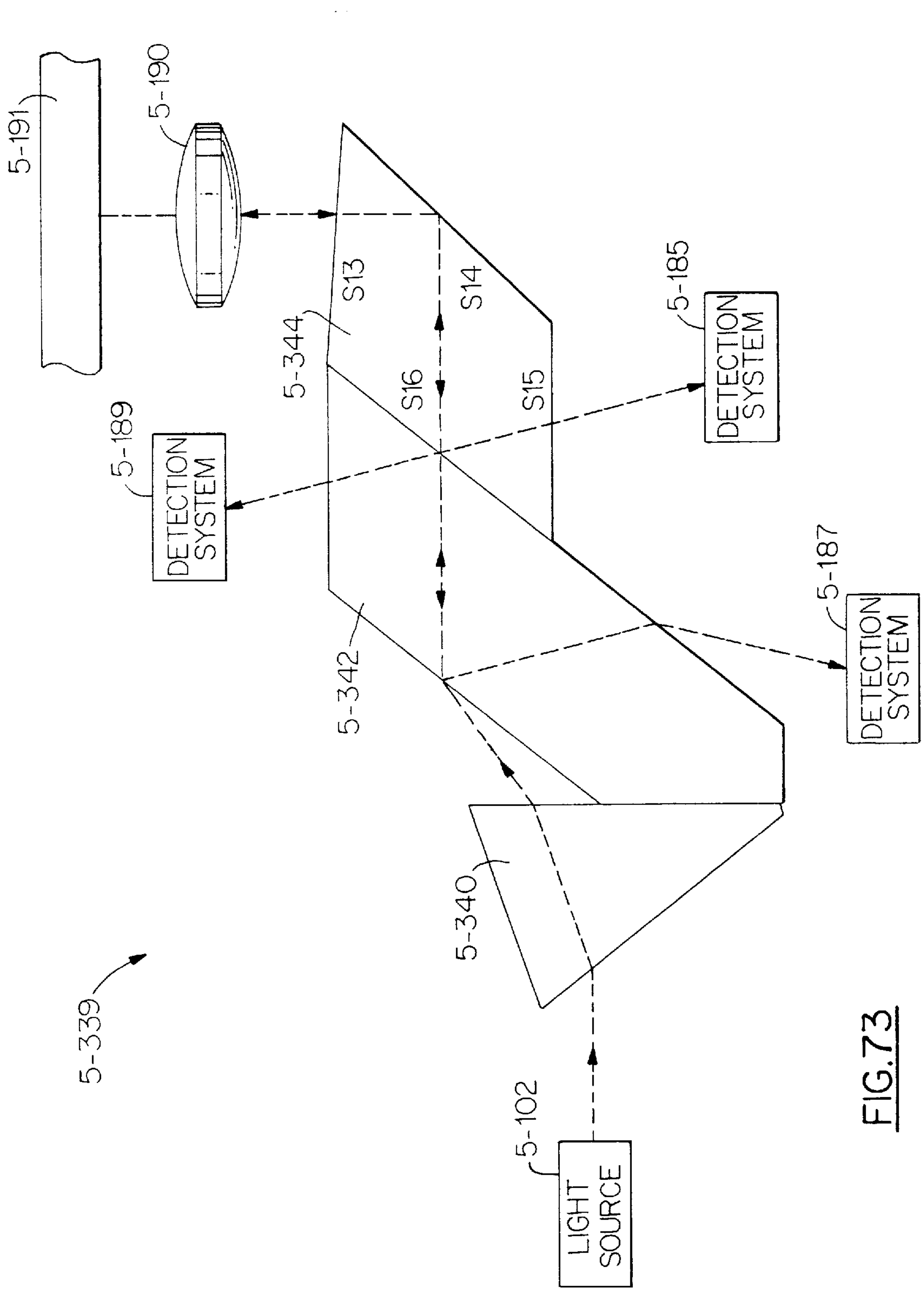
FIG. 73 depicts an alternative embodiment of an air-spaced, multi-element prism system of the present invention.

FIG. 73 illustrates a prism system 5-339 as an alternative embodiment of the present invention. This embodiment has the correcting prism 5-340, a plate prism 5-342, and a quadrilateral prism 5-344. The correcting prism 5-340 and the plate prism 5-342 are both substantially the same as the correcting prism 5-176 and the plate prism 5-172, respectively, of the prism system 5-170 shown in FIG. 69. The quadrilateral prism 5-344, however, differs from the trapezoidal prism 5-174.

Figure 74A:
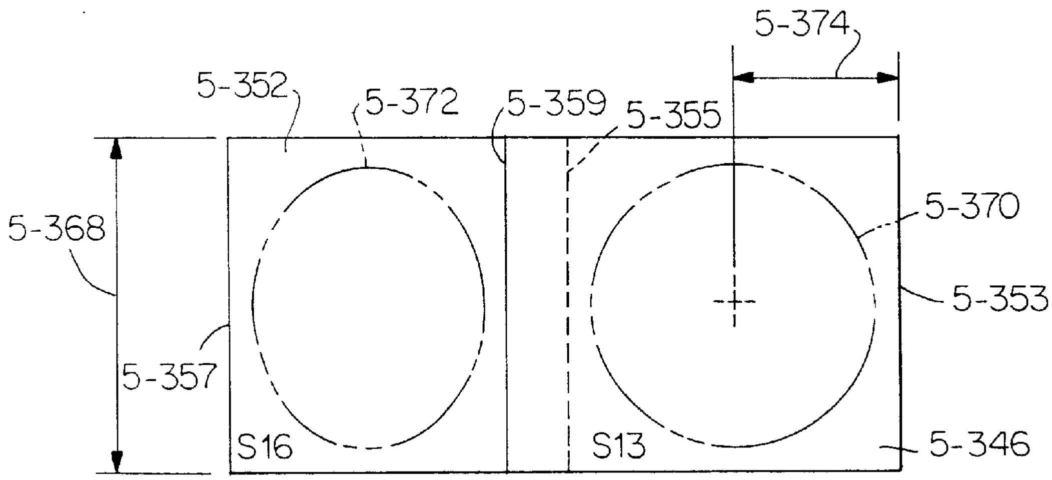
FIGS. 74, 74A, and 74B depict side, top and bottom plan views, respectively, of the quadrilateral prism of the alternative embodiment illustrated in FIG. 73.
Figure 74:
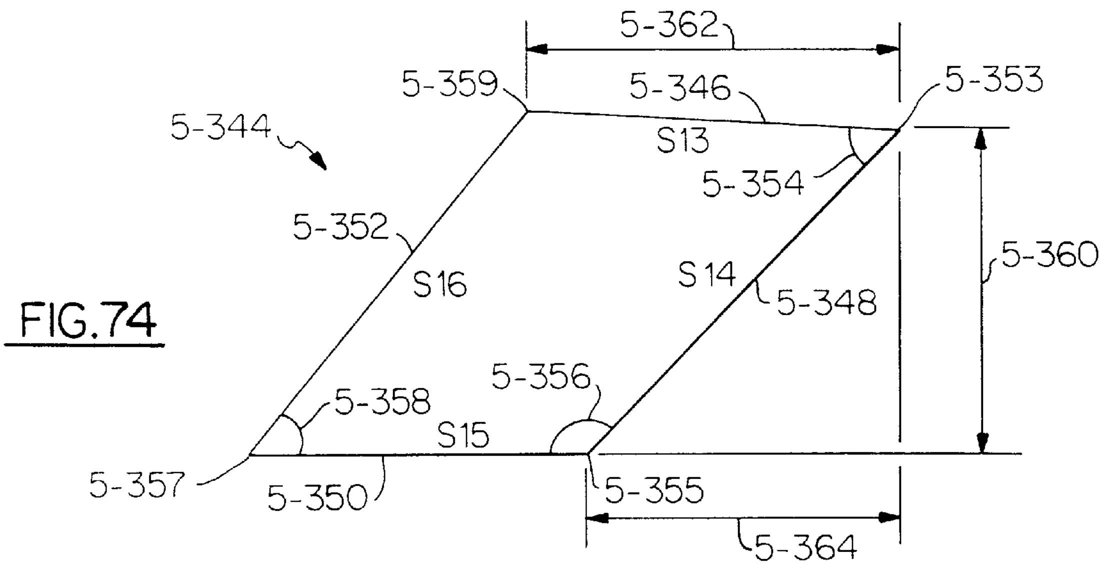
Figure 74B:
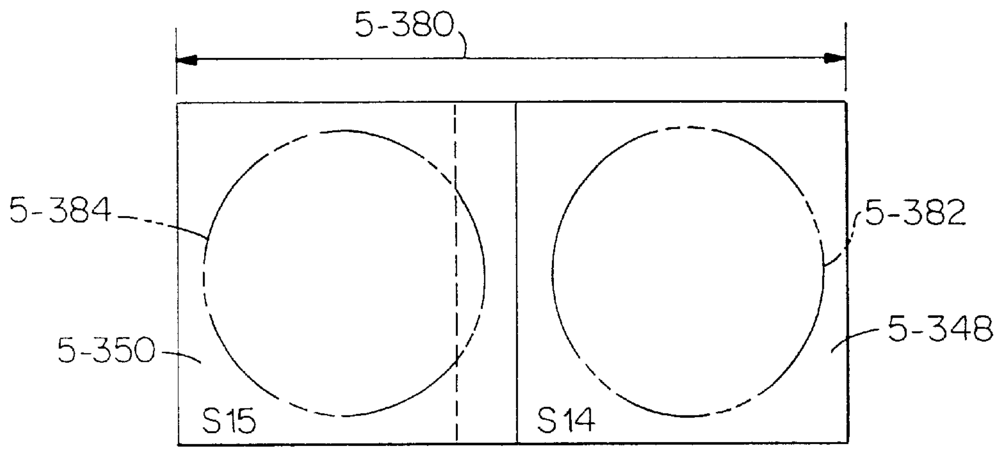

The quadrilateral prism 5-344 of FIG. 73 is depicted in more detail in FIGS. 74, 74A and 74B. The quadrilateral prism 5-344 has a surface S13 5-346, a surface S14 5-348, a surface S15 5-350, and a surface S16 5-352. The surfaces S13 5-346, S14 5-348, S15 5-350, and S16 5-352 are configured similarly but not identical to the surfaces S6 5-240, S7 5-242, S8 5-244, and S9 5-246 of the trapezoidal prism 5-174. The surfaces S13 5-346 and S14 5-348 intersect at an edge 5-353 at an angle 5-354; the surfaces S14 5-348 and S15 5-350 intersect at an edge 5-355 at an angle referenced 5-356; and the surfaces S15 5-350 and S16 5-352 intersect at an edge 5-357 at an angle 5-358, as shown in FIG. 74. Finally, the surfaces S16 5-352 and S13 5-346 intersect at an edge 5-359. In one embodiment, the angle 5-354 is 49° 40', the angle 5-356 is 135°, and the angle 5-358 is 50° 21'. The distance between the edge 5-353 and the edge 5-355, measured perpendicular to the surface S1 5 5-350 is referenced as 5-360 in FIG. 74. In one embodiment, the distance 5-360 is 8.0 mm. Additionally, the distance from the edge 5-353 to the edge 5-359 is referenced 5-362. In one embodiment, the distance 5-362 is 8.9 mm measured parallel to the surface S15 5-350. Finally, the distance between the edge 5-353 and the edge 5-355, measured along a plane parallel with the surface S15 5-350, is referenced as 5-364. In one embodiment, the distance 5-364 is preferably 8.0 mm.

FIG. 74A is a plan view of the surface S13 5-346 and also depicts the surface S16 5-352. FIG. 74A illustrates the thickness of the prism 5-344 referenced as 5-368. In one embodiment, the thickness 5-368 is 8.0 mm. Advantageously, the prism 5-344 has a clear aperture 5-370 defined along the surface S13 5-346, and a clear aperture 5-372 defined along the surface S16 5-352, as shown in FIG. 74A. In the present embodiment, the clear aperture 5-370 is a circular aperture centered across the surface and a distance 5-374 from the edge 5-353. In one embodiment, the clear aperture 5-370 is a circular aperture with a minimum diameter of 6.5 mm and the distance 5-374 is 4.0 mm. Advantageously, the surface S16 5-352 also has the clear aperture 5-372 centered on the surface. In one embodiment, the clear aperture 5-372 is a 6.5 mm by 8.5 mm oval aperture centered on the surface S16 5-352 as represented in FIG. 74A.

FIG. 74B is a plan view of the surface S14 5-348 and also illustrates the surface S15 5-350. The overall length of the prism 5-344 from the edge 5-353 to the edge 5-357 measured along a plane parallel to the surface S15 5-350 is referenced as 5-380 in FIG. 74B. In one embodiment, the length 5-380 is 16.13 mm. As seen in FIG. 74B, the surface S14 5-348 has a clear aperture 5-382 centered on the surface, and the surface S15 5-350 also has a clear aperture 5-384 centered on the surface. In one embodiment, the clear aperture 5-382 is a 6.5 mm by 9.2 mm oval, and the clear aperture 5-384 is a 6.5 mm by 6.7 mm oval.

Advantageously, the quadrilateral prism 5-344 also has coatings on some of its optical surfaces. In one embodiment, the surface S13 5-346 has a coating with reflectance ≦0.2% at 40°±5' angle of incidence with respect to the normal for internally incident light. In the same embodiment, the surface S15 5-350 has a coating with reflectance ≦0.5% at 10.7°±0.5° angle of incidence with respect to the normal, for internally incident light. Finally, the surface S16 5-352 advantageously has a thin film coating with $R_s$>90%, $R_p$=12.5%±2.5% at 39° 39'±5° angle of incidence with respect to the normal. Preferably, this thin film coating also has less than 8° phase shift for all operating and optical conditions.

With the configuration shown in FIG. 74, the deviation angle of the entrance beam to the exit beam totals, advantageously, 90°. This facilitates manufacturing because mounting components for 90° deviations are easier to fabricate than for 87° deviations, as in the embodiment of FIG. 69. For the dimensions and coatings specified for the embodiment of FIG. 73, the prism is not perfectly achromatic. The prism system illustrated in FIG. 73, however, is substantially achromatic over an acceptable range of operating wavelengths around the design wavelength.

Calculations simulating the performance of the prism system 5-339 of FIG. 73 for variations in the wavelength from 780 nm to 785 nm are shown in the chart below. Again, Phi is 35° 26' in this embodiment.

| Wavelength Shift | Phi −0.5° | Phi | Phi +0.5° |
|---|---|---|---|
| 780–781.5 nm | 12.5 nm | 9.8 nm | 7.1 nm |
| 780–783 nm | 25.1 nm | 19.6 nm | 14.3 nm |
| 780–785 nm | 42.0 nm | 32.9 nm | 24.0 nm |

As can be seen, the design shown in FIG. 73 is not as achromatic as the design shown in FIG. 69. For a wavelength shift of 780 to 783 nm, however, the lateral displacement of the focused spot from the light exiting the prism is only 19.6 nm. Again, this should be contrasted with a lateral displacement of approximately 200 nm for a wavelength shift of 3 nm in an embodiment similar to the embodiment described above but without the chromatic correction.

Data Retrieval—Transition Detection

A detailed system for storing and retrieving data from a magneto-optical device is provided in related application Ser. No. 07/964,518 filed Jan. 25, 1993, which application is incorporated by reference as if fully set forth herein.

Figure 75:
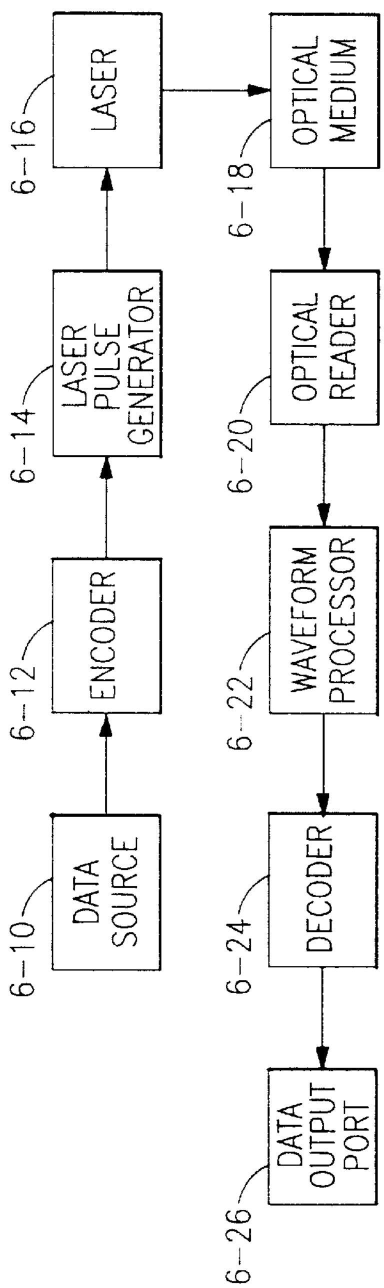
FIG. 75 is a block diagram showing an optical data storage and retrieval system.

A block diagram of an exemplary magneto-optical system is shown in FIG. 75. The system may have a read mode and a write mode. During the write mode, a data source 6-10 transmits data to an encoder 6-12. The encoder 6-12 converts the data into binary code bits. The binary code bits are transmitted to a laser pulse generator 6-14, where the code bits may be converted to energizing pulses for turning a laser 6-16 on and off. In one embodiment, for example, a code bit of "1" indicates that the laser will be pulsed on for a fixed duration independent of the code bit pattern, while a code bit of "0" indicates that the laser will not be pulsed at that interval. Depending on the particular laser and type of optical medium being used, performance may be enhanced by adjusting the relative occurrence of the laser pulse or extending the otherwise uniform pulse duration. In response to being pulsed, the laser 6-16 heats localized areas of an optical medium 6-18, thereby exposing the localized areas of the optical medium 6-18 to a magnetic flux that fixes the polarity of the magnetic material on the optical medium 6-18. The localized areas, commonly called "pits", store the encoded data in magnetic form until erased.

During the read mode, a laser beam or other light source is reflected off the surface of the optical medium 6-18. The reflected laser beam has a polarization dependent upon the polarity of the magnetic surface of the optical medium 6-18. The reflected laser beam is provided to an optical reader 6-20, which sends an input signal or read signal to a waveform processor 6-22 for conditioning the input signal and recovering the encoded data. The output of the waveform processor 6-22 may be provided to a decoder 6-24. The decoder 6-24 translates the encoded data back to its original form and sends the decoded data to a data output port 6-26 for transmission or other processing as desired.

Figure 76A:
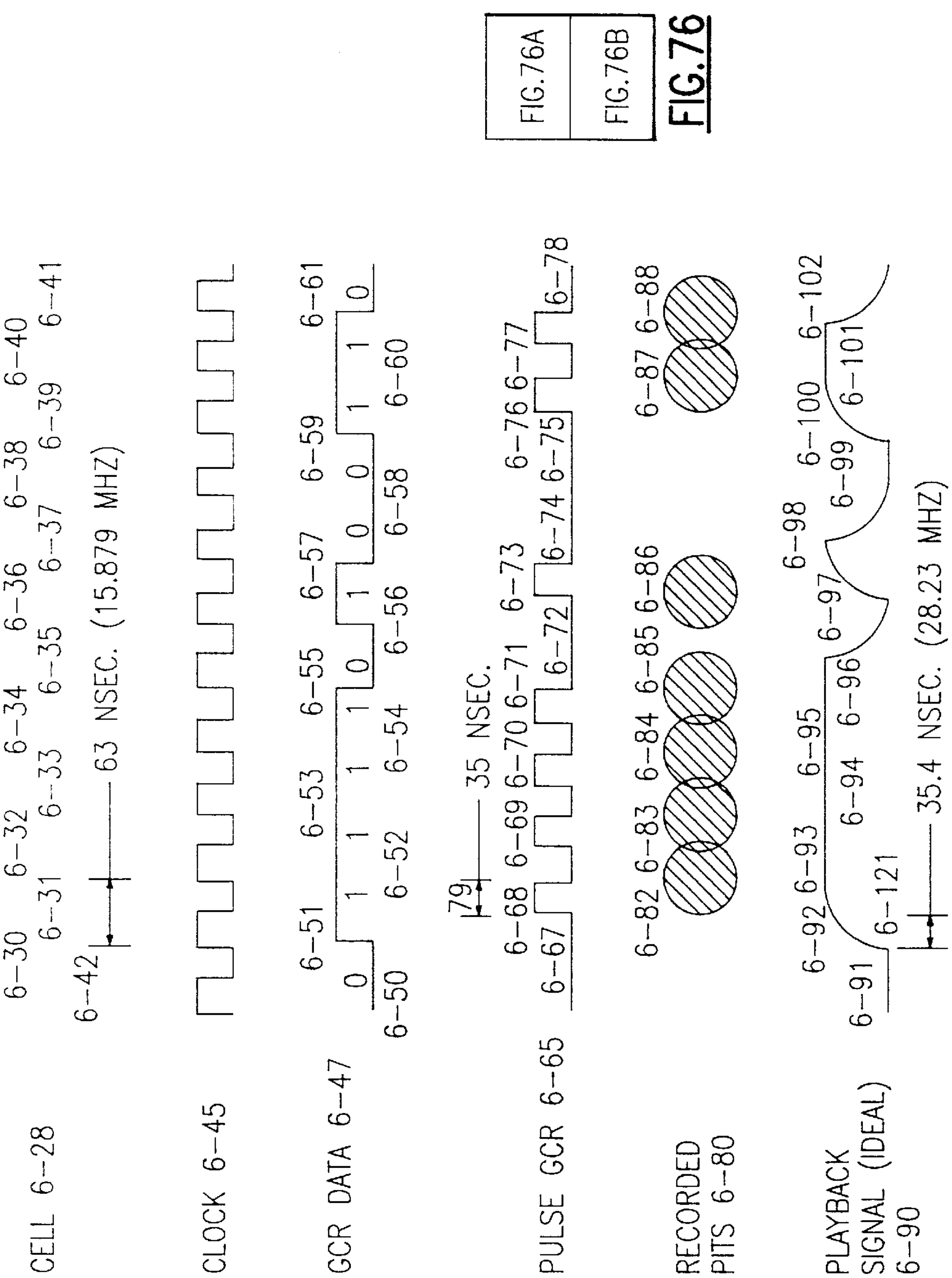
FIG. 76 is a series of sample waveforms.
Figure 76B:
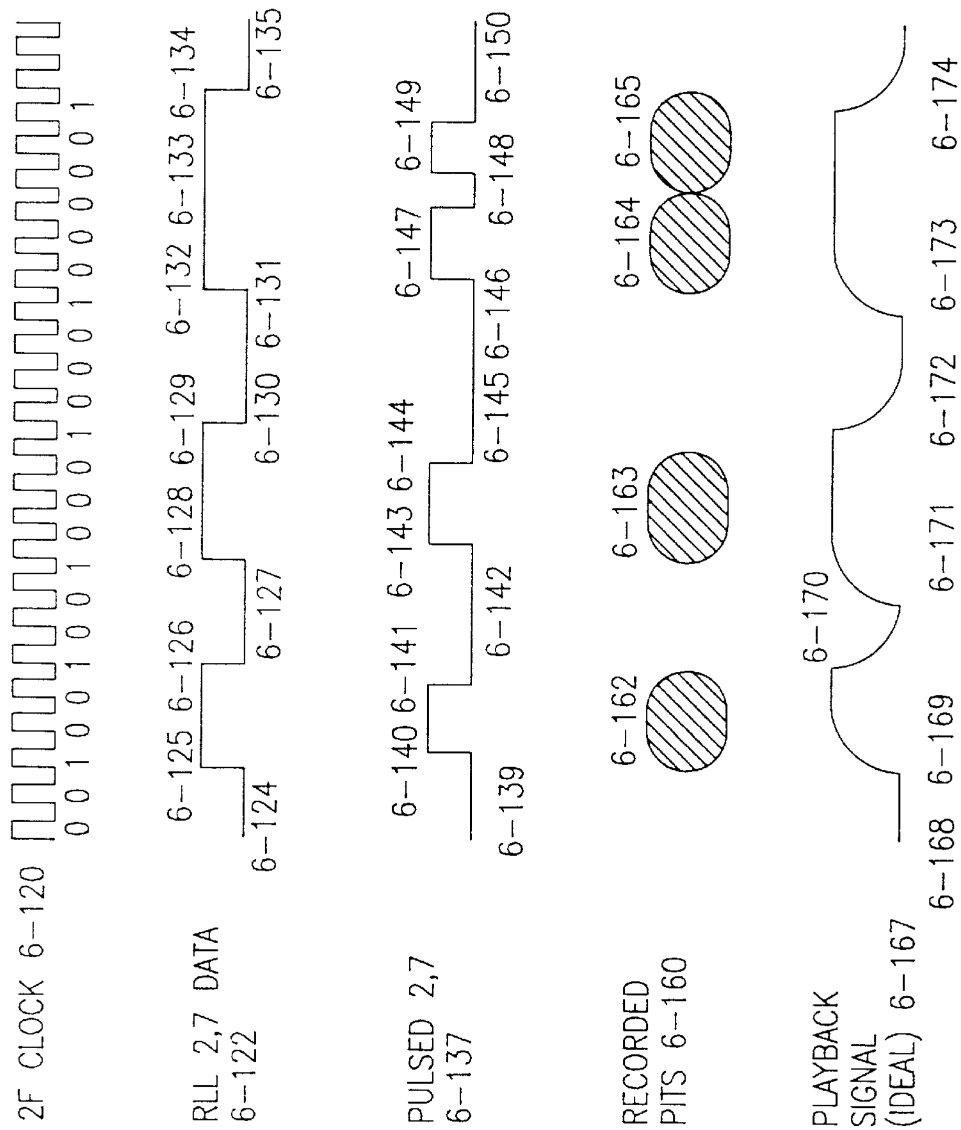

FIG. 76 depicts in more detail the process of data storage and retrieval using a GCR 8/9 code format. For a GCR 8/9 code, a cell 6-28, FIG. 76A, is defined as one channel bit. Each clock period 6-42 corresponds to a channel bit; thus, cells 6-30 through 6-41 each correspond to one clock period 6-42 of clock waveform 6-45. As an example of clock speeds, for a 3½" optical disc rotating at 2,400 revolutions per minute with a storage capacity of 256 Mbytes, clock period 6-42 will typically be 63 nanoseconds or a clock frequency of 15.879 MHz. A GCR input waveform 6-47 is the encoded data output from the encoder 6-12 of FIG. 75. The GCR input waveform 6-47 corresponds to a representative channel sequence "010001110101". The laser pulse generator 6-14 uses the GCR data waveform 6-47 to derive a pulse GCR waveform 6-65 (which in FIG. 76 has not been adjusted in time or duration to reflect performance enhancement for specific data patterns). Generally, GCR pulses 6-67 through 6-78 occur at clock periods when the GCR data waveform 6-47 is high. The pulse GCR waveform 6-65 is provided to the laser 6-16. The magnetization of the previously erased optical medium reverses polarity when in the presence of an external magnetic field of opposite polarity to the erased medium and when the laser is pulsed on with sufficient energy to exceed the Curie temperature of the media. The laser pulses resulting from GCR pulses 6-68, 6-69, 6-70, etc., create a pattern of recorded pits 6-80 on the optical medium 6-18. Thus, recorded pits 6-82 through 6-88 correspond to pulses 6-68, 6-69, 6-70, 6-71, 6-73, 6-76, and 6-77, respectively.

Successive recorded pits 6-82 through 6-85 may merge together to effectively create an elongated pit. The elongated pit has a leading edge corresponding to the leading edge of the first recorded pit 6-82 and a trailing edge corresponding to the trailing edge of last recorded pit 6-85.

Reading the recorded pits with an optical device such as a laser results in the generation of a playback signal 6-90. The playback signal 6-90 is low in the absence of any recorded pits. At the leading edge of the pit 6-86, the playback signal 6-90 will rise and remain high until the trailing edge of the pit 6-86 is reached, at which point the playback signal 6-90 will decay and remain low until the next pit 6-87.

The above described process may be referred to as pulse width modulation ("PWM") because the width of the pulses in playback signal 6-90 indicate the distance between 1-bits. Thus, the edges of the recorded pits 6-80 which define the length of the pulses in playback signal 6-90 contain the pertinent data information. If the playback signal 6-90 is differentiated, signal peaks of the first derivative signal will correspond to the edges of the recorded pits 6-80. The signal peaks of the first derivative playback signal would be slightly offset from the edges of the recorded pits 6-80 because the playback signal 6-90 is shown as the ideal playback signal. In order to recover the pit edge information from the first derivative signal, it is necessary to detect the signal peaks thereof. Such a process is described in detail further herein.

In contrast, most if not all existing RLL 2/7 code systems are used in conjunction with pulse position modulation ("PPM"). In PPM systems, each pit represents a "1" while the absence of a pit represents a "0". The distance between pits represents the distance between 1-bits. The center of each pit corresponds to the location of the data. In order to find the pit centers, the playback signal is differentiated and the zero-crossings of the first derivative are detected. Such a technique may be contrasted with PWM systems, described above, in which the signal peaks of the first derivative contain the pertinent pulse width information.

It is nevertheless possible to utilize PWM instead of PPM with an RLL system such as an RLL 2/7 code system. Each channel bit may correspond to a clock period of a clock waveform. As with the GCR system described earlier using PWM, a "1" may be represented by a transition in the input waveform. Thus, the RLL 2/7 input waveform may remain in the same state while a "0" occurs, but changes from high-to-low or low-to-high when a "1" occurs.

In both RLL and GCR codes, as well as other codes, when data patterns are read, the input signal generated from the optical reader 6-20 is often not symmetrical. When an unsymmetrical signal is AC-coupled between circuits, the average DC value shifts away from the peak-to-peak midpoint. The unintended shifting away from the midpoint may result in a shift in the apparent position of the data, adversely affect the ability to determine accurately the locations of data, and reduce timing margins or render the recorded data unrecoverable.

Figure 77A:
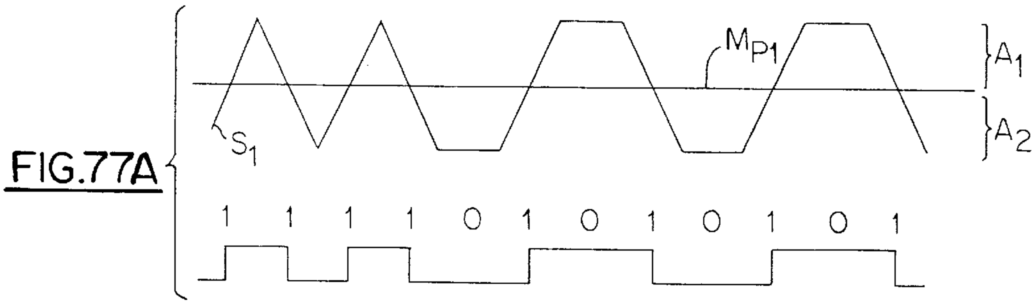
FIGS. 77A and 77B are waveform diagrams of a symmetrical and unsymmetrical input signal, respectively.

This phenomenon may be explained with reference to FIGS. 77A and 77B, which show an ideal input signal $S_1$ derived from a symmetrical data pattern. Normally, transitions between 1's and 0's in the data are detected at the midpoint between high and low peaks of the input signal. It may be observed in FIG. 77A that the areas $A_1$ and $A_2$ above and below the peak-to-peak midpoint $M_{P1}$ of the input signal $S_1$ are equal, and the transitions between 1's and 0's correspond precisely (in an ideal system) to the crossings of the input signal $S_1$ and the peak-to-peak midpoint $M_{P1}$.

Figure 77B:
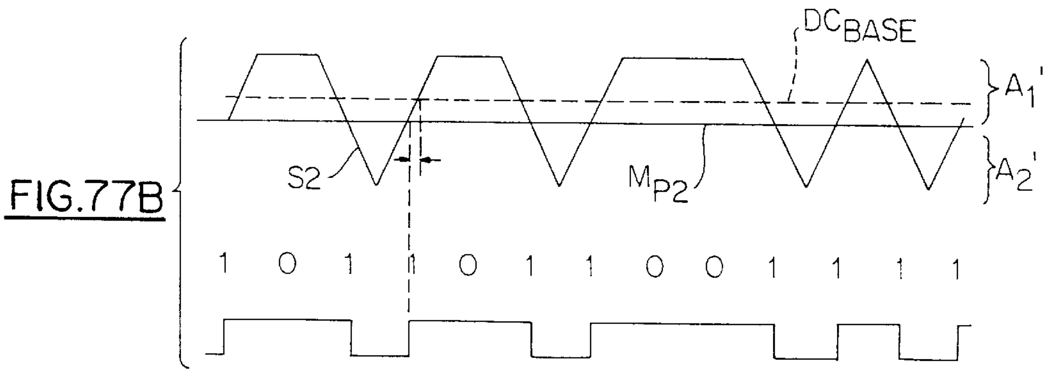

FIG. 77B, in contrast, shows an input signal $S_2$ derived from an unsymmetrical data pattern. It may be observed that the area $A_1'$ above the peak-to-peak midpoint $M_{P2}$ is greater than the are $A_2'$ below the graph. The input signal $S_2$, therefore, has a DC component that shifts the DC baseline $DC_{BASE}$ above the peak-to-peak midpoint $M_{P2}$. When an attempt is made to locate transitions between 1's and 0's by determining the zero-crossings of the AC coupled input signal S2, errors may be made because the DC level is not identical to the peak-to-peak midpoint $M_{P2}$. The DC level does not stay constant but rises and falls depending on the nature of the input signal. The larger the DC buildup, the more the detected transitions will stray from the true transition points. Thus, DC buildup can cause timing margins to shrink or the data to be unrecoverable.

Figure 78:
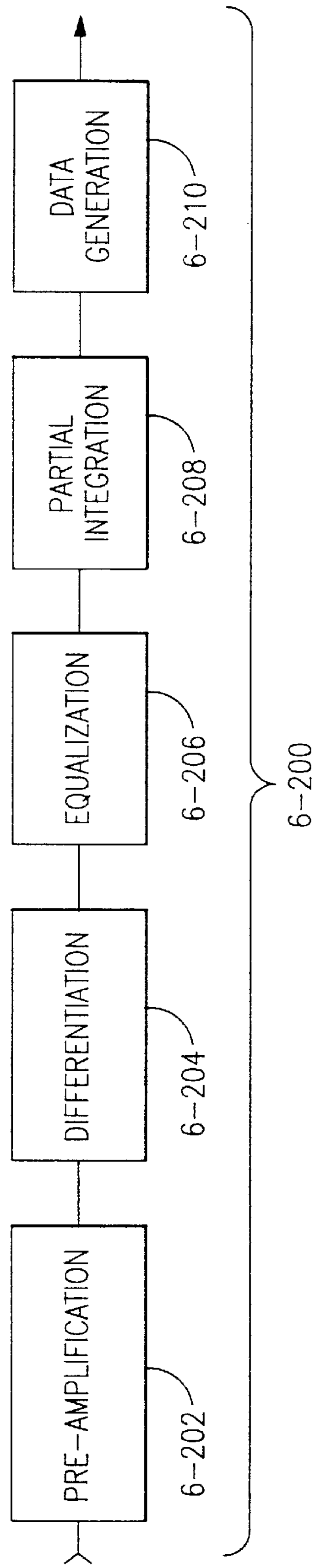
FIG. 78 is a block diagram of a read channel.

FIG. 78 is a block diagram of a read channel 6-200 in accordance with one embodiment of the present invention for mitigating the effects of DC buildup. The read channel 6-200 roughly corresponds to the waveform processor 6-22 of FIG. 75. The read channel 6-200 includes a preamplification stage 6-202, a differentiation stage 6-204, an equalization stage 6-206, a partial integration stage 6-208, and a data generation stage 6-210. The operation of the read channel 6-200 will be explained with reference to a more detailed block diagram shown in FIG. 79, the waveform diagrams shown in FIGS. 84A–84D, and various others as will be referenced from time to time herein.

Figure 84A:
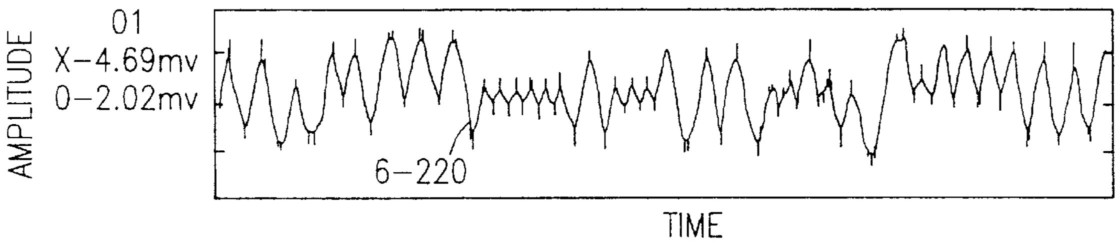
FIGS. 84A–84D are diagrams showing exemplary waveforms at various points in a read channel.

When the optical medium 6-18 is scanned for data, the pre-amplification stage 6-202 amplifies the input signal to an appropriate level. The pre-amplification stage 6-202 may include a pre-amplifier 6-203 as is well known in the art. The pre-amplifier 6-203 may alternatively be located elsewhere such as within the optical reader 6-20. An exemplary amplified playback signal 6-220 is depicted in FIG. 84A.

Figure 79A:
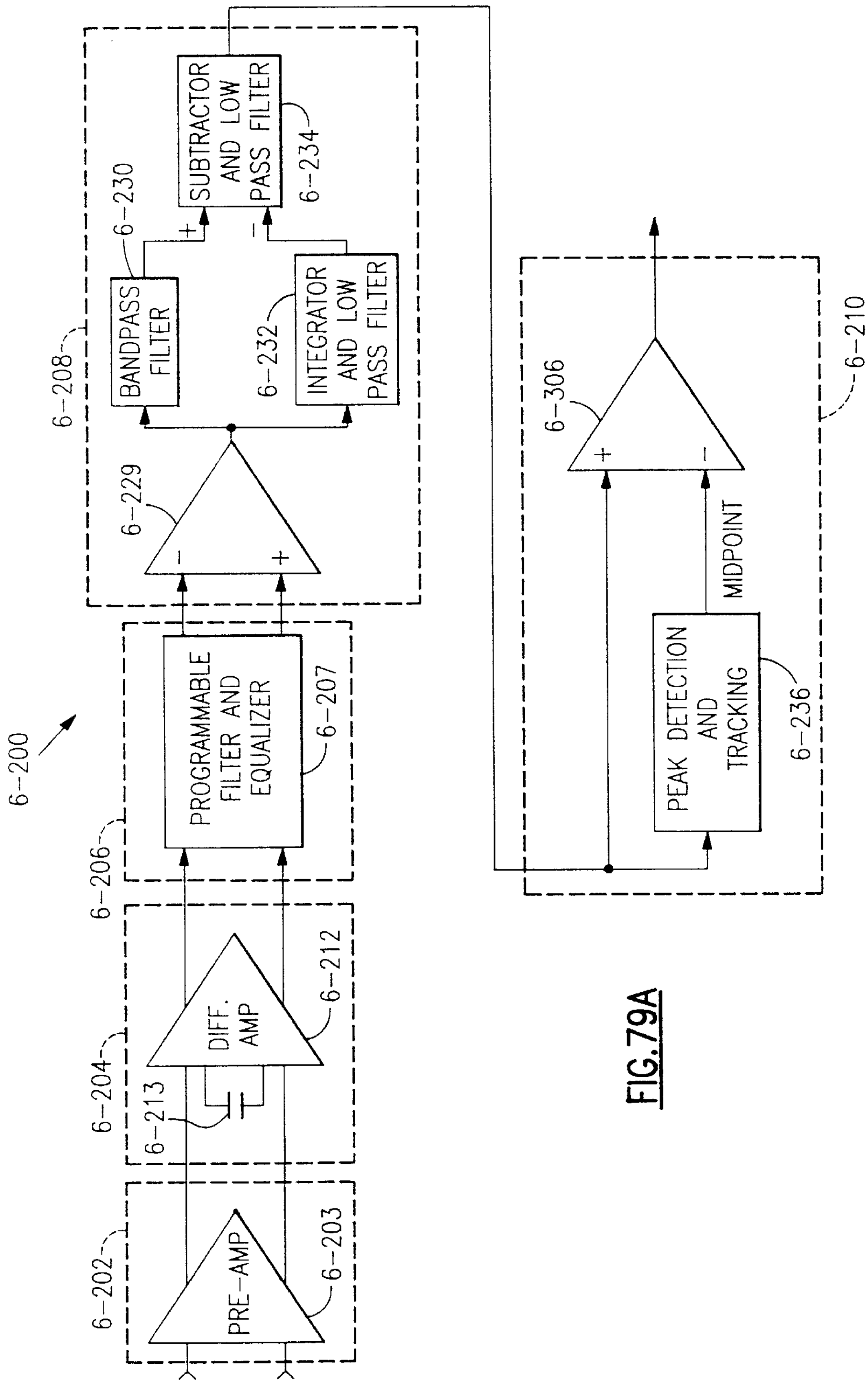
FIG. 79A is a more detailed block diagram of various stages of a read channel.
Figure 80A:
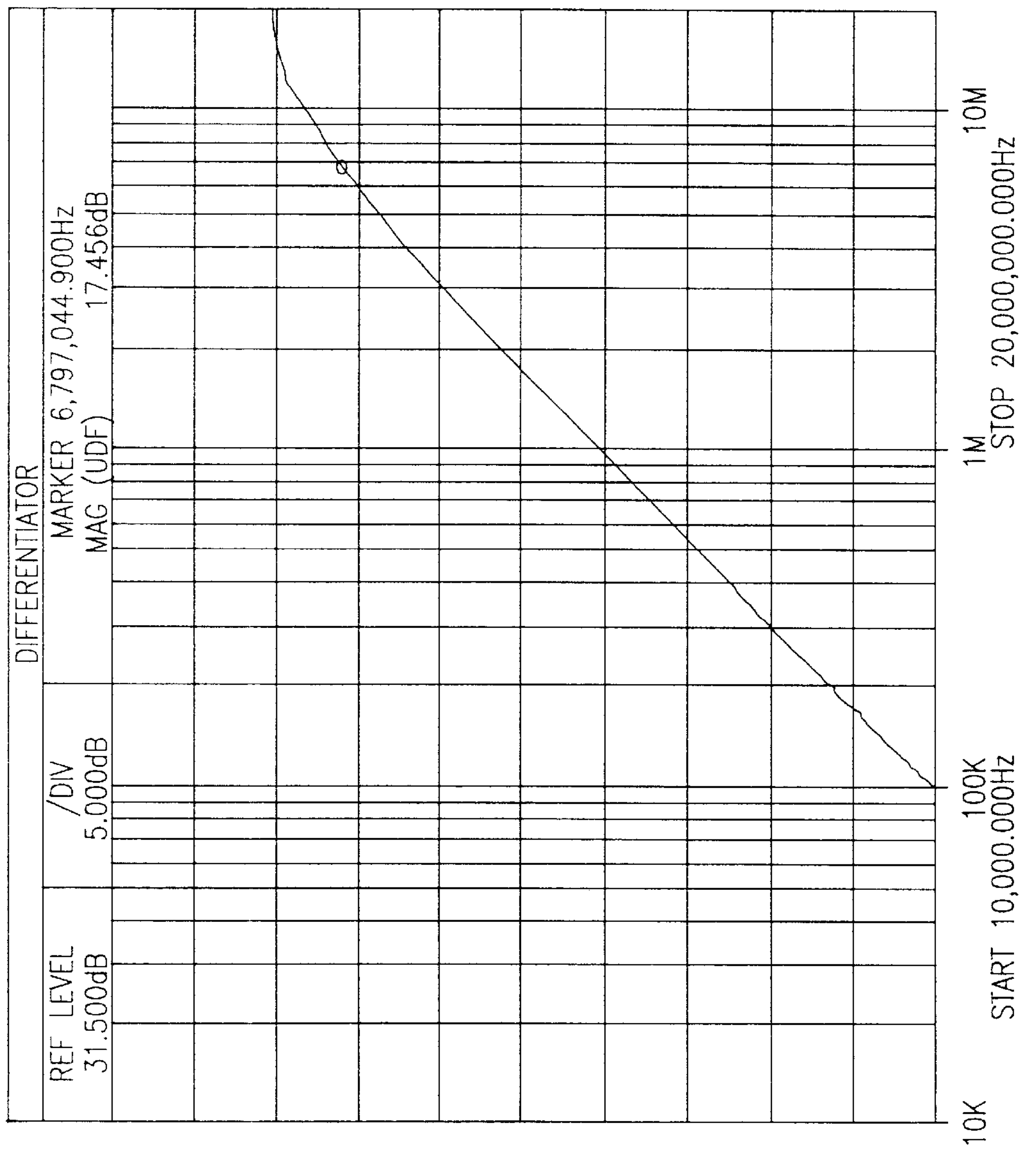
FIGS. 80A–80E are frequency response diagrams of various stages of a read channel.
Figure 84B:
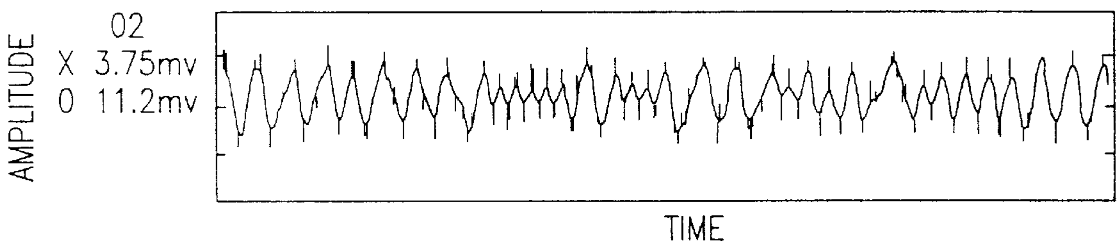

The output of the pre-amplification stage 6-202, as shown in FIG. 79A, is provided to the differentiation stage 6-204. The differentiation stage 6-204 may include a differential amplifier 6-212 such as a video differential amplifier configured with a capacitor 6-213 in a manner well known in the art. A representative frequency response diagram of the differentiation stage 6-204 is shown in FIG. 80A. The differentiation stage 6-204 effectively increases the relative magnitudes of the high frequency components of the amplified playback signal 6-202. An exemplary waveform of the output of the differentiation stage 6-204 is shown in FIG. 84B.

The differentiation stage 6-204 is followed by the equalization stage 6-206 as shown in FIG. 79A. The equalization stage 6-206 provides additional filtering so as to modify the overall channel transfer function and provide more reliable data detection. The equalization stage 6-206 shapes the differentiated input signal so as to even out the amplitudes of high and low frequency components and generate a smoother signal for later processing. Equalizing filters often modify the noise spectrum as well as the signal. Thus, an improvement in the shape of the differentiated input signal (i.e., a reduction in distortion) is usually accompanied by a degradation in the signal-to-noise ratio. Consequently, design of the equalization stage 6-206 involves a compromise between attempting to minimize noise and providing a distortion-free signal at an acceptable hardware cost. In general, equalizer design depends on the amount of intersymbol interference to be compensated, the modulation code, the data recovery technique to be used, the signal-to-noise ratio, and the noise spectrum shape.

A substantial portion of linear intersymbol interference when reading stored data in a magneto-optical recording system is caused by limited bandwidth of the analog read channel and roll-off of input signal amplitude with increased storage density. Accordingly, the equalization stage 6-206 may include one or more linear filters which modify the read channel transfer function so as to provide more reliable data detection. Normally, the equalization stage is implemented as part of the read channel, but, under certain conditions, part of the equalization filtering can be implemented as part of the write channel as well.

For purposes of analysis, the playback signal can be considered as a series of bipolar rectangular pulses having unit amplitude and a duration T. Alternatively, the playback signal may be considered as a series of bidirectional step functions at each flux reversal location, where the step amplitude matches the pulse amplitude. When an input signal is applied to the equalization stage 6-206, clocking information as well as pulse polarity for each clock cell or binit may be derived from the output signal of the equalization stage 6-206. The clocking and polarity information may be derived, in theory, by use of an ideal waveform restoration equalizer, which produces an output signal having mid-binit and binit boundary values similar to those of the input signal. The zero crossings of the output signal occur at binit boundaries in order to regenerate a clock accurately. If the zero-crossing time and direction are known, both clock and data can be extracted from the signal zero crossings.

In one embodiment, the equalization stage 6-206 comprises an equalizer selected from a class of waveform restoration equalizers. Generally, a waveform restoration equalizer generates a signal comprising a binary sequence resembling the input or playback waveform. The corners of the otherwise rectangular pulses of the resultant signal are rounded because signal harmonics are attenuated in the channel. The resultant signal may also exhibit some output signal amplitude variation.

An equalizer which produces a minimum bandwidth output signal is an ideal low pass filter with response of unity to the minimum cutoff frequency and no response at higher frequencies. Although such an ideal low pass filter is not physically realizable, the Nyquist theorem on vestigial symmetry suggests that the sharp cutoff minimum bandwidth filter can be modified and still retain output pulse zero crossing at all mid-binit cell times. To achieve this result, the high frequency roll-off of the equalized channel is preferably symmetrical and locates the half-amplitude point at the minimum bandwidth filter cutoff frequency.

One type of roll-off characteristic that may be exhibited by a filter in the equalization stage 6-206 is a raised cosine roll-off, leading to the name raised cosine equalizer. A raised cosine roll-off transfer function is approximately realizable, and has an improved response over the minimum bandwidth filter. The output pulses have a zero value at times nT, but the sidelobe damped oscillation amplitude is reduced. The output zero crossings of the raised cosine filter are more consistent than those of the minimum bandwidth filter, and linear phase characteristics are more easily achieved with a gradual roll-off, such as with the relatively gradual roll-off of the raised cosine filter. These advantages, however, are typically obtained at the expense of increased bandwidth. The ratio of bandwidth extension to the minimum bandwidth, fm, is sometimes referred to as the "$\alpha$" of the raised cosine channel. Thus, in the case of a modulation code with d=0, $\alpha$=0 is the minimum bandwidth but represents an unrealizable rectangular transfer function, while $\alpha$=1 represents a filter using twice the minimum bandwidth.

The impulse transfer function of the raised cosine equalization channel (including the analog channel plus equalizer, but excluding the input filter) may be given as follows:

$$H(f)=1,\ \text{for}\ 0<f<(1-\alpha)\cdot fm$$

$$H(f)=\tfrac{1}{2}\{1+\cos\,[(f-(1-\alpha)\cdot fm)/(2\cdot\alpha\cdot fm)]\},$$

$$\text{for}\ (1-\alpha)\cdot fm<f<(1+\alpha)\cdot fm$$

$$H(f)=0,\ \text{for}\ f>(1+\alpha)\cdot fm$$

where $\phi(f)=k\cdot f$ is the phase, and k is a constant. The above family may be referred to as a waveform restoration equalizers. The $\alpha=1$ channel has the property of having nulls at half-binit intervals as well as at full binit intervals. Such a channel results in a signal having no intersymbol interference at mid-binit or binit boundary times, which are signal zero crossing and sample times, thus allowing accurate clock and data recovery. For such a full bandwidth equalizer, the roll-off starts at zero frequency and extends to the cutoff frequency $f_c$.

Raised cosine equalizers are capable of correcting extensive amounts of linear intersymbol interference given adequate signal-to-noise ratio. A large amount of high frequency boost may be required to compensate for MO-media and optical system resolution. An equalizer bandwidth equal to at least twice the minimum bandwidth is preferred for elimination of linear intersymbol interference, assuming a physically realizable channel operating on a modulation code with d=0. A bandwidth of such a width generally results in reduction of the signal-to-noise ratio. The equalizer bandwidth is selected so as to achieve the optimum compromise between interference distortion and noise. In some instances, it may be desirable to narrow the bandwidth by using an $\alpha<1$ transfer function in order to improve noise at the expense of added distortion in the form of clock jitter.

Another waveform-restoration equalizer is known as the cosine $\beta$ response equalizer. The impulse transfer function of a full bandwidth $\beta$ channel is as follows:

$$H(f)-\cos^{\beta}(\pi\cdot f/(2\cdot f_c))\ \text{for}\ 0<f<f_c$$

$$H(f)=0,\ \text{for}\ f>f_c$$

Like the $\alpha$ equalizer family, there are numerous $\beta$ equalizers. Full bandwidth $\beta$ equalizers have a cutoff frequency off$_c$, and consequently reduce clock jitter due to the relatively small amount of interference at binit boundaries. Techniques are known in the art for optimizing these types of equalizing filters to achieve the minimum probability of error in various types of noise conditions.

Use of $\alpha$ equalizers generally results in a narrower bandwidth, thereby reducing noise at the expense of clock jitter or horizontal eye opening. Use of a $\beta$ equalizer generally results in signal-to-noise ratio improvement by reducing high frequency boost without reducing the bandwidth. The choice of $\beta$ equalizer may reduce the vertical eye opening or an effective amplitude reduction. The $\alpha=1$ and $\beta=2$ equalizer channels are identical from the standpoint of eye pattern, both types of channels having a relatively wide open eye pattern.

A preferred equalizer channel bandwidth for codes with d>0 does not necessarily depend on the minimum recorded pulse width, Tr, as might be expected, but rather on the binit width, Tm. This is because the data-recovery circuits are generally required to distinguish between pulses that differ by as little as one binit width, and time resolution is a function of signal bandwidth. The (0,k) codes (where k represents the maximum number of contiguous binits without flux reversals) require a nominal bandwidth $BW_{NOM}=1/Tm=f_c$ so as to eliminate interference at the center and edge of each binit, provided that intersymbol interference at binit boundaries is absent.

For codes with d>0, interference can be essentially eliminated at binit edges with a reduced bandwidth of $BW=1/(2\cdot Tm)=f_c/2$. In such a case, all binit read pulses then have unit amplitude at a flux reversal, and the read-pulse tails cross zero at flux transitions. The narrower bandwidth BW results in output signal zero crossings at a point of no interference, without considering binit centers, but the bandwidth reduction is typically obtained with an increase in detection ambiguity in the presence of channel impairments. The narrower bandwidth BW may also result in a reduction of the signal zero-crossing slope, leading to a potential increase in detection sensitivity with respect to noise, disc speed variations, analog channel differences, or improper equalization. For example, a half-bandwidth $\beta=2$ equalization channel with a (1,k)⅔ rate modulation code may result in a signal having no intersymbol interference at the signal zero crossings, but some amplitude variation between zero crossings. The bandwidth is less than the bandwidth for non-return to zero ("NRZI") modulation, even though more information is recorded than with NRZI modulation (e.g., bandwidth=0.75 and bit rate=1.33 relative to NRZI). The reduced bandwidth makes up for the modulation code rate loss.

The $\alpha=1$ and $\beta$ waveform restoration equalizers may permit output zero crossings to occur at the equivalent of input pulse edges. Data detection can then be obtained by hard-limiting the equalized signal, generally resulting in an output signal resembling the original playback signal. However, this result occurs only if the equalizer response extends to DC, which is typically not the case for a magneto-optical channel. Disc birefringence in the MO channel causes drift up and down of the DC baseline, resulting in output binits which are lengthened or shortened according to the degree of amplitude offset at zero-crossing detector. This problem can be reduced by the use of DC restoration as described herein. In order to achieve the desired low frequency response for a waveform-restoration equalizer, the low frequency signals may have to be amplified significantly, which can seriously degrade signal-to-noise ratio under some conditions. If low frequency noise is present in significant amounts, waveform-restoration equalization techniques may not be very satisfactory unless a modulation code with no DC and little low-frequency content or DC restoration circuits are used.

Figure 80B:
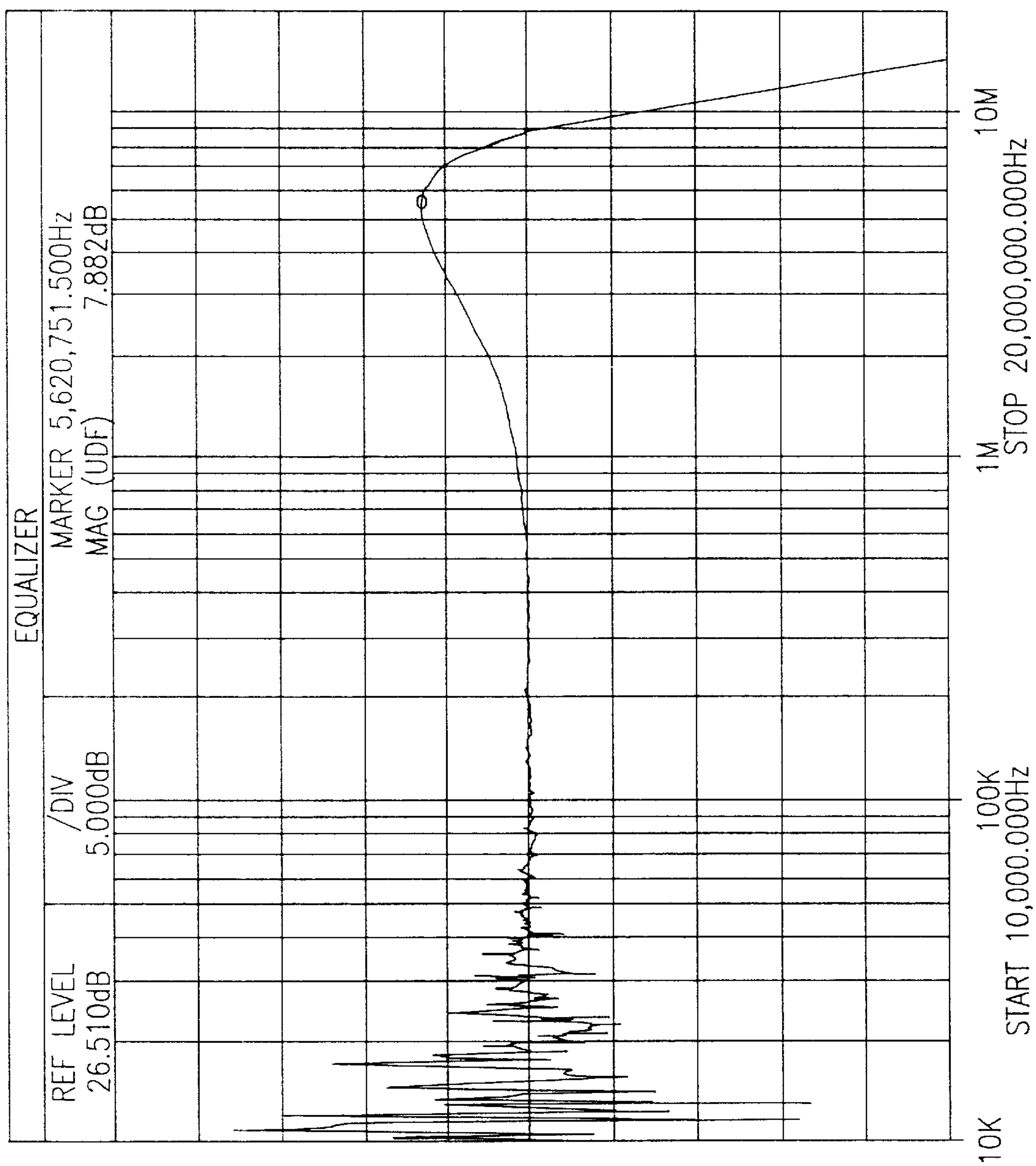

In a preferred embodiment, the equalization stage 6-206 may comprise a programmable filter and equalizer 6-207, FIG. 79A, located on an integrated chip. Such integrated chips are presently available from various manufacturers. The filter and equalizer 6-207 may be of an equi-ripple variety and have relatively constant group delay up to a frequency equal to about twice the cutoff frequency. A representative frequency response diagram of the equalization stage 6-206 is shown in FIG. 80B, and an exemplary output waveform is shown in FIG. 84C.

Figure 84C:
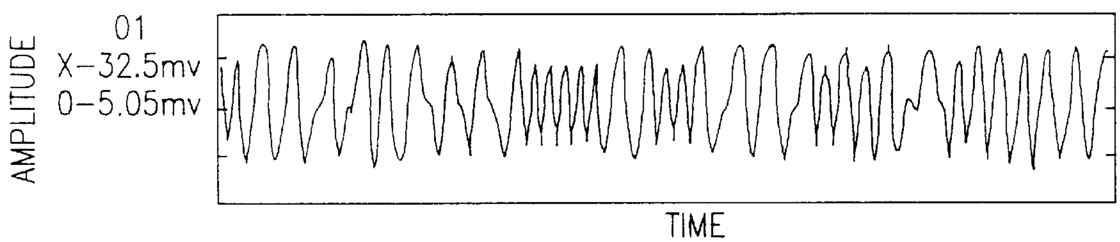

After the signal has been processed by the equalization stage 6-206, the signal peaks of the waveform in FIG. 84C contain accurate information regarding the position of the read data. The signal peaks can be detected by taking another derivative, but doing so may be detrimental to the system's signal-to-noise ratio and will likely cause undesired jitter. A preferred embodiment of the invention described herein provides an accurate means for detecting the signal peaks without taking a second derivative, by using partial integration and a novel data generation circuit.

Figure 80C:
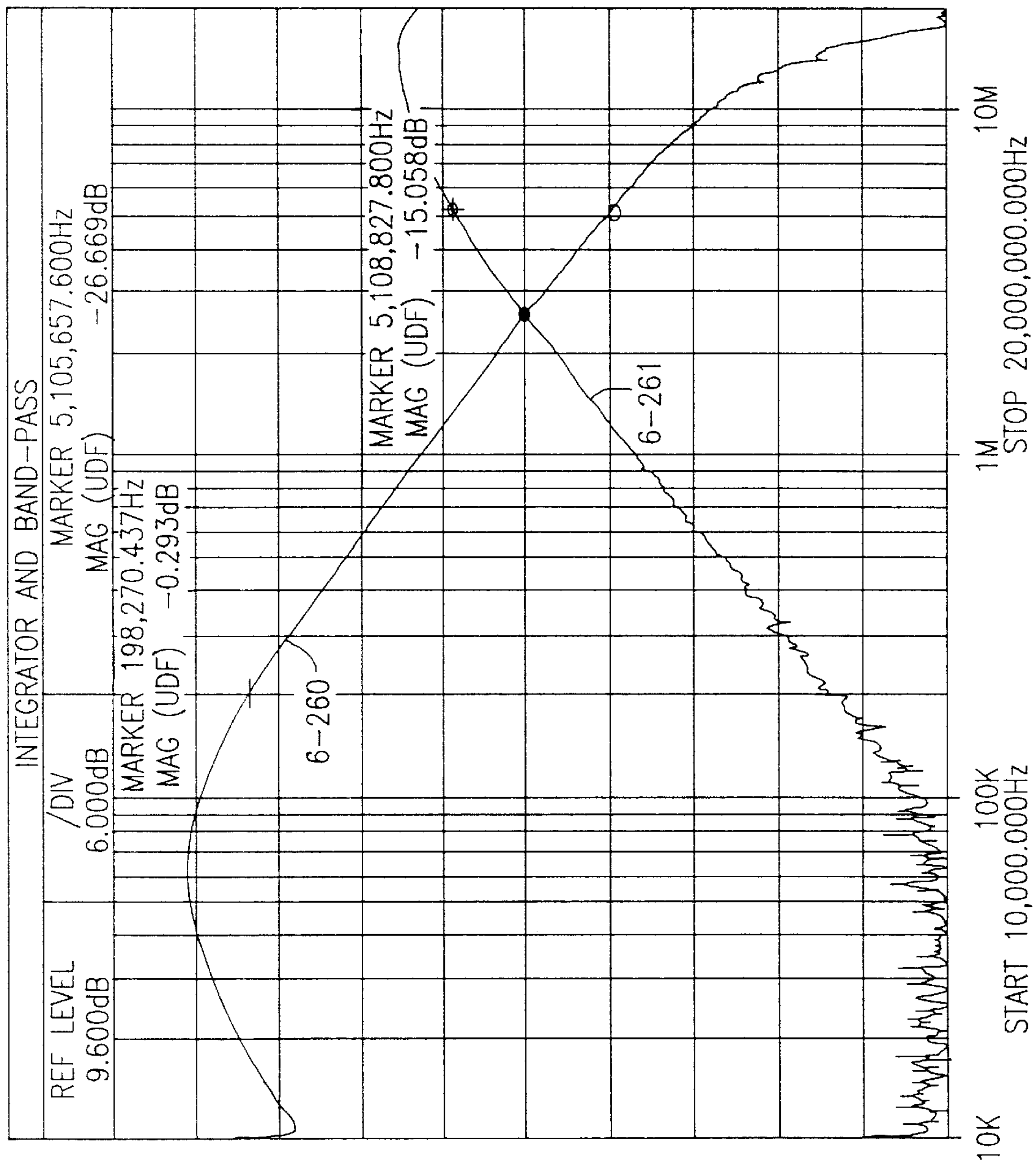

After the signal has been processed by the equalization stage 6-206, it is provided to the partial integrator stage 6-208 for further shaping of the waveform. As illustrated in FIG. 79A, the partial integrator stage 6-208 may comprise an amplifier stage 6-229, a bandpass filter stage 6-230, an integrator and low pass filter stage 6-232, and a subtractor and low pass filter stage 6-234. The amplifier stage 6-229 receives the output of the equalization stage 6-206 and provides a signal to the bandpass filter stage 6-230 and the integrator and low pass filter stage 6-232. The integrator and low pass filter stage 6-232 preferably attenuates a selected range of high frequency components. A representative frequency response 6-260 of the integrator and low pass filter stage 6-232 and a representative frequency response 6-261 of the bandpass filter stage 6-230 are depicted in FIG. 80C.

Figure 80D:
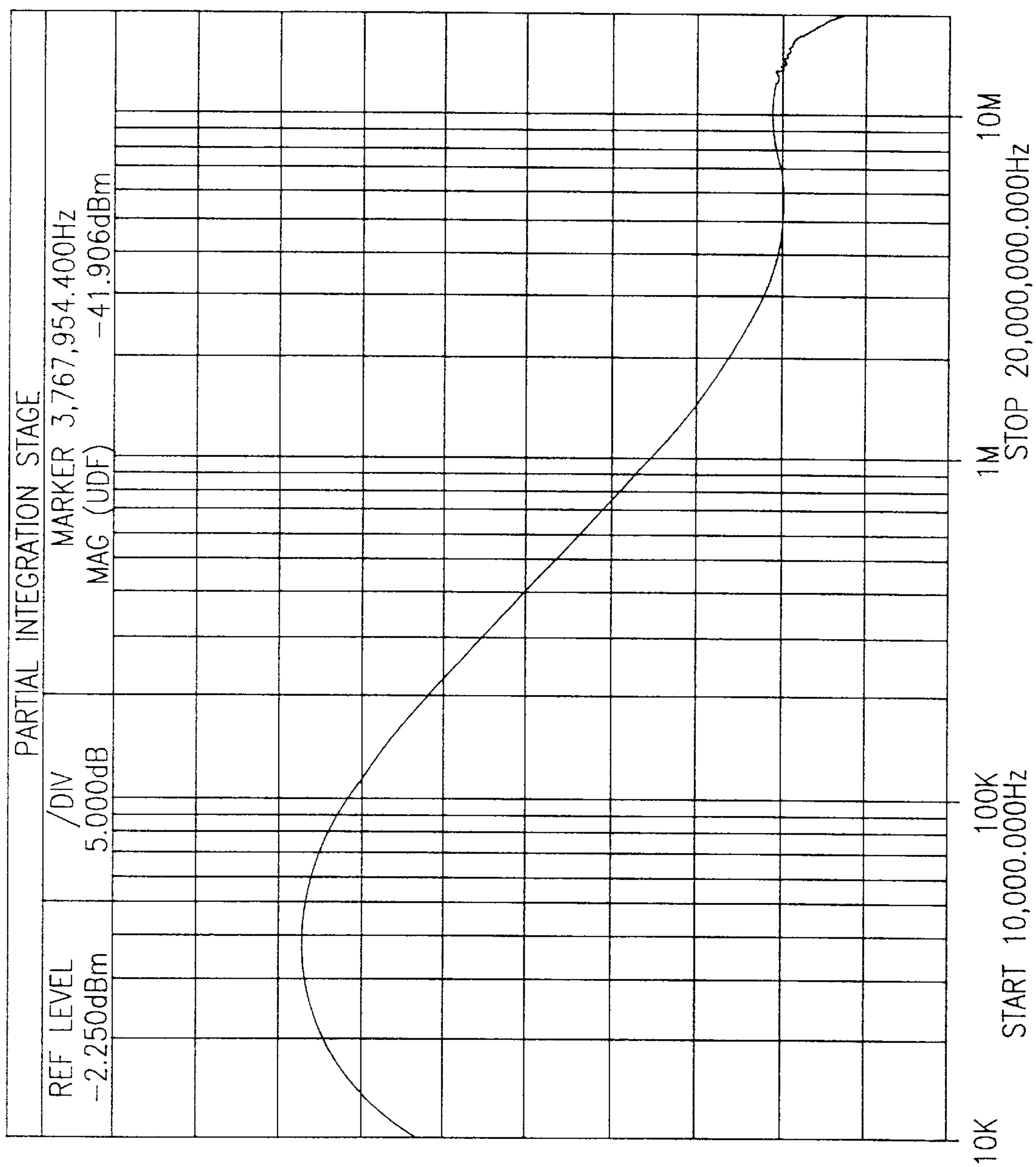
Figure 84D:
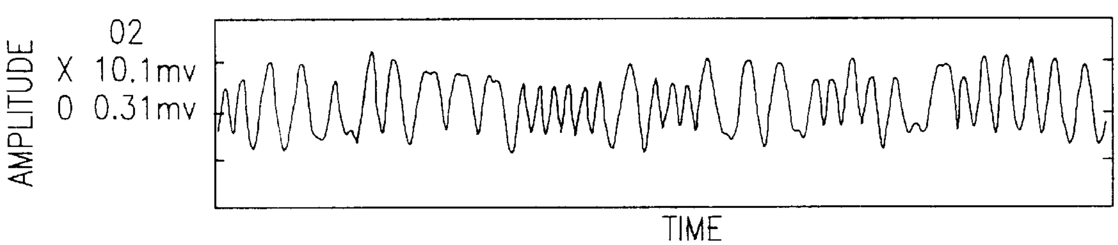

The output of the bandpass filter stage 6-230, FIG. 79A, is thereafter subtracted from the output of the integrator and low pass filter stage 6-232 and filtered by the low pass filter stage 6-234. A graph of the total frequency response of the partial integrator stage 6-208, including the low pass filter 6-234, is shown in FIG. 80D. An exemplary output waveform of the partial integrator stage 6-208 is shown in FIG. 84D.

Figure 79B:
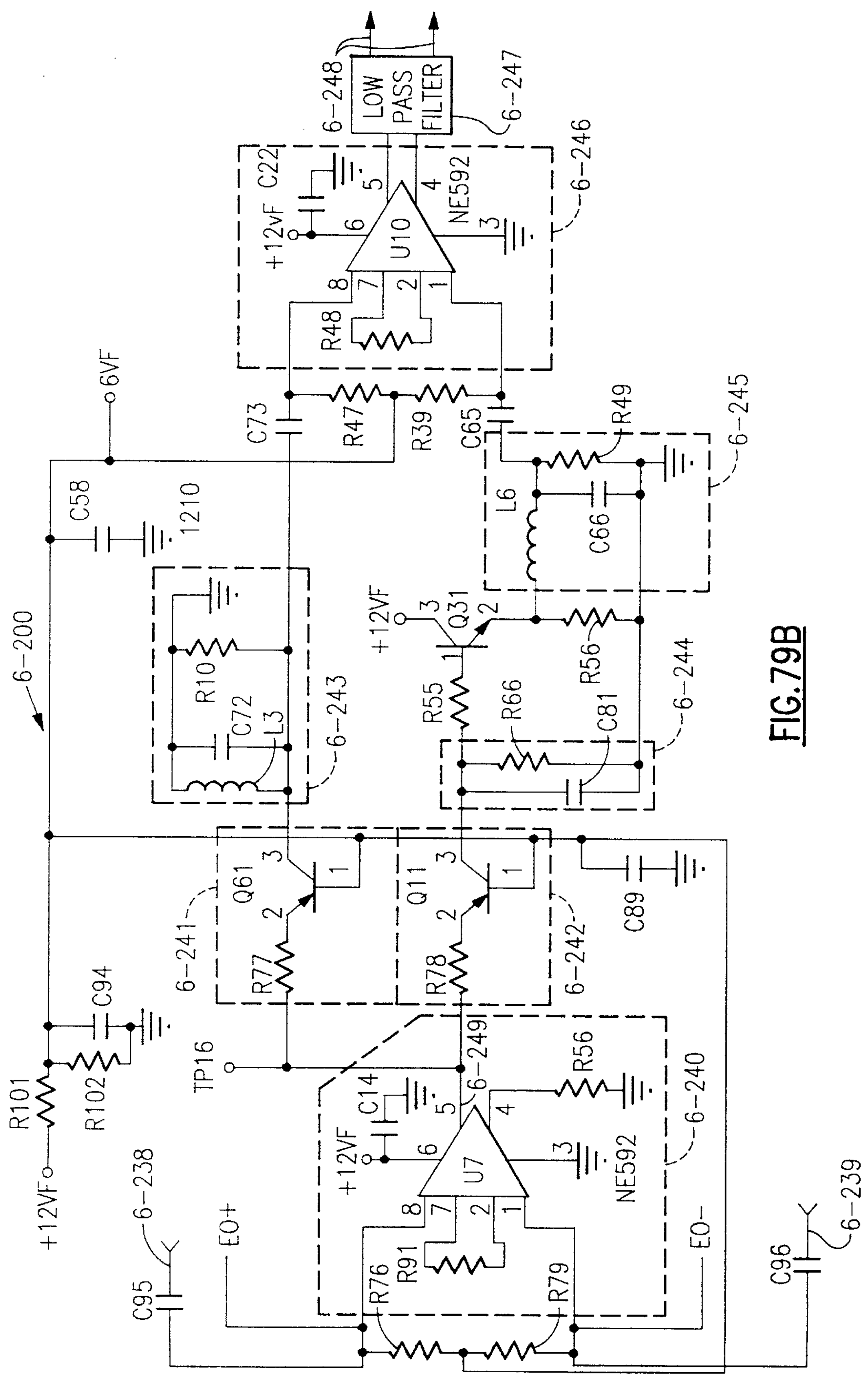
FIG. 79B is a detailed circuit diagram of a partial integrator stage.

A detailed circuit diagram of a particular embodiment of the partial integrator stage 6-208 is illustrated in FIG. 79B. Initially, as shown in FIG. 79B, a differential input 6-238, 6-239 is received, such as from the equalization stage 6-206. The differential input 6-238, 6-239 is provided to differential amplifier 6-240, configured as shown, which differentially sums its inputs. Differential amplifier 6-240 essentially corresponds to amplifier stage 6-229 shown in FIG. 79A.

An output 6-249 from the differential amplifier 6-240 is connected to a pair of current generators 6-241 and 6-242. The first current generator 6-241 comprises a resistor R77 and a PNP transistor Q61, configured as shown in FIG. 79B. The second current generator 6-242 also comprises a resistor R78 and a PNP transistor Q11, configured as shown in FIG. 79B.

An output from current generator 6-241 is connected to a bandpass filter 6-243. The bandpass filter 6-243 includes an inductor L3, a capacitor C72 and a resistor R10, configured in parallel as shown. The bandpass filter 6-243 essentially corresponds to bandpass filter stage 6-230 of FIG. 79A. An output from the other current generator 6-242 is connected to an integrator 6-244. The integrator 6-244 comprises a capacitor C81 and a resistor R66, configured in parallel as shown in FIG. 79B.

An output from the integrator 6-244 is connected through a resistor R55 to a NPN transistor Q31. Transistor Q31 is configured as an emitter-follower, providing isolation with respect to the output of the integrator 6-244, and acting as a voltage source. The emitter of transistor Q31 is connected to a low pass filter 6-245. The low pass filter 6-245 comprises an inductor L6, a capacitor C66 and a resistor R49, configured as shown in FIG. 79B. The integrator 6-244, emitter-follower including transistor Q31, and the low pass filter 6-245 essentially correspond to the integrator and low pass filter stage 6-232 shown in FIG. 79A. The frequency response of the integrator 6-244 essentially corresponds to the frequency response 6-260 shown in FIG. 80C, while the frequency response of the band pass filter 6-243 essentially corresponds to the frequency response 6-261 shown in FIG. 80C.

An output from the low pass filter 6-245 and an output from the bandpass filter 6-243 are coupled to a differential amplifier 6-246, configured as shown in FIG. 79B. Differential amplifier 6-246 differentially sums its inputs, and provides a differential output to a low pass filter 6-247. The differential amplifier 6-246 and low pass filter 6-247 correspond essentially to the subtractor and low pass filter stage 6-234 shown in FIG. 79A.

Exemplary waveforms for the circuit of FIG. 79B are shown in FIGS. 80G(1)–80G(4). FIG. 80G(1) shows first an exemplary input waveform 6-256 as may be provided to the differential amplifier 6-240 from, e.g., equalizer 6-206. The next waveform 6-257 in FIG. 80G(2) corresponds to an output from the bandpass filter 6-243, FIG. 79B, in response to the circuit receiving input waveform 6-256. The next waveform 6-258 in FIG. 80G(3) corresponds to an output from the low pass filter 6-245 in response to the FIG. 79B circuit receiving input waveform 6-256. Waveform 6-258 shows the effect of operation of the integrator 6-244. The function of low pass filter 6-245 is essentially to provide a delay so as to align the output of the bandpass filter 6-243 and the integrator 6-244 in time at the input of differential amplifier 6-246. Low pass filter 6-245 thereby matches the delays along each input leg of the differential amplifier 6-246 prior to differential summing.

The final waveform 6-259 in FIG. 80G(4) corresponds to an output from the second low pass filter 6-247, after the signals output from the bandpass filter 6-243 and low pass filter 6-245 have been combined and filtered. Waveform 6-259 typically exhibits considerably improved resolution over the original playback signal read from the magnetic medium.

It should be noted that the partial integration functions described with respect to FIGS. 79A and 79B are carried out using differential amplifiers (e.g., differential amplifiers 6-240 and 6-246), thereby providing common mode rejection or, equivalently, rejection of the DC component of the input signal 6-238, 6-239. Another feature of the embodiments shown in FIGS. 79A and 79B is the relatively favorable frequency response characteristics exhibited by the partial integration stage. In particular, by combining an integrated signal with a high pass filtered signal (e.g., at subtractor and low pass filter block 6-234 or differential amplifier 6-246), noise is removed from the differentiated and equalized playback signal, but while maintaining relatively rapid response time due in part to the high pass frequency boost provided by the bandpass filter.

Figure 80E:
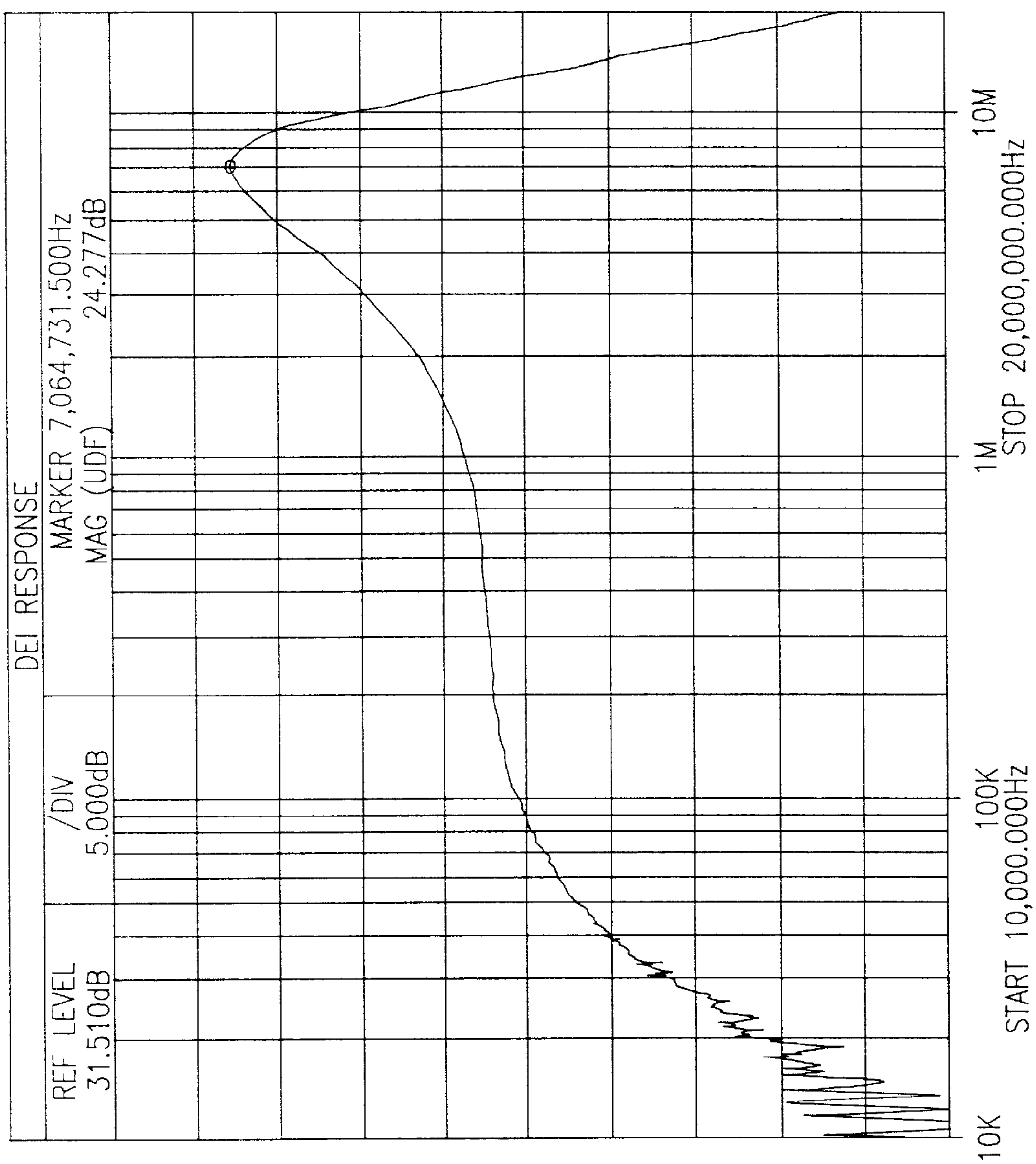
Figure 80F:
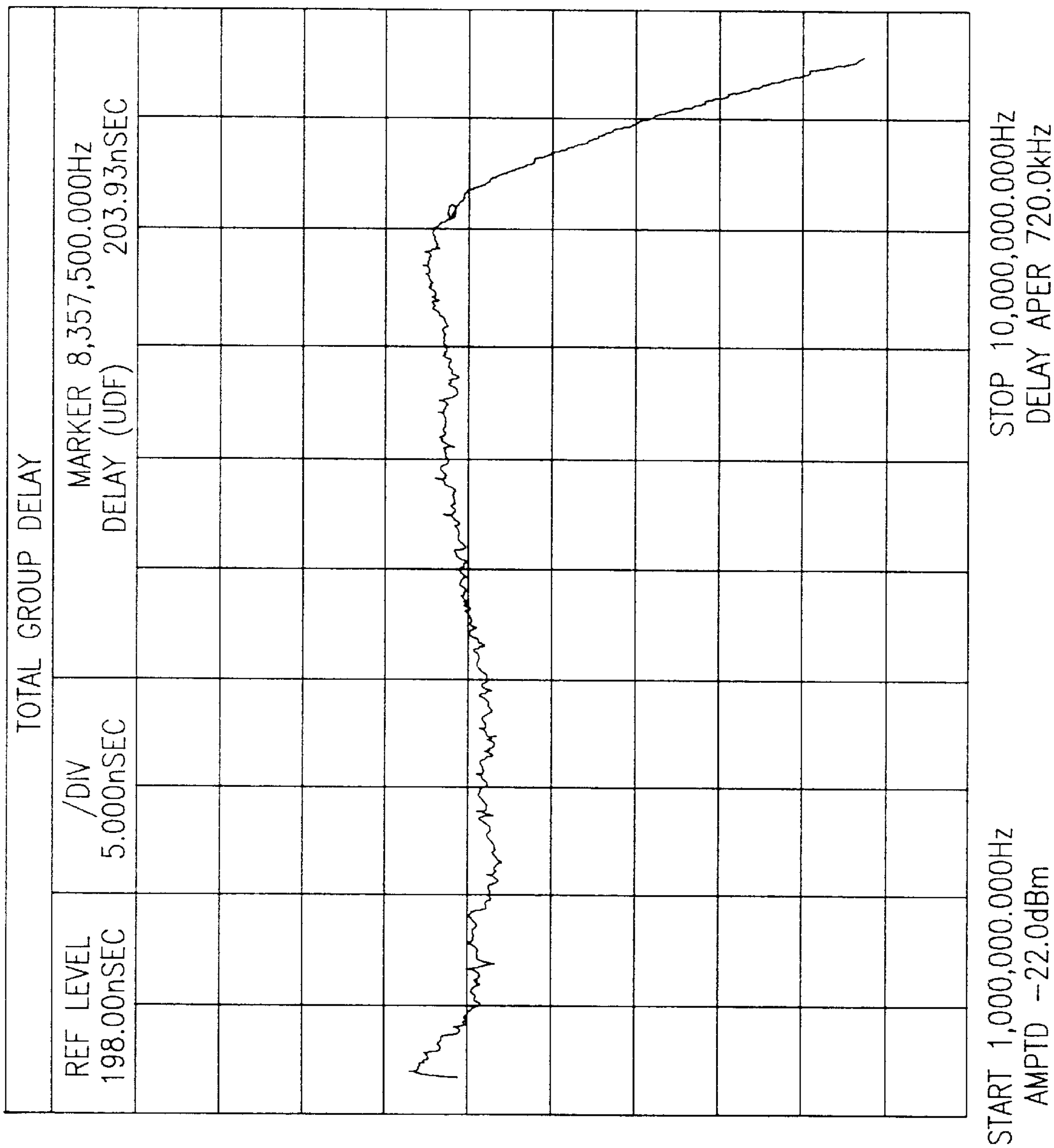
FIG. 80F is a plot of group delay for a combination of stages in a read channel.

A primary function of the combination of the differentiation stage 6-204, the equalization stage 6-206, and the partial integration stage 6-208 is to shape the playback signal 6-220 in an appropriate manner for facilitating data recovery. As can be seen by comparing FIGS. 84A and 84D, the resultant signal shown in FIG. 84D is similar to the playback signal 6-220 of FIG. 84A (from which it was derived) but differs therefrom in that the amplitudes of its high and low frequency components have been equalized and sharp noise-like characteristics removed. A graph of the total frequency response for the combination of the differentiation stage 6-204, the equalization stage 6-206, and the partial integration stage 6-208 is shown in FIG. 80E. A graph of the total group delay response for the same chain of elements is shown in FIG. 80F.

It may be noted that tape drive systems presently exist utilizing equalization and integration of a playback signal in order to facilitate data recovery. To a large degree, however, such systems do not suffer from the problems of DC buildup because they typically utilize DC-free codes. As mentioned previously, DC-free codes have the disadvantage of being relatively low in density ratio and hence inefficient. The present invention in various embodiments allows for the use of more efficient coding systems by providing means for eliminating the effects of DC buildup without necessarily using a DC-free code.

Figure 83:
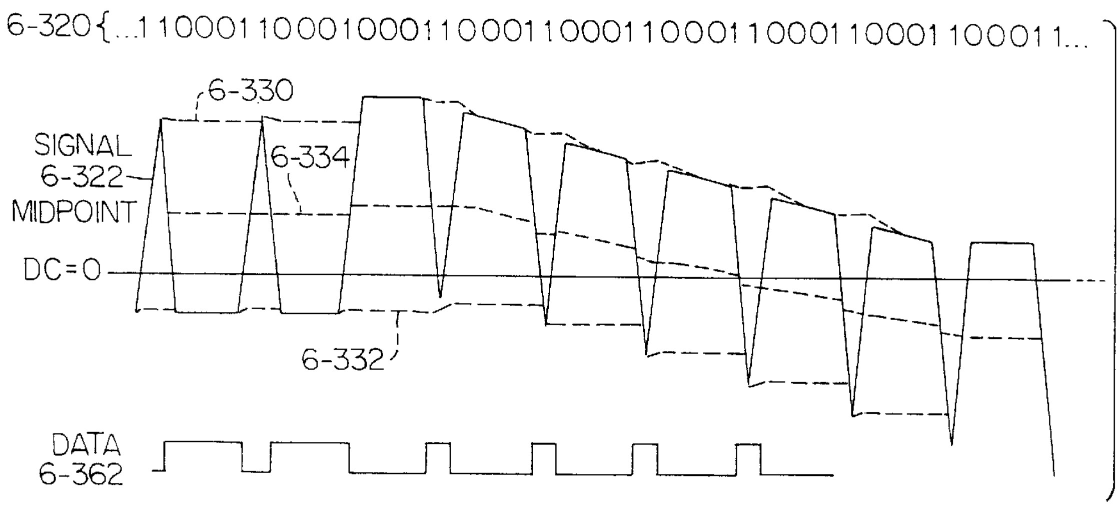
FIG. 83 is a waveform diagram showing tracking by a threshold signal of the DC envelope of an input signal.
Figure 81:
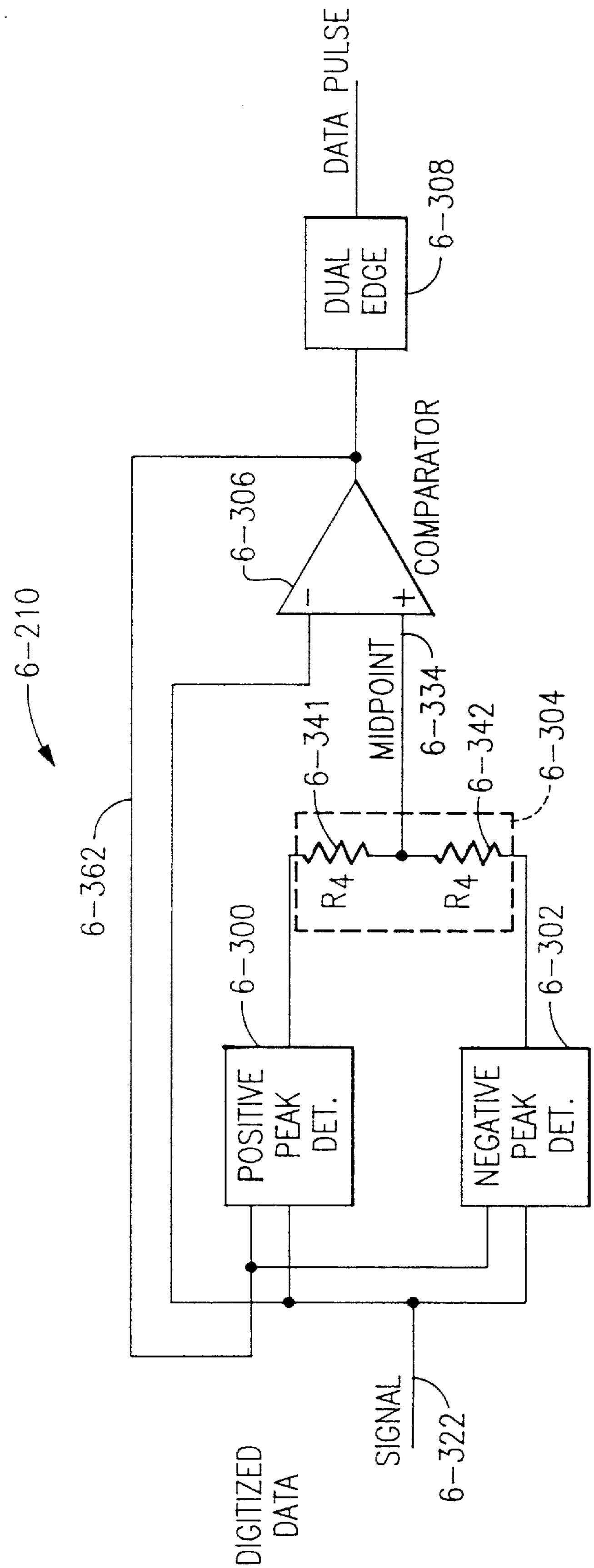
FIG. 81 is a block diagram of a peak detection and tracking circuit.

The output of the partial integrator stage 6-208 (e.g., the waveform in FIG. 84D) is provided to the data generation stage 6-210 of FIG. 79. A block diagram of the data generation stage 6-210 is shown in FIG. 81. The data generation stage 6-210 includes a positive peak detector 6-300, a negative peak detector 6-302, a voltage divider 6-304, a comparator 6-306, and a dual edge circuit 6-308. The operation of the circuit show in FIG. 81 may be explained with reference to FIG. 83. In FIG. 83, it is assumed that a recorded bit sequence 6-320 has been read and eventually caused to be generated, in the manner as previously described, a preprocessed signal 6-322 from the partial integrator stage 6-208. It should be noted that the preprocessed signal 6-322 and various other waveforms described herein have been idealized somewhat for purposes of illustration, and those skilled in the art will appreciate that the actual waveforms may vary in shape and size from those depicted in FIG. 83 and elsewhere.

The preprocessed signal 6-322 is fed to the positive peak detector 6-300 and the negative peak detector 6-302 which measure and track the positive and negative peaks, respectively, of the preprocessed signal 6-322. A positive peak output signal 6-330 of the positive peak detector 6-300 and a negative peak output signal 6-332 of the negative peak detector 6-302 are illustrated in FIG. 83. The positive peak output signal 6-330 and the negative peak output signal 6-332 are averaged by the voltage divider 6-304, which is comprised of a pair of resistors 6-341 and 6-342. The output of voltage divider 6-304 is utilized as a threshold signal 6-334, FIGS. 81–83, and represents the approximate peak-to-peak midpoint of the preprocessed signal 6-322. The output of the voltage divider 6-304 is provided to the comparator 6-306 which compares the divided voltage with the preprocessed signal 6-322. The comparator 6-306 changes states when the preprocessed signal 6-322 crosses the threshold signal 6-334, indicating a transition in the read data from 1 to 0 or 0 to 1. The output of comparator 6-306 is shown as an output data waveform 6-362 in FIG. 83. As explained in more detail below, the output data waveform 6-362 is fed back to the positive peak detector 6-300 and negative peak detector 6-302 to allow tracking of the DC envelope. The output of the comparator 6-306 is also provided to the dual edge circuit 6-308 which generates a unipolar pulse of fixed duration each time the comparator 6-306 changes states.

The output of the dual edge circuit 6-308 provides clocking and data information from which recovery of the recorded data may be had in a straightforward manner. For example, in a pulse-width modulation ("PWM") technique such as the GCR 8/9 modulation code described previously, each data pulse output from the dual edge circuit 6-308 represents a transition in flux (i.e., a recorded 1-bit), while the lack of data pulse at clock intervals would represent the lack of transition in flux (i.e., a recorded 0-bit). The sequence of recorded bits can thereafter be decoded by decoder 6-24 (shown in FIG. 75) by methods well known in the art to determine the original data.

Figure 82:
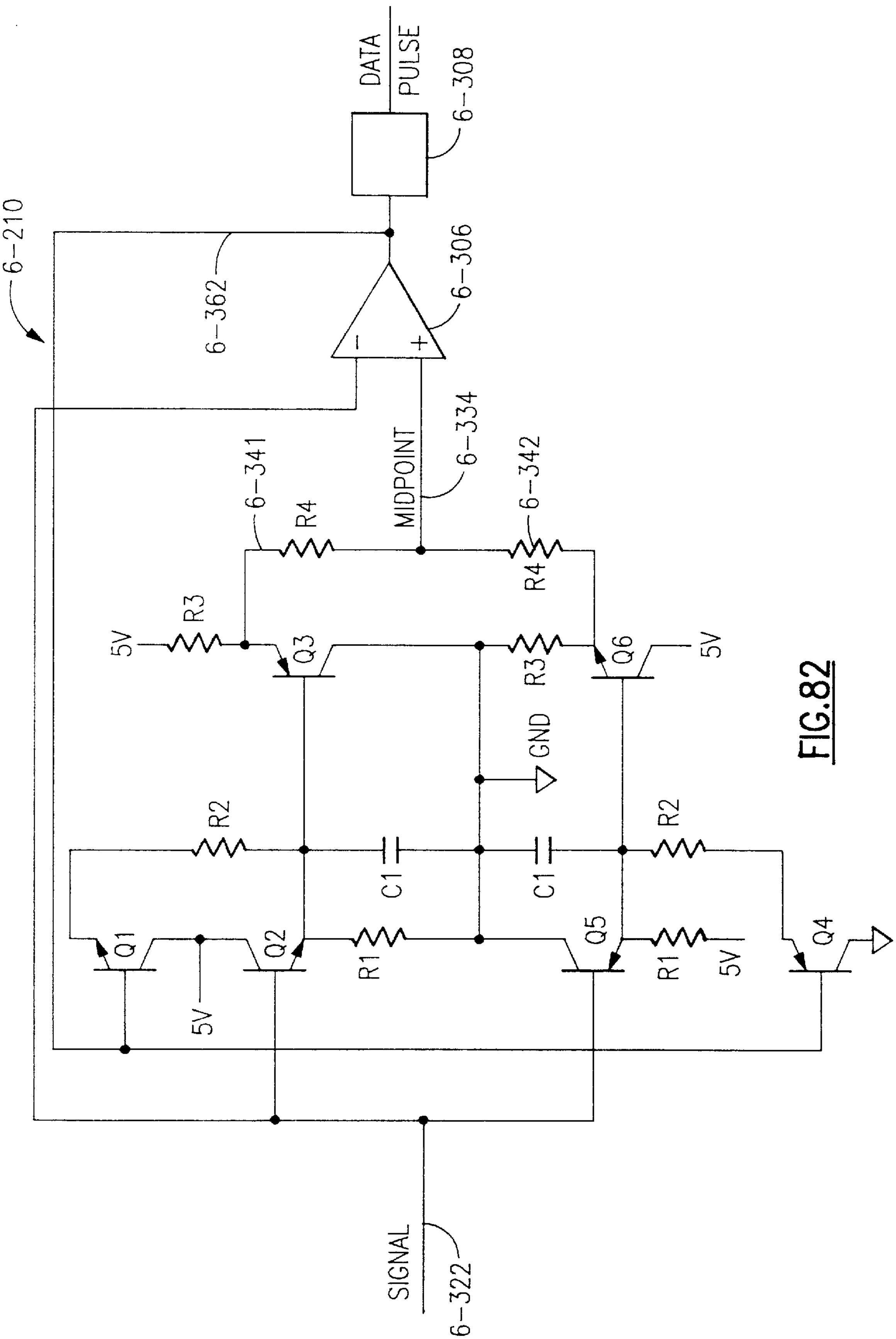
FIG. 82 is a schematic diagram of the peak detection and tracking circuit of FIG. 81.

In order to properly track the envelope caused by the DC portion of the preprocessed signal 6-322, a preferred embodiment feeds back duty cycle information from the output signal 6-362 to the peak detectors. Thus, the output of the comparator 6-306 is fed back to the positive peak detector 6-300 and the negative peak detector 6-302. This process may be explained further by reference to FIG. 82 which depicts a more detailed circuit diagram of the data generator stage 6-210. As shown in FIG. 82, the preprocessed signal 6-322 is provided to the base of transistors Q2 and Q5. Transistor Q2 is associated with the positive peak detector 6-300, and transistor Q5 is associated with the negative peak detector 6-302. Because the positive peak detector 6-300 and negative peak detector 6-302 operate in an analogous fashion, the duty cycle feedback operation will be explained only with reference to the positive peak detector 6-300, while those skilled in the art will understand by reference to FIG. 82 and the description below the analogous operation of the negative peak detector 6-302.

Transistor Q2 charges a capacitor C1 when the amplitude of the preprocessed signal 6-322 exceeds the stored voltage of the capacitor C1 (plus the forward bias voltage of the transistor Q2). In FIG. 83, it can be seen that the positive peak output signal 6-330 charges rapidly to the peak of the signal 6-322. The output signal 6-362, through feedback, maintains the positive charge on the capacitor C1 when the output signal 6-362 is high and allows the capacitor C1 to discharge when the output signal 6-362 is low. Thus, if the output signal 6-362 is high, the positive charge on capacitor C1 is maintained by a transistor Q1 through resistor R2. Preferably, resistors R1 and R2 are selected to be the same value so that charge is added to the capacitor through resistor R2 at the same rate that it is discharged through resistor R1, thus maintaining as constant the net charge on capacitor C1. If, on the other hand, the output signal 6-362 is low, then transistor Q1 is turned off and capacitor C1 is allowed to discharge through resistor R1. The values of capacitor C1 and resistor R1 are preferably selected such that the time constant is slightly faster than the speed expected of DC buildup so that the capacitor C1 can track the change in DC level as it occurs.

The output of capacitor C1 is provided to the base of a transistor Q3. The voltage level of the emitter of Q3 is a bias voltage level above the output of capacitor C1. Current is drawn through resistor R3 which allows the emitter of transistor Q3 to follow the voltage of the capacitor C1 (offset by the emitter-base bias voltage). Thus, the emitter of transistor Q3 yields positive peak output signal 6-330. It should be noted that transistors Q1 and Q2 are NPN type transistors while Q3 is a PNP type transistor. Thus, the NPN-PNP configuration largely cancels out adverse thermal effects that may be experienced with transistors Q1, Q2, and Q3, and also cancels out the bias voltages associated with their operation.

The negative peak detector 6-302 operates in an analogous fashion to the positive peak detector 6-300 and is therefore not explained in greater detail. The emitter of transistor Q6 yields negative peak output signal 6-332.

As described previously, positive peak output signal 6-330 and negative peak output signal 6-332 are averaged by the voltage divider 6-304 comprised of the pair of resistors R4, 6-341 and 6-342, as shown in FIGS. 81 and 82 to form the threshold signal 6-334. The threshold signal 6-334 therefore constitutes the approximate midpoint of the peak-to-peak value of the preprocessed signal 6-322 and tracks the DC envelope of the preprocessed signal 6-322 through duty cycle feedback compensation.

Although the duty cycle feedback has been shown in the preferred embodiment as originating from the output of the comparator 6-306, it may be observed that other feedback paths may also be utilized. For example, a similar feedback path may be taken from the output of dual edge circuit 6-308 if a flip/flop or other memory element is placed at the output of the dual edge circuit 6-308. Also, other means for measuring duty cycle and adjusting the threshold signal to track the DC envelope may be utilized.

A preferred technique such as described generally in FIGS. 78 and 79B includes the step of differentiation of the playback signal prior to partial integration, followed thereafter by the step of DC tracking. The preferred method is particularly suitable for systems having a playback signal with relatively poor resolution, and may be advantageously applied, for example, to reading information stored in a GCR format. In one aspect of the preferred method, the initial step of differentiation reduces the low frequency component from the incoming playback signal. In another aspect of the preferred method, the partial integration stage results in restoration or partial restoration of the playback signal while providing rapid response due to the high pass boost (e.g., from the bandpass filter stage). The preferred method may be contrasted with a method in which integration of the playback signal is carried out initially (i.e., prior to differentiation), which may lead to an increased size of DC component and a correspondingly more difficult time in tracking the DC component.

It will be appreciated that the various circuits and methods described herein are not limited to magneto-optical systems but may also be useful in systems for reading data on stored tapes and other types of disks as well and, in a more general sense, in any system (whether or not a data storage system) for processing electrical signals in which it is desired to mitigate the effects of DC buildup.

Data Storage and Other Aspects of Data Retrieval

Figure 85:
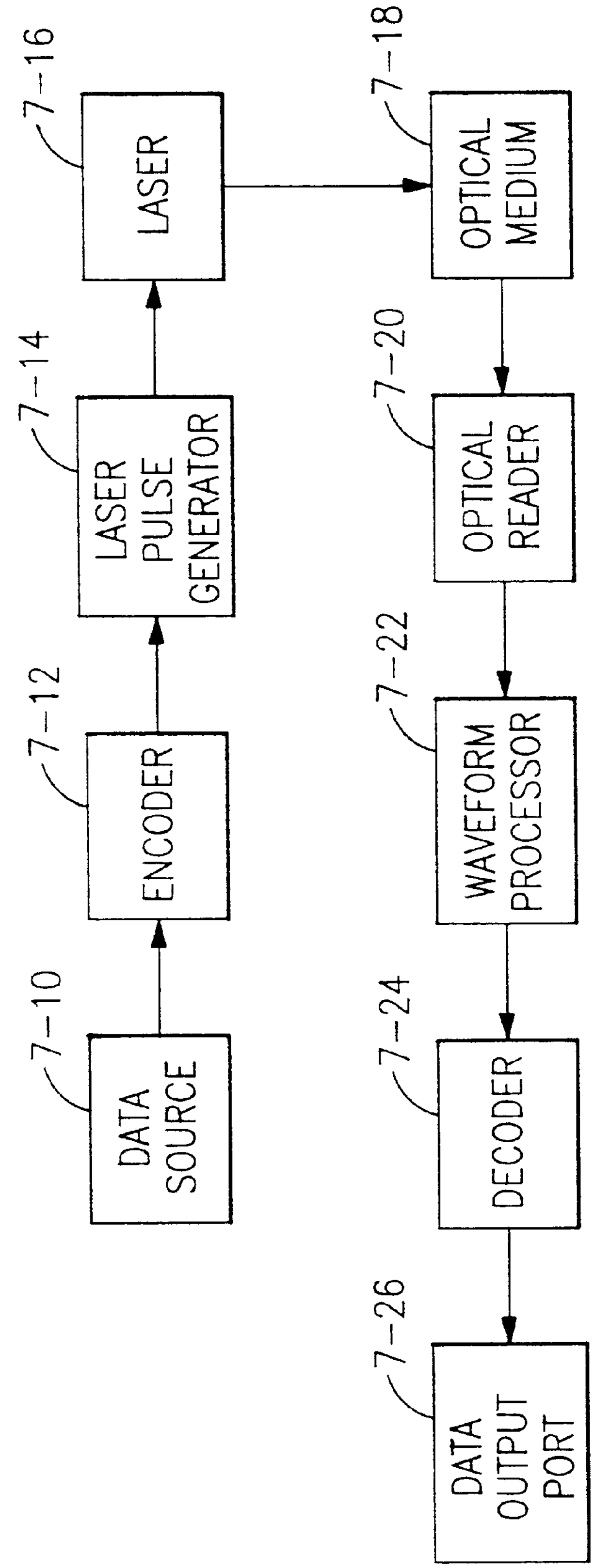
FIG. 85 is a block diagram showing the optical data storage and retrieval system.

In FIG. 85, during the write mode, a data source 7-10 transmits data to an encoder 7-12. The encoder 7-12 converts the binary data into binary code bits. The code bits are then transmitted to a laser pulse generator 7-14, where the code bits are converted to energizing pulses for turning a laser 7-16 on and off. In the preferred embodiment, a code bit "1" indicates that the laser will be pulsed on for a fixed duration independent of the code bit pattern. Depending on the laser and optical medium being used, however, performance may be enhanced by adjusting the occurrence of the laser pulse or by extending the otherwise uniform pulse duration. The output of laser 7-16 heats localized areas of an optical medium 7-18, which is being exposed to a magnetic flux that sets the polarity of the magnetic material on the optical medium 7-18. During reads of the optical medium 7-18, a laser beam is impinged on the surface of the medium. The polarization of the reflected laser beam will be dependent upon the polarity of the magnetic surface of the optical medium.

During the read mode, the reflected laser beam will be inputted into an optical reader 7-20, where the read code output will be sent to a waveform processor 7-22. The processed read code will be sent to a decoder 7-24, where output data will be transmitted to a data output port 7-26 for transmission.

Figures 86, 86A:
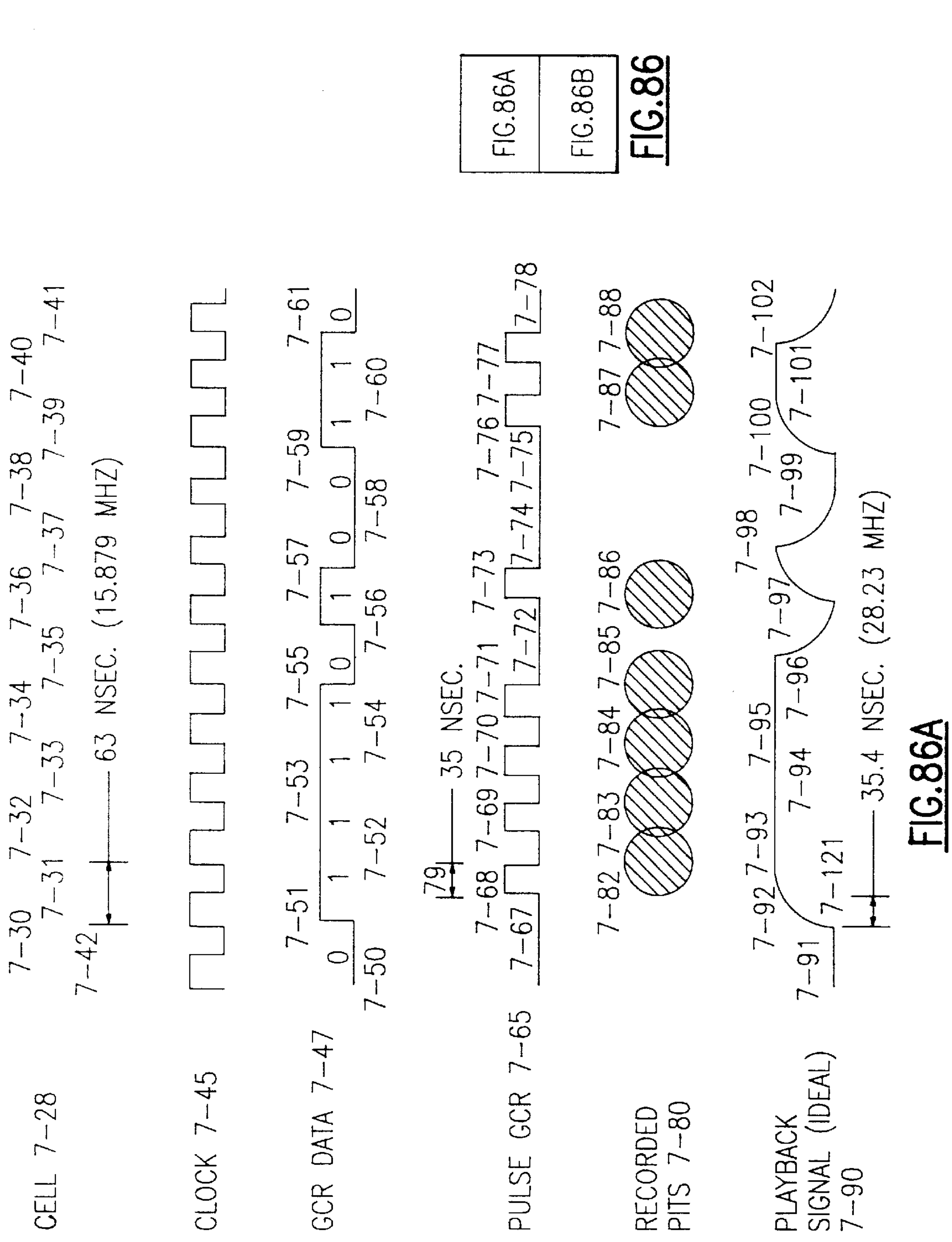
FIG. 86 is a series of waveforms showing uniform laser pulsing under a pulsed GCR format and nonuniform laser pulsing under an RLL 2,7 format.

FIG. 86 illustrates the differences between the laser pulsing in GCR 8/9 and RLL 2,7 code formats. In GCR 8/9, a cell 7-28, FIG. 86A, is defined as a code bit. For GCR 8/9, nine cells or code bits are equal to eight data bits. Thus, cells 7-30 through 7-41 each correspond to one clock period 7-42 of a clock waveform 7-45. For a 3½" optical disc rotating at 2,400 revolutions per minute (RPM) with a storage capacity of 256 Mbytes, clock period 7-42 will typically be 63 nanoseconds or a clock frequency of 15.879 MHz. A GCR data waveform 7-47 is the encoded data output from the encoder 7-12. A representative data sequence is depicted in FIG. 86A. The code data sequence "010001110101" is shown in GCR data 7-50 through 7-61, where GCR data 7-50 is low. GCR data 7-51 is high. GCR data 7-52 is high and so forth for GCR data 7-53 through 7-61. A pulse GCR waveform 7-65 is the output from laser pulse generator 7-14 and inputted into laser 7-16. In practicing the invention, a non-return-to-zero driving signal is utilized to energize the magnetic recording head. Thus, the magnetization of the previously erased optical medium reverses polarity when, in the presence of an external magnetic field of opposite polarity to the erased medium, the laser is pulsed on with sufficient energy to exceed the Curie temperature of the medium. Pulse GCR waveform 7-65 as shown has not been adjusted in time or duration to reflect performance enhancement for specific data patterns. Pulse GCR 7-67 through 7-78 reflect no pulse when the corresponding GCR data 7-47 is low and reflect a pulse when GCR data 7-47 is high. For example, pulse GCR 7-67 has no pulse because GCR data 7-50 is low. Conversely, pulse GCR 7-68, 7-69, 7-70, and 7-71 show a laser pulse because GCR data 7-51 through 7-54 are each high, respectively, and similarly for pulse GCR 7-72 through 7-78. Under the depicted uniform scenario, pulse GCR pulse width 7-65 is uniform for pulse GCR 7-68, 7-69, 7-70, 7-71, 7-73, 7-76, and 7-77. For the preferred embodiment, this pulse width is 28 nanoseconds. Each laser pulse corresponding to pulse GCR waveform 7-65 creates recorded pits 7-80 on the optical medium 7-18. Recorded pit 7-82 corresponds to pulse GCR 7-68. Recorded pit 7-83 corresponds to pulse GCR 7-69. Similarly, recorded pits 7-84 through 7-88 correspond to pulse GCR 7-70, 7-71, 7-73, 7-76, and 7-77, respectively.

Because of thermal dissipation and spot size on the optical medium 7-18, the recorded pits 7-80 are wider in time than pulse GCR 7-65. Successive recorded pits 7-80 merge together to effectively create a larger recorded pit. Thus, the elongated recorded pit has a leading edge, corresponding to the first recorded pit, and a trailing edge, corresponding to the last recorded pit. For example, the pit created by recorded pits 7-82 through 7-85 has a leading edge from recorded pit 7-82 and a trailing edge from pit 7-85. Under the GCR 8/9 data format, a leading edge corresponds to GCR data 7-47 going high, and a trailing edge corresponds to GCR data 7-47 going low. Hence, for data pattern "10001" as shown by GCR data 7-51 through 7-55, a leading edge occurs for the first "1" (GCR data 7-47 going high) as shown by recorded pit 7-82; and, at the end of the GCR data 7-54, a trailing edge occurs as shown by recorded pit 7-85, because GCR data 7-55 is low.

A playback signal 7-90 will be low when recorded pits 7-80 shows no pits. At the leading edge of a pit, the playback signal 7-90 will rise and remain high until the trailing edge of the pit is reached. The signal will go low and remain low until the next pit. For example, the playback signal 7-91 is low because GCR data 7-50, which is low, did not create a pit. At the front edge of recorded pit 7-82, playback signal 7-90 has a leading edge as shown in playback signal 7-92. Playback signal 7-90 will then remain unchanged until a trailing edge occurs on a recorded pit. For example, because recorded pits 7-83 and 7-84 show no trailing edge, playback signals 7-93 and 7-94 remain high. The signal remains high during playback signal 7-95 because of recorded pit 7-85. However, because GCR data 7-55 is low, recorded pit 7-85 creates a trailing edge. Thus, playback signal 7-96 decays. The signal will decay to "O" until a recorded pit occurs, creating a leading edge. Thus, with the occurrence of recorded pit 7-86, which corresponds to GCR data 7-56 being high, playback signal 7-97 rises. Because there is no immediate successor to recorded pit 7-86 when GCR data 7-57 is low, playback signal 7-98 decays. Playback signal 7-99 remains low because there is no recorded pit when GCR data 7-58 is low. With GCR data 7-59 and 7-60 being high, recorded pits 7-87 and 7-88 overlap creating one larger pit. Thus, playback signal 7-100 rises and playback signal 7-101 remains high. Playback signal 7-102 falls at the trailing edge of recorded pit 7-88 when GCR data 7-61 is low.

Figure 86B:
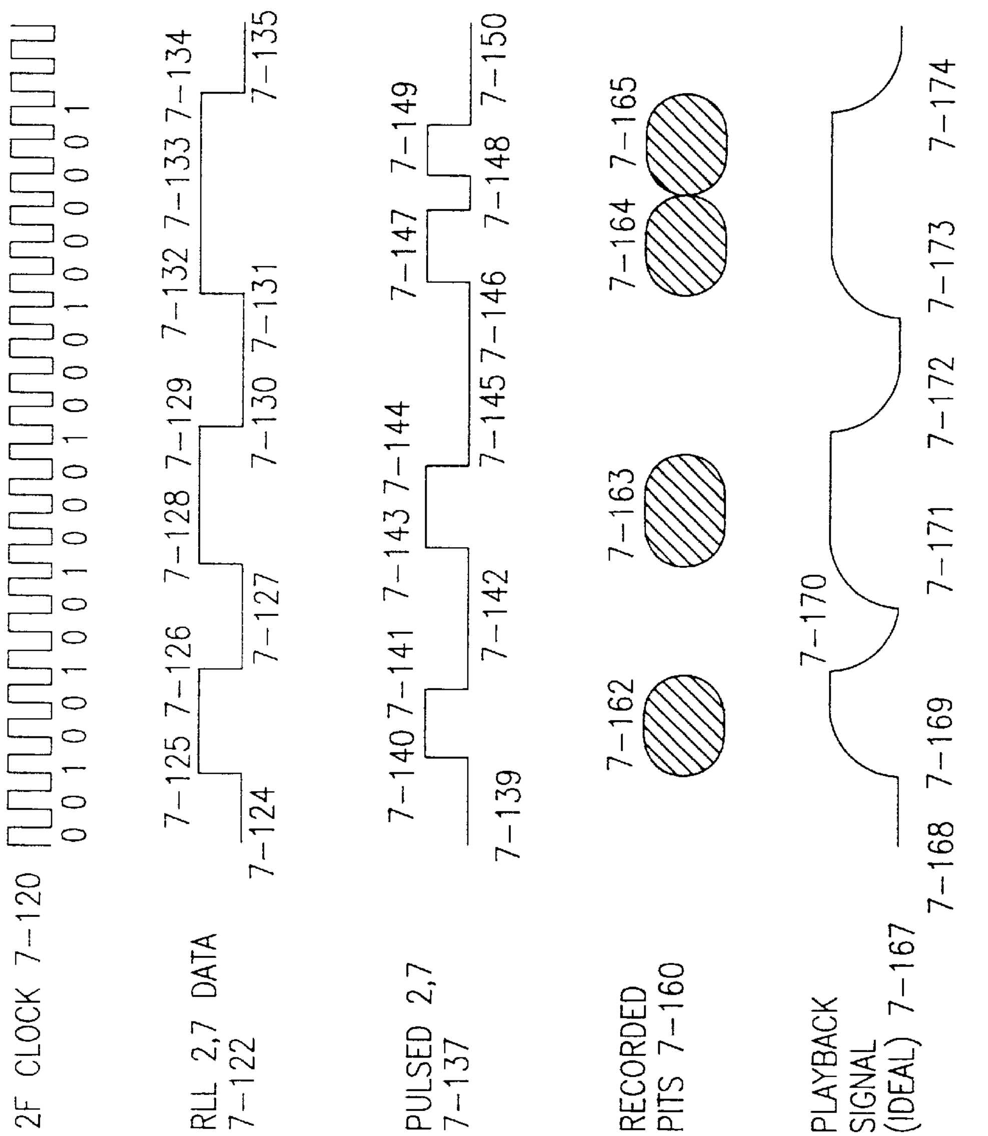

For RLL 2,7 a cell consists of two data bits, which corresponds to two clock periods 7-121 of 2F clock waveform 7-120, FIG. 86B. For a 256 Mbyte disc, an RLL 2,7 encoding format will require a 2F clock pulse width 7-121 of 35.4 nanoseconds or a clock frequency of 28.23 MHz. The calculation of this value is straightforward. In order to maintain the same disc density, the GCR 8/9 and RLL 2,7 encoding formats must contain the same amount of information in the same recording time. Because two code bits are required per data bit in the RLL 2,7 format, it requires a clock frequency of 2.(8/9) that of the GCR data format. The GCR data format records nine bits of code bits per eight bits of data. Thus, the GCR data bit clock is nine-eighths of the clock period 7-42. Thus, for a GCR clock period 7-42 of 63 nanoseconds, the RLL 2,7 pulse width 7-121 must be 35.4 nanoseconds in order to maintain the same disc density.

The RLL 2,7 data waveform 7-122 reflects two code bits per cell. For example, RLL 2,7 data 7-124 shows a data pattern "00" while RLL 2,7 data 7-125 shows a data pattern "10". In this data format, a "1" represents a transition in data. Thus, RLL 2,7 data 7-125 goes high when the "1" occurs in the data pattern. Similarly, RLL 2,7 data 7-126 goes low when the "1" occurs in the data pattern. While an "0" occurs, RLL 2,7 data 7-122 remains in the same state. Pulsed 2,7 waveform 7-137 reflects the pulsing of laser 7-16 corresponding to RLL 2,7 data 7-122. Thus, for RLL 2,7 data 7-125 and 7-126, during the period when that signal is high, pulsed 2,7 waveform 7-140 and 7-141 is high. Because of the thermal elongation of the pit, pulsed 2,7 waveform 7-141 goes low prior in time to RLL 2,7 data 7-126. For longer data patterns of "0", the pulsing must remain on. For example, during the data pattern "10001" as shown in RLL 2,7 data 7-128 and 7-129, pulsed 2,7 waveform 7-143 and 7-144 remains high longer than pulsed 2,7 waveform 7-140 and 7-141. For data patterns of successive "O", the pulsed 2,7 waveform 7-137 can be pulsed as separate pulses. For example, for the data pattern "1000001", RLL 2,7 data 7-132, 7-133, and 7-134 can be pulsed in two separate pulses as shown in pulse 2,7 7-147, 7-148, and 7-149.

As with the GCR 8/9 format, recorded pits 7-160 show thermal elongation. For example, recorded pit 7-162 is wider in time than the pulse from pulsed 2,7 waveform 7-140 and 7-141; a similar result may be seen for recorded pit 7-163. Again, playback signal 7-167, depicted by playback signal 7-168 through 7-174, goes high on leading edges of recorded pits 7-160, decays on trailing edges of recorded pits 7-160, and remains constant during the presence or absence of pits.

Figure 87:
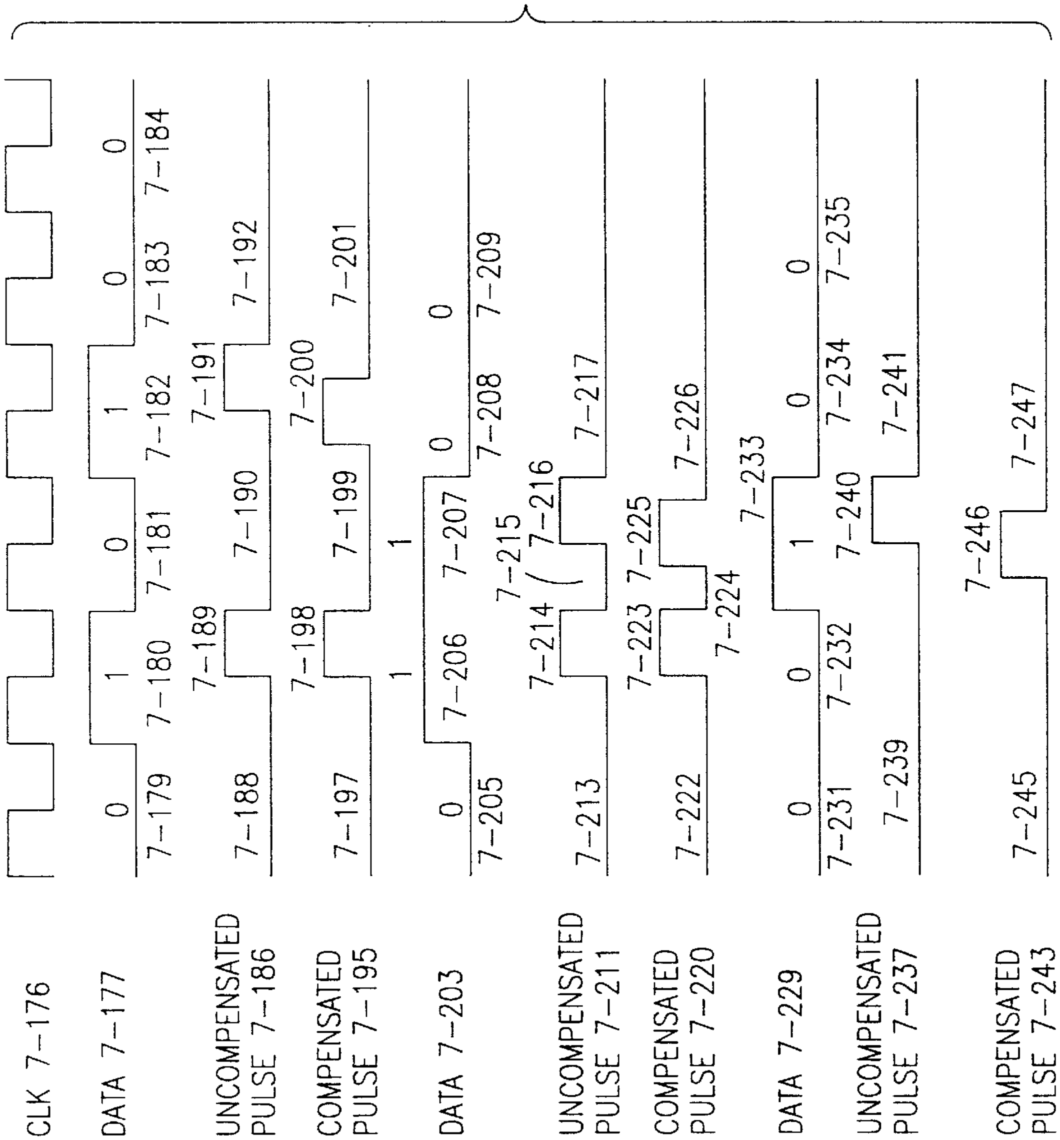
FIG. 87 is a series of waveforms showing laser pulsing for various data patterns adjusted by the write compensation circuit.

The pulsed GCR code can be improved by correcting predictable position shifts. FIG. 87 shows the timing diagram for the write compensation of the laser pulse generator 7-14. Experimental testing showed that recording early when the laser 7-16 is off for two bits or greater enhances performance. Clock waveform 7-176 is the code bit clock used for clocking data 7-177, 7-203, and 7-229, which show the worst case data patterns for enhancement. Other patterns can be corrected, but will suffer in signal amplitude. Data 7-180 through 7-184 correspond to the data sequence "10100". The uncompensated pulse waveforms 7-188 through 7-192 correspond to this data pattern without write compensation. Uncompensated pulse waveforms 7-189 and 7-191 occur in the second half of the clock period. After write compensation, the output of laser pulse generator 7-14 corresponds to compensated pulse waveform 7-195, where compensated pulse waveforms 7-197 and 7-198 remain unchanged, and a shortened off-period for compensated pulse waveform 7-199 provides an earlier compensated pulse waveform 7-200. During compensated pulse 7-201, laser 7-16 remains off for a longer duration than uncompensated pulse 7-192. Similarly, for data 7-206 through 7-209, corresponding to data pattern "1100", uncompensated pulse waveform 7-211 would be off for uncompensated pulse waveform 7-213 followed by two pulses, i.e., uncompensated pulse waveforms 7-214 and 7-216. Again, the write compensation circuit adjusts compensated pulse waveform 7-220 so that compensated pulse waveform 7-225 will occur closer in time to compensated pulse waveform 7-223 so that compensated pulse waveform 7-224 is shorter than uncompensated pulse waveform 7-215. Finally, data 7-231 through 7-235, corresponding to the data pattern "00100", have uncompensated pulse waveform 7-237 occurring at uncompensated pulse waveform 7-240. Write compensation would move compensated pulse waveform 7-243 earlier in time to compensated pulse waveform 7-246.

Figure 88:
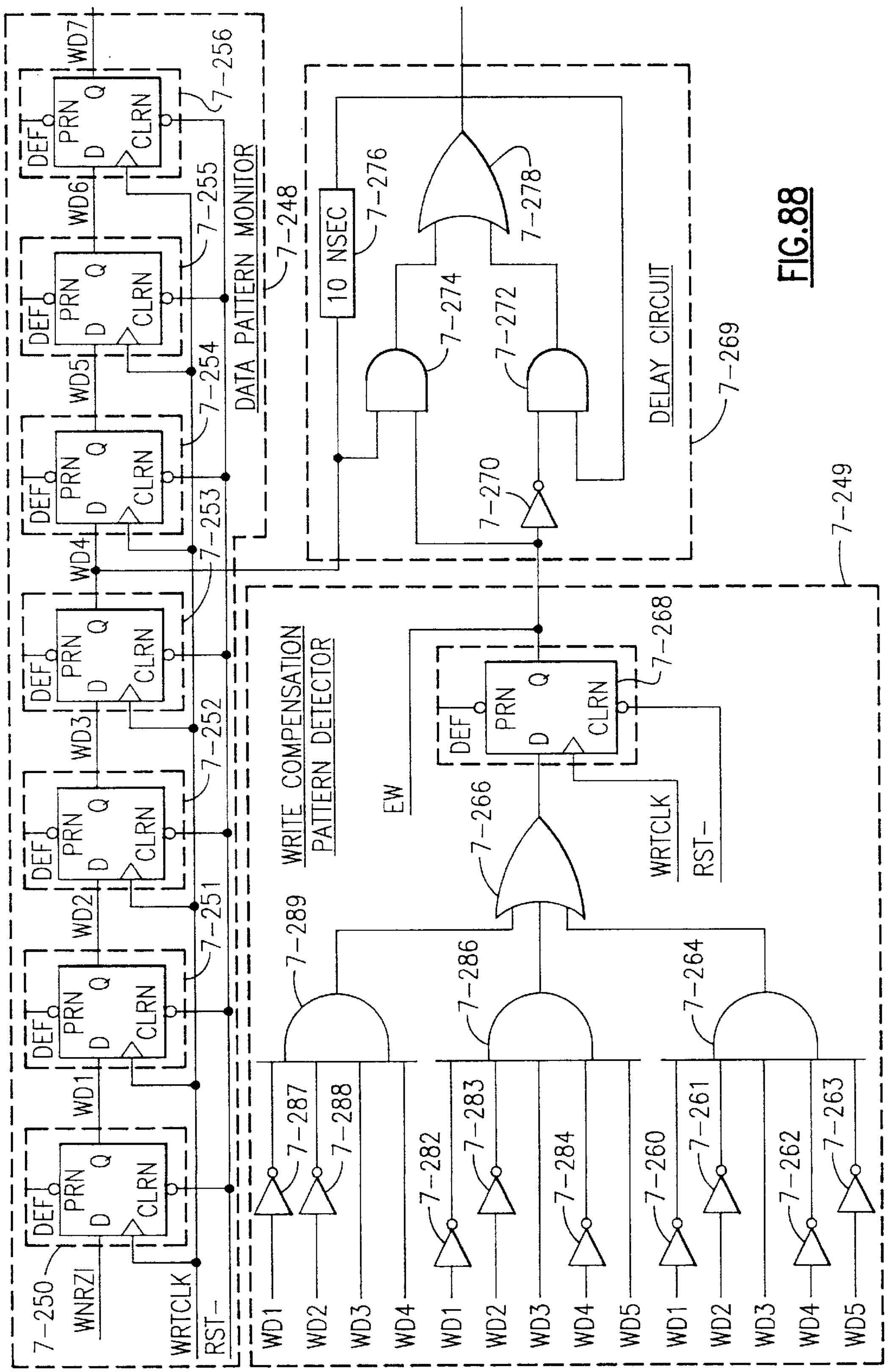
FIG. 88 is a schematic diagram showing the write compensation circuit.

FIG. 88 shows the schematic diagram of the write compensation circuit, which comprises data pattern monitor 7-248, write compensation pattern detector 7-249, and delay circuit 7-269. Data pattern monitor 7-248 is a serial shift register that sequentially clocks encoded data from the encoder 7-12. The last five clocked in data bits are sent to the write compensation pattern detector 7-249, where they are analyzed for determining whether to pulse the laser earlier than normal.

Data pattern monitor 7-248 consists of data sequence D flip-flops 7-250 through 7-256. Encoded data is input into the D port of the data sequence D flip-flop 7-250, whose Q output WD1 becomes the input of the D port of data sequence D flip-flop 7-251. This clocking continues through data sequence D flip-flops 7-252 through 7-256, whose Q output WD7 is the data sequence delayed by seven clock periods from when it was first input into data pattern monitor 7-248. The Q outputs WD1, WD2, WD3, WD4, and WD5 of data sequence D flip-flops 7-250 through 7-254, respectively, represent the last five of the last seven data bits inputted into a data pattern monitor 7-248. These five bits are sent to the write compensation pattern detector 7-249, where they are compared to predetermined data patterns; and, if they match, an enable write signal is sent to the delay circuit 7-269 to indicate that the laser pulse is to occur earlier than normal.

The first data pattern is detected by inverting the Q data WD1, WD2, WD4, and WD5 from data sequence D flip-flops 7-250, 7-251, 7-253, and 7-254, respectively, through data invertors 7-260, 7-261, 7-262, and 7-263, respectively. The outputs of these invertors are AND'ed with the output from data sequence D flip-flop 7-252 in detect AND gate 7-264. Thus, when a sequence "00100" occurs, the output of detect AND gate 7-264 goes high, indicating that a detect of the data pattern occurred. Similarly, the second data pattern is detected by inverting the Q outputs WD1, WD2, and WD4 from data sequence D flip-flops 7-250, 7-251, and 7-253, respectively, through data invertors 7-282, 7-283, and 7-284, respectively, and AND'ing these inverted outputs with the outputs WD3 and WD5 of data sequence D flip-flops 7-252 and 7-254 in detect AND gate 7-286. Thus, a data pattern of "10100" will trigger a high from detect AND gate 7-286, indicating a detect. The third data sequence is detected by inverting the Q outputs WD1 and WD2 from data sequence D flip-flops 7-250 and 7-251, respectively, through data invertors 7-287 and 7-288 and AND'ing these inverted outputs with the Q outputs WD3 and WD4 from data sequence D flip-flops 7-252 and 7-253, respectively, in data detect AND gate 7-289. Thus, the data pattern of "1100" will trigger a detect from detect AND gate 7-289, indicating the presence of the data. The data pattern detect outputs of detect AND gates 7-264, 7-286, and 7-289 are OR'ed in detected pattern OR gate 7-266, whose output goes high when one of the three data patterns is detected. The detected pattern output is clocked in enable write D flip-flop 7-268, whose Q output, the enable write signal, is then sent to the delay circuit 7-269.

The delay circuit 7-269 takes the clocked data output WD4 of the data sequence D flip-flop 7-253 and simultaneously inputs it into a delay circuit 7-276 and a not-delay-select AND gate 7-274. The delayed output of the delay circuit 7-276 is inputted into delay-select AND gate 7-272. The enable write signal from write compensation pattern detector 7-249 will enable either delay-select AND gate 7-272 or not-delay-select AND gate 7-274. When the enable write signal is low, which indicates that one of the three data patterns has not occurred, it is inverted by an enable write inverter 7-270. This allows the delayed data from delay circuit 7-276 to be clocked. On the other hand, if enable write is high, which indicates that one of the three data patterns has occurred, then the not-delay-select AND gate 7-274 allows the transmission of the data from data sequence D flip-flop 7-253, which is undelayed. The outputs from delay-select AND 7-272 and not-delay-select AND gate 7-274 are OR'ed in a data OR gate 7-278, where it is outputted from delay circuit 7-269. Although prior discussions about the write compensation circuit or timing indicated that for the three data patterns, the write pulse would occur 10 nanoseconds earlier, in actual implementation, data is delayed 10 nanoseconds for all data but the three data patterns. The delay of delay circuit 7-276 is set between 7 to 12 nanoseconds for the frequency of the preferred embodiment.

When recording lower frequency data patterns, the resultant magneto-optical signal has a slower rise time than fall time. This causes the final output from the waveform processor 7-22 to have degraded amplitude on positive peaks, which can be corrected by recording with higher effective power at the leading edge of the data pattern. For the preferred embodiment, the data pattern "000111" will trigger a wide-write signal during the second "1" of the data pattern, thereby pulsing the laser during its normal off period.

Figure 89:
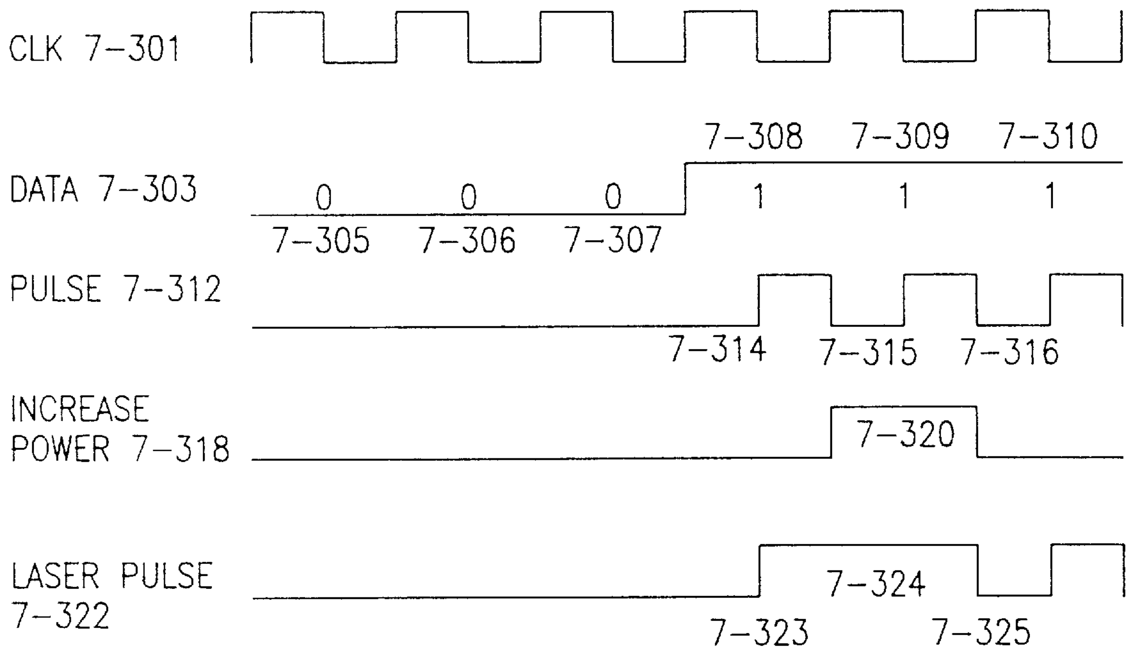
FIG. 89 is a series of waveforms showing laser pulsing for amplitude asymmetry correction.

In FIG. 89, clock waveform 7-301 clocks data waveform 7-303 through the laser pulse generator 7-14 for the data pattern "000111". As depicted by data 7-305 through 7-310, the laser pulse generator 7-14 generates a pulse waveform 7-312 with pulses 7-314, 7-315, and 7-316 when data waveform 7-303 is a "1". During the second "1" of this data pattern, the laser pulse generator 7-14 will turn on for an increase power waveform 7-318 and generate a pulse 7-320. An output laser pulse waveform 7-322 results from the OR of pulse 7-312 and the increase power waveform 7-318 that creates laser pulses 7-323, 7-324, and 7-325. Under normal operations, laser pulse 7-324 would be off during the first half of the clock period. Under this particular data pattern, however, keeping the laser on for the laser pulses 7-323 and 7-324, effectively increases the power fifty percent during this time period.

Figure 90:
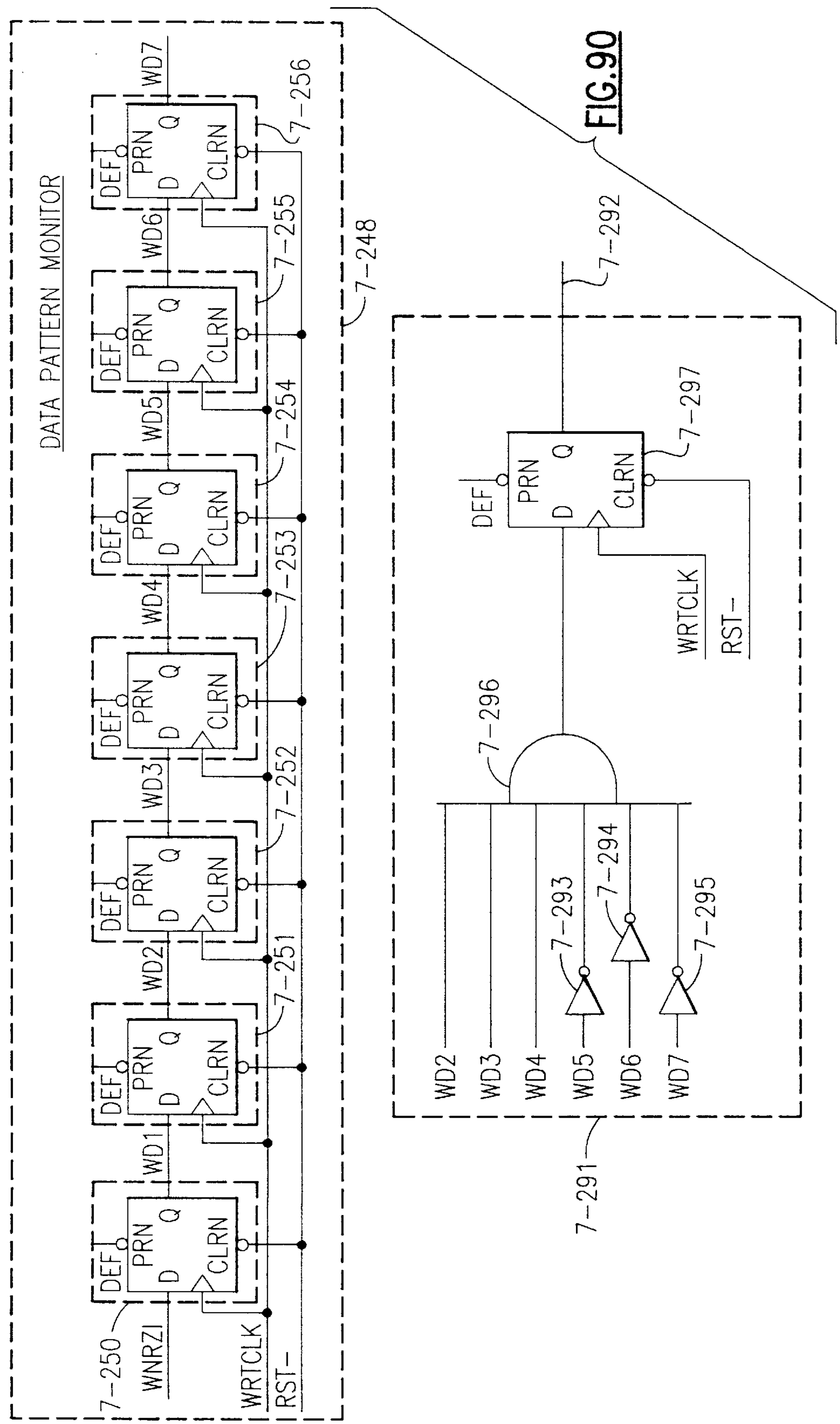
FIG. 90 is a schematic diagram showing the amplitude asymmetry correction circuit.

In FIG. 90, an amplitude asymmetry correction circuit 7-291 generates a write-wide pulse 7-292 (corresponds to increase power waveform 7-318 in FIG. 89), which will be OR'ed with the laser pulse output from the delay circuit 7-269 (corresponds to pulse waveform 7-312 in FIG. 89) in laser pulse OR gate resulting in the output laser pulse waveform 7-322. The data pattern monitor 7-248 operates as shown in FIG. 88. The Q outputs WD2, WD3, WD4, WD5, WD6, and WD7 of data sequence D flip-flops 7-251 through 7-256, respectively, are 5 inputted into the amplitude asymmetry correction circuit 7-291, where the outputs WD5, WD6, and WD7 of data sequence D flip-flops 7-254, 7-255, and 7-256, respectively, are inverted in data invertors 7-293, 7-294, and 7-295, respectively. The outputs of data invertors 7-293, 7-294, and 7-295 and data sequence D flip-flops 7-251, 7-252, and 7-253 are AND'ed in a detect AND gate 7-296. The output of detect AND gate 7-296 indicates a detected pattern form "000111", which will be clocked out of a write-wide D flip-flop 7-297 at the next clock 7-301.

Figure 91:
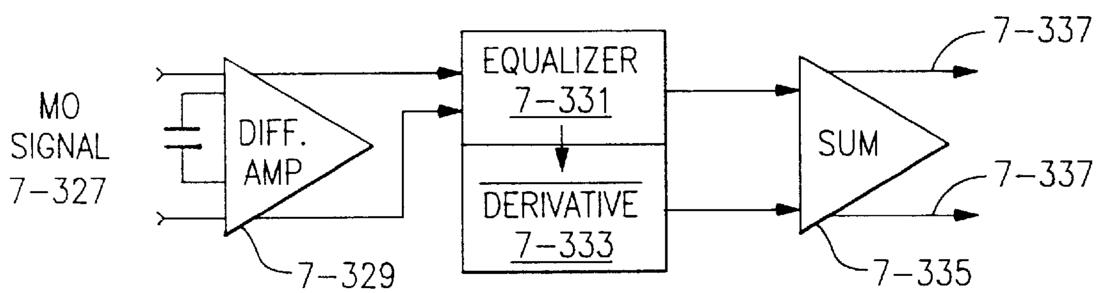
FIG. 91 is a block diagram showing the basic relationship of elements of the pulse slimming means.

The waveform output of the optical reader 7-20 will be degraded as a function of frequency and data pattern. Amplitude and timing can be enhanced by processing the signal through the waveform processor 7-22. The asymmetry of the rise and fall times of an isolated pulse can be improved by summing an equalized, differentiated signal with its derivative. In FIG. 91, a magneto-optical signal 7-327 is differentiated by a differential amplifier 7-329. The differentiated signal is inputted into an equalizer 7-331, where it is equalized by 5 dB in the preferred embodiment, and the amplitude is equalized as a function of frequency. The derivative of the equalized signal is taken by a derivative processor 7-333 and summed with the equalized signal in an adder 7-335. The output of the adder 7-335 is the read signal 7-337.

Figure 92:
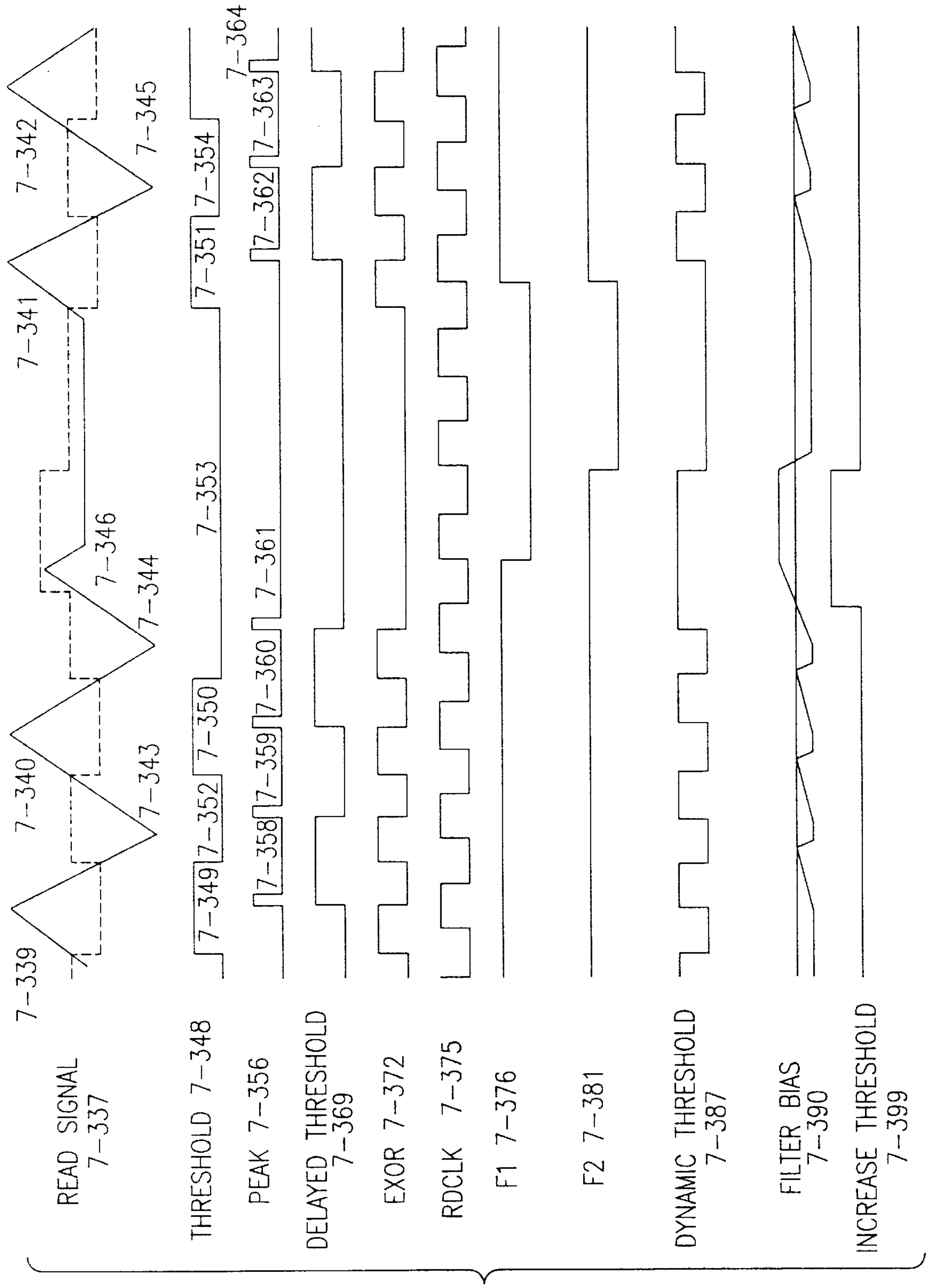
FIG. 92 is a series of waveforms showing threshold adjustments by the dynamic threshold circuit.
Figure 93:
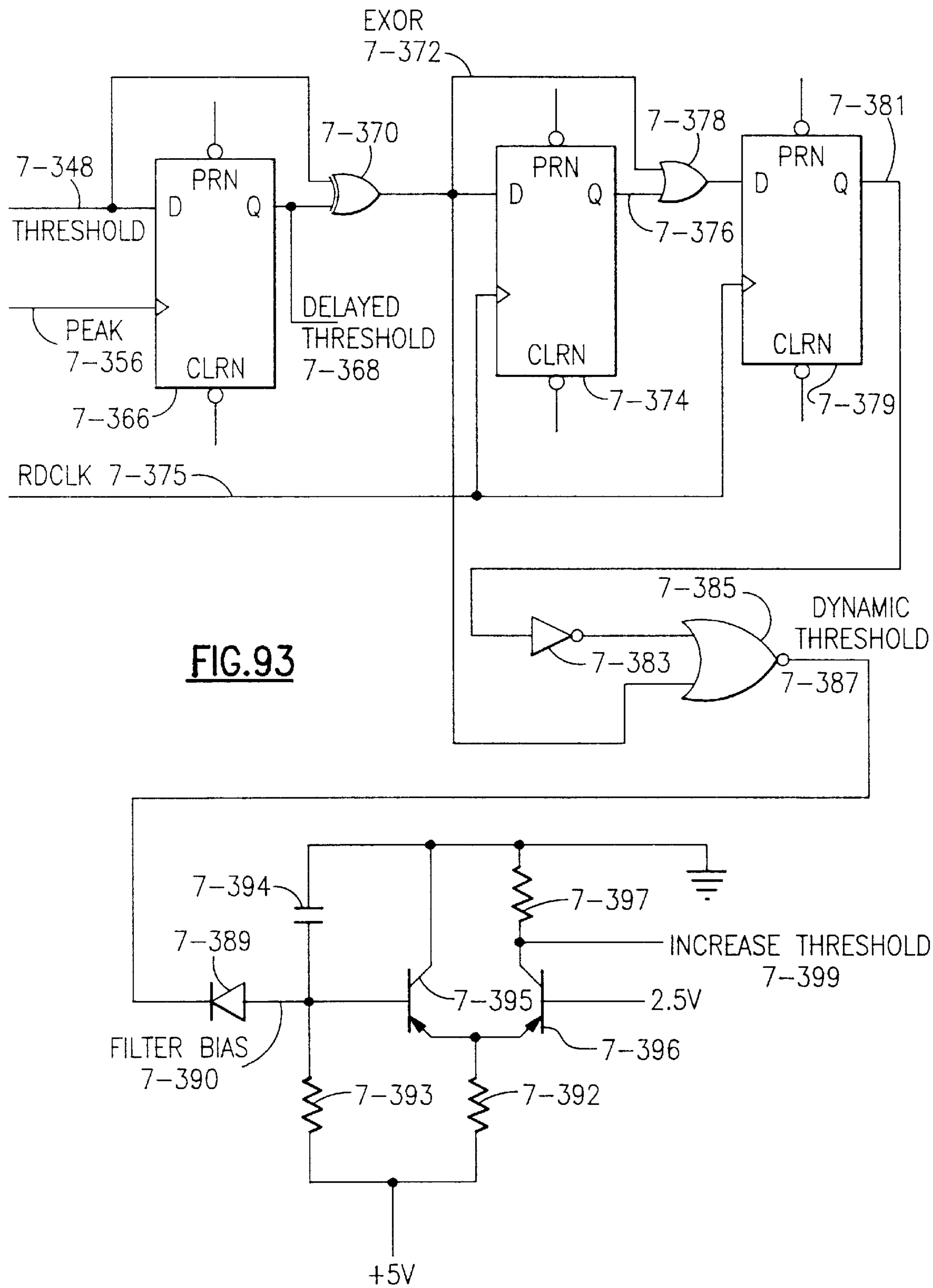
FIG. 93 is a schematic diagram for the dynamic threshold circuit.

FIG. 92 shows the timing diagram for the dynamic threshold circuit of FIG. 93. The read signal 7-337 will contain an overshoot produced by the pulse slimming. Because this overshoot is predictable, the threshold for the read circuitry can be increased during the overshoot to prevent false data reads during positive peaks 7-339, 7-340, 7-341, and 7-342, and during negative peaks 7-343, 7-344, and 7-345 of read signal 7-337. A threshold waveform 7-348 is switched high during positive peaks. Threshold waveforms 7-349, 7-350, and 7-351 are high during positive peaks 7-339, 7-340, and 7-341, respectively. Threshold waveforms 7-352, 7-353, and 7-354 are low during negative peaks 7-343, 7-344, and 7-345, respectively. Each peak, whether positive or negative, of the read signal 7-337 generates peak waveform 7-356, which is a short clocking pulse that occurs shortly after the read signal 7-337 peaks. Peaks 7-339, 7-343, 7-340, 7-344, 7-341, 7-345, and 7-342 of the read signal 7-337 generate peak waveforms 7-358 through 7-364, respectively.

As shown in FIG. 93, threshold waveform 7-348 is inputted into the D port of a threshold delay D flip-flop 7-366. The peak waveform 7-356 clocks threshold waveform 7-348 through the flip-flop 7-366. A delayed threshold waveform 7-368 is the Q output of threshold delay D flip-flop 7-366, which is exclusively OR'ed with threshold waveform 7-348 in a threshold-exclusive OR gate 7-370. An EXOR signal 7-372 is the output of threshold-exclusive OR gate 7-370. The EXOR signal 7-372 has twice the frequency of the original threshold waveform 7-348. The EXOR signal 7-372 is inputted into the D port of an EXOR D flip-flop 7-374, where it is clocked at a read clock 7-375. An F1 waveform 7-376 is the Q output of the EXOR D flip-flop 7-374. Read clock waveform 7-375 has a leading edge during high pulses of the EXOR signal 7-372, except when the EXOR signal 7-372 is low for more than one read clock waveform 7-375. Thus, the F1 waveform 7-376 is high except for the time between the first read clock 7-375 pulse after the EXOR signal 7-372 is low for more than one read clock 7-375 and the next EXOR signal 7-372 pulse.

The F1 waveform 7-376 is OR'ed with the EXOR signal 7-372 in an envelope OR gate 7-378. The output of envelope OR gate 7-378 is high except for the time from the first read clock 7-375 after the EXOR signal 7-372 has been low for more than one clock period until the signal 7-372 goes high again. The output of envelope OR gate 7-378 is clocked through the D input of an envelope D flip-flop 7-379, which is clocked by the read clock 7-375. The Q output of the envelope D flip-flop 7-379 is an F2 waveform 7-381. The F2 waveform 7-381 is high except from the second read clock 7-375 period after the EXOR signal 7-372 goes low until the next read clock 7-375 clocks a high for the EXOR signal 7-372. The F2 waveform 7-381 is inverted through an F2 inverter 7-383 and NOR'ed with the EXOR signal 7-372 in a dynamic threshold NOR gate 7-385 to produce a dynamic threshold waveform 7-387. The dynamic threshold waveform 7-387 is high any time the EXOR signal 7-372 is low, except when the F2 waveform 7-381 is low. Thus, the dynamic threshold waveform 7-387 has an on-time less than a half read clock 7-375 period except when the EXOR signal 7-372 is low on the next read clock 7-375 period. For this exception, the dynamic threshold waveform 7-387 stays high from the end of the EXOR signal 7-372 until the second read clock 7-375 pulse.

The dynamic threshold waveform 7-387 is used to forward or reverse bias a biasing diode 7-389. When dynamic threshold 7-387 is high, the biasing diode 7-389 is reverse biased. Conversely, when the dynamic threshold waveform 7-387 is low, the biasing diode 7-389 is forward biased.

When the dynamic threshold waveform 7-387 forward biases the biasing diode 7-389 (i.e., is low), the potential of a filter bias signal 7-390 is higher by the junction voltage of the biasing diode 7-389. This potential is 0.6 volts for standard devices. The 5-volt supply voltage drops across a limiting resistor 7-393 to the potential of the filter bias signal 7-390, because the voltage across a charging capacitor 7-394 is the difference between the filter bias signal 7-390 and ground. The charging capacitor 7-394 charges up to this potential, which is also the base voltage of a transistor 7-395. This turns on the transistor 7-395, causing the voltage on the emitter of transistor 7-395 to be 1.4 volts. Because the emitters of the transistors 7-395 and 7-396 are connected, the emitter voltage of the transistor 7-396 is less than the 2.5-volt base voltage of the transistor 7-396. Accordingly, the transistor 7-396 is off so that the collector voltage across a collector resistor 7-397 produces an increase threshold waveform 7-399 which is 0 volts (ground). The increase threshold waveform 7-399 is the signal that increases the threshold of the read signal 7-377 detector during periods of overshoot.

When the dynamic threshold waveform 7-387 is high, the biasing diode 7-389 is reversed biased, thereby no longer taking the base of the transistor 7-395 to 6 volts. When the dynamic threshold waveform 7-387 goes high, the charging capacitor 7-394 starts charging, creating a potential at the base of the transistor 7-395 that will rise exponentially up to the supply voltage, 5 volts. As the filter bias signal 7-390 rises in voltage, the voltage at the emitter of the transistor 7-395 increases, which equally increases the emitter voltage of the transistor 7-396. When this emitter voltage exceeds the base voltage by the junction potential across the emitter-to-base junction of the transistor 7-396, the transistor 7-396 is turned on. Turning on the transistor 7-396 causes the increase threshold waveform 7-399 to go high.

Under normal operations, the dynamic threshold waveform 7-387 is pulsed as described above. During normal read signals, the dynamic threshold 7-387 is on for a period equivalent to the on-period of read clock 7-375. The charge time for the voltage across the charging capacitor 7-394 to exceed the base voltage of 2.5 volts is longer than this half clock period of time. Thus, under normal circumstances, the increase threshold waveform 7-399 remains low. During periods of overshoot, however, the dynamic threshold waveform 7-399 is on for a longer period of time, thereby allowing the charging capacitor 7-394 to charge to a voltage that exceeds 2.5 volts, thereby triggering the increase threshold waveform 7-399 to go high.

Figure 94:
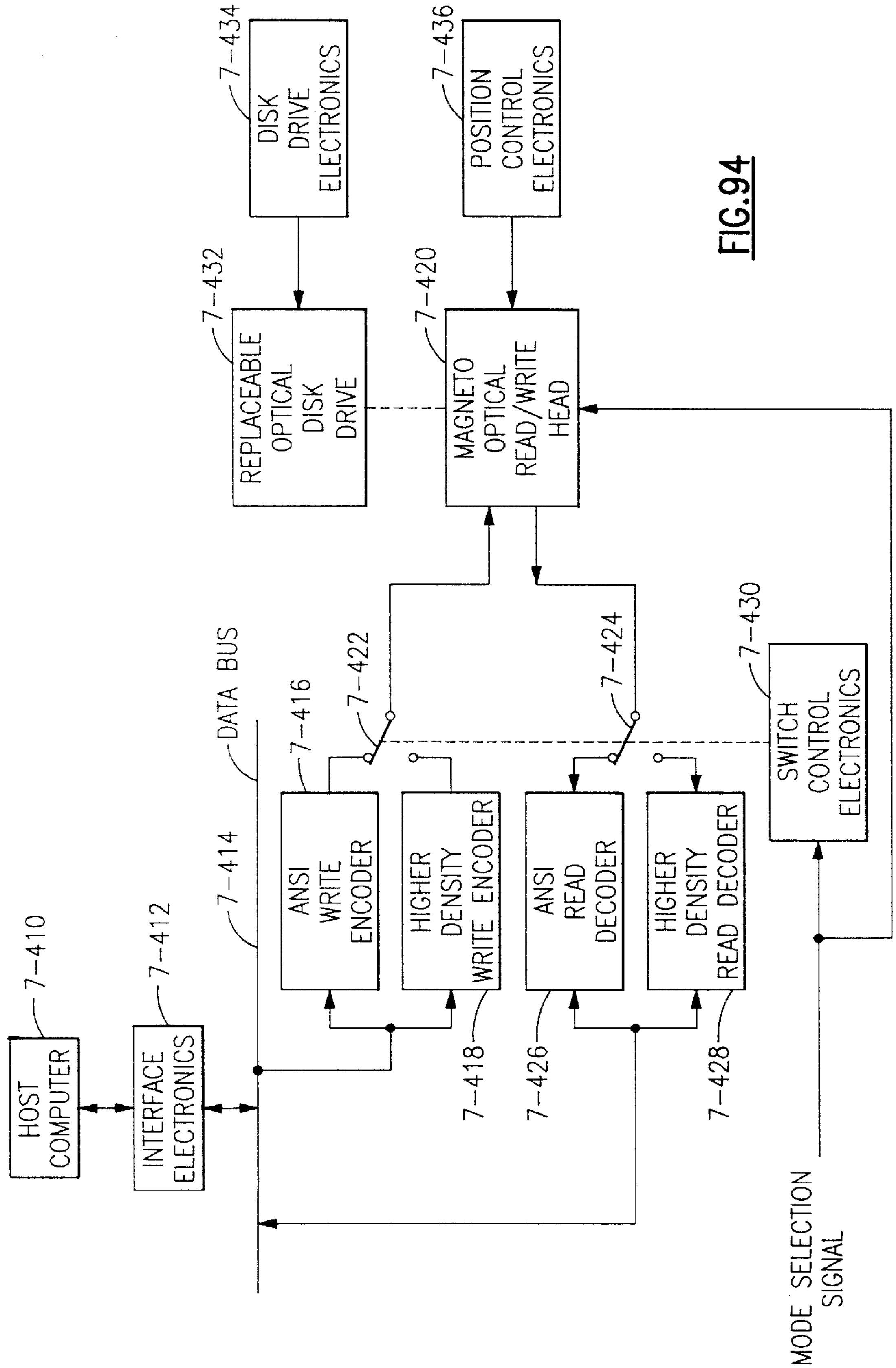
FIG. 94 is a schematic block diagram of an optical data storage and retrieval system incorporating downward compatibility.

In FIG. 94, a host computer 7-410, which serves as a source and utilizer of digital data, is coupled by interface electronics 7-412 to a data bus 7-414. As host computer 7-410 processes data, and it needs to access external memory from time to time, a connection is established through interface electronics 7-412 to data bus 7-414. Data bus 7-414 is coupled to the input of a write encoder 7-416 and the input of a write encoder 7-418. Preferably, write encoder 7-416 encodes data from bus 7-414 in a low-density (i.e., ANSI) format; and write encoder 7-418 encodes data from data bus 7-414 in a higher density format. The Draft Proposal for 90MM Rewritable Optical Disc Cartridges for Information Interchange, dated Jan. 1, 1991, which describes the ANSI format, is incorporated herein by reference. The outputs of write encoders 7-416 and 7-418 are coupled alternatively through a switch 7-422 to the write input of a magneto-optical read/write head 7-420. The read output of head 7-420 is coupled alternatively through a switch 7-424 to the inputs of a read decoder 7-426 and a read decoder 7-428. The read decoder 7-426 decodes data in the same format, i.e., ANSI, as write encoder 7-416; and read decoder 7-428 decodes data in the same format as write encoder 7-418. Preferably, the encoding and decoding technique disclosed above is employed to implement write encoder 7-418 and read decoder 7-428. The outputs of decoders 7-426 and 7-428 are connected to the data bus 7-414.

Responsive to a mode-selection signal, switch-control electronics 7-430 set the states of switches 7-422 and 7-424 into either a first mode or a second mode. In the first mode, the write encoder 7-418 and the read decoder 7-428 are connected between the data bus 7-414 and the read/write head 7-420. In the second mode, the write encoder 7-416 and the read decoder 7-426 are connected between data bus the 7-414 and the read/write head 7-420. The read/write head 7-420 reads encoded data from and writes encoded data to a 90 millimeter optical disc received by a replaceable optical disc drive 7-432, which is controlled by disk-drive electronics 7-434. The read/write head 7-420 is transported radially across the surface of the disc received by disc drive 7-432 by position-control electronics 7-436.

When a 90 millimeter disc in a high-density format is received by the disc drive 7-432, a mode-selection signal sets the system in the first mode. As a result, data from the host computer 7-410, to be stored on the disc, is organized by the interface electronics 7-412 and encoded by the write encoder 7-418. Data read from the disc is decoded by the read decoder 7-428, reorganized by the interface electronics 7-412, and transmitted to the host computer 7-410 for processing.

When a 90 millimeter disc in the low-density, ANSI format is received by the disc drive 7-432, a mode-selection signal sets the system in the second mode. As a result, data from host the computer 7-410, to be stored on the disc, is organized by interface electronics 7-412 and encoded by write encoder 7-416. Data read from the disc is decoded by the read decoder 7-426, reorganized by the interface electronics 7-412, and transmitted to the host computer 7-410 for processing.

Preferably, irrespective of the format used to store data, the mode-selection signal is stored on each and every disc in one format, e.g., the low-density, ANSI format, and the system defaults to the corresponding mode, e.g., the second mode. The mode-selection signal could be recorded in the control track zone in ANSI format. When a disc is installed in the disc drive 7-432, the disk-drive electronics 7-434 initially controls position-control electronics 7-436 to read the area of the disc on which the mode-selection signal is stored. The read decoder 7-426 reproduces the mode-selection signal, which is applied to switch-control electronics 7-430. If the installed disc has the low-density, ANSI format, then the system remains in the second mode when the mode-selection signal is read. If the installed disc has the high-density format, then the system switches to the first mode when the mode-selection signal is read.

In certain cases, it may be desirable to modify the laser for the first and second modes. For example, different laser frequencies could be used or different laser-focusing lens systems could be used for the different modes. In such case, the mode-selection signal is also coupled to the read/write head 7-420 to control the conversion between frequencies or optical-lens focusing systems, as the case may be.

It is preferable to organize the data stored in both formats to have the same number of bytes per sector, i.e., in the case of ANSI, 512 bytes. In such case, the same interface electronics 7-412 can be used to organize the data stored on and retrieved from the disks in both formats.

In accordance with the invention, the same read/write head 7-420, position-control electronics 7-436, optical disc drive 7-432, disk-drive electronics 7-434, interface electronics 7-412, and data bus 7-414 can be employed to store data on and retrieve data from optical disks in different formats. As a result, downward compatibility from higher-density formats that are being developed as the state of the art advances, to the industry standard ANSI format can be realized using the same equipment.

Figure 95:
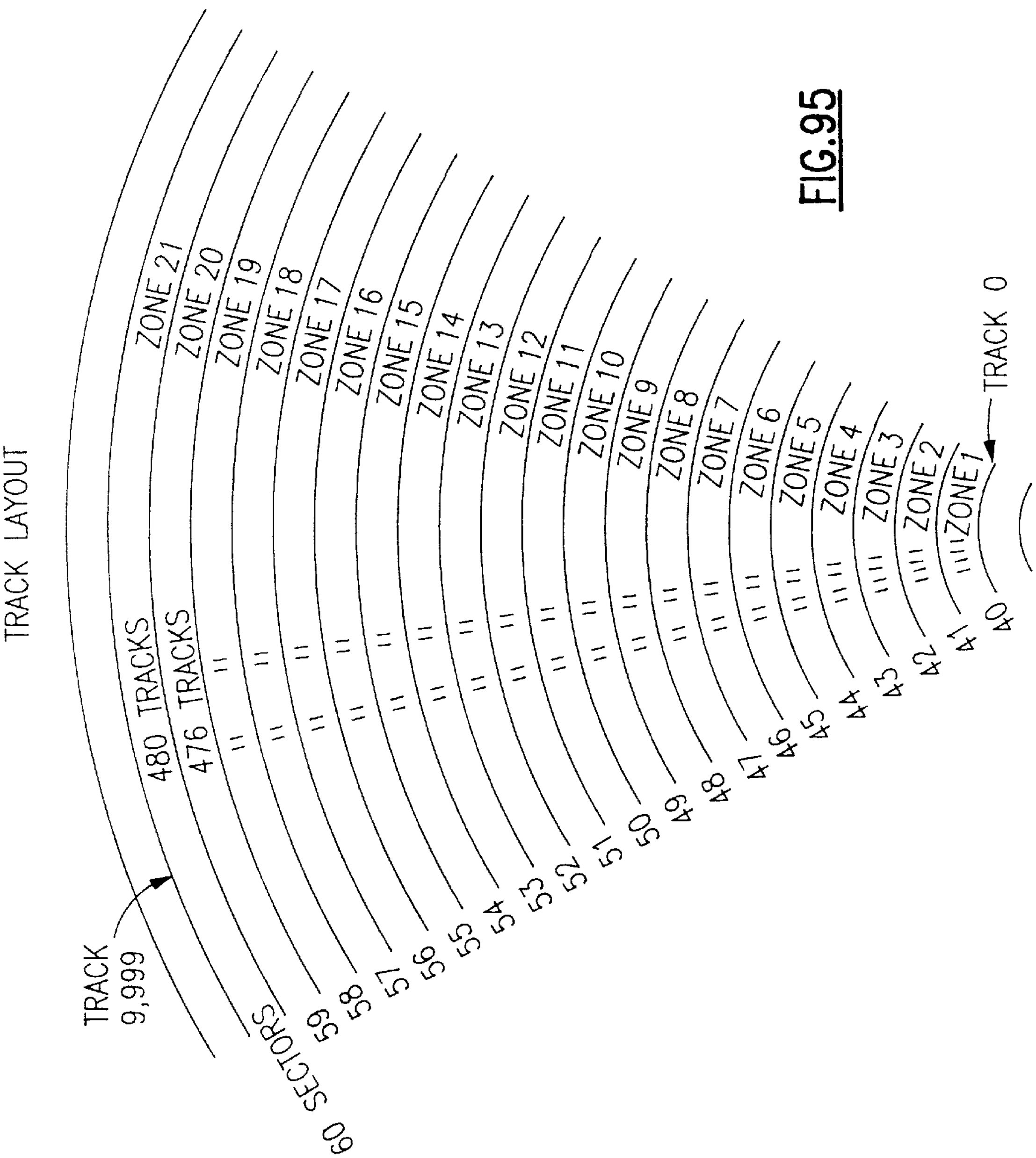
FIG. 95 is a diagram of the track layout of the high-density optical disks.
Figure 96:
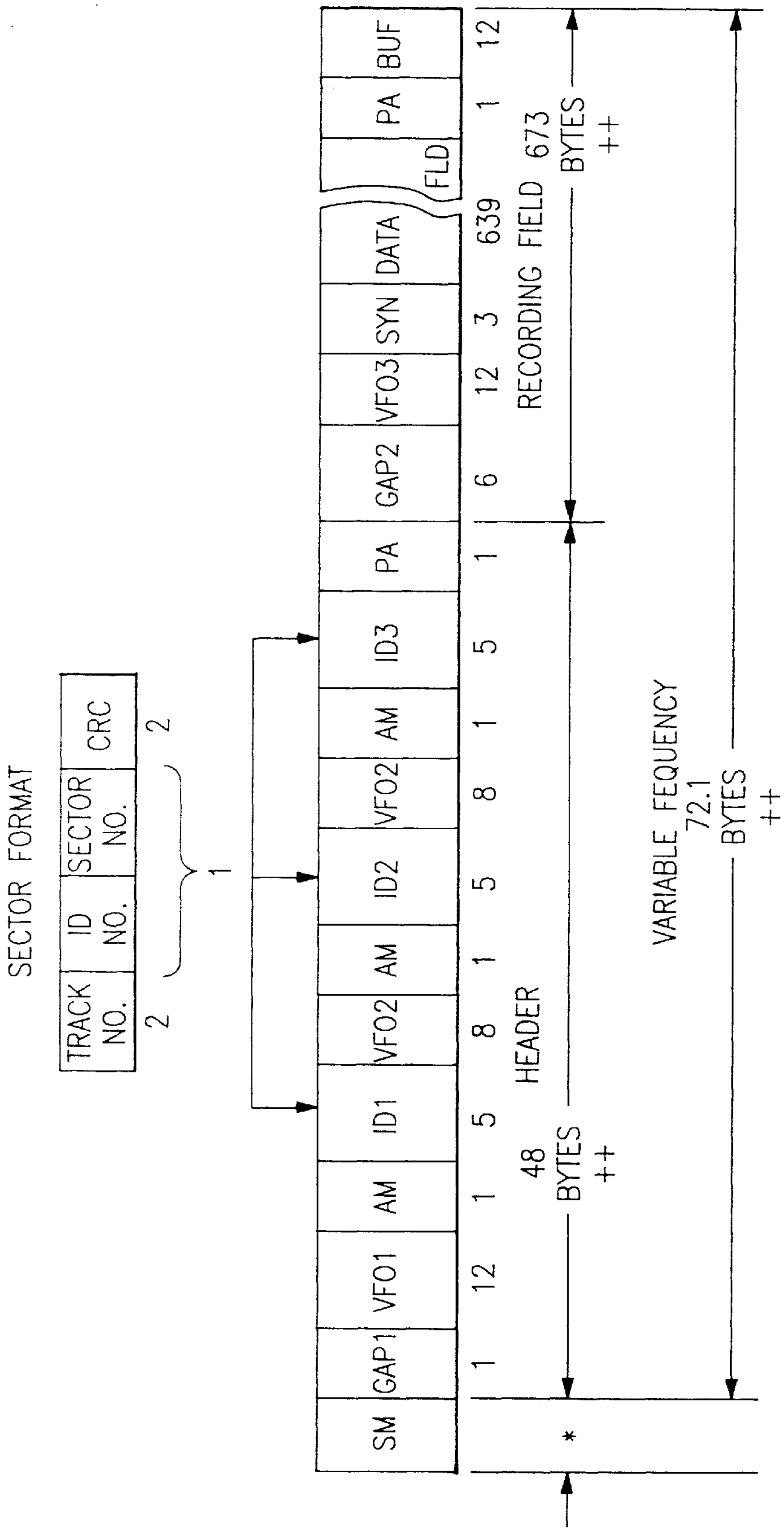
FIG. 96 is a diagram of the sector format of the high-density optical disks.

With reference now to FIGS. 95, 96, and 98, the preferred format of the high-density optical disc will now be described. There are ten thousand tracks, namely tracks 0 to 9999, arranged in 21 zones. Each track is divided into a plurality of sectors. There are a different number of sectors in each zone, increasing in number moving outwardly on the disc. The frequency of the data recorded in each zone is also different, increasing in frequency moving outwardly on the disc. (See FIGS. 95 and 98 for a description of the number of tracks in each zone, the number of sectors in each zone, and the recording frequency in each zone.) In contrast to the low-density disks, the format markings are erasably recorded on the disc using the same recording technique as is used for the data, preferably magneto-optical (MO). These format markings comprise sector fields, header fields for each sector, and control tracks. In contrast to the header fields and the data, the sector fields for all the zones are recorded at the same frequency. A description of the preferred embodiment of the sector format follows.

Sector Layout

A sector comprises a sector mark, a header, and a recording field in which 512 user data bytes can be recorded. The recording field can be empty or user-written. The total length of a sector is 721 bytes (one byte is equivalent to nine channel bits) of header and recording fields at a frequency that varies from zone to zone, plus 80 channel bits of sector mark at a fixed frequency, i.e., the same frequency for each zone. Tolerances are taken up by the buffer, i.e., the last field of the sector. The length of the header field is 48 bytes. The length of the recording field is 673 bytes.

Sector Mark (SM)

The sector mark consists of a pattern that does not occur in data, and is intended to enable the drive to identify the start of the sector without recourse to a phase-locked loop. The sector marks are recorded with a fixed frequency of 11.6 MHz for all zones. The length of the sector mark is 80 channel bits. The following diagram shows the pattern in the NRZI format.

1111 1111 1100 0000
1111 1100 0000 0000
0000 1111 1100 0000
1111 1100 0000 1111
1111 1100 1001 0010

VFO Fields

There are four fields designated either, VFO1, one of two VFO2, or VFO3 to give the voltage-controlled oscillator of the phase locked loop of the read channel a signal on which to phase lock. The information in VFO fields, VFO1 and VFO3 is identical in pattern and has the same length of 108 bits. The two fields designated VFO2 each have a length of 72 bits.

Address Mark (AM)

The address mark consists of a pattern that does not occur in data. The field is intended to give the disc drive the drive-byte synchronization for the following ID field. It has a length of 9 bits with the following pattern:

110000101

ID Fields

The three ID fields each contain the address of the sector, i.e., the track number and the sector number of the sector, and CRC (Cyclic Redundancy Check) bytes. Each field consists of five bytes with the following contents:

1st byte - Track MSByte
2nd byte - Track LSByte
3rd byte
  bit - 7 and 6
  00 - ID Field 0
  01 - ID Field 1
  10 - ID Field 2
  11 - not allowed
bit 5-zero.
bit 4 through bit 0 - binary sector number
4th and 5th bytes - CRC field The CRC bytes contain CRC information computed over the first three bytes according to equations 1, 2, and 3 illustrated in the table of FIG. 99. With reference thereto, it is understood that the 16 check bits of the CRC of the ID field shall be computed over the first three bytes of this field. The generator polynomial is equation (1) of FIG. 99. The residual polynomial is defined by equation (2) wherein $b_i$ denotes a bit of the first three bytes and $\overline{b}_i$ an inverted bit. $Bit_{23}$ is the highest order bit of the first byte. The contents of the 16 check bits $C_k$ of the CRC are defined by equation (3) of FIG. 99, wherein $c_{15}$ is recorded in the highest order bit of the fourth byte in the ID field.

Postambles (PA)

The postamble fields are equal in length, both having 9 bits. There is a postamble following ID3 and a postamble following the data field. A postamble allows closure of the last byte of the preceding CRC or data field. The postambles (PA) have 9 bits of the following pattern:

10 00100 01

Gaps

GAP 1 is a field with a nominal length of 9 channel bits, and GAP 2 is of 54 channel bits. GAP 1 shall be zeroes and GAP 2 not specified. GAP 2 is the first field of the recording field, and gives the disc drive some time for processing after it has finished reading the header and before it has to write or read the VFO3 field.

Sync

The sync field allows the drive to obtain byte synchronization for the following data field. It has a length of 27 bits and is recorded with the bit pattern:

101000111 110110001 111000111

Data Field

The data field is used to record user data. It has a length of 639 bytes (one byte=9 channel bits) and comprises:

512 bytes of user data;

4 bytes the contents of which are not specified by this standard and shall be ignored in interchange;

4 bytes of CRC parity;

80 bytes of ECC parity; and 39 bytes for resynchronization.

User Data Bytes

The user data bytes are at the disposal of the user for recording information.

CRC and ECC Bytes

The Cyclic Redundancy Check (CRC) bytes and Error Correction Code (ECC) bytes are used by the error detection and correction system to rectify erroneous data. The ECC is a Reed-Solomon code of degree 16.

Resync Bytes

The resync bytes enable a drive to regain byte synchronization after a large defect in the data field. Each has a length of 9 bits with the following pattern:

100010001

Their content and location in the data field is as follows. The resync field is inserted between bytes A15n and A15n+1, where $1 \leqq n \leqq 39$.

Buffer Field

The buffer field has a length of 108 channel bits.

Figure 100A:
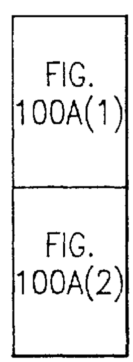
FIG. 100A is the first half of a table (Hex 00 to 7F) showing how the 8-bit bytes in the three address fields and in the data field, except for the resync bytes, are converted to channel bits on the disc.
Figure 100B:
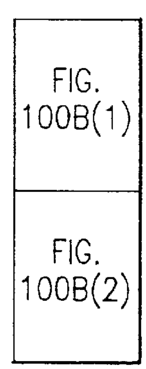
FIG. 100B is the second half of a table (Hex 80 to FF) showing how the 8-bit bytes in the three address fields and in the data field, except for the resync bytes, are converted to channel bits on the disc.
Figure 101A:
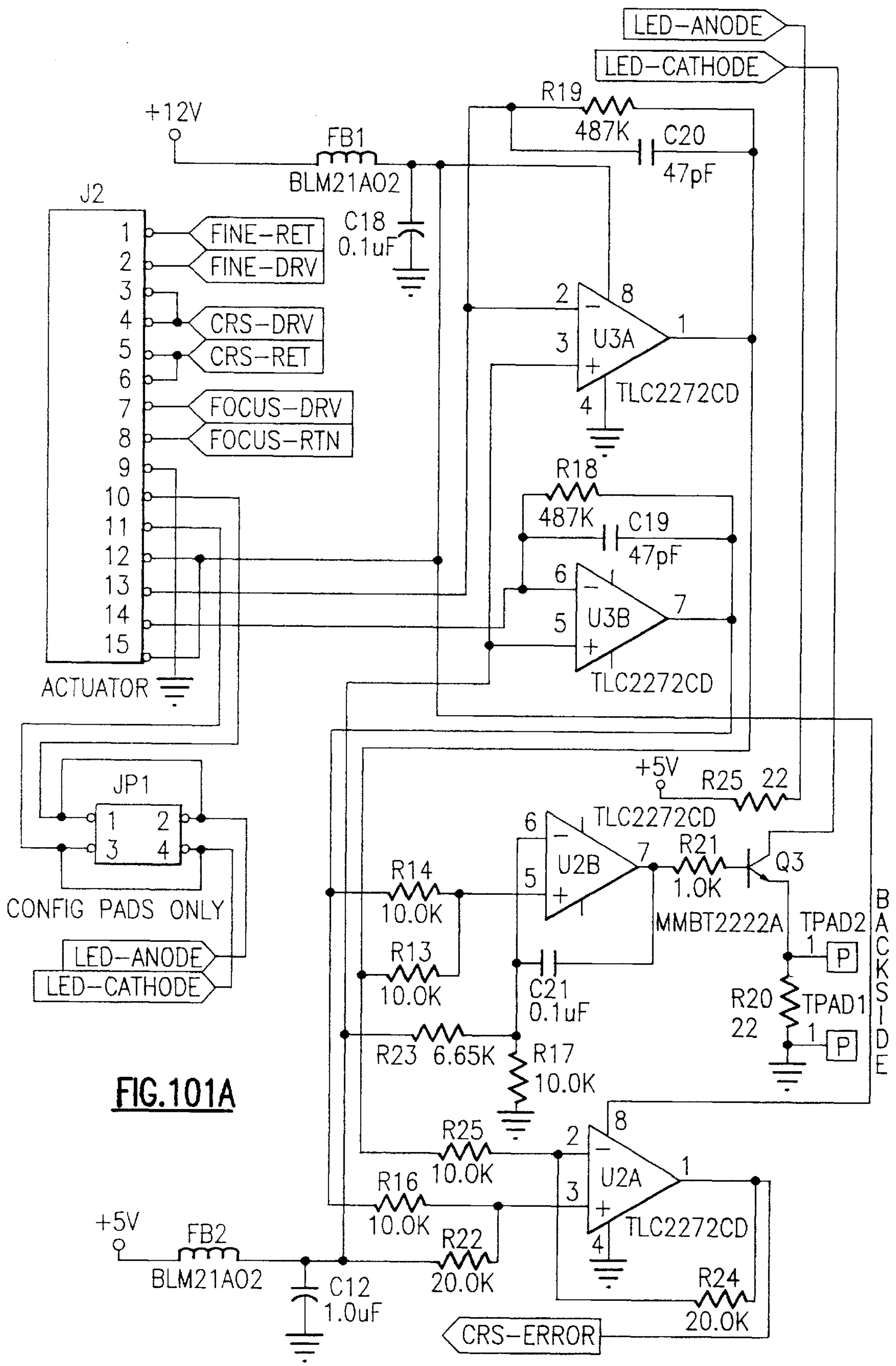
FIGS. 101A–119C are schematic diagrams of the electronic circuitry in a preferred embodiment of the invention.
Figures 101B, 101C, 101D, 101E:
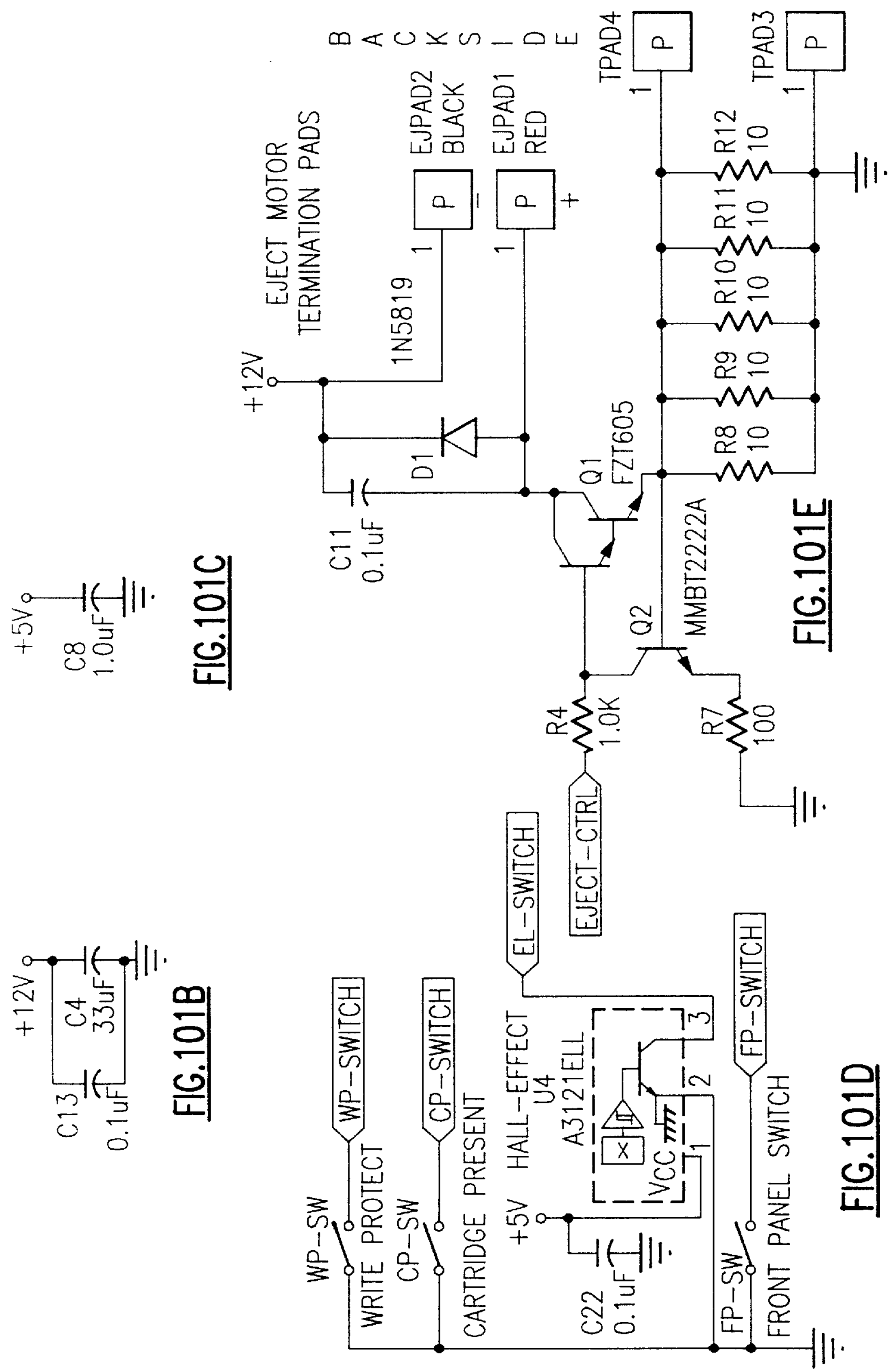
Figure 101F:
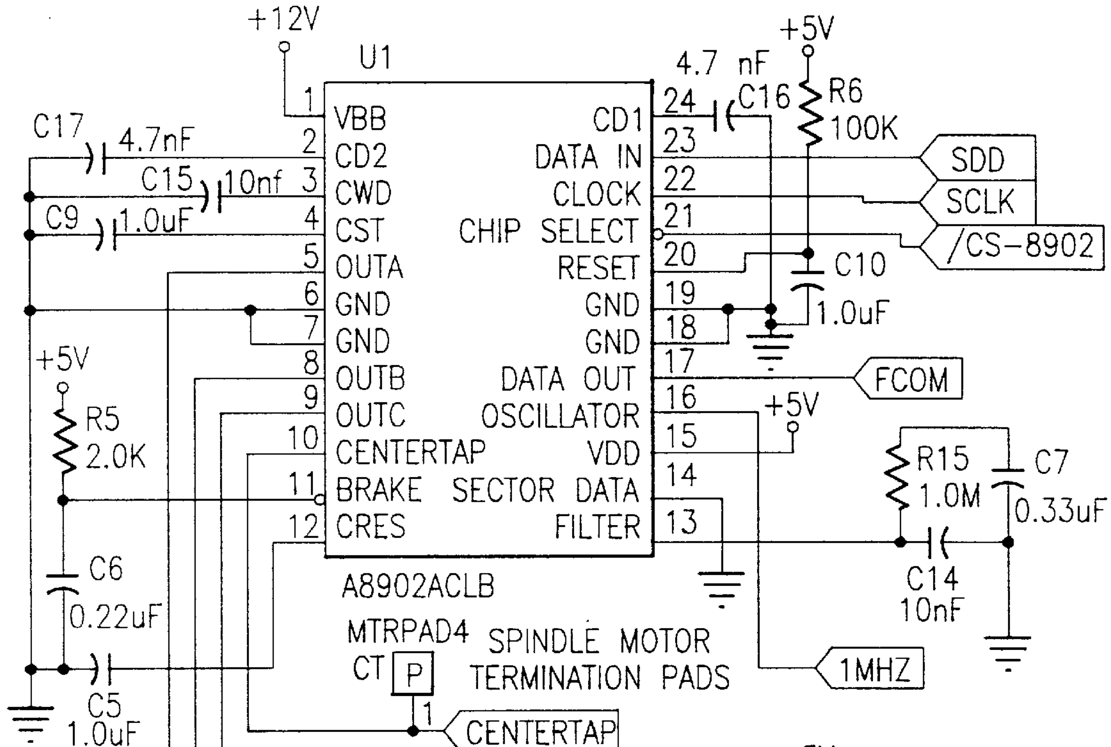
Figure 101F:
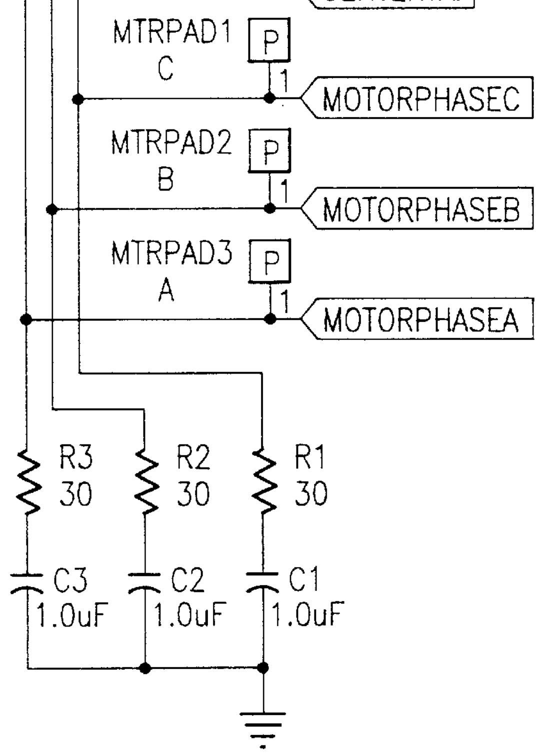
Figure 101G:
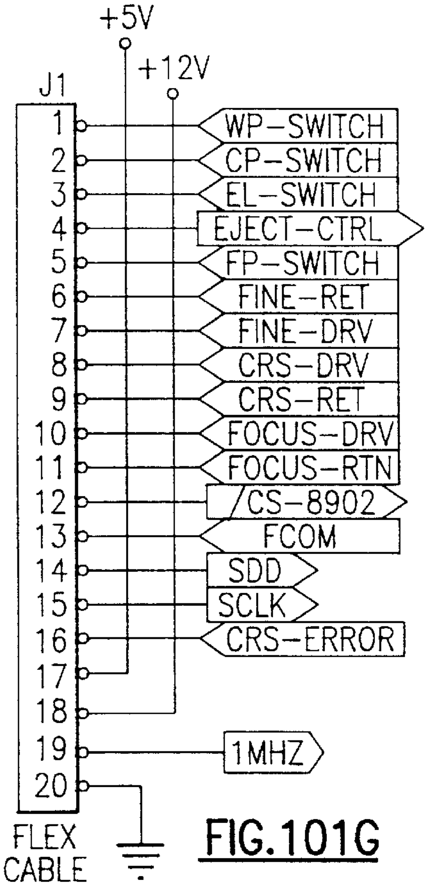

The 8-bit bytes in the three address fields and in the data field, except for the resync bytes, are converted to channel bits on the disc according to FIGS. 100A and 100B. All other fields in a sector are as defined above in terms of channel bits. The recording code used to record all data in the information regions on the disc is Group-Code (GCR 8/9).

Figure 97:
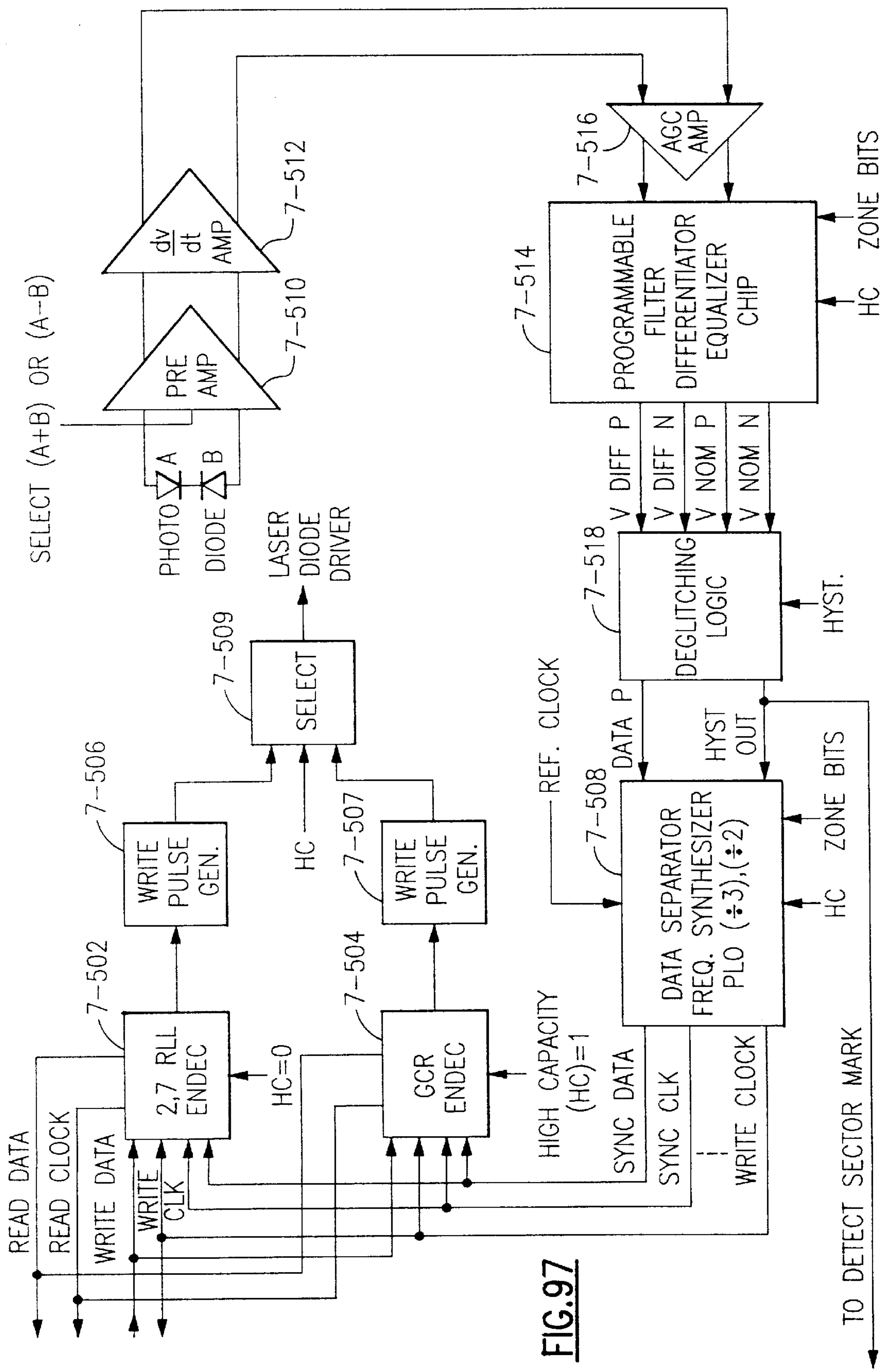
FIG. 97 is a block diagram in more detail showing the read/write circuitry of FIG. 94.

In FIG. 97, the write data is decoded by a RLL 2,7 encoder/decoder (ENDEC) 7-502 for the low-capacity, 128 Mbyte (low-density) mode. A GCR encoder/decoder (ENDEC) 7-504 is used in the high-capacity, 256 Mbyte (high-density) mode. A write pulse generator 7-506 produces a pulse width of 86 nsec with write power level varying from 7.0 mW to 8.5 mW from the inner to the outer zones for the low-capacity mode. For the high-capacity mode, a write pulse generator 7-507 decreases the pulse width to 28 nsec, but the write power is increased to a level that varies from 9.0 mW to 10.0 mW from the inner to the outer zones. A select circuit 7-509 alternatively couples the pulse generator 7-506 or 7-507 to the laser diode driver of the magneto-optical read/write head depending upon the state of an applied control bit HC. Control bit HC equals zero in the low-capacity mode and equals one in the high-capacity mode. The appropriate output is selected to drive the laser diode driver. The write clock is generated by the frequency synthesizer in a data separator 7-508. The frequency is set to 11.6 MHz for the low-capacity mode and 10.59 MHz to 15.95 MHz from inner to outer zones for the high-capacity mode.

During the playback, a preamplifier 7-510, which is fed by photodiodes in the magneto-optical read/write head, can be selected for the sum mode (A+B) or the difference mode (A−B). For the sum mode, the preamplifier 7-510 reads the reflectance change due to the preformatted pits. These pits are stamped in the RLL 2,7 code and identify the sector mark, VFO fields, and track sector data. There are 512 user bytes of data recorded in each preformatted sector. There are 10,000 tracks, segmented into 25 sectors, which totals 128 Mbytes of data for the low-capacity mode. In the high-capacity mode, the disc is formatted with GCR code. There are 40 sectors at the inner zone (i.e., zone 1), and the number of sectors gradually increases to 60 sectors at the outer zone (i.e., zone 21). Again, 512 bytes of user data are recorded in each sector, which totals 256 Mbytes of data.

The writing of data in the RLL 2,7 mode is also pit-type recording. When these pits are read in the difference mode (A−B), the waveform appearing at the output of the preamplifier is identical to the preformatted pits when read in the sum mode (A+B). This signal only needs to be differentiated once by a dv/dt amplifier 7-512. A pulse corresponding to approximately the center of each pit is generated by digitizing the nominal output (VNOM P, VNOM N) from the programmable filter. The filter cutoff frequency is set to 5.4 MHz for the low-capacity mode responsive to the HC control bit. The filtered signal is digitized and passed through a deglitching logic circuit 7-518. The resulting signal called HYSTOUT (Hysteresis) is fed to the data separator 7-508. The signal is also coupled to the system controller to detect the sector marks. Responsive to the HC control bit, the PLO divider of the frequency synthesizer in data separator 7-508 is set to 3, and the synthesizer is set to 11.6 MHz. The sync data is identical to the original data encoded by the RLL ENDEC 7-502. This is coupled to the RLL ENDEC 7-502 for decoding purposes and then to the data bus to be utilized.

In the high-capacity mode, the difference mode of the preamplifier 7-510 is selected. The playback signal appearing at the output of the preamplifier is in the NRZ (non-return-to-zero) form and requires detection of both edges. This is accomplished by double differentiation by the dv/dt amplifier and the differentiator in a programmable filter chip 7-514 after passage through a AGC amplifier 7-516. The differentiator, a high-frequency filter cutoff, and an equalizer on the chip 7-514 are activated by the HC control bit. The filter cutoff is adjusted depending upon zone-identification bits applied to the chip 7-514. (The differentiator and equalizer in the chip 7-514 are not used in the low-capacity mode.) The output signal (VDIFF P, VDIFF N) from the chip 7-514 is digitized and deglitched in the deglitching logic circuit 7-518. This circuit suppresses low signal level noise. The threshold level is set by a HYST control signal applied to the deglitching logic circuit 7-518. The DATA P output is fed to the data separator. Responsive to the HC control bit, the PLO divider is set to 2, and the synthesizer is set to the appropriate frequency as determined by the applied zone number bits from the system controller. The cutoff frequency of the programmable filter is also dependent on the zone bits, but only in the high-capacity mode. The sync data is identical to the original GCR encoded data. This is coupled to the GCR ENDEC 7-504 for decoding purposes and then to the data bus to be utilized. The entire read function is shared between the low-capacity and high-capacity modes.

The RLL 2,7 ENDEC 7-502 and the write pulse generator 7-506 are represented by the write encoder 7-416 and the read decoder 7-426 in FIG. 94. The GCR ENDEC 7-504 and the write pulse generator 7-507 are represented by the write encoder 7-418 and the read decoder 7-428 in FIG. 94. The select circuit 7-509 is represented by the switch 7-422 in FIG. 94. The internal control of the ENDECs 7-502 and 7-504, which alternately activates them depending on the HC control bit, is represented by the switch 7-424 in FIG. 94. The preamplifier 7-510, amplifier 7-512, AGC amplifier 7-516, chip 7-514, deglitching logic circuit 7-518, and data separator 7-508 are employed in both the high-capacity and low-capacity modes. Thus, they are represented in part by both the read decoder 7-426 and the read decoder 7-428.

Mechanical Isolator

Figure 120:
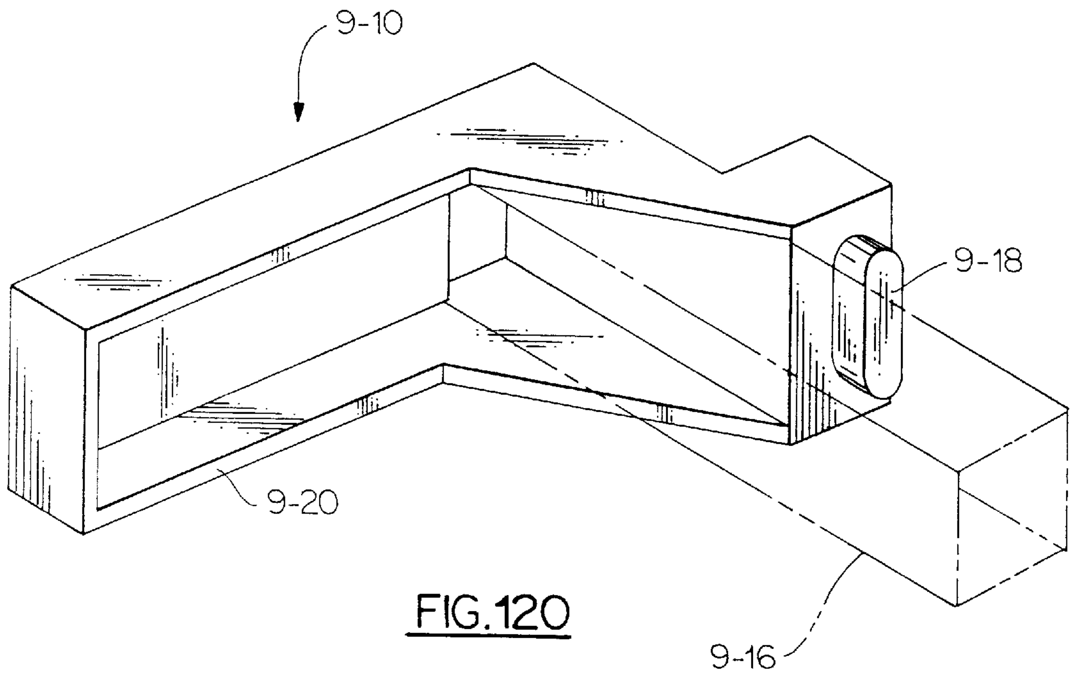
FIG. 120 is an isometric view of a mechanical isolator and a pole piece in accordance with a first preferred embodiment.
Figure 121:
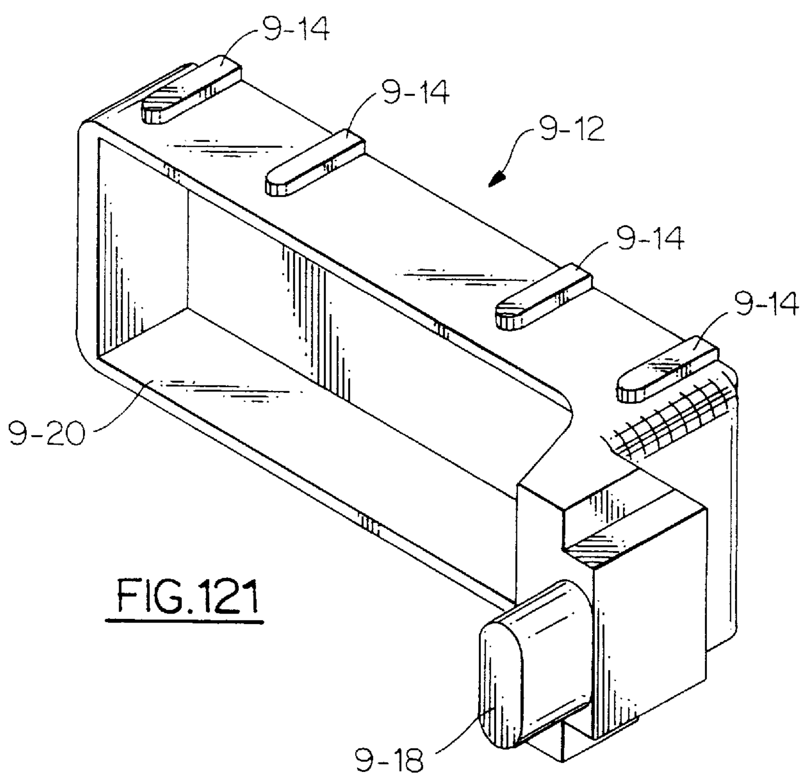

Referring now to FIGS. 120 and 121, there is shown two embodiments of a mechanical isolator, separately referenced 9-10 and 9-12, respectively, according to the present invention. The mechanical isolators 9-10 and 9-12 are ideally suited for use in an optical drive such as a compact disc, laser disc, or magneto-optical player/recorder. The mechanical isolators 9-10 and 9-12, however, will also be useful in any similar system. Two embodiments of the invention are envisioned—the first embodiment of the mechanical isolator 9-10 is shown in FIG. 120 and the second embodiment, mechanical isolator 9-12, is shown in FIG. 121. The mechanical isolator 9-12 has compression ribs 9-14. These function to absorb compression of the invention. The mechanical isolators 9-10 and 9-12 may be fitted to the end of a pole piece assembly 9-16. A crash stop 9-18 is designed to prevent a moving, optical carriage from crashing into solid metal. A shoe 9-20 fits over the end of the pole piece 9-16 and assists in providing vibration isolation and helps accommodate thermal expansion.

The mechanical isolators 9-10 and 9-12 should be made of a material that exhibits minimum creep. As such a silicon rubber, polyurethane or injection molded plastic may be used. In this case the material MS4OG14H-4RED was selected.

Firmware

Appendix A, attached hereto and incorporated herein by reference, contains the hexadecimal executable code contained in the firmware. The following sections provide a detailed functional and structural definition of the hexadecimal code contained in Appendix A. As described in the following sections in more detail, the 80C188firmware handles the SCSI interface to and from the host. The firmware contains the necessary code to be able to initiate and complete reads, writes, and seeks through an interface with the digital signal processor, and also contains a drive command module which interfaces directly with many of the hardware features.

The firmware includes a kernel and a SCSI monitor task module. The kernel and SCSI monitor task module receive SCSI commands from the host. For functions not requiring media access, the SCSI monitor task module either performs the functions or directs a low-level task module to perform the functions. For all other functions, the SCSI monitor forwards the function request to a drive task layer for execution, and awaits a response from the drive task layer to indicate that the function has been completed.

The drive task layer, in turn, directs any of several modules to perform the requested function. These modules include the drive command module, the drive attention module and the format module. These modules interact with each other, with a defect management module, with an exception handling module, and with a digital signal processor to perform these functions.

The drive command module directs the digital signal processor, or directs the hardware devices themselves, to control the movement of the hardware devices. The format module directs the drive command module to format the media. Any defects in the media discovered during this process are stored in the defect management module, which may be located in random access memory.

Feedback from the digital signal processor and the hardware devices occurs in the form of command complete signals and interrupts passed to the drive attention module. In addition, the drive attention module allows other modules to register attentions, so that when an interrupt occurs, the registering module receives notice of the interrupt.

When a drive attention interrupt signals a fault or exception, the drive attention module retrieves from the drive command module information concerning the status of the media and drive, and the exception handler module uses this information to attempt to recover from the fault. Without passing a failure status back to the drive task layer and SCSI interface with the host, the exception handling module may direct the drive control module or format module to attempt the function again. The drive attention module may direct many retries before aborting the function and returning a failure status to the drive task layer. This exception handling process may occur for any drive function, such as seek, eject, magnetic bias, and temperature. In addition to the failure status, a sense code qualifier is passed to the drive task layer. The sense code qualifier specifies exactly which failure occurred, allowing the SCSI interface to specify that information to the host. It will be apparent to one skilled in the art that the exception handling module may be contained within the drive attention module.

In operation with respect to magnetic bias, the bias magnet is turned on, and the bias is monitored through a serial analog-to-digital converter. The bias is monitored until it comes within the desired range, or until 5 milliseconds have passed, in which case a failure status is passed to the drive task layer.

In operation, the temperature of the main board is monitored. Characteristics of the media may change as the temperature increases. At high information densities, a constant-intensity writing beam might cause overlap in the information recorded as temperature changes and media characteristics change. Therefore, by monitoring the ambient temperature within the housing, the firmware can adjust the power to the writing beam in response to the temperature-sensitive characteristics of the media, or can perform a recalibration.

Characteristics of the writing beam are also changed in response to position on the media. The media is divided into concentric zones. The number of zones is determined by the density of the information recorded on the media. For double density recording, the media is divided into 16 zones. For quadruple density recording, the media is divided into either 32 or 34 zones. The power of the writing beam differs approximately linearly between zones.

Additionally, characteristics of the writing beam and reading beam change in response to the media itself. Different media made by different manufacturers may have different optical characteristics. When the media is at the desired rotational speed, an identification code is read from the media. Optical characteristic information concerning the media is loaded into non-volatile random access memory (NVRAM) at the time the drive is manufactured, and the information corresponding to the present media is loaded into the digital signal processor when the identification code is read. If the identification code is unreadable, the power of the reading beam is set to a low power, and is slowly raised until the identification code becomes readable.

In monitoring and changing the power of the reading beam or writing beam, a plurality of digital-to-analog converters may be used. The monitoring and changing of the power may include one or more of the digital-to-analog converters.

When the spindle motor is spinning up from a rest or slower rotational state, the drive command module writes into the digital signal processor an upper limit for rotational speed. This upper limit is slower than the desired speed. When the spindle speed exceeds this upper limit, the digital signal processor generates an interrupt. The acceleration of the spindle motor speed may be decreased at this point. Then, the drive command module writes another upper limit into the digital signal processor. This new upper limit is the lower acceptable limit for normal operation. When the spindle speed exceeds this new upper limit, a final upper limit and lower limit is written into the digital signal processor. These final limits define the operational range for spindle speed, and may be on the order of 1% apart.

When the spindle motor is spinning down from a faster rotational state, the drive command module writes into the digital signal processor a lower limit for rotational speed. This lower limit is faster than the desired speed. When the spindle speed passes this lower limit, the digital signal processor generates an interrupt. The rate of change of the spindle motor speed may be decreased at this point. Then, the drive command module writes another lower limit into the digital signal processor. This new lower limit is the upper acceptable limit for normal operation. When the spindle speed passes this new lower limit, a final upper limit and lower limit is written into the digital signal processor. These final limits define the operational range for spindle speed, and may be on the order of 1% apart.

The algorithm for spinning up or spinning down a spindle motor, although disclosed with respect to a magneto-optical drive, is equally applicable to optical drives including but not limited to CD-ROM drives, CD-R drives, Mini-Disc drives, Write-Once Read Many (WORM) drives, Video Disc drives, and CD-Audio drives. Additionally, the algorithm is applicable to magnetic drives, both fixed disk drives and removable disk drives.

At the initial spinning up process, the media is first spun to the lowest speed for normal operation of the drive, according to the above-described process. At this point, an identification code is read. If the identification code is unreadable, the media is spun at the next highest speed for normal operation, and the identification code is attempted to be read again. This process is repeated until either the identification code is unreadable at the highest speed for normal operation, in which case a failure status occurs, or the identification code is successfully read.

There may be several types of memory storage in the drive. First, there may be flash electrically erasable programmable read only memory (EEPROM). Implementations of the invention may include 256 kilobytes of flash EEPROM. Second, there may be static random access memory, and implementations of the invention may include 256 kilobytes of static random access memory. Finally, there may be NVRAM, and implementations of the invention may include 2 kilobytes of NVRAM.

Portions of the information in the following sections, Disc Drive SCSI Firmware, Drive Exceptions, Read Ahead Cache, and Disc Drive Firmware Architecture, are represented as "TBD", indicating either that the implementation of the modules had prior hereto not been determined, that certain parameters related to optimization or environment, but not critical to function or operation, had yet to be agreed upon, or that certain modules became unnecessary based on the implementation of other modules as represented in the executable code in Appendix A, and as described in the identified following sections. Each of the "TBD" matters are design considerations which would not effect one of skill in the art from practicing the present invention as herein enabled and disclosed. The modules whose implementation had prior hereto not been determined may be implemented in the following manner.

The defect management module will create a defect table while the media is being formatted, and will write the defect table to a portion of the media. When a previously formatted media is loaded into the drive, the defect management module will read the defect table from the media and load it into the memory. The defect management module can then consult the defect table to ensure that the digital signal processor or the hardware devices directly do not attempt to access a defective portion of the media.

The commands SEEK_COMP_ON and SEEK_COMP_OFF activate and deactivate, respectively, an algorithm which optimizes seek time to a certain point on the media. The commands may invoke the algorithm directly, may set a flag indicating to another module to invoke the algorithm, or may generate an interrupt directing another module to invoke the algorithm. In addition, other implementations will be apparent to one skilled in the art.

The commands NORMAL_PLL_BWIDTH, HGH_PLL_BWIDTH, and VHGH_PLL_BWIDTH may read values from memory and store values into the read chip memory. In addition, the commands may calculate values and store values into the read chip memory.

The Write Power Calibration for 2x and Write Power Calibration for 4x may have a similar implementation. During manufacturing, values from a digital-to-analog converter control the write power for the radiant energy source. The write power may be measured for different digital-to-analog converter values, and sense values may be determined. These sense values may be stored in the memory of the drive. During use of the drive, values from a digital-to-analog converter control the write power for the radiant energy source, and sense values may be measured. These sense values are compared against the stored sense values until they are equal within tolerable limits. This process may use more than one digital-to-analog converter. In addition, the process may also calibrate the write power according to temperature, as described above.

Recalibration is performed as described above based on temperature, media type, and other factors. Additionally, recalibration of the servos may be performed by directing the digital signal processor to set the servos based on certain variable factors.

Manufacturing requirements dictate that the information described above that is determined at time of manufacture of the drive be recorded and stored in memory associated with the drive.

The Front Panel Eject Request function generates a drive attention interrupt. The Front Panel Eject Request function may determine the drive status and, based on that information, allow the current command to complete or stop that command.

Firmware performance issues are optimization issues. In particular, movement of the carriage assembly requires power. Power requirements are related to the speed of movement of the carriage, and heat is generated relative to the power requirements. The firmware seeks to minimize the speed of movement of the carriage assembly without affecting access time for a given command.

When a command is queued within the firmware, modules within the firmware determine the initial radial position of the carriage assembly relative to the storage medium, the initial circumferential position of the carriage assembly relative to the storage medium, and the initial circumferential velocity of the storage medium. Modules within the firmware also determine the target radial position of the carriage assembly relative to the storage medium and the target circumferential position of the carriage assembly relative to the storage medium. The firmware then calculates a movement speed for the carriage assembly. The movement speed is related to the initial radial position, the initial circumferential position, the target radial position, the target circumferential position, and the initial circumferential velocity. The movement speed is calculated such that, if the carriage assembly is moved from the initial position to the target position at the movement speed, the carriage assembly will arrive radially and circumferentially at the target position at substantially the same time.

The firmware directs the carriage assembly to move from the initial position to the target position beginning substantially at the movement speed. The carriage assembly may begin moving from the initial position to the target position at a predetermined speed before the firmware has calculated the movement speed. Instead of calculating the movement speed relative to the initial radial and circumferential position, the movement speed will be calculated relative to an intermediate radial and circumferential position. The intermediate radial and circumferential position correspond to the radial and circumferential position of the carriage assembly at the time when the firmware finishes calculating the movement speed.

Additionally, the firmware may determine a target circumferential velocity of the storage medium. In this case, the movement speed is further related to the target circumferential velocity as well. The carriage assembly moves from the initial position to the target position substantially at the movement speed, and the rate of rotation of the storage medium is changed from the initial circumferential velocity to the target circumferential velocity. In this case, the carriage assembly will arrive radially and circumferentially at the target position substantially at the same time. The storage medium may arrive at the target circumferential velocity either before, at the same time, or after the carriage assembly arrives at the target position.

The Firmware Performance optimization algorithm, although disclosed with respect to a magneto-optical drive, is equally applicable to optical drives including but not limited to CD-ROM drives, CD-R drives, Mini-Disc drives, Write-Once Read Many (WORM) drives, Video Disc drives, and CD-Audio drives. Additionally, the algorithm is applicable to magnetic drives, both fixed disk drives and removable disk drives.

The SCSI Eject Command may be disabled by an option switch. The option switch may be implemented in the form of DIP switches.

The External ENDEC Test and the Glue Logic Test, performed as part of the Power-On Self Test, comprise reading and writing information under certain conditions to ensure proper functioning of the External ENDEC and the Glue Logic.

The following sections describe the system firmware in further detail. As of the filing date of this application, this specification describes the current best mode of the present invention which is considered sufficiently enabled and operable. As would be understood by one skilled in the art, the following sections include certain limited areas identified as "TBD" indicating where the above-discussed implementations would apply.

Disc Drive SCSI Firmware

The purpose of the following sections is to describe the functional characteristics of the SCSI firmware for the Jupiter-I 5.25 inch MO disk drive. The SCSI firmware is the portion of the controller code which is executed by the 80C188 CPU. This discussion is not intended to describe the functional characteristics of the controller code which is executed by the DSP.

The firmware requirements which have been used to develop this aspect of the present invention have been included in this discussion and can be found below under the section heading, A. Firmware Requirements. The following referenced documents are incorporated herein by reference, 1) Cirrus Logic CL-SM330, Optical Disk ENDEC/ECC, April 1991, 2) Cirrus Logic CL-SM331, SCSI Optical Disk Controller, April 1991, 3) MOST Manufacturing, Inc., 1,7 ENDEC/FORMATTER, Aug. 2, 1994, 4) MOST Manufacturing, Inc., Jupiter-I Product Specification, Sep. 15, 1994, and 5) MOST Manufacturing, Inc., 80C188/TMS320C5X Communications, Rev. XH, Aug. 25, 1994.

SCSI SUPPORT: SCSI Commands: The SCSI Commands to be supported by the Jupiter firmware are listed in Tables 1–5 below. In addition to listing the command set supported, the Tables 1–5 identify which commands are not valid when issued to the drive when 1x, CCW, O-ROM or P-ROM media is installed. The column for P-ROM indicates commands issued for blocks which are in a read only group of the P-ROM media.

TABLE 1

Group 0, 6-Byte Commands

| Code | Command Name | 1x | CCW | P-ROM |
|---|---|---|---|---|
| 00h | Test Unit Ready | | | |
| 01h | Rezero Unit | | | |
| 03h | Request Sense | | | |
| 04h | Format Unit | No | TBD | TBD |
| 07h | Reassign Block | No | TBD | No |
| 08h | Read | | | |
| 09h | Erase | | | |
| 0Ah | Write | No | | No |
| 0Bh | Seek | | | |
| 0Ch | Erase | No | No | No |
| 12h | Inquiry | | | |
| 15h | Mode Select | | | |
| 16h | Reserve Unit | | | |
| 17h | Release Unit | | | |
| 1Ah | Mode Sense | | | |
| 1Bh | Start Stop Unit | | | |
| 1Ch | Receive Diagnostics | | | |
| 1Dh | Send Diagnostics | | | |
| 1Eh | Prevent Allow Medium Removal | | | |

TABLE 2

Group 1, 10-Byte Commands

| Code | Command Name | 1x | CCW | P-ROM |
|---|---|---|---|---|
| 25h | Read Capacity | | | |
| 28h | Read | | | |
| 2Ah | Write | No | | No |
| 2Bh | Seek | | | |
| 2Ch | Erase | No | No | No |
| 2Eh | Write and Verify | No | | No |
| 2Fh | Verify | | | |
| 35h | Synchronize Cache | No | | No |
| 36h | Lock Unlock Cache | | | |
| 37h | Read Defect Data | | | |
| 3Bh | Write Buffer | | | |
| 3Ch | Read Buffer | | | |
| 3Eh | Read Long | | | |
| 3Fh | Write Long | No | | No |

TABLE 3

| Code | Command Name | 1x | CCW | P-ROM |
|---|---|---|---|---|
| Group 2, 10-Byte Commands | | | | |
| 40h | Change Definition | | | |
| 41h | Write Same | No | | No |
| 55h | Mode Select | | | |
| 5Ah | Mode Sense | | | |

TABLE 4

| Code | Command Name | 1x | CCW | P-ROM |
|---|---|---|---|---|
| Group 5, 12-Byte Commands | | | | |
| A8h | Read | | | |
| AAh | Write | No | | No |
| ACh | Erase | No | No | No |
| AEh | Write and Verify | No | | No |
| AFh | Verify | | | |
| B7h | Read Defect Data | | | |

TABLE 5

| Code | Command Name | 1x | CCW | P-ROM |
|---|---|---|---|---|
| Group 7, Vendor Unique Commands | | | | |
| E0h | Peek/Poke CPU memory | | | |
| E1h | Read Drive Attention Count | | | |
| E5h | Read Trace Buffer | | | |
| E7h | Read/Write ESDI | | | |
| E8h | Read Special | | | |
| EAh | Write Special | No | | No |
| ECh | Erase Absolute | No | No | No |
| FAh | Manufacturing Test | | | |
| TBD | Clean Optics | | | |

A complete description of the SCSI command set to be supported, is provided in the Jupiter-I Product Specification, Section 9, SCSI Support, as incorporated herein by reference. It is important to note that the Log Select and Log Sense commands will not be supported by the Jupiter firmware.

SCSI Messages: The SCSI messages which will be supported by the Jupiter firmware are listed below in Table 6.

TABLE 6

| Code | Message Name |
|---|---|
| SCSI Messages Supported | |
| 00h | Command Complete |
| 01h | Extended Messages |
| | 00h - Modify Data Pointer |
| | 01h - Synchronous Data Transfer Request |
| 02h | Save Data Pointer |
| 03h | Restore Pointers |
| 04h | Disconnect |
| 05h | Initiator Detected Error |
| 06h | Abort |
| 07h | Message Reject |
| 08h | No Operation |
| 09h | Message Parity Error |
| 0Ah | Linked Command Complete |
| 0Bh | Linked Command Complete (With Flag) |
| 0Ch | Bus Device Reset |
| 0Eh | Clear Queue |
| 80h+ | Identify |

It is important to note that the Terminate I/O Message will not be supported.

SCSI Mode Pages: The Mode Pages to be supported by the Jupiter firmware are listed below in Table 7.

TABLE 7

| Code | Message Name |
|---|---|
| Mode Pages Supported | |
| 00h | Unit Attention Parameters |
| 01h | Read/Write Error Recovery Parameters |
| 02h | Disconnect/Reconnect Control Parameters |
| 07h | Verify Error Recovery Parameters |
| 08h | Caching Parameters Page |
| 0Bh | Medium Type Supported Parameters |
| 0Ch | Notch and Partition Parameters |
| 30h | Vendor Unique Parameters |
| 3Bh | MOST Engineering Features Control |
| 3Ch | Error Retry Limit Parameters |
| 3Dh | Vendor Unique Inquiry Data Page |
| 3Eh | Vendor Unique Manufacturing Data Page |

Saved pages will not be supported by the Jupiter firmware. It is also important to note that Mode Pages 20h and 21h will not be supported.

Reset: A reset will be performed by the drive in response to a SCSI Bus Reset, an Autochanger Reset, or a 12V power failure. The functions performed by the drive for each of these types of resets are described in the subsections below.

SCSI Bus Reset: When the SCSI Bus RESET signal is asserted, an INT3 to the 80C188 is produced. The use of an INT3 allows the drive the flexibility of responding to a reset as a Hard or Soft Reset. However, the use of an INT3 assumes that the interrupt vector for the INT3 is still valid. If the firmware has inadvertently overwritten that entry in the Interrupt Vector Table (IVT), then the reset will not recover the drive. The only option the user will have will be to power the drive off and back on.

The INT3 Interrupt Service Routine (ISR) must determine from an option switch whether a Hard or Soft reset must be performed. If the Hard Reset option switch is enabled, a Hard Reset will be performed. If the Hard Reset option switch is disabled, a Soft Reset will be performed.

Hard SCSI Reset: When a SCSI Bus Reset is detected by the drive and the Hard Reset option switch is enabled (indicating a Hard Reset), the drive, 1) will not attempt to process any command which may currently be in progress, 2) will not write any data which may be in the Buffer RAM (i.e., in the Write Cache) to the media, 3) will not preserve any SCSI device reservations, 4) will remove all pending commands from the queue, 5) will perform the steps in the following section, Powerup Sequence, for a Hard Reset, 6) will set the values for each of the Mode Pages to their default values, and 7) will set the unit attention condition.

Without a hardware reset line to reset the various chips on the board, the firmware must use the software reset feature of the chips which possess such a feature. The firmware must also initialize the registers as described on page 36 of the Cirrus Logic SM330 manual and on page 47 of the Cirrus Logic SM331 manual to account for the differences between a hard and soft reset of the chips.

Soft SCSI Reset: When SCSI Bus Reset is detected by the drive and the Hard Reset option switch is disabled (indicating a Soft Reset), the drive, 1) will not attempt to process any command which may currently be in progress, 2) will not write any data which may be in the Buffer RAM (i.e., in the Write Cache) to the media, 3) will not preserve any SCSI device reservations, 4) will remove all pending commands from the queue, 5) will perform the steps in the following section, Powerup Sequence, for a Soft Reset, 6) will set the values for each of the Mode Pages to their default values, and 7) will set the unit attention condition.

Autochanger Reset: If the Autochanger asserted Autochanger Reset during the power-up sequence, the drive, a) must ignore Autochanger EJECT, and b) must wait for Autochanger RESET to be deasserted before performing the SCSI initialization. The Autochanger may assert Autochanger RESET at any time to change the drive's SCSI ID.

12V Power Failure: When the 12V power fails below (TBD), a hardware reset is generated to the 80C188, SM330, SM331, and the RLL(1,7) External ENDEC. Once the ENDEC is reset, it will drive Servo Reset to its initialized state which is asserted which in turn will reset the DSP and the servos.

Unclearable Conditions: When a severe error (listed in Table 8 below) is detected by the drive, an unclearable condition is declared to exist. An unclearable condition forces the drive to respond to a Request Sense Command with a Sense Key of HARDWARE ERROR, an Error Code of INTERNAL CONTROLLER ERROR, and an Additional Sense Code Qualifier specific to the error. A Send Diagnostic SCSI command may remove the source of the hardware error and clear the unclearable condition. If the Send Diagnostic command is not successful in clearing the hardware error, a SCSI Bus reset will be required to clear the unclearable condition. A SCSI Bus Reset received while the drive has an unclearable condition will force the drive to perform a Hard Reset and perform its full set of diagnostics. In this manner, any serious error discovered while performing an operation will first abort the current operation and then preclude the drive from attempting to alter the media during subsequent operations.

TABLE 8

Severe Errors

| Symbolic Name | Description |
|---|---|
| ASCQ_NO_TCS_AVAIL | No message blocks available |
| ASCQ_CZ_RD_ERR | Error while reading control tracks/SFP |
| ASCQ_UNDEF_UNIT_ATTN | Undefined Unit Attention |
| ASCQ_CPU_FAILURE | CPU failure |
| ASCQ_BUFF_RAM_FAILURE | Buffer RAM failure |
| ASCQ_SM330_FAILURE | Cirrus Logic SM330 failure |
| ASCQ_SM331_FAILURE | Cirrus Logic SM331 failure |
| ASCQ_WCS1_FAILURE | Cirrus Logic Write Control Store test #1 failure |
| ASCQ_WCS2_FAILURE | Cirrus Logic Write Control Store test #2 failure |
| ASCQ_EXT_ENDEC_FAILURE | RLL (1, 7) ENDEC failure |
| ASCQ_UNDEF_REALLOC | Undefined reallocation |
| ASCQ_LOAD_SEQ_FAILURE | Failure while loading Format Sequencer |
| ASCQ_TOO_MANY_ATTNS | Too many Drive Attentions |
| ASCQ_DSP_CMD_CHECKSUM | DSP command checksum failure |
| ASCQ_LASER_FAIL | Laser power control failure |
| ASCQ_HRDWR_FAIL | Hardware failure |
| ASCQ_UNKNOWN_READ_ERROR | Unknown interrupt while reading |
| ASCQ_UNKNOWN_WRITE_ERROR | Unknown interrupt while writing |
| ASCQ_DRV_INIT_FAIL | Drive initialization failed |
| ASCQ_INV_OP | Invalid DSP command |
| ASCQ_RELOC_LIMIT_RCHD | Too many reallocations attempted for same sector |
| ASCQ_DRV_SELECT_FAIL | Drive selection failure |
| ASCQ_MAGNET_FAILED | Bias magnet failure |

Multi-initiator Support: Support for multiple initiators will be provided by the Jupiter firmware. A queue for incoming requests will be maintained by the firmware to order requests from multiple initiators for disconnecting commands. Tagged Queued commands will not be supported initially. The firmware design, however, must not preclude the ability to add that feature at a later date.

When a non-media access command is received while the drive is currently processing a disconnected, media access command, the firmware must be capable of servicing the new command while remaining connected. The exact method of providing this capability is not specified. The commands which will be supported in this nondisconnecting fashion are listed below in Table 9.

TABLE 9

Non-Disconnecting SCSI Commands

| Code | Message Name |
|---|---|
| 00h | Test Unit Ready |
| 03h | Request Sense |
| 12h | Inquiry |
| 16h | Reserve Unit |
| 17h | Release Unit |
| 1Ah | Mode Sense |
| 1Ch | Receive Diagnostic |
| 1Eh | Prevent/Allow Media Removal |
| 25h | Read Capacity |
| 5Ah | Mode Sense |
| E0h | Peek/Poke CPU Memory |
| E1h | Read Drive Attention Count |
| E5h | Read Trace Buffer |
| E7h | Read/Write ESDI |

SCSI REQ/ACK Response: The Cirrus SM331 chip only accepts the first six bytes of a SCSI Command Descriptor Block (CDB) and then generates an interrupt. The firmware must then use Programmed I/O (PIO) to transfer any remaining bytes. If the firmware is delayed, the command will stall between the sixth and seventh bytes. The drive's latency to respond to a Cirrus SCSI interrupt must be within the following range: 20 $\mu$s is a reasonable number, 40 $\mu$s a poor length of time, and 150 $\mu$s is unacceptable.

SCSI Inquiry Command: The drive will respond to the SCSI Inquiry Command be returning the firmware revision level for the SCSI firmware and the DSP firmware, the checksum for the SCSI firmware flash PROM and the DSP PROM, and a bit indicating whether the Hard Reset or Soft Reset function is currently being supported.

INITIALIZATION: Diagnostics: The diagnostics performed by the drive are executed during Power-On Self Test (POST), in response to a SCSI Send Diagnostic Command, or when the drive detects that the serial diagnostic interface cable is attached.

Power-On Self Test (POST): During POST, the drive will perform the tests listed below. A detailed description of each test is provided below under the section heading, B. Post Definition. These tests include, 1) 80C188 Register and Flag Test, 2) CPU RAM Test, 3) 80C188 Interrupt Vector Test, 4) ROM Checksum Test, 5) SM331 Register Test, 6) SM331 Sequencer Test, 7) SM330 ENDEC Test, 8) External ENDEC Test, 9) Glue Logic Test, 10) Buffer RAM Test, 11) DSP POST, and 12) Bias Magnet Test.

If while performing the Buffer RAM Test it is determined that some of the Buffer RAM is bad, the drive is considered to be unusable. The drive will respond to SCSI commands, but only to report a hardware failure. The Buffer RAM test will be performed in two phases. The first phase will only test 64K bytes of the buffer. During that time, the drive will be capable of responding Busy to a SCSI command. After the drive has initialized, the remainder of the Buffer RAM will be tested in a background mode. (See section, Powerup Sequence, below for a detailed description.) If during the background test a portion of the Buffer RAM is determined to be bad, the drive will declare the unclearable condition to exist.

Send Diagnostic Command: When the drive receives a SCSI Send Diagnostic Command, the drive will perform the following diagnostics, 1) ROM Checksum Test, 2) SM331 Sequencer Test, 3) SM331 SCSI Interface Test, 4) SM330 ENDEC Test, 5) External ENDEC Test, 6) Glue Logic Test, 7) Buffer RAM Test, and 8) Bias Magnet Test. The tests performed in response to a Send Diagnostic Command will be the same tests which the drive executes when performing the POST, as described above.

Serial Diagnostic Interface: When the drive powers up, it will perform the diagnostics numbered 1 through 4 in above section Power-On Self Test (POST), and then check to see if the serial diagnostic interface cable is currently attached. If the cable is not detected, the drive will continue performing the POST. If the cable is detected, the drive will discontinue performing the POST and be prepared to receive diagnostic commands through the serial diagnostic interface. The diagnostic commands and their format is not within the scope of this discussion.

Chip Initialization: SM330 Initialization: This section describes the initialization of the Cirrus Logic SM330. The mnemonics used for the SM330 registers are listed in Table 31 provided below in section C. SM330 Registers. The steps taken to initialize the Cirrus Logic SM330 are listed below:

1) The current value for the General Purpose Output (EDC_GPO) register is saved.

2) The chip is placed in reset by setting the EDC__CHIP__RESET, EDC__OPER__HALT, and EDC__ERROR__RESET fields in EDC__CFG__REG1.

3) The EDC__VU__PTR__SRC__MODE, EDC__130MM__MODE, and EDC__1__SPEED__TOL fields are set in EDC__CFG__REG2.

4) The EDC__SPT register is set to the default number of sectors per track, SECT__PER__TRK__RLL__1X__512__1.

5) The EDC__SM__WIN__POS, EDC__SMM (shifted left by 3), and EDC__SMS fields are set in the EDC__SMC register.

6) The EDC__RMC register is set to the default value of 2.

7) The EDC__ID__FLD__SYN__CTL register is set to the default values of 2 out of 3 IDs and 9 out of 12 Data Sync Marks.

8) The EDC__WIN__CTL register is initialized to 0×00.

9) The Chip is taken out of reset by writing 0x00 to the EDC__CFG__REG1 register.

10) The saved value from the EDC__GPO register is written back to the register.

11) The EDC__CFG__REG3 register is initialized to 0×00.

12) All chip interrupts are cleared by writing 0×FF to the EDC__INT__STAT and EDC__MED__ERR__STAT registers.

13) All chip interrupts are disabled by writing 0×00 to the EDC__INT__EN__REG and EDC__MED__ERR__EN registers.

14) The sequencer sync byte count is initialized by writing 40 to the SF__SYNC__BYTE__CNT__LMT register.

15) The Data Buffer Address pointer is initialized to zero (EDC__DAT__BUF__ADR__L, EDC__DAT__BUF__ADR__M, and EDC__DAT__BUF__ADR__H registers).

16) The EDC__TOF__WIN__CTL register is cleared to 0×00.

17) The EDC__SM__ALPC__LEN register is cleared to 0×00.

18) The EDC__PLL__LOCK__CTL register is initialized to 0×E0.

19) The EDC__PLL__RELOCK__CTL register is cleared to 0×00.

20) The EDC__LFLD__WIN__CTL register is cleared to 0×00.

21) The ECC Corrector RAM locations 0×00 and 0×01 are zeroed.

22) The ECC Corrector RAM locations 0×0F and 0×016 are zeroed.

23) The ECC Corrector RAM locations 0×20 and 0×027 are zeroed.

24) The ECC Corrector RAM threshold for sector correction is initialized to 0×0F.

25) The ECC Corrector RAM threshold for interleave correction is initialized to 0×03.

26) The EDC__GPO register is initialized by clearing the DSP__DIR__, BIAS__EN__, BIAS__E__W__, SCLK, SDO, and MIRROR__TX__bits.

27) The LED for the drive is turned off.

SM331 Initialization: This section describes the initialization of the Cirrus Logic SM331. The mnemonics used for the SM331 registers are listed in Table 32 provided below in section D. SM331 Registers.

The initialization of the SM331 includes reading the option switches and the initialization of the SCSI, Buffer Manager, and Format Sequencer portions of the chip. To read the option switches tri-stated on the SCSI Bus, the firmware performs the following steps:

1) The SM331 is placed in reset by setting BM__SW__RESET in the BMMODE__CTL register.

2) The SM331 is taken out of reset by clearing BM__SW__RESET in the BM__MODE__CTL register.

3) The SF__LOCAL__HINT__EN, SF__LOCAL__DINT__EN, and SF__SCSI__IO__40__47H fields are set in the SF__MODE__CTL register.

4) The BM__MOE__DISABLE bit is set in the BM__MODE__CTL register.

5) The BM__SCHED__DATA register is read twice. (The first read initiates the actual transfer of data from the buffer which is fetched during the second read.)

6) The value read is complemented and saved as the value of the option switches.

7) The BM__MOE__DISABLE bit is cleared in the BM__MODE__CTL register.

The steps taken to initialize the SCSI portion of the SM331 are as listed below:

1) The SCSI ID for the drive is read from the 20-pin connector via the GLIC__JB__INP__REG register and placed in the variable target__id.

2) The SCSI Parity Enable option is read from the 20-pin connector via the GLIC__JB__INP__REG register.

3) The SCSI__MODE__CTL register is setup with the drive's SCSI ID, SCSI Parity Enable, and the CLK__PRESCALE field is set.

4) The phase control register SCSI__PHA__CTL is cleared with 0×00.

5) The synchronous control register SCSI__SYNC__CTL is initialized with the value (0×0F-1 ).0×10.

6) The Buffer Manager FIFO is cleared by writing 0×10 to the BM__STAT__CTL register.

7) The BM__SCSI__DATA__2T and BM__DRAM__BURST__EN fields are set in the Buffer Manager Control register BM__STAT__CTL.

8) The Buffer Manager Transfer control register BM__XFER__CTL is initialized to 0×00.

9) The SCSI Reselection ID register SCSI__SEL__REG is set to the drive's SCSI ID.

10) The SCSI__RESET, SCSI__ATTN, SCSI__OFST__OVERRUN, SCSI__BUS__FREE, SCSI__BFR__PTY__ERR, SCSI__BUS__PTY__ERR bits are set in the SCSI Status register SCSI__STAT__1.

11) The SCSI__STAT__2 register is initialized to 0×FF.

12) The SCSI interrupts are disabled by writing 0×00 to the SCSI__NT__EN__2 register.

The steps taken to initialize the Buffer Manager portion of the SM331 are as follows below:

1) The BM_SCSI_DATA_2T and BM_DRAM_BURST_EN fields are set in the Buffer Manager Control register BM_TAT_TL.

2) The Buffer Manager Transfer control register BM_XFER_CTL is initialized to 0×00.

3) The BM_DRAM, BM_256K_RAM, BM_PTY_EN, and BM_NO_WS fields are set in the Buffer Manager Mode Control register BM_MODE_CTL.

4) The DRAM timing is initialized in the BM_TIME_CTL and BM_DRAM_REF_PER registers.

5) The size of the Buffer RAM is encoded into the BM_BUFF_SIZE register.

6) The Disk Address Pointer is initialized to 0×000000 in the BM_DAPL, BM_DAPM, and BM_DAPH registers.

7) The Host Address Pointer is initialized to 0×000000 in the BM_HAPL, BM_HAPM, and BM_HAPH registers.

8) The Stop Address Pointer is initialized to 0×000000 in the BM_SAPL, BM_SAPM, and BM_SAPH registers.

The steps taken to initialize the Format Sequencer portion of the SM331 are as identified below:

1) The Format Sequencer is stopped by writing 0×1F (the stop address) to the sequencer start address register SF_SEQ_STRT_ADR.

2) The default sector size of 512 bytes is setup in the sector size register SF_SECT_SIZE by writing 0×00.

3) The sync byte count is initialized by writing x028 to the SF_SYNC_BYTE_CNT_LMT register.

4) The operation control register SF_OP_CTL is initialized by setting the SF_DATA_BR_FLD_EN field.

5) The branch address register SF_BRANCH_ADR is initialized to 0×00.

6) The sequencer interrupts are disabled by writing 0×00 to the SF_INT_EN register.

7) The default Write Control Store (WCS) program is loaded into the Format Sequencer.

RLL (1,7) External ENDEC Initialization: (TBD).

Glue Logic IC (GLIC) Initialization: The initialization of the GLIC includes the steps of, 1) set the Read Gate Hold Override bit in the GLIC_JB_CTRL_REG register, and 2) enable all interrupts in the GLIC_INT_EN_REG register.

SCSI Initialization: The SCSI Initialization firmware will use the 20-pin connector as the source of the drive's SCSI ID and SCSI Parity Enable. When the cable is attached, the signals will be driven by the jukebox. When the cable is not attached, the same pins will have jumpers installed to indicate the SCSI ID and SCSI Parity Enable to be used.

Termination of the SCSI Bus within the drive will be selected via an option switch. There will be no firmware interaction required to support SCSI Termination.

Powerup Sequence: Table 10 below itemizes the steps in the order to be performed for the powerup sequence. The columns Power On, Soft Reset, and Hard Reset identify which steps are performed following a Power On condition, a Soft Reset, or a Hard Reset. If an unclearable condition exists when a reset is received which would have generated a Soft Reset, the reset will instead produce a Hard Reset to force the drive to complete its full set of diagnostics.

TABLE 10

| Power On | Hard Reset | Soft Reset | Description |
|---|---|---|---|
| Y | | | 1) The Servo Reset signal is held asserted by the ENDEC. The SCSI chip does not (cannot) respond to a selection. |
| Y | Y | | 2) The 80C188 initializes the Peripheral Control Block for the ROM, SRAM, and peripheral chip selects. |
| Y | Y | | 3) The 80C188 disables the timers. |
| Y | Y | Y | 4) The 80C188 initializes the interrupt controller. |
| Y | Y | | 5) The 80C188 performs a CPU flag test. |
| Y | Y | | 6) The 80C188 performs a CPU register ripple test. |

At this point, the 80C188 checks to see if a full Hard Reset should be performed or whether a variation, called a Firm Reset, can instead be used. A Firm Reset will not reset the DSP. This approach saves considerable time by not forcing the DSP's code to be downloaded nor the DSP to reinitialize all its servo loops. A Firm Reset will check for a valid RAM signature (TBD) in the 80C188 CPU memory, that an unclearable condition does not exist, and that the DSP is able to respond to a Get Status command properly. If any of these reconditions is not true, the drive will perform a Hard Reset. The continuing descriptions are consecutively numbered in Table 11.

TABLE 11

| Power On | Hard | Firm | Soft | Description |
|---|---|---|---|---|
| Y | Y | | | 7) The 80C188 resets the External ENDEC, which asserts the Servo Reset signal. |
| Y | Y | Y | | 8) The 80C188 performs a CPU RAM test. |
| Y | Y | Y | | 9) The 80C188 performs a CPU interrupt test. |
| Y | Y | Y | | 10) The 80C188 initializes all interrupt vectors. |
| Y | Y | Y | | 11) The 80C188 performs a CPU ROM checksum. |
| Y | Y | Y | Y | 12) The 80C188 initializes all chips and timers. |
| Y | Y | Y | | 13) The 80C188 tests the Cirrus Logic SM331. |
| Y | Y | Y | | 14) The 80C188 tests the Cirrus Logic SM330. |
| Y | Y | Y | | 15) The 80C188 tests the RLL (1.7) External ENDEC. |
| Y | Y | Y | | 16) The 80C188 performs a Buffer RAM test. Only the first 64Kbytes of the Buffer RAM are tested. |
| Y | Y | Y | | 17) The 80C188 performs a Bias Magnet test. |

TABLE 11-continued

| Power On | Hard | Firm | Soft | Description |
|---|---|---|---|---|
| Y | Y | Y | Y | 18) The system firmware initializes itself (i.e., kernel initialization). |
| Y | Y | Y | Y | 19) The drive initializes the Sense Data structures. |
| Y | Y | Y | Y | 20) The drive initializes the host request block information structures. |
| Y | Y | Y | Y | 21) Interrupts for SCSI and Drive Attentions are enabled |
| Y | Y | Y | Y | 22) The SCSI interface is initialized and the drive is made capable of responding BUSY to any SCSI command. |
| Y | Y | | | 23) The 80C188 deasserts Servo Reset. |
| Y | Y | | | 24) The DSP code is downloaded from the SCSI ROM. |
| Y | Y | Y | | 25) The DSP starts executing and performs a limited set (TBD) of diagnostics. |
| Y | Y | | | 26) The 80C188 requests the address of the Velocity Table and downloads the default (low velocity) table. |
| Y | Y | | | 27) The 80C188 validates (TBD) that the DSP is functioning properly. If not, Servo Reset is asserted, deasserted, and then the process repeats with step (23), retrying up to two times. |
| Y | Y | Y | Y | 28) The 80C188 enables all interrupts from the GLIC. |
| Y | Y | Y | Y | 29) The drive initializes the Mode Page structures. |
| Y | Y | Y | Y | 30) The drive initializes the Inquiry Data structures. |
| Y | Y | Y | Y | 31) The DSP validates that the Eject Limit switch is in the correct position. The 80C188 is notified (TBD) if not. |
| Y | Y | Y | Y | 32) The drive checks if a cartridge is present and spins it up. |
| Y | Y | Y | Y | 33) The DSP is commanded to close focus & tracking loops. If the DSP reports that the cartridge initialization failed, two additional retries will be performed before reporting that "cartridge initialization failure." |
| Y | Y | | | 34) The drive performs the media type determination algorithm described in Section 5.1. Once the type is determined, the media parameters are initialized. |
| Y | Y | | Y | 35) The Velocity Table for the current media installed is downloaded to the DSP. |
| Y | Y | Y | | 36) The drive reads the defect lists and builds the Defect Management data structures. |
| Y | Y | Y | | 37) The drive begins to test the remainder of the Buffer RAM in background mode. |
| Y | Y | Y | Y | 38) The SCSI interface is made fully operational (i.e., it no longer returns BUSY). |

DRIVE ATTENTIONS: Drive Attention Interrupts: Drive Attention interrupts are indications that an anomalous condition exists within the drive. The interrupts are generated by either the hardware attached to the Glue Logic IC (GLIC) or by the DSP. The DSP interrupts are routed through the GLIC to form a combined source of interrupts (on INT2) to the 80C188. The following section describes the interrupts which are generated by the DSP. Section GLIC Interrupts, describes the interrupts which are generated by the other hardware attached to the GLIC. The firmware can determine the source of the interrupt by examining the GLIC Interrupt Status Register (Base Addr+05h).

DSP Interrupts: The sources of the DSP interrupts can be broken into two categories which include aborting interrupts and non-aborting interrupts. An aborting interrupt is generated by the DSP when a catastrophic event occurs which requires that the drive's ability to write be immediately disabled. When the DSP asserts the aborting interrupt, the drive hardware will deassert Write Gate, turn off the laser, and generate a Drive Attention Interrupt to the 80C188. When the DSP asserts the non-aborting interrupt, only a Drive Attention Interrupt is generated to the 80C188.

Aborting DSP Interrupts: The conditions which cause the DSP to report an aborting interrupt are identified in Table 12.

TABLE 12

| Aborting DSP Interrupts |
|---|
| Focus Error |
| Off-Track Error |
| Laser Power Control Error |
| Spindle Not At Speed Error |

A Focus Error is reported by the DSP when the focus error signal exceeds the programmable threshold set by the 80C188. An Off-Track Error is reported by the DSP when the tracking error signal exceeds the programmable threshold set by the 80C188. A Laser Read Power Control Error is reported by the DSP when the laser's output can no longer be controlled by the DSP within the thresholds set by the 80C188. A Spindle Not At Speed Error is reported by the DSP when the spindle speed falls below the minimum RPM established by the 80C188 or rises above the maximum RPM established by the 80C188.

Non-Aborting DSP Interrupts: The conditions which cause the DSP to report a non-aborting interrupt are identified below in Table 13.

TABLE 13

| Non-Aborting DSP Interrupts |
| --- |
| 10-Second Timer Event |
| Bad Command Checksum |
| Unknown Command |
| Bad Seek Error |
| Cartridge Eject Failed Error |

A 10-Second Timer Event interrupt is returned by the DSP to signal that its internal clock has reached 10 seconds. The 80C188 is responsible for maintaining a running clock of the total powered on hours and minutes. Each 10-Second Timer Event interrupt advances the powered-on hours clock. A Bad Command Checksum is reported by the DSP when its calculation of the checksum for the command does not match the contents of the checksum byte within the command just received from the 80C188. An Unknown Command is reported by the DSP when the contents of the command byte just received from the 80C188 is not a valid DSP command.

A Bad Seek Error is reported by the DSP when a) the first entry in the Seek Velocity Table is empty, or b) the Focus Loop is not closed (this should only occur if a seek is issued as the first command before the DSP is commanded to initialize). Seek Settling Errors will appear as Off-Track Errors. The DSP will disable Off-Track Errors for (TBD)ps after the Tracking Loop is closed to prevent false Off-Track Errors during the settling time. A Cartridge Eject Failed Error is reported by the DSP when the Eject Limit signal is not detected by the DSP within (TBD)ps.

GLIC Interrupts: The GLIC (Glue Logic IC) provides an interface to various input and output signals which the 80C188 must manage. The input signals which have been defined to produce interrupts from the GLIC are as identified below in Table 14.

TABLE 14

| Other Drive Attention Interrupts |
| --- |
| Autochanger Reset |
| Autochanger Power Down Request |
| Autochanger Eject |
| Front Panel Eject |
| Cartridge Inserted (in throat) (future) |
| Cartridge Present (seated on the hub) |

An Autochanger Reset interrupt is produced by the GLIC whenever a rising edge is detected on the Autochanger Reset input signal on the Jukebox 20-pin connector. An Autochanger Power Down Request interrupt is produced by the GLIC whenever a rising edge is detected on the Autochanger Power Down Request input signal on the Jukebox 20-pin connector. An Autochanger Eject interrupt is produced by the GLIC whenever a rising edge is detected on the Autochanger Eject input signal on the Jukebox 20-pin connector. A Front Panel Eject interrupt is produced by the GLIC whenever a rising edge is detected on the signal from the Font Panel Eject Switch. A Cartridge Inserted (cartridge detected in the throat of the drive) interrupt is produced by the GLIC whenever a rising or falling edge is detected on the signal from the Cartridge Inserted Switch. The interrupt is capable of being produced by the GLIC hardware, however, there is no actual switch to generate the interrupt. At this time, no firmware will be written to support this feature. A Cartridge Present (a cartridge is seated on the drive hub) interrupt is produced by the GLIC whenever a leading or trailing edge is detected on the signal from the Cartridge Seated Switch.

Drive Attention Recovery: The Drive Attention code must service all Drive Attentions and return the drive to a safe, known state. To do this, the Drive Attention code must be partitioned into an Interrupt Service Routine (ISR) and a Handler. The Drive Attention ISR must execute as the highest priority maskable ISR so that it can preempt the SCSI ISR and/or Disk ISR and disable any operations which may be in progress, taking the drive to a safe state. Once the operation is disabled, the SCSI ISR or Disk ISR is allowed to run to completion and exit. The handler portion of the Drive Attention Handler is then free to run and attempt to take the drive to a known state. Often there are multiple Drive Attention Interrupts as the drive cascades through a series of faults, causing the Handler to interrupt itself.

When the DSP detects a Drive Attention, an interrupt will be produced by the GLIC (on INT2) to the 80C188. When the interrupt is an aborting interrupt, the GLIC also deasserts Write Gate and turns off the laser. The Drive Attention ISR will stop any drive operation in progress by halting the SM331 Format Sequencer, the SM330, and the External ENDEC. A hook will be provided to call an application specific halt routine. The below section, Drive Attention Notification, provides further information relating thereto.

The Drive Attention Handler is responsible for identifying the reason for the Drive Attention Interrupt, clearing the source of the interrupt, initiating recovery procedures to take the drive to a known state, and verifying that the initial error condition has been cleared. The source of the Drive Attention Interrupt is determined by examining the GLIC Interrupt Status Register (Base Addr+05h) and possibly by requesting the current DSP status. The relative priorities of the possible errors are addressed in the following section. If the DSP is the source of the interrupt, the Drive Attention Handler sends a command to the DSP to reset the attention condition and clear the status bits. The error recovery procedure for each of the different error conditions is described below.

Drive Attention Error Priorities: This section lists the different Drive Attention error conditions which are recognized by the Jupiter drive and the relative priority which is proposed for each type of error. Table 15—Drive Attention Priorities, with the relative ranking of each of the errors, appears below.

TABLE 15

| Drive Attention Priorities |
| --- |
| Laser Power Error |
| Focus Failure |
| Not On Track, which includes: |
| Seek Settling Error |
| Tracking Error |
| Write Terminated |
| Write Fault (Write Gate asserted and Bias OK not yet asserted) |
| Bias Magnet Failed (TBD) |
| Spindle Speed Failure |
| Eject Request, which includes: |
| Front Panel Eject Request |
| Autochanger Eject Request |
| Autochanger Powerdown Request |
| Autochanger Reset |
| Cartridge Detected (Cartridge In Throat Switch) |
| Media Changed (Cartridge Present Switch) |
| Cartridge Unload Failure (cartridge still seated after eject cycle) |
| Disk Rejected (not used for Jupiter) |

TABLE 15-continued

| Drive Attention Priorities |
| --- |
| Command Fault, which includes: |
| Bad Command Checksum<br>Invalid Command |

Drive Attention Error Recovery: This section describes the different Drive Attention error conditions which are recognized by the Jupiter drive. Each subsection will describe the status bits used to classify the error condition and also contains pseudocode to describe how the error condition is handled.

The pseudocode listed within each subsection has been re-engineered from the Drive Attention Handler currently in use with the RMD-5300 product and is intended as a guideline only. The actual code uses multiple flags to further refine the priorities of the Drive Attentions.

The variables SuggSenseKey, SuggSenseCode, and SuggSenseCodeQ shown in the pseudocode represent the SCSI Sense Data fields Sense Key, Error Code, and Additional Sense Code Qualifier (ASCQ), respectively. The variable unclr__cond__flag is used to indicate when an unclearable condition exists within the drive. An unclearable condition forces the drive to respond to a Request Sense Command with a Sense Key of HARDWARE ERROR, an Error Code of INTERNAL CONTROLLER ERROR, and an ASCQ of the current value in unclr__cond__flag. A reset or the execution of a SCSI Send Diagnostic command may clear an unclearable condition by forcing the drive to perform its full set of diagnostics. In this manner, any serious error discovered while performing an operation will preclude the drive from altering the media.

The following subsections use the conventions that S is the drive's Standard Status, O is the drive's Optical Status, D is the DSP Status, and G is the GLIC Interrupt Status. The Standard Status and Optical Status are the modified ESDI status words for the drive. The below section, Drive Command Status, provides information on the ESDI Status. The below section, DSP Status Definitions, for information on the DSP Status. At the beginning of each subsection is listed the status bits which are used to determine whether that particular error condition exists. The pseudocode then describes how the condition is handled.

Command Fault:
Status Bits:
S=ESDI__CMD__PTY__FLT|ESDI__INVALID__CMD;
Pseudocode:
SuggSenseKey=HARDWARE__ERROR;
SuggSenseCode=INTERNAL__CONTROLLER__ERR;
if S=ESDI__CMD__PTY__FLT
SuggSenseCodeQ=ASCQ__CMD__PRTY;
if S=ESDI__INVALID__CMD
SuggSenseCodeQ=ASCQ__INV__OP;
uncir__cond__flag=SuggSenseCodeQ;

A command fault will occur if a bad command checksum is detected by the DSP or an invalid command is received by the DSP. Neither of these errors should occur in the final product made in accordance with the teachings of this invention. Therefore, if they do, they are probably an indication of another type of error, such as a memory error, which would be detected during the reset required to clear the unclearable condition.

Disk Rejected
Status Bits
O=CARTRIDGE__REJECTED
Pseudocode
send RESET__ATTN command
get REQ__STD__STAT
get REQ__OPT__STAT;
if (ANY__ATTN__PENDING)
return (ATTN__DIDNT__CLEAR);
send Bias Magnet command to turn off magnet
if medium present
send STOP__SPINDLE command
Wait__for__cmd__cmplt A Disk Rejected error will be reported if the DSP cannot successfully close the focus and/or tracking loops after three attempts.

Cartridge Unload Failure
Status Bits
O=CART__LOAD__FAILURE
Pseudocode:
if third attempt fails
GLIC__JB__CTRL__REG &=~JB__ERROR; II Assert.
SuggSenseKey=HARDWARE__ERROR;
SuggSenseCode=INTERNAL__CONTROLLER__ERR;
SuggSenseCodeQ=ASCQ__CANT__UNLD;
else
send RESET__ATTN command
get REQ__STD__STAT
get REQ__OPT__STAT;
GLIC__JB__CTRL__REG=JB__CART__LOADED; II Deassert.
if (ANY__ATTN__PENDING)
return (ATTN__DIDNT__CLEAR);
if medium present
send EJECT__CART command
Wait__for__cmd__cmplt();

The DSP will monitor the eject cartridge sequence and generate an interrupt if the Eject Limit signal is not asserted after three seconds. The recovery procedure will be to attempt to eject the cartridge three times. If the error persists, the failure is reported appropriately on SCSI and the 20-pin Autochanger connector signal ERROR (active low).

Eject Request
Status Bits
O=EJECT__REQUEST
Pseudocode
SuggSenseKey=MEDIUM ERROR;
SuggSenseCode=MEDIUM__OUT;
SuggSenseCodeQ=NO__SENSE__CODE__QUAL;
get REQ__STD__STAT;
if medium present
send Bias Magnet command to turn off magnet
send STOP__SPINDLE command
GLIC__JB__CTRL__REG|=JB__CART__LOADED; II Deassert.
send EJECT__CART command
Wait__for__cmd__cmplt ();
send RESET__ATTN command
get REQ__STD__STAT;
if (ANY__ATTN__PENDING)
return (ATTN__DIDNT__CLEAR);

An Eject Request can come from either the Autochanger or from the Front Panel. If a cartridge is present, the spindle is stopped and the Autochanger CART__LOADED signal is deasserted (active low). After waiting for the spindle to stop (as specified in the below section, STOP__SPINDLE), the cartridge is ejected.

Media Changed:

Status Bits

O=CARTRIDGE__CHANGED

Pseudocode

```
SuggSenseKey=MEDIUM ERROR;
SuggSenseCode=MEDIUM__OUT;
SuggSenseCodeQ=NO__SENSE__CODE__QUAL;
Set__not__rdy__mchg__attn ();
send RESET__ATTN command
get REQ__STD__STAT;
get REQ__OPT__STAT;
if (ANY__ATTN__PENDING)
return (ATTN__DIDNT__CLEAR);
send STOP__SPINDLE command
send START__SPINDLE command for 4x RPM
Wait__for__cmd__cmpit ();
GLIC__JB__CTRL__REG &=~JB__CART__LOADED; // Assert.
```

This condition exists when a cartridge is seated onto the hub and closes the Cartridge Present switch. The Autochanger signal CART__LOADED is asserted (active low).

Spindle Speed Failure

Status Bits

O=SPINDLE__SPEED__FAILURE

Pseudocode:

```
send RESET__ATTN command
get REQ__STD__STAT;
get REQ__OPT__STAT;
GLIC__JB__CTRL__REG=JB__CART__LOADED; // Deassert.
if (ANY__ATTN__PENDING)
return (ATTN__DIDNT__CLEAR);
if medium present
send START__SPINDLE command for current media RPM
Wait__for__cmd__cmplt ();
GLIC__JB__CTRL__REG &=~JB__CART__LOADED; // Assert.
```

The DSP will monitor the spindle speed based on a range of acceptable speeds for a particular type of media. The minimum and maximum speed were identified to the DSP by the 80C188. If the spindle speed is detected to be outside of the specified range, the DSP will generate the interrupt.

Laser Power Failure

Status Bits

O=LASER__DRIVE__FAILURE

Pseudocode:

```
send RESET__ATTN command
send RECAL__DRIVE command
get REQ__STD__STAT;
get REQ__OPT__STAT;
if O=LASER__DRIVE__FAILURE
SuggSenseKey=HARDWARE__ERROR;
SuggSenseCode=INTERNAL__CONTROLLER__ERR;
SuggSenseCodeQ=ASCQ__LASER__FAIL;
unclr__cond__flag=SuggSenseCodeQ:
return (ATTN__DIDNT__CLEAR);
if (ANY__ATTN__PENDING)
return (ATTN__DIDNT__CLEAR);
return (ALL__DONE);
```

When a Laser Read Power threshold is exceeded and is detected by the DSP, an aborting interrupt will be generated. An unclearable condition is declared to exist if the laser failure does not clear after the drive performs a recalibration.

Focus Failure

Status Bits

O=FOCUS__SERVO__FAILURE

Pseudocode

```
GLIC__JB__CTRL__REG=JB__CART__LOADED; // Deassert.
send RESET__ATTN command
get REQ__STD__STAT;
get REQ__OPT__STAT;
if (ANY__ATTN__PENDING)
return (ATTN__DIDNT__CLEAR);
GLIC__JB__CTRL__REG &=~JB__CART__LOADED; // Assert.
```

The threshold for Out of Focus errors is programmable by the 80C188. When the focus signal exceeds the specified thresholds, the DSP will generate an aborting interrupt to the 80C188.

Write Fault

Status Bits

S=WRITE__FAULT__ERROR

Pseudocode

```
if medium not write protected
Set__not__rdy__mchg__attn ();
SuggSenseKey=NOT__READY;
SuggSenseCode=DRIVE__NOT__READY;
SuggSenseCodeQ=NO__SENSE__CODE__QUAL;
else
SuggSenseKey=MEDIUM__ERROR;
SuggSenseCode=WRITE__PROTECTED;
SuggSenseCodeQ=NO__SENSE__CODE__QUAL;
send RESET__ATTN command
get REQ__STD__STAT
get REQ__OPT__STAT;
if (ANY__ATTN__PENDING)
  return (ATTN__DIDNT__CLEAR);
```

Not On Track

Status Bits

O=NOT__ON__TRACK|WRITE__TERMINATED;

S=SEEK__FAULT;

Pseudocode

```
get DSP status
if Bad Seek and Focus Loop NOT Closed
download seek tables to DSP
send RESET__ATTN command
else
send RESET__ATTN command
if (S==SEEK__FAULT) or (O=WRITE__TERMINATED)
  send RECAL__DRIVE command
get REQ__STD__STAT
get REQ__OPT__STAT;
if (ANY__ATTN__PENDING)
  return (ATTN__DIDNT__CLEAR);
```

When a Bad Seek is reported by the DSP, the Drive Attention Handler should request the status from the DSP to determine whether a seek produced the error or whether the Velocity Table was missing. If the Bad Seek status bit is set and the "Focus Loop Not Closed" status bit is not set, this implies that the seek tables are not initialized properly. If only the Seek Fault status bit is set, the Drive Attention Handler will send a "Reset Attention" command to the DSP and indicate that the Seek Fault status bit is to be cleared. The 80C188 seek code will then need to restart from the Drive Attention registration point.

The threshold for Off-Track Errors is programmable by the 80C188. The thresholds can be set separately for reads or writes if the writing process needs to have higher constraints. When an Off-Track is detected, the DSP will use the "catastrophic" interrupt to terminate the drive operation. The Drive Attention Handler will issue a "Reset Attention" to the DSP.

Open Issue. The recovery mechanism is to allow the firmware to issue another seek command (thereby allowing the DSP to seek and then reacquire tracking). An alternative is to open the Tracking Loop and then command the DSP to reacquire tracking. This approach does not work for a failure mode when the seek has not settled and the head is "skating" across the disk. Therefore, the best recovery mechanism is to attempt another seek. Special code will be required to handle the case where the last seek fails with an Off-Track Error. Another seek would be the best recovery attempt.

Bias Magnet Failed

Status Bits

S=MAGNET_BIAS_FAILURE

Pseudocode

```
SuggSenseKey=HARDWARE_ERROR;
SuggSenseCode=INTERNAL_CONTROLLER_ERR;
SuggSenseCodeQ=ASCQ_MAGNET_FAILED;
send RESET_ATTN command
get REQ_STD_STAT
get REQ_OPT_STAT;
if (ANY_ATTN_PENDING)
   return (ATTN_DIDNT_CLEAR);
```

Spiral Mode: When all error conditions have been cleared, the Drive Attention Handler must return the drive to its original state for spiraling (otherwise known as track following or jumpbacks disabled). This is accomplished by saving the original state on entry and executing the code below on exit.

```
if ((WasSpiraling==0) &&!(S & MEDIUM_NOT_PRESENT) &&
!(S & SPINDLE_STOPPED))
SpiralMode (FALSE);
```

Drive Attention Notification: Drive Attentions produce interrupts to the Drive Attention Handler which takes the drive to a known condition. The Handler is then responsible for notifying the portion of the firmware responsible for managing the current operation that an attention condition existed and what was done to clear the condition. Two mechanisms are used to notify the firmware. These include messages and direct notification.

When a task has initiated an operation and is waiting for the SCSI ISR or the Disk ISR to send a message, the Drive Attention Handler will send a message to the task's queue to indicate that a Drive Attention occurred. Which task is currently responsible for an operation is maintained in a routing variable. When a portion of the firmware is executing which could generate a Drive Attention at any time (such as the seek code), continually polling the task's queue for a message would take too much overhead processing. The second mechanism for reporting Drive Attentions utilizes a "long jump" feature to take the code execution back to a place where the firmware knows how to restart an algorithm or attempt a retry. The process of identifying where to long jump to is referred to as registering. Multiple levels of registration can be performed, each new level saving the previous registration information on its local stack. When a section of code registers itself, the code can also identify a routine which the Drive Attention ISR will call to perform a context sensitive abort.

MEDIA FORMATS: Media Type Determination: The type of media will be identified using the following sequence of events:

a) A cartridge is inserted or already present when the drive powers up.

b) The 80C188 issues a spinup command for the 4x speed to the spindle motor.

c) The 80C188 issues a DSP command to notify when the RPM is greater than sixty RPM.

d) When the DSP interrupts with the RPM greater than sixty, the 80C188 issues a DSP command to notify when the RPM is greater than the 4x minimum RPM.

e) The 80C188 then issues a DSP command to initialize:

1) The DSP slowly finds the inside crash stop.
2) The DSP seeks towards the OD for (TBD) tracks.
3) The default is that Jump Backs are enabled and the direction is 4x.
4) If the DSP encounters an error during the initial seek, the error will be reported to the 80C188. The 80C188 will reset the DSP and then re-initialize.

f) The 80C188 attempts to read an ID for zone (TBD) for 4x corresponding to (TBD) tracks from the Inner Diameter.

g) If no ID can be read, the 80C188 attempts to read an ID using the frequencies for the neighboring zones, plus and minus (TBD) zones.

h) If no ID can be read, the 80C188 issues a 2x speed command to the spindle motor.

i) The 80C188 issues a DSP command to notify when the RPM is greater than the 2x minimum.

j) When the DSP interrupts with the RPM greater than 2x minimum, the 80C188 issues an initialization command to the DSP and then attempts to read an ID at zone (TBD) corresponding to (TBD) tracks.

k) If no ID can be read, the 80C188 attempts to read an ID using the frequencies for the neighboring zones, plus and minus (TBD) zones.

i) If no ID can be read, steps (h) through (k) for 1x.

m) If no ID can be read, the 80C188 issues a 2x speed command to the spindle motor.

n) The 80C188 issues a DSP command to notify when the RPM is less than the 2x maximum.

o) When the DSP interrupts with the RPM less than 2x maximum, the 80C188 attempts to read an ID by performing a frequency sweep. The sweep pattern will be: the default zone, zone-1, zone+1, zone-2, zone+2, etc, until all frequencies have been tried.

p) If no ID can be read, the 80C188 issues a 4x speed command to the spindle motor.

q) The 80C188 issues a DSP command to notify when the RPM is less than the 4x maximum.

r) When the DSP interrupts with the RPM less than 4x maximum, the 80C188 attempts to read an ID by performing a frequency sweep. The sweep pattern will be: the default zone, zone-1, zone+1, zone-2, zone+2, etc, until all frequencies have been tried.

AN ID HAS BEEN READ s) The 80C188 issues a seek command to position in the SFP area.

t) The 80C188 attempts to read the SFP data for 512-byte sectors. Failing to read the sector successfully, the 80C188 attempts to read the SFP data for 1024-byte sectors.

u) The 80C188 initializes the drive's media parameters for the media type and SFP information. A prewrite test flag is set to indicate that prewrite testing must be performed prior to writing to the media.

v) The 80C188 begins the initialization of the cartridge (i.e., reading the Defect Management Areas, building group tables, etc.) If any DMA must be rewritten to make it consistent with the other DMAs, the drive must check if prewrite testing should be performed first.

CCW (Pseudo-WORM) Support: The Blank Check functions of the Cirrus Logic SM330 will be used to determine if a 1x or 2x cartridge is unrecorded. The DMP field will not be used. The Blank Check functions of the External ENDEC will be used to determine if a 4x cartridge is unrecorded. The DMP field will not be used.

Whenever a CCW cartridge is inserted in the drive, the drive will automatically disable the Write Cache and clear the WCE (Write Cache Enable) field in Mode Page 08h, Caching Parameters. All initiators will be notified of the change on the next command from each initiator by issuing a CHECK CONDITION. The Sense Key/Sense Code combination returned in response to a Request Sense Command will be UNIT ATTENTION/MODE SELECT PARAMETERS CHANGED (06h/29h).

P-ROM Support: Open Issue. For P-ROM media, the PREFMT signal must be set when the head is over or within three tracks of a ROM area of the cartridge. The seek algorithm will need to take into account where the P-ROM areas are on the cartridge and may need to step through them. The DSP may be required to seek over a P-ROM area during its initialization. This initial seek will be performed at a low velocity to minimize the change for an Off-Track Error.

Retry Strategy: When the drive attempts to access the media for a read, erase, write, or verify operation, it may encounter media errors, correction errors, or other errors. The sources of media errors are: Sector Marks (SM), Sector IDS, Data Syncs (DS), or Resyncs (RS). The sources of correction errors are: Cyclical Redundancy Check (CRC) or Error Checking and Correction (ECC). The sources of other errors which the drive may encounter are: Format Sequencer errors, Drive Attentions, or Buffer RAM parity errors. For each of the media or correction errors, the drive validates the error against a threshold for the type of error and the type of operation. The thresholds are maintained in various Mode Pages which may be modified by the host. Table 16 below identifies the default thresholds which are used by the drive.

TABLE 16

| | Default Thresholds | | | |
|---|---|---|---|---|
| Threshold | 1×, 2× 512 BPS | 1×, 2× 1024 BPS | 4× 512 BPS | 4× 1024 BPS |
| Sector Mark | 4/5 Marks 3/4 Spaces | 4/5 Marks 3/4 Spaces | 4/5 Segments | 4/5 Segments |
| Sector IDs | | | | |
| Read | 2/3 | 2/3 | 2/3 | 2/3 |
| Erase, Write | 2/3 | 2/3 | 2/3 | 2/3 |
| Verify | 3/3 | 3/3 | 3/3 | 3/3 |
| Data Sync (DS) | 9/12 Groups | 9/12 Groups | 3/4 Groups | 3/4 Groups |
| Resync (RS) | 3 | 6 | 3 | 6 |
| ECC bytes in error per Sector | 15 | 30 | 15 | 30 |
| ECC bytes in error per Interleave | 3 | 6 | 3 | 6 |

When a media or correction error exceeds the current threshold or any other error defined above is encountered, the drive may attempt a retry of the operation as described in the remainder of this section. Retries are performed unless a sever error resulting in an unclearable condition or other aborting condition is encountered while attempting to access the data. In addition, retries are not performed if an internal debug flag, drvRetryDisable, is set. The drvRetryDisable flag is set or cleared via the SCSI Read/Write ESDI Command (E7h).

When the drive is performing a read operation, it will perform a maximum number of retries as identified in Mode Page 01h, Read/Write Error Recovery Parameters, Read Retry Count (Byte 3). When the drive is performing an erase or write operation, it will perform a maximum number of retries as identified in Mode Page 01h, Read/Write Error Recovery Parameters, Write Retry Count (Byte 8). When the drive is performing a verify operation, it will perform a maximum number of retries as identified in Mode Page 07h, Verify Error Recovery Parameters, Verify Retry Count (Byte 3).

If a sector cannot be read within the current thresholds, the drive may attempt to recover the sector using heroic means as described in the below section, Heroic Recovery Strategies. If the sector is recovered, the sector may be reallocated as described below in section, Reallocation Strategy.

Error Checking and Correction (ECC): Error Checking for a read or verify operation is performed in hardware in the Cirrus Logic SM330. Update vectors to correct any bytes in error are generated by the SM330 and transmitted to the SM331 via a dedicated serial link between the two chips. The CRC and ECC codes for a write operation are produced by the SM330.

Correction is not applied to a sector for a read operation when the Disable Correction (DCR) bit is set in Mode Page 01h Read/Write Error Recovery Parameters. ECC is also not applied to a sector for a read operation when the Enable Early Correction (EEC) bit is not set in Mode Page 01h Read/Vrite Error Recovery Parameters. If after all but one retries have failed with the EEC bit not set, the drive will automatically apply correction on the final retry, if DCR is not set. It is important to note that with the DCR bit set, ECC errors are still detected, but not corrected.

Heroic Recovery Strategies: The term Heroic Recovery is used to describe the process of using all possible means to recover the data from the media. The strategy is to selectively relax various thresholds and eventually recover the data intact. The absolute criteria for determining whether a sector has been recovered is whether the data can be corrected within the maximum thresholds established by the correction hardware. To minimize miscorrection, the media thresholds are relaxed in a progressive sequence (TBD).

Heroic Recovery is initiated if a sector cannot be read within the current thresholds and the Transfer Block (TB) bit or the Automatic Read Reallocation Enabled (ARRE) bit is set in Mode Page 01h, Read/Write Error Recovery Parameters. If the data for the sector is fully recovered and ARRE is enabled, the sector may be reallocated as described below in section, Reallocation Strategy.

The drive parameters which can be altered in an attempt to recover the data are, 1) PLL Bandwidth (normal, high, and very high), 2) Frequency Zone (expected zone-1, expected zone+1), 3) Pseudo Sector Mark, 4) Pseudo Data Sync, 5) Lock on First Resync (sector is not eligible for reallocation, may only be sent to host), and 6) (TBD).

Reallocation Strategy: Reallocation is the process of relocating the data for a logical sector to a new physical sector. A sector is reallocated 1) in response to a host request (SCSI Reassign Block Command, 07h), 2) when a sector cannot be read within the current thresholds, the sector was fully recovered, and the ARRE bit is set, 3) the sector cannot be erased or written using the current thresholds and the Automatic Write Reallocation Enabled (AWRE) bit is set in Mode Page 01h, Read/Write Error Recovery Parameters, or 4) the sector cannot be verified within the current thresholds as part of a SCSI Write and Verify Command.

Read Reallocation: When the data for a sector which exceeded read thresholds has been fully recovered and the ARRE bit is set, the drive will first attempt to rewrite the data to the same physical sector if the threshold exceeded was due to a Data Sync, Resync or ECC correction error. If the data for that same sector can now be verified within the thresholds defined in Mode Page 07H Verify Error Recovery Parameters, the sector will not be reallocated. Sectors which produced errors due to an error in the Sector Mark of ID fields or sectors which could not be correctly verified will be reallocated to a new physical sector.

When a new physical sector is required for relocating a logical sector, the drive will write the data (using the write thresholds) to a spare sector and then verify that sector (using the verify thresholds). If the sector cannot be written or verified using the current thresholds, another physical sector will be identified as the spare and the process repeated. A maximum of three spare sectors will be used in an attempt to reallocate a single logical sector.

Write Reallocation: A sector which fails to meet the Sector Mark threshold or the threshold for the number of valid Sector IDS as defined in Mode Page 01h, Read/Write Error Recovery Parameters, will be reallocated if the Automatic Write Reallocation Enabled (AWRE) bit is set.

When a new physical sector is required for relocating a logical sector, the drive will write the data (using the write thresholds) to a spare sector and then verify that sector (using the verify thresholds). If the sector cannot be written or verified using the current thresholds, another physical sector will be identified as the spare and the process repeated. A maximum of three spare sectors will be used in an attempt to reallocate a single logical sector.

Verify After Write Reallocation: A sector which fails to meet the verify thresholds as defined in Mode Page 07h, Verify Error Recovery Parameters, as part of a SCSI Write and Verify Command, will be reallocated. The ARRE and AWRE bits do not affect the decision to reallocate a sector which cannot be verified within the current thresholds as part of a SCSI Write and Verify Command.

When a new physical sector is required for relocating a logical sector, the drive will write the data (using the write thresholds) to a spare sector and then verify that sector (using the verify thresholds). If the sector cannot be written or verified using the current thresholds, another physical sector will be identified as the spare and the process repeated. A maximum of three spare sectors will be used in an attempt to reallocate a single logical sector.

SCSI Error Codes Returned: The following subsections describe the SCSI Sense Key/Sense Code/Additional Sense Code Qualifier (ASCQ) combinations for each of the conditions described in the above sections, Retry Strategy and following. The control bits which affect the drive's response and the SCSI Sense Key/Sense Code/ASCQ combination returned to the host are listed below in Table 17—Mode Page 01h, Error Recovery Parameters.

TABLE 17

Mode Page 01h, Error Recovery Parameters

| Bit | Name | Description |
|---|---|---|
| AWRE | Automatic Write Reallocation Enabled | The drive will perform automatic reallocation of defective blocks detected during write operations. |
| ARRE | Automatic Read Reallocation Enabled | The drive will perform automatic re-allocation of defective blocks detected during read operations. |

TABLE 17-continued

Mode Page 01h, Error Recovery Parameters

| Bit | Name | Description |
|---|---|---|
| TB | Transfer Block | The drive will transfer to the host a block which is recovered outside of thresholds. |
| RC | Read Continuous | The drive will transfer data without adding delays to perform error recovery. (Data may be fabricated to maintain continuous flow of data.) |
| EEC | Enable Early Correction | The drive will use error correction before retries. |
| PER | Post Error | The drive will report a Check Condition for blocks which are recovered through retries, correction, or reallocation. |
| DTE | Disable Transfer on Error | The drive will terminate the data transfer when an error is encountered. |
| DCR | Disable Correction | The drive will not use error correction for data error recovery. The drive will still detect ECC errors. |

Errors While Reallocating: While attempting to reallocate a logical sector to a new physical sector, the sense combinations in Table 18 will be reported by the drive if the indicated error condition is encountered.

TABLE 18

Error Codes Reported While Attempting to Reallocate a Sector

| Error Condition | Sense Key/Code/ASCQ | Data Returned |
|---|---|---|
| No spares available | 03/32/00 | Yes |
| Automatic Reallocation failed | 04/81/00 | Yes |
| Too many attempts to reallocate | 04/44/A6 | Yes |
| Defect List Error | 03/32/01 | Yes |

Automatic Reallocation is considered to fail when a hardware error or other server error precludes the drive from performing the reallocation. While performing the reallocation, the drive will make only three attempts to locate the logical sector to a new physical sector. If more than three attempts are required, the drive assumes that a hardware error has occurred. This approach limits the number of attempts to reallocate a sector and thereby minimizes the time taken to reallocate and minimizes the chance of consuming all available spares. If the drive can only write and verify a single Defect Management Area (DMA) on the disk, the drive will report a Defect List Error.

Read Error Codes: This section identifies the conditions which cause the drive to potentially report status back to the host while performing a read operation. Whether or not the status is actually reported depends upon whether the host issues a SCSI Request Sense Command.

The conditions can be broken down into five main categories which include, 1) attempting to locate the desired sector, 2) attempting to read the sector, 3) attempting to recover the sector with heroics, 4) attempting to reallocate the sector, and 5) Drive Attentions and other severe errors. Table 18 provides the sense combinations reported when reallocation fails, while above Table 8 provides the sense combinations reported for severe errors.

While attempting to locate the desired sector, the sense combinations in Table 19 will be reported by the drive if the indicated error type is encountered.

TABLE 19

Error Codes Reported While Locating the Desired Sector

| Error Condition | Sense Key/Code/ASCQ | Data Returned |
|---|---|---|
| Sector Mark Threshold | 03/01/00 | No |
| ID Threshold (Bad CRC) | 03/10/00 | No |
| ID Threshold (No Address Mark) | 03/12/00 | No |

While attempting to read the sector, the sense combinations in Table 20 will be reported by the drive if the indicated error type is encountered, ARRE is not set, and the data cannot be recovered within thresholds while performing retries. If all retries are exhausted and the data has not been recovered, the drive will perform heroic recovery if the TB bit is set. The data will then be returned to the host whether or not the data was fully recovered. If recovered fully, the data is not reallocated to a new sector.

TABLE 20

Error Codes Reported While Attempting to Read, ARRE is Not Set

| Error Condition | Sense Key/Code/ASCQ | Data Returned |
|---|---|---|
| Data Sync Threshold | 03/13/00 | If TB = 1 |
| Resync Threshold | 03/11/07 | If TB = 1 |
| ECC Error Threshold | 03/11/0C | If TB = 1 |
| Uncorrectable ECC Error | 03/11/02 | If TB = 1 |

While attempting to read the sector, the sense combinations in Table 21 will be reported by the drive for the condition described if DCR is set and the data is able to be recovered within thresholds while performing retries or heroics. If the data cannot be recovered through heroics, the error codes returned are those listed above in Table 20. If the data is fully recovered and ARRE is set, the drive will attempt to reallocate the logical sector to a new physical sector.

TABLE 21

Error Codes Reported While Performing Read Retries, DCR is Set

| Error Condition | Sense Key/ Code/ASCQ | Data Returned |
|---|---|---|
| No retries required. No ECC used | 00/00/00 | Yes |
| Retries required. No ECC used | 01/17/01 | Yes |
| Heroics required. No ECC used. Auto Reallocation was performed (ARRE = 1) | 01/17/06 | Yes |
| Heroics required. No ECC used. Auto Reallocation recommended (ARRE = 0) | 01/17/07 | If TB = 1 |
| Heroics required. No ECC used. Rewrite for Auto Reallocation was successful | 01/17/09 | Yes |

While attempting to read the sector, the sense combinations in Table 22 will be reported by the drive for the condition described if DCR is not set and the data is able to be recovered within thresholds while performing retries or heroics. If the data cannot be recovered through heroics, the error codes returned are those listed above in Table 20. If the data is fully recovered and ARRE is set, the drive will attempt to reallocate the logical sector to a new physical sector.

TABLE 22

Error Codes Reported While Performing Read Retries, DCR Not Set

| Error Condition | Sense Key/ Code/ASCQ | Data Returned |
|---|---|---|
| No retries required. No ECC used | 00/00/00 | Yes |
| No retries required. ECC required (within thresholds) | 01/18/00 | Yes |
| Retries required. ECC required (within thresholds) | 01/18/01 | Yes |
| Heroics required. Auto Reallocation was performed (ARRE = 1) | 01/18/02 | Yes |
| Heroics required. Auto Reallocation recommended (ARRE = 0) | 01/18/05 | If TB = 1 |
| Heroics required. Rewrite for Auto Reallocation was successful | 01/18/07 | Yes |

Read Error Reporting: This section describes the logic used by the firmware to determine when to set a specific sense combination, when to report the error via a Check Condition, and when to return the data.

Read Operation

```
Do_seek:
    seek to desired sector
    if seek error
        abort with 04/15
        (RANDOM POSITIONING ERROR)
    init read retry count from Mode Page 01h
    if DCR is set or EEC is set
        set to detect ECC errors but not correct
    if RC is set
        if 1x or 2x mode
            set RC mode in SM330
        else
            set RC mode in SM330
            set to ignore ID errors, RS errors, and DS errors
    (Comment: wait for hardware to indicate sector has been read
    or that there was an error.)
Wait_for_msg:
    wait for msg from ISR
    if no error
        if recovered from retry
            if PER is set
```

-continued

```
                set Check Condition
                if DCR is set
                    set sense to 01/17/01
                    (RECOVERED DATA WITH ERROR CORRECTION & RETRIES)
            if DTE is set
                set to return all blocks read
                do not continue after this block
        queue data for SCSI
        if new seek required
            goto Do_seek
        else if more to do
            goto Wait_for _msg
        else
            return to caller
else
    decrement read retry count
    if no more retries
        if (TB is set or ARRE is set,
            and not physical access, and not read long)
            perform Heroic Recovery
            if successful
                if PER is set
                    Set Check Condition
                if DCR is set
                set sense to 01/17/07
                (RECOVERED DATA WITHOUT ECC,
                RECOMMEND REASSIGNMENT)
            else
                set sense to 01/18/05
                (RECOVERED DATA, RECOMMEND REASSIGNMENT)
        if TB is set
            set to return fully recovered block
            If ARRE is not set
                goto Report_error
        if ARRE is set
            attempt to reallocate
            if rewrite of same sector was successful
                if PER is set
                    if DCR is set
                        set sense to 01/17/09
                        (RECOVERED DATA WITH RETRIES AND/OR
                        ECC, REWRITE OF DATA WAS SUCCESSFUL)
                    else
                        set sense to 01/18/07
                        (RECOVERED DATA WITH RETRIES & ECC,
                        REWRITE OF DATA WAS SUCCESSFUL)
            else if reallocation was successful
                if PER is set
                    set Check Condition
                    if DCR is set
                        set sense to 01/17/06
                        (RECOVERED DATA WITHOUT ECC,
                        AUTO REALLOCATION PERFORMED)
                    else
                        set sense to 01/18/02
                        (RECOVERED DATA WITHOUT ECC,
                        AUTO REALLOCATION PERFORMED)
            else
                set Check Condition
                if no spares available
                    set sense to 03/32
                    (NO DEFECT SPARE LOCATION AVAILABLE)
                if automatic reallocation failed
                    set sense to 04/81
                if too many attempts to reallocate
                    set sense to 04/44/A6
                    (RELOCATION LIMIT REACHED)
                if Defect List could not be written
                    set sense to 03/32/01
                    (DEFECT LIST UPDATE FAILURE)
else
    set Check Condition
    if TB is set
            set to return partially recovered block
        goto Report_error
    else
        do not return block
        set Check Condition
        goto Report_error
```

-continued

```
   else
      if PER is set
         set Check Condition
         if DCR is set
            set sense to 01/17/01
            (RECOVERED DATA WITH RETRIES)
         else
            set sense to 01/18/01
            (RECOVERED DATA WITH ERROR CORRECTION & RETRIES)
      prepare to retry the block
      if last retry and EEC is set
         set to use ECC correction
      goto Setup_for_read
Report_error:
   if Sector Mark Threshold error
      set sense to 03/01
      (NO INDEX/SECTOR SIGNAL)
   if ID CRC error
      set sense to 03/10
      (ID CRC OR ECC ERROR)
   if ID Threshold error
      set sense to 03/12
      (ADDRESS MARK NOT FOUND FOR ID FIELD)
   if Data Sync Threshold error
      set sense to 03/13
      (ADDRESS MARK NOT FOUND FOR DATA FIELD)
   if Resync Threshold error
      set sense to 03/11/07
      (DATA RESYNCHRONIZATION ERROR)
   if ECC Threshold error
      set sense to 03/11/0C
      (UNRECOVERED READ ERROR, RECOMMEND REWRITE THE DATA)
   if Uncorrectable ECC error
      set sense to 03/22/02
      (ERROR TOO LONG TO CORRECT)
   return to caller
```

Verify Error Codes: This section identifies the conditions which cause the drive to potentially report status back to the host while performing a verify operation in response to a SCSI Verify Command. Whether or not the status is actually reported depends upon whether the host issues a SCSI Request Sense Command.

The conditions can be broken down into three main categories which include, 1) attempting to locate the desired sector, 2) attempting to verify the sector, and 3) Drive Attentions and other severe errors. Above Table 8—Severe Errors, provides the sense combinations reported for severe errors.

While attempting to locate the desired sector, the sense combinations previously listed in Table 19 will be reported by the drive if the indicated error type is encountered. While attempting to verify the sector, the sense combinations previously listed in Table 20 will be reported by the drive if the indicated error type is encountered. With a verify operation, however, no data will actually be returned to the host. By definition, heroics are never performed during the verify operation. The intent is to verify that the data can be read using the (potentially) more stringent thresholds of Mode Page 07h, Verify Error Recovery Parameters. No automatic reallocation of sectors is performed in response to a sector which cannot be verified at the current thresholds. (Note: Automatic reallocation may be performed during a verify after write operation which is initiated through an entirely different SCSI command.)

Verify Error Reporting: This section describes the logic used by the firmware to determine when to set a specific sense combination, when to report the error via a Check Condition, and when to return the data.

```
Verify Operation
   seek to desired sector
   if seek error
      abort with 04/15
      (RANDOM POSITIONING ERROR)
Setup_for_verify:
   init verify retry count from Mode Page 07h
   if DCR is set
      set to detect ECC errors but not correct
   (Comment: wait for hardware to indicate sector has been read
   or that there was an error.)
Wait_for_msg:
   wait for msg from ISR
   if no error
      if recovered from retry
```

-continued

```
        if PER is set
            set Check Condition
            if DCR is set
                set sense to 01/17/01
                (RECOVERED DATA WITH RETRIES)
            else
                Set sense to 01/18/01
                (RECOVERED DATA WITH ERROR CORRECTION APPLIED)
        if DTE is set
            do not continue after this block
if new seek required
    goto Setup_for_verify
else if more to do
    goto Wait_for_msg
else
    return to caller
else
    decrement verify retry count
    if no more retries
        set Check Condition
        goto Report_error (same as Read Operation)
    else
        if PER is set
            set Check Condition
            if DCR is set
                set sense to 01/17/01
                (RECOVERED DATA WITH RETRIES)
            else
                set sense to 01/18/01
                (RECOVERED DATA WITH ERROR CORRECTION APPLIED)
        prepare to retry the block
        goto Setup_for_verify
```

Write Error Codes: This section identifies the conditions which cause the drive to potentially report status back to the host while performing a write operation. Whether or not the status is actually reported depends upon whether the host issues a SCSI Request Sense Command.

The conditions can be broken down into four main categories which include, 1) attempting to locate the desired sector, 2) attempting to write the sector, 3) attempting to reallocate the sector, and 4) Drive Attentions and other severe errors. Above Table 18—Error Codes Reported While Attempting to Reallocate a Sector, provide the sense combinations reported when reallocation fails, while Table 8—Severe Errors shows the sense combinations reported for severe errors.

While attempting to locate the desired sector, the sense combinations previously listed in Table 19 will be reported by the drive if the indicated error type is encountered. While attempting to write the sector, the sense combinations shown below in Table 23 will be reported by the drive if the indicated error type is encountered.

TABLE 23

Error Codes Reported While Performing Write Operations

| Error Condition | Sense Key/Code/ASCQ |
|---|---|
| No retries required | 00/00/00 |
| Retries required | 01/0C/00 |
| Auto Reallocation was performed (AWRE = 1) | 01/0C/01 |
| Auto Reallocation recommended (AWRE = 0) | 03/0C/00 |

Write Error Reporting: This section describes the logic used by the firmware to determine when to set a specific sense combination, when to report the error via a Check Condition, and when to return the data.

```
Write Operation

    seek to desired sector
    if seek error
        abort with 04/15
        (RANDOM POSITIONING ERROR)
    (Comment: setup section)
Setup_for_write:
    init write retry count from Mode Page 01h
    (Comment: wait for hardware to indicate sector has been
    written or that there was an error.)
Wait_for_msg:
    wait for msg from ISR
    if no error
        if recovered from retry
            if PER is set
                set Check Condition
```

-continued

```
                set sense to 01/0C/00
                (RECOVERED WRITE ERROR)
            if DTE is set
                do not continue after this block
        if new seek required
            goto Setup_for_write
        else if more to do
            goto Wait_for_msg
        else
            return to caller
    else
        decrement write retry count
        if no more retries
            if AWRE is set, not physical access, not write long
                attempt to reallocate
                if reallocation was successful
                    if PER is set
                        set Check Condition
                            set sense to 01/0C/01
                            (WRITE ERROR RECOVERED WITH AUTO
                            REALLOCATION)
                else
                    set Check Condition
                    if no spares available
                        set sense to 03/32
                        (NO DEFECT SPARE LOCATION AVAILABLE)
                    if automatic reallocation failed
                        set sense to 04/81
                        (AUTO REALLOCATION FAILED)
                    if too many attempts to reallocate
                        set sense to 04/44/A6
                        (RELOCATION LIMIT REACHED)
                    if Defect List could not be written
                        set sense to 03/32/01
                        (DEFECT LIST UPDATE FAILURE)
        else
            set Check Condition
            goto Report_error
    else
        if PER is set
            set Check Condition
            set sense to 01/0C/00
            (RECOVERED WRITE ERROR)
        prepare to retry the block
        goto Setup_for_Write
```

Verify After Write Error Codes: This section identifies the conditions which cause the drive to potentially report status back to the host while performing a verify after write operation. Whether or not the status is actually reported depends upon whether the host issues a SCSI Request Sense Command.

The conditions can be broken down into four main categories which include, 1) attempting to locate the desired sector, 2) attempting to verify the sector, 3) attempting to reallocate the sector, and 4) Drive Attentions and other severe errors. Above Table 18—Error Codes Reported While Attempting to Reallocate a Sector, presents the sense combinations reported when reallocation fails, while Table 8—Severe Errors, provides the sense combinations reported for severe errors.

While attempting to locate the desired sector, the sense combinations previously listed in Table 19 will be reported by the drive if the indicated error type is encountered. While attempting to verify the sector, the sense combinations previously listed in Table 20 will be reported by the drive if the indicated error type is encountered.

Verify After Write Error Reporting: This section describes the logic used by the firmware to determine when to set a specific sense combination, when to report the error via a Check Condition, and when to return the data.

```
Verify After Write Operation

    seek to desired sector
    if seek error
            abort with 04/15
            (RANDOM POSITIONING ERROR)
        (Comment: setup section)
Setup_for_verify:
    init verify retry count from Mode Page 07h
    if DCR is set
```

-continued

```
        set to detect ECC errors but not correct
    (Comment: wait for hardware to indicate sector has been read
    or that there was an error.)
Wait__for__msg:
    wait for msg from ISR
    if no error
        if recovered from retry
            if PER is set
                set Check Condition
                if DCR is set
                    set sense to 01/17/01
                    (RECOVERED DATA WITH RETRIES)
                else
                    set sense to 01/18/01
                    (RECOVERED DATA WITH ECC & RETRIES APPLIED)
            if DTE is set
                do not continue after this block
        if new seek required
            goto Setup__for__verify
        else if more to do
            goto Wait__for__msg
        else
            return to caller
    else
        decrement read retry count
        if no more retries
        attempt to reallocate
        if rewrite of same sector was successful
            if PER is set
                if DCR is set
                    set sense to 01/17/09
                    (RECOVERED DATA WITH RETRIES AND/OR
                    ECC, REWRITE OF DATA WAS SUCCESSFUL)
                else
                    set sense to 01/18/07
                    (RECOVERED DATA WITH RETRIES & ECC,
                    REWRITE OF DATA WAS SUCCESSFUL)
        else if reallocation was successful
            if PER is set
                set Check Condition
                if DCR is set
                    set sense to 01/17/06
                    (RECOVERED DATA WITH ECC,
                    AUTO REALLOCATION PERFORMED)
                else
                    set sense to 01/18/02
                    (RECOVERED DATA WITH ECC,
                    AUTO REALLOCATION PERFORMED)
        else
            set Check Condition
            if no spares available
                set sense to 03/32
                (NO DEFECT SPARE LOCATION AVAILABLE)
            if automatic reallocation failed
                set sense to 04/81
                (AUTO REALLOCATION FAILED)
            if too many attempts to reallocate
                set sense to 04/44/A6
                (RELOCATION LIMIT REACHED)
            if Defect List could not be written
                set sense to 03/32/01
                (DEFECT LIST UPDATE FAILURE)
    else
        if PER is set
            set Check Condition
            if DCR is set
                set sense to 01/17/01
                (RECOVERED DATA WITH RETRIES)
            else
                set sense to 01/18/01
                (RECOVERED DATA WITH ECC & RETRIES APPLIED)
        prepare to retry the block
        goto Set__for__verify
```

Defect Management Areas: This section is TBD. The following are notes and questions which will be used during the definition of this section. Reading DMAs: Which thresholds to use is a matter of design. How many retries. Comparing/Updating DMAs: How many must be good. When are they rewritten. Announcing "Approaching End of Life" and "End of Life". Each of these matters are design considerations which would not effect one of skill in the art from practicing the present invention as herein enabled and disclosed. Building DMA data structures to support: Sector Slipping, Linear Replacement.

Seek Tables for Different Media: The firmware will download to the DSP the appropriate velocity table for the type of media which is detected to be installed in the drive. A default (i.e., conservative) velocity table will be used until the media type has been determined.

DRIVE COMMAND INTERFACE: The Drive Command Interface is the software interface that provides access to the drive's hardware platform. Access to the SCSI interface, Format Sequencer, ENDEC, and External ENDEC is performed as direct access to those components and not through the Drive Command Interface. All other components are accessed using the Drive Commands defined in the following section.

Drive Commands: The Drive Commands used by the Jupiter firmware are listed in Table 24 below. The column for Type defines whether the Drive Command is immediate (I), performed by the 80C188 (188), or performed by the DSP (DSP). An Immediate Command results in a flag or bit being set and does not require any CPU time to process or monitor the operation. An Immediate Command indicates that the command is complete immediately. The below section, Drive Command Completion, provides further detail relating hereto. A 188 Command type indicates that additional processing is required by the 80C188 to satisfy the request. Additional monitoring may be required to validate that the hardware has reached the desired state. The command is indicated as complete when the processing or monitoring has completed. A DSP Command type indicates that a command must be sent to the DSP to satisfy the Drive Command. The command is indicated as complete when the DSP returns status for its command.

TABLE 24

Drive Commands

| Code | Name | Description | Type |
|---|---|---|---|
| 0x0000 | SET_EE_ADDR | Set EEPROM address. | I |
| 0x0100 | READ_EEPROM | Read EEPROM (at current address). | 188 |
| 0x0200 | SET_JUMP_BACK_IN | Set to jumpback towards ID. | DSP |
| 0x0300 | SET_JUMP_BACK_OUT | Set to jumpback towards OD. | DSP |
| 0x0400 | JUMP_BACK_ENABLE | Enable Jumpbacks. | I |
| 0x0500 | JUMP_BACK_DISABLE | Disable Jumpbacks. | I |
| 0x0600 | | | |
| 0x0700 | DISABLE_EEWR | Disable EEPROM write function. | (TBD) |
| 0x0800 | REQ_STATUS | Request DSP status. | DSP |
| 0x0900 | SET_LASER_THOLD | Set Laser Read Power Threshold. | DSP |
| 0x0A00 | SET_FOCUS_THOLD | Set DSP Focus Threshold. | DSP |
| 0x0B00 | SET_TRACK_THOLD | Set DSP Tracking Threshold. | DSP |
| 0x0C00 | SET_SEEK_THOLD | Set DSP Seek Threshold. | DSP |
| 0x0D00 | SET_SPIN_THOLD | Set Spindle RPM thresholds. | DSP |
| 0x0E00 | BIAS_TEST | Perform Bias Magnet Test. | 188 |
| 0x0F00 | READ_DSP_REV | Get DSP firmware revision. | DSP |
| 0x1000 | WRITE_EEPROM | Write EEPROM (at current address). | 188 |

TABLE 24-continued

Drive Commands

| Code | Name | Description | Type |
|---|---|---|---|
| 0x2000 | REQ_STD_STAT | Request Standard Status. | 188, DSP |
| 0x2900 | REQ_OPT_STAT | Request Optical Status. | 188, DSP |
| 0x4400 | SET_MAG_READ | Set Bias Magnet, freq., for reading. | 188 |
| 0x4800 | SET_MAG_ERASE | Set Bias Magnet, freq., for erasing. | 188 |
| 0x4C00 | SET_MAG_WRITE | Set Bias Magnet, freq., for writing. | 188 |
| 0x5000 | RESET_ATTN | Reset the Drive Attention. | DSP |
| 0x5100 | RECAL_DRIVE | Recalibrate the drive. | (TBD) |
| 0x5200 | STOP_SPINDLE | Stop the spindle. | 188, DSP |
| 0x5300 | START_SPINDLE | Start the spindle. | 188, DSP |
| 0x5400 | LOCK_CART | Lock the cartridge. | I |
| 0x5500 | UNLOCK_CART | Unlock the cartridge. | I |
| 0x5600 | EJECT_CART | Eject the cartridge. | 188, DSP |
| 0x5B00 | SEEK_COMP_OFF | Set Seek Compensation on. | (TBD) |
| 0x5B01 | SEEK_COMP_ON | Set Seek Compensation off. | (TBD) |
| 0x5F00 | SLCT_GCR_FRQ_SET | Select a set of frequencies. | I |
| 0x6700 | ALLOW_ATTN_CLEAR | | (TBD) |
| 0x6800 | READ_DRV_RAM | Read RAM in DSP. | DSP |
| 0x6A00 | NORMAL_PLL_BWIDTH | Set PLL Bandwidth to normal. | I |
| 0x6A01 | HGH_PLL_BWIDTH | Set PLL Bandwidth to high. | I |
| 0x6A02 | VHGH_PLL_BWIDTH | Set PLL Bandwidth to very high. | I |
| 0x7000 | SET_LWP_RAM | Set Laser Write Power in RAM. | I |
| 0x8000 | SEEK_BACKWARD | Seek towards ID. | DSP |
| 0xC000 | SEEK_FORWARD | Seek towards OD. | DSP |

Drive Commands are one or two word commands which request that some function be performed by either the 80C188 or be passed on to the DSP. The Drive Command code is responsible for maintaining the protocol with the DSP and determining when a command has been completed. In some cases when the 80C188 is performing the function, the command is immediately identified as being complete. In other cases, a delay is required while the hardware is allowed to settle (e.g., in the case of turning on the bias magnet). In the cases where the 80C188 commands the PSP to perform a function, the 80X188 must wait for the DSP to indicate that the command has completed. See below section, Drive Command Completion, for a more detailed discussion of completing commands. The high word for the two-word commands is placed in the variable esdi_cmd. The low word is placed in the variable esdi_cmd2. The commands which only use a single word still use esdi_cmd. These variables are global variables and must be setup before the call to the Drive_cmd function.

Drive Command Descriptions: The following subsections provide a more detailed description of the Drive Commands.

SET_EE_ADDR: The Set EEPROM Address command is used to identify the address for the next NVRAM operation. The address is set first, and then followed by a READ_EEPROM or a WRITE_EEPROM command, as discussed below.

READ_EEPROM: The Read EEPROM command reads the data current stored in the NVRAM from the location previously identified using the SET_EE_ADDR command.

SET_JUMP_BACK_IN: The Set Jumpbacks In Command identifies to the DSP that the media spirals towards the ID and therefore that a jumpback should perform a one track seek towards the ID. Ajumpback is performed once per revolution to maintain the optical over the same physical track.

SET_JUMP_BACK_OUT: The Set Jumpbacks Out Command identifies to the DSP that the media spirals towards the OD and therefore that a jumpback should perform a one track seek towards the OD. A jumpback is performed once per revolution to maintain the optical over the same physical track.

JUMP_BACK_ENABLE: The Jumpback Enable Command informs the DSP that jumpbacks should be performed in order to maintain the current optical head position over the media.

JUMP_BACK_DISABLE: The Jumpback Disable Command informs the DSP that jumpbacks should not be performed and that the optical head should be allowed to follow the spiral of the media.

DISABLE_EEWR: This section is TBD.

REQ_STATUS: The Request Status Command requests the current status from the DSP.

SET_LASER_THOLD: The Set Laser Read Threshold Command sets the acceptable range for the laser read power signal. If the read power exceeds the threshold, the DSP issues an aborting interrupt.

SET_FOCUS_THOLD: The Set Focus Threshold Command sets the acceptable range for the focus error signal. If the focus error signal exceeds the threshold, the DSP issues an aborting interrupt.

SET_TRACK_THOLD: The Set Tracking Threshold Command sets the acceptable range for the tracking error signal. If the tracking error signal exceeds the threshold, the DSP issues an aborting interrupt.

SET_SEEK_THOLD: This section is TBD.

SET_SPIN_THOLD: The spindle speed needs to be monitored to ensure that data is written to the media and can be later recovered. The spindle speed is monitored by the DSP against a minimum and maximum RPM specified with this command. If the spindle speed drops below the minimum or exceeds the maximum, the DSP generates an aborting interrupt.

The monitoring function allows the Drive Command interface to detect when a cartridge has come up to speed as well as when a cartridge fails to maintain the correct speed. By setting the minimum RPM to zero and the maximum to the lower RPM for the media's nominal range, the DSP will interrupt the 80C188 when the cartridge is actually up to speed. Once up to speed, the 80C188 issues a new range to the DSP specifying the minimum and maximum RPM for the media's nominal range. A minimum RPM of zero indicates that no check should be performed on the minimum RPM.

BIAS_TEST: The Bias Test Command requests that the bias magnet be tested. The actual steps taken during the test are described below in section, B. POST Definition, Bias Magnet Test.

READ_DSP_REV: The Read DSP Firmware Revision Command requests the firmware revision level from the DSP.

WRITE_EEPROM: The Write EEPROM command writes a byte of data to the NVRAM at the location previously identified using the SET_EE_ADDR command, as described above.

REQ_STD_STAT: The Request Standard Status Command requests the ESDI Standard Status. The status provided includes status for the drive and status from the DSP.

REQ_OPT_STAT: The Request Optical Status Command requests the ESDI Optical Status. The status provided includes status for the drive and status from the DSP.

SET_MAG_READ: The Set Magnet Read Command prepares the drive for a read operation. The bias commands are described below in section Magnet Bias, Laser Power, and PLL Frequency Command.

SET_MAG_ERASE: The Set Magnet Erase Command prepares the drive for an erase operation. The bias commands are described below in section Magnet Bias, Laser Power, and PLL Frequency Command.

SET_MAG_WRITE: The Set Magnet Write Command prepares the drive for a write operation. The bias commands are described below in section Magnet Bias, Laser Power, and PLL Frequency Command.

RESET_ATTN: The Reset Attention Command instructs the DSP to reset the status bits which it has set to indicate the error conditions which generated the Drive Attention interrupt to the 80C188.

RECAL_DRIVE: This section is TBD.

STOP_SPINDLE: The Stop Spindle command opens the servo loops and spins the cartridge down. The Drive Command code first instructs the DSP to open the servo loops for the laser, focus, and tracking. The spindle RPM is then set to zero and the brake is applied. After (TBD) seconds, the brake is removed and the firmware verifies that the spindle has sufficiently slowed down to (TBD) RPM. Once the spindle has slowed down, the firmware will reapply the brake and delay for (TBD) milliseconds for the cartridge to stop. The time to wait for the initial spin down and the time to wait for the spindle to stop will be dependent upon whether the cartridge is plastic or glass. The firmware will monitor the time to spin the cartridge up in order to determine the type of media installed. The SET_SPIN_THOLD command, see above, will be used to monitor the spindle RPM rate.

START_SPINDLE: The Start Spindle Command is responsible for spinning the cartridge up, validating that the cartridge attains the correct RPM, and then requesting that the DSP perform its initialization with the cartridge. Monitoring the spindle RPM is accomplished using the SET_SPIN_THOLD command, as discussed above.

The spinup is a two-step process which includes: 1) the spindle threshold is set to monitor the RPM until the cartridge gets to the minimum RPM for a particular media type, and then 2) the spindle threshold is set to monitor the RPM for the nominal RPM range for the media. If the cartridge spinup takes too long, the firmware should spin the cartridge down and return an error code (TBD). The drive must not eject the cartridge.

A timer will be used to measure the amount of time required to bring the media up to the 4x (default) RPM. The time required to spinup the cartridge will indicate whether the media is plastic or glass. Once identified, the STOP_SPINDLE command will use an appropriate timeout based on the cartridge type.

Once the cartridge has reached the RPM, the firmware will issue an initialize command to the DSP. At that time, the DSP will attempt to close all its servo loops.

LOCK_CART: The Lock Cartridge Command sets a flag which causes any subsequent requests to eject the cartridge to be denied.

UNLOCK_CART: The Unlock Cartridge Command clears a flag and allows subsequent requests to eject the cartridge to be honored.

EJECT_CART: The Eject Cartridge Command spins down a cartridge, if it is currently spinning, the eject the cartridge. The steps taken to spin down the cartridge are the same steps taken for the STOP_SPINDLE command, as described above. Once spun down, the firmware issues an eject cartridge command to the DSP.

SEEK_COMP_OFF: This section is TBD.

SEEK_COMP_ON: This section is TBD.

SLCT_FRO_SET: The Select Frequency Set Command selects a set of frequencies. Each media format requires a different set of frequencies for media recording. The Bias Magnet Command, see below, is used to select one frequency from the set identified with this command.

ALLOW_ATTN_CLEAR: This section is TBD.

READ_DRV_RAM: This section is TBD.

NORMAL_PLL_BWIDTH: This section is TBD.

HGH_PLL_BWIDTH: This section is TBD.

VHGH_PLL_BWIDTH: This section is TBD.

SET_LWP_RAM: The Set Laser Write Power RAM Command sets the laser write power value for a specific laser power zone. This command allows the drive during diagnostics to modify the write power which would be used during the next erase or write operation performed in the specified power zone.

SEEK_BACKWARD: The format for the Seek Backward Command is presented below in section, Seek Command.

SEEK_FORWARD: The format for the Seek Forward Command is presented below in section, Seek Command.

Seek Command: The format for the two-word seek command appears below in Table 25.

TABLE 25

Seek Command

| | | |
|---|---|---|
| hi_wd: | bit 15 | Seek Command = 1 |
| | bit 14 | Direction Bit (1 = "OD", 0 = "ID") |
| | bit 13–0 | Unused |
| lo_wd: | bit 15–0 | Number of tracks to seek |

For the Seek Command, "OD" is defined as the direction towards the OD or away from the spindle motor. "ID" is defined as the direction towards ID or towards the spindle motor. The thresholds for the DSP to use while seeking must be set separately prior to issuing the seek command. The seek thresholds are set using the SET_SEEK_THOLD command.

Magnet Bias, Laser Power, and PLL Frequency Command: The Bias Command is responsible for setting up the hardware to enable the drive to read, erase, or write at a specific location on the media. The format for the one_word Bias Command is shown in Table 26 below.

TABLE 26

Bias, Laser Power, and Frequency Command

| | | | |
|---|---|---|---|
| hi_wd: | bit 15–12: | Bias Command | = 0100 |
| | bit 11–10: | MO bias | 01 = read |
| | | | 10 = erase |
| | | | 11 = write |
| | bit 9: | "seek to follow" | = 1 |
| | bit 8–0 | Zone (Laser Power and Freq.) | |
| lo_wd: | bit 15–0: | Unused | |

In order to read, erase, or write at a specific location on the media, the Drive Command code must setup the magnet bias, the laser write power levels (for 2x and 4x only), the PLL frequency, and the DSP focus and tracking thresholds. When the command is to prepare for an erase or write operation, the Drive Command code must also verify that the bias magnet is drawing current between (TBD)V and (TBD)V within (TBD) milliseconds. The serial ADC will be used to sample the current which the bias magnet is drawing. The DSP focus and tracking thresholds to be used during a read, erase, or write operation must be set separately prior to the operation. The SET_FOCUS_THOLD and SET_TRACK_THOLD commands are used to set these thresholds.

There is only one frequency band for 1x media and there are no Laser Power Write Zones as writing is not supported for 1x. The number of Laser Power Write Zones for 2x will be equal to the number of bands (i.e., 16 zones). The number of Laser Power Write Zones for 4x will be equal to the number of bands (i.e., 30 bands for media formatted with 512-byte sectors and 34 bands for media formatted with 1024-byte sectors).

Drive Command Status: The status available from the Drive Command Interface is based on a modified ESDI interface, as used with the RMD-5000 series products. The status bits reflect the actual state of the hardware, error conditions from the DSP, or a state being managed by the firmware. The status is provided in two 16-bit words, commonly referred to as Standard Status and Optical Status. The definition of the status words and the source of the status are listed in Table 27—ESDI Standard Status and Table 28—ESDI Optical Status below.

TABLE 27

ESDI Standard Status

| Standard Status | Bit | Source of Status |
|---|---|---|
| (Reserved) | 15 | (not used) |
| MEDIUM_NOT_PRESENT | 14 | FW maintained |
| WRITE_PROTECT | 13 | FW maintained |
| OROM_MEDIA | 12 | FW maintained |
| (Reserved) | 11 | (not used) |
| (Reserved) | 10 | (not used) |
| SPINDLE_STOPPED | 9 | FW maintained |
| POWER_ON_CONDITION | 8 | (not used) |
| ESDI_CMD_PTY_FLT | 7 | from DSP |
| ESDI_INTERFACE_FLT | 6 | FW maintained |
| ESDI_INVALID_CMD | 5 | from DSP |
| SEEK_FAULT | 4 | from DSP |
| MAGNET_BIAS_FAILURE | 3 | FW maintained |
| MAX_LASER_POWER_EXCEEDED | 2 | (not used) |
| WRITE_FAULT_ERROR | 1 | (TBD) |
| CARTRIDGE_CHANGED | 0 | from GLIC |

TABLE 28

ESDI Optical Status

| Standard Status | Bit | Source of Status |
|---|---|---|
| DRIVE_INIT_FAULURE | 15 | (not used) |
| NOT_ON_TRACK | 14 | from DSP |
| CART_LOAD_FAILURE | 13 | from DSP |
| SPINDLE_SPEED_FAILURE | 12 | from DSP |
| FOCUS_SERVO_FAILURE | 11 | from DSP |
| (Reserved) | 10 | (not used) |
| (Reserved) | 9 | (not used) |
| LASER_DRIVE_FAILURE | 8 | from DSP |
| CARTRIDGE_REJECTED | 7 | (not used) |
| CARTRIDGE_INIT_FAILURE | 6 | from DSP |
| DRIVE_HARDWARE_FAILURE | 5 | (not used) |
| WRITE_TERMINATED | 4 | (TBD) |
| EJECT_REQUEST | 3 | from GLIC |
| ERASE_BIAS_IS_ON | 2 | FW maintained |
| WRITE_BIAS_IS_ON | 1 | FW maintained |
| DC_POWER_FAILURE | 0 | (not used) |

Serial Drive Control Interface: The Drive Command Interface provides a common mechanism to programming the various serial devices in the Jupiter hardware. Serial devices have been selected for spindle motor control, ADC, read channel components, and the NVRAM. The serial interface is transparent to the firmware. The Drive Command firmware is responsible for knowing how to talk to each device to start the spindle, to read the bias current on the ADC, or read or write data at a location in the NVRAM, etc. It is important that the Drive Command firmware deselect all serial chip selects to abort any previous operation which may still be in progress.

Open Issue. All interrupts must be disabled while a serial access is being performed. Interrupts may need to be disabled for between 100 μs and 1 ms.

8OC188/DSP Communication Interface: The commands to the DSP and their functions are specified in the 80C188/TMS320C5X Communications document (DSPCOMM.DOC), Rev XGH—Aug. 25, 1994. For convenience, the commands are listed below in Table 29—DSP Commands.

TABLE 29

| DSP Commands | |
|---|---|
| DSP_REQ_STAT | 0x00 |
| DSP_INIT_DRV | 0x01 |
| DSP_LSR_ON | 0x02 |
| DSP_CAP_FOCUS | 0x03 |
| DSP_CAP_FTRK | 0x04 |
| DSP_CAP_CTRK | 0x05 |
| DSP_CLOSE_PIN | 0x06 |
| DSP_JB_EN_IN | 0x07 |
| DSP_JB_EN_OUT | 0x08 |
| DSP_SEEK_IN | 0x0A |
| DSP_SEEK_OUT | 0x0B |
| DSP_OPEN_LOOPS | 0x0C |
| DSP_CLR_INT | 0x0D |
| DSP_RD_VEL | 0x0E |
| DSP_RD_CLOCK | 0x0F |
| DSP_EJECT_CART | 0x11 |
| DSP_GET_REV | 0x80 |
| DSP_RD_MEM | 0x81 |
| DSP_WR_MEM | 0x82 |

DSP Status Definitions: Table 30 lists the bit definitions for the DSP status bytes. The Table 30 also identifies how each bit is translated into a bit in the ESDI Standard Status or the ESDI Optical Status definition.

Drive Command Completion: The command and status phase of a Drive Command have been separated in order to provide the 80C188 firmware with the flexibility to continue processing while the DSP performs the command. At a later point, the 80C188 firmware can specifically wait for the command to complete. Normally, all that is required is that two consecutive commands do not overrun. Therefore, at the beginning of each Drive Command, the firmware must check that the previous command has completed and if not, to wait for a specified amount of time (TBD) before timing out.

Commands to the DSP fall into difference categories which require different timeouts. A memory access should complete within 500 μs. A short seek should complete within 2 milliseconds, a long seek within 100 milliseconds. Initialization of the DSP can take up to 2 seconds.

The Drive Command firmware must also monitor timeouts for hardware that it is directly responsible for managing, such as the bias magnet and the Read Channel components. The bias magnet may take as long as 4.5 milliseconds to achieve the desired field strength. The delay while the Read Channel settles is (TBD)ps.

JUKEBOX 20-PIN CONNECTOR SUPPORT: This section describes the actions taken by the Jupiter drive in response to various signals on the 20-pin jukebox connector. There will be no tests in the firmware to determine whether the jukebox cable is attached. All signals will be asserted/deasserted at the jukebox interface whether or not a cable is attached.

AC Eject: When the AC_EJECT signal is asserted on the 20-pin connector, the drive will abort any current operation and transfer all data in the Write Cache to the media. If the cartridge is spinning, the firmware will issue a Drive Command to spin the cartridge down. Once the drive has validated that the cartridge has stopped spinning (method is TBD), the drive will issue a Drive Command to eject the Cartridge.

AC Reset: Open Issue. When the AC_RESET signal is asserted on the 20-pin connector, the drive will no longer accept any new commands. Those commands which are currently in the queue will be serviced to completion. Any data currently in the Write Cache will be flushed to the

TABLE 30

DSP Status to ESDI Status Translation

| | Bit | ESDI Equivalent | Status | Bit |
|---|---|---|---|---|
| DSP Status Byte 0 | | | | |
| DSP_CMD_COMPLETE | 7 | | | |
| DSP_BAD_CHECKSUM | 6 | ESDI_CMD_PTY_FLT | Standard | 7 |
| DSP_INVALID_CMD | 5 | ESDI_INVALID_CMD | Standard | 5 |
| DSP_TRACKING_ERR | 4 | NOT_ON_TRACK | Optical | 14 |
| DSP_TIMER_EVENT | 3 | | | |
| DSP_FOCUS_ERR | 2 | FOCUS_SERVO_FAILURE | Optical | 11 |
| DSP_LASER_POWER_ERR | 1 | LASER_DRIVE_FAILURE | Optical | 8 |
| DSP_FOCUS_LP_CLOSED | 0 | | | |
| DSP Status Byte 1 | | | | |
| DSP_FINE_LP_CLOSED | 7 | | | |
| DSP_COARSE_LP_CLOSED | 6 | | | |
| DSP_PINNING_LP_CLOSED | 5 | | | |
| DSP_SPINDLE_SPEED_ERR | 4 | SPINDLE_SPEED_FAILURE | Optical | 12 |
| DSP_LASER_ON | 3 | | | |
| DSP_JUMPBACK_IN | 2 | | | |
| DSP_EJECT_FAIL | 1 | CART_LOAD_FAIL | Optical | 13 |
| DSP_BAD_SEEK | 0 | SEEK_FAULT | Standard | 4 |

media. Once the drive completes the above function, it will wait for the Autochanger Reset signal to deassert before completing the SCSI initialization, as described above.

Cartridge in Drive: The CART_IN_DRIVE (AKA cartridge present) signal on the 20-pin connector will be maintained in a deasserted state, whether or not there is a cartridge in the drive. No firmware support will be provided for this signal. The interrupt is possible from the External ENDEC. There is, however, no sensor to generate the cartridge i throat signal.

Cartridge Loaded: The CART_LOADED (AKA cartridge present) signal on the 20-pin connector will be asserted when a cartridge is present, seated on the hub, spinning, and the DSP has completed its initialization (including focus and tracking).

Error: The ERROR signal on the 20-pin connector will be asserted when-ever a cartridge eject sequence fails. There currently is no way for the firmware to detect a cartridge load or unload failure without a cartridge in throat sensor.

LED Pipe: The LED_PIPE signal on the 20-pin connector will be asserted whenever the drive's LED is illuminated.

Power Down Request: When the PWRDNREQ signal on the 20-pin connector is asserted, the drive will complete any write command already in progress and then transfer all data in the Write Cache/write buffer to the media.

Power Down Acknowledge: When the Write Cache has been flushed in response to a PWRDNREQ signal, the drive will assert the PWRDNACK signal on the 20-pin connector.

Standalone/AC: The drive can determine whether the 20-pin connector is attached by sensing the level of this signal on the jukebox interface. If the signal is high, the drive is in standalone mode. If the signal is low, the drive has a 20-pin connector attached to the jukebox.

DRIVE OPERATION: Non-Volatile RAM (NVRAM): NVRAM will be used with the Jupiter drive. Some drive parameters (such as laser power settings and OEM product information) will be customized and stored in the NVRAM. If the NVRAM is later deleted from the design, the parameters will be stored in Flash.

Power Supply Failures: Any failure of the 5V or 12V power will produce a hardware reset to the 80C188.

Focus Offset Calibration for 1x and 2x: The DSP will perform the Focus Offset Calibration for 1x and 2x media, optimizing for the best Radial Push Pull (RPP) signal.

Focus Offset Calibration for 4x: This section is TBD. The following are notes and questions which will be used during the definition of this section. The Focus Offset Calibration for 4x is performed in two parts. The first part of the calibration is performed by the DSP in which it will optimize for the best RPP signal, as done for the 1x and 2x Focus Offset Calibration. The second part of the Focus Offset Calibration for 4x will be performed to optimize for the best carrier-to-noise ratio (CNR). This requires that the 80C188 write and read data patterns, select the best offset, and pass the offset to the DSP.

The 80C188 will command the DSP to use a specific focus offset and then write a 2T data pattern to a sector. The sector is read and within approximately 100 $\mu$s the serial ADC must be read to capture the value of the "sample and hold". The process is repeated using various focus offsets until an optimum value is determined. The specific algorithm is TBD. The final value is then passed to the DSP.

Write Power Calibration for 2x: This section is TBD. The following are notes and questions which will be used during the definition of this section. Open Issue. The 80C188 will perform the write power calibrations using the following (TBD) algorithm.

Write Power Calibration for 4x (Prewrite Testing): This section is TBD. The following are notes and questions which will be used during the definition of this section. Open Issue. We need to identify when the prewrite testing is to be performed: 1) temperature initiated, test all zones, 2) temperature initiated, only when the zone is next used, 3) each time a new zone is written to, and 4) some other algorithm. Also, do the prewrite test tracks have headers. Each of these matters are design considerations which would not effect one of skill in the art from practicing the present invention as herein enabled and disclosed.

The process for write power calibration for 4x is similar to the process for determining the 4x focus offset. The 80C188 is responsible for writing a series of sectors while varying the write power level for WR1. It may be necessary to skip one or two sectors while the setup for the next write is performed. Once a range of values have been used, the 80C188 reads the same sectors and uses the serial ADC to quantify the read back signal. Based on an algorithm (TBD), the optimum write power level is determined.

It is important to note that this sequence needs to be interruptible and restartable. If a new SCSI command is received in the middle of the algorithm, the drive needs to respond in a timely fashion to the command and return to the prewrite testing at a later time.

Open Issue. If the drive is performing the prewrite testing and a new SCSI write command is received, does the drive 1) abort the prewrite testing and execute the write command using the old write power levels, or 2) continue with the prewrite testing to determine the new write power levels, thereby increasing this commands overhead.

Recalibration: This section is TBD. The following are notes and questions which will be used during the definition of this section. When is it done. What is done. Temperature Monitoring, How often. How much of a rise in temperature is required to induce a recalibration.

What will be calibrated versus recalibrated. When will the drive recalibrate. Will calibration and recalibration be the same. Will recal be done for laser current changes. Each of these matters are design considerations which would not effect one of skill in the art from practicing the present invention as herein enabled and disclosed.

The DSP calibration includes establishing the Focus Offset and the RPE Offset. There are two algorithms for calibrating focus. Which algorithm to use has not been established. Recalibration will be performed as a function of temperature or as an error recovery procedure. With every rise in temperature of 5–10° C., the Focus Offset, RPE Offset, and Write Laser Power will be recalibrated. The recal should be performed when "nothing else" is being processed. If the recalibration is in process, it must be interruptible for incoming SCSI commands. If the system remains busy for an extended period, eventually the recal must take precedence. A recal will not take place for every change in the laser read power.

Flash EEPROM Support: The Write Buffer SCSI Command will be used to download new SCSI firmware to the drive. The drive will not be capable of surviving a reset or power cycle which may occur during the update of the Flash EEPROM. It will be extremely important to make this fact clear to the end user which may be attempting to perform the firmware update: they must never cycle power or cause a reset during the download process. If this happens, the drive will need to be sent back to the factory for repair.

Manufacturing Requirements: This section is TBD. The following are notes and questions which will be used during the definition of this section. Trace Buffer Support (will it be the same as RMD-5300). This matter is a design consideration which would not effect one of skill in the art from practicing the present invention as herein enabled and disclosed.

Read Ahead Cache: This section is TBD. The following are notes and questions which will be used during the definition of this section. The amount of memory dedicated to the read and write portions of the cache will be set through the Mode Pages. See Below.

Write Cache: This section is TBD. The following are notes and questions which will be used during the definition of this section. The amount of memory dedicated to the read and write portions of the cache will be set through the Mode Pages. Will timed flush be supported. Immediate Reporting. Write Reordering. Each of these matters are design considerations which would not effect one of skill in the art from practicing the present invention as herein enabled and disclosed.

SCSI Command Performance: This section is TBD. The following are notes and questions which will be used during the definition of this section. Combining multiple SCSI commands into a single media request. Breaking a seek into preliminary and final seeks. Bus occupancy algorithms: Buffer Empty Ratio for writing. Buffer Full Ratio for reading. Each of these matters are design considerations which would not effect one of skill in the art from practicing the present invention as herein enabled and disclosed.

Powered-On Hours: The number of hours the drive has been powered on will be kept in NVRAM. To accumulate the powered-on hours, the DSP will interrupt the 80C188 approximately every 10 seconds ($2^{19}\times 20\ \mu s$). The 80C188 will update the powered-on hours by $2^{19}\times 20\ \mu s$ and store the total in the NVRAM. If the drive encounters an error, the 80C188 can request the current value of the DSP clock. Only the lower 19 bits are used and will be added to the powered-on hours giving a relative time stamp for the error event. Note: 1) The time spent during initialization prior to releasing the DSP from reset is not included. This time could be added each time the drive powers up. 2) The time remaining until the next 10 (approximately 5 seconds) could be added on each time the drive powers up.

Lens Cleaning: Once it has been determined that the lens must be cleaned, the next time the drive will eject the cartridge, the actuator will be moved into position. The cartridge eject will cause a brush to pass over the lens. When the cartridge has cleared the throat, the actuator will be moved to its normal position. The following are open issues: 1) What if the cartridge remains in the throat. 2) When is it safe to move the actuator back to its normal position. 3) Can the lens be harmed in any way if the actuator is moved at the "wrong" time during this procedure. Each of these matters are design considerations which would not effect one of skill in the art from practicing the present invention as herein enabled and disclosed.

Firmware Performance: This section is TBD. The following are notes and questions which will be used during the definition of this section. Identify minimum sector times for media RPM. Use strategy for multiple sectors per interrupt. Identify time critical regions of Interrupt Service Routines (ISRs).

Front Panel Eject Request: This section is TBD. The following are notes and questions which will be used during the definition of this section. Will this abort the current command. Is the contents of the cache written to the media first. Each of these matters are design considerations which would not effect one of skill in the art from practicing the present invention as herein enabled and disclosed.

SCSI Eject Command: This section is TBD. The following are notes and questions which will be used during the definition of this section. Will this always eject, even if the Cartridge Present Switch indicates there is no cartridge. Should this be disabled via an option switch. Jukeboxes may or may not want a host to be able to eject the cartridge directly. Each of these matters are design considerations which would not effect one of skill in the art from practicing the present invention as herein enabled and disclosed.

Option Switches: This section is TBD. The following are notes and questions which will be used during the definition of this section. Enable/Disable hard reset from SCSI Bus Reset signal. (Will be routed to hardware reset for enabled). Enable/Disable SCSI termination. Enable/Disable automatic verify after write. Enable/Disable flash memory programming for SCSI firmware updates. Enable/Disable eject from SCSI command. Reserved (number TBD).

A. FIRMWARE REQUIREMENTS: This section contains the firmware requirements which were used to derive the Firmware Functional Specification.

1. Diagnostics

1) Support serial communications for diagnostics.

2) Serial communication supports access to new hardware.

3) Develop power-on self-test (POST) diagnostics for new chips and hardware: RLL (1,7) ENDEC, GLIC (Glue Logic IC), NVRAM, Read Channel, Spindle Motor, Serial A/D Converter, Parallel D/A Converter.

4) Motor spindle speed must be changeable via a SCSI command.

2. Firmware Upgrades

1) Support F1ash EEPROM for SCSI Firmware.

2) New firmware (SCSI and/or DSP) must be downloadable through SCSI.

3) A firmware download operation must be recoverable.

3. DSP Support

1) Must be able to download DSP code from SCSI EEPROM.

2) Must support a Communication Interface providing commands, status, and data exchange.

3) Must be capable of supporting a ROMable DSP.

4) Must support different velocity tables for different media formats.

4. 20-Pin Connector

1) The firmware must be able to detect when the 20-pin connector is attached.

2) The firmware must be able to read the latched values for the following 20-pin connector signals: Autochanger RESET, Autochanger Power Down Request, Autochanger Eject, SCSI ID, SCSI Parity Enabled.

3) The firmware must be able to read the current status of Autochanger RESET (non-latched).

4) The firmware must receive an interrupt when the following signals on the 20-pin connector are asserted: Autochanger RESET, Power Down Request, Autochanger Eject.

5) The firmware must be able to assert/deassert the following signals on the 20-pin connector: CART_IN_DIRVE, CART_LOADED, ERROR, PWRDNACK (Power Down Acknowledge).

6) When PWRDNREQ on the 20-pin connector is asserted, 1) the Write Cache is flushed, and then 2) PWRDNACK is asserted.

5. SCSI Initialization

1) The SCSI Initialization firmware will use the 20-pin connector as the source of the drive's SCSI ID. When the cable is attached, the signals will be driven by the jukebox.

When the cable is not attached, the same pins will have jumpers installed to indicate the SCSI ID to be used.

2) The SCSI Initialization firmware will use the 20-pin connector as the source of the drive's SCSI Parity Enable. When the cable is attached, the signal will be driven by the jukebox. When the cable is not attached, the same pin will have a jumper installed to indicate whether SCSI Parity should be enabled.

3) The drive must support user selection of terminator power.

6. Reset

1) If the SCSI Bus RESET signal is asserted, an INT3 to the 80C188 is produced.

2) If the Autochanger RESET signal is asserted, an interrupt to the 80C188 is produced.

3) If the SCSI Bus asserted RESET, the INT3 ISR must determine from an option switch whether a hard or soft reset must be performed. If a soft reset is to be performed, the INT3 ISR notifies the Monitor Task that a reset has occurred and that the contents of the Write Cache must be flushed.

4) If the Autochanger asserted Autochanger RESET during the power-up sequence, the drive a) must ignore Autochanger EJECT, and b) must wait for Autochanger RESET to be deasserted before performing the SCSI initialization.

5) The Autochanger may assert Autochanger RESET at any time to change the drive's SCSI ID.

7. Read Channel Support

1) The firmware must setup the Read Channel for the current type of read operation.

8. Write Channel Support

1) The firmware must initiate the process to sample signals from the Read Channel for sectors used for prewrite testing.

2) The firmware must determine the optimum Write Power Level for the current frequency zone and current drive temperature.

3) The firmware must send the Focus Offset to the DSP for 4x media.

9. Drive Command Support

1) Drive Command Interface must be based upon the interface used with the HC11.

2) The Drive Command status word definition must be identical to the status words used with the CP.

3) Jump Back must be enabled/disabled through a GLIC register, read by the DSP.

4) The direction of the Jump Back must be specified to the DSP.

5) The Drive Command firmware must set the spindle speed for the media type.

6) The Drive Command firmware must be able to validate that the spindle is up to speed.

7) The Drive Command firmware must be able to sample the drive's temperature.

8) The Reset Interface Command will now assert SERVO RESET for one microsecond and then deassert SERVO RESET.

9) The Seek Command must accommodate a range of physical tracks corresponding to the logical tracks in the range from −3366 to +76724.

10) The Drive Command firmware will enable/disable the bias magnet and select the magnet polarity.

11) The Bias/Laser/Freq Command must accommodate up to 34 frequency and laser power zones.

12) The Drive Command firmware will tell the DSP to eject the cartridge.

13) The Drive Command firmware must be able to sense when a cartridge is Write Protected.

14) The Drive Command firmware will control the chip select for serial interface.

15) The Drive Command firmware will use NVRAM for logged events and other saved drive parameters (e.g., laser power levels).

10. Drive Attention Handler

1) The Drive Attention Handler must detect when a cartridge has been inserted and seated on the hub. The cartridge will then be spun up.

2) After a cartridge has been inserted, loaded, spun up, and the DSP "locked up", CART_LOADED must be asserted.

3) If Autochanger EJECT is asserted or the Front Panel EJECT switch is pressed, the drive a) transfers all queued write operations to the media (flushes the Write Cache), spins the cartridge down, and c) ejects the cartridge.

4) When a cartridge is spun down, CART_LOADED must be deasserted.

5) During the cartridge unloading sequence, the Autochanger ERROR signal is asserted if the DSP reports that the eject failed.

6) The Drive Attention Handler must handle and clear the following types of errors: Seek Fault, Off Track, Bias Magnet Failure, Laser Failure, Load/Unload failure, Spindle not at speed, Write Fault.

11. Functional Enhancements Required

1) Add support for non-media access commands while drive is satisfying a media access command but is currently disconnected. (This is commonly referred to as multiple initiator support.)

2) Modify commands to support various command sets. (TBD - HP, IBM, DEC, Apple, Fujitsu, etc.)

3) Add support for new command sets. (TBD)

4) Add support for Vendor Unique Sense Data and Sense Key/Code combinations. (TBD)

5) Add P-ROM support.

6) Add CCW (pseudo-WORM) support.

7) Add Read Ahead Cache.

8) Add Write Cache, including flushing the buffer after a user selectable time delay.

12. Performance Requirements

1) The Interrupt Service Routines must be capable of handling minimum sector times of: 1x at 3600 RPM 538 microseconds, 2x at 3320 RPM 368 microseconds, 4x at 1900 RPM 272 microseconds.

13. Other Requirements

1) The firmware must assert/deassert the Front Panel LED.

2) The firmware will support the power-on hours odometer.

3) The firmware will support the cartridge load odometer.

4) If either the 5V or 12V power fails, the drive will (TBD).

14. Interrupt Sources

1) The interrupt sources for Jupiter are: i) INTO, Cirrus Logic SM331 (DINT), Cirrus Logic SM330, RLL(1,7) ENDEC; ii) INT1, Cirrus Logic SM331 (HINT); iii) INT2, DSP, GLIC (Glue Logic IC); iv) INT3, SCSI Bus Reset 2) The sources of the DSP interrupts are as follows: i) Non-Aborting Interrupt, Bad Seek Error, 10-Second Timer Event, Bad Command Checksum,Unknown Command, Cartridge Eject Failed; ii) Aborting Interrupt, Focus Error, Off Track Error, Laser Power Control Error, Spindle Not At Speed Error.

3) The sources of the GLIC interrupts are as follows: Autochanger Reset, Autochanger Power Down Request, Autochanger Eject, Front Panel Eject,Cartridge Inserted (in throat), Cartridge Present (seated on the hub).

4) Cartridge Inserted will not be supported by the firmware.

15. Error Recovery

1) Heroic Error Recovery for individual sectors will be attempted after the user-specified number of retries and the user-specified thresholds.

2) Error Recovery will include recovery using the following error recovery modes: (TBD)

B. POST DEFINITION: This section contains a description of the tests which are performed during the Power On Self Test (POST).

1. 80C188 Register and Flag Test

The 80C188 CPU sign, parity, carry and zero flags are checked to be sure that they are properly set and then reset. The test is performed in two parts. First, the value 0xC5 is placed in the AH register and then stored into the flags using the SAHF instruction. The flags are tested for their reset state (i.e., JNS, JNP, JNC, and JNZ). Second, the value is complemented and stored into the flags. The flags are tested for their set state (i.e., JS, JP, JC, and JZ). Any flag not in the proper state fails the test and forces the drive to use the LED to signal a CPU fault.

The register test is a ripple test, passing the value 0xFFFF through all registers (i.e., AX, BX, ES, CX, DS, DX, SS, BP, Si, Dl, and SP). The value 0x0000 is then passed through the same registers. If the desired value is not present in the final register in the series, the test fails and forces the drive to use the LED to signal a CPU fault.

2. CPU RAM Test

The CPU RAM test writes an incrementing byte pattern to all locations of the static RAM (SRAM) in two passes. Alternating patterns rewritten in 128-byte blocks. During the first pass, the pattern for the first block is 0x00, 0x01, 0x02, . . . , 0xFE, 0xFF. The pattern for the next block is 0×01, 0×02, 0×03, . . . , 0XFF, 0x00. During the second pass, the pattern is inverted. If any SRAM location does not contain the correct value when read back at the end of each pass, the test fails and forces the drive to use the LED to signal a RAM fault.

3. 80C188 Interrupt Vector Test

The interrupt vector test uses a software interrupt to test the dispatching ability of the 80C188. An entry in the Interrupt Vector Table (IVT) is initialized to point to a test Interrupt Service Routine (ISR). The AX register is initialized to 0x000. The interrupt is dispatched to using the INT instruction, the AX register is decremented, and the ISR exits. Upon return from the interrupt, the value in AX is checked. If the value is not 0xFFFF, the test fails and forces the drive to use the LED to signal a CPU fault.

4. ROM Checksum Test

The ROM Checksum Test checks the contents of the flash PROMs using a primitive degree 16 polynomial. If the calculated checksum is not zero, the test fails and forces the drive to use the LED to signal a ROM fault.

For each 16-bit word in PROM, the low byte is XOR'd into the BH register and BX is multiplied by two. If the carry flag is set after the multiply (shift), the polynomial 0x38CB is XOR'd into BX. The high byte from the PROM is XOR's into the BH register and BX is multiplied by two. If the carry flag is set after the multiply (shift), the polynomial 0x38CB is XOR's into BX.

5. SM331 Register Test

The Cirrus Logic CL-SM331 Register Test resets the SM331 and checks the registers after reset for appropriate values. If any register fails the test, the drive declares an unclearable condition and uses the LED to signal a (TBD) error.

The specific steps are as follows: 1) Assert the SM331 chip reset, 2) Deassert the SM331 chip reset, 3) Clear the Disk Access Pointer (DAP), 4) Registers 0x57 (BM_DAPL) through 0x5F are checked for zero, 5) Register 0x41 (SCSI_SEL_REG) is checked for zero, 6) Register 0x43 (SCSI_SYNC-CTL) through 0x45 are checked for zero, 7) Register 0x48 (SCSI_STAT_2) through 0x49 are checked for zero, 8) Register 0x50 (BM_SCHED_DATA) through 0x52 are checked for zero.

6. SM331 Sequencer Test

The Cirrus Logic CL-SM331 Sequencer Test writes a pattern into the Write Control Store (WCS) for the sequencer and validates the pattern written. If any portion of the test fails, the drive declares an unclearable condition and uses the LED to signal a (TBD) error.

The specific steps are as follows:

1) The sequencer is stopped. (The value 0xIF is written to the start address.)

2) An incrementing pattern is written to each of the 31 locations in the WCS for the Next Address, Control, Count, and Branch fields.

3) The incrementing pattern is verified.

4) The incrementing pattern is written to each of the 31 locations in the WCS for the Next Address, Control, Count, and Branch fields.

5) The decrementing pattern is verified.

7. SM330 ENDEC Test

The Cirrus Logic CL-SM330 ENDEC Test resets the SM330, clears the GPO register, clears the Corrector RAM, verifies the Corrector RAM, and induces a Sector Transfer Count Equals Zero interrupt. If any portion of the test fails, the drive declares an unclearable condition and uses the LED to signal a (TBD) error.

The specific steps are as follows:

1) Assert the SM330 chip reset.

2) Deassert the SM330 chip reset.

3) Delay at least 10 microseconds for the chip to perform its reset.

4) The General Purpose Output (GPO) register is initialized to 0x00.

5) The Corrector RAM locations 0x00 and 0x01 are zeroed.

6) The Corrector RAM locations 0x0F to 0x16 are zeroed.

7) The Corrector RAM locations 0x20 to 0x27 are zeroed.

8) The Corrector RAM locations 0x00 and 0x01 are checked for zero.

9) The Corrector RAM locations 0x0F to 0x16 are checked for zero.

10) The Corrector RAM locations 0x20 to 0x27 are checked for zero.

11) The standard chip initialization is performed as described above.

12) The interrupt vector for the SM330 is initialized to point to a test Interrupt Service Routine.

13) A "Sector Transfer Count Equals Zero" interrupt is forced by writing a zero as the transfer count to the Sector Transfer Count Register.

14) The firmware waits for a maximum count of 0xFFFF for the interrupt to decrement a register which is being polled.

8. External ENDEC Test (TBD)

9. Glue Logic Test (TBD)

10. Buffer RAM Test

The Buffer RAM test writes an incrementing address pattern to all locations in the Buffer RAM and then verifies the pattern. The incrementing pattern used is 0x00, 0x01, 0x02, . . . , 0xFF. The test then writes and inverse address pattern to all locations in the Buffer RAM and then verifies the pattern. The inverse pattern used is 0x00, 0XFF, 0xFE, . . . , 0x01. Finally, the test writes 0x00 to all locations in the Buffer RAM. If any location in the Buffer RAM has failed, the drive declares an unclearable condition, but does not signal the error with the LED.

11. DSP POST

The basic functionality of the DSP is validated by the 80C188 by issuing a Read Code Revision command to the DSP. This command will test the interface between the 80C188 and DSP, access a location in the DSP memory, and test the ability to return valid status.

12. Bias Magnet Test

The Bias Magnet Test will turn on the bias magnet for a write function. (To preclude accidental data loss, the laser write power Digital to Analog Converters (DACs) will be maintained at the read power levels.) The Drive Command code is responsible for turning on the magnet, setting the laser write power, and then reading the Analog to Digital Converter (ADC) to verify that the bias coil is drawing (TBD) current. The Drive Command code will wait (TBD) milliseconds before reading the ADC. If the current is not within (TBD) range, the drive declares an unclearable condition, but does not signal the error with the LED.

C. SM330 REGISTERS: This section contains a description of the Cirrus Logic SM330, Optical Disk ENDEC/ECC registers as provided below in Table 31.

TABLE 31

| Register Name | Offset | Description | Read/ Write Status |
|---|---|---|---|
| EDC_CFG_REG1 | 10h | Configuration reg | R/W |
| EDC_CFG_REG2 | 11h | Configuration reg | R/W |
| EDC_CFG_REG3 | 12h | Configuration reg | R/W |
| EDC_SPT | 13h | Sectors/track | R/W |
| EDC_ID_TARG_SEC | 14h | ID Target Sector | R/W |
| EDC_ID_TARG_TRK_LSB | 15h | ID Target Track LSB | R/W |
| EDC_ID_TARG_TRK_MSB | 16h | ID Target Track MSB | R/W |
| EDC_ID_CMP_SEC | 17h | ID Compare Sector | R/W |
| EDC_ID_CMP_TRK_LSB | 18h | ID Compare Track LSB | R/W |
| EDC_ID_CMP_TRK_MSB | 19h | ID Compare Track MSB | R/W |
| EDC_SEC_XFR_CNT | 1Ah | Sect. Xfer Cnt. | R/W |
| EDC_SEC_COR_CNT | 1Bh | Sect. Corr. Cnt. | R/W |
| EDC_DAT_BUF_ADR_L | 1Ch | Data Buffer Address High | R/W |
| EDC_DAT_BUF_ADR_M | 1Dh | Data Buffer Address Mid | R/W |
| EDC_DAT_BUF_ADR_H | 1Eh | Data Buffer Address Low | R/W |
| EDC_REV_NUMBER | 1Fh | CL-SH8530 Revision Number | R/W |
| EDC_INT_EN_REG | 20h | Interrupt Enable Reg. | R/W |
| EDC_MED_ERR_EN | 21h | Media Error Enable | R/W |
| EDC_INT_STAT | 22h | Interrupt Status | R/W |
| EDC_MED_ERR_STAT | 23h | Media Error Status | R/W |
| EDC_SMC | 24h | Sector Mark Control | R/W |
| EDC_RMC | 25h | Resync Mark Control | R/W |
| EDC_ID_FLD_SYN_CTL | 26h | ID Field/Sync Control | R/W |
| EDC_ID_ERR_STAT | 27h | ID Error Status | R/W |
| EDC_WIN_CTL | 28h | Window Control | R/W |
| EDC_TOF_WIN_CTL | 29h | TOF Window Control | R/W |
| EDC_SM_ALPC_LEN | 2Ah | Sector Mark/ALPC | R/W |
| EDC_LFLD_ALPC | 2Bh | LFLD/ALPC | R/W |
| EDC_PLL_LOCK_CTL | 2Ch | PLL Lock Control | R/W |

TABLE 31-continued

| Register Name | Offset | Description | Read/ Write Status |
|---|---|---|---|
| EDC_PLL_RELOCK_CTL | 2Dh | Relock Control | R/W |
| EDC_LFLD_WIN_CTL | 2Eh | LFLD Window Control | R/W |
| EDC_RESV2 | 2Fh | Reserved | R/W |
| EDC_ECC_COR_STAT | 30h | ECC Correction Status | R/W |
| EDC_ECC_RAM_ADR | 31h | ECC RAM Address | R/W |
| EDC_ECC_RAM_ACC | 32h | ECC RAM Access | R/W |
| EDC_RESV3 | 33h | Reserved | --- |
| EDC_VU_1 | 34h | Vendor Unique Byte | R/W |
| EDC_VU_2 | 35h | Vendor Unique Byte | R/W |
| EDC_VU_3 | 36h | Vendor Unique Byte | R/W |
| EDC_VU_4 | 37h | Vendor Unique Byte | R/W |
| EDC_GPI | 38h | General Purpose Input | R-- |
| EDC_GPO | 39h | General Purpose Output | R/W |
| EDC_RESV4 | 3Ah | Reserved | --- |
| EDC_TEST_REG | 3Fh | Test Register | R/W |

D. SM331 REGISTERS: This section contains a description of the Cirrus Logic SM331, SCSI Optical Disk Controller register as shown below in Table 32.

TABLE 32

| Register Name | Offset | Description | Read/Write Status |
|---|---|---|---|
| SCSI_ACC_REG | 40h | Direct SCSI Access Port | R/W |
| SCSI_SEL_REG | 41h | Sel/Re-selection ID | R/W |
| SCSI_PHA_CTL | 42h | SCSI Phase control register | R/W |
| SCSI_SYNC_CTL | 43h | SCSI Sync. Xfer. Control reg | R/W |
| SCSI_MODE_CTL | 44h | SCSI Mode Control reg | R/W |
| SCSI_OP_CTL | 45h | SCSI Operation Control reg | R/W |
| SCSI_STAT_1 | 46h | SCSI Status Reg 1 | R/W |
| SCSI_INT_EN_1 | 47h | SCSI Interrupt Enable Reg | R/W |
| SCSI_STAT_2 | 48h | SCSI Status Reg 2 | R/W |
| SCSI_INT_EN_2 | 49h | SCSI Interrupt Enable Reg 2 | R/W |
| SCSI_FIFO | 4Ah | SCSI MPU FIFO Access Port | R/W |
| SF_SECT_SIZE | 4Eh | Sector Size | R/W |
| SF_MODE_CTL | 4Fh | Mode Control | R/W |
| BM_SCHED_DATA | 50h | Scheduled Buffer Data | R/W |
| BM_STAT_CTL | 51h | Buffer Status/Control | R/W |
| BM_XFER_CTL | 52h | Transfer Control reg | R/W |
| BM_MODE_CTL | 53h | Buffer Mode Control | R/W |
| BM_TIME_CTL | 54h | Buffer Timing Control | R/W |
| BM_DRAM_REF_PER | 55h | DRAM Re- | R/W |

TABLE 32-continued

| Register Name | Offset | Description | Read/Write Status |
|---|---|---|---|
| | | fresh Period | |
| BM_BUFF_SIZE | 56h | Buffer Size | R/W |
| BM_DAPL | 57h | Disk Address Pointer Low | R/W |
| BM_DAPM | 58h | Disk Address Pointer Mid | R/W |
| BM_DAPH | 59h | Disk Address Pointer High | R/W |
| BM_HAPL | 5Ah | Host Address Pointer Low | R/W |
| BM_HAPM | 5Bh | Host Address Pointer Mid | R/W |
| BM_HAPH | 5Ch | Host Address Pointer High | R/W |
| BM_SAPL | 5Dh | Stop Address Pointer Low | R/W |
| BM_SAPM | 5Eh | Stop Address Pointer Mid | R/W |
| BM_SAPH | 5Fh | Stop Address Pointer High | R/W |
| SF_SYNC_BYTE_CNT_LMT | 70h | Sync. Byte Count Limit | R/W |
| SF_OP_CTL | 77h | Operation Control reg | R/W |
| SF_NXT_SEQ_ADR | 78h | Next Format Seq. Control | R.. |
| SF_BRANCH_ADR | 78h | Branch Address | ..W |
| SF_SEQ_STAT_REG1 | 79h | Sequencer Status reg 1 | R.. |
| SF_SEQ_STRT_ADR | 79h | Sequencer Start Address | ..W |
| SF_SEQ_STAT_REG2 | 7Ah | Sequencer Status reg 2 | R.. |
| SF_INT | 7Dh | Interrupt reg | R/W |
| SF_INT-EN | 7Eh | Interrupt Enable reg | R/W |
| SF_STACK | 7Fh | Stack | R.. |

E. GLIC REGISTERS: This section contains a description of the MOST Manufacturing, Inc. Glue Logic Integrated Circuit (GLIC) registers as provided below in Table 33.

TABLE 33

| Register Name | Offset | Description | Read/Write Status |
|---|---|---|---|
| GLIC_DSP_REG | 00h | DSP Comm Register | R/W |
| GLIC_JB_CTRL_REG | 01h | Jukebox Control Register | R/W |
| GLIC_INT_EN_REG | 02h | Interrupt Enable Register | R/W |
| GLIC_MIO_REG | 03h | Miscellaneous Control Register | R/W |
| GLIC_JB_INP_REG | 04h | Jukebox Input Register | R.. |
| GLIC_WPR_DAC0 | 04h | Write Power DAC0 | ..W |
| GLIC_INT_INS_REG | 05h | Interrupt In-Service Register | R.. |
| GLIC_WPR_DAC1 | 05h | Write Power DAC1 | ..W |
| GLIC_WPR_DAC2 | 06h | Write Power DAC2 | ..W |
| GLIC_WPR_DAC3 | 07h | Write Power DAC3 | ..W |

Drive Exceptions: Status and Error Handling Considerations

The following Tables 33–43 provide a summary of the "Exceptions" handling issues relating to the firmware of the present invention, and specific issues relating thereto.

Next objective=discuss missing items/changes, data integrity risk issues, and resolve where in the drive what functions are performed (considering logic, costs, and manpower impacts).

Notes and Assumptions:

1) It is the intention that this list includes all drive exception handling conditions.

2) At the time of filing the present application, which discloses the current best mode of this invention, there are several concerns about power regulation, laser feedback, and media read level damage threshold. With this in mind, the following is taking the safe initial drive operation path by having all read level and focus acquisitions occur at the inner radius during drive initialization (read power and focus will never be acquired in the data region, just maintained).

3) The recovery section refers to drive shut downs and non-volatile error logs due to recovery failures. These failures are identified and logged, but the user is not prevented from attempting to execute the command again. This does increase risk to user data integrity, with some compensation provided by the non-volatile error log.

4) It is assumed that more than one initiator will be on the SCSI bus.

5) Error detection should never be disabled (although interrupts may be masked).

6) Exception handling priorities=1) Data integrity, 2) cost impact, 3) system performance, and 4) error logging capability.

7) Some of the drive implementation design methods and the specifics of exception handling timing are a function of the market we are targeting. An environment of high contaminants versus an environment of high vibration will have performance differences for the specific implementations.

8) The DSP does not have plans to implement additional power on reset tests outside the currently supported communication test and descriptive error status conditions.

9) The GPO register bits 2 and 5 need to be checked for proper power up polarity. Additional Exceptions Not In The Tables:

1) "Power On", "Hard Reset", and "Soft Reset" are discussed above.

2) "Invalid SCSI Command" and "Improper SCSI Command" exception handling is discussed in conjunction with SCSI handling.

3) "Power Failure" (5V & 12V) is currently triggering a power on reset as described above. There is currently, however, discussion for power faults to be handled differently (individual 12V interrupt to the DSP and no 5V is a design matter consideration). At the time of filing this application, this issue was left open. This detailed matter, however, is believed only to indicate continuing development issues which do not to impact operability of the present invention as disclosed herein.

4) "Laser Write Power Error" reserved for monitoring the laser write power levels during write is not implemented or being pursued.

5) 188 internal "Write Fault" flags improper write conditions triggered by spin error (etc.). Previously, this was also triggered by a real time measurement on the bias current. Real time measurement of bias current is now a future consideration. Question marks appearing in the following tables present design considerations which would not effect one of skill in the art from practicing the present invention as herein enabled and disclosed.

TABLE 34

| ERROR DETECTION | | | | | | |
|---|---|---|---|---|---|---|
| SIGNAL | READ POWER | SPIN | FOCUS | TRACKING | SEEK | EJECT |
| Status Filter | No | No | Yes | Yes | No | No |
| Time Critical (Accuracy) | No (not attempted) | Yes | Yes | Yes | No | No |
| Sample Rate/ Time to Error | TBD to 1 msec + TBD | 16.7 to 31.6 msec (1 rev) + TBD | 50 kHz 80 usec | 50 kHz 80 usec | TBD + TBD | 5 sec. |
| Write Interrupt Abort/Non-Abort | Abort | Abort | Abort | Abort | Non-Abort | Non-Abort |
| 188 Mask Capability | No–Yes? | Yes | Yes | Yes | Yes | Yes |

TABLE 35

| ERROR QUALIFICATION | | | | | | |
|---|---|---|---|---|---|---|
| SIGNAL | READ POWER | SPIN | FOCUS | TRACKING | SEEK | EJECT |
| Qualification Filter | Yes | Yes | Yes | Yes | No | No |
| Time Critical | Yes | No | No | No | No | No |
| Sample Rate/ Time to Error | ASAP | TBD > 100 msec | y msec | y msec | 10 msec | TBD > 100 |
| Qualification Description | The initialization process and focus acquisition will require a 100 msec recovery and verification period. | Check for 100 msec of good status over 1 second. Process recovery if not successful. | Move status threshold to read level. Check for x msec of good status over a y msec period. Process recovery if not successful. | Move status threshold to read level. Check for x msec of good status over a y msec period. Process recovery if not successful. | Process Recovery Directly. | Process Recovery Directly. |

TABLE 36

| ERROR RECOVERY | | | | | | |
|---|---|---|---|---|---|---|
| SIGNAL | READ POWER | SPIN | FOCUS | TRACKING | SEEK | EJECT |
| Priority | 1 | 5 | 2 | 3 | 4 | 12 |
| Recovery Description | 1) Shut down laser. Open all loops. 2) Re-Initalize the power (init. drive) at a non-data region. 3) Monitor power status for 100 msec. 4) 2nd error will force drive shut down (non-volatile error record). | 1) Reset spin for proper speed. 2) Monitor spin staus for 100 msec of good status over 1 sec. 3) If failure, open all loops and shut down spin and retry for a total of 3 times. 4) 3rd error will result in drive shut down (non-volatile error record). | 1) Open all loops and issue a initialize drive to the DSP. 2) Monitor init. drive status for success. 3) If failure, open all loops and issue a init. drive for a total of 3 times. 4) 3rd error will result in drive shut down (non-volatile error record). | 1) Open fine and coarse tracking loops. Close fine trk. loop, and then coarse trk. loop. (maybe issue a seek?). 2) Monitor tracking status. 3) If failure, 3rd error will result in opening the fine and coarse trk. loops and issuing a init drive to the DSP. 4) Failure of the init drive will result in opening all loops and issuing a init drive (full init). 5) 3rd failure of the full init. drive will result in drive shut down (non-volatile error record). | 1) Open the fine and coarse trk. loops and issuing a init. drive to the DSP. 2) Failure of the init drive will result in opening all loops and issuing a init drive (full init.) 3) If failure, 3rd failure of the full init. drive will result in drive shut down (non-volatile error record). | 1) Reissue the eject command. 2) Failure to successfully complete eject in 3 tries will result in drive shut down (non-volatile error record). |

TABLE 37

| SIGNAL | EXCEPTION SOURCES | | | | | |
|---|---|---|---|---|---|---|
| | READ POWER | SPIN | FOCUS | TRACKING | SEEK | EJECT |
| | Laser feedback and media reflectivities, and drive error. | Shock, vibration, media imbalance, thermal shutdown, and drive errors. | Shock vibration, media defects, media variations, thermal shutdown, and drive errors. | Shock, vibration, media defects, media variations, thermal shutdown, and drive errors. | Shock, vibration media defects, calibration variations, and drive error. | Media mechanical jam errors and drive |

TABLE 38

| SIGNAL | READ POWER | SPIN | FOCUS | TRACKING | SEEK | EJECT |
|---|---|---|---|---|---|---|
| | | *Non-volatile error logging for all recovery attempts. | *Non-volatile error logging for all recovery attempts.<br>*Can the drive support focus capture in the data region (laser feedback, etc.) | *Non-volatile error logging for all recovery attempts.<br>*PROM effects.<br>*Item "1" needs test mods/verification.<br>*Init. requires a mod. to recognize that the focus loop is open. | *Non-volatile error logging for all recovery attempts.<br>*Recovery considerations for cash conditions. | *Non-volatile error logging for all recovery attempts.<br>*Can the DSP detect the cam position.<br>*Can the eject motor maintain stall currents without burnup. |

TABLE 39

| SIGNAL | ERROR DETECTION | | | | | |
|---|---|---|---|---|---|---|
| | Incorrect Seek Track ID | Magnet Bias | Sector Mark | Track-Sector ID | Data Read ECC Level | Internal Parity Error |
| Status Filter | Yes | No | Yes | Yes | Yes | No |
| Time Critical (Accuracy) | No | Yes | Yes | Yes | Yes | Yes |
| Sample Rate/ Time to Error | 2/header | 1/write operation | 1/header | 2/header | 1/sector | TBD |
| Pre-Write Cond. Abort/Non-Abort | Pre-Abort | Pre-Abort | Pre-Abort | Pre-Abort | N/A | Abort |
| Mask Capability | Yes | Yes | Yes | ? | Yes | Yes |
| Filter Description | READ:<br>WRITE:<br>VERIFY:<br>Successfully read one track and sector ID.<br>2 of 2 header track numbers must match. | | READ:<br>WRITE:<br>VERIFY:<br>4 of 5 and 3 of 4 symbols must match. | READ:<br>WRITE:<br>VERIFY:<br>2 of 2 track and sector numbers must match. | READ:<br>Threshold set to TBD level to support reads and detection for reallocation<br>VERIFY:<br>Threshold set to a TBD level (lower than the read level) to support verify and reallocation | |

TABLE 40

ERROR QUALIFICATION

| SIGNAL | Incorrect Seek Track ID | Magnet Bias | Sector Mark | Track-Sector ID | Data Read ECC Level | Internal Parity Error |
|---|---|---|---|---|---|---|
| Qualification Filter | No | No | Yes | No | No | No |
| Time Critical | No | Yes | Yes | Yes | Yes | Yes |
| Sample Rate/ Time to Error | 1/header | 1/write operation | 1/header | 2/header | 1/sector | TBD |

TABLE 41

ERROR RECOVERY

| SIGNAL | Incorrect Seek Track ID | Magnet Bias | Sector Mark | Track-Sector ID | Data Read ECC Level | Internal Parity Error |
|---|---|---|---|---|---|---|
| Priority Recovery Description | 6 READ: WRITE: VERIFY: Re-seek a total of 3 times to obtain a track number match. If unsuccessful, report error to host and non-volatile memory. | 7 WRITE: Set the unclearable magnet failed bit and do not write. Record in non-volatile memory. | 8 WRITE: VERIFY: 1) Failure to verify any SM will result in band freq. sweeps for the given media (see "Media Formats" 2) Failure for the specific sector will result in sector reallocation. READ: 1) Failure to verify any SM will result in band freq. sweeps for the given media (see "Media Formats" 2) Failure for the specific sector will result in heroic recovery including reduction of SMs needed from 3 to 0 (using synthesized sector mark). | 9 WRITE: VERIFY: 1) Failure to verify any IDS will result in band freq. sweeps for the given media (see "Media Formats" 2) 2 of 2 track and sector numbers must match, failure will result in sector reallocation. READ: ? 1) Failure to verify any IDs will result in band freq. sweeps for the given media (see "Media Formats" 2) Retry up to 3 times. Heroic recovery including 1 of 2 track and sector number matches. | 10 READ: Increase ECC level to maximum to attempt data recovery. Retry reads up to 3 times. Reallocate if above TBD ECC level. VERIFY: Reallocate sector if ECC level is above TBD. | 11 READ: WRITE: VERIFY: Retry operation 3 times. Record error to host and non-volatile memory. |

TABLE 42

EXCEPTION SOURCES

| SIGNAL | Incorrect Seek Track ID | Magnet Bias | Sector Mark | Track-Sector ID | Data Read ECC Level | Internal Parity Error |
|---|---|---|---|---|---|---|
| | Media defects, media variations, and drive error. | Thermal shutdown and drive error. | Media defects, media variations, and drive error. | Media defects, media variations, and drive error. | Media defects, media variations, and drive error. | Drive error. |

TABLE 43

| | ISSUES | | | | | |
|---|---|---|---|---|---|---|
| SIGNAL | Incorrect Seek Track ID | Magnet Bias | Sector Mark | Track-Sector ID | Data Read ECC Level | Internal Parity Error |
| | * Logging of errors in non-volatile memory. | * Do we do this after writing also? * Data integrity concern for bias failure during write. * Thermal shutdown is reset auto. * Hard current limits need to be identified. | * Logging of errors for heroic recovery? * Reallocation of high error sectors. | | * Determining when previously written sectors are reallocated is a question. | |

Read Ahead Cache

This section describes the operation of the Read Ahead Cache for the RMD-5200-SD drive. A brief cache overview will be provided, followed by a description of the individual cache components. This section will also describe the test used to verify operation of the Read Ahead Cache.

The 256 cache code was developed based on the 128 cache code. There are only two differences (apart from media specific function calls) in the two modes of operation. The first is that the 256 cache ISR contains delayed error processing. (Delayed errors are media errors which are detected before the previous sector has completed correction.) The second difference is that the 256 mode does not diagnose a "Sequencer Stopped" error. These differences are not critical to the operation of the cache. The present discussion, therefore, will not distinguish between 256 and 128 caching.

The read ahead cache code was originated prior hereto. The present invention includes modifications to the original code. These changes were made to improve data integrity, and add 256 mode functionality. This discussion will not highlight what features were changed. It will, instead, describe the behavior of the current best mode of the code.

Cache Overview: Cache Enable Conditions: Caching will be kicked off only if all of the following conditions apply, 1) the RCD bi of mode page 8 is set to zero, 2) the current SCSI command is a Read_6 or Read_10, in LBA mode of addressing, or 3) the current SCSI READ command completes without any errors. This includes a Check Condition status phase, and relocations. Caching is not performed when any relocations have been made in order that the SDL can be updated without delay.

Cache Prefetch Operation: The prefetching operation begins at the logical block immediately after the last logical block of the previous READ command. Errors that occur during the prefetch operation are not reported to the initiator unless the target cannot, as a result of the error, execute subsequent commands correctly. The error well be reported on the subsequent command.

Cache Termination: Caching will terminate upon any of the following conditions, 1) the last LBA to be cached is read, 2) an unrecoverable read error occurs and retries are used up, 3) Are set of Bus Device Reset occurs, 4) a conflicting SCSI command is received, (a "conflicting" SCSI command is one that requires the drive to seek, access the buffer, or change the drive parameters spindle speed, media removal prevention status, etc, see discussion below), or 5) a Drive Attention occurs.

Cache Components: Mode Page 8: The Mode Page 8 defines parameters that affect the operation of the read ahead cache. However, only the RCD bit (bit 0 of byte 2) has any real impact on the operation of the read ahead cache in the RMD-5200-SD. This bit is the Read Cache Disable bit. As its name implies, when this bit is set, caching is disabled.

The other fields in Mode Page 8 are not implemented, and cannot be changed from their default values.

Drive Structure Cache Parameters: Cache parameters which indicate the status of the read ahead cache are stored in the drive structure, drv_cfg:

1) cache_ctrl (UINT)
   Individual bits describe the current state of the cache:
   - 0x0001: CACHE_ENABLED Set when mode page 8 allows cache, and last READ command from host is a Read_6 or Read_10 in LBA mode, and there are blocks that can be cached.
   - 0x0002: CACHE_IN_PROG Indicates that the hardware is executing a cache read. Set when a cache read is kicked off, and reset when the cache ISR queues a tcs on the cache queue.
   - 0x0004: CACHE_STOP Set by Cache Monitor task to notify cache ISR to terminate caching.
   - 0x0008: CACHE_TCS_ON_Q Indicates that a tcs from the cache ISR is on the Cache Monitor queue. This tcs should be processed before kicking off another cache read.
   - 0x0010: CACHE_START_SCSI_XFER Set by function RdDatalnCache when a cache hit occurs. This bit indicates that the read processor may begin a SCSI transfer immediately.
   - 0x0020: CACHE_ABORT_READ_TASK Set by Cache Monitor to indicate that control should return to the SCSI Monitor Task.
   - 0x0040: CACHE_MORM_IN_PROG Indicates that the current read operation is for requested data.
2) cache_start_lba (ULONG) The first LBA cached.
3) cache_cur_lba (ULONG) The LBA following the last LBA cached.
4) cache_buff_addr (ULONG) The buffer address corresponding to cache_start_lba.
5) cache_xfer_len (UINT) Number of blocks left to cache.
6) cache_blks_rd (UINT) Number of blocks cached.
7) cache_free_space (UINT) Free space available for cached data.

8) cache__free__space__predict (UINT) Expected free space for cached data.

Cache Functions: The functions called when caching is enabled will be described in roughly the order in which they are called during a simple cache sequence.

CheckQueuRouting (Old Task, New Task): Both the SCSI Monitor Task and the Cache Monitor Task are able to process TCSs from the SCSI selection ISR. Only one of these two tasks will perform this role at a time. The variable scsi__mon__task is used to designate which task is to receive any further SCSI selection TCSs. CheckQueuRouting will designate scsi__mon__task=New__Task. In addition, the queue of Old__Task is filtered. Any TCSs from the Drive Attention ISR or from the SCSI selection ISR are transferred to the queue of New__Task. Other TCSs are deallocated.

CheckQueuRouting is called by both the SCSI Monitor Task and the Cache Monitor Task as SCSI control is switched between them.

Compute__cache__rng(): This function is an assembly routine, called before starting a normal read operation when caching may be performed later. Its purpose is to calculate the first LBA to be cached and the maximum number of blocks that can be cached (cache__xfer__len). The cache transfer length is truncated by the maximum amount of free space available, and by the maximum LBA. Compute__ cache__rng() also initialize drv__cfg.cache__blks__rd=0. If the transfer length is valid, the CACHE__ENABLED bit in drv__cfg.cache__ctrl is set.

Prep__Cache(): This function is an assembly routine whose purpose is to determine whether the normal read has completed, and if so, initialize the following cache parameters: 1) drv__cfg.cache__free-space, 2)drv__cfg.cache-free__space__predict, 3) drv__cfg.cache__buff__addr. Prep__ Cache() returns TRUE if the cache can be kicked off, else it returns FALSE.

Cache ISR (RA__cache__isr, or gcrRAC__isr): The cache ISR is a simplified version of the normal read ISR, except that it is simplified in the following areas: 1) on ECC complete, the ISR only checks for free space availability and burst completion. Unlike a normal read, the cache is not concerned with SCSI transfers, so it doesn't need to check for SCSI notification conditions; 2) except for the sequencer stopped error, the cache ISR does not distinguish between error types. Caching does not modify any error thresholds on retries, so there is no need to determine the specific type of error; 3) the cache ISR checks for the CACHE__STOP bit in the drv__cfg.cache__ctrl on each ECC complete. If set, the ISR terminates further caching.

Due to its simplified nature, the Cache ISR only returns three cache states: 1) RA__XFER__CMPLT, returned when the cache blocks have been successfully read, and a new seek is required to continue the cache; 2) RA__RD__ ERROR, returned when any error occurs, unless it was due to the sequencer stopping; and 3) RA__SEQ__STOPPED. This error is treated separately because the corrective action requires that the sequencer be restarted.

REQUEST__TASK(New Task): Request__task sets the state of the calling task to SLEEP, while activating New__ Task. Request__task also saves the value of the instruction pointer in the calling function. The New__Task will begin execution at the point where it last called Request__task (indicated by the saved instruction pointer).

Cache Monitor Task: Activation of Cache Monitor Task: The Cache Monitor Task is activated by the Read Task upon the final transfer of data back to the host. Once activated, it processes TCSs from the SCSI selection ISR, the Drive Attention ISR, and from the Cache ISR.

The Cache Monitor Task is not a true task in the sense that it is not activated merely by placing a TCS on its queue. Instead, it is invoked by the Read Task via a call to REQUEST__TASK(New__Task), as described above. Initially, the Cache Monitor Task will begin its execution at the outermost Sleep() statement. The Cache Monitor Task returns control to the Read Task by another call to REQUEST__TASK.

It is important to note that while the Cache Monitor Task is active, there is one TCS being used by the Read Task, which has not yet been returned to the system. The SCSI Monitor Task is still waiting for this particular TCS when control returns to the SCSI Monitor task.

SCSI Monitor Functions: Part of the role of the Cache Monitor Task is to process TCSs from the SCSI selection ISR. The Cache Monitor Task begins receiving TCSs from the SCSI selection ISR when the SCSI Monitor Task receives a READ command and Mode Page 8 has not disabled caching. At this point, the SCSI Monitor Task reroutes its TCSs by calling CheckQueuRouting-(SCSl__ MONITOR__TASK, CACHE__-MONITOR__TASK).

The Cache Monitor Task groups SCSI commands into three categories which include, 1) Conflicting Commands, 2) Concurrent Commands, and 3) Continuing Commands. Depending on the command category, the Cache Monitor Task will abort caching, execute the command, or stop and resume caching.

Conflicting Commands: A conflicting command is one that requires the drive to seek, access the buffer, or change the drive parameters (spindle speed, media removal prevention status, etc.). Upon receipt of a conflicting SCSI command, the Cache Monitor Task will shutdown and abort caching. The SCSI monitor task is reinstated. The following commands are defined as conflicting commands: Rezero Unit, Prevent/Allow Media Removal, Format, Write__10, Reassign Block, Seek__10, Erase__6, Erase__10, Write__6, WriteNerify, Seek__6, Verify, Mode Select, Read Defect Data, Reserve Unit, Write Buffer, Release UnitRead Buffer, Mode Sense, Read Long, Start/Stop, Write Long, Send Diagnostics, All Vendor Unique commands.

Concurrent Commands: Concurrent commands are those which can be executed without degrading the state of the cache. The following commands are defined as concurrent commands: Test Unit Ready, Inquiry, Request Sense, Read Capacity.

Continuing Commands: Continuing commands are read commands which may request cached data, and kickoff additional cache reads. Only two commands are classified as continuing commands. These commands are Read__6 and Read__10.

Processing Cache ISR TCSs: The Cache Monitor Task Receives TCSs from the Cache ISR, then calls RaCachelsr-Proco to process the TCS.

Cache Monitor Task Deactivation: Control is returned to the Read Task should any SCSI READ command come in which requests non-cache data. Control is returned to the SCSI Monitor Task should caching be terminated due to the occurrence of a SCSI reset, Bus Device Reset Message, conflicting SCSI command, or Drive Attention.

When the Cache Monitor Task is deactivated, control is returned to the Read Task, which may then return control to the SCSI Monitor Task. Control flow is determined by the cache task state set by the Cache Monitor Task. The cache task states are evaluated by the Read Task when it is reinstated via a call to REQUEST__TASK. The three cache task states are described next. 1) RAC__TERM: This state indicates that caching has been aborted. The Read Task will return back to the SCSI Monitor, which immediately returns the READ TCS and fetches the next TCS off the queue. Note that the SCSI Monitor task does not go to STATUS phase as it would normally, because status and command complete has already been sent as part of the transition to the Cache Monitor Task. 2) RAC_CONT: This state indicates that a new READ command has come in, and all or part of the data requested has already been cached. The Cache Monitor task has kicked off a SCSI transfer, and the Read Processor needs to wait for the SCSI TCS to come in. 3) RAC_NEW_REQ: This state indicates that a new READ command has come in and none of the requested data has been cached. The Read Processor needs to kick off a "normal" read and then wait for the TCS from the Read ISR.

RaCacheIsrProco: This routine is called by the Cache Monitor Task, and its purpose is to perform the functions of the Read Task with respect to disk transfers. It processes TCSs from the Cache ISR, updates appropriate parameters in the drive structure, and kicks off additional read operations as required.

StopCacheinProgo: This routine is called by the Cache Monitor Task when it receives a "continuing" READ command. The purpose of StopCacheInProg is to cleanly terminate the current cache process. It checks the CACHE_IN_PROG bit to see if a cache is in progress. If so, the CACHE_STOP bit is set to notify the Cache ISR to terminate caching. After a 5 ms delay to allow the cache to terminate, the CACHE_IN_PROG bit is checked again to see whether the ISR shut down the cache. If the bit is not cleared, it is assumed that the cache was shut down by some other means. In this case, the CACHE_STOP and CACHE_IN_PROG bits are cleared.

RdDataInCache(): This routine is called by the Cache Monitor Task when it starts processing a "continuing" READ command. Its purpose is to determine whether there is a cache hit by the new read request. If there is a cache hit, the CACHE_START_SCSI_XFER bit is set in drv_cfg.cache_ctrl. RdDataInCache also modifies drv_cfg.rw_scsi_blks to reflect how many of the requested blocks have been cached.

If there was a cache hit, but not all the requested data has been cached, RdData-InCache modifies drive structure data to indicate how many blocks have been read, how many are left to be read, and where the read should resume.

Read Ahead Cache Performance Test: Test Description: A cache test program called CT.C was developed. This cache test program runs with the SDS-3(F) host adapter. This program was modified slightly to yield CTT.C. CTT.EXE was used to verify the RMD-5200-SD read ahead cache.

CTT exercised the cache over the first 64K LBAs. A unique pattern is written to each of these LBAs. The pattern consists of all 0X5As, with the first four bytes overwritten with the block's hexadecimal LBA address (except for LBA 0, whose first four bytes are set to 0xFF). CTT first checks LBA 0, and if the expected pattern is missing, the CTT initializes the disk. If LBA 0 matches, then the disk is assumed to be initialized.

After the disk is initialized, CTT performs several passes of sequential reads across the 64k blocks. The same transfer length is used within a pass. The transfer length is then doubled for the next pass. The maximum transfer length use is 64 blocks due to the limited buffer size of the host adapter. A data compare is performed on each read to verify data integrity.

Test Options: Logging Results to a File (Command Line Option): The user can Specify a log file by executing with the command line, C:>CTT -fo=filename.ext. If a log file is specified, any results normally printed to the screen will also be printed to the log file.

Target ID: CTT can test various target IDs, although it cannot do so during the same execution.

Number of Iterations: The user can specify how many times CTT will execute the entire test.

Initial Transfer Length: The user can specify the initial transfer length. On subsequent passes, the transfer length is doubled until the transfer length exceeds 64 blocks.

Pause Between Reads: CTT will always do a pass without pausing between reads. As an option, however, CTT will also do a pass with pauses between reads. This option ensures that the drive has time to do a total or partial cache, depending on the delay. The partial cache was tested to ensure that the drive can stop the cache reliably. The total cache was tested to ensure that the drive stops caching when the buffer is full.

Pause Length: If the pause option has been selected, the user will also be asked for the paused delay time in milliseconds.

Halting on Errors: CTT also inquires whether the test should halt when it encounters an error condition (such as a data miscompare or check condition status). Halting is useful when performing the user is not logging results to a file, such as when testing for frequent errors.

Disc Drive Firmware Architecture

This section describes the architectural changes required to implement Jupiter-I using the Cirrus Logic Optical Disk Controller Chip Set and using the RMD-5200-SD firmware as a baseline.

The Jupiter-I architecture will reduce the number of tasks required in the system. The SCSI Monitor Task (now called the Monitor Task) will control the overall function of the drive. The Read Task and Write Task will be combined into a Drive Task. The functionality of the Read Ahead Cache Monitor Task will be split: the duplication of the monitor functions will be eliminated and the caching functions will be moved to the Drive Task. The specific changes to the (SCSI) Monitor Task and the Drive Task are described above.

Interrupts: The Jupiter-I drive has four categories of interrupt. These include nonmaskable interrupts (NMI), SCSI Interrupts, Drive Interrupts, and Drive Attention Interrupts.

NMIs are generated when the SCSI Bus RESET signal is asserted, when the 20-pin connector ACRESENT is asserted (TBD), or when PWRDNREQ (autochanger power down request) is asserted.

A SCSI interrupt is generated when the first six bytes of a command have been received, when the SCSI Bus Attention signal is asserted, when a SCSI parity error occurs, when a buffer parity error occurs, or when a SCSI transfer has been completed.

A drive interrupt is generated from three possible chips: the SM331, SM330, or External ENDEC. The SM331 interrupts when the format sequencer stops or when an ECC correction vector parity error is detected. The SM330 interrupts in 1x or 2x mode when, a valid ID has been read, a media error occurs, an ECC error occurs, a slipped sector is encountered, the Sector Transfer Count register decrements to zero, or when an Operation complete interrupt is generated. The SM330 interrupts in 4x mode when an ECC error occurs or an Operation Complete interrupt is generated. The External ENDEC interrupts in 4x mode when, a valid ID has been read, a media error occurs, a slipped sector is encountered, the Sector Transfer Count register decrements to zero, an erase or write terminates abnormally, or when an index pulse is generated.

A drive Attention interrupt is generated by the DSP or by Glue Logic IC (GLIC). The DSP will generate a Drive Attention Interrupt when, it fails to properly initialize, a seek fault occurs, an off-track condition is detected, the spindle motor is at speed, and when the spindle motor is not at speed. The GLIC will generate a Drive Attention Interrupt when, the AC Eject is asserted, the front panel eject button is pressed, the Eject Limit signal is asserted, the Cartridge Sensor signal toggles, and when the Cartridge seated Sensor signal toggles.

Multi-Tasking Kernel: Identifying Message Types: The current architecture provides a means to identify the type of a specific message which has been received. Currently, the source of the message is interrogated and the "status" of the message is sometimes used as type. The integer variables for TCS ID, TCS Source ID, and TCS Destination ID will be converted to byte variables. A new byte variable for message type will be added, maintaining the additional bytes as reserved in the TCS header. The message type variable will function as the tag field in a variant record.

Concurrent Processing: Concurrent processing is required for Jupiter-I in order for the drive to, a) perform command queuing, and, b) respond in a multiple initiator environment to a non-media access command when a read or write request has been issued to the Drive Task. The current architecture causes the SCSI Monitor Task to block execution until the Read Task or Write Task has completed processing the current request.

Concurrent processing in Jupiter-I will be achieved by, 1) not allowing the Monitor Task to block after sending a request to the Drive Task, 2) by having all tasks participate in the round-robin scheduling by "sharing" the CPU resource, and 3) by allowing the Monitor Task to preempt the Drive Task or Low-Level Task when a non-disconnecting command is received. To implement 1) above, the Monitor Task will use a new kernel service to send the request to the Drive Task. The current way that the tasks register for which task is to receive a message when a Drive Attention occurs will need to change. Drive Attention message routing will be discussed below in detail. Item 20, round-robin scheduling, will be implemented as described in the following section. Item 3), preemption, will be implemented as described after the following section. It should be noted that if preemption is not implemented, a semaphore will be required to manage the SCSI interface. New kernel services will be required to test, test & set, and clear the SCSI_in_use semaphore.

Round-Robin Scheduling: In order for each task to have "equal" access to the CPU resource, each task must give up the CPU at periodic intervals. This is already accomplished to some extent when a task's execution blocks while it waits for the next message to arrive in its queue. With the requirement for concurrent processing, the latency from the time the Monitor Task needs to run and the time the Drive Task surrenders the CPU needs to be minimized. The latency issue is addressed in the next section on preemption.

When preemption is not required, the CPU will be voluntarily shared between the tasks. The kernel call to wait for the next message causes the current task to block while the kernel searches for a ready task. The scheduling latency while the kernel performs this search will be minimized by 1) reducing the number of tasks to be checked, and 2) by reducing the possible stats a task may be in. The number of tasks will be reduced by eliminating a Read Ahead Monitor Task an by combining the separate tasks for reading and writing each media type into a signal task. Task consolidation is described below in further detail.

The set of possible states for a task currently includes the "wait for a specific message" state. With the concurrent processing requirement, this state would be invalid and will therefore be removed from the system. There will be only three possible states: active, waiting for a message, and sleeping. The kernel code checking for a sleeping task and checking for a task waiting for a message is already highly optimized. A Ready List of tasks ready to resume will not add any significant performance increase. The kernel will require an additional 11 s to test the additional two tasks before returning to check the original task.

Preemption: The Jupiter-I architecture needs to be preemptive to the degree that a non-disconnecting command received during a disconnected media access command can cause the Monitor Task to preempt the Drive Task or the Low-Level Task. There is no requirement as yet for the Drive Task to preempt the Monitor Task or the Low-Level Task. It is herein proposed that it is better to cause the Drive Task to restart some portion of its processing rather than delay a non-disconnecting command by tens or many tens of milliseconds.

Sections of code need to be identified within the Drive Task and Low-Level Task (especially the heroic recovery routines) which require that processing be restarted for that section if the task were to be preempted. The Drive Task and Low-Level Task will register themselves at the beginning of those sections of code to identify where to restart from. This is similar to registering for Drive Attentions. If the Drive Task or Low-Level Task is the active task but not registered, the task is assumed to be fully preemptable. That is, the task can be interrupted and later resume from the same point without any ill effects.

When a new command is received by the SCSI ISR, a new kernel call will be made on exit from the ISR to determine if preemption is required and if so, to dispatch. If the Monitor Task was the current task before the SCSI ISR ran, no preemption is required. If the Drive Task or Low-Level Task was the current task, it will be preempted.

When a new non-disconnecting command is received by the SCSI ISR while the drive is processing a disconnected media access command, the ISR will on exit call the new kernel service routine to detect whether a task has registered itself. If not registered, the task will be preempted by the Monitor Task and will resume at the point it was interrupted when the round-robin scheduling resumes. If the task is registered, the kernel will, a) shut down the drive, b) take the drive out of Spiral Mode (now a Drive Command to the DSP), c) vector the Drive Task or Low-Level Task to restart at the registered address, and d) transfer execution to the Monitor Task. After the Monitor Task processes the new command, it will make a kernel call to wait for the next message. The kernel will then enter the Idle Loop looking for a ready task. The Drive Task or Low-Level Task will still be ready, the kernel will dispatch to it, and execution will resume from the registered address with a value in AX indicating that a restart took place.

Any media access where the CPU is monitoring in real time some aspect of the disk (e.g., waiting for a sector mark) will be disrupted if preempted by the Monitor Task. These sections of code would need to be managed by registering for a restart if preempted.

Once the Drive Task or Low-Level Task have kicked off the media access, the hardware and the disk ISR will continue the burst, cause it to terminate cleanly, and send a message to the task to indicate that the burst has been completed. The task is then responsible for dequeuing the message and kicking off the next burst. Preemption after the hardware has been kicked off will not produce any drive control problems.

During an implied seek for a media access, the seek code disables SCSI interrupts, tries to read an ID, and waits up to 16 milliseconds for an ISR to read an ID which has been latched. During this 16 milliseconds, the SCSI ISR cannot run which means that the SCSI Bus is potentially held in the middle of the Command Phase (after the first six bytes have been read by the SM331). In the case where the seek is successful, SCSI interrupts will remain disabled from the time that the seek code starts to read an ID until after the seek code returns to the setup code (e.g., gcr__StartRdVfy), after all the registers have been set up, and after the sequencer has been started. To better handle this condition, the new architecture will allow the Monitor Task to preempt the seek. This will be accomplished by registering the seek code for preemption and then enabling SCSI interrupts. If a SCSI interrupt (requiring preemption) occurs while the seek is in progress, the DSP will complete the seek and then place the drive in Jump Back. (This assumes that the DSP can queue up the Disable Spiral command while it completes the seek.) If a SCSI interrupt (requiring preemption) occurs after the seek has completed but before the hardware has been kicked off, the code should restart at its registered address and eventually perform a reseek. If a SCSI interrupt occurs after the hardware has been kicked off, the media access is fully preemptable and therefore no longer needs to be registered.

Stack Size: The stack size for each task is currently set at 512 bytes. With the increased modularity anticipated for Jupiter-I and the additional layers required to manage queued commands, caching, etc., it may be required to increase the stack size to 1024 bytes. With the reduction of the number of tasks to three, the memory allocated to stack actually decreases.

Drive Configuration Structure: Identification of Media Type: The firmware will need to determine which type of media has been inserted into the drive in order to dispatch to the appropriate routines for each media type. Separate bits in the Drive Configuration variable "inited" will be used for each of the media types: 1x, 2x, and 4x.

Drive State Variable: With the requirement for concurrent processing described above, the Monitor Task needs to be able to determine the current state of the drive and to issue the appropriate message corresponding to the newly arrived event. This will be a accomplished by introducing a new "drive state" variable which will be solely maintained by the Monitor Task. Table 44 below lists the possible drive states.

TABLE 44

| Drive States |
|---|
| Power Up, Phase I (no selections) |
| Power Up, Phase II (busy) |
| Power Down |
| Soft Reset |
| Hard Reset |
| Loading Cartridge |
| Spinning Up |
| Spinning Down |
| Ejecting Cartridge |
| Idle |
| Seek |
| Format |
| Read, With Caching |
| Read, Without Caching |
| Read Cache |
| Write |
| Write Cache |

TABLE 44-continued

| Drive States |
|---|
| Flush Write Cache, then Power Down |
| Flush Write Cache, then Eject Cartridge |
| Flush Write Cache, then Reset |

Drive Task can change state from "Read" to "Read, Connected" or "Read, Disconnected".

Power On Self Test: ROM Checksum: The Rom Test currently computes the checksum for the single EPROM. With Jupiter-I's dual chip design, the range for the ROM checksum must include the address range for both chips. The address range for both chips is 0xC0000 to 0XFFFFF.

Buffer RAM Diagnostic: The Buffer RAM diagnostic will take considerably longer with 4MB of Buffer RAM. Jupiter-I is required to be capable of handling a SCSI selection after 250 milliseconds. The firmware currently has a two-phase initialization. Phase I Initialization is where no selections are allowed while the drive is performing its diagnostics (currently including the Buffer RAM diagnostic). Once the basic drive integrity has been established, the drive enters Phase 11 Initialization where it can handle a selection and respond only to a Test Unit Ready or Inquiry Command. During Phase II, the drive is reading the EEPROM, initializing the Inquiry Data, the Mode Page Data and various other data structures. It is during the Phase II Initialization where the Jupiter-I 4MB Buffer RAM Test should be performed.

RAM Diagnostic: If the RAM diagnostic for both SRAM chips takes too long, the test could be divided and the remaining portions performed during the Phase II Initialization as described above for the Buffer RAM Test.

Autochanger Reset: If the drive detects that Autochanger Reset is asserted, the drive must wait for Autochanger Reset to be deasserted before attempting to read the 20-pin connector for the SCSI ID to use and whether to enable SCSI Parity. The Jupiter-I drive can perform all of its Phase I Initialization while Autochanger Reset is asserted. When the drive is ready to initialize the SCSI portion of the SM331, it will examine the GLIC chip to see if the 20-pin connector is attached. If not attached, the SCSI ID and whether SCSI Parity is enabled are determined by the option jumpers. If the 20-pin connector is attached, the drive will poll the GLIC chip to monitor the actual level of the Autochanger Reset. When Autochanger Reset is deasserted, the signals from the 20-pin connector will determine the SCSI ID and whether SCSI Parity is enabled.

Boot Task: Initialization Code: The code for the Phase II Initialization is contained within the Boot Task. The Boot Task performs the initialization, creates the other drive tasks, and then replaces itself with the code for the Monitor Task. It takes some amount of time to overlay the Boot Task with the Monitor Task. Jupiter-I instead will place the Phase II Initialization code in a routine which will be the first executed within the Monitor Task. After the initialization is performed, the Monitor Task will proceed on to the code it normally executes. Due to the control loops defined in each of the tasks, execution for the task never leaves the loop. The initialization code will be placed before the task loop and will, therefore, only be executed once when the task is originally created by the kernel.

Single Read and Write Task: The current architecture has separate tasks for 1x read, 2x read, 1x write, and 2x write. There can never be more than one type of media installed at a time. Only one function, read or write, can be performed at a time. Therefore, there only needs to be one media access talk, the Read/Write Task.

The Phase II initialization code will only create a single read/write task referred to in this discussion as the Drive Task. The sections below provide further detail.

Cartridge Initialization: Cartridge Initialization is performed at power-on time when a cartridge is already present in the drive or after poweron when a cartridge is inserted. The current architecture preforms the initialization at poweron time as part of the Boot Task. When a cartridge is inserted after poweron, the initialization is performed as part of the Drive Attention Handler which is an Interrupt Service Routine (ISR). Due to the new structure of interrupts from the DSP and timeout messages, the Cartridge initialization function must be performed by a task so that it can receive a message in its queue. (Only tasks have queues.) The Phase II Initialization code will now send a message to the Drive Task to perform the cartridge initialization at poweron and when a cartridge is inserted. Cartridge initialization is discussed below in further detail.

(SCSI) Monitor Task: Concurrent Processing

Drive State Management and Control: The Monitor Task is now responsible for maintaining the "drive state" variable. The following subsections describe the relationship between the SCSI Commands received, the drive state, and various messages used throughout the drive architecture. As previously mentioned, Table 44 above provides for a list of the drive states.

Non-Media Access Commands: The Monitor Task will remain responsible for executing non-media access command, such as Test Unit Ready, Inquiry, and Mode Sense.

Start/Stop Spindle Command: In the current architecture, the SCSI Monitor Task executes the Start/Stop Spindle Command. In order to provide concurrent processing while the command is being executed, this command must be performed by a separate task. For consistency in the architecture when performing cartridge initialization, "Spindle Start/Stop Request" messages will be sent to the Low-Level Task. Prior to sending the message, the Monitor Task will set the drive state to either "Spinning Up" or "Spinning Down". For discussion of the Low-Level Task, see below.

SCSI Seek: The SCSI Seek Command will now be handled by the Drive Task. This is required in order for the Monitor Task to be able to support the concurrent processing of new commands as they are received. The Monitor Task will change the drive state to "Seek" and send a message to the Drive Task to perform the seek. The Drive Task will return a "Seek Status" message to the Monitor Task to indicated that the request has been satisfied.

Media Access Commands: The Monitor Task will be responsible for sending a message to the Drive Task for each of the read, verify, erase, write, write/verify, and format commands. The Monitor Task will set the drive state to "Read", "Write", or "Format" as required. The Monitor Task will not block its execution while waiting for the Drive Task to satisfy the request. The Drive Task will return a status message to the Monitor Task to indicate that the request has been satisfied.

Read State and Caching: When a read request is received from an initiator, the Monitor Task will check if the current Mode Page 08h has read caching enabled. If enabled and there are no other commands in the queue, the Monitor Task will send a message to the Drive Task to begin processing the read request and to start the Read Ahead cache when done. The drive state at that point will be changed to "Read, With Caching". If other commands were present in the queue, the Monitor Task would determine whether the next command precluded caching. If so, the message sent to the Drive Task to begin processing the read request and to start the Read Ahead Cache when done. The drive state at that point will be changed to "Read With Caching". If other commands were present in the queue, the Monitor Task would determine whether the next command precluded caching. If so, the message sent to the Drive Task would indicate that caching was not to be started and the drive state would be set to "Read, Without Caching".

If read caching were enabled and started, and then another command were to be received, the Monitor Task (executing concurrently) would determine whether the Read Ahead Cache should be stopped. If the command received were, for example, a write request, the Monitor Task would send a message to the Drive Task to abort the Read Ahead Cache and invalidate any data in the cache. If the command received were a read request, the Monitor Task would send a message to the Drive Task to stop the Read Ahead Cache and retain the data in the cache. The related issue of handling Drive Attention messages will be addressed below.

Write State and Caching: When a write request is received from an initiator, the Monitor Task will check if the current Mode Page 08h has vote caching enabled. If enabled and there are no other commands in the queue, the Monitor Task will send a message to the Drive Task to process the write request as required. The drive state at that point will be changed to "Write Request, With Caching". If other commands were present in the queue, the Monitor Task would determine whether the next command precluded caching. If so, the message sent to the Drive Task would indicate that caching was not appropriate and the drive state would be set to "Write Request, Without Caching".

If write caching were enabled and another command were to be received, the Monitor Task (executing concurrently) would determine whether the Write Cache should be stopped. If the command received were, for example, a read request, the Monitor Task would send a message to the Drive Task to stop the Write Cache and flush any data in the cache to the media. If the command received were a write request, the Monitor Task would take no action except to queue the command for processing after the current request is satisfied. The related issue of handling Drive Attention messages will be discussed below.

Catastrophic Events: Catastrophic Events are defined as a SCSI Bus Reset or a Power Down Request from the autochanger. When one of these events occurs, the NMI ISR will be invoked to send a message to the Monitor Task. Based upon the drive state, the Monitor Task will take the corrective action described below.

When a "SCSI Bus Reset" message is received, the Monitor Task will examine the current drive state. If the drive is currently in the "Write" state, a "Flush Write Cache" message is sent to the Drive Task and the drive state is changed to "Flush Write Cache, then Reset". When the Drive Task returns a "Flush Status" message, the Monitor Task will examine the Reset Bit in byte 14 of the Vendor Unique Mode Page 21h. If a hard reset is configured, the Monitor Task sets the drive state to "Hard Reset" and then initiates a hard reset by jumping to the boot address (0FFFF0h). If a soft reset is configured, the Monitor Task sets the drive state to "Soft Reset" and then initiates a soft reset. When a "SCSI Bus Reset" message is received and the drive is currently in the "Read" state, the Monitor Task will examine the Reset Bit in byte 14 of the Vendor Unique Mode Page 21h and initiate a hard or soft reset as indicated.

When a "Power Down Request" message is received, the Monitor Task will examine the current drive state. If the drive is currently in the "Write" state, a "Flush Write Cache" message is sent to the Drive Task and the drive state is changed to "Flush Write Cache, then Power Down". When the Drive Task returns a "Flush Status" message, the Monitor Task will change the drive state to "Power Down" and assert the PWRDNACK signal on the 20-pin connector. When a "Power Down Request" message is received and the drive is in the "Read" state, the Monitor Task will set the drive state to "Power Down" and assert the PWRDNACK signal on the 20-pin connector. Note: additional actions to take after asserting PWRDNACK or remaining constraints.

Command Queuing: Note: tagged or untagged queuing. Each of these matters are design considerations which would not effect one of skill in the art from practicing the present invention as herein enabled and disclosed.

Drive Task: The Drive task will perform the cartridge initialization, SCSI seek, and all media access and caching functions. A single task is required because only one type of media access can occur at a time and one type of caching is supported at a time. The Monitor Task will send messages to the Drive Task to request the appropriate service.

Servicing SCSI Commands: When the Drive Task receives a message requesting service for a SCSI command (seek, read/verify, erase/write, or format), the firmware for the Drive Task will branch to the appropriate path for reading, writing, or formatting and then again for 1x, 2x, or 4x media format. The code for each media type will still be maintained as a separate set of modules for maintainability and stability reasons as before.

Cartridge Initialization: The cartridge initialization function will be performed by the Drive Task when a message is received from the Monitor Task at poweron time. When a cartridge is inserted after poweron, the Drive Attention Handler will send a "Cartridge Inserted" message to the Monitor Task. The Monitor Task will chance the drive state to "Loading Cartridge" and send an "Initialize Cartridge Request" message to the Drive Task. The Drive Task, in turn, will send a "Spindle Start/Stop Request" message to the Low-Level Task as described below. Once the cartridge has been successfully loaded and spun up to speed, the Drive Task will determine the cartridge type and media format, read the four Defect Management Areas (DMA), rewrite any DMA as required, and initialize the defect management structures. When the initialization process is complete, the Drive Task will return an "Initialize Cartridge Status" message to the Monitor Task. The drive state will then be changed to "Idle".

Read and Read Ahead Cache: The read code within the Drive Task is responsible for managing the read process, the Read Ahead Cache, determining when a hit has taken place, or deciding to access the media. Messages from the Monitor Task will control the actions of the Drive Task to read, cache, or not cache.

When the Drive Task receives a message to perform a read, the message will indicate whether caching should be started after the read has completed. A "Read Request, without caching" message indicates that the Drive Task should not plan to cache any data. A "Read Request, with caching" message indicates that the Drive Task should plan to extend the read with caching. When either of these messages has been received by the Drive Task, the Monitor Task will already have set the drive state to the appropriate read state.

Figure 122:
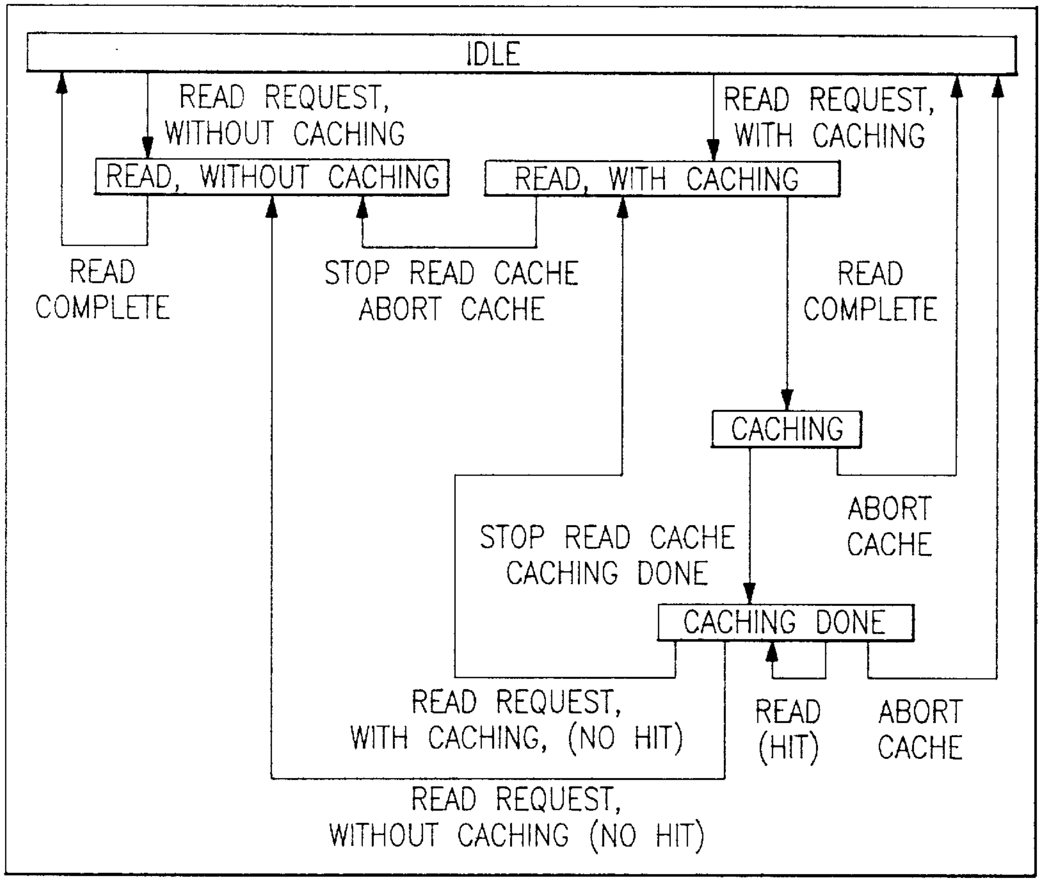

The Drive Task may receive other messages while performing the non-cached read to ignore the initial caching request and not extend the read. If a "Stop Read Cache" message is received, the Drive Task will only satisfy the non-cached portion of the read. If caching has not already begun the Drive Task will not start the read ahead. If caching has already begun, the read ahead will be shut down and all cached data will be retained. The Read Mode state diagram is illustrated in FIG. 122. If an "Abort Read Cache" message is received, the Drive Task will only satisfy the non-cached portion of the read. If caching has not already begun, the Drive Task will not start the read ahead. If caching has already begun, the read ahead will be shut down and all cached data will be invalidated.

The Read Ahead Cache will buffer the sectors from the last LBA, ABA or track sector until 1) a "Stop Read Cache" or "Abort Read Cache" message is received, 2) the maximum prefetch is satisfied, 3) no free space remains in the Buffer RAM, or 4) a sector cannot be recovered within the current thresholds.

The Drive Task, by necessity, must keep the Drive Attention Router (DAR) token. If a Drive Attention occurs while performing the read ahead, the Drive Task must be made aware of the attention condition, take the appropriate actions to clear it, and begin recovery operations. The management of the DAR token is described below.

Figure 123:
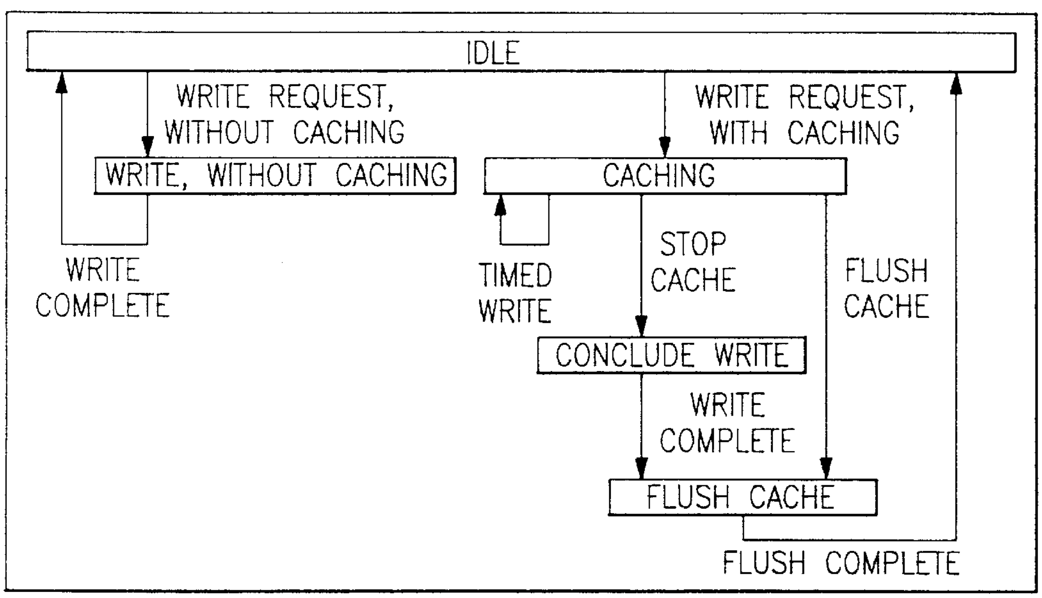

Write Cache: This discussion is provided in conjunction with reference to FIG. 123. The write code within the Drive Task is responsible for deciding when to access the media, managing the Write Cache, managing the Write Cache buffer latency, and flushing the Write Cache. Messages from the Monitor Task will control the actions of the write process.

When the Drive Task receives a message to perform a write, the message will indicate whether the data may be cached. A "Write Request, with caching" message indicates that the Drive Task may cache the data depending upon the Immediate Flag in the CDB and the current contents of the Write Cache. A "Write Request, without caching" message indicates that the Drive Task may not cache the data under any circumstances.

The Drive Task may receive other messages while performing a cached write to flush the contents of the Write Cache. If a "Stop Write Cache" message is received, the Drive Task will satisfy the current write request and then flush all cached data to the media. If a "Flush Write Cache" message is received, the Drive Task will satisfy the current write request if one is in progress and then flush all cached data to the media, or if no request is in progress, all cached data will be flushed to the media.

The function of the Write Cache is to take advantage of the coherency of data from multiple SCSI write requests. Sectors from multiple requests which are contiguous can be combined into a single media access which offers less processing overhead. Sectors which are contiguous may be cached. Sectors which are not contiguous cause the sectors which have been in the cache the longest to be transferred to the media.

Data is allowed to remain in the Buffer RAM up to the maximum time as specified in the Maximum Buffer Latency in Mode Page 21h. When a write request is cached, the Drive Task will request that the Timer Service send a message after the time specified in the Maximum Buffer Latency has expired. If the Drive Task receives the timeout message before the data has been transferred to the media (due to the non-contiguous nature of subsequent requests), the Drive Task will begin to transfer the data (and all contiguous data) to the media. If the data was forced to be transferred to the media due to non-contiguous sectors, the Drive Task will request that the Timer Service not send the timeout message previously requested.

Only one timeout is required at any one time to monitor the buffer latency. The single timeout is for the first write request which is cached. If a following request is contiguous, that request would be cached with the first and written to the media when the first request would be, hence a single timeout. If the following request were not contiguous, the first request would be written to the media, its timeout canceled, and a new timeout requested for the following request. Only a single timeout is therefore required.

The Drive Task, by necessity, must keep the Drive Attention Router (DAR) token. If a Drive Attention occurs while performing the Write Cache, the Drive Task must be made aware of the attention condition, take the appropriate actions to clear it, and begin recovery operations. The management of the DAR token is described below.

Low-Level Task: The Low-Level Task in the current design is responsible for handling system requests to read, verify, erase, write or heroically recover sectors. These requests are used during the reading of the Defect Management Areas, during the reassignment of a sector, during the automatic reallocation of a sector, during the recovery of write errors, and during the heroic recovery of read errors. New responsibilities for the Low-Level Task will include handling Spindle Start/Stop Requests, and Eject Cartridge Requests.

With the requirement for concurrent processing, the Monitor Task is no longer able to poll for the spindle or eject events while it waits for new SCSI commands or a timeout. Consequently, these functions have been moved to the Low-Level Task. The Low-Level Task has its own task queue and can block while waiting for the various events to occur.

When the Low-Level Task receives a “Spindle Start/Stop Request”, it will issue Drive Commands to start or stop the spindle and then monitor for a timeout. When a start spindle Drive Command is received, the Drive Command firmware will issue the appropriate speed command to the spindle motor control chip. A command will be issued to the DSP to monitor the spindle speed and issue an interrupt when the spindle has attained the required minimum speed.

To monitor the time required for the spindle start function, the Low-Level Task will issue a request to the Timer Service to receive a message in (TBD) seconds. The Low-Level Task will then wait for one of two messages. When the DSP presents the interrupt for the spindle at speed, the Drive Attention Handler will be invoked. The Low-Level Task, as the registered recipient for the Drive Attention messages, will receive the “Spindle At Speed” message. The Timer Service will be notified that the spindle timeout message is no longer required and a “Spindle Start/Stop Status” message will be returned to the Monitor Task. If the spindle timeout message is received, the spindle motor has not come up to speed. A Drive Command will be issued to stop the spindle and a “Spindle Start/Stop Status” message will be returned to the Monitor Task. It is presently proposed whether is it necessary to monitor the stop spindle function.

Timer Service: A new service available with Jupiter-I is the system Timer Service. The Timer Service has the dedicated use of Timer 1 and Timer 2 (as the presacler). Timer 0 is available for use at any time by the firmware. The Timer Service is responsible for sending a message to the requester after a specified time has elapsed. When multiple requests overlap, the Timer Service is responsible for managing the separate requests and producing messages at the correct times.

The Timer Service will accept two types of requests: Insert Timer Event and Remove Timer Event. When an Insert Timer Event request is received and there are no other outstanding requests, the Timer Service will start the timers for the total number of clock ticks specified, enable the timer interrupt, place the request at the head of its timer event list, and return to the caller with a handle for the timer event. When the timer interrupt occurs, the Timer Service will remove the request from the head of the timer event list and send a message to the requester. When the Timer Service receives a request for a timer event when one or more requests are outstanding, the Timer Service will place the request in the timer event list in the proper order, ranked by increasing period of delay. All timer events in the list will be managed with delta times. When a new timer event is requested which places it in before an existing request, the existing request and all later events in the list will have their delta times recomputed. If a new request is received with a smaller timeout than the event currently at the head of the queue, the timers will be reprogrammed and the new delta will cascade down the event list.

When a Remove Timer Event request is received, the Timer Service will use the handle returned from the Insert Timer Event request to identify the timer event and remove it from the timer event list. If the removed event was at the head of the timer event list, the timers will be reprogrammed for the remaining time on the next event in the list and the new delta will cascade down the event list. If the removed event was in the middle of the list, the delta for the removed event will cascade down the event list.

NMI ISR: When a SCSI Bus Base or a Power Down Request from the autochanger event occurs, the NMI ISR will be invoked. The ISR will interrogate the Glue Logic IC (GLIC) to determine the source of the interrupt and then send a message to the Monitor Task. Based upon the message received, the Monitor Task will take the corrective action described above.

If the SCSI Bus Reset bit in the GLIC (TBD) register is asserted, the NMI was caused by the SCSI Bus Reset line being asserted and a “SCSI Bus Reset” message will be sent to the Monitor Task. If the Autochanger Reset bit in the GLIC (TBD) register is asserted, the NMI was caused by the Autochanger Reset line being asserted and a “Autochanger Reset” message will be sent to the Monitor Task. If the Autochanger Power Down Request in the GLIC (TBD) register is asserted, the NMI was caused by the Autochanger PWRDNREQ line being asserted and a “Autochanger Power Down Request” message will be sent to the Monitor Task.

Drive Attentions: A Drive Attention is an exception event relating to the drive such as an off track, seek fault, or eject request. This section addresses the mechanisms required to notify the firmware that a Drive Attention has occurred and which messages will be generated under which conditions.

Drive Attention Notification: When a Drive Attention occurs, different recovery procedures may be required depending upon what the drive was doing when the event occurred. For example, if the drive were sitting idle and happened to be bumped enough to produce an off track, no recovery is necessary. If on the other hand, a read had been in progress, the drive would need to reseek and then continue the read operation.

Only the current task interfacing with the drive is aware of the appropriate measures to take for recovery based on what that task was doing. Therefore, notification that a Drive Attention occurred must be delivered to the current task interfacing with the drive. As this may not always be the current task executing, each task must identify when it is responsible for Drive Attentions. The first notification mechanism, therefore, is sending a message to the responsible task when a Drive Attention does occur. The responsible task is identified by a variable task__id__router which is cooperatively managed by all tasks.

The first mechanism relies on each task waiting to receive messages, one of which may be a Drive Attention message. If the firmware is not expecting a message, stopping to poll the queue can be a significant loss of compute power. A second mechanism for notification is also used which does not rely on a task polling for a Drive Attention message. At critical points in the firmware, a task can register a section of code to be vectored to if a Drive Attention occurs. If no Drive Attention does occur, no additional time beyond the register/unregister is required.

Drive Attention Handling and Concurrency: The Drive Attention Handler executes as an ISR, a small core ISR first with interrupts disabled and then a larger handler with interrupts enabled. The following Example 1 will provide an illustrative scenario.

EXAMPLE 1

A seek is in progress and SCSI interrupts are disabled. The drive has a seek fault and so a Drive Attention occurs. The Drive Attention Handler will run as an ISR. If another SCSI command were to come in, the first six bytes would be handled by hardware. Any remaining bytes would wait to be PIO'd in the SCSI ISR until after the Drive Attention reenabled interrupts. As the drive is seeking, SCSI interrupts will still be masked off. Therefore, all the time that the recovery is being performed by the Drive Attention Handler (including recals if required), the SCSI bus could be held in the middle of a command.

Drive Attention Events and Messages:

Determines source of attention.

Sends message to currently registered recipient for Drive Attention messages.

Sends messages for AC Eject Request, Front Panel Eject Request, Spindle At Speed, and Eject Limit.

Does not perform automatic spin up and initialization when cartridge inserted.

Drive Attention Routing and Caching: Monitor Task sends TCS to kill Read Ahead Cache when Drive Attention Router token is needed.

The Drive Task must remain registered as the task to receive Drive Attention messages while it is performing the Read Ahead Cache. If a Drive Attention were to occur (e.g., an off track), the Drive Task would need to take corrective action. The Monitor Task will need to send a message to the Drive Task to tell it to abort and return the Drive Attention Router token.

SCSI Transfer: PIO Mode: If transfer is greater than (TBD) bytes, copy the data to the Buffer RAM and then DMA it out from there.

SCSI Messages: Bus Device Reset, Terminate I/O, and Abort.

Events: List of Events.

Message Types:

Current TCS Sources Types

SCSI__TCS Pass request from Monitor Task to Drive Task

ATTN__TCS From Drive Attention Handler

LL__RD__TCS Request for Low-Level Read

LL__WR__TCS Request for Low-Level Write

ERCVRY__TCS Request for Sector Error Recovery

To be replaced by:

Messages

SCSI Bus Reset

Autochanger Reset

Autochanger power Down Request

Drive Attention TCSs

- Error (Seek Fault, Off Track, Cartridge Not At Speed, etc.)
- Cartridge in Throat
- Cartridge on Hub
- Eject Request (autochanger or front panel)
- Eject Limit Spindle At Speed Timer Event Request Timer Event Occurred Spindle Start/Stop Request Spindle Start/Stop Status(OK, Fail)

Eject Cartridge Request

Eject Cartridge Status (OK, Fail)

Initialize Cartridge Request

Initialize Cartridge Status (OK, Fail; type of cartridge)

Drive Attention Router (DAR) Token

Return Drive Attention Router (DAR) Token

DAR Returned

Seek Request

Seek Status (DAR Token returned)

Read Request, with caching

Read Request, without caching

Read Status

Stop Read Cache (Read Request will follow)

Abort Read Cache, flush Read Cache

Write Request, with caching

Write Request, without caching

Write Status

Stop Write Cache (finish write and flush Write Cache)

Timed Write Request (write selected portion of Write Cache to medium)

Flush Write Cache (Reset or Power Down Request)

Flush Status

Hardware Requirements: 1) 2K RAM to shadow the NVRAM for quick access to saved data. (Helps to meet requirement for non-disconnecting commands (i.e., Mode Sense and Log Sense.) 2) Elapsed Time Counter for power-on hours.

Electronics

The drive electronics consist of three circuit assemblies: an integrated spindle motor circuit shown in FIGS. 101A–101G, a flex circuit with pre-amps shown in FIGS. 102–105, and a main circuit board containing a majority of the drive functions shown in FIGS. 106A through 119.

The Integrated Spindle Motor Board

The spindle motor board has three functions. One function is to receive the actuator signals on connector J2, FIG. 101A, and pass them to the main board through connector J1, FIG. 101G. Other functions on the board are a brushless spindle motor driver and a coarse position sensor preamp. These features are described in detail below.

With continued reference to FIGS. 101A–G, the circuit shown drives the spindle motor. This spindle driver circuit contains U1, FIG. 101F, which is a brushless motor driver, and miscellaneous components for stabilizing the spindle motor (motor not shown). U1 is programmable and uses a 1 MHz clock which is supplied from the main board. U1 sends a tack pulse on the FCOM signal to the main board so the main board can monitor the spindle speed.

The circuit shown in FIGS. 101A–G also functions to generate a coarse position error. Operational amps U2 and U3 generate the error signal. U2 and U3 use a 12 volt supply and a +5 volt supply. The +5 volt supply is used as a reference. A reference signal propagates through a ferrite bead into inputs pins 3 and 5 of U3, which have 487K feedback resistors R18 and R19 with 47 picofarad capacitors C19 and C20 in parallel. Two transimpedance amplifiers U3A and U3B receive an inputs from a position sensitive detector located on the actuator (not shown). The detector is similar to a split detector photodiode. Amplifier U2A differentially amplifies the outputs from U3A and U3B with a gain of 2. The output of U2A is sent to the main circuit board as a course position error.

The other operational amp U2B has a reference level on input pin 6 generated by resistors R23 and R17. That reference level requires that the summed output of the transimpedance amplifiers U3A and U3B, the sum of those two as seen at node 5 of U2B, will be the same as what is seen on node 6 from the resistor divider R23 and R17. A capacitor C21 in the feedback causes U2B to act as an integrator thereby driving the transistor Q3 through resistor R21. Q3 drives an LED which shines light on the photodiode (not shown). This is basically a closed loop system guaranteeing that certain levels of voltage out of transimpedance amplifiers U3A and U3B.

Referring again to FIGS. 101A–G, the other function on this board is the motor eject driver. The motor driver is a Darlington Q1, FIG. 101E, current limited by transistor Q2 as determined by resistor R7. Diode D1 and C11 are noise suppression for the motor (not shown). The position of the cartridge eject mechanism is detected through hall effect sensor U4, FIG. 101D, and functions to determine the position of the gear train until the cartridge is ejected. There are also three switches WP-SW, CP-SW, and FP-SW on the board to detect whether the cartridge is write protected, whether there is a cartridge present, and whether the front panel switch requests that the main processor eject a cartridge.

Pre-amplifiers

Described here are two embodiments of pre-amplifiers. Common elements are shown in FIGS. 102A–D and 103A–D. Differing elements between the two embodiments are shown in FIGS. 104A–105B.

The optics module flex lead, shown in FIGS. 102A–105B, has three main functions. One is a servo transimpedance amplifier section; a second is the read channel read preamplifier; and, the third is the laser driver.

Figure 102A:
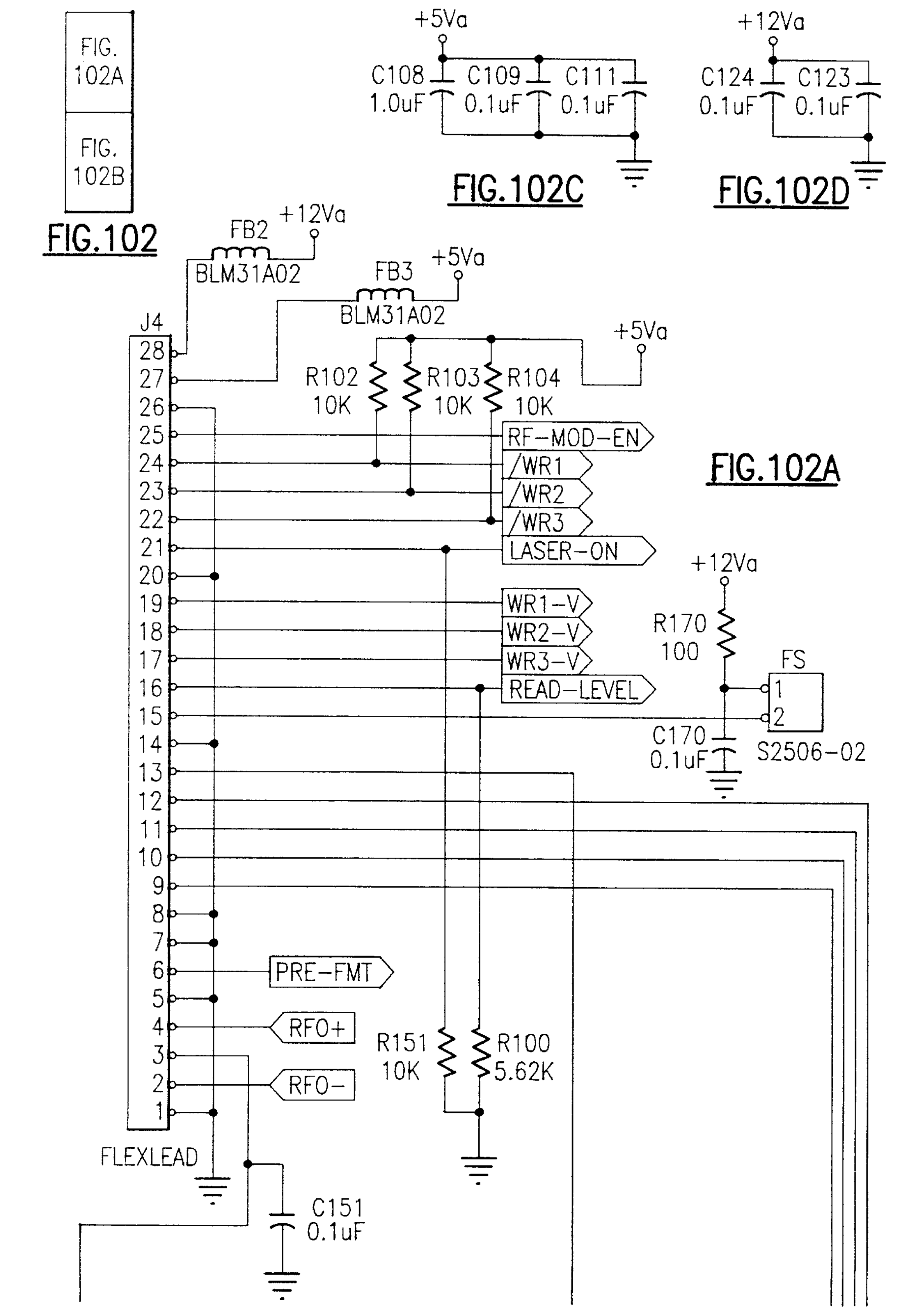
Figures 102B, 102E:
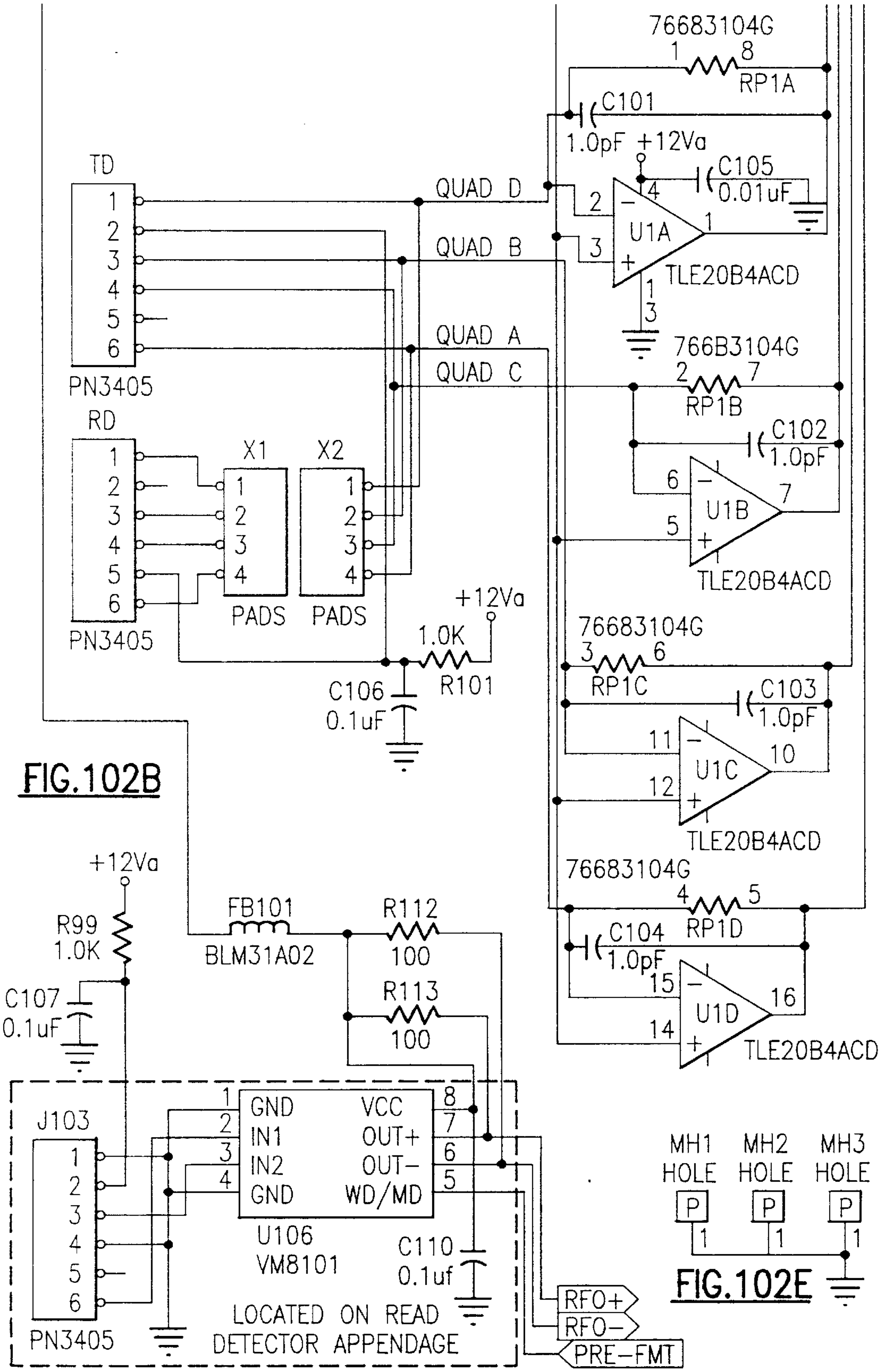

In FIG. 102A is shown the connector J4 and the signals coming out of U1, FIG. 102B, are the transimpedance signals. TD and RD are two quad detectors for the servo signals. During initial alignment, X1 is not connected to X2 so that the individual quads can be aligned. After that, X1 pin 1 is connected to X2 pin 1, X1 pin 2 to X2 pin 2, etc. The sums of currents of the two quads are then transimpedance amplified through amplifier U1A through U1D. Four quad signals create the servo signals on the main board. The transimpedance amplification U1A–U1D is done with 100k ohm resistors RP1A, RP1B, RP1C, and RP1D with 1 picofarad capacitors C101–C104 in parallel.

A photodiode FS, FIG. 102A, is a forward sense diode. The forward sense current is an indication of the power coming out of the laser, and is communicated to the main board via connector J4 on pin 15.

Referring to FIG. 102B, it is shown that U106 is connected to J103. J103 is another quad detector of which two of the four quads are used to generate the differential MO (magneto optics) signal and the sum signal. The VM8101, U106, is a pre-amp specifically made for MO drives and is also a transimpedance amplifier. The read +/− signals from U106 can be switched between a difference and sum signal by the preformat signal coming in from the connector J103, pin 6.

FIGS. 103A–D show the level translators U7B, U7C, and U7D for the write level. U7B, U7C, and U7D are three differential operational amps that are also compensated to be stable with large capacitive loads. The resistors and capacitors around U7B, U7C, and U7D preform the stabilization. The differential amplifiers U7B, U7C, and U7D have a gain of ½ to set up write levels for transistor bases Q301, Q302, Q303, Q304, Q305 and Q306 which are shown in FIGS. 104A–B. There are three write levels: write level 1; write level 2; and write level 3 which allow the invention to have different write levels for different pulses in the pulse train that will write the MO signals.

Figure 103B:
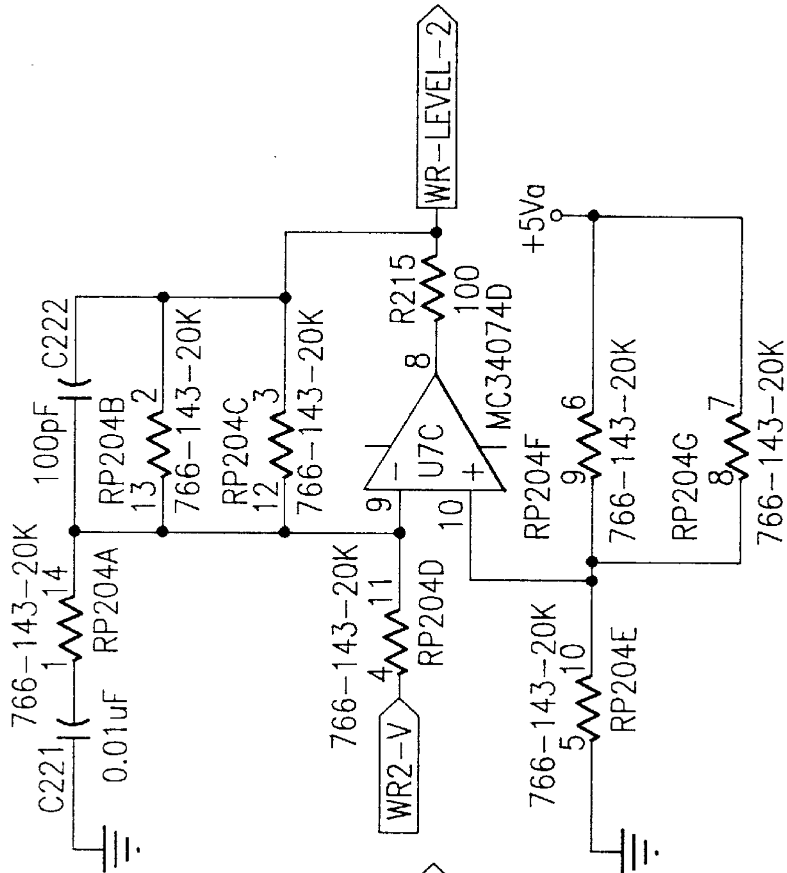
Figure 103A:
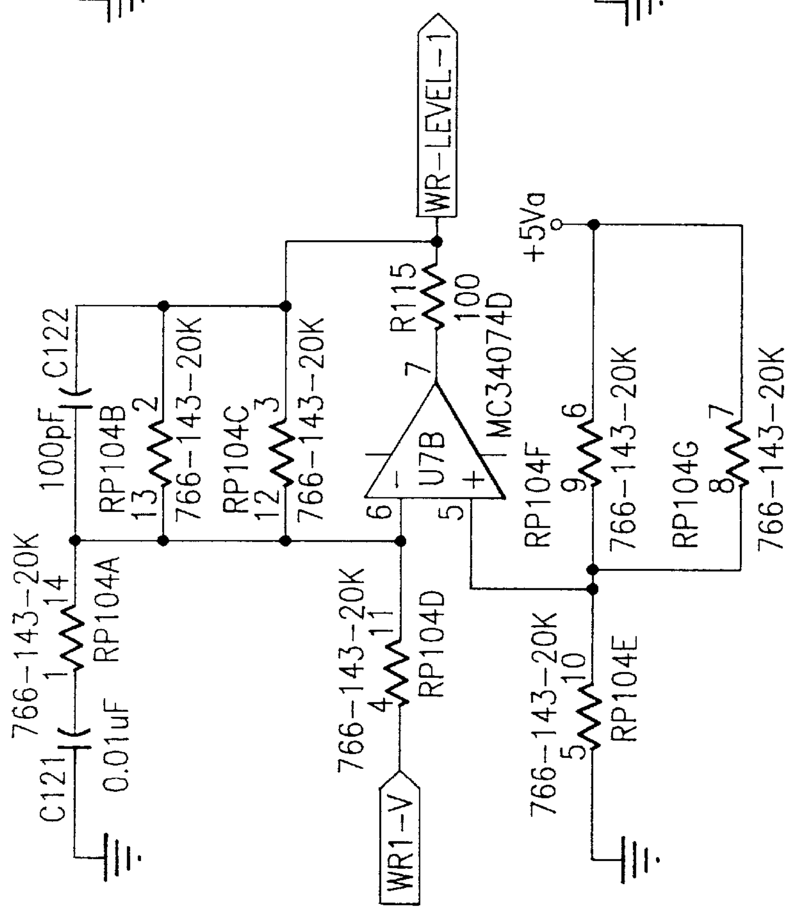
Figures 103C, 103D:
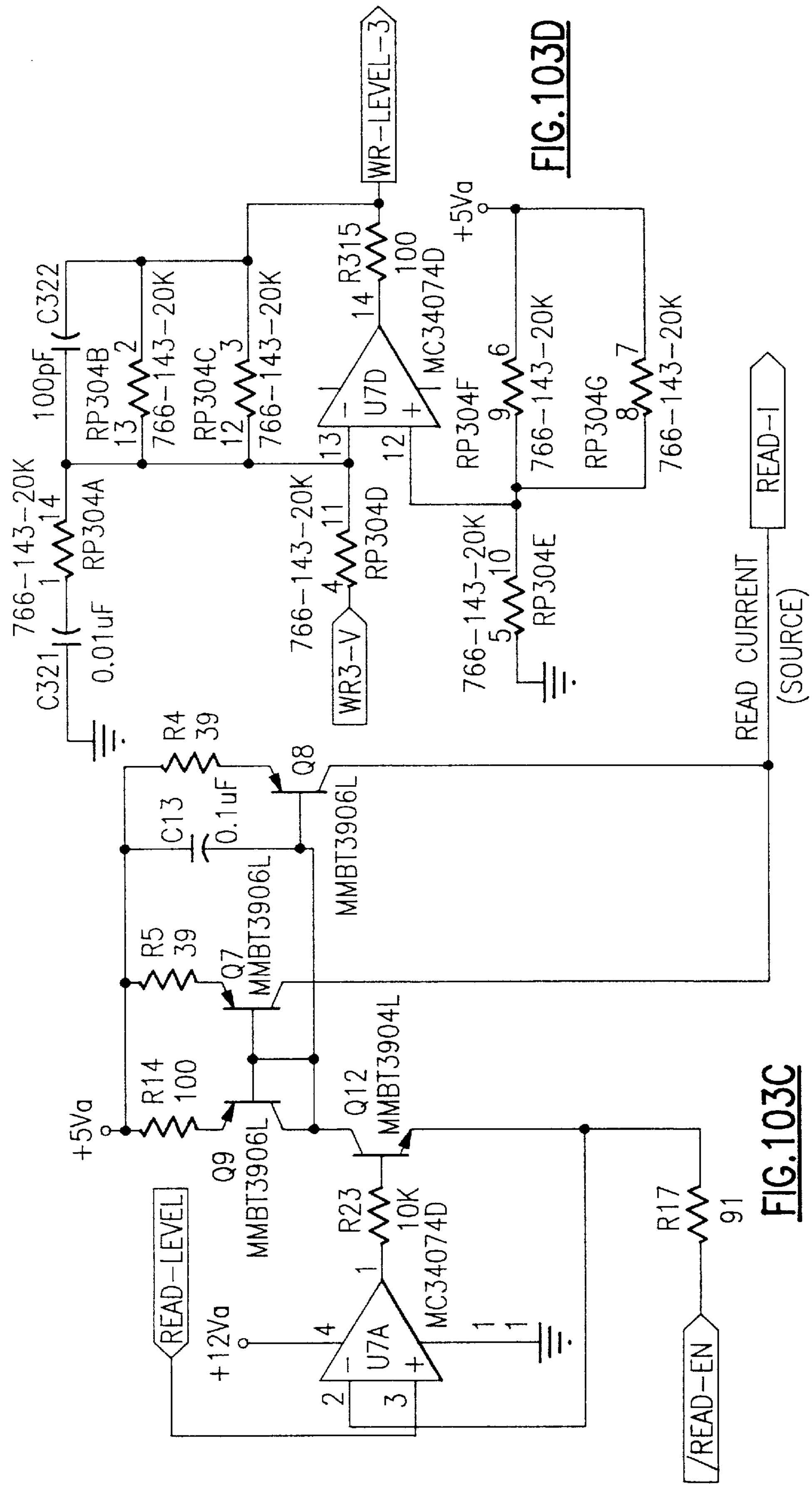
Figures 104, 104A:
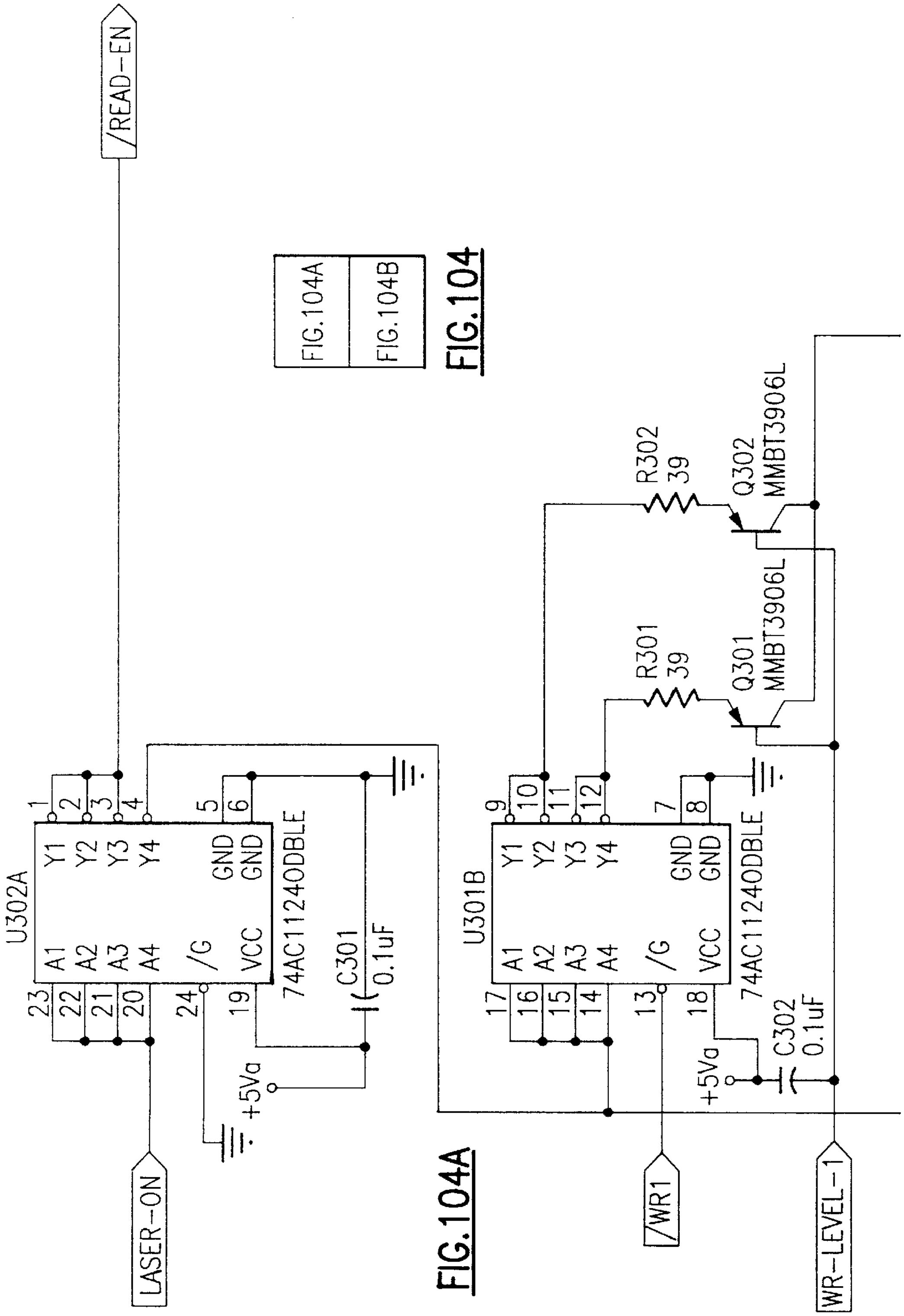
Figure 104B:
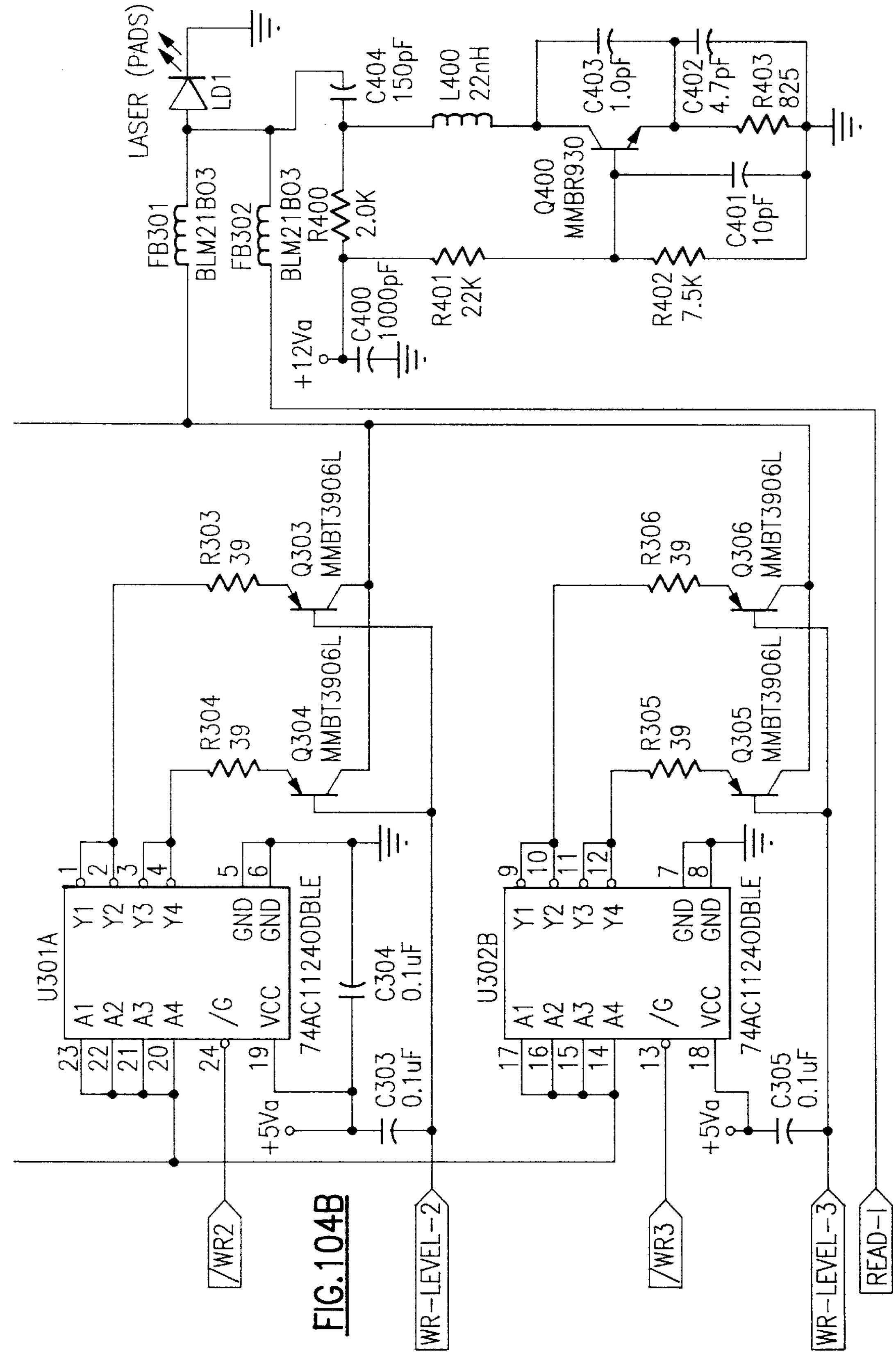

The fourth operational amplifier U7A, shown in FIG. 103C, sets the read current level. U7A drives Q12 and the current is mirrored in transistors Q7, Q8, and Q9. The mirrored current in Q7 and Q8 is the actual read current going to the laser.

FIGS. 104A–B show the actual pulse drivers and the enable to turn the laser LD1 on. The laser is actually protected with CMOS gates U301 and U302A to guarantee that as the voltage levels are rising, the laser is not actually affected by any current spikes. U302A guarantees logic low coming in on Laser On signal and U302A will keep the current mirror, FIG. 103A, from being enabled until read enable bar, pins 1, 2, and 3 of U302A, is enabled with a high logic level on U302A pins 20, 21, 22, and 23. It also provides a signal which will enable the write pulses to drive the laser only after the laser is activated. The activation is performed at pin 4 of U302A, which controls the inputs of 301A, 301B and 302B.

The enable pins, pins 13 and 24 of U302 and U301, and pin 24 of U301A are the individual write signals corresponding to write strobe 1, write strobe 2, and write strobe 3. Turning on the current sources generated by individual transistors Q301 through Q306 allows three levels of writing. Ferrite beads 301 and 302, FIG. 104B, act to isolate the read current from the write current and also keeps the RF modulation from being emitted back out the cables for EMI purposes.

Figure 105A:
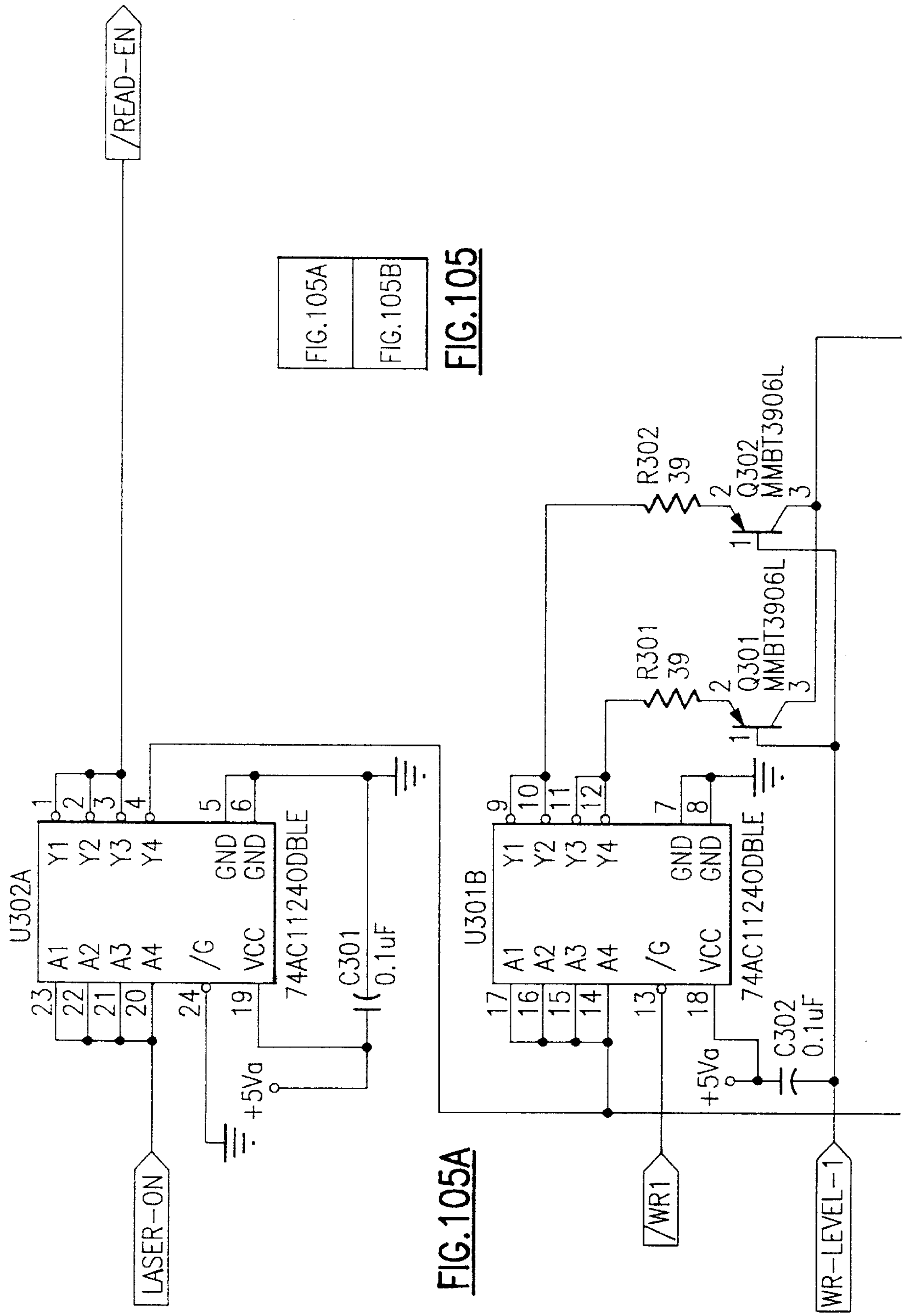
Figure 105B:
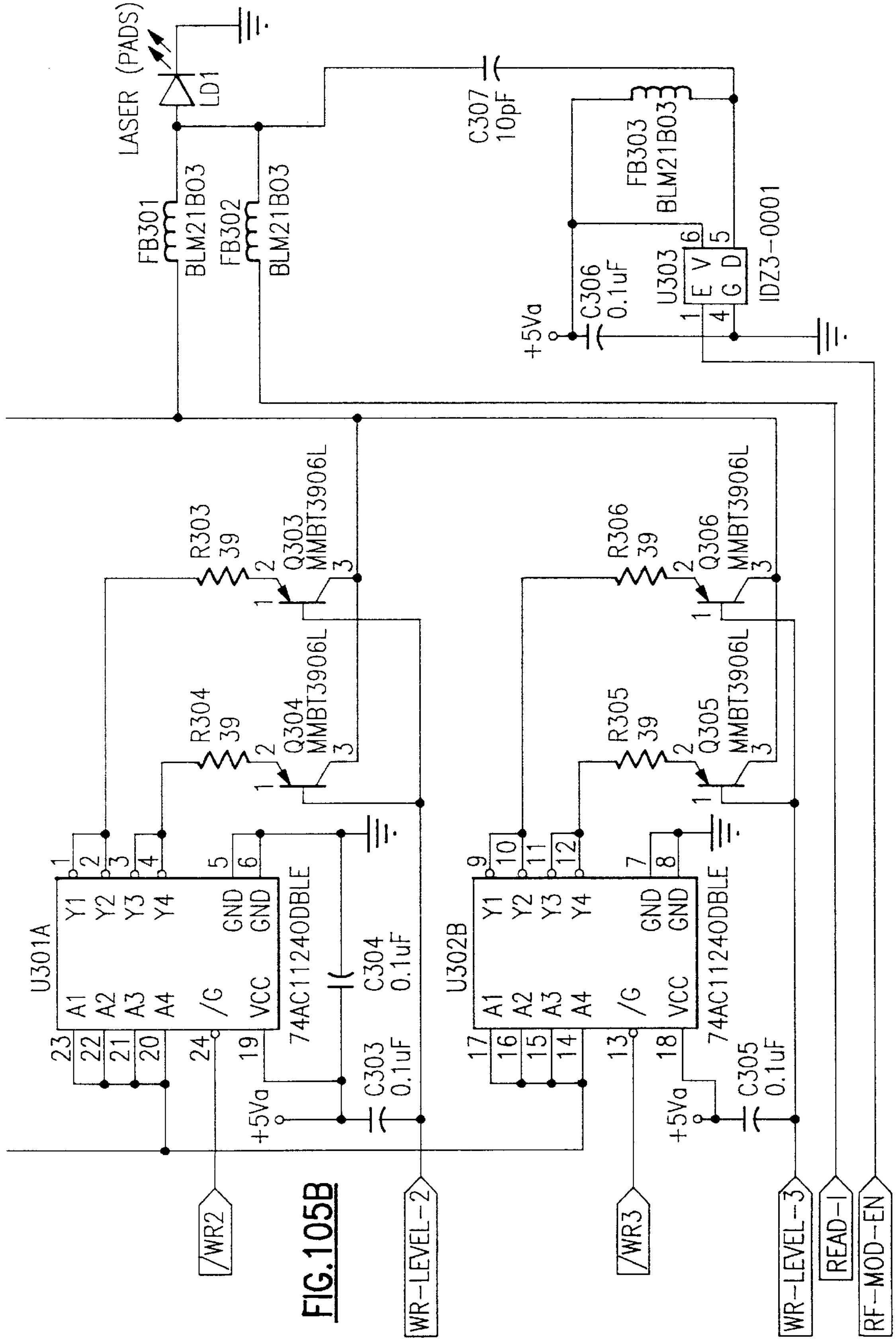

Referring to FIGS. 105A–B, U303 is an IDZ3 from Hewlett Packard, a custom integrated circuit, which performs a function of generating about 460 MHz current. This current is conducted into the laser for RF modulation to reduce laser noise. Its output is coupled through C307. There is an enable pin, pin 1 on U303 to turn modulation on and off.

In FIG. 104, the second embodiment uses a Colpitts oscillator built around a single transistor Q400, FIG. 104B, a split capacitor design C403, and C402 with an inductor L400. This circuit is biased with 12 volts with a 2k resistive load R400 to ensure that write pulses coming in through ferrite bead FB301 will not have any ringing generated by the oscillator circuit. If a disable is needed, the disable for the oscillator would be provided through the base signal by shorting R402 to ground.

Previous designs of the Colpitts oscillator include a 5 volt supply and an inductor in place of R400. This other design provided sufficient amplitude modulation into the laser to reduce noise. This previous design, however, would ring every time a write pulse was supplied. The write pulse no longer induces ringing in the oscillator circuit because the inductor was replaced with the resistor R400. In order to eliminate ringing and still maintain enough peak to peak current in the RF modulation, it required changing the supply for the oscillator from 5 volts to 12 volts and then revising all resistors appropriately.

Main Circuit Board

FIGS. 106A–119C depict the main circuit board. The main circuit board contains the functions of the drive not contained on the spindle motor board, or pre-amplifiers. This includes a SCSI controller, encoders/decoders for the reading and writing, the read channel, servos, power amplifiers and servo error generation.

Figures 106A, 106C, 106D, 106E, 106F:
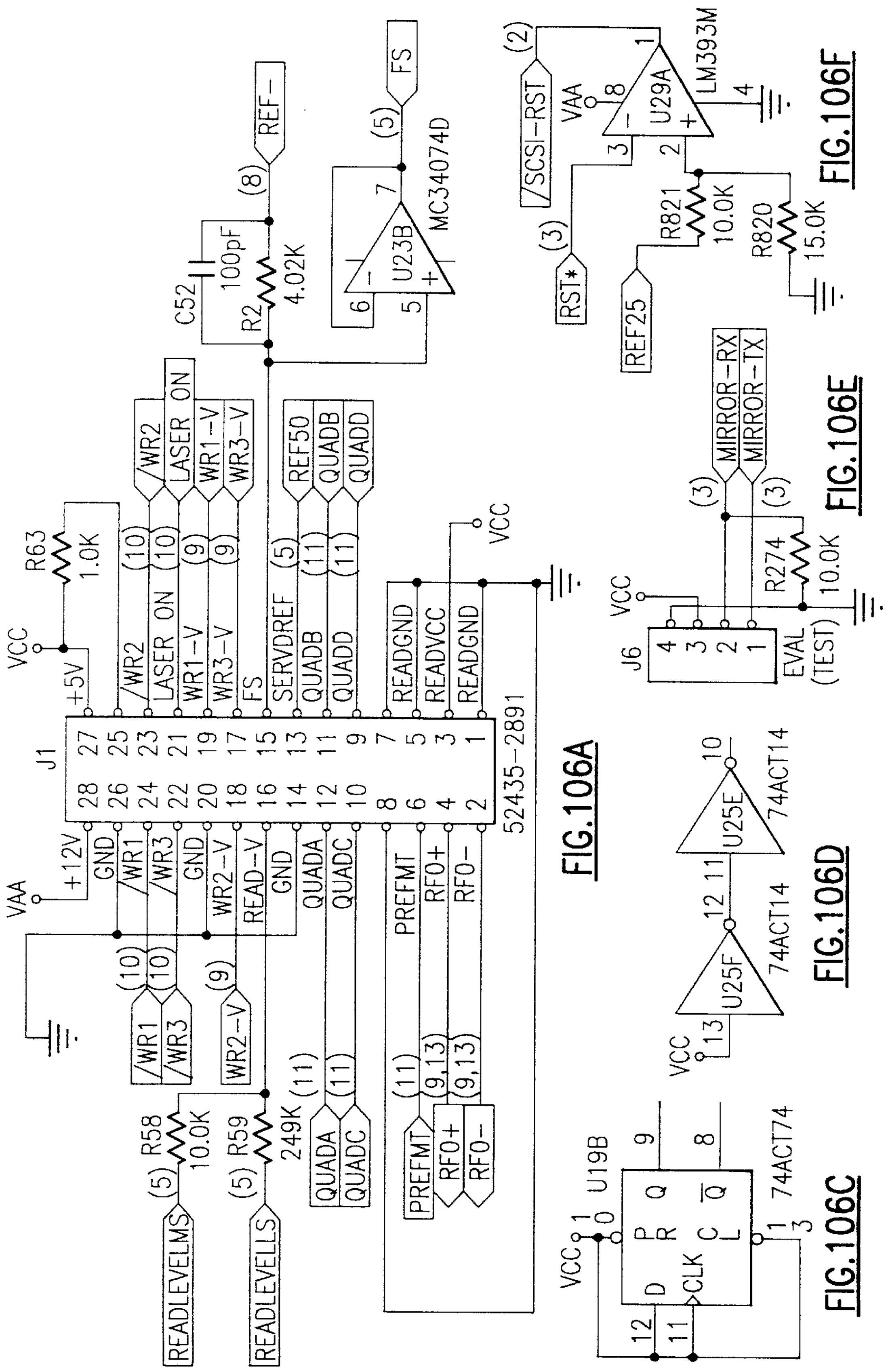

FIGS. 106A shows the connection from the pre-amplifier flex circuit J1. Pin 15 of pre-amplifier flex circuit J1 is the forward sense current from the pre-amplifier flex circuit board, as shown in FIG. 102A. Resistor R2, FIG. 106A, references the sense output to the minus reference voltage. Operational amplifier U23B buffers this signal, which is measured with ADC U11 (FIGS. 110C–D).

Two resistors R58, R59, FIG. 106A, perform the function of a resistor divider to obtain finer resolution on the laser read current level. Outputs from the Digital to Analog converter U3 shown in FIG. 110D set the laser read current. The DSP U4, FIGS. 110A–B, controls the converters.

FIG. 106E shows the Eval connector J6, also known as the test connector. The Eval connector J6 provides a serial communication link in a test mode to the processor U38 (FIGS. 109A–B) through I/O ports of U43 shown in FIGS. 108A(1)–A(3). Comparator U29A, FIG. 106F, generates the SCSI reset signal for the processor.

Power monitor U45, FIG. 106G, monitors the system power and holds the system in reset until such time as the 5 volt supply is within tolerance and the 12 volt supply is within tolerance.

Connector J3A, FIG. 106H, connects the main circuit board to the main power. Power filters F1, F2 provide filtering for the main circuit board.

Capacitively coupled chassis mounts MT1, MT2, FIG. 1061, capacitively ground the main circuit board to the chassis, providing AC grounding to the chassis.

Figure 107A:
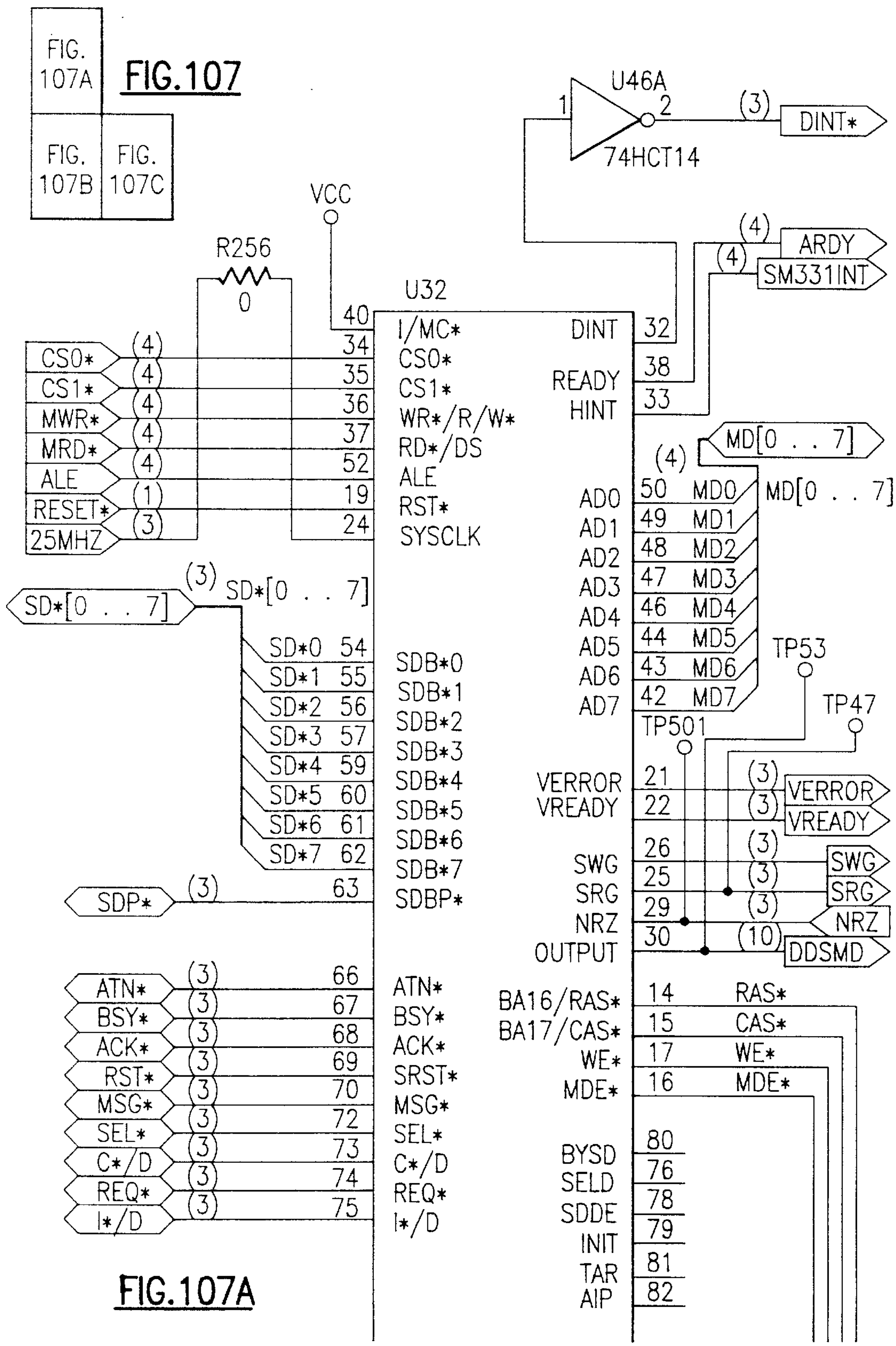
Figure 107B:
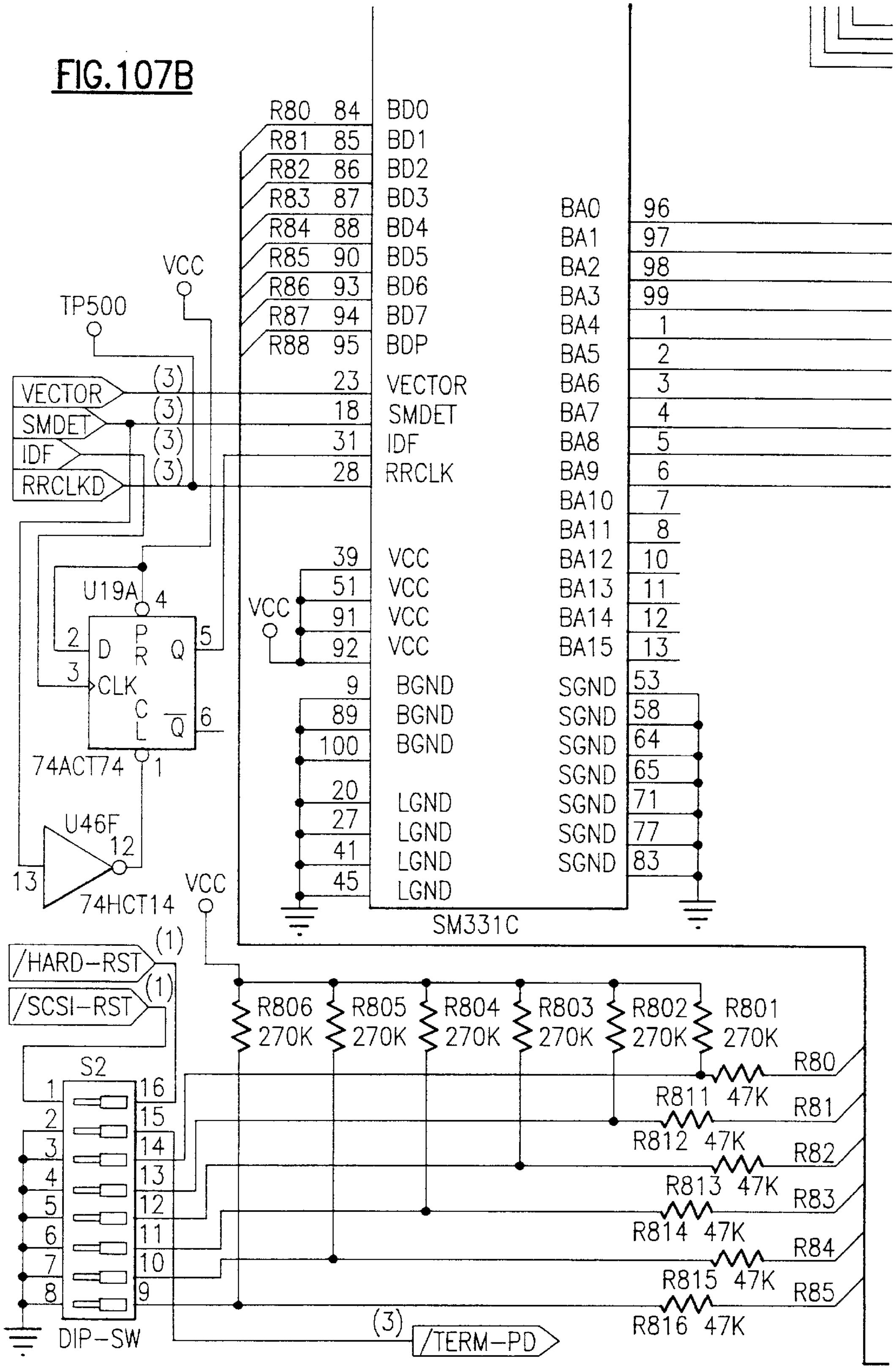
Figure 107C:
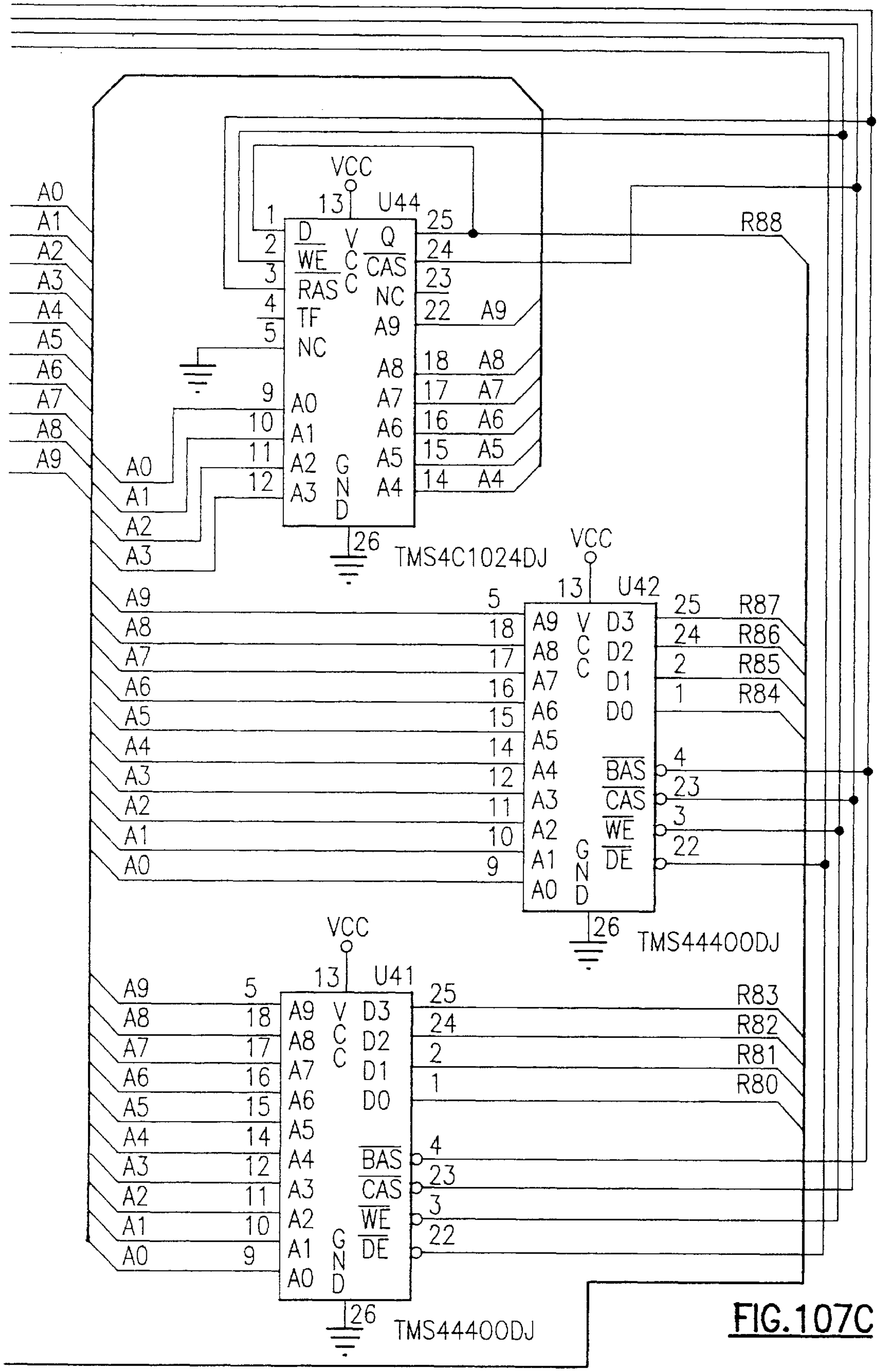

FIGS. 107A–C U32 show the SCSI buffer manager/controller circuit. U32 performs the buffering function and command handling for the SCSI bus. U19A stretches the length of the ID found signal from FIG. 108A U43. In FIG. 107C U41, U42, and U44 are a 1 Mb x 9 buffer RAM for the SCSI buffer. FIG. 107B shows an eight position dip switch S2. Switch S2 is a general purpose DIP switch for selecting SCSI bus parameters such as reset and termination.

FIG. 108A shows an encode/decode circuit U43, which is part of the SCSI controller. Encode/decode circuit U43 performs a RLL 2,7 encode/decode of data and provides all the signals necessary, as well as decoding the sector format for ISO standard disc formats for the 1x and 2x 5¼ inch discs. There is also general purpose input/output, which performs miscellaneous functions including communication with various serial devices, enabling the bias coil driver and determining the polarity of the bias coil.

A small non-volatile RAM U34, FIG. 108A(3), stores drive-specific parameters. These parameters are set during drive calibration at drive manufacture time.

Figure 108B:
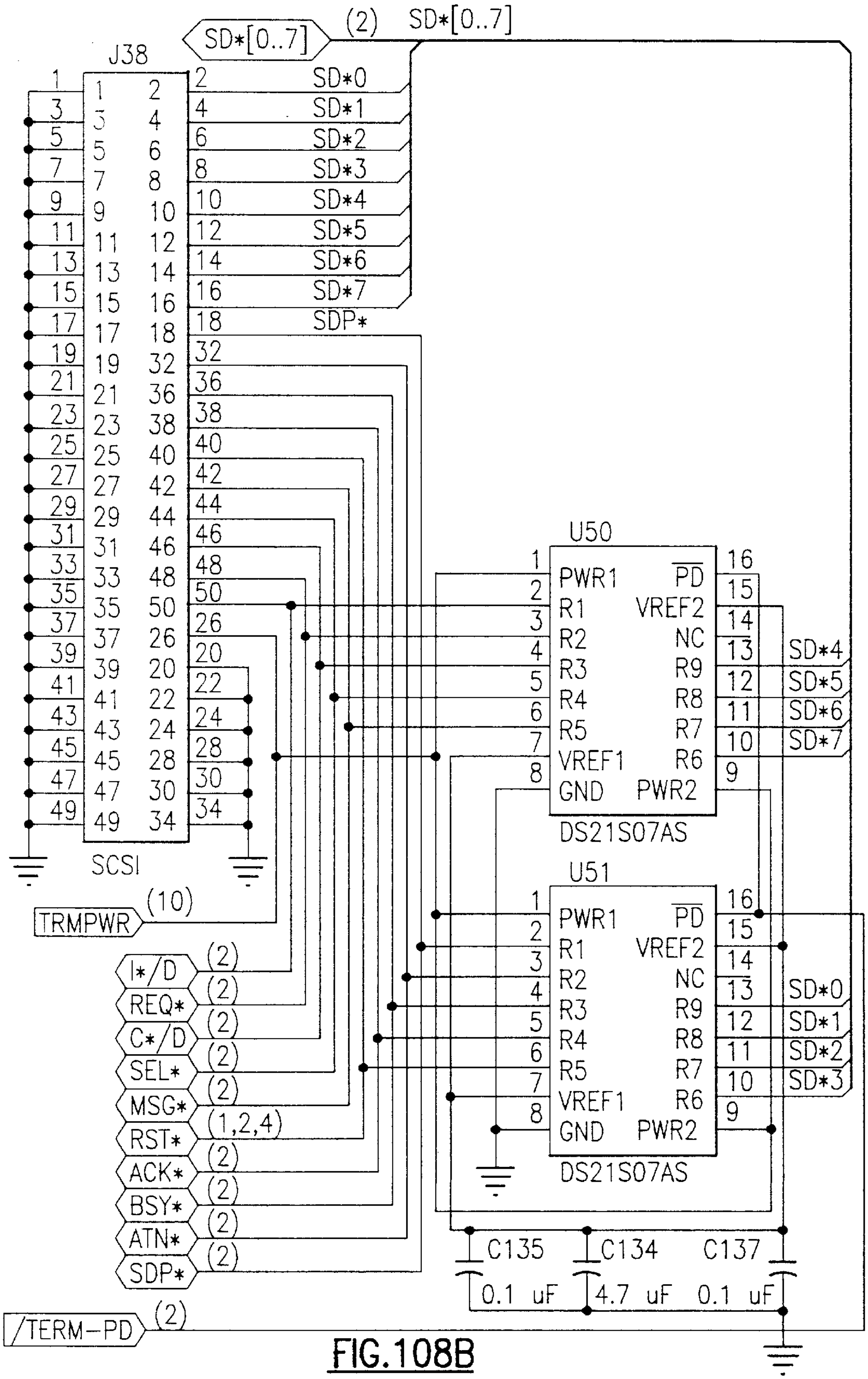

SCSI active termination packages U50, U51, shown in FIG. 108B, may be enabled by the switch S2, shown in FIG. 107B.

The encode/decode circuit U43 in FIG. 108A has a special mode that is used in the drive where an NRZ bit pattern can be enabled for input and output. When enabled, a custom GLENDEC U100, FIGS. 115A–C, can be used for RLL 1,7 encode/decode for the 4X disc. In this mode of the encode/decode, circuit U43 can enable the use of many other encode/decode systems for other disc specifications.

Figures 109, 109A:
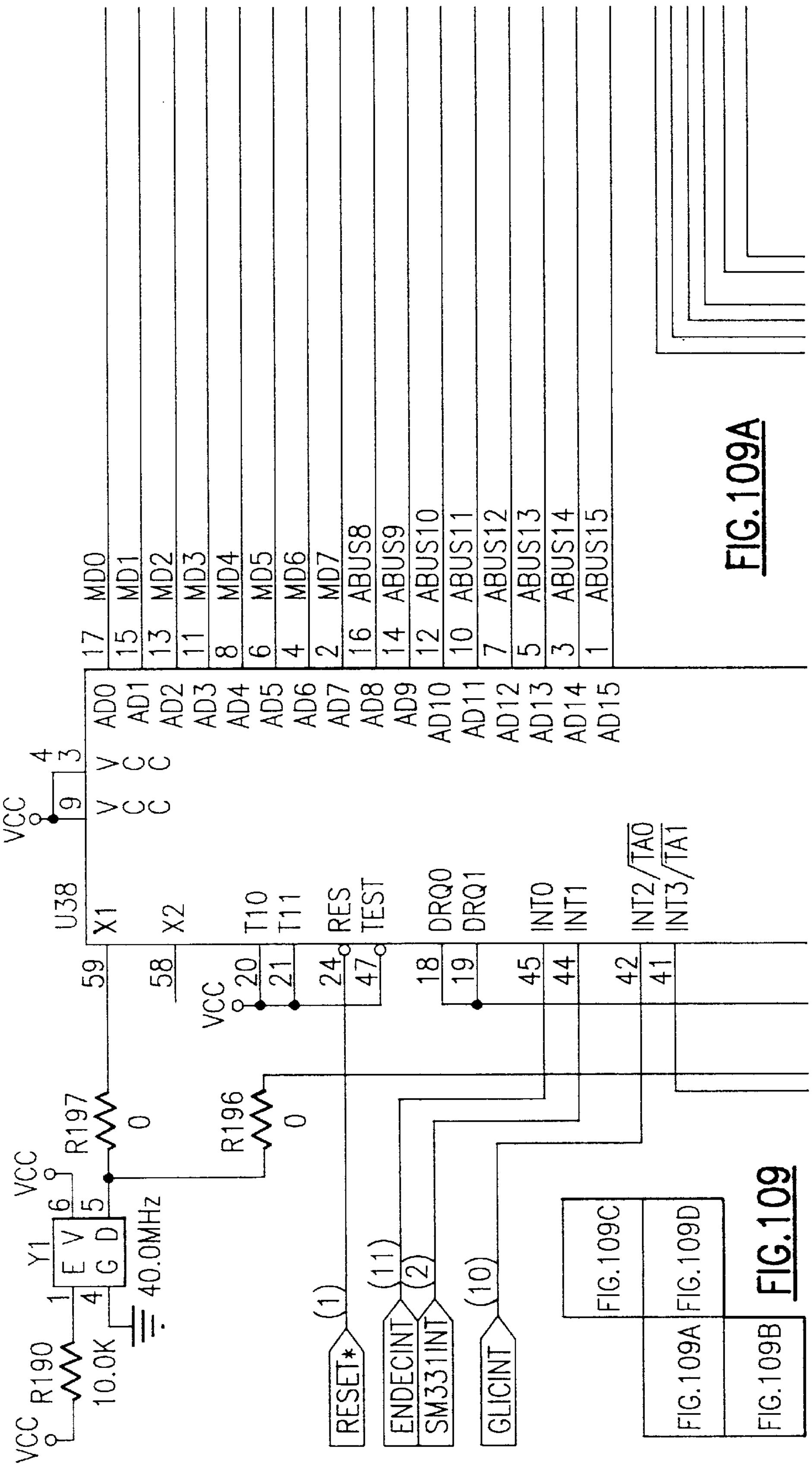

FIG. 109 shows an 80C188 system control processor U38. The 80C188 system control processor U38 operates at 20 megahertz, with 256k bytes of program memory U35, U36 and 256k bytes RAM U39, U40, FIGS. 109C–D. The 80C188 system control processor U38 controls function of the drive. The 80C188 system control processor U38 is a general purpose processor and can be programmed to handle different formats and different customer requirements. Different disc formats can be handled with the appropriate support equipment and encode/decode systems.

Figures 110, 110A:
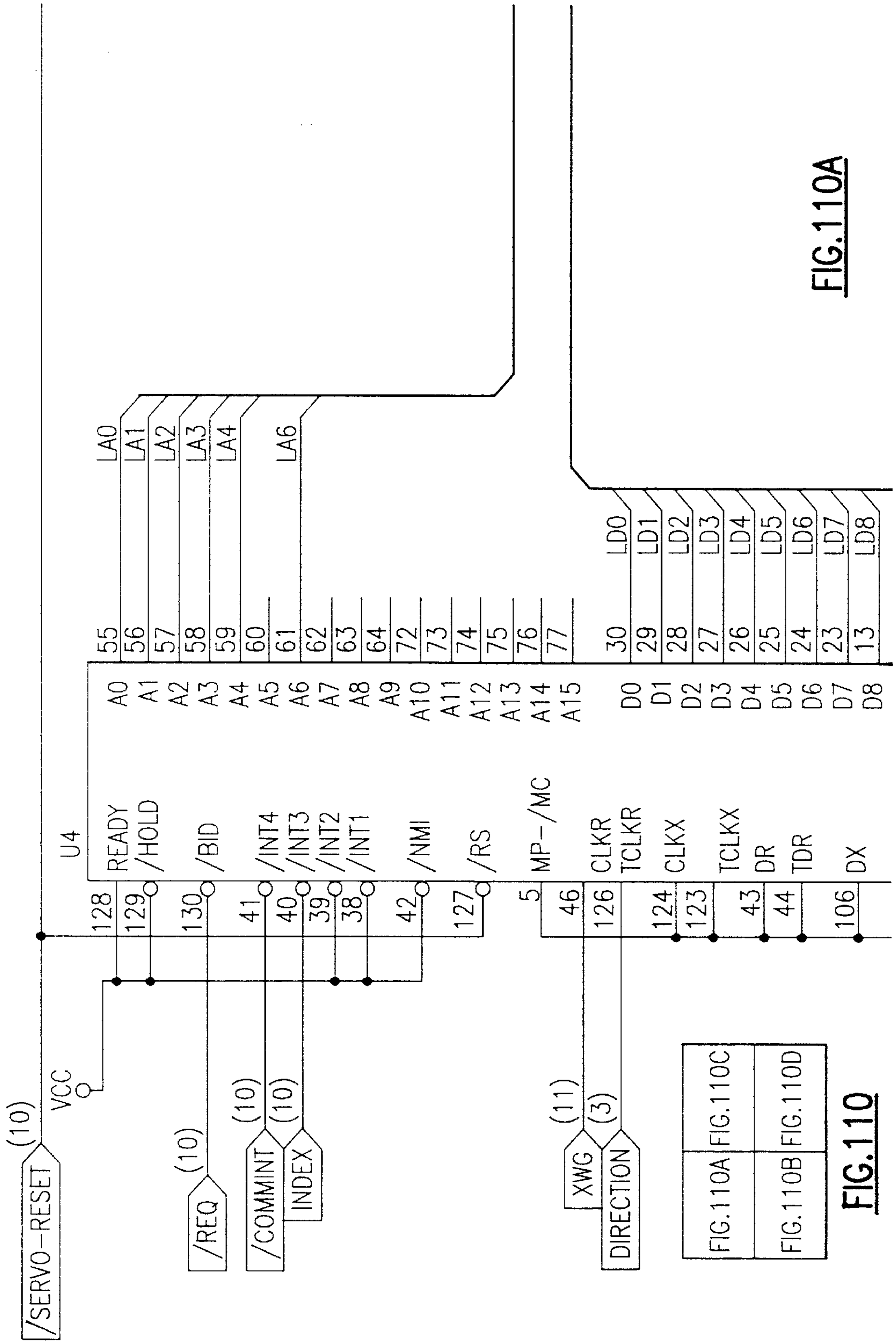
Figure 110B:
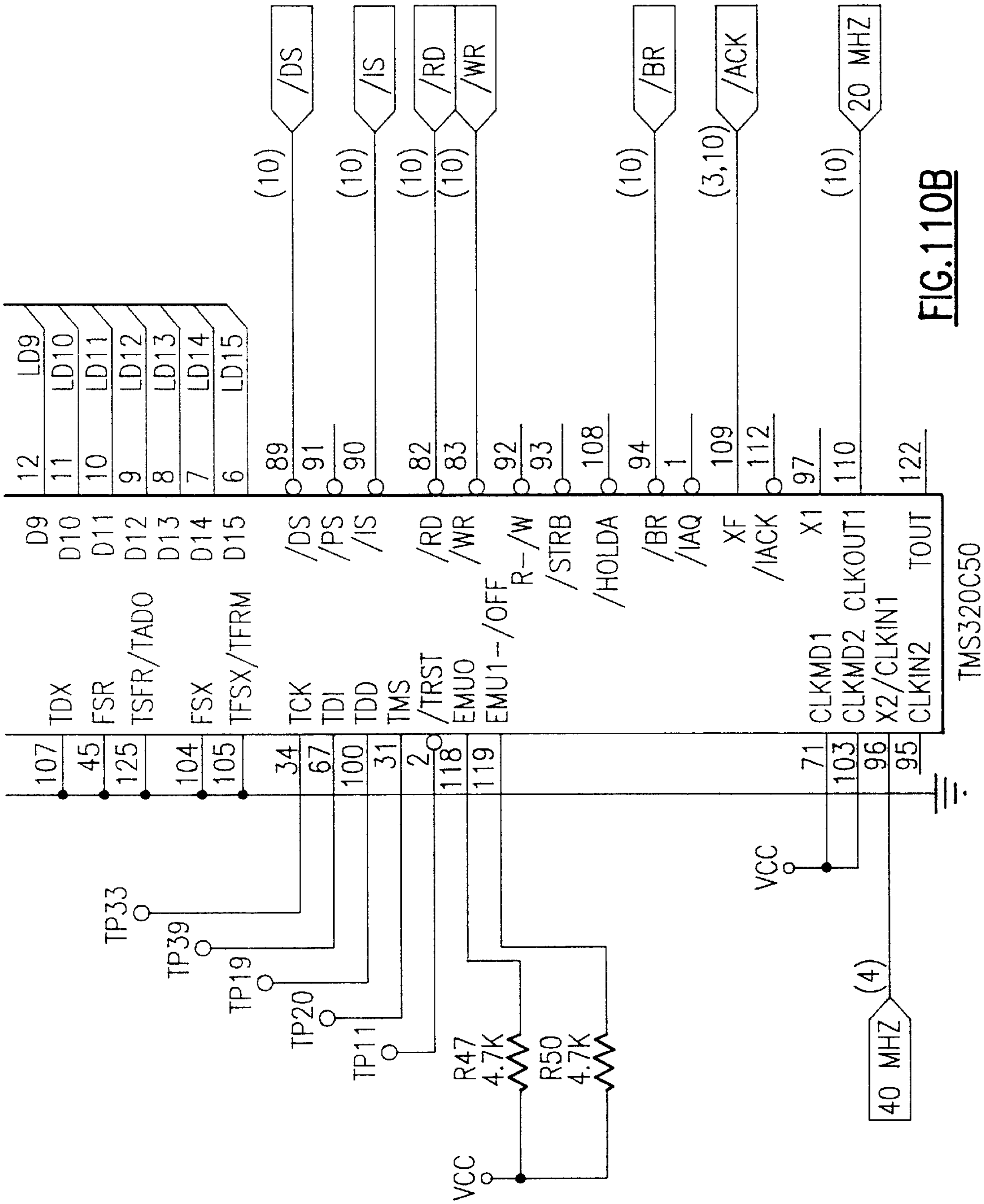
Figure 110C:
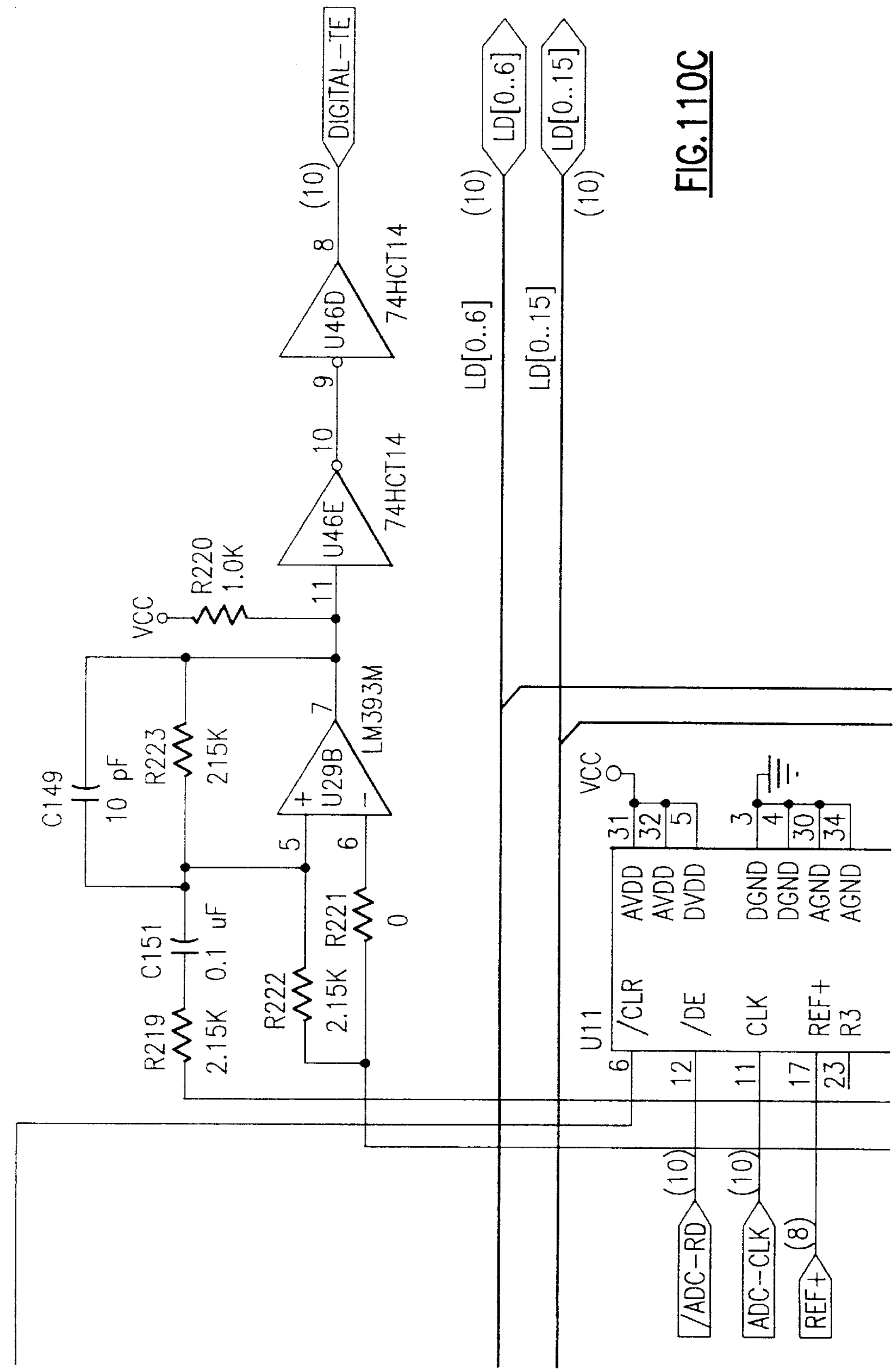
Figure 110D:
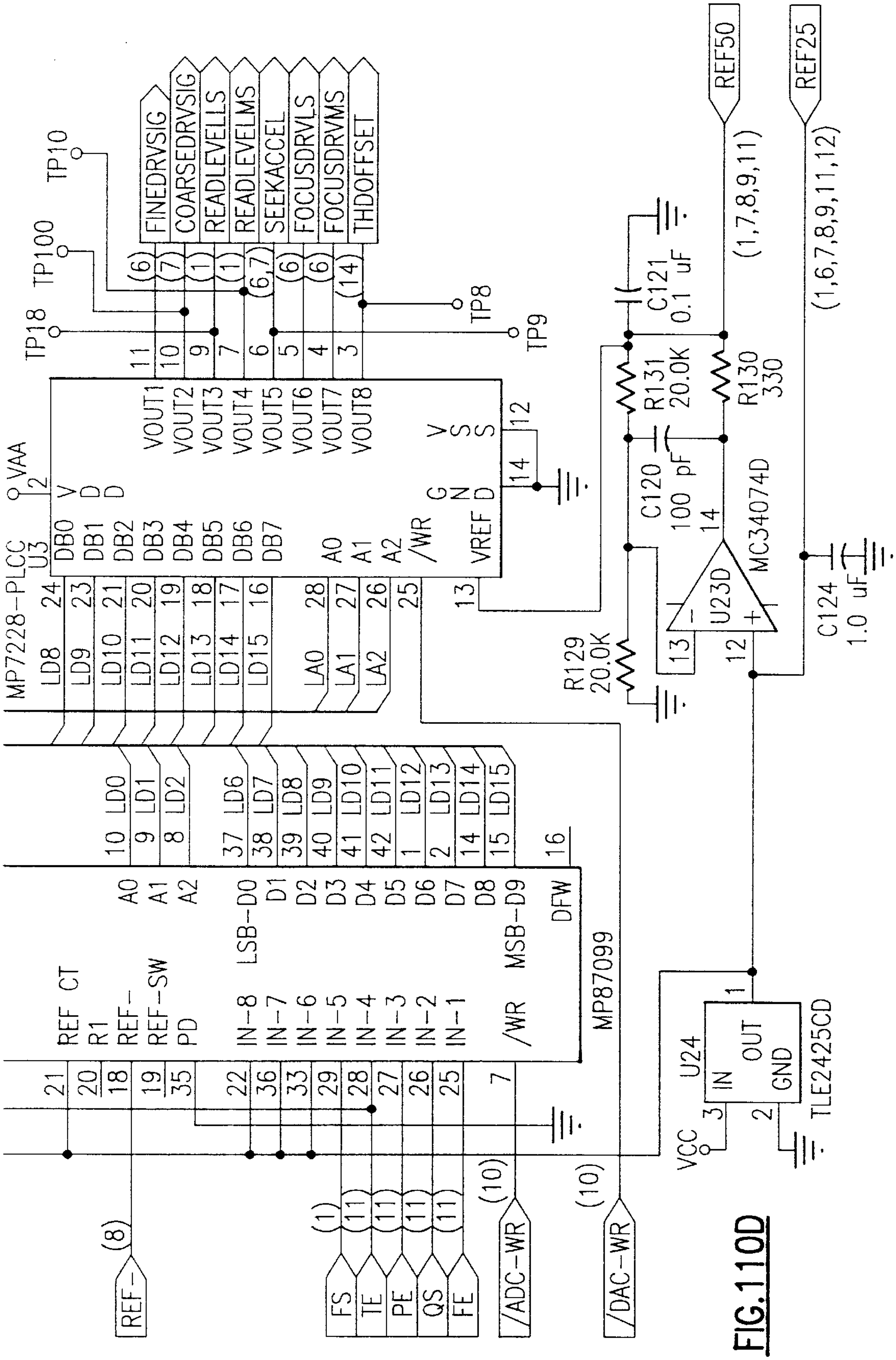

FIG. 110 shows a TI TMS320C50 DSP servo controller U4, a multi-input analog to digital converter U11 for converting the servo error signals, and an 8 channel/8 bit digital to analog converter U3 for providing servo drive signals and level setting. The DSP servo controller U4 accepts signals from the analog to digital converter U11 and outputs signals to digital to analog converter U3.

The DSP servo controller U4 controls functions such as monitoring the spindle speed via an index signal on pin 40 of the DSP servo controller U4. The DSP servo controller U4 determines whether the drive is writing or reading via a control signal on pin 45. The DSP servo controller U4 communicates with the system control processor U38 via the GLENDEC U100, shown FIGS. 115A–C. The DSP servo controller U4 performs the fine tracking servo, coarse tracking servo, focus servo, laser read power control, and the cartridge eject control. The DSP servo controller U4 also monitors spindle speed to verify that the disc is rotating within speed tolerances. The analog to digital converter U11 performs conversions on the focus, tracking, and coarse position signals. Focus and tracking conversions are done using a +/– reference from pins 17 and 18 of the analog to digital converter U11, generated from a quad sum signal. The quad sum signal is the sum of the servo signals. A normalization of the error signals is performed by using the +/– quad sum as the reference. The coarse position, the quad sum signal, and the forward sense are converted using a +/– voltage reference.

The digital to analog converter U3, FIG. 110D, has outputs including a fine drive signal, a coarse drive signal, a focus drive, LS and MS signals. These signals are servo signals functioning to drive the power amplifier (U9 and U10 of FIGS. 111A–B, and U8 of FIG. 112B) and to close the servo loops. The focus has a FOCUSDRYLS and FOCUSDRYMS drive signals. The FOCUSDRYLS signal allows fine stepping of the focus motor in an open loop sense to acquire the disc by stepping in very fine steps. The FOCUSDRYMS signal is used as the servo loop driver. Pin 7 of the digital to analog converter U3, FIG. 110D, contains a signal READ-LEVEL-MS. Pin 9 of the digital to analog converter U3 contains a signal READ-LEVEL-LS. These signals from pins 7, 9 of the digital to analog converter U3 are used for controlling the laser read power. Pin 3 of the digital to analog converter U3 is a threshold offset that is used in 4x read channel error recovery, enabling an offset to be injected into the read channel for error recovery.

FIG. 110D also shows a 2.5 volt reference U24, which is amplified by a factor of 2 by amplifier U23D, yielding a 5 volt reference. The 2.5 volt reference U24 is used by a comparator U29. The comparator U29 compares the AC component of the tracking error signal to zero volts to determine zero track crossings. The track error signal is digitized and sent to the GLENDEC U100, shown in FIGS. 115A–C, for determining track crossings which are used during seek operation.

The analog to digital converter U11, FIGS. 110C–D uses a quad sum signal for performing conversions for the focus and tracking error. By using the quad sum for a reference on pins 17 and 18 of the analog to digital converter U11 the error signals are automatically normalized to the quad sum signal. The analog to digital converter U11 divides the error by the sum signal and gives a normalized error signal for input into the servo loop. The advantage is that the servo loop deals with a reduced number of variations. This normalization function can be performed externally with analog dividers. Analog dividers have inherent precision and speed problems. This function can also be performed by the DSP servo controller U4, FIGS. 110A–B, by doing a digital division of the error signal by the quad sum signal. A division in the DSP servo controller U4 requires a significant amount of time. At a sample rate of 50 kilohertz, there may not be time to do the divisions and process the error signals digitally inside the servo loops. Since the quad sum is used as the reference, division is not necessary and the error signals are automatically normalized.

Figure 113:
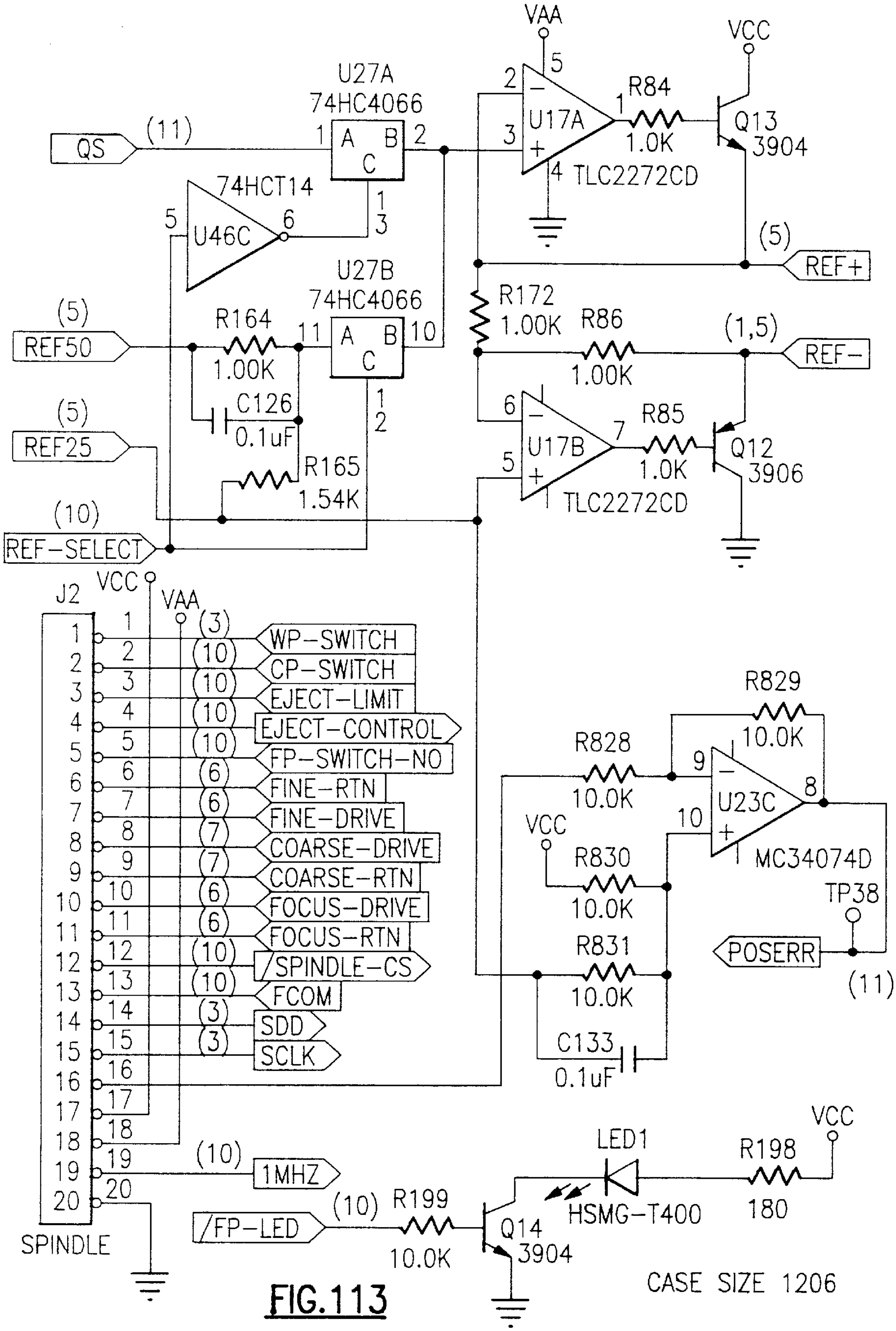

Referring to FIGS. 110 and 113, the analog to digital reference signals on pins 17, 18 of analog to digital converter U11, FIGS. 110C–D, originate from operational amplifiers U17A, U17B, FIG. 113. Operational amplifiers U17A, U17B generate the reference +/– voltages. Switches U27A, U27B select the input reference for the operational amplifiers U17A, U17B. The operational amplifiers U17A, U17B function to generate a 1 volt reference and a 4 volt reference (2.5 volt +/–1.5 volt reference) when switch U27B is activated, or a reference from the quad sum when switch U27A is activated. The switches U27A and U27B are switched at the servo sample rate of 50 kilohertz. This enables focus and tracking samples to used Quad Sum in every servo sample and Quad Sum, forward sense and coarse position will be taken with the 2.5 volt +/– 1.5 volts as a reference. By multiplexing the reference, the automatic normalization of the servo errors is achieved in the single analog-to-digital conversion.

In summary, the switching system shown in FIG. 113 multiplexes two different reference levels. The switching system enables a true reference level analog to digital conversion for laser power and amount of detected signals from the disc, as well as the normalization of servo error signals when using the quad sum reference. The conversion can be done in real time on signals such as the laser power, the quad sum level, the error signals focus, and tracking by switching between both reference levels at a 50 kilohertz rate.

Figure 111A:
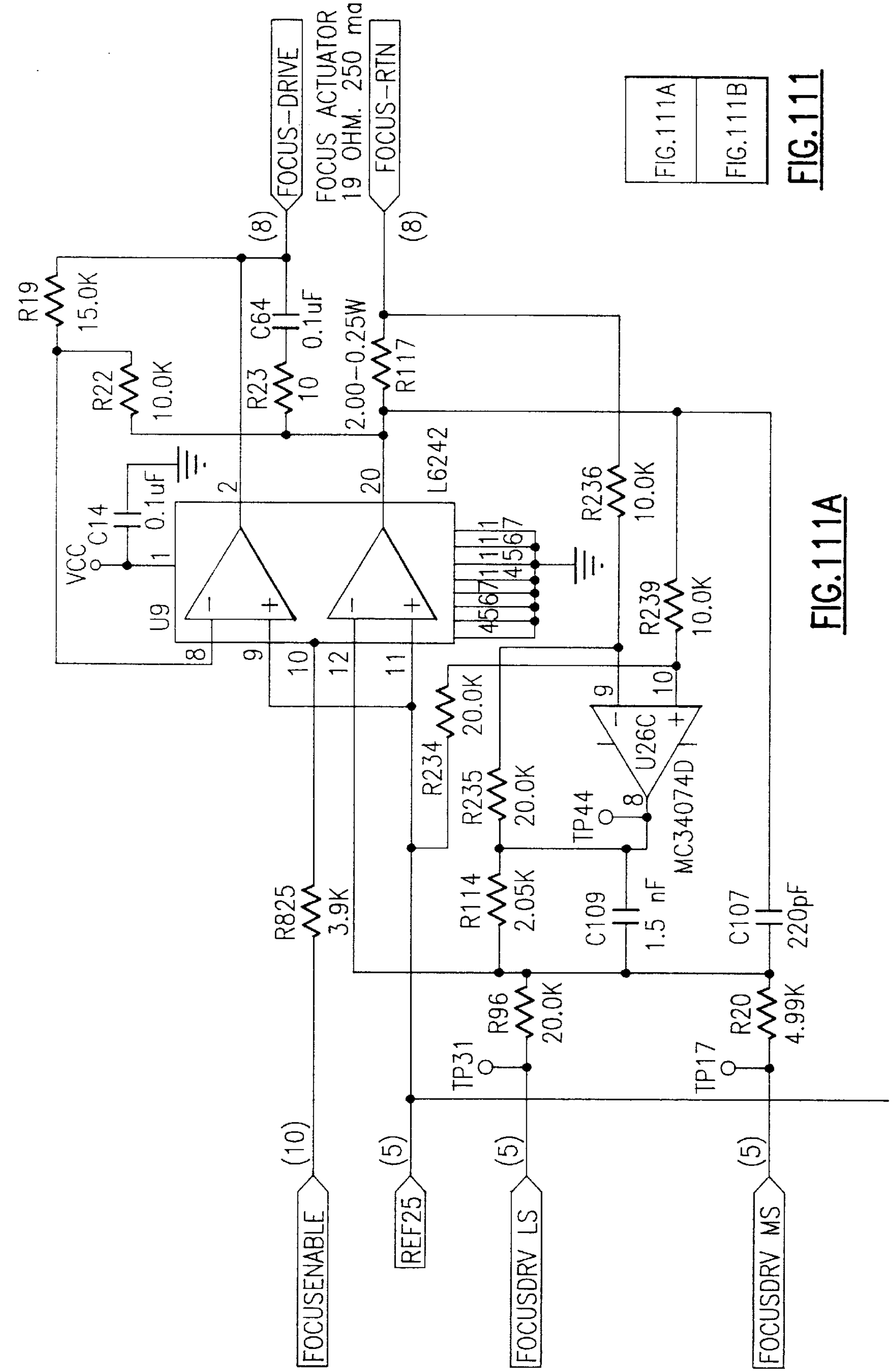
Figure 111B:
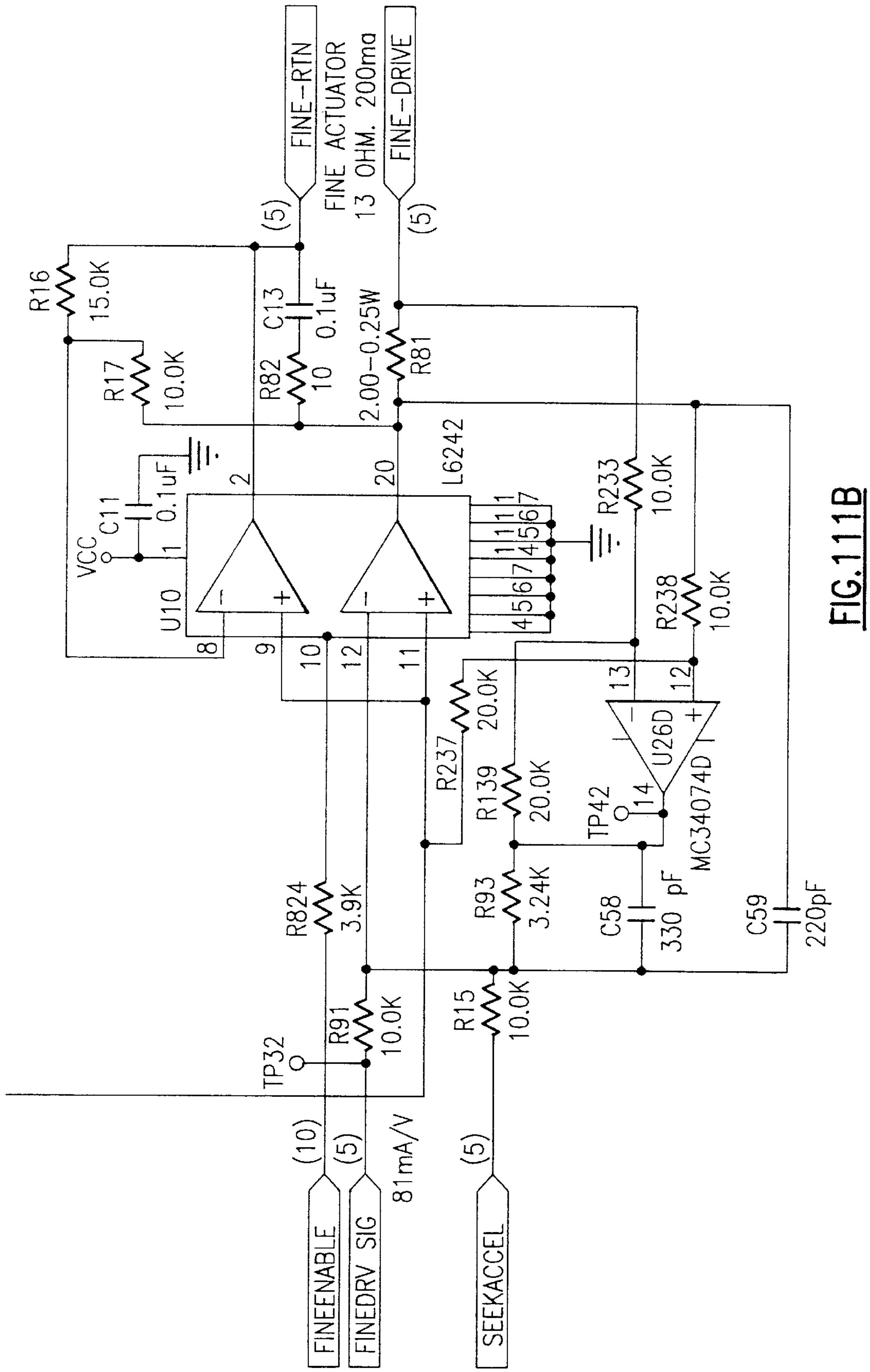

FIG. 111 shows a circuit with focus power amplifier U9, FIG. 111A, and fine drive power amplifiers U10, FIG. 111B. The power amplifiers U9, U10 have digital enable lines, on pins 10, that are controlled by the processor. One advantage of microprocessor control is that the power amplifiers are inactive during drive power up, preventing damage and uncontrolled movement of the associated focus and drive assemblies. Both of the power amplifiers U9, U10 have a 2.5 volt reference used as an analog reference and are powered by a 5 volt supply. The power amplifiers U9, U10 have digital to analog inputs from the DSP servo controller U4 to control the current outputs. The focus power amp can drive +/– 250 milliamps current and the fine power amp can drive +/– 200 milliamps current.

Figures 112, 112A:
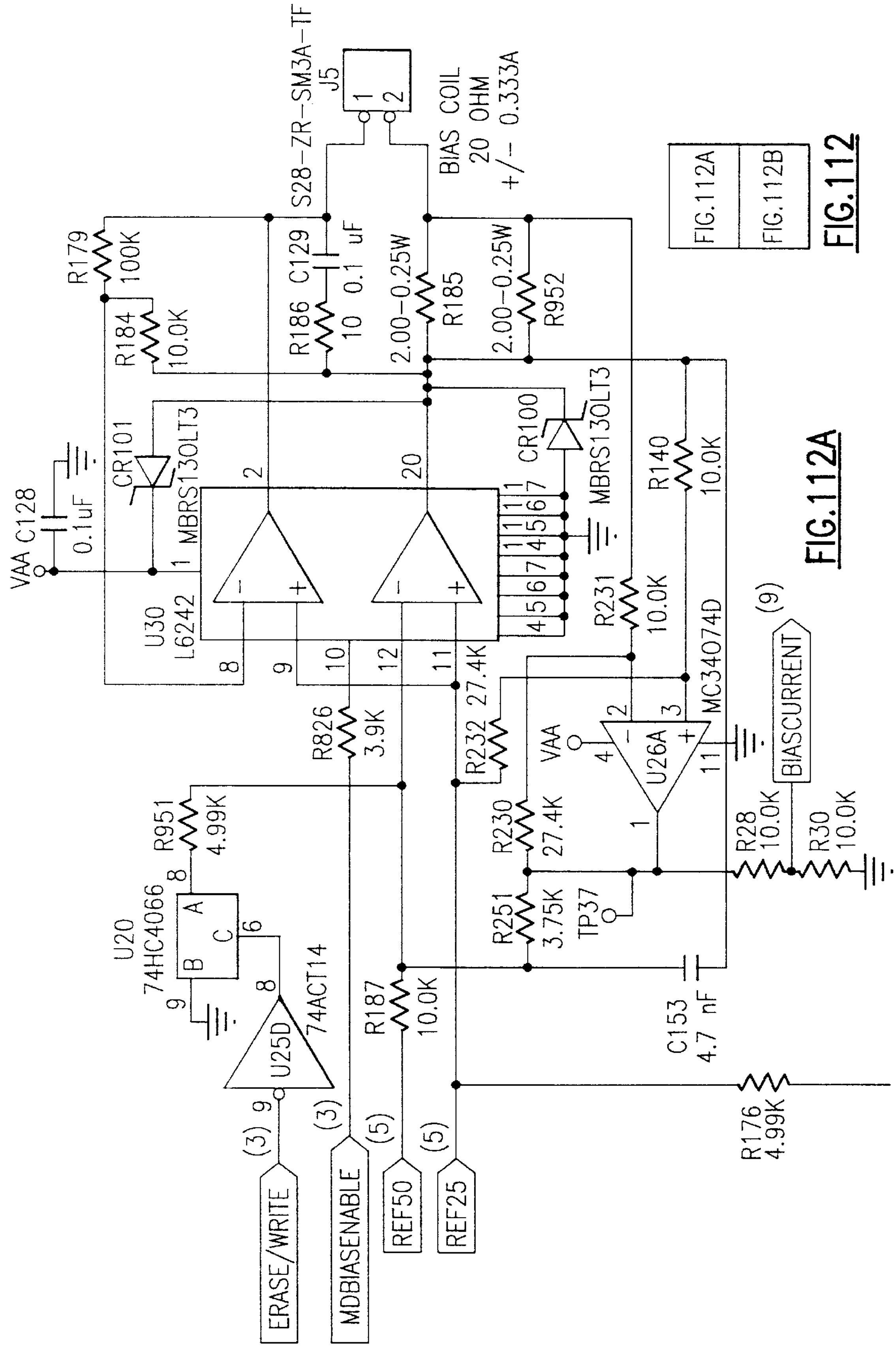
Figure 112B:
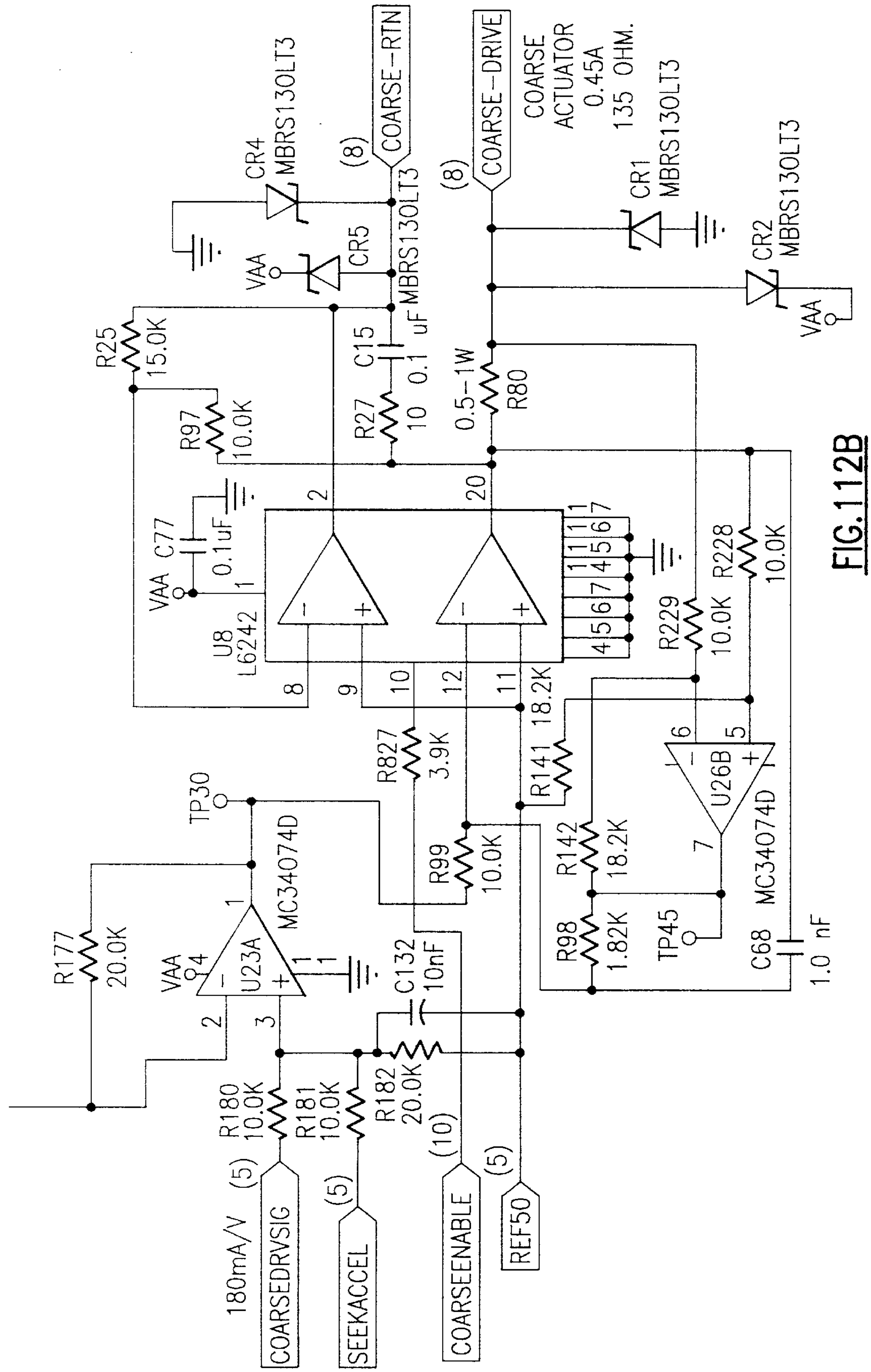

FIG. 112 shows a circuit having power amplifiers U30, FIG. 112A, and U8, FIG. 112B, for the MO bias coil drive and the coarse drive. The power amplifiers U30, U8 are powered by the 12 volt supply to allow higher voltage range across the motors. The bias coil (not shown) is digitally controlled to be enabled and set to either erase polarity or write polarity. Power amplifier U30 will output ⅓ of an amp into a 20 ohm coil. The coarse motor power amplifier U8 is designed to supply up to 0.45 amps into a 13½ ohm load. Power amplifier U8 has a level translator U23A at an input, so that the voltage drive is referenced to 5 volts instead of 2.5 volts.

The power amplifiers U9, U10, U30, U8, as shown in FIGS. 111 and 112, are configured similarly and compensated to yield bandwidths of greater than 30 kilohertz. Clamping diodes CR1, CR2, CR4, CR5, FIG. 112B, on the coarse power amplifier U8 keep the voltage on the output of the power amplifier U8 from exceeding the rails when the direction the coarse motor is reversed due to the back EMF of the motor. The clamping diodes CR1, CR2, CR4, CR5 will keep the power amplifier U8 from going into saturation for extended periods of time and thereby making seeks difficult.

Figures 114, 114A:
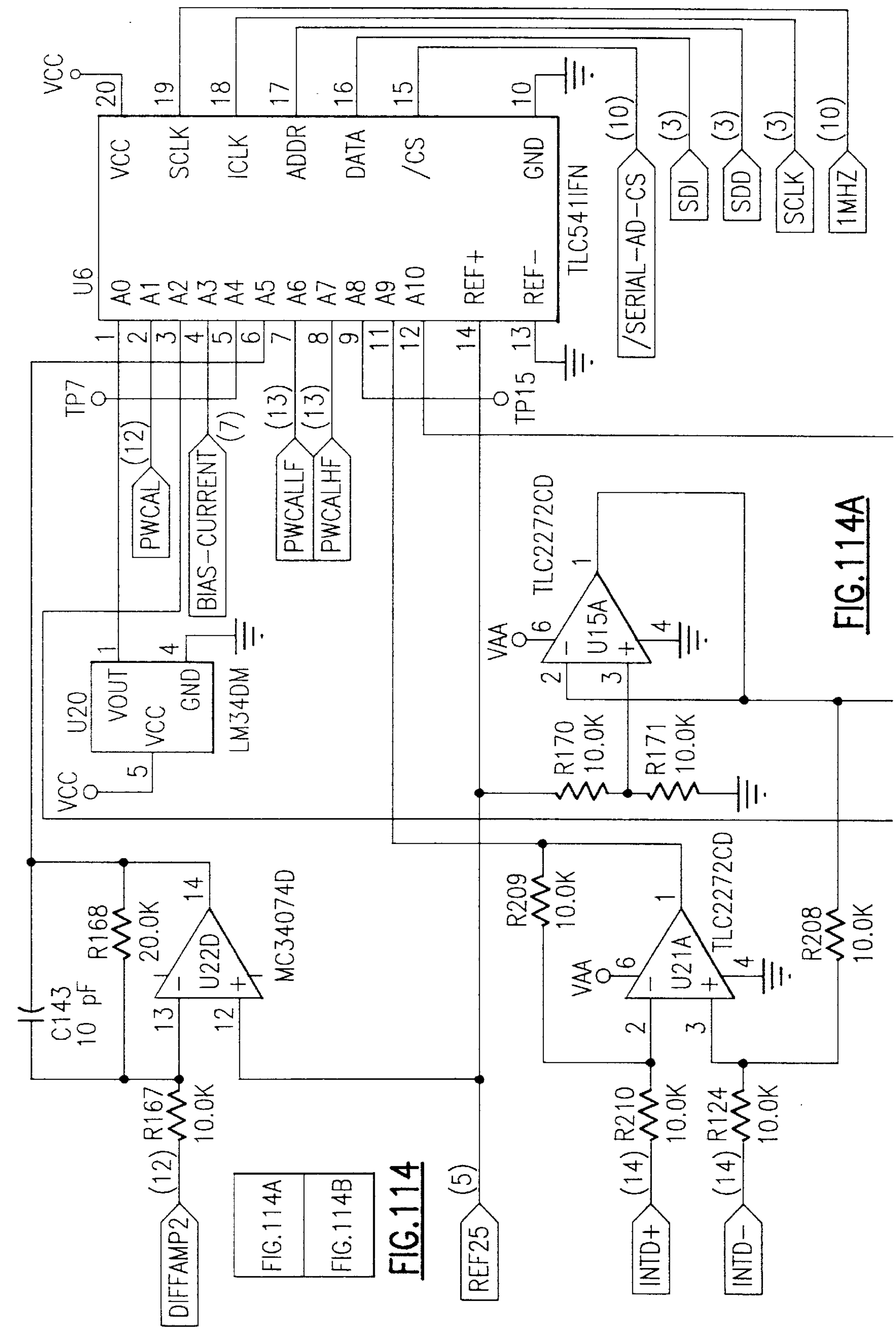

The output of amplifier U26A, FIG. 112A, and resistor divider R28/R30 feed the bias current back into the analog to digital converter U6, shown on FIG. 114A. This enables the processor U38 (FIG. 109) to ensure that the bias coil is at the desired level before writing is attempted.

Referring to FIG. 113, the quad sum reference translator is realized as circuits U27A, U27B, U17A, and U17B, as previously discussed with reference to FIG. 110. Spindle motor connector J2 transmits signals to other circuit elements.

A differential amplifier U23C translates the course position error to a 2.5 volt reference. The coarse position error from the spindle motor board (J2) is referenced to $V_{CC}$. Transistor Q14 is a driver for the front panel LED, LEDI.

Referring now to FIG. 114, U6 is a serial A to D convertor, which converts a signal from a temperature sensor U20. Recalibration of the drive occurs responsive to measured temperature changes. This is an important feature of the invention, particularly in the case of 4x writing, where the write power is critical, and may be required to vary as a function of the system temperature.

Figures 117, 117A:
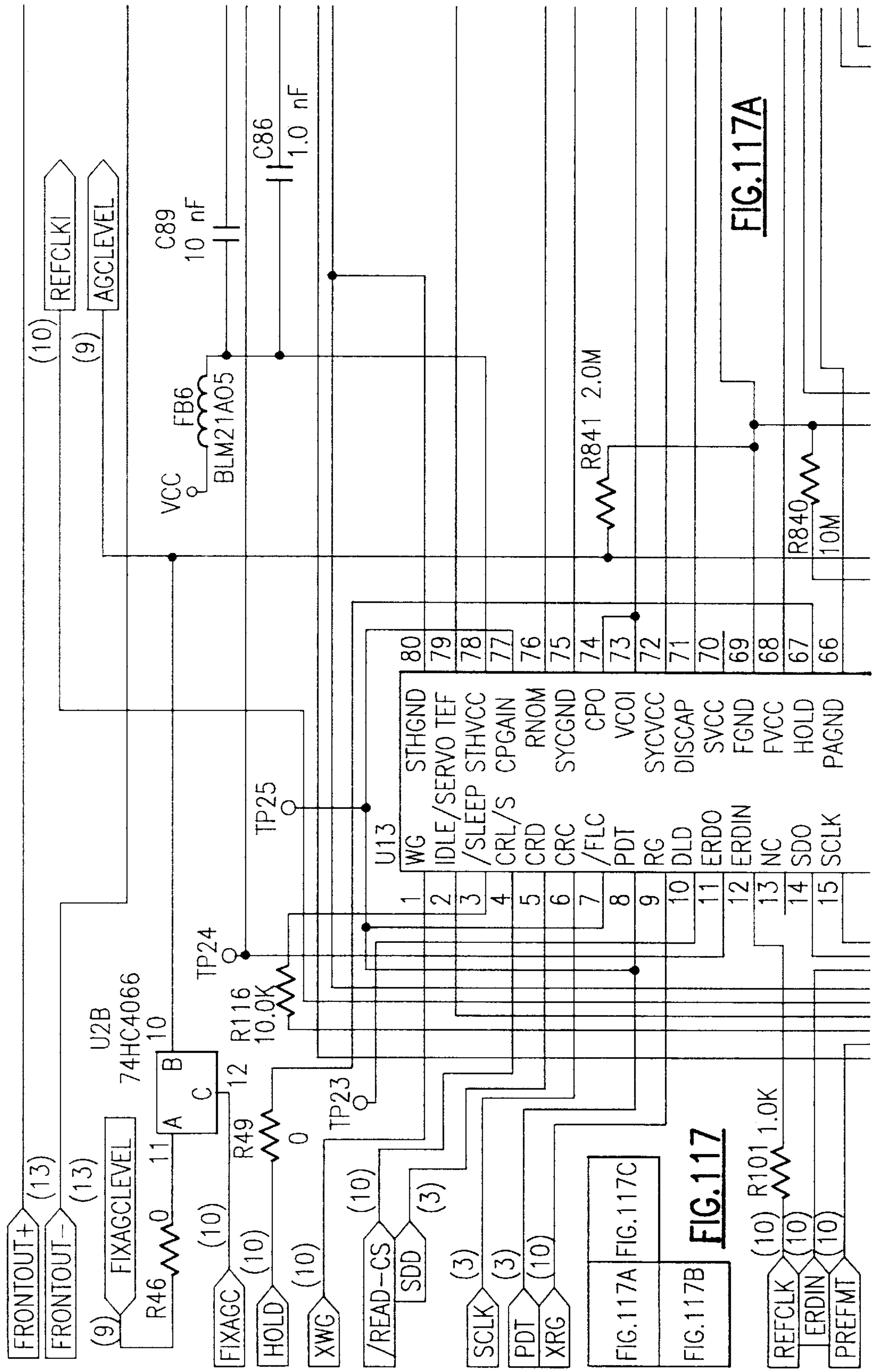
Figure 117B:
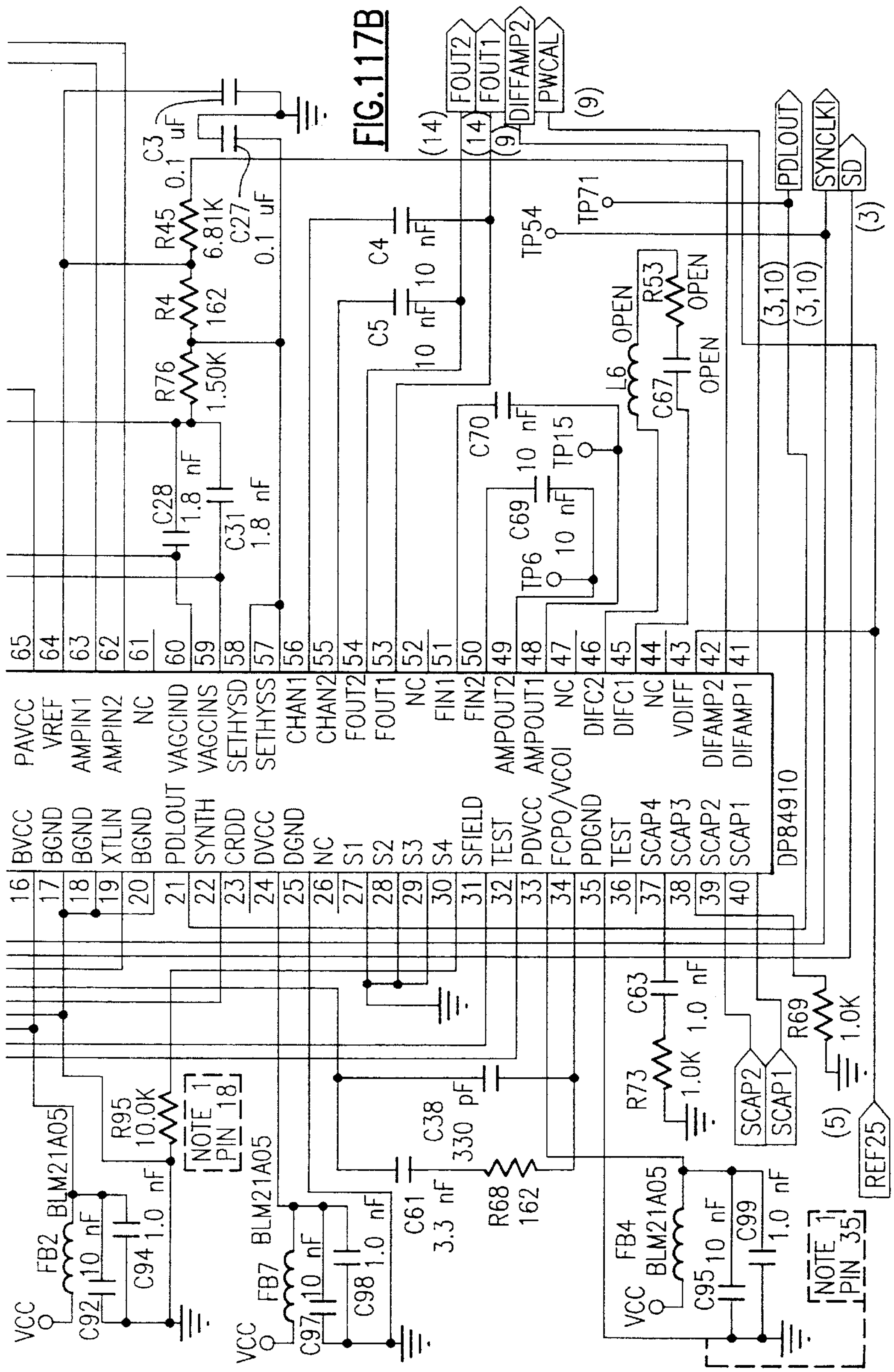

Signals at pin 2 (PWCAL) and pin 6 of the analog-to-digital converter U6 are servo differential amplifier signals originating from the 84910 (FIG. 117). These signals may be used to sample the read channel signals and are controlled by digital signals at pins 27–30 of the 84910, FIG. 117B. In the present embodiment pins 27–30 are grounded, but those skilled in the art will appreciate that these pins could be driven by a variety of different signals, and would allow various signals to be sampled for purposes of calibration.

Pin 3 of U6, FIG. 114A, is the AGC level, which is buffered by U21B, and then resistively divided to scale it for input into the A to D converter. The AGC level will be sampled in a known written sector. The resulting value will be written out on pin 19 of U16 as a fixed AGC level. The fixed AGC level is then input into the 84910 of FIG. 117. The 84910 then sets the AGC level that inhibits the amplifiers from operating at maximum gain while a sector is being evaluated to determine if it is a blank sector.

The bias current, which has been discussed with reference to FIG. 112, is monitored on pin 4 of analog to digital converter U6, FIG. 114A, as a further safeguard during write and erase operations in order to determine that it has correct amplitude and polarity.

Signals PWCALLF and PWCALHF appear on pins 7 and 8 of U6 at A6 and A7 respectively. These signals are derived from sample and hold circuits (see FIG. 118), and can be controlled by the glue logic encoder/decoder (GLENDEC) by signals WTLF or WTHF, as shown in FIG. 118B. They are employed within a sector in order to sample a high frequency written pattern, and the average DC component of a low frequency written pattern. The average values can be compared to obtain an offset that can be used to optimize 4x write powers.

Pin 11 of U6 (A9), FIG. 114A, is coupled through U21A, a differential amplifier having inputs INTD+ and INTD–.

These signals are the DC level of the data relative to the DC level of the restore signal in the 4x read channel. The difference signal determines the threshold level for the comparator in the 4x read channel. Using the D-to-A converter, DSP threshold, at U3, pin 3 (FIG. 11OD) this DC offset can be canceled. Additionally, for error recovery an offset could be injected to attempt to recover data that may be otherwise unrecoverable. Thus a 4x read channel recovery and calibration function is provided.

Figure 114B:
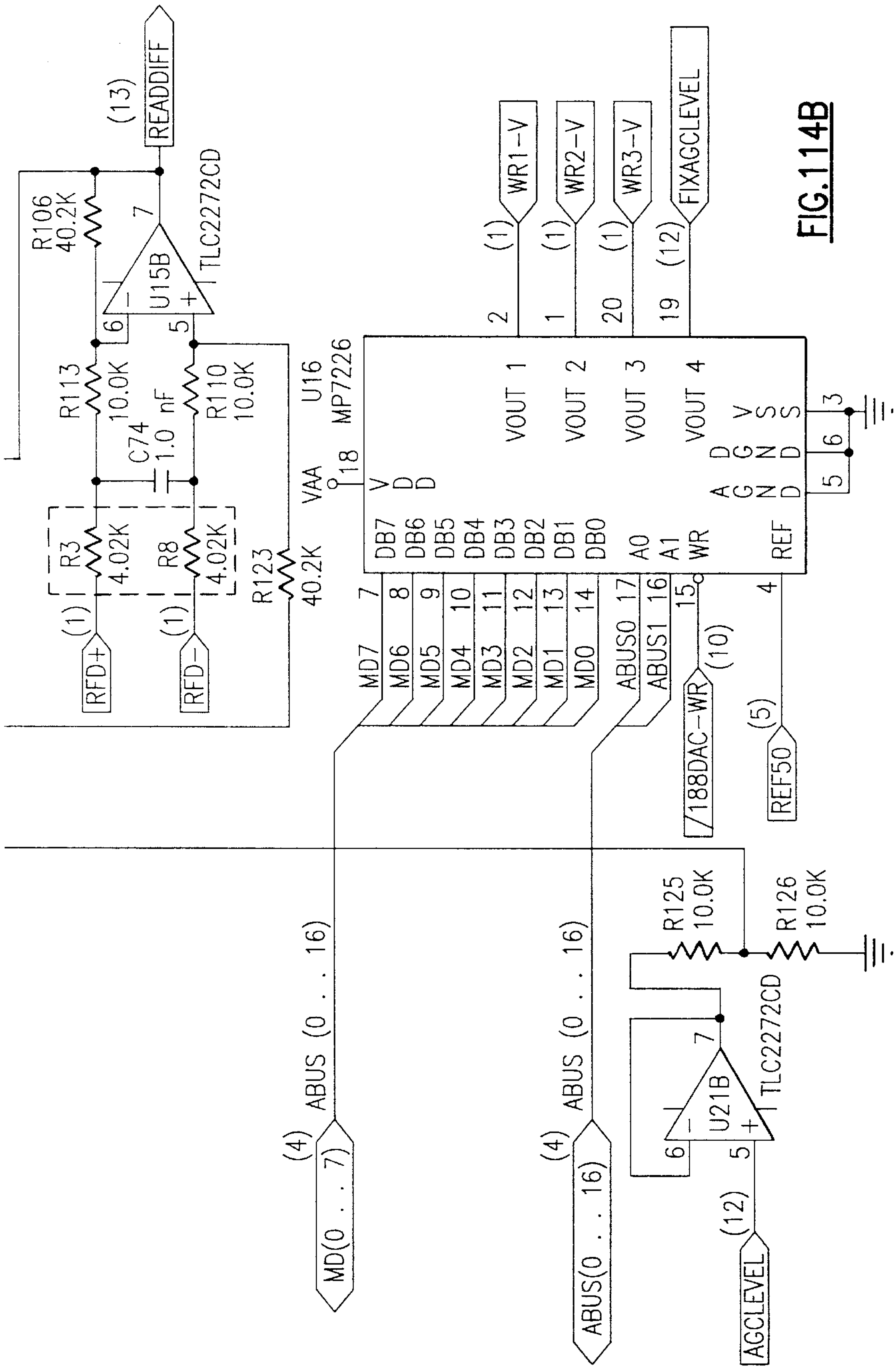

Signal ReadDIFF appears at Pin 12 of U6, A10, as the output of a differential amplifier U15B, FIGS. 114A–B. ReadDIFF is the DC component of the MO preamplifier, or the pre-format preamplifier. Thus the DC value of the read signal can be determined, and can be used to measure the DC value of an erased track in a first direction, and an erased track in a second direction in order to provide a difference value for the peak-to-peak MO signal. Also the written data can be averaged to yield an average DC value that provides a measure of the writing that is occurring. This value is also used for a 4x write power calibration.

Figure 109B:
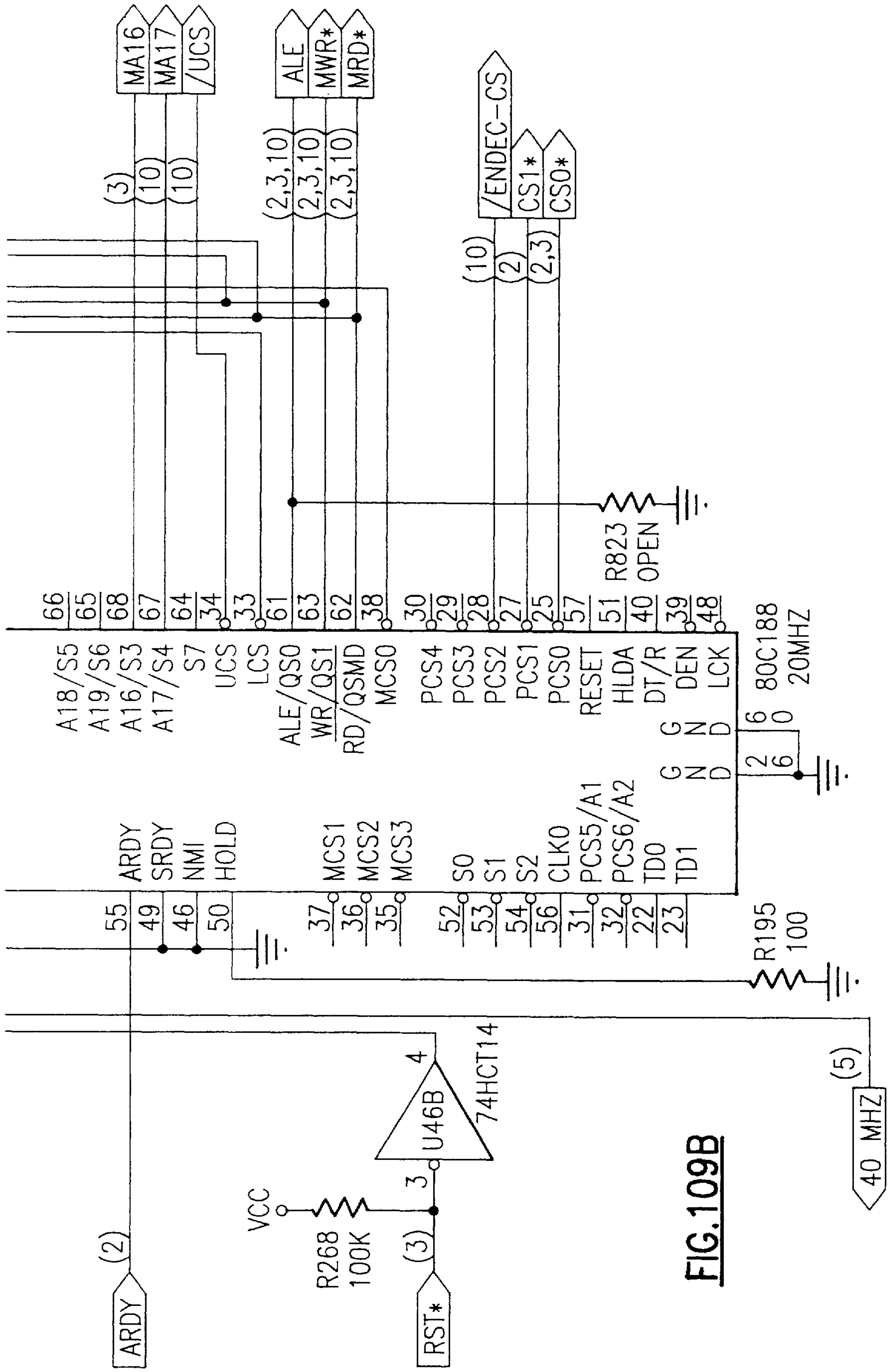
Figure 109C:
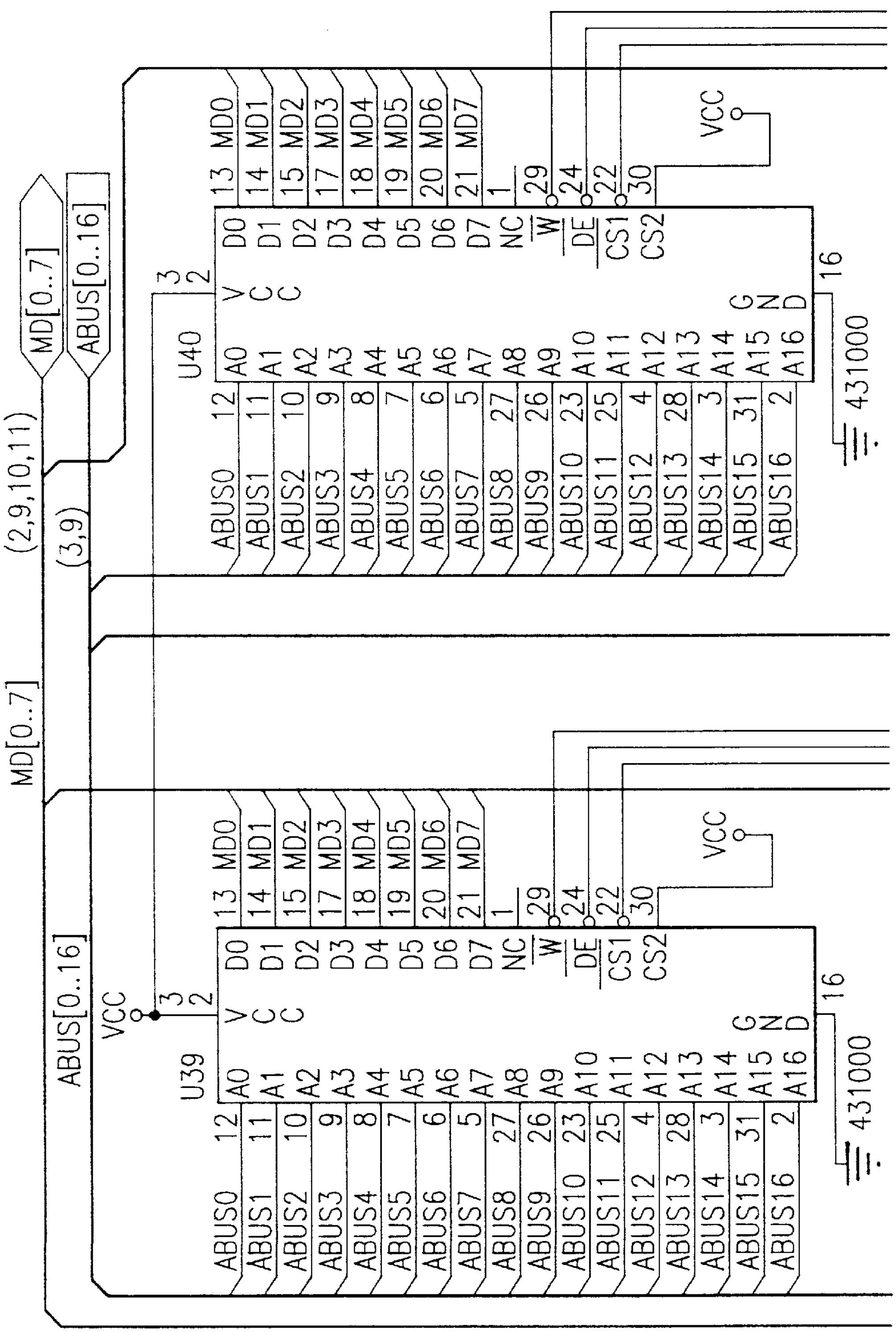
Figure 109D:
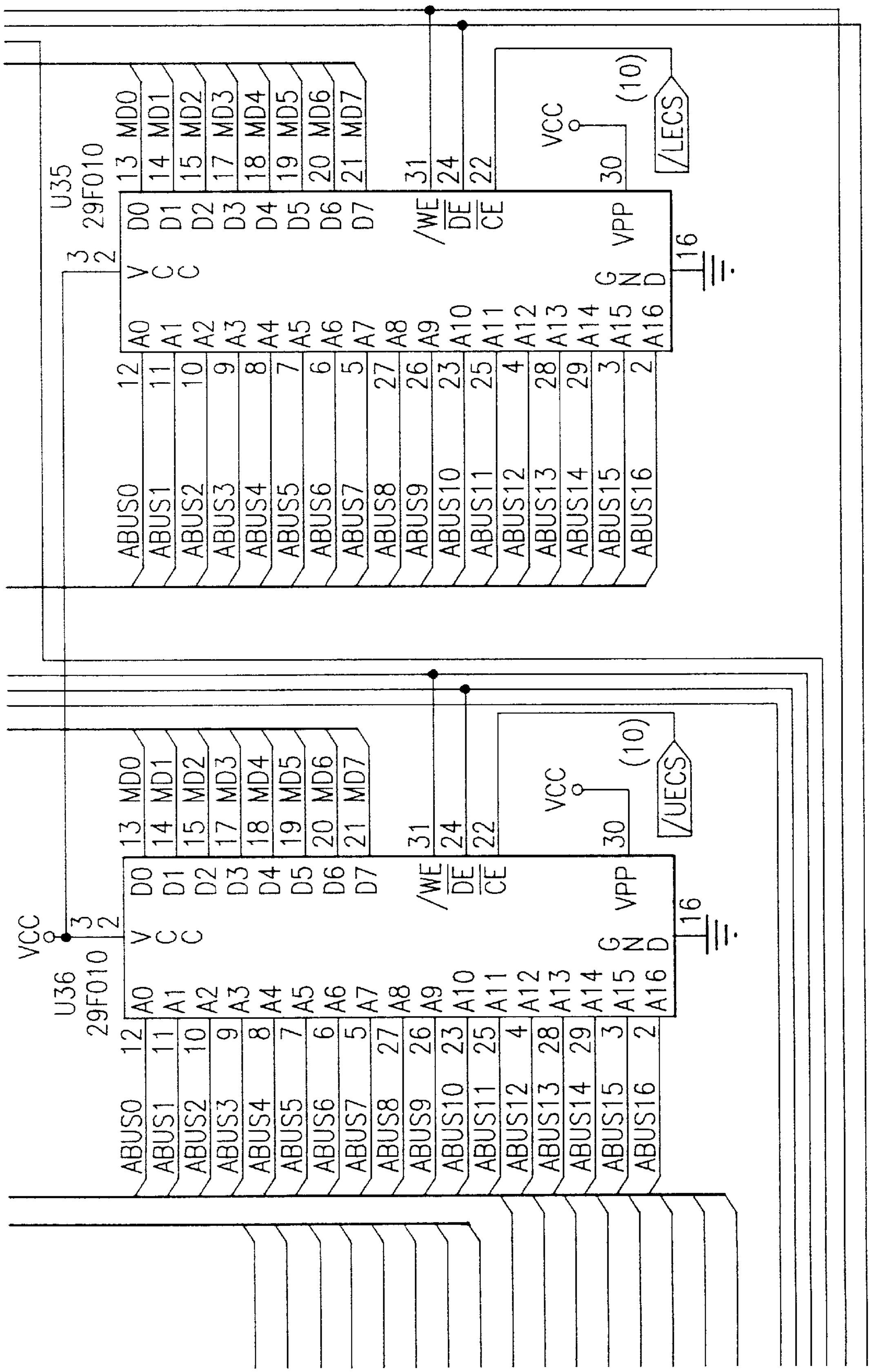

U16, FIG. 114B, is a D-to-A converter which is controlled by the 80C188 (FIGS. 109A–B; U38) processor. The outputs of U16 are voltages that control the current levels for the three write power levels; WR1-V, WR2-V, and WR3-V. These signals determine the power of the individual pulses. The fourth output is the above noted fixed AGC level.

Figures 115, 115A:
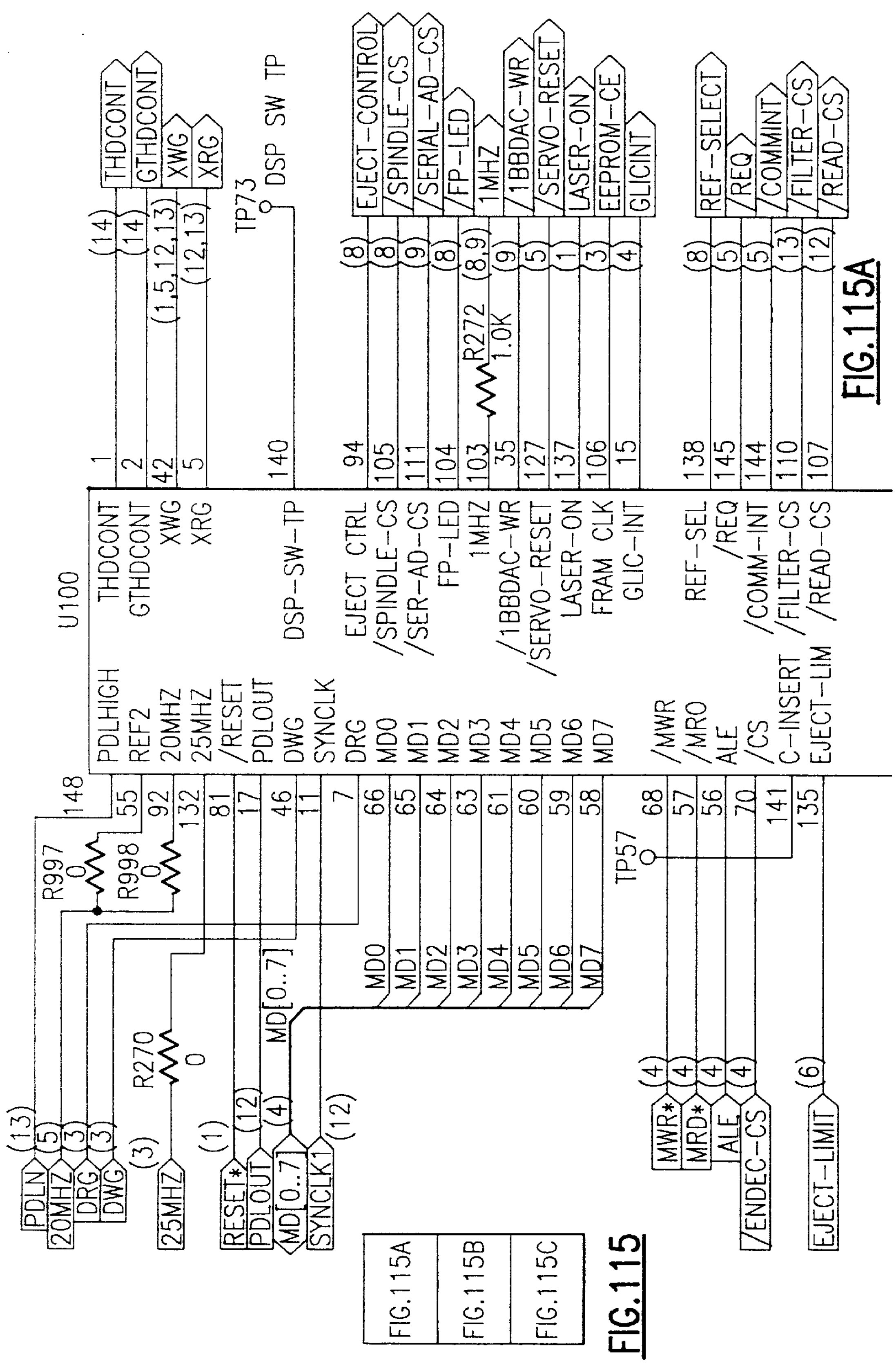
Figure 115B:
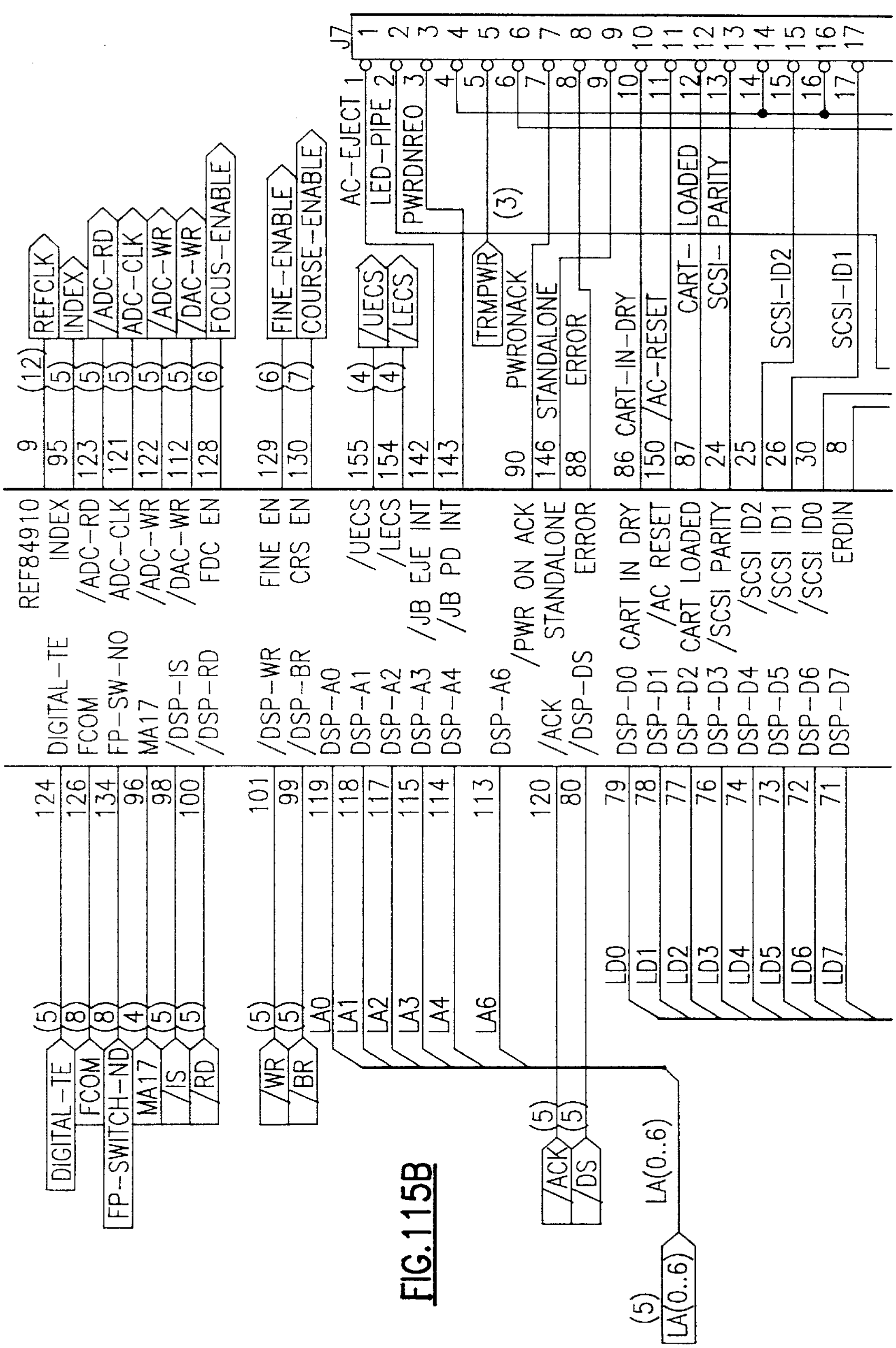
Figure 115C:
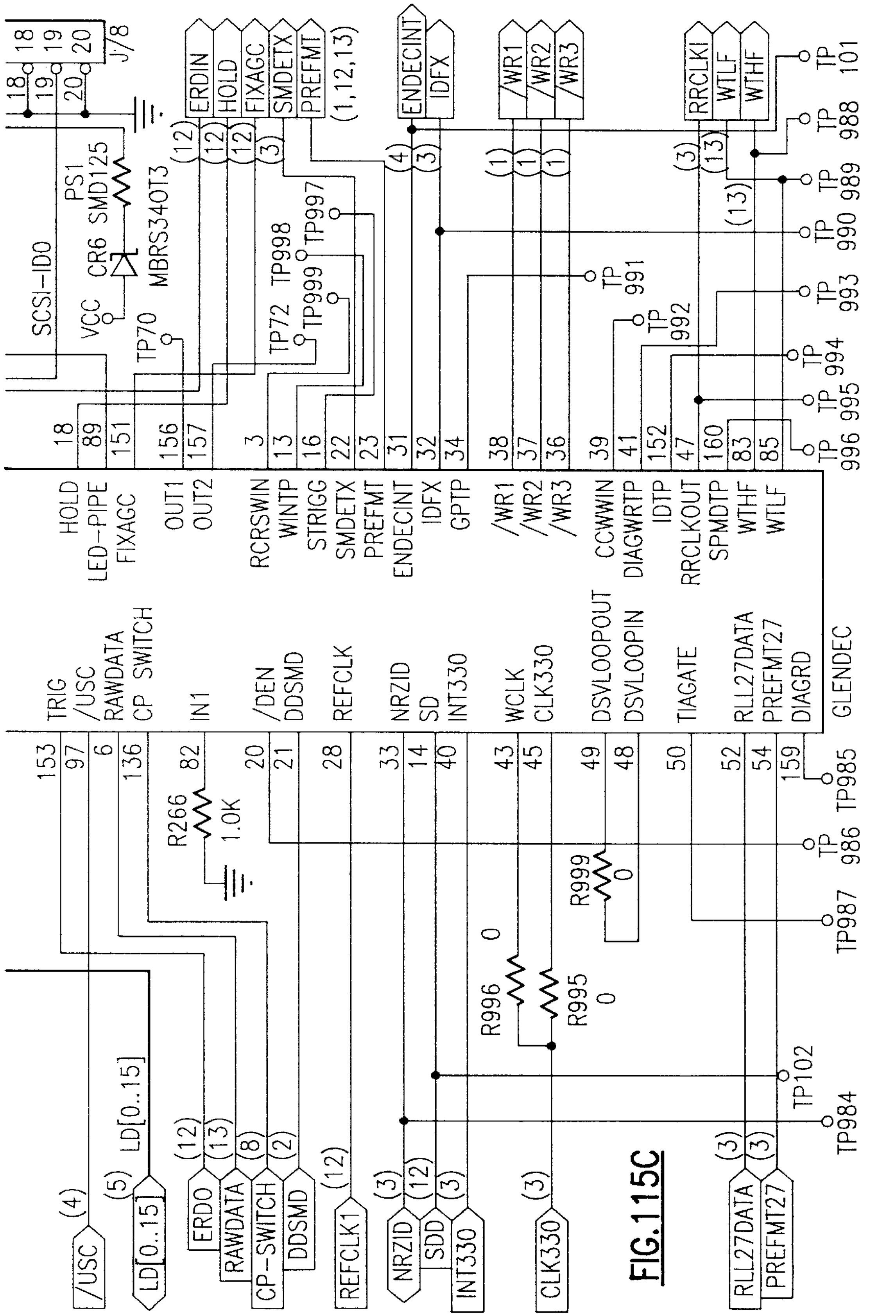

The GLENDEC is shown in FIG. 115 as U100. The Glue Logic ENcode/DECode essentially combines a number of different functions in a gate array. The ENcode/DECode portion is an RLL 1, 7 encode/decode function. The ENcode function's input is the NRZ of U43 (FIG. 108A), pin 70, and its output is encoded to RLL 1, 7, which is then written to the disc by pin 36, 37 and 38 of U100 (WR1, WR2, WR3). The DECode function accepts RLL 1, 7-encoded data from the disc, which is decoded and returned to the NRZ for transmission to U43 (FIG. 108A). U16, FIG. 114B, also contains the 4x sector format which is used for timing. Of course U16 is programmable, so that different sector formats can be defined therein.

Other functions conducted by the GLENDEC U100 of FIG. 115 include the communication interface between the DSP (U4, FIG. 110) and the host processor, the 80C188 (U38; FIG. 109). Counters for track crossing, and timers for measuring time between track crossings are also provided, which are used by the DSP for seek functions.

Figures 116, 116A:
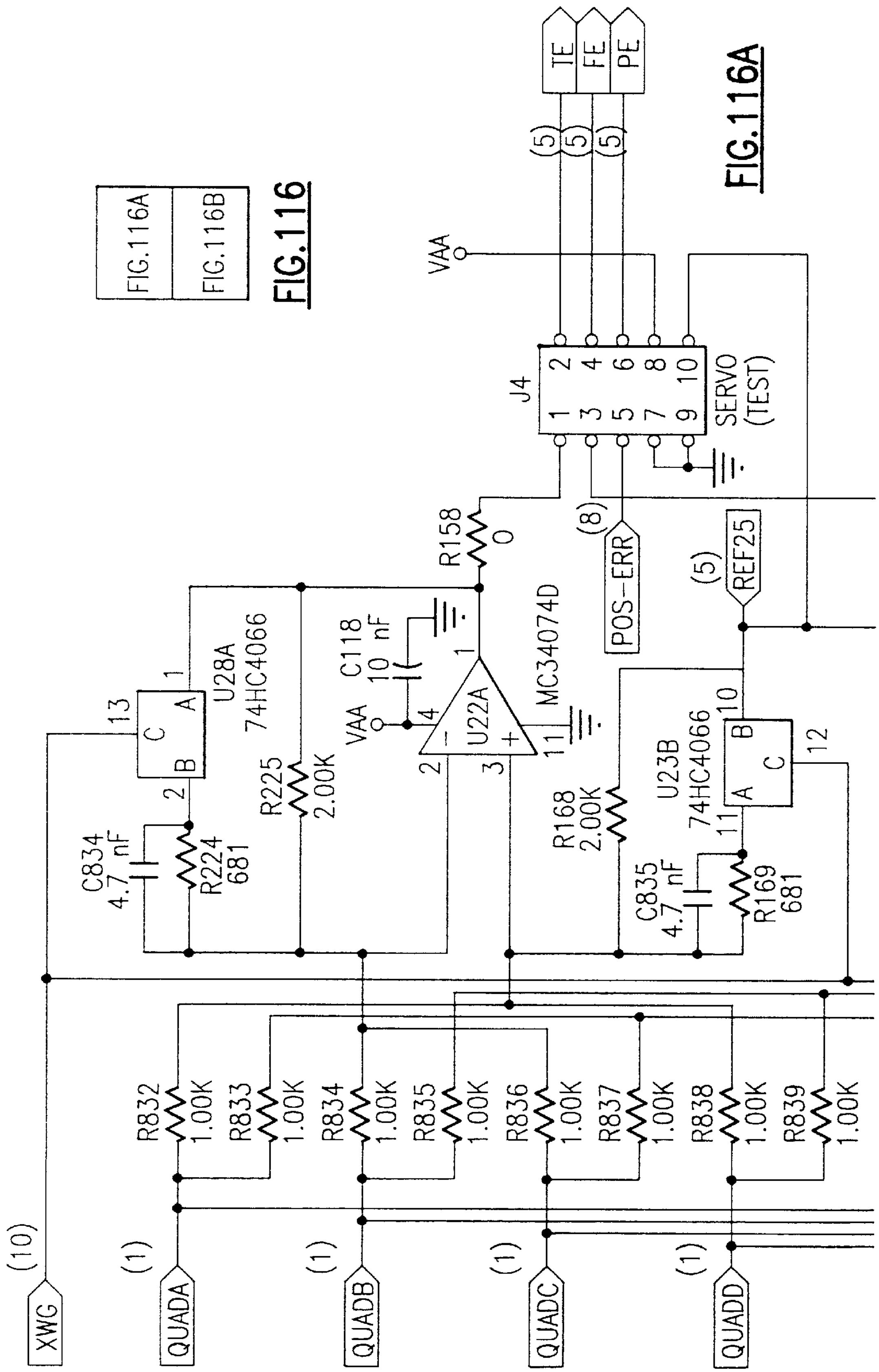
Figure 116B:
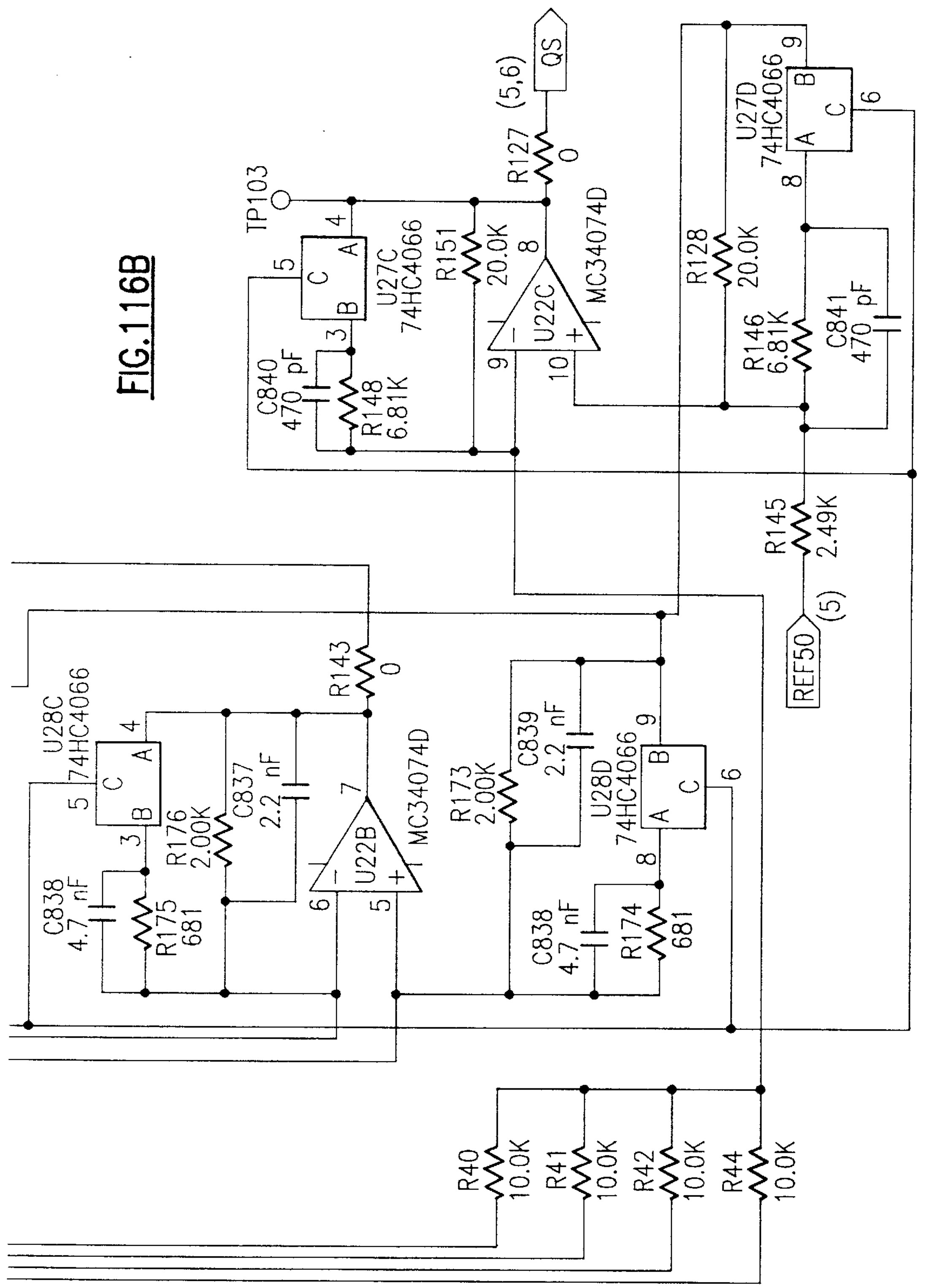

FIG. 116 shows the servo error generation circuitry. Signals QUADA, QUADB, QUADC, and QUADD, FIG. 116A, represent the output of the servo transimpedance amplifiers which are located on the preamp board (FIG. 102B, U1A–U1D). These signals are added and subtracted as appropriate in operational amplifiers U22A and U22B, FIGS. 116A–B, in order to generate tracking and focus error signals TE and FE, respectively, on J4 of FIG. 116A. U22C, FIG. 116B, sums QUADA, QUADB, QUADC, and QUADD as quad sum signal QS.

The switches U28A, U28B, U28C, U28D, U27C, and U27D are enabled during writing to lower the circuit gain because of increased quad currents during writes. During a write QUADA, QUADB, QUADC, and QUADD are all attenuated by approximately a factor of 4.

The read channel is now discussed with reference to FIG. 118A. The read signals RFD+, RFD− originate on the preamplifier board (FIG. 102B, U106), and propagate through gain switches U48A, U48B, FIG. 118A(1), for normalizing the relative levels of the preformatted signal and the MO signal. The gain switches are controlled by U25B, which switches between preformatted and MO areas of the disk.

Figures 117C, 117D, 117E:
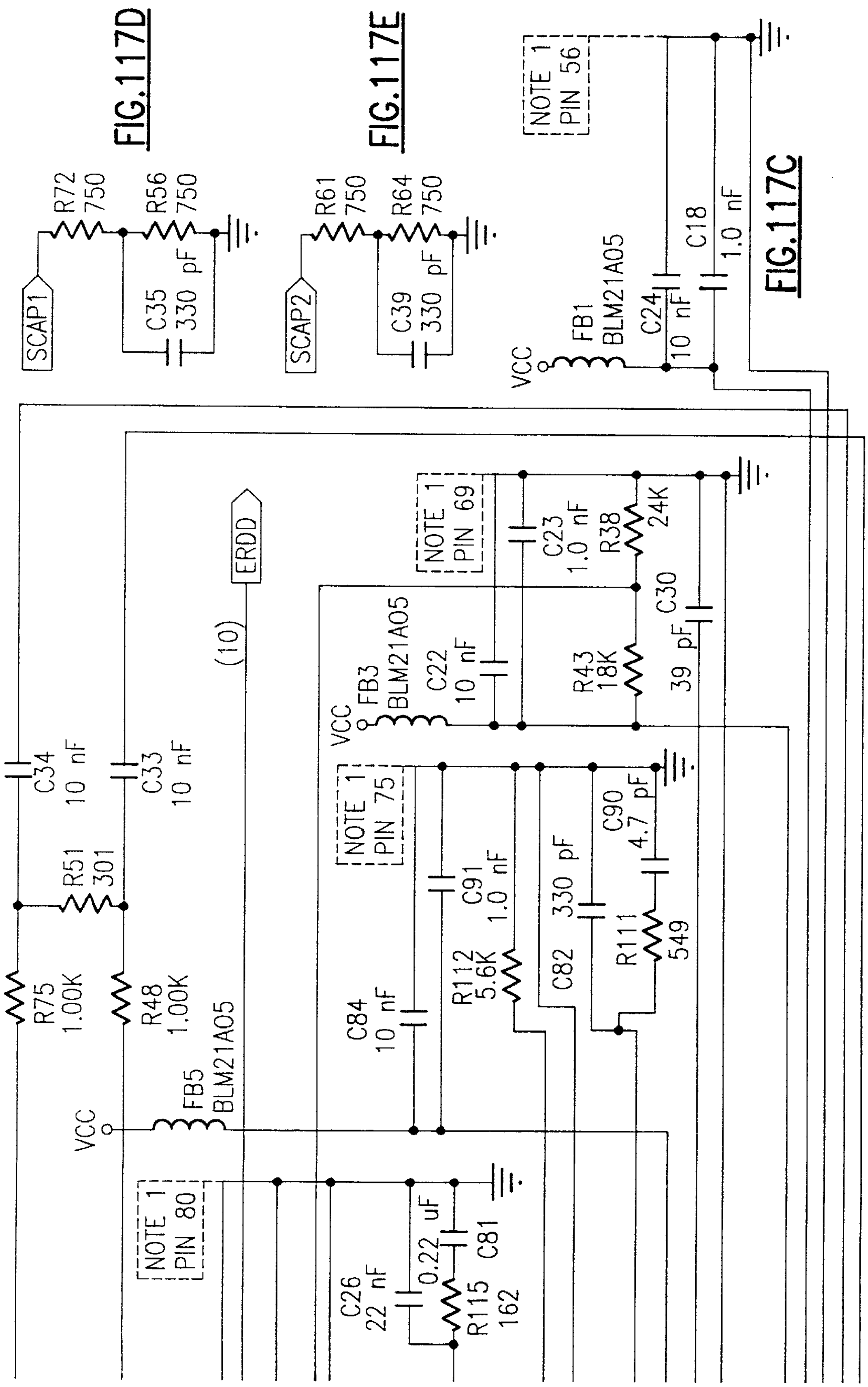

During write operations U48C and U48D are open, so that the read signals do not saturate the inputs of the read channel. During read operations, both of these switches are closed, and the read signal fed through to the differentiator U47, FIG. 118A(2). U47 is compensated for minimum group delay errors, and can operate out to 20 MHz. The output of U47 is AC coupled through C36 and C37 to SSI filter U1 and to the 84910 (FIG. 117) through FRONTOUT+ and FRONTOUT−. Signals are resistively attenuated by R75 and R48, as shown in FIG. 117C, so that acceptable signal levels are seen by the 84910. FRONTOUT+ and FRONTOUT− are then AC coupled to the 84910 through C34 and C33 respectively.

Several functions are included in the 84910 in order that the read channel can function properly. These include the read channel AGC, read channel phase lock loop, data detector, data separator, frequency synthesizer. Servo error generators, which are typical Winchester servo error generator functions, also are part of the 84910. These, however, are not used in the present embodiment.

The output of the data separated signal of the 84910 (U13), FIG. 117, comes out on pins 14 and 15 and is then connected to the SM330, U43 (FIG. 108A). These signals are used for the 1x and 2x read channel modes.

The pre-format signal controls pin 31 of the 84910 so that there are actually two separate AGC signals. One is used for reading the header or pre-formatted data and the other for MO data.

Figure 118A:
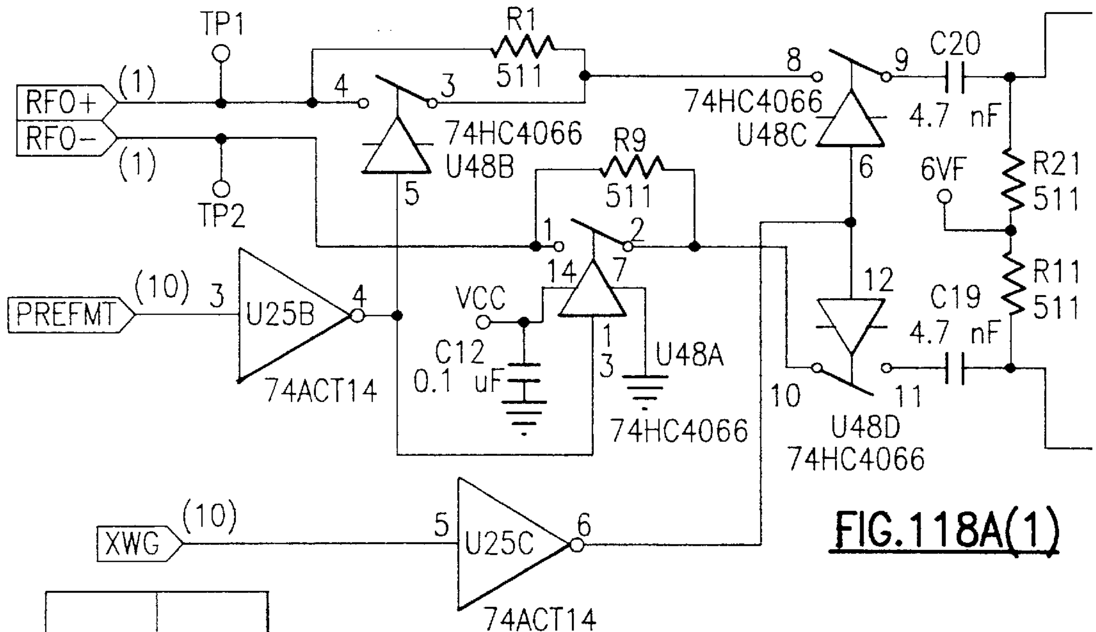
Figure 118A:
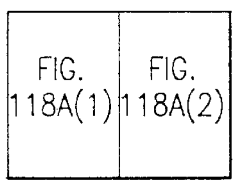
Figure 118B:
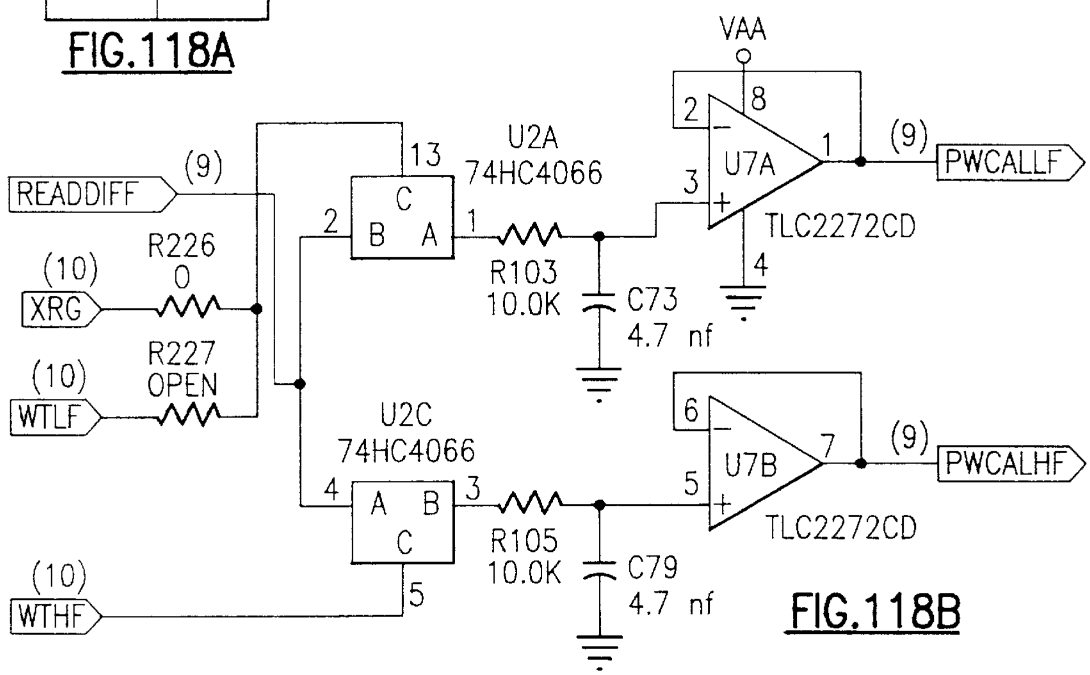
Figures 119, 119A:
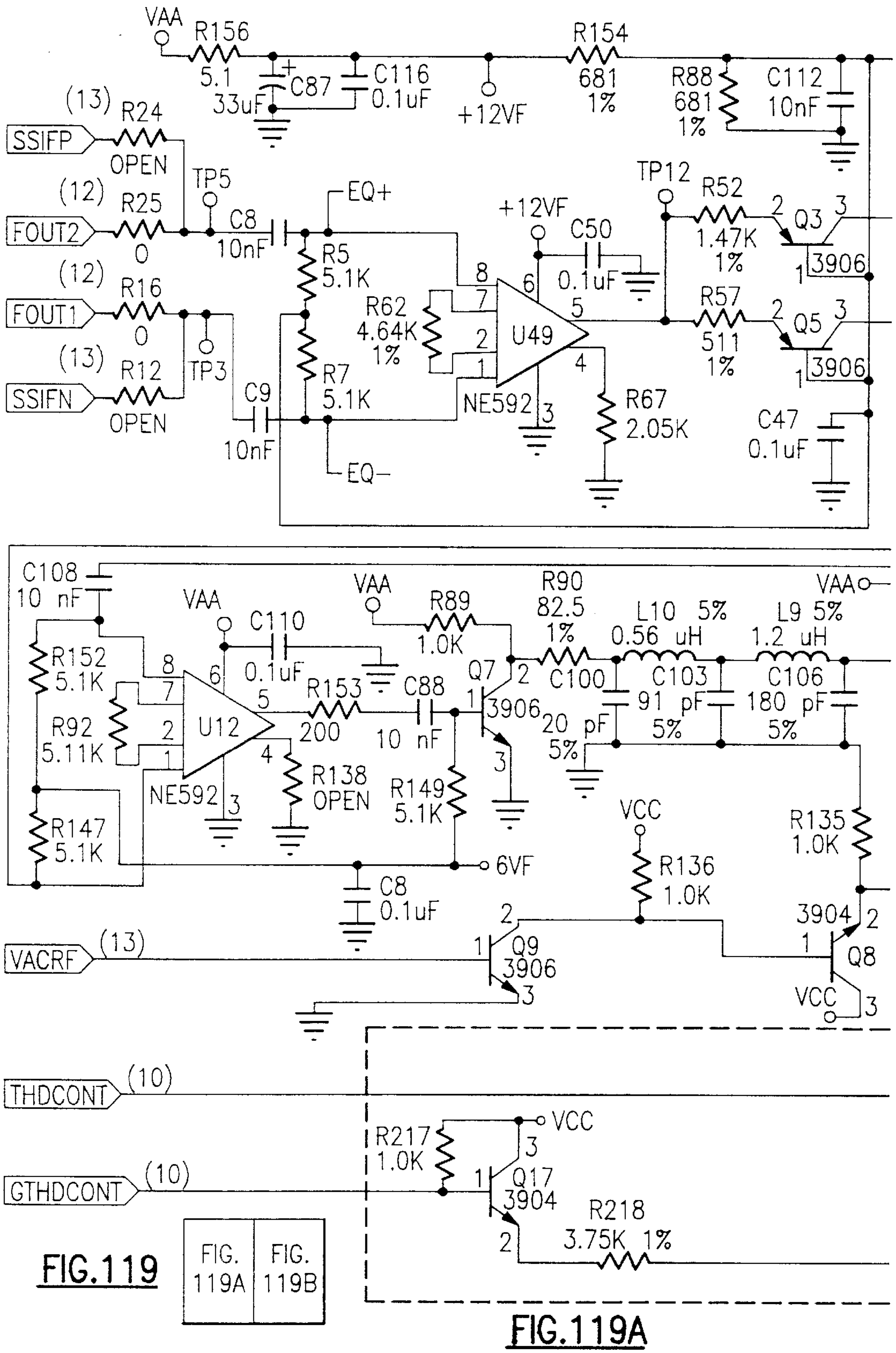
Figure 119B:
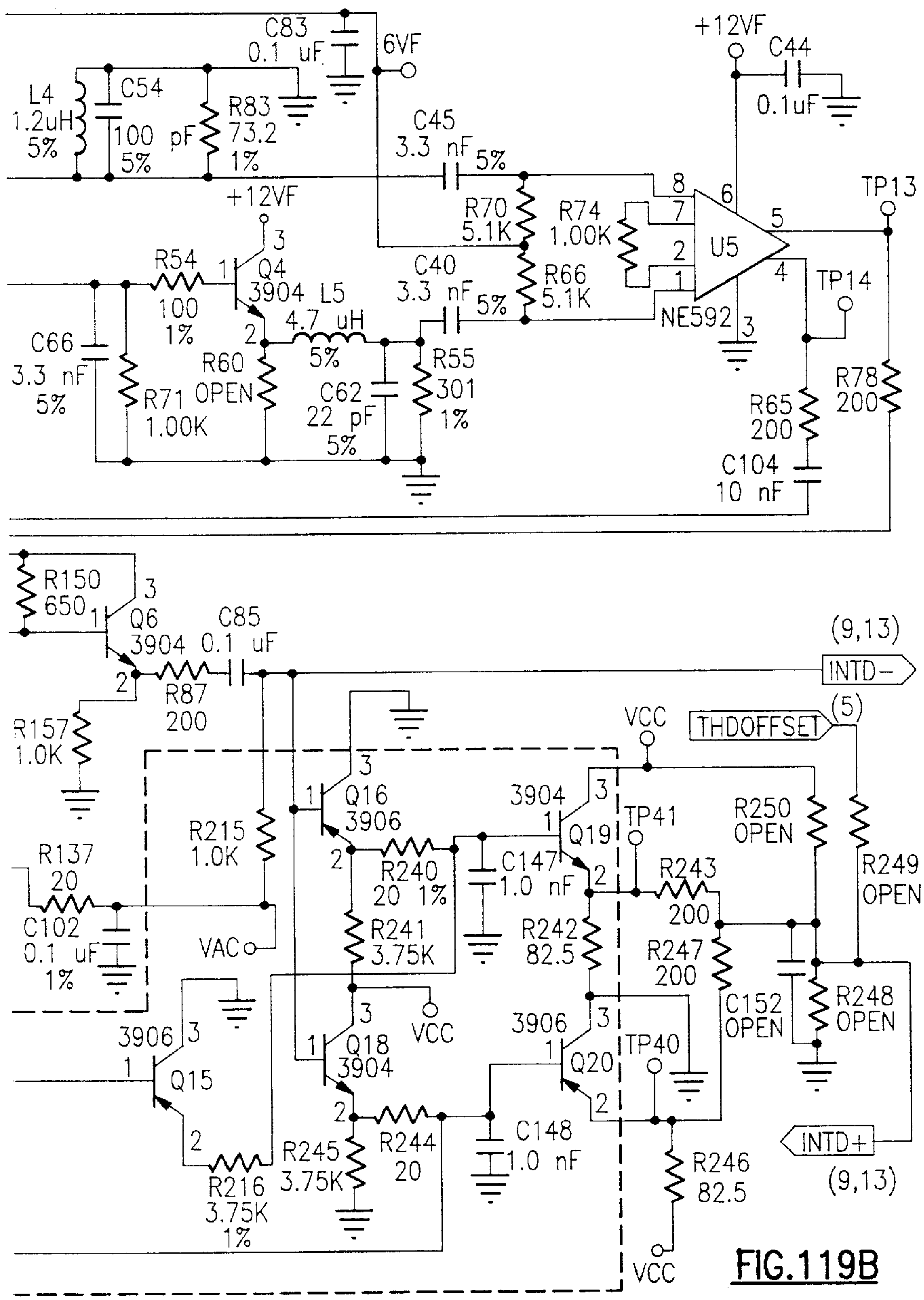
Figure 119C:
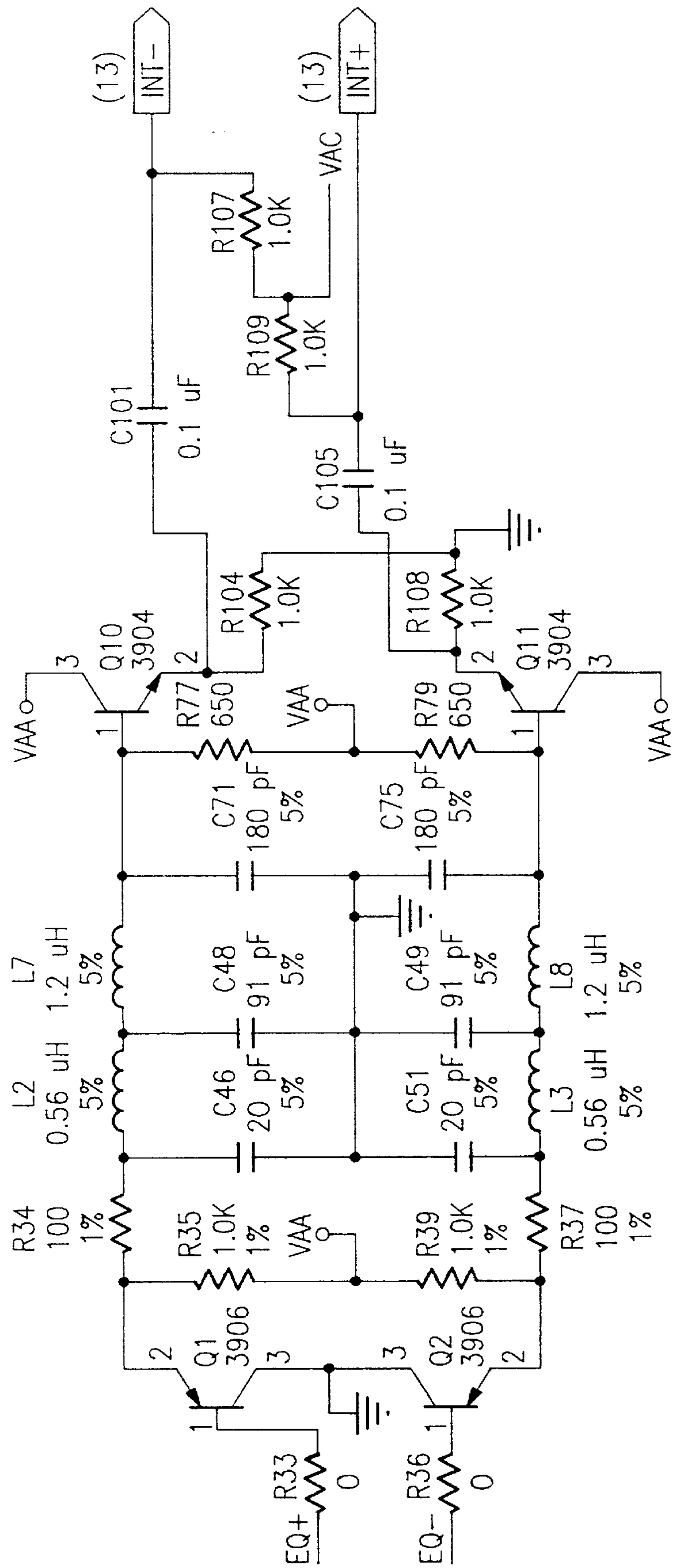

In the case of the 4x read channel, signals SSIFP and SSIFN, FIG. 118A(2), enter U49, a buffer amplifier (FIG. 119A). The output of U49 is conducted to Q3, Q4 and Q5, (FIGS. 119A–B) which function as an integrator with boost. U5, FIG. 119B, is a buffer amplifier for the integrated and boosted signal. The 4x read channel thus involves an SSI filter, equalization, differentiation, and integration.

Figure 118C:
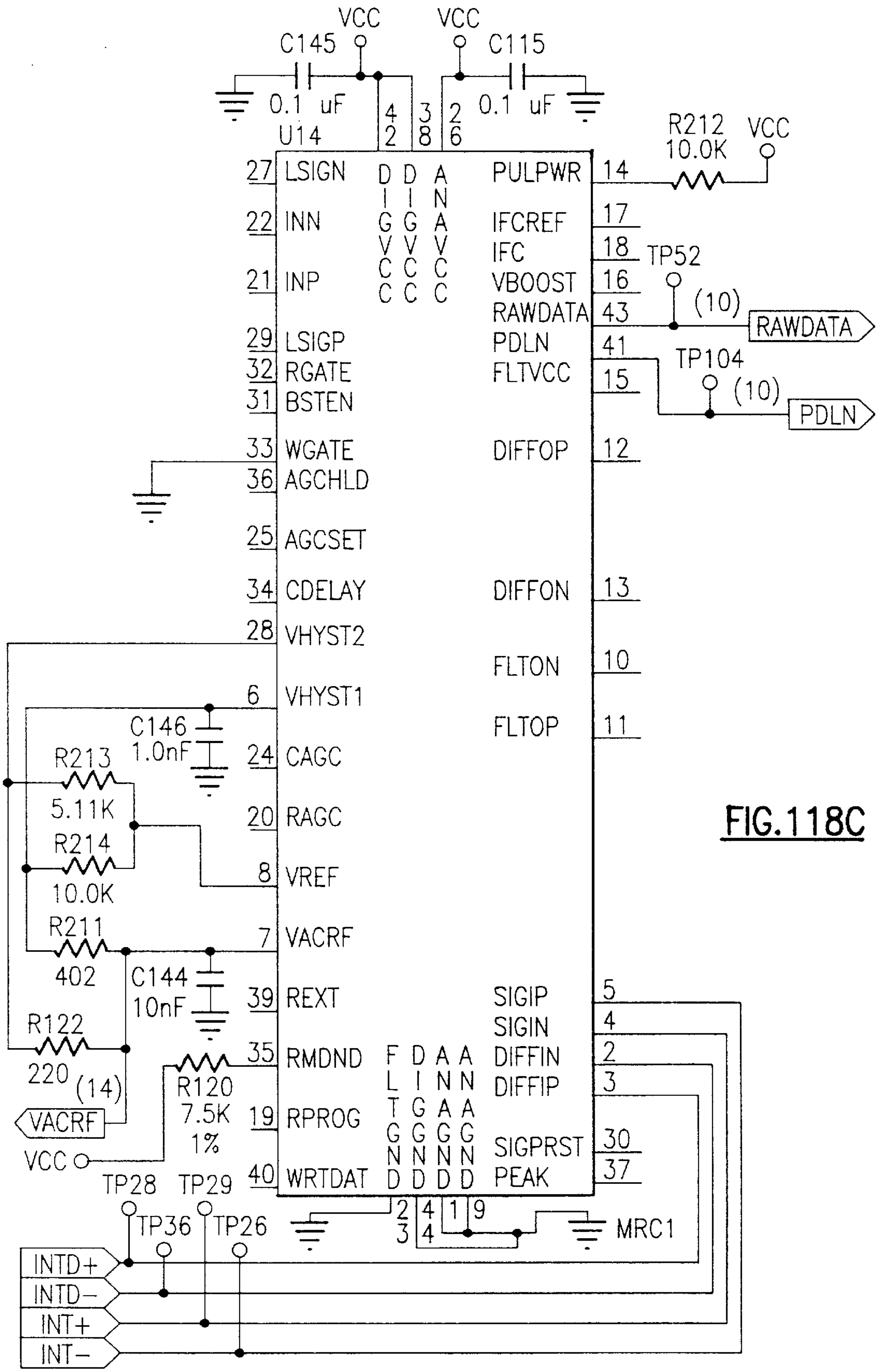

The output of U5 is buffered by amplifier U12, FIG. 119A, and is coupled to a circuit that determines the midpoint between the peak-to-peak levels, also known as a restore circuit. As a result of the restoration, the signals INTD+ and INTD−, FIG. 118C, are input to a comparator whose output provides the threshold level signal used in data separation. Signals INT+, INT−, INTD+ and INTD− are then input to U14, an MRC1 of FIG. 118C, where they are compared, and read data is separated. The output of U14 is returned to the GLENDEC U100 (FIG. 115) for encode/decode operation.

The digital signal processor firmware is disclosed in Appendix B attached hereto and incorporated herein by reference.

Digital Lead/Lag Compensation Circuit

It is well known in the art that there are particular concerns with position control systems that use a motor having a drive signal proportional to acceleration (e.g., the drive signal is a current). These position control systems require lead/lag compensation to substantially eliminate oscillation to stabilize the position control system or servo system.

The circuit of the present invention is a digital lead/lag compensation circuit that not only substantially eliminates oscillation, but also provides a notch filter frequency of one half the digital sampling frequency. In the following section labeled Transfer Functions, there are listed the mathematical transfer functions of a digital lead/lag circuit of the present invention, which is a single lead, complex lag compensation. Also listed for comparison are a few prior art digital lead/lag compensation circuits and one analog lead/lag compensation circuit. From the section below, the transfer function of the invention is seen to be H (s)=(s+w6) x square (w7) divided by (square (s)+2 zeta7 w7s+square(w7)) w6.

Also listed in the following section is the s-domain formulation of the transfer function, a formulation suitable for display on a Bode plot. From the Bode plot one can see that the compensation circuit of the present invention has a minimal impact on phase.

While the prior art compensation circuits also can be seen to have minimum phase impact, only the compensation circuit of the present invention has a notch filter at a frequency of one half the digital sampling frequency. With proper choice of sampling frequency, this notch filter can be used to notch parasitic mechanical resonance frequencies, such as those of the servo motor being compensated. In the drive 10 of FIG. 1, and the alternate preferred embodiments thereof, the single lead complex lag compensation circuit is used to suppress mechanical decoupling resonance of the fine and focus servo motors as shown in the following section.

Transfer Functions

The following mathematical derivations illustrate the transfer functions of the digital lead/lag compensation circuit of the present invention. The focus loop transfer function will be shown and discussed first. This discussion is followed by a similar detailed description of the compensation transfer functions.

Focus Loop Transfer Function:

Shift in frequency at 23 C $$T_{factor}:=1 \quad \omega_0:=2\cdot\pi\cdot 3000i$$

ACTUATOR MODEL: Decoupling Frequency:

$$\omega_1 := T_{factor}\cdot 2\cdot\pi\cdot 33\cdot 10^3 \qquad \zeta_1 := 0.01$$

$$H_1(s) := \frac{2\cdot\zeta_1\cdot\omega_1\cdot s+\omega_1{}^2}{(s^2+2\cdot\zeta_1\cdot\omega_1\cdot s+\omega_1{}^2)}$$

Parasitic Resonance:

$$\omega_3:=T_{factor}\cdot 2\cdot\pi\cdot 23\cdot 10^3 \zeta_3:=0.03 \quad \omega_2:=T_{factor}\cdot 2\cdot\pi\cdot 27\cdot 10^3$$

$$\zeta_2 := \zeta_3\cdot\left(\frac{\omega_2}{\omega_3}\right) \qquad H_2(s) := \left(\frac{s^2+2\cdot\zeta_2\cdot\omega_2\cdot s+\omega_2{}^2}{s^2+2\cdot\zeta_3\cdot\omega_3\cdot s+\omega_3{}^2}\right)\cdot\left(\frac{\omega_3{}^2}{\omega_2{}^2}\right)$$

HF Phase Loss:

$$\omega_4 := 2\cdot\pi\cdot 100\cdot 10^3 \qquad \tau_4 := \frac{1}{\omega_4} \qquad H_3(s) := \frac{1}{1+\tau_4\cdot s}$$

Fundamental Frequency:

$$M_{constant}:=790\ m/(s\hat{}2\cdot A)$$

$$\omega_5:=T_{factor}\cdot 2\cdot\pi\cdot 36.9 \quad \zeta_5:=0.08$$

$$H_4(s) := \frac{M_{constant}}{\omega_5{}^2}\cdot\left(\frac{\omega_5{}^2}{s^2+2\cdot\zeta_5\cdot\omega_3\cdot s+\omega_5{}^2}\right)$$

Actuator Response:

$$H_{actuator}(s):=H_1(s)\cdot H_2(s)\cdot H_3(s)\cdot H_4(s)$$

DSP MODEL: Single Lead Complex Lag Circuit:

Sample Period $T:=20\cdot 10^{-6}$ $$H_{leading}(s) := \frac{1+\frac{0.107}{e^{(s\cdot T)}}-\frac{0.893}{[e^{(s\cdot T)}]^2}}{1+\frac{0.356}{e^{(s\cdot T)}}+\frac{0.136}{[e^{(s\cdot T)}]^2}}$$

DSP S&H and Processing Delay:

$$ZOH(s) := \left(\frac{1-\exp(-s\cdot T)}{s\cdot T}\right)$$

$$T_{delay} := 3.3\cdot 10^{-6} \qquad H_{delay}(s) := \exp(-s\cdot T_{delay})$$

DSP Response:

$$H_{dsp}(s):=(ZOH(s)\cdot H_{delay}(s)\cdot H_{leading}(s))$$

Anti-aliasing Filter:

$$R_{filt} := 20000 \quad C_{filt} := 100\cdot 10^{-12} \quad \tau_{filt} := R_{filt}\cdot C_{filt}$$

$$H_{filt}(s) := \frac{1}{1+s\cdot\tau_{filt}}$$

$$F_{filt} := \frac{1}{2\cdot\pi\cdot\tau_{filt}} \qquad F_{filt} = 7.958\cdot 10^4$$

Simplified Focus Power Amp Response:

$$\omega_{pa1} := 2\cdot\pi\cdot 28000 \quad \zeta_{pa1} := .4 \quad G_{pa1} := 0.098\frac{A}{V} \quad G_{pa2} := \frac{5}{2^{16}}\frac{V}{\text{bit}}$$

$$\omega_{pa2} := 2\cdot\pi\cdot 450000 \quad \zeta_{pa2} := 0.8 \quad G_{pa} := G_{pa1}\cdot G_{pa2}A/\text{BIT}$$

$$G_{pa}\cdot M_{constant} = 5.907\cdot 10^{-3}\frac{m}{s^2\cdot\text{bit}} \qquad G_{pa} = 7.477\cdot 10^{-6}$$

$$H_{pa}(s) := G_{pa}\cdot\left(\frac{\omega_{pa1}{}^2}{s^2+2\cdot\zeta_{pa1}\cdot\omega_{pa1}\cdot s+\omega_{pa1}{}^2}\right)\cdot\left(\frac{\omega_{pa2}{}^2}{s^2\cdot 2\cdot\zeta_{pa2}\cdot\omega_{pa2}\cdot s+\omega_{pa2}{}^2}\right)$$

Focus Error Signal:

$$\text{Slope} := 0.1\frac{Q\text{sum}}{\mu\text{m}} \qquad G_{fe} := \frac{2^{16}}{2}\frac{\text{Bit}}{Q\text{Sum}}$$

$$H_{fe} := \text{Slope}\cdot G_{fe}\cdot 10^6\frac{\text{Bit}}{m} \qquad H_{fe} := 3.277\cdot 10^9$$

Filter Response:

$H(s):=H_{filt}(s)$ Volts/Volt

DSP Response:

$H(s):=H_{dsp}(s)$ Volts/Volt

Power Amp Response:

$H(s):=H_{pa}(s)$ Amps/bit

Actuator Response:

$H(s):=H_{actuator}(s)$ m/a

Focus Error Response:

$H(s):=H_{fe}$ bit/m

Open Loop Response:

$$H(s):=H_{filt}(s)\cdot H_{dsp}(s)\cdot H_{pa}(s)\cdot H_{actuator}(s)\cdot H_{fe}$$

Gain Factor:

$$G := \frac{1}{|H(\omega_0)|} \quad G = 36.059$$

Closed Loop Response:

$$H_{cl}(s) := \frac{G \cdot H(s)}{1 + G \cdot H(s)}$$

Generating Nyquist diagram with "M-circles": Selected amounts of closed loop peaking $M_p$:

$$j := 1 \ldots 4 \qquad M := \begin{bmatrix} 1.3 \\ 1.5 \\ 2.0 \\ 4.0 \end{bmatrix}$$

Radius of M-circle Center of M-circle $$R_j := \frac{M_j}{1 - (M_j)^2} \qquad Ctr_j := \frac{(M_j)^2}{1 - (M_j)^2}$$

$n_2$:=100 $m$:=1 . . $n_2$ $\min_{2_j}$:=$R_j$+$Ctr_j$ $\max_{2_j}$:=−$R_3$+$Ctr_3$ $$x_{m,j} := \min_{2_j} + (\max_{2_j} - \min_{2_j}) \cdot \frac{(m-1)}{(n_2 - 1)}$$

$$y_{m,j} := -\sqrt{(R_j)^2 - (x_{m,j} - Ctr_j)^2}$$

$$z_{m,j} := \sqrt{(R_j)^2 - (x_{m,j} - Ctr_j)^2}$$

$n$:=300 $k$:1 . . $n$ $N_k$:=1000+100·k

Data for bode plots:

$$\min := 100 \quad \max := 10 \cdot 10^4 \quad r := \ln\left(\frac{\max}{\min}\right)$$

$$f_k := \min \cdot e^{k \cdot \frac{r}{n}} \quad deg \equiv \frac{\pi}{180}$$

Magn($s$):=20·log(|G·$H$($s$)|)

Φ($s$):=angle(Re($H$($s$)),Im($H$($s$)))−360·deg $Magn_1$($s$):=20·log(|$H_{cl}$($s$)|)

$Φ_1$($s$):=angle(Re($H_{cl}$($s$)),Im($H_{cl}$($s$)))−360·deg

Figure 124:
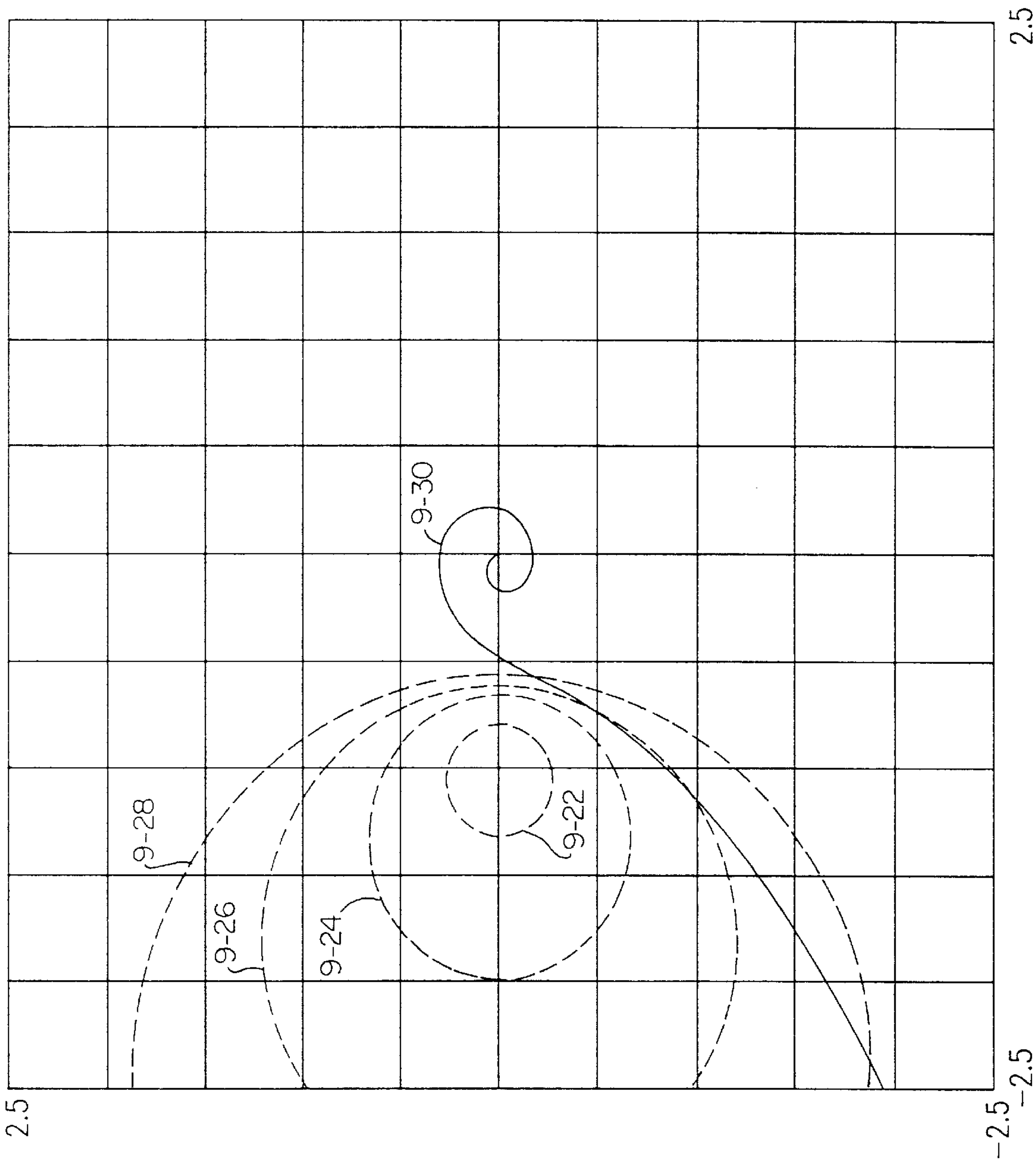
Figure 125:
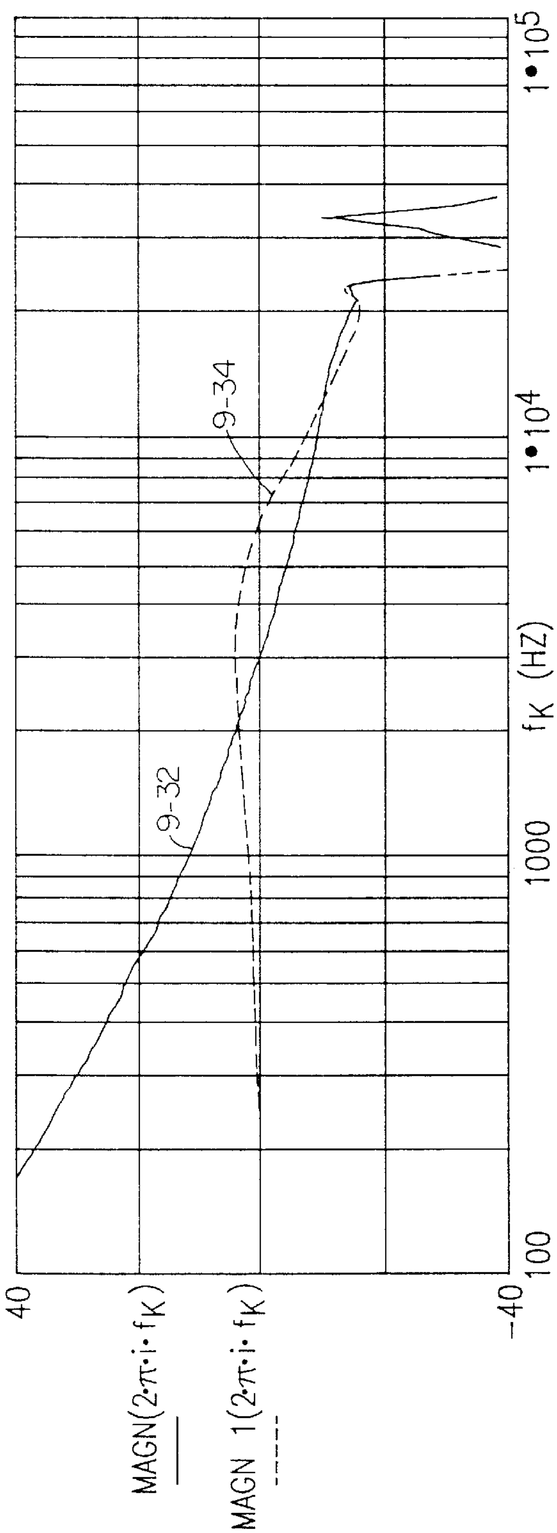
Figure 126:
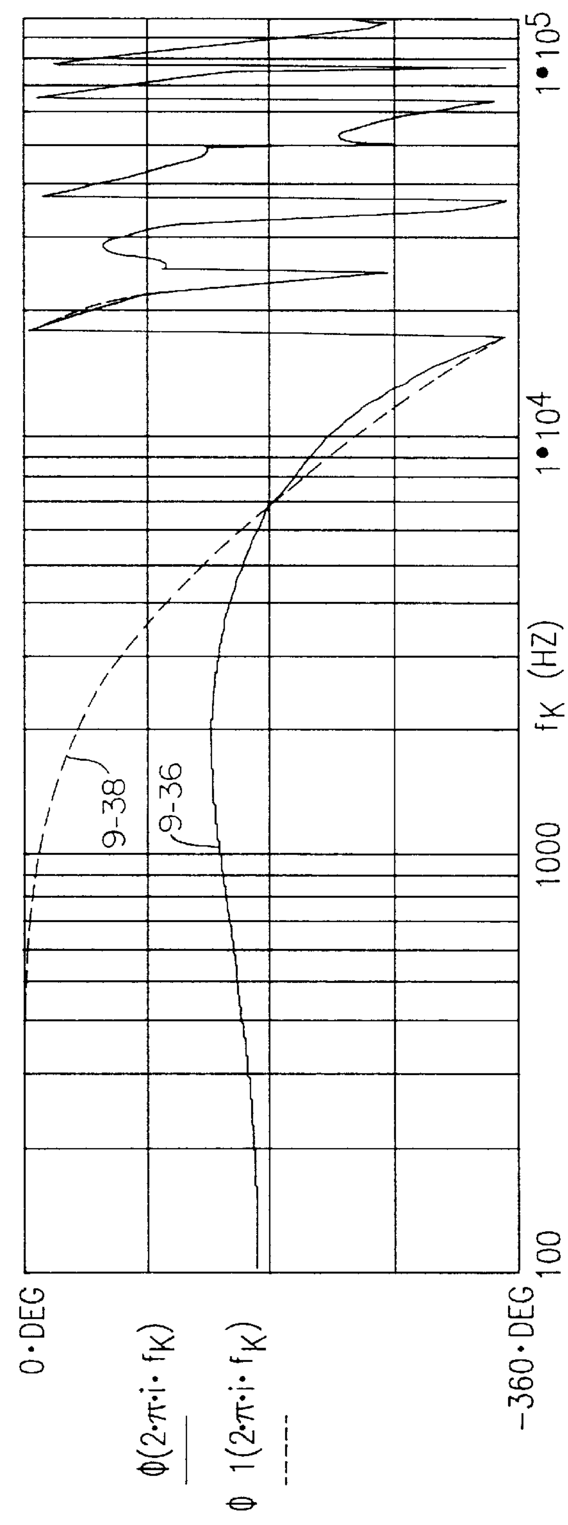

As shown in FIG. 124, the Nyquist diagram of the focus loop transfer function includes equal-peaking-loci which create M-circles 9–22, 9–24, 9–26, and 9–28. Each having an $M_p$value of 4.0, 2.0, 1.5, 1.3 respectively. FIG. 124 also shows loop curve 9–30 as generated from the open loop equations above. FIG. 125 shows the magnitude curve of the open loop response 9–32, and the closed loop response magnitude curve 9–34. FIG. 126 shows the phase curve of the open loop response 9–36 and the closed loop response phase curve 9–38.

Compensation Transfer Functions:

$T$:=20·$10^{-6}$$\omega_0$:=2·π·3000

DSP S&H and Processing Delay:

$$ZOH(s) := \left(\frac{1 - \exp(-s \cdot T)}{s \cdot T}\right)$$

$$T_{delay} := 2.5 \cdot 10^{-6} \quad H_{delay}(s) := \exp(-s \cdot T_{delay})$$

DSP MODEL: Triple Lead/Lag Circuit:

$$\tau_{lead} := \frac{1}{2 \cdot \pi \cdot 2185} \qquad \tau_{lag} := \frac{1}{2 \cdot \pi \cdot 5848}$$

Bilateral Transform $$s = \frac{2}{T} \cdot \left(\frac{z-1}{z+1}\right)$$

$$H_{leadlag}(z) := \frac{\left[1 + 2 \cdot \frac{\tau_{lead}}{T} \cdot \frac{(z-1)}{(z+1)}\right]}{\left[1 + 2 \cdot \frac{\tau_{lag}}{T} \cdot \frac{(z-1)}{(z+1)}\right]}$$

$$H_{leadlag}(s) := \left(\frac{1 + \tau_{lead} \cdot s}{1 + \tau_{lag} \cdot s}\right)$$

$$\frac{T - 2 \cdot \tau_{lead}}{T + 2 \cdot \tau_{lead}} = -0.759 \quad H_{leadlag}(z) := \frac{(T \cdot z + T + 2 \cdot \tau_{lead} \cdot z - 2 \cdot \tau_{lead})}{(T \cdot z + T + 2 \cdot \tau_{lag} \cdot z - 2 \cdot \tau_{lag})}$$

$$\frac{T - 2 \cdot \tau_{lag}}{T + 2 \cdot \tau_{lag}} = -0.463 \quad H_{leadlag}(z) := \frac{\left[1 + \left[\frac{(T - 2 \cdot \tau_{lead})}{(T + 2 \cdot \tau_{lead})}\right] \cdot \frac{1}{z}\right]}{\left[1 + \left[\frac{(T - 2 \cdot \tau_{lag})}{(T + 2 \cdot \tau_{lag})}\right] \cdot \frac{1}{z}\right]}$$

Definition of $z$: $z = e^{s \cdot T}$ $$H_{TripleComp}(s) := \left[\frac{1 + \left[\frac{(T - 2 \cdot \tau_{lead})}{(T + 2 \cdot \tau_{lead})}\right] \cdot \frac{1}{\exp(s \cdot T)}}{1 + \left[\frac{(T - 2 \cdot \tau_{lag})}{(T + 2 \cdot \tau_{lag})}\right] \cdot \frac{1}{\exp(s \cdot T)}}\right]^3$$

Triple Lead Lag Response:

$$H_{Triple}(s) := \frac{ZOH(s) \cdot H_{delay}(s) \cdot H_{TripleComp}(s)}{|H_{TripleComp}(\omega_0)|}$$

Single Lead Lag Response:

$$\tau_{lead} := \frac{1}{2 \cdot \pi \cdot 1000} \quad \tau_{lag} := \frac{1}{2 \cdot \pi \cdot 25000}$$

$$H_{LeadLag}(s) := \frac{1 + \left[\frac{(T - 2 \cdot \tau_{lead})}{(T + 2 \cdot \tau_{lead})}\right] \cdot \frac{1}{\exp(s \cdot T)}}{1 + \left[\frac{(T - 2 \cdot \tau_{lag})}{(T + 2 \cdot \tau_{lag})}\right] \cdot \frac{1}{\exp(s \cdot T)}}$$

$$H_{Single}(s) := \frac{ZOH(s) \cdot H_{delay}(s) \cdot H_{LeadLag}(s)}{|H_{LeadLag}(\omega_0)|}$$

Complex Lead Lag:

$\omega_{center}$:=2·π·2200 Span:=1.0 $\omega_2$:=$_{center}$−0.5·Span·$\omega_{center}$ $\omega_3$:=$\omega_{center}^2$/$\omega_2$$\zeta_3$:=1.7 $\zeta_2$:=0.707

$$H_{Compl}(s) := \left(\frac{s^2 + 2\cdot\zeta_2\cdot\omega_2\cdot s + \omega_2{}^2}{s^2 + 2\cdot\zeta_3\cdot\omega_3\cdot s + \omega_3{}^2}\right)\cdot\left(\frac{\omega_3{}^2}{\omega_2{}^2}\right)$$

$$\frac{\omega_2}{2\cdot\pi} = 1.1\cdot 10^3 \qquad \frac{\omega_3}{2\cdot\pi} = 4.4\cdot 10^3$$

$$H_{Compl}(z) := \frac{\left[\frac{4}{T^2}\cdot\frac{(z-1)^2}{(z+1)^2} + 4\cdot\zeta_2\cdot\frac{\omega_2}{T}\cdot\frac{(z-1)}{(z+1)} + \omega_2{}^2\right]}{\left[\frac{4}{T^2}\cdot\frac{(z-1)^2}{(z+1)^2} + 4\cdot\zeta_3\cdot\frac{\omega_3}{T}\cdot\frac{(z-1)}{(z+1)} + \omega_3{}^2\right]}\cdot\frac{\omega_3{}^2}{\omega_2{}^2}$$

$$H_{Compl}(z) := \frac{(4\cdot z^2 - 8\cdot z + 4 + 4\cdot\zeta_2\cdot\omega_2\cdot T\cdot z^2 - 4\cdot\zeta_2\cdot\omega_2\cdot T + \omega_2{}^2\cdot T^2\cdot z^2 + 2\cdot\omega_2{}^2\cdot T^2\cdot z + \omega_2{}^2\cdot T^2)}{(4\cdot z^2 - 8\cdot z + 4 + 4\cdot\zeta_3\cdot\omega_3\cdot T\cdot z^2 - 4\cdot\zeta_3\cdot\omega_3\cdot T + \omega_3{}^2\cdot T^2\cdot z^2 + 2\cdot\omega_3{}^2\cdot T^2\cdot z + \omega_3{}^2\cdot T^2)}\cdot\frac{\omega_3{}^2}{\omega_2{}^2}$$

$$H_{Compl}(z) := \frac{[(4 + \omega_2{}^2\cdot T^2 + 4\cdot\zeta_2\cdot\omega_2\cdot t)\cdot z^2 + (-8 + 2\cdot\omega_2{}^2\cdot T^2)\cdot z - 4\cdot\zeta_2\cdot\omega_2\cdot T + 4 + \omega_2{}^2\cdot T^2]}{[(4 + \omega_3{}^2\cdot T^2 + 4\cdot\zeta_3\cdot\omega_3\cdot t)\cdot z^2 + (-8 + 2\cdot\omega_3{}^2\cdot T^2)\cdot z - 4\cdot\zeta_3\cdot\omega_3\cdot T + 4 + \omega_3{}^2\cdot T^2]}\cdot\frac{\omega_3{}^2}{\omega_2{}^2}$$

$$H_{Compl}(z) := \frac{[(4 + \omega_2{}^2\cdot T^2 + 4\cdot\zeta_2\cdot\omega_2\cdot T) + (-8 + 2\cdot\omega_2{}^2\cdot T^2)\cdot z^{-1} + (4 + \omega_2{}^2\cdot T^2 - 4\cdot\zeta_2\cdot\omega_2\cdot T)\cdot z^{-2}]}{[(4 + \omega_3{}^2\cdot T^2 + 4\cdot\zeta_3\cdot\omega_3\cdot T) + (-8 + 2\cdot\omega_3{}^2\cdot T^2)\cdot z^{-1} + (4 + \omega_3{}^2\cdot T^2 - 4\cdot\zeta_3\cdot\omega_3\cdot T)\cdot z^{-2}]}\cdot\frac{\omega_3{}^2}{\omega_2{}^2}$$

$$H_{Compl}(s) := \frac{\left[4 + \omega_2{}^2\cdot T^2 + 4\cdot\zeta_2\cdot\omega_2\cdot T + \frac{(-8 + 2\cdot\omega_2{}^2\cdot T^2)}{\exp(s\cdot T)} + \frac{(-4\cdot\zeta_2\cdot\omega_2\cdot T + 4 + \omega_2{}^2\cdot T^2)}{\exp(s\cdot T)^2}\right]}{\left[4 + \omega_3{}^2\cdot T^2 + 4\cdot\zeta_3\cdot\omega_3\cdot T + \frac{(-8 + 2\cdot\omega_3{}^2\cdot T^2)}{\exp(s\cdot T)} + \frac{(-4\cdot\zeta_3\cdot\omega_3\cdot T + 4 + \omega_3{}^2\cdot T^2)}{\exp(s\cdot T)^2}\right]}\cdot\frac{\omega_3{}^2}{\omega_2{}^2}$$

$$H_{Complex}(s) := \frac{ZOH(s)\cdot H_{delay}(s)\cdot H_{Compl}(s)}{|\,H_{Compl}(\omega_0)\,|}$$

Analog Box ompensation:

$$\tau_{lead} := 20.5\cdot 10^3\cdot 0.01\cdot 10^{-6}$$

$$\tau_{lag} := 0.01\cdot 10^{-6}\cdot\frac{20.5\cdot 2.05}{(20.5 + 2.05)}\cdot 10^3$$

$$\tau_{lp} := 330\cdot 10^{-12}\cdot 20.5\cdot 10^3$$

$$H_{ABox}(s) := \left(\frac{1 + \tau_{lead}\cdot s}{1 + \tau_{lag}\cdot s}\right)\cdot\frac{1}{1 + \tau_{lp}\cdot s}$$

$$H_{AnalogBox}(s) := \frac{H_{ABox}(s)}{|\,H_{ABox}(\omega_0)\,|}$$

Single Lead Complex Lag:

$\omega_2 := 2\cdot\pi\cdot 900$ $\omega_7 := 2\cdot\pi\cdot 22000$ $\zeta_7 := 0.8$ $$H_{Compl}(s) := \frac{(s + \omega_6)}{(s^2 + 2\cdot\zeta_7\cdot\omega_7\cdot s + \omega_7{}^2)}\cdot\frac{\omega_7{}^2}{\omega_6}$$

-continued $$H_{Compl}(z) := \frac{\left[\frac{2}{T}\cdot\frac{(z-1)}{(z+1)} + \omega_6\right]}{\left[\frac{4}{T^2}\cdot\frac{(z-1)^2}{(z+1)^2} + 4\cdot\zeta_7\cdot\frac{\omega_7}{T}\cdot\frac{(z-1)}{(z+1)} + \omega_7{}^2\right]}\cdot\frac{\omega_7{}^2}{\omega_6}$$

$$H_{Compl}(z) := \frac{(2\cdot z - 2 + \omega_6\cdot T\cdot z + \omega_6\cdot T)\cdot((z+1)\cdot T)}{(4\cdot z^2 - 8\cdot z + 4 + 4\cdot\zeta_7\cdot\omega_7\cdot T\cdot z^2 - 4\cdot\zeta_7\cdot\omega_7\cdot T + \omega_7{}^2\cdot T^2\cdot z^2 + 2\cdot\omega_7{}^2\cdot T^2\cdot z + \omega_7{}^2\cdot T^2)}\cdot\frac{\omega_7{}^2}{\omega_6}$$

$$H_{Compl}(z) := \frac{(2\cdot T\cdot z^2 - 2\cdot T + \omega_6\cdot T^2\cdot z^2 + 2\cdot\omega_6\cdot T^2\cdot z + \omega_6\cdot T^2)}{(4\cdot z^2 - 8\cdot z + 4 + 4\cdot\zeta_7\cdot\omega_7\cdot T\cdot z^2 - 4\cdot\zeta_7\cdot\omega_7\cdot T + \omega_7{}^2\cdot T^2\cdot z^2 + 2\cdot\omega_7{}^2\cdot T^2\cdot z + \omega_7{}^2\cdot T^2)}\cdot\frac{\omega_7{}^2}{\omega_6}$$

$$H_{Compl}(z) := \frac{\left[\omega_6\cdot T^2 + 2\cdot T + 2\cdot\omega_6\cdot\frac{T^2}{z} + \frac{(\omega_6\cdot T^2 - 2\cdot T)}{z^2}\right]}{\left[4 + \omega_7{}^2\cdot T^2 + 4\cdot\zeta_7\cdot\omega_7\cdot T + \frac{(-8 + 2\cdot\omega_7{}^2\cdot T^2)}{z} + \frac{(4 + \omega_7{}^2\cdot T^2 - 4\cdot\zeta_7\cdot\omega_7\cdot T)}{z^2}\right]}\cdot\frac{\omega_7{}^2}{\omega_6}$$

$$H_{Compl}(s) := \frac{\left[\omega_6\cdot T^2 + 2\cdot T + 2\cdot\omega_6\cdot\frac{T^2}{\exp(s\cdot T)} + \frac{(\omega_6\cdot T^2 - 2\cdot T)}{\exp(s\cdot T)^2}\right]}{\left[4 + \omega_7{}^2\cdot T^2 + 4\cdot\zeta_7\cdot\omega_7\cdot T + \frac{(-8 + 2\cdot\omega_7{}^2\cdot T^2)}{\exp(s\cdot T)} + \frac{(4 + \omega_7{}^2\cdot T^2 - 4\cdot\zeta_7\cdot\omega_7\cdot T)}{\exp(s\cdot T)^2}\right]}\cdot\frac{\omega_7{}^2}{\omega_6}$$

$$H_{slcl}(s) := \frac{ZOH(s)\cdot H_{delay}(s)\cdot H_{Compl}(s)}{|\,H_{Compl}(\omega_0)\,|}$$

Plot Data:

$$n := 400 \quad r := \ln\left(\frac{\max}{\min}\right) \quad k := 1 \ldots n \quad \min := 100$$

$$f_k := \min\cdot e^{k\cdot\frac{r}{n}} \quad deg \equiv \frac{\pi}{180} \quad \max := 10\cdot 10^4$$

Figure 127:
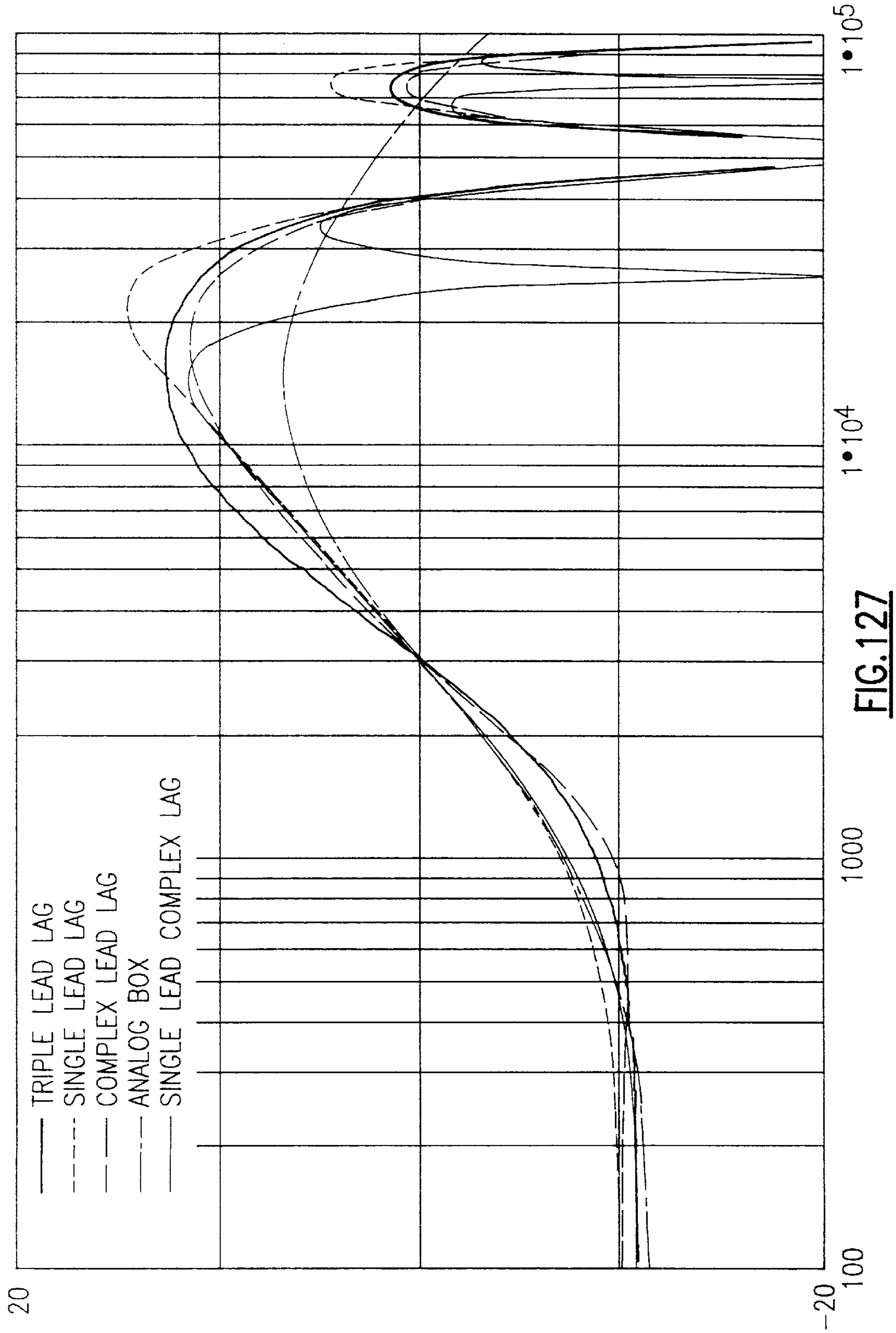
Figure 128:
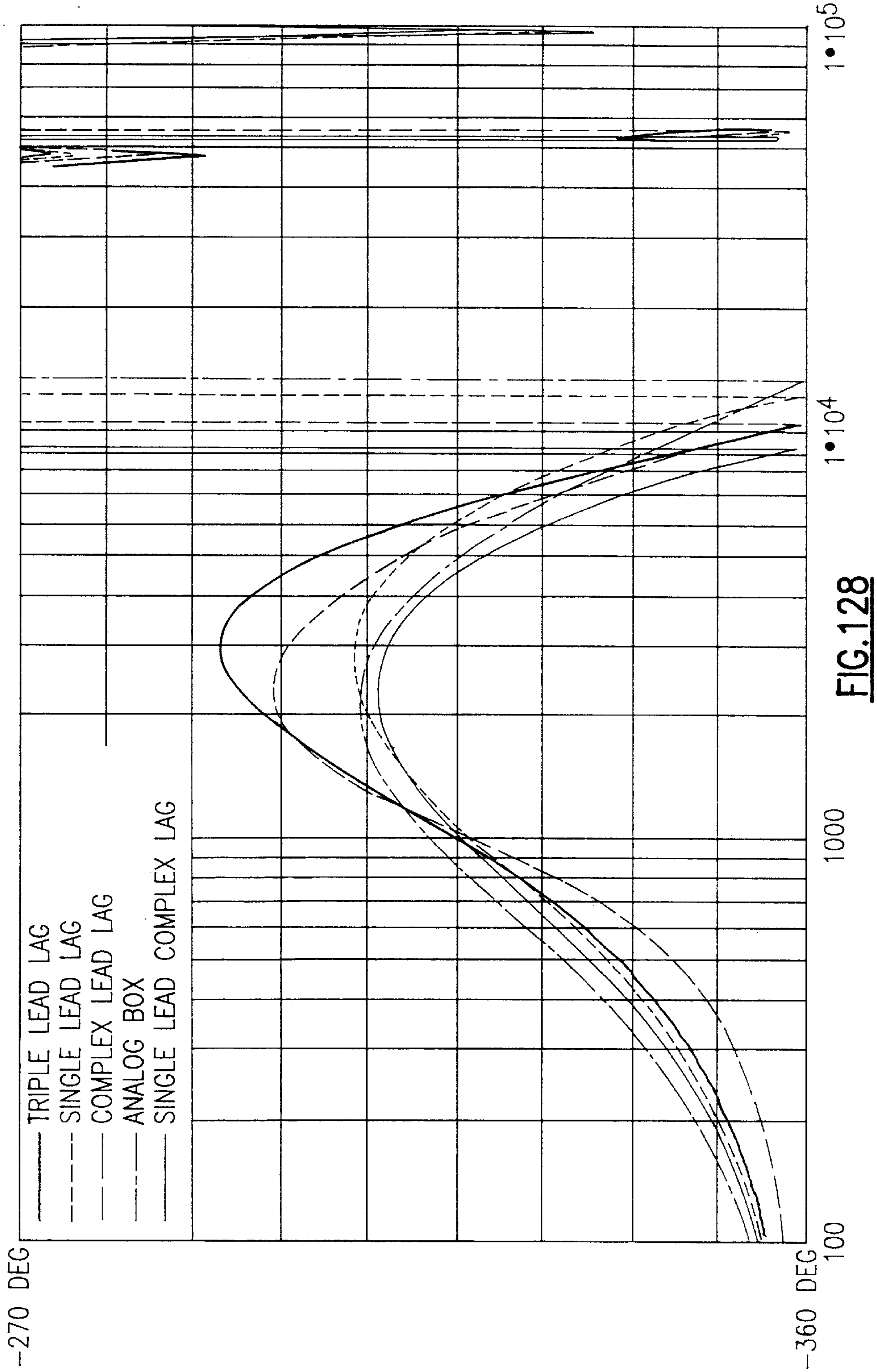

$\mathrm{Magn}(s) := 20\cdot\log(|H_{Triple}(s)|)$ $\phi(s) := \mathrm{angle}(\mathrm{Re}(H_{Triple}(s)), \mathrm{Im}(H_{Triple}(s))) - 360\cdot deg$ $\mathrm{Magn}_1(s) := 20\cdot\log(|H_{Single}(s)|)$ $\phi_1(s) := \mathrm{angle}(\mathrm{Re}(H_{single}(s)), \mathrm{Im}(H_{Single}(s))) - 360\cdot deg$ $\mathrm{Magn}_2(s) := 20\cdot\log(H_{complex}(S)|)$ $\phi_2(s) := \mathrm{angle}(\mathrm{Re}(H_{Complex}(s)), \mathrm{Im}(H_{complex}(s))) - 360\cdot deg$ $\mathrm{Magn}_3(s) := 20\cdot\log(|H_{AnalogBox}(s)|)$ $\phi_3(s) := \mathrm{angle}(\mathrm{Re}(H_{AnalogBox}(s)), \mathrm{Im}(H_{AnalogBox}(s)))\cdot 360\cdot deg$ $\mathrm{Magn}_4(s) := 20\cdot\log(|H_{slcl}(s)|)$ $\phi_4(s) := \mathrm{angle}(\mathrm{Re}(H_{slcl}(s)), \mathrm{Im}(H_{slcl}(s))) - 360\cdot deg$ FIG. 127 illustrates the magnitude response curves for focus compensation transfer functions as derived from the indicated equations. The graph of FIG. 127 shows the individual response curves for triple lead lag, single lead lag, complex lead lag, analog box, and single lead complex lag as identified by the keys in the legend box. Similarly, FIG. 128 shows the phase response curves for the focus compensation transfer functions as derived from the corresponding equations. The graph of FIG. 128 illustrates the individual phase response curves for triple lead lag, single lead lag, complex lead lag, analog box, and single lead complex lag as identified in the legend box.

Complex Lead/Lag:

$$H_{Compl}(z) := \frac{\left[\frac{4+\omega_2{}^2\cdot T^2+4\cdot\zeta_2\cdot\omega_2\cdot T}{(-8+2\cdot\omega_2{}^2\cdot T^2)} + 1\cdot z^{-1} + \frac{4+\omega_2{}^2\cdot T^2-4-\zeta_2\cdot\omega_2\cdot T}{(-8+2\cdot\omega_2{}^2\cdot T^2)}\cdot z^{-2}\right]}{\left(1+\frac{-8+2\cdot\omega_3{}^2\cdot T^2}{4+\omega_3{}^2\cdot T^2+4\cdot\zeta_3\cdot\omega_3\cdot T}\cdot z^{-1} + \frac{4+\omega_3{}^2\cdot T^2-4\cdot\zeta_3\cdot\omega_3\cdot T}{4+\omega_3{}^2\cdot T^2+4\cdot\zeta_3\cdot\omega_3\cdot T}\cdot z^{-2}\right)} \cdot \frac{\omega_3{}^2\cdot(-8+2\cdot\omega_2{}^2\cdot T^2)}{\omega_2{}^2\cdot(4+\omega_3{}^2\cdot T^2+4\cdot\zeta_3\cdot\omega_3\cdot T)}$$

$$N_1 := \frac{4+\omega_2{}^2\cdot T^2+4\cdot\zeta_2\cdot\omega_2\cdot T}{(-8+2\cdot\omega_2{}^2\cdot T^2)} \quad N_1 = -0.554 \quad N_2 := 1$$

$$N_3 := \frac{4+\omega_2{}^2\cdot T^2-4\cdot\zeta_2\cdot\omega_2\cdot T}{(-8+2\cdot\omega_2{}^2\cdot T^2)} \quad N_3 = -0.456 \quad D_1 := 1$$

$$D_2 := \frac{-8+2\cdot\omega_3{}^2\cdot T^2}{(4+\omega_3{}^2\cdot T^2+4\cdot\zeta_3\cdot\omega_3\cdot T)} \quad D_2 = -0.916$$

$$D_3 := \frac{4+\omega_3{}^2\cdot T^2-4\cdot\zeta_3\cdot\omega_3\cdot T}{(4+\omega_3{}^2\cdot T^2+4\cdot\zeta_3\cdot\omega_3\cdot T)} \quad D_3 = 0.068$$

Single Lead Complex Lag:

$$H_{Compl}(z) := \frac{[(\omega_6\cdot T^2+2\cdot)+2\cdot\omega_6\cdot T^2\cdot z^{-1}+(\omega_6\cdot T^2-2\cdot T)\cdot z^{-2}]}{[(4+\omega_7{}^2\cdot T^2+4\cdot\zeta_7\cdot\omega_7\cdot T)+(-8+2\cdot\omega_7{}^2\cdot T^2)\cdot z^{-1}+(4+\omega_7{}^2\cdot T^2-4\cdot\zeta_7\cdot\omega_7\cdot T)\cdot z^{-2}]}\cdot\frac{\omega_7{}^2}{\omega_6}$$

$$\omega_2\cdot T^2+2\cdot T = 4.276\cdot 10^{-5} \quad 2\cdot\omega_2\cdot T^2 = 5.529\cdot 10^{-6}$$

$$N_1 := \frac{\omega_6\cdot T^2+2\cdot T}{(\omega_6\cdot T^2+2\cdot T)} \quad N_1 = 1$$

$$N_2 := \frac{2\cdot\omega_6\cdot T^2}{(\omega_6\cdot T^2+2\cdot T)} \quad N_2 = 0.107$$

$$N_3 := \frac{\omega_6\cdot T^2-2\cdot T}{(\omega_6\cdot T^2+2\cdot T)} \quad N_3 = -0.893 \quad |N_1|+|N_2|+|N_3| = 2$$

$$D_2 := \frac{-8+2\cdot\omega_7{}^2\cdot T^2}{4+\omega_7{}^2\cdot T^2+4\cdot\zeta_7\cdot\omega_7\cdot T} \quad D_2 = 0.356$$

$$D_3 := \frac{4+\omega_7{}^2\cdot T^2-4\cdot\zeta_7\cdot\omega_7\cdot T}{4+\omega_7{}^2\cdot T^2+4\cdot\zeta_7\cdot\omega_7\cdot T} \quad D_3 = 0.136$$

To the extent not already disclosed, the following U.S. Patents are herein incorporated by reference: Grove et al., U.S. Pat. No. 5,155,633; Prikryl et al., U.S. Pat. No. 5,245,174; and Grassens, U.S. Pat. No. 5,177,640.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. An optical disc system for changing a rotational rate of a storage medium, said system comprising:

means for applying a force to a respective storage medium to change the rotational rate of said storage medium from an initial rotational rate toward a first upper limit, said first upper limit being between said initial rotational rate and a desired rotational rate;

means for generating a first signal when the rotational rate of said storage medium exceeds said first upper limit;

means for generating a second signal when said rotational rate of said storage medium exceeds a lower acceptable limit of said desired rotational rate; and first means for terminating said application of said force to said storage medium.

2. The system according to claim 1 further including means for decreasing the magnitude of said force applied to said storage medium after generating said first signal.

3. The system according to claim 1 further including means for decreasing the magnitude of said force applied to said storage medium before generating said second signal.

4. The system according to claim 1 wherein said first means for terminating includes:

means for setting a second upper limit at an upper acceptable limit of said desired rotational rate;

means for setting a lower limit at said lower acceptable limit of said desired rotational rate; and second means for terminating said application of said force to said storage medium when the rotational rate of said storage medium is greater than said lower limit.

5. The system according to claim 4 wherein said first means for terminating includes said second means for terminating.

6. The system according to claim 4 wherein said upper acceptable limit of said desired rotational rate is greater than said lower acceptable limit of said desired rotational rate.

7. The system according to claim 6 wherein said upper acceptable limit is one-half of one percent greater than said desired rotational rate, and said lower acceptable limit is one-half of one percent less than said desired rotational rate.

8. An optical disc system for changing a rotational rate of a storage medium, said system comprising:

a motor for rotating a respective storage medium relative to an objective lens, said motor having a support assembly for supporting said storage medium, and said motor employed to apply a force to the supported storage medium to thereby rotate said storage medium;

a controller connected to said motor for regulating the force applied to said storage medium so that the rotational rate of said storage medium is changed form from an initial rotational rate toward a first lower limit, said first lower limit being between said initial rotational rate and a desired rotational rate having a lower acceptable limit and an upper acceptable limit;

a first electronic circuit that generates a first signal when the rotational rate of said storage medium drops below said first lower limit;

a second electronic circuit that generates a second signal when the rotational rate of said storage medium drops below said upper acceptable limit; and a switching circuit that directs said controller to terminate application of said force to said storage medium.

9. The system according to claim 8 further including means for decreasing the magnitude of said force applied to said storage medium after said first signal is generated.

10. The system according to claim 8 further including means for decreasing the magnitude of said force applied to said storage medium before said second signal is generated.

11. The system according to claim 8 wherein said switching circuit includes:

means for setting a second lower limit at said lower acceptable limit of said desired rotational rate;

means for setting an upper limit at said upper acceptable limit of said desired rotational rate; and means for terminating said application of said force to said storage medium when the rotational rate of said storage medium is less than said upper limit.

12. The system according to claim 11 wherein said upper acceptable limit of said desired rotational rate is greater than said lower acceptable limit of said desired rotational rate.

13. The system according to claim 12 wherein said upper acceptable limit is one-half of one percent greater than said desired rotational rate, and said lower acceptable limit is one-half of one percent less than said desired rotational rate.

14. A method of changing a rotational rate of a storage medium, said method comprising the steps of:

applying a force to a respective storage medium to change the rotational rate of said storage medium from an initial rotational rate toward a first upper limit, said first upper limit being between said initial rotational rate and a desired rotational rate;

generating a first signal when the rotational rate of said storage medium exceeds said first upper limit;

generating a second signal when said rotational rate of said storage medium exceeds a lower acceptable limit of said desired rotational rate; and terminating said application of said force to said storage medium.

15. The method according to claim 14 further including the step of decreasing the magnitude of said force applied to said storage medium after generating said first signal.

16. The method according to claim 14 further including the step of decreasing the magnitude of said force applied to said storage medium before generating said second signal.

17. The method according to claim 14 wherein said step of terminating further includes the steps of:

setting a second upper limit at an upper acceptable limit of said desired rotational rate;

setting a lower limit at said lower acceptable limit of said desired rotational rate; and terminating said application of said force to said storage medium when the rotational rate of said storage medium is greater than said lower limit.

18. The method according to claim 17 wherein said upper acceptable limit of said desired rotational rate is greater than said lower acceptable limit of said desired rotational rate.

19. The method according to claim 18 wherein said upper acceptable limit is one-half of one percent greater than said desired rotational rate, and said lower acceptable limit is one-half of one percent less than said desired rotational rate.

20. A method of changing a rotational rate of a storage medium, said method comprising the steps of:

applying a force to a respective storage medium to change the rotational rate of said storage medium from an initial rotational rate toward a first lower limit, said first lower limit being between said initial rotational rate and a desired rotational rate having a lower acceptable limit and an upper acceptable limit;

generating a first signal when the rotational rate of said storage medium drops below said first lower limit;

generating a second signal when the rotational rate of said storage medium drops below said upper acceptable limit; and terminating said application of said force to said storage medium.

21. The method according to claim 20 further including the step of decreasing the magnitude of said force applied to said storage medium after said step of generating said first signal.

22. The method according to claim 20 further including the step of decreasing the magnitude of said force applied to said storage medium before said step of generating said second signal.

23. The method according to claim 20 wherein said step of terminating further includes the steps of:

setting a second lower limit at said lower acceptable limit of said desired rotational rate;

setting an upper limit at said upper acceptable limit of said desired rotational rate; and terminating said application of said force to said storage medium when the rotational rate of said storage medium is less than said upper limit.

24. The method according to claim 23 wherein said upper acceptable limit of said desired rotational rate is greater than said lower acceptable limit of said desired rotational rate.

25. The method according to claim 24 wherein said upper acceptable limit is one-half of one percent greater than said desired rotational rate, and said lower acceptable limit is one-half of one percent less than said desired rotational rate.

26. An optical disc system operated in accordance with the method recited in claim 14.

27. An optical disc system operated in accordance with the method recited in claim 20.

28. An optical disc system operated in accordance with the method recited in claim 15.

29. An optical disc system operated in accordance with the method recited in claim 16.

30. An optical disc system operated in accordance with the method recited in claim 17.

31. An optical disc system operated in accordance with the method recited in claim 18.

32. An optical disc system operated in accordance with the method recited in claim 19.

33. An optical disc system operated in accordance with the method recited in claim 21.

34. An optical disc system operated in accordance with the method recited in claim 22.

35. An optical disc system operated in accordance with the method recited in claim 23.

36. An optical disc system operated in accordance with the method recited in claim 24.

37. An optical disc system operated in accordance with the method recited in claim 25.

* * * * *

UNITED STATES PATENT AND TRADEMARK OFFICE

CERTIFICATE OF CORRECTION

PATENT NO. : 6,091,684
DATED : July 18, 2000
INVENTOR(S) : David L. Schell

It is certified that error appears in the above-identified patent and that said Letters Patent is hereby corrected as shown below:

Item [56], References Cited,
Under U.S. PATENT DOCUMENTS: Add

| | | |
|---|---|---|
| -- 4,677,605 | 6/1987 | Abed |
| 4,974,222 | 11/1990 | Ishitoya et al. |
| 5,004,901 | 4/1991 | Yoshimoto et al. -- |

FOREIGN PATENT DOCUMENTS: Add

| | | |
|---|---|---|
| -- 456454 | 11/1991 | European Pat. Off. |
| 458319 | 11/1991 | European Pat. Off. |
| 554125 | 8/1993 | European Pat. Off. |
| 568009 | 11/1993 | European Pat. Off. |
| 586185 | 3/1994 | European Pat. Off. |
| 618569 | 10/1994 | European Pat. Off. |
| 2595857 | 9/1987 | France |
| 5325294 | 12/1993 | Japan |
| 6342526 | 12/1994 | Japan -- |

OTHER PUBLICATIONS: Add
-- Marchant, Alan B., "Optical Recording: A Technical Overview" 1990, Addison-Wesley, Reading Massachusetts XP002093189 19056 "The servo loop", pg. 181-188. --

Signed and Sealed this

Twenty-seventh Day of November, 2001

*Attest:*

Nicholas P. Godici

NICHOLAS P. GODICI

*Attesting Officer* *Acting Director of the United States Patent and Trademark Office*